United States Patent [19]

Dysart et al.

[11] Patent Number: 4,953,080
[45] Date of Patent: Aug. 28, 1990

[54] OBJECT MANAGEMENT FACILITY FOR MAINTAINING DATA IN A COMPUTER SYSTEM

[75] Inventors: John A. Dysart, Santa Clara; Peter S. Showman, Cupertino; William M. Crow, San Jose, all of Calif.; Peter M. Williams, Lydney, England; Brian W. McBride, Wokingham, England; John R. F. Senior, Thornbury, England; Charles H. Whelan, Placerville, Calif.; Brian Murdoch, Wokingham, England

[73] Assignee: Hewlett-Packard Company, Palo Alto, Calif.

[21] Appl. No.: 186,516

[22] Filed: Apr. 25, 1988

[51] Int. Cl.⁵ .............................................. G06F 1/00
[52] U.S. Cl. ............................... 364/200; 364/222.81
[58] Field of Search ... 364/200 MS File, 900 MS File

[56] References Cited

U.S. PATENT DOCUMENTS

| | | | |
|---|---|---|---|
| 4,555,775 | 11/1985 | Pike | 364/900 |
| 4,558,413 | 12/1985 | Schmidt et al. | 364/300 |
| 4,635,208 | 1/1987 | Coleby et al. | 364/491 |
| 4,700,181 | 10/1987 | Maine et al. | 340/747 |
| 4,739,477 | 4/1988 | Barker et al. | 364/300 |
| 4,782,463 | 11/1988 | Sanders et al. | 364/900 |
| 4,792,937 | 11/1988 | Picard | 369/59 |
| 4,811,240 | 3/1989 | Ballou et al. | 364/518 |

Primary Examiner—Raulfe B. Zache
Attorney, Agent, or Firm—Roland I. Griffin; Alan H. Haggard

[57] ABSTRACT

A computer having a file management system is presented. The file management system includes a plurality of application programs, a plurality of data files, a plurality of class data structures and a plurality of object data structures. Each class data structure includes a reference to an application program within the plurality of application programs. Each object data structure includes a reference to a class data structure from the plurality of class data structure and a reference to at least one data file from the plurality of data files.

The use of object data structures adds a layer between a user of the computer and data files. This allows for the computer to refer to an object data structure and associated access files using a tag which is inaccessible to the user. The user refers to an object based on the physical location of the object on the screen. The user may also give the object data structure a name, which is wholly unconnected to the value of the tag. This allows a user to, for instance, give two objects in the same directory, the same name.

Additonally, the file management system includes a plurality of link data structures, each link data structure including a reference to a first object data structure in the plurality of object data structures which serves a parent object of the link, and including a reference to a second object data structure in the plurality of object data structures which serves as a child object of the link. Child objects and parent objects are not necessarily the same for each link data structure.

24 Claims, 59 Drawing Sheets

| 731 | 732 | 734 / 733 |
|---|---|---|
| ***  | | *** |
| 6 | 12 | 1 | — 735
| ** | | ** |
| 6 | 19 | 7 | — 736
| ** | | ** |
| 17 | 8 | 1 | — 737
| | | | — 738
| ** | | ** |
| 17 | 21 | 3 | — 739
| | | | — 740
| *** | | *** |

HPOMF XRF

FIG. 79

View Specification Record 740

OBJECT MANAGEMENT FACILITY FOR MAINTAINING DATA IN A COMPUTER SYSTEM

BACKGROUND

The present invention relates to the management of data within a computing system.

One problem that has made computer use difficult is inefficient file management systems. For instance, in a directory, there cannot exist two files with the same name.

Further, there is data incompatibility between data files which are originated by different computer applications. Typically, each computer application operates independently from other computer applications. It is extremely rare that data from one computer application may be effectively incorporated into data from another application. If data is incorporated, it is difficult if not impossible to modify. Furthermore, once data has been transferred from a first application to a second application, it is usually impossible to return the data back to the first application to be modified.

On occasion so-called integrated software is developed whereby there is some data compatibility between certain applications. However, these integrated software packages do not provide for data compatibility with computer applications which are not part of the integrated software packages.

SUMMARY OF THE INVENTION

In accordance with the preferred embodiment of the present invention, a computer having a file management system is presented. The file management system includes a plurality of application programs, a plurality of data files a plurality of class data structures and a plurality of object data structures. Each class data structure includes a reference to an application program within the plurality of application programs. Each object data structure includes a reference to a class data structure from the plurality of class data structures and a reference to at least one data file from the plurality of data files.

The use of object data structures adds a layer between a user of the computer and data files. This allows for the computer to refer to an object data structure and access files associated therewith using a tag which is inaccessible to the user. The user refers to an object based on the physical location of the object on the screen. The user may also give the object data structure a name, which is wholly unconnected to the value of the tag. This allows a user to, for instance, give two objects in the same directory, the same name.

Additionally, the file management system includes a plurality of link data structures, each link data structure including a reference to a first object data structure in the plurality of object data structures which serves a parent object of the link, and including a reference to a second object data structure in the plurality of object data structures which serves as a child object of the link. Child objects and parent objects are not necessarily the same for each link data structure.

One advantage of the present invention is that it allows users to file and use their data in any number of locations, by linking those locations to the actual data object. For example, a single spreadsheet can be linked into several different folders, used as a table in a word processing document and as a data source for a bar chart. From any of these linked locations, for instance, the user can very easily get to the spreadsheet to more fully examine or modify it. Any changes made to the spreadsheet are automatically reflected in all locations where the spreadsheet is linked.

BRIEF DESCRIPTION OF THE DRAWINGS

FIG. 79 is a block diagram of the organization of HPOMF.XRF, a system file included in the OMF shown in FIG. 72.

FIG. 8B shows the data path of a view when there is a snapshot, in accordance with a preferred embodiment of the present invention.

DESCRIPTION OF THE PREFERRED EMBODIMENT

Figure 1:
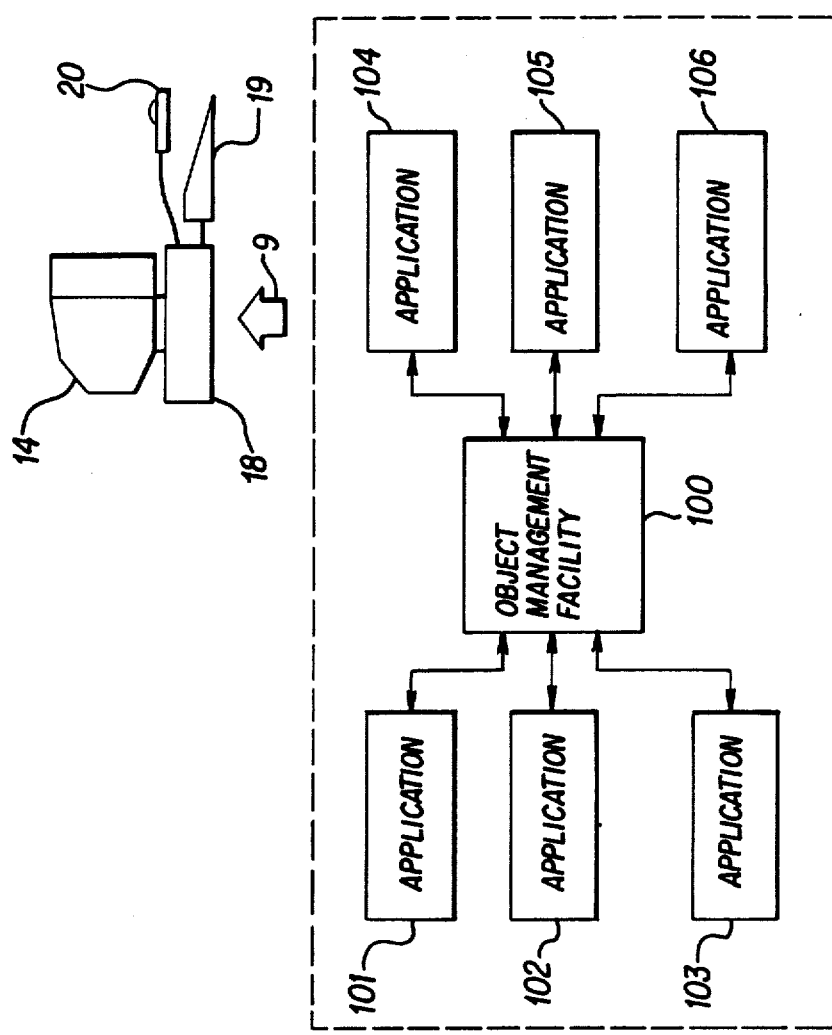
FIG. 1 is a block diagram of a computer in accordance with the preferred embodiment of the present invention.

FIG. 1 shows a computer 18 having a monitor 14, a keyboard 19 and a mouse 20. A portion of computer main memory 17 is shown by an arrow 9 to be within computer 18. Within computer memory main 17 is shown an object management facility (OMF)100, an application 101, an application 102, an application 103, an application 104, an application 105 and an application 106.

Each of applications 101 to 106 store data using objects. For instance, in FIG. 2, application 101 is shown to have stored data using an object 202, an object 203, an object 204 and an object 205. Similarly, application 106 is shown to have stored data in an object 207, an object 208, an object 209 and an object 210. OMF 100 stores information indicating which objects go with which application. Objects which are associated with a single application are considered to be objects of the same type, or the same class. For instance, object 202, 203, 204 and 205 are of the same class because each is associated with application 101. Similarly objects 207, 208, 209 and 210 are of the same class because each is associated with application 106. All objects of the same class use the same application. When an application is being run by computer 18, OMF 100 informs the application which object the application should access for data. That object is then considered to be active. An object is inactive when the application the object is associated with is not being run by computer 18, or when the application the object is associated with is being run, but is not being run with the data of that object.

Active objects can communicate with each other using messages. For example if two instances of application 101 are being run by computer 18, one with the data of object 202 and the other with the data of object 203, object 202 and object 203 are both active. Therefore object 202 may send a message 211 to object 203. Similarly, if computer 18 is running application 101 with the data of object 202, and is running application 106 with the data of object 207, object 202 and object 207 are both active. Therefore, object 202 may send a message 212 to object 207.

Messages, such as message 211 and 212 may be formatted to be sent and received by all types of objects. This allows for free communication between all active objects. This also allows new object types to be defined and added to the system without requiring that the existing object types be updated to use the new type.

Each object has associated with a set of data files. For instance, object 210 is shown to have associated with it a data file 221, a data file 222 and a data file 223. Data in data files 221, 222 and 223 are in a format which can be interpreted by application 106.

Each object has associated with it a list of properties. Each property has a name and a value which may be accessed by specifying the name. In addition, each class of objects has associated with it a list of properties that are common to all objects of that class. For instance, in FIG. 2A, object 205 and application 101 are shown. Object 205 has associated with it a property 231, a property 232, and a property 233. Application 101 has associated with it a property 131, a property 132 and a property 133.

Property lists can contain any number of properties. Each property value can be from zero to 3,2762 bytes in length. Properties are used to store descriptive information about objects and classes, such as names, comments and so on.

Objects may have references to other objects. These references are called links. Links are directional: one object is called the parent, the other the child. Each link has a reference name which is a number that is assigned by the parent object to identify each of its children. All of an object's children, its children's children, and so on are collectively called that object's descendents. Similarly, an object's parents, its parents' parents, and so on, are collectively called that object's ancestors. In the preferred embodiment of the present invention, an object which may be manipulated by a user, can have zero or more children and one or more parents. An object is not allowed to become its own descendent.

Figure 3:
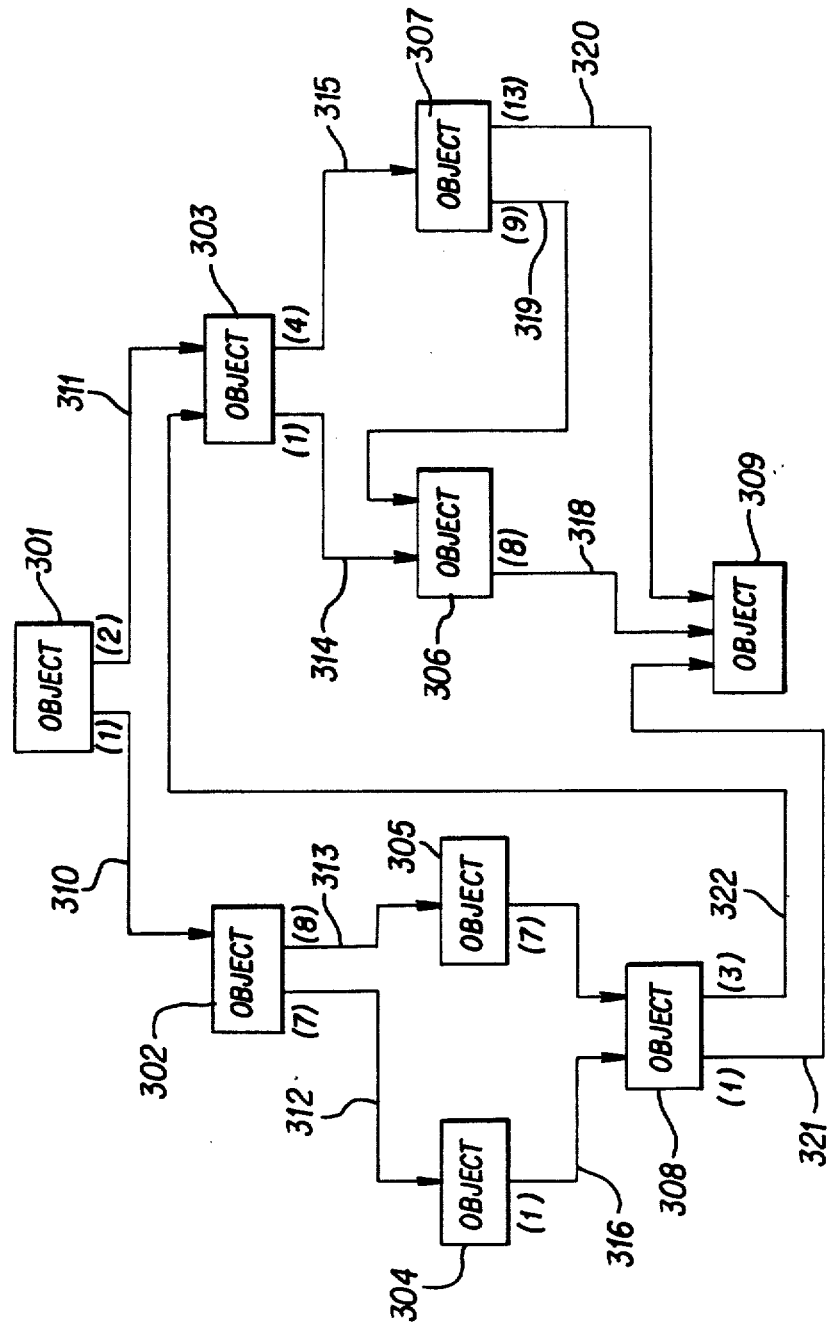
FIG. 3 shows a plurality of objects linked in accordance with a preferred embodiment of the present invention.

In FIG. 3 is shown an object 301, an object 302, an object 303, an object 304, an object 305, an object 306, an object 307, an object 308 and an object 309. Objects 301-309 have links with reference names which are numbers shown in parenthesis by each link. Object 301 has a link 310, with reference name "1", to object 302. Object 301 has a link 311, with reference name "2", to object 303. Object 302 has a link 312, with reference name "7", to object 304. Object 302 has a link 313, with reference name "8", to object 305. Object 303 has a link 314, with reference name "1", to object 306. Object 303 has a link 315, with reference name "4", to object 307. Object 304 has a link 316, with reference name "1", to object 308. Object 305 has a link 317, with reference name "7", to object 308. Object 306 has a link 318, with reference name "8", to object 309. Object 307 has a link 319, with reference name "9", to object 306. Object 307 has a link 320, with reference name "13", to object 309. Object 308 has a link 321, with reference name "1", to object 309. Object 308 has a link 322, with reference name "3", to object 303.

Object 301 is a parent of 302 and 303. Object 303 is a child of object 301 and of object 308. Each of objects 302-309 are descendents of object 301. Descendents of object 303 are objects 306, 307 and 309. Object 309 has for ancestors all of objects 301-308. Object 303 has for ancestors objects 301, 302, 304, 305 and 308. And so on.

Active objects can dynamically make and delete links to other objects. When a link to an object is deleted, OMF 100 checks if the object has any other parents. If not, OMF 100 destroys the object by deleting the data files of the object and reclaiming other storage space associated with the object.

Figure 4:
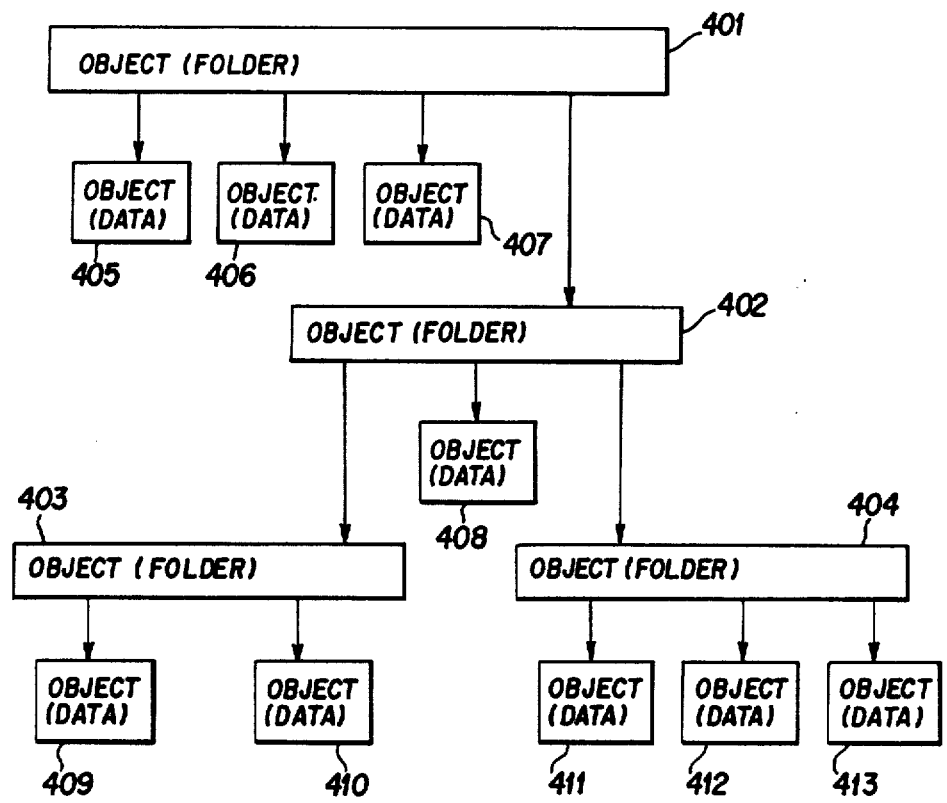
FIG. 4 shows a series of objects serving as folders, as parents of objects containing data, in accordance with a preferred embodiment of the present invention.

Object links may be used for various purposes. For example, folders may be in the form of objects. The children of objects used as folders may be objects containing data for use with various applications, or the objects may be other folders. FIG. 4 shows an example of the use of objects as folders. An object 401 (also called folder 401), an object 402 (also called folder 402), an object 403 (also called folder 403) and an object 404 (also called folder 404) are used as folders. Folder 401 contains an object 405, used to contain data, an object 406, used to contain data, an object 407, used to contain data, and folder 402. Folder 402 contains an object 408, used to contain data, folder 403 and folder 404. Folder 403 contains an object 409, used to contain data, and an object 410, used to contain data. Folder 404 contains an object 411, used to contain data, an object 412, used to contain data and an object 413, used to contain data.

Figure 5:
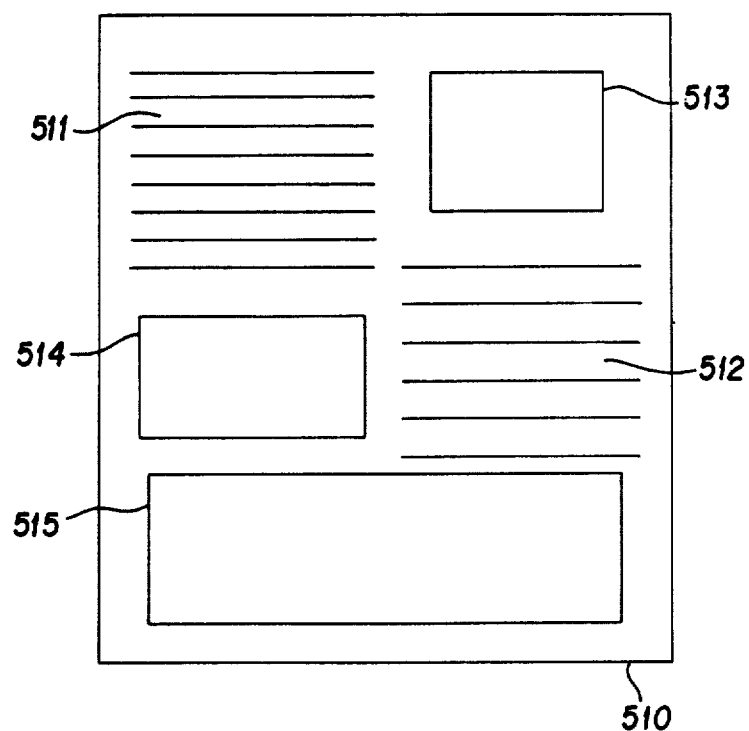
FIG. 5 illustrates the screen display which results from linking of various objects in accordance with a preferred embodiment of the present invention.
Figure 6:
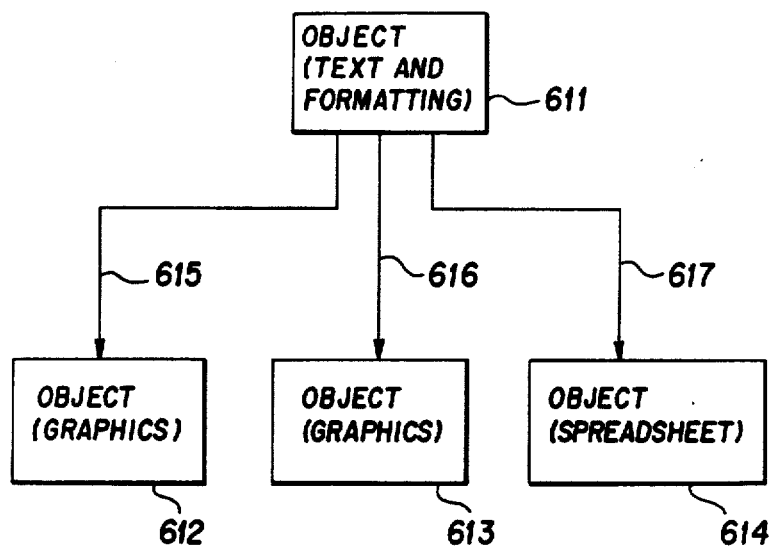
FIG. 6 shows the linking of objects in order to create the screen display shown in FIG. 5.

A more sophisticated use of links is to construct compound objects. For instance in FIG. 5, a document 510 contains lines of text 511, lines of text 512, a graphics FIG. 513, a graphics FIG. 514 and spreadsheet data 515. As shown in FIG. 6, text and formatting data is stored in an object 611, graphics data for graphics FIG. 513 is stored in an object 612, graphics data for graphics figure 514 is stored in an object 613 and spreadsheet data 515 is stored in object 614. Links that are used to build compound objects always have some kind of data transfer associated with the link and chain are called data links. In FIG. 6 is shown a data link 615, a data link 616 and a data link 617. In document 510, data from object 612, object 613 and object 614 are merely displayed, therefore data link 614, data link 615 and data link 616 are visual data links. In a visual data link, the parent will send requests to its child to display data within the parent's window.

Figure 7:
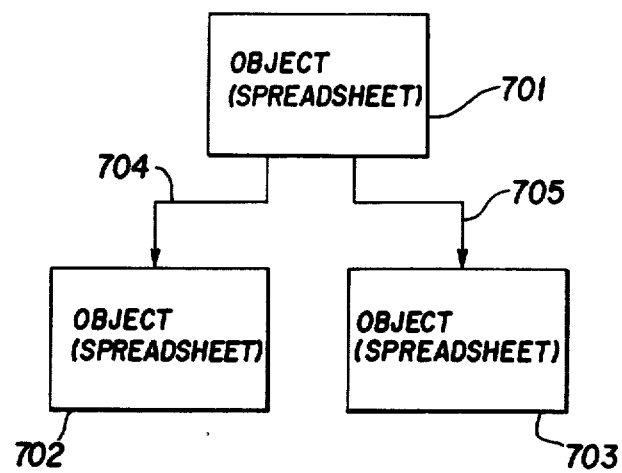
FIG. 7 shows how three objects may be linked together in accordance with a preferred embodiment of the present invention.

In FIG. 7, an object 701, which contains data for a first spreadsheet, is linked through data link 704 to an object 702, which contains data for a second spreadsheet, and is linked through data link 705 to an object 703, which contains data for a third spreadsheet. The first spreadsheet uses data from the second spreadsheet and from the third spreadsheet. Since the first spreadsheet does more than merely display data from the second and the third spreadsheets, data link 704 and data link 705 are called data-passing data links.

OMF 100 does the "bookkeeping" when objects are copied or mailed. When an object is copied, OMF 100 makes copies of data files associated with the object. If the object being copied has children, OMF 100 also makes copies of the object's descendents, and builds links between the new objects to give the new compound object the same structure as the original.

Figure 8:
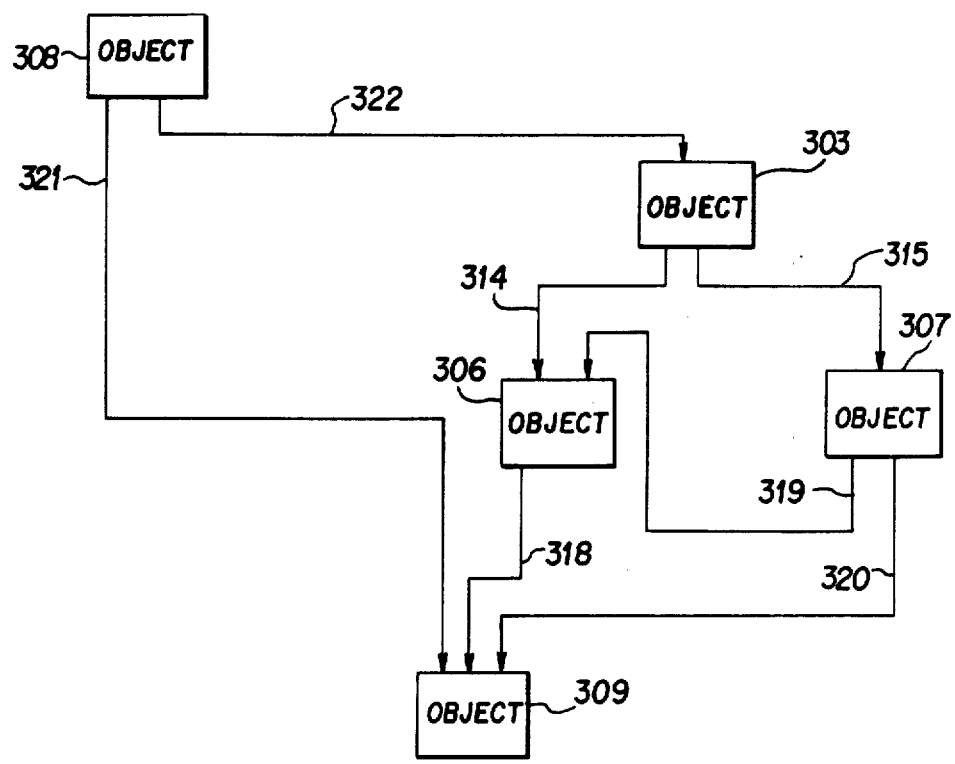
FIG. 8 and FIG. 9 illustrate how an object may be copied in accordance with a preferred embodiment of the present invention.
Figure 9:
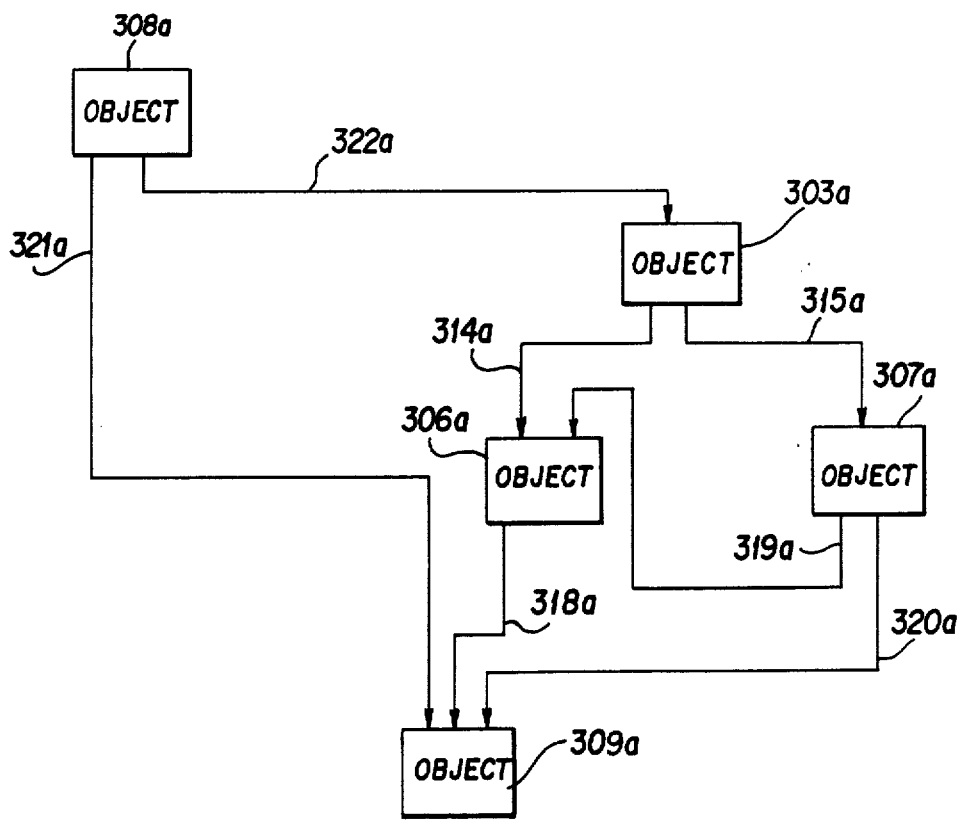

For instance, FIG. 8 shows object 308, from FIG. 3, and the descendents of object 308. When OMF makes a copy of object 308, OMF copies each of object 308's descendents and the links shown in FIG. 8. FIG. 9 shows a copy of object 308. Object 308a is a copy of object 308. Object 303a is a copy of object 303. Object 306a is a copy of object 306. Object 307a is a copy of object 307. Object 309a is a copy of object 309. Link 321a is a copy of link 321. Link 322a is a copy of link 322. Link 314a is a copy of link 314. Link 315a is a copy of link 315. Link 318a is a copy of link 318. Link 319a is a copy of link 319. Link 320a is a copy of link 320.

Figure 11:
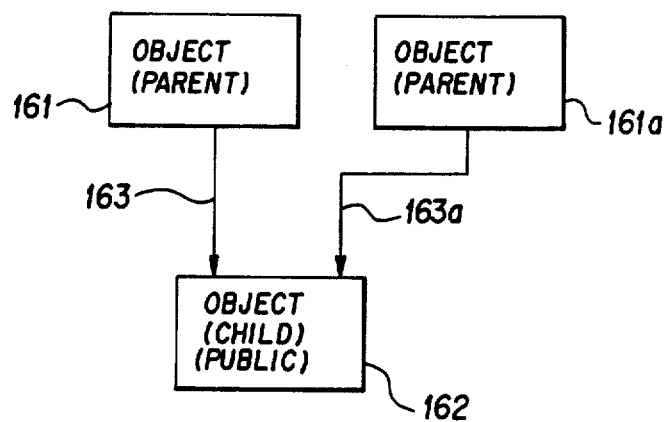
FIG. 10 and FIG. 11 illustrate the copying of a public object in accordance to a preferred embodiment of the present invention.
Figure 10:
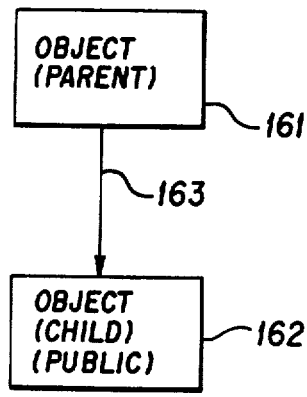

In the preferred embodiment, the default behavior results in the copy of a parent's children when the parent is copied. However, when a child is designated as "public" it is not copied. Rather, a copy of the parent includes a link to the child. For instance, in FIG. 10, a parent object 161 is to be copied. Parent object 161 is linked to a child object 162 through a link 163. Child object 162 is a public object. As shown in FIG. 11, copying of parent object 161 results in new object 161a being linked to object 162 through a new link 163a. Object 161a is a copy of object 161. Link 163a is a copy of link 163.

Figure 12:
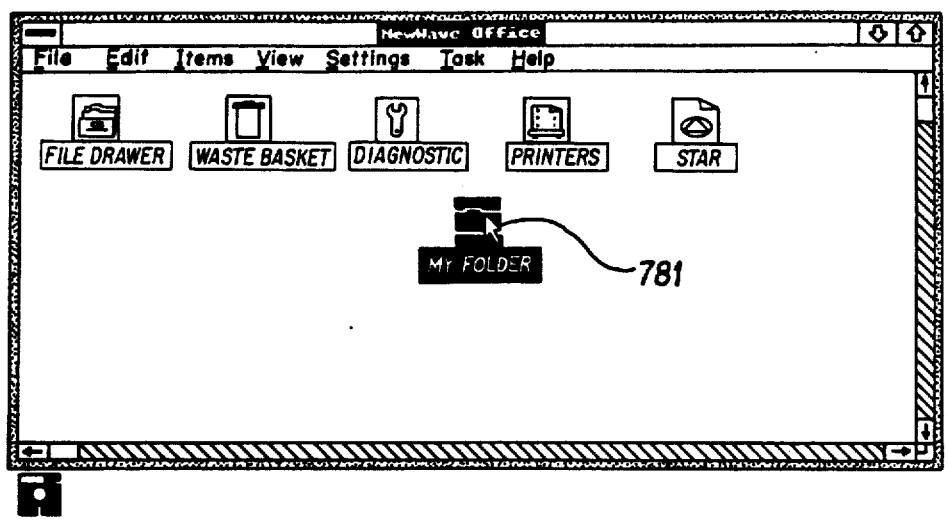
FIGS. 12 through FIG. 71 show the appearance on a screen of a session in which a user manipulates objects in accordance with a preferred embodiment of the present invention. Also shown are block diagrams of how objects appearing to the user are linked in accordance to the preferred embodiment of the present invention.
Figure 71:
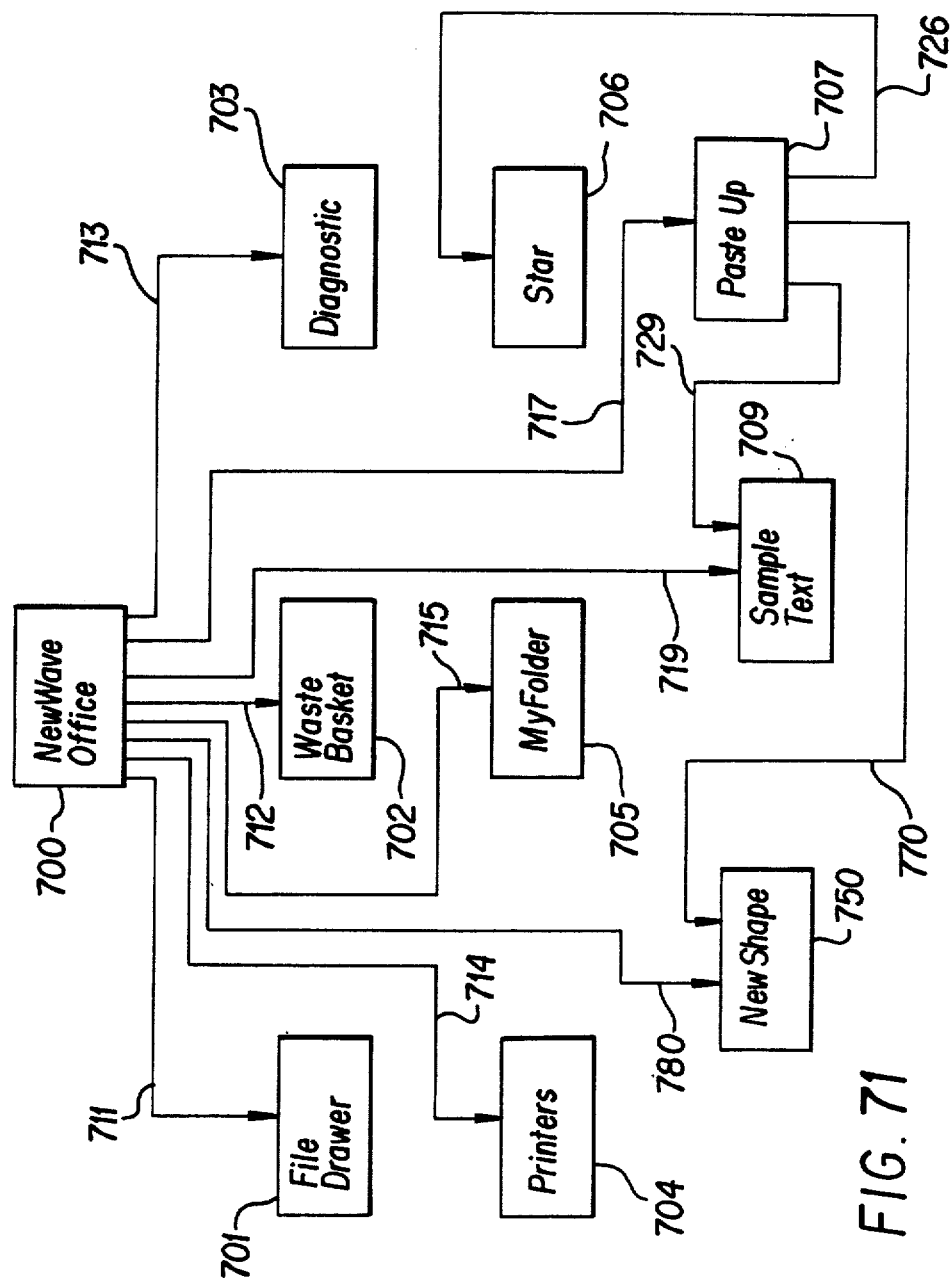

In FIG. 12 through FIG. 71, it is shown how objects are displayed to a user on monitor 14. In FIG. 12 a "NewWave Office" desktop is shown to include icons labelled as "File Drawer", "Waste Basket", "Diagnostic", "Printers", "Star" and "My Folder". A user (not shown) has manipulated a cursor 781, using keyboard 19 or mouse 20, to select "My Folder".

Figure 13:
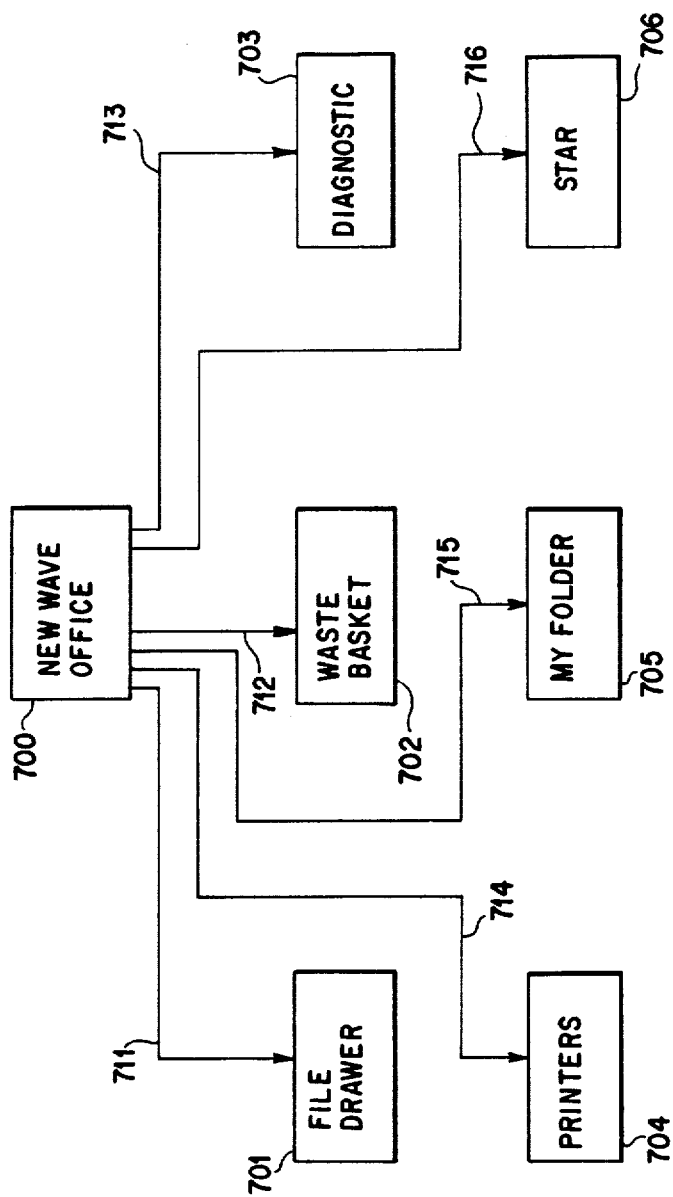

FIG. 13 shows how the objects displayed on monitor 14 are linked. NewWave Office (shown as an object 700) is the parent of "File Drawer" (shown as an object 701) through a link 711, of "Waste Basket" (shown as an object 702) through a link 712, of "Diagnostic" (shown as an object 703) through a link 713, of "Printers" (shown as an object 704) through a link 714, of "My Folder" (shown as an object 705) through a link 715 and of "Star" (shown as an object 706) through a link 716.

Figure 14:
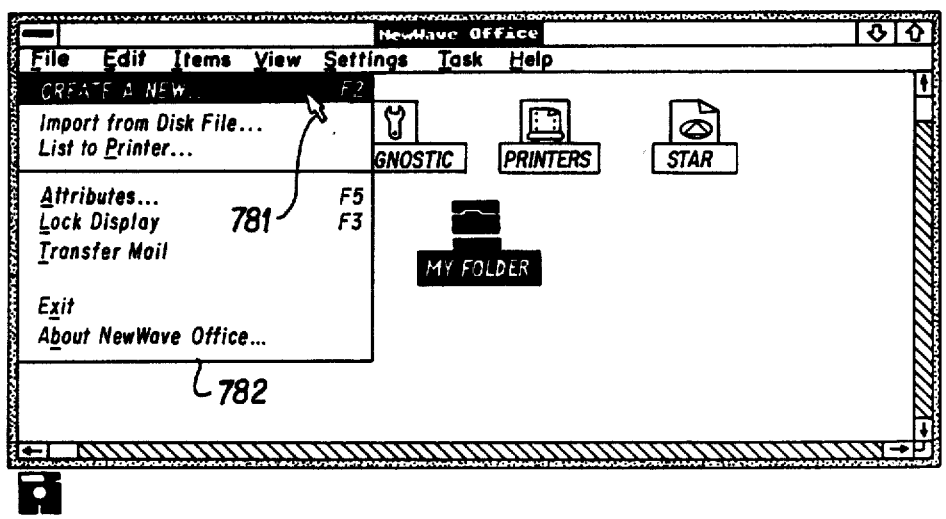
Figure 15:
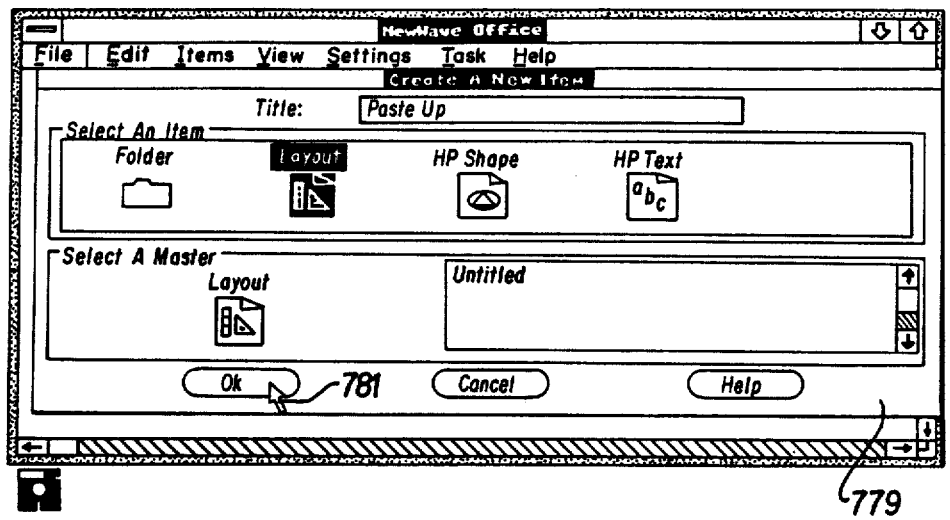
Figure 16:
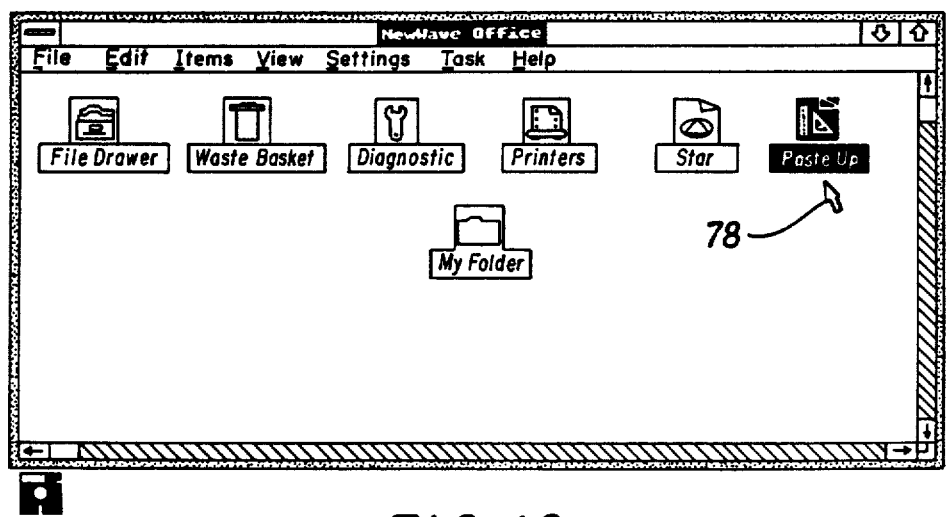

In FIG. 14, the user, using cursor 781, has selected "Create a New . . . " in a pull down menu 782. As a result of this selection a dialog box 779 appears as shown in FIG. 15. Using cursor 781, the user has highlighted the icon "Layout" and using keyboard 19 has typed in the name "Paste Up" as a name for a new object to be created. Cursor 781 now points to a region labelled "OK". Once this region is selected, a new object titled "Paste Up" is created, as is shown in FIG. 16.

Figure 17:
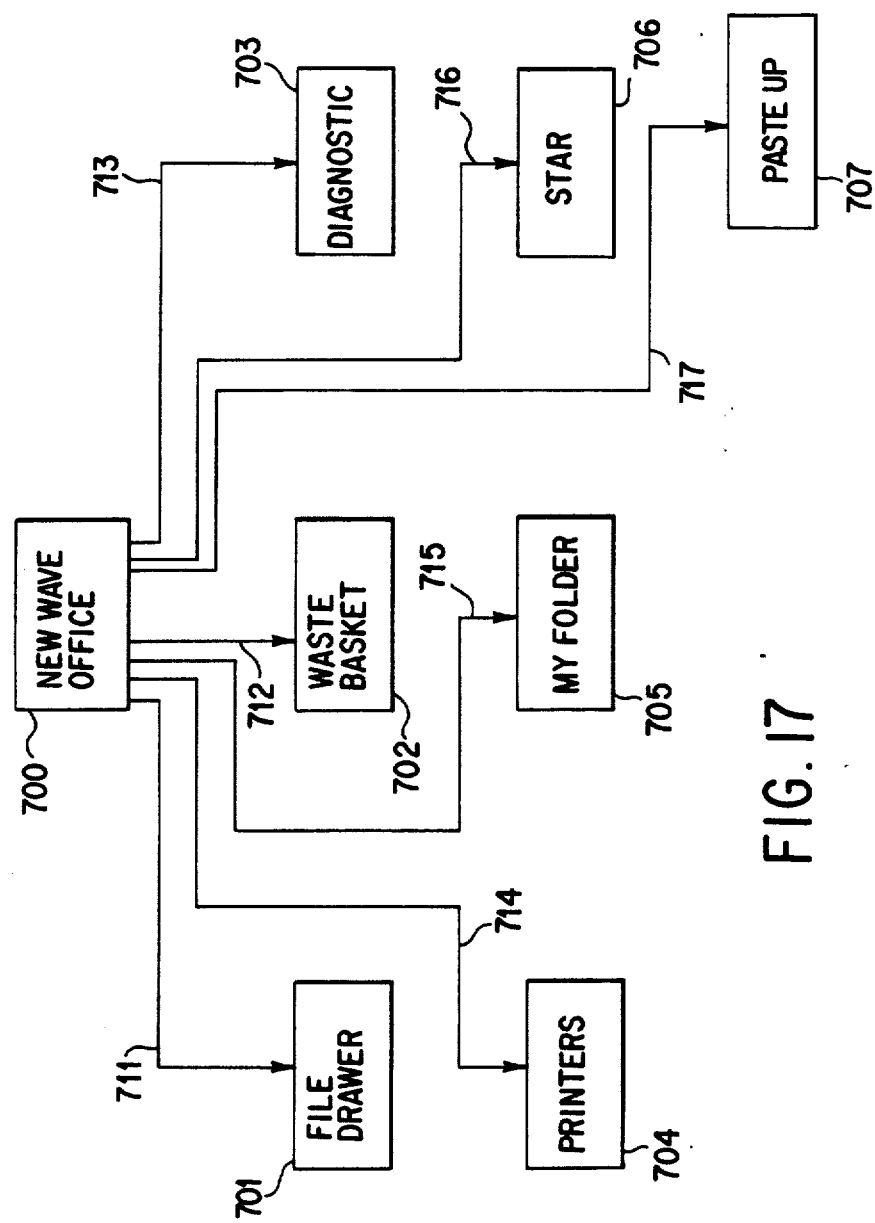

In FIG. 17, "Paste Up" is shown as an object 707 linked as a child of NewWave Office through a link 717.

The basic clipboard operations are Cut, Copy, and Paste. The user must select the data that is to be moved or copied, and then give either the Cut command or the Copy command. Cut moves the selected data to the clipboard (deleting it from its original location). Copy makes a copy of the selected data on the clipboard. The user must then select the location where he wants the data to be moved or copied to, and give the Paste command. This command copies the contents of the clipboard to the selected location.

Figure 18:
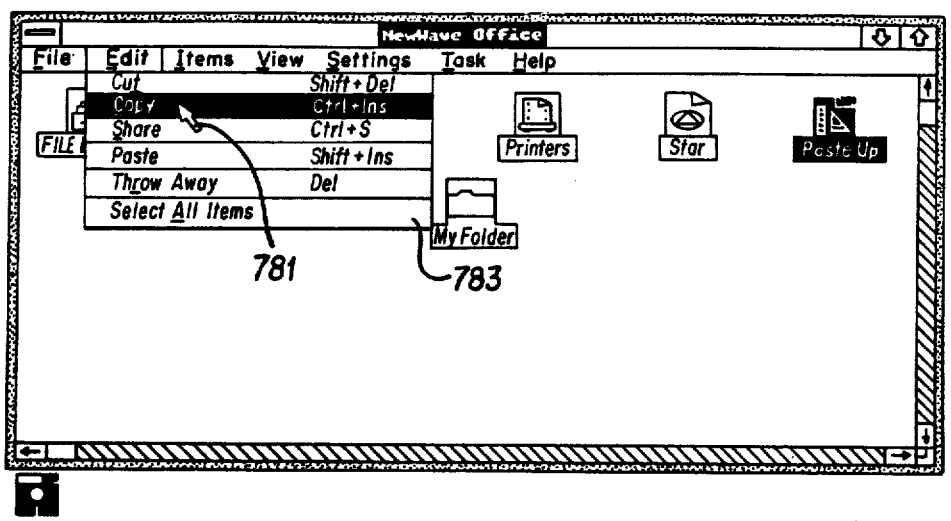
Figure 18A:
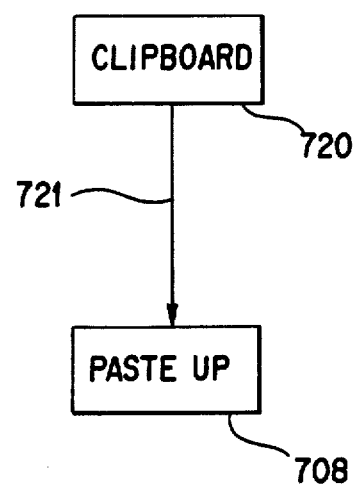

In FIG. 18 a user is shown to have selected "Paste Up". The selection is represented by the icon for "Paste Up" being displayed using inverse video. With cursor 781, the user selects "Copy" from a pull down menu 783. In FIG. 18A a Clipboard object 720 is shown to be a parent of an object 708 through a link 721. Object 708, is a copy of object 707 ("Paste Up").

Figure 19:
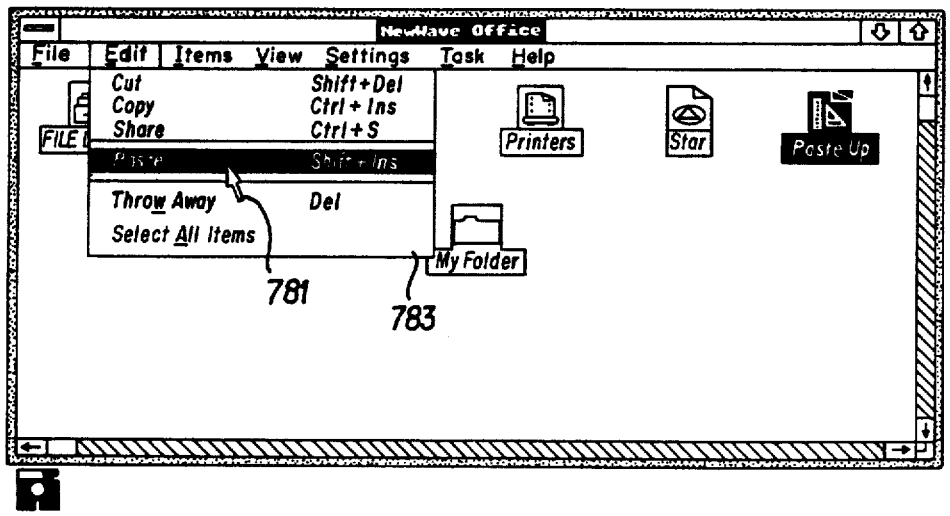
Figure 20:
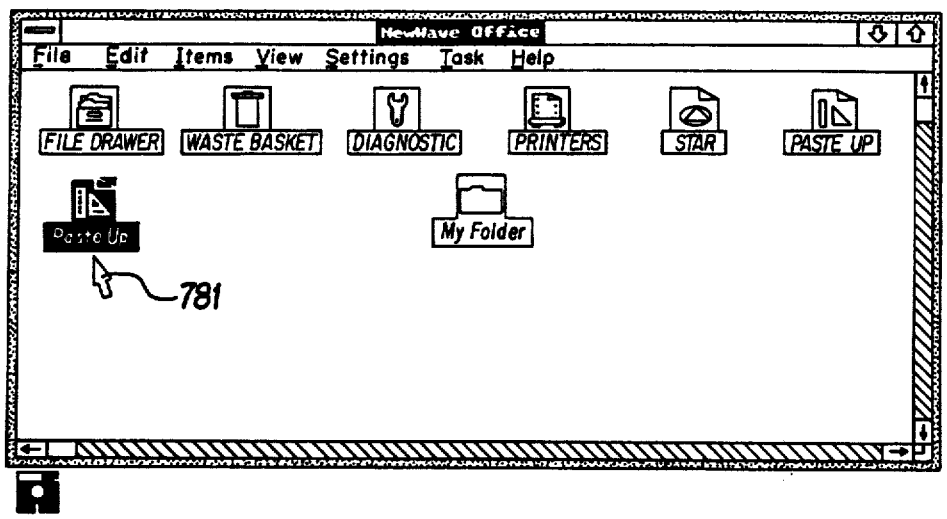

As shown in FIG. 19, next the user selects "Paste" from pull down men 783. The result, shown in FIG. 20, is the addition of an object 708, pointed to by cursor 781, which is a copy of the original "Paste Up" object 707.

Figure 21:
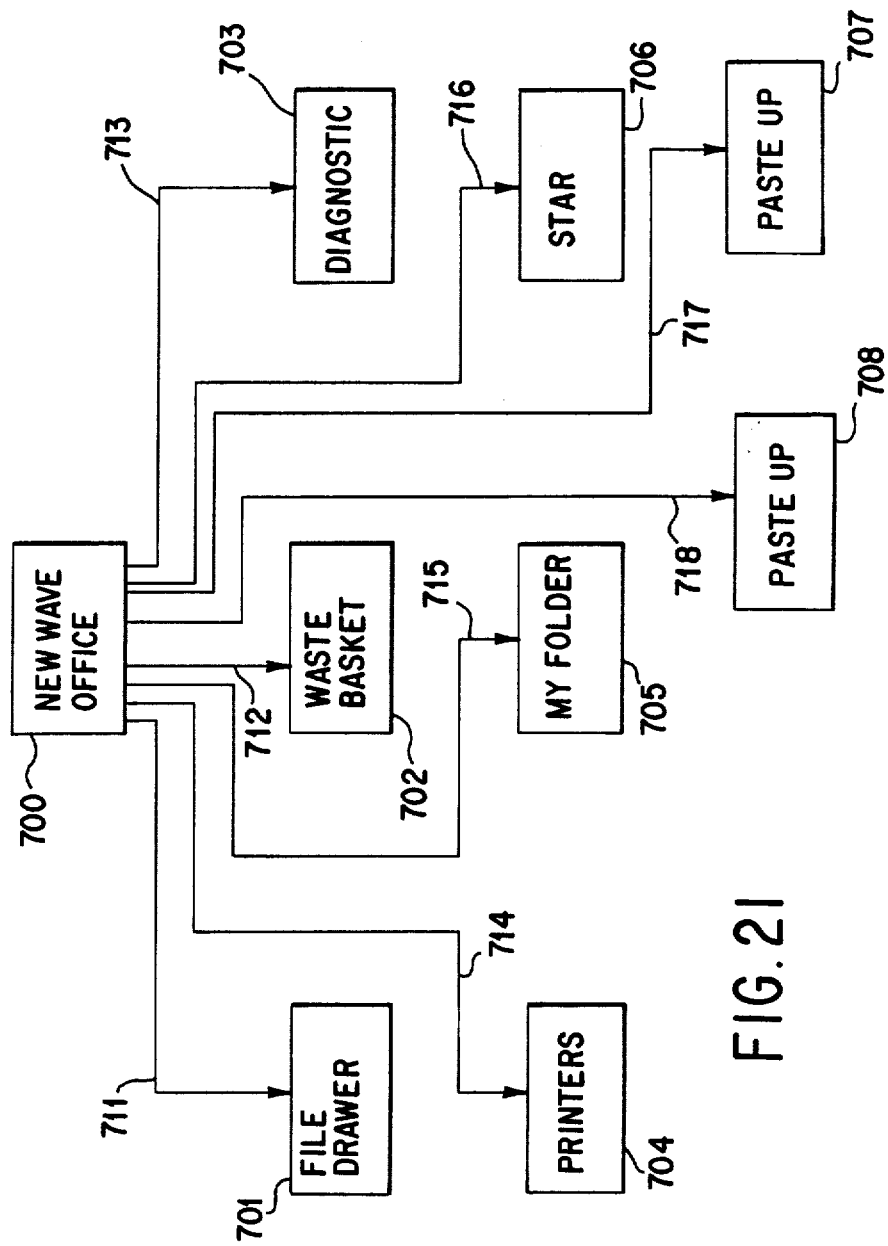

In FIG. 21, the new object is shown as object 708 linked as a child of NewWave Office through a link 718.

Figure 22:
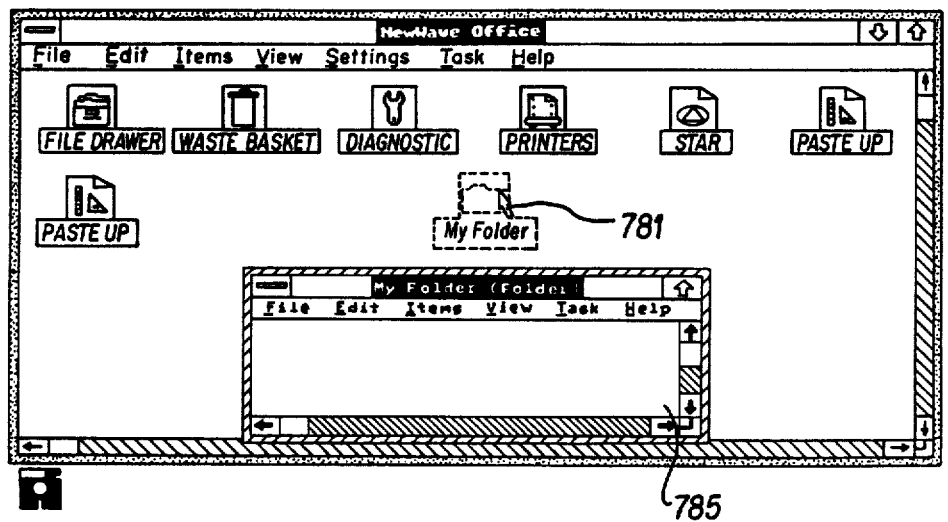
Figure 23:
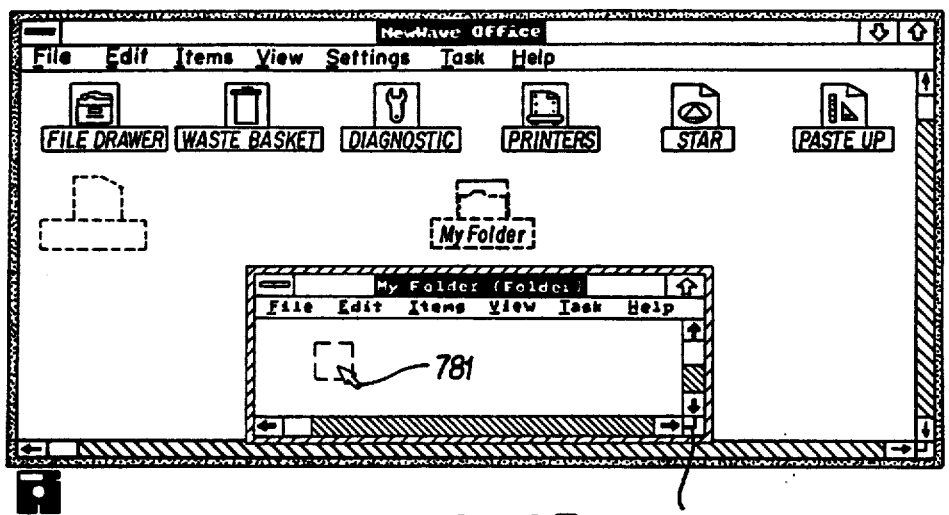
Figure 24:
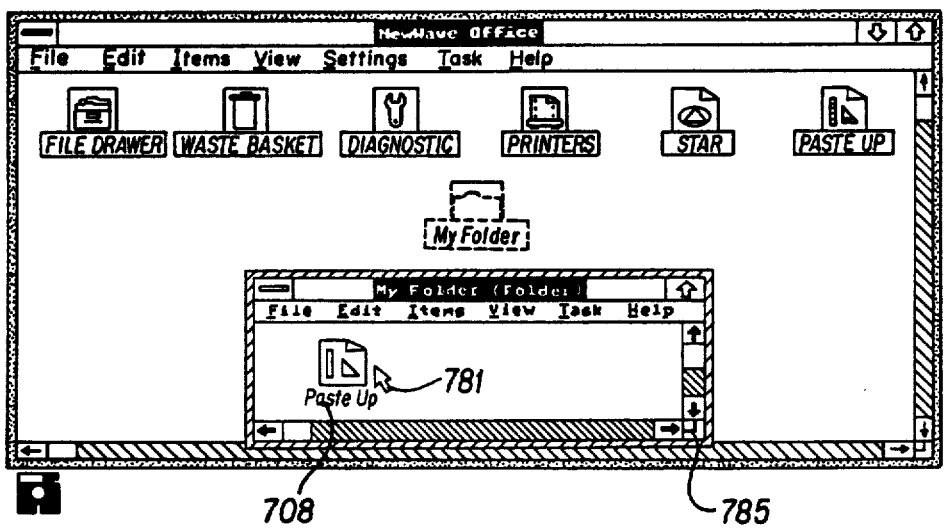
Figure 25:
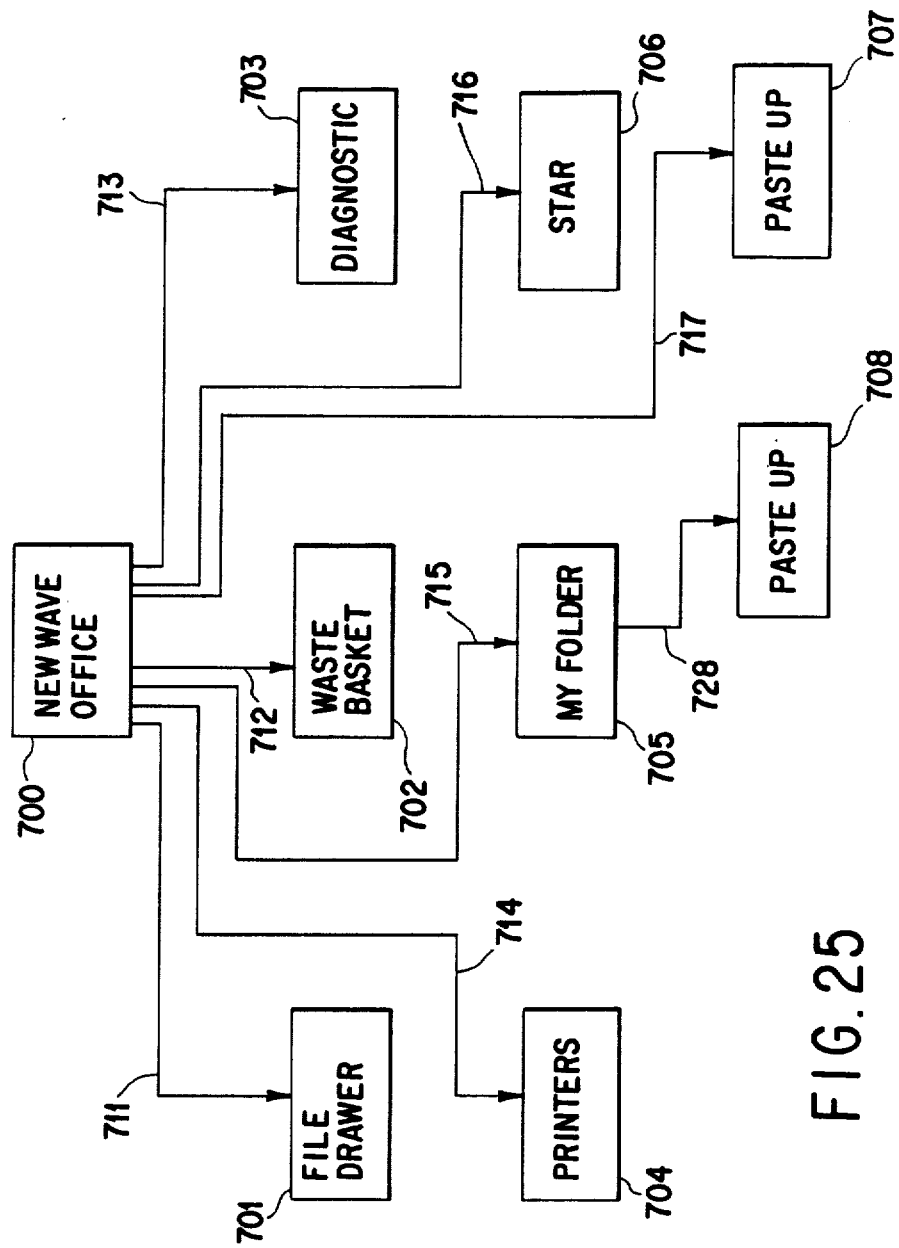

In FIG. 22, "My Folder", has been opened by double clicking the icon for "My Folder" using cursor 781. The result is a new window 785 representing "My Folder". In FIG. 23, using cursor 781, "Paste Up" (object 708) is shown being dragged to window 785. In FIG. 24, the process is complete and "Paste Up" (object 708) is now in window "My Folder". In FIG. 25, "Paste Up", shown as object 708, is now a child of "My Folder" through link 728.

The user sets up multiple links by using the Share command. This command is an extension of the clipboard metaphor common in software packages today for moving and copying data around the system. The clipboard is a special buffer that the system uses to hold data that is in transit.

In one way, the Share command operates similarly to the Cut or Copy command described above. That is, using Share, Cut, or Copy, the user selects some data first and then gives the Share command, which results in something being put on the clipboard. In the case of the Share command, however, what is put on the clipboard is neither the actual data nor a copy of the actual data. Instead, it is a link to the selected data. When this link is pasted, a permanent connection is made between the original data and the location of the Paste. Through use of OMF 100, this link is used by the involved applications to provide easy access to the original data (in its full application) and automatic updating when the original data is modified.

Figure 26:
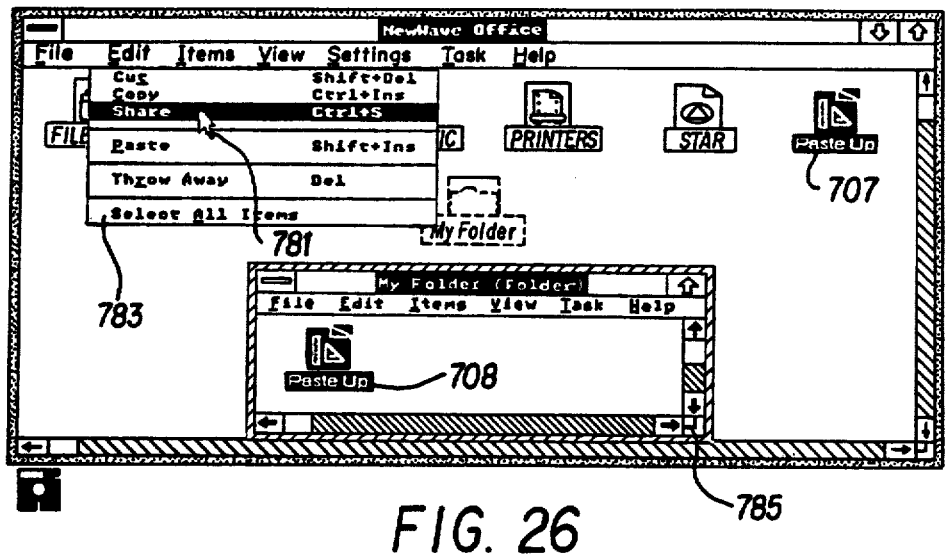

In FIG. 26, the NewWave Office window has been activated. "Paste Up" (object 707) has been selected, as evidenced by "Paste Up" (object 707) being in inverse video. Using cursor 781, "Share" from menu 783 is selected. In FIG. 720, Clipboard object 720 is shown to be a parent of "Paste Up" object 707 through a link 722.

Figure 27:
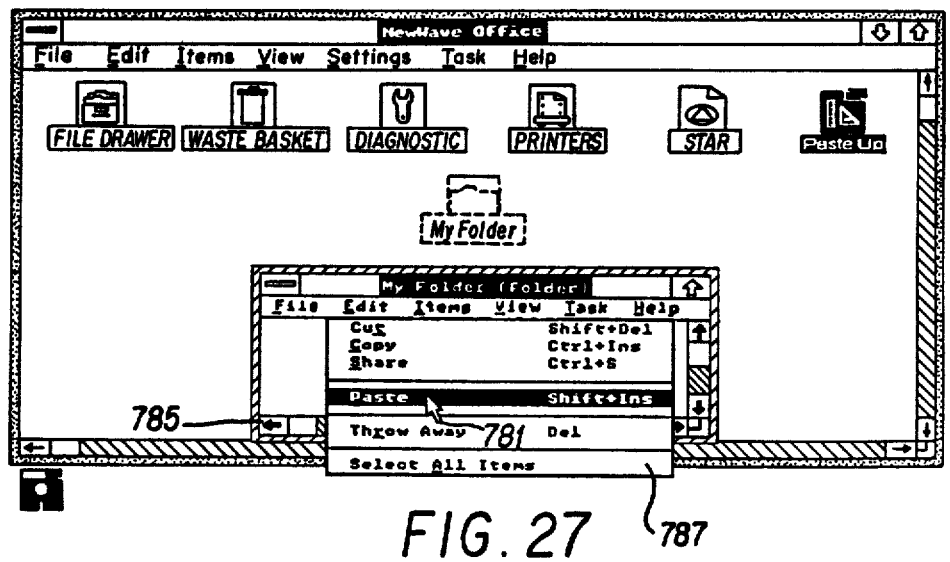
Figure 26A:
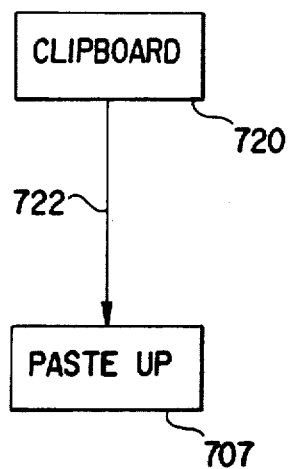
Figure 28A:
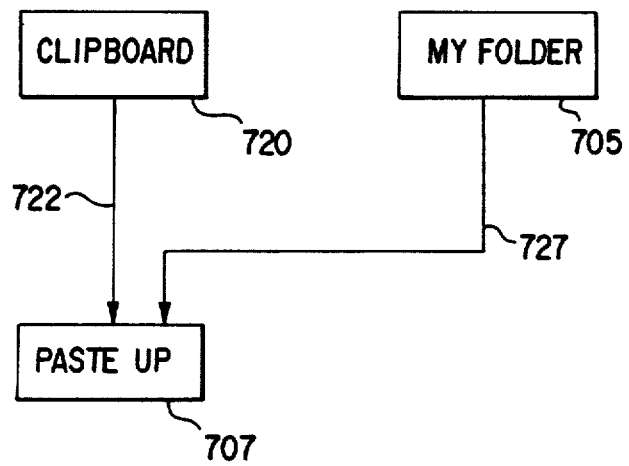
Figure 28:
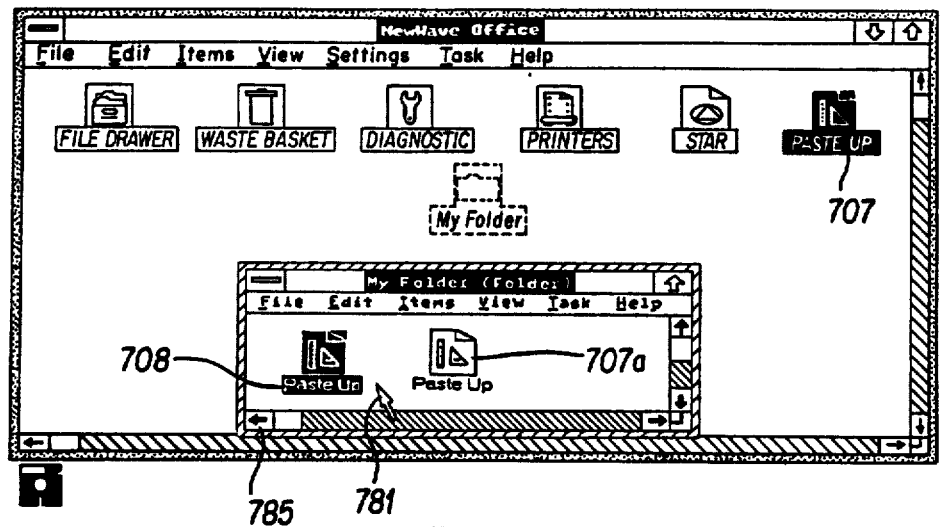
Figure 29:
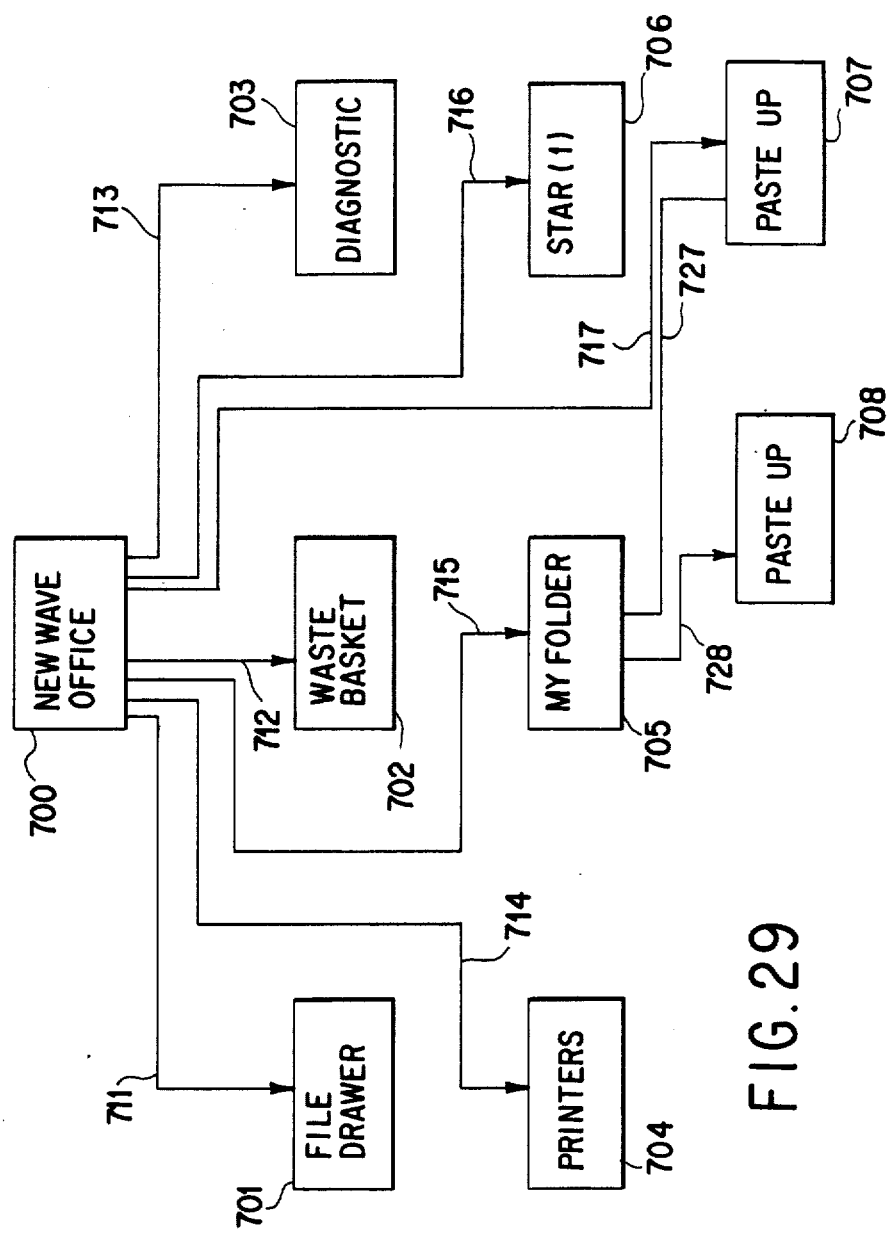

In FIG. 27, window 785 has been activated. From a menu 787, "Paste" is selected. The result, shown in FIG. 28, is an icon 707a appearing in window 785, which indicates that "Paste Up" (object 707) is shared by window 785 and the Newwave Office window. In FIG. 28A, as a result of the paste, "Paste Up" is now shown to be both a child of Clipboard 720 through link 722 and a child of "My Folder" 705 through a link 727. In FIG. 29, showing just the interconnection of objects visible to the user, "Paste Up" (object 707) is shown to be a child of "My Folder" 705 through link 727. Since "Paste Up" (object 707) is shared, not copied, "Paste Up" (object 707) remains a child of NewWave Office through link 717.

One key feature of data links is automated data transfer. When a child object is open and the user changes a part of it which is "shared out", then it makes a call to OMF 100. OMF 100 checks if any of the object's parents "care" about this particular change. If they care and if they are also open, OMF 100 sends to the parents a message informing them that new data is available. The parent can then send messages to the child to produce or display the data. This feature allows the user to establish compound objects with complex data dependencies, and then have changes made to any sub-part be automatically reflected in other parts. For example, changing a number in a spreadsheet could cause a graph to be re-drawn, and updated as a figure in a document. And since an object can have many parents, a single object can be used as "boiler plate" for any number of other objects. A change in the boiler plate will be reflected in all the objects which have links to it. Automated data transfer is illustrated in the following discussion.

Figure 30:
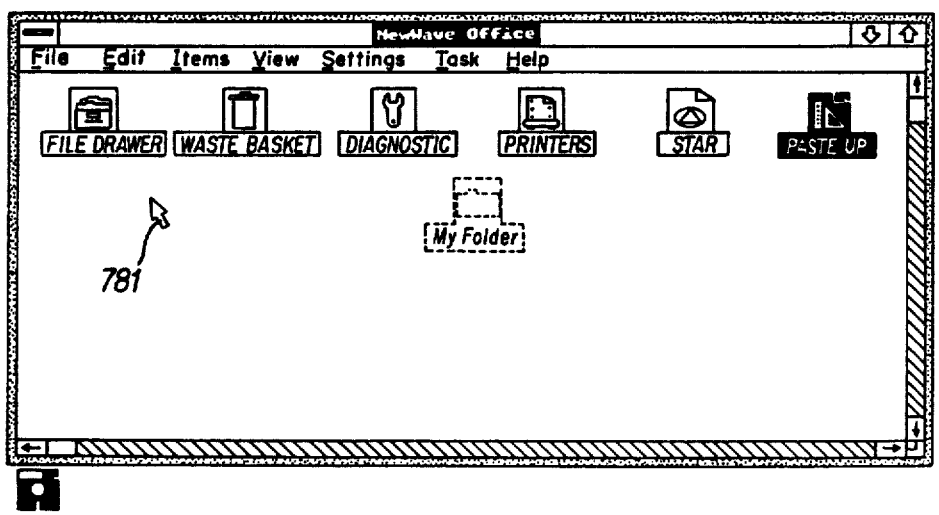
Figure 31:
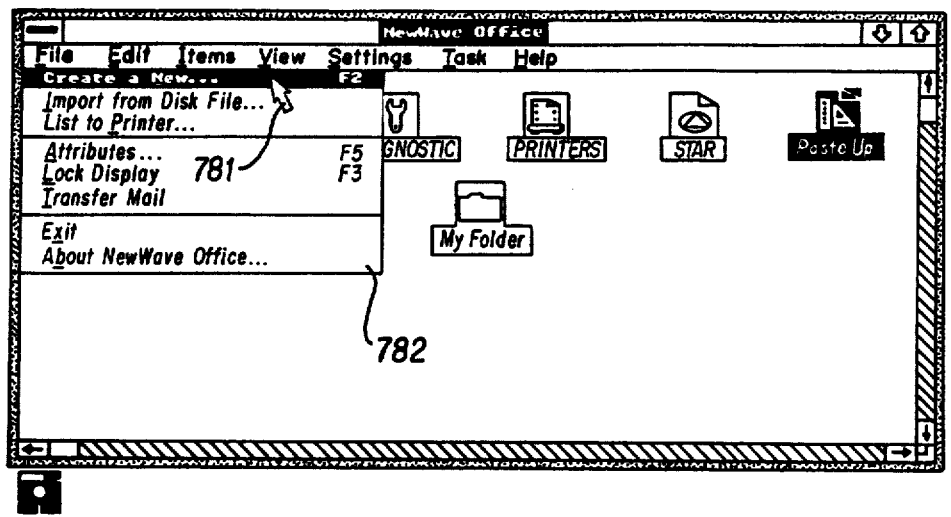
Figure 32:
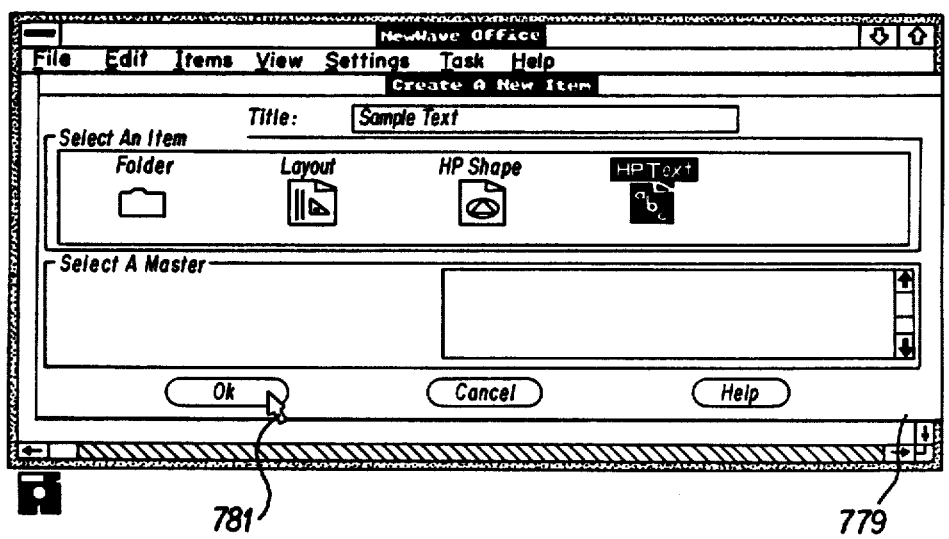
Figure 33:
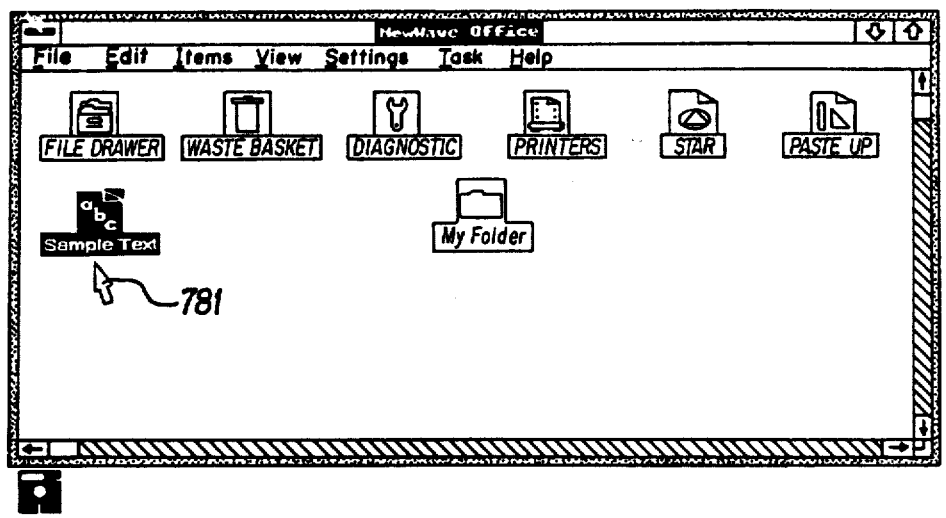

In FIG. 30, window 785 for "My Folder" has been closed. In FIG. 31, cursor 781 is used to select "Create a New . . . " from pull down menu 782. As a result of this selection dialog box 779 appears as shown in FIG. 32. Using cursor 781, the icon HP Text has been highlighted and using keyboard 19 the name "Sample Text" has been typed in as the name for a new object to be created. Cursor 781 now points to a region labelled "OK". Once this region is selected, a new object titled "Sample Text" is created, as is shown in FIG. 33.

Figure 34:
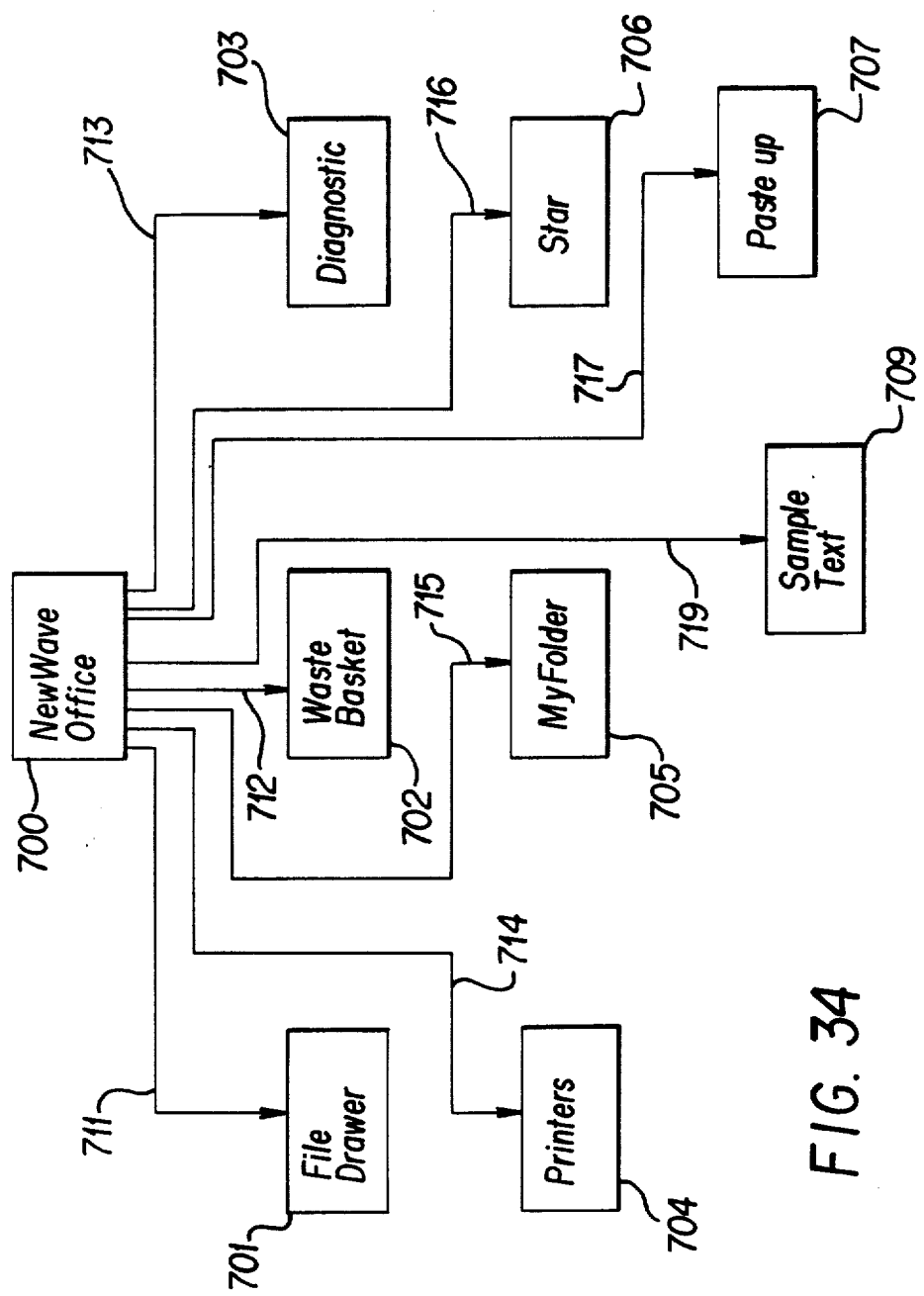

In FIG. 34, "Sample Text"(object 709) is shown to be a child of NewWave Office through a link 719. In FIG. 34, since "My Folder" has been closed, "Paste Up" (object 708), link 728 and link 727 are not shown. However, these still exist, but are not currently visible to a user.

Figure 35:
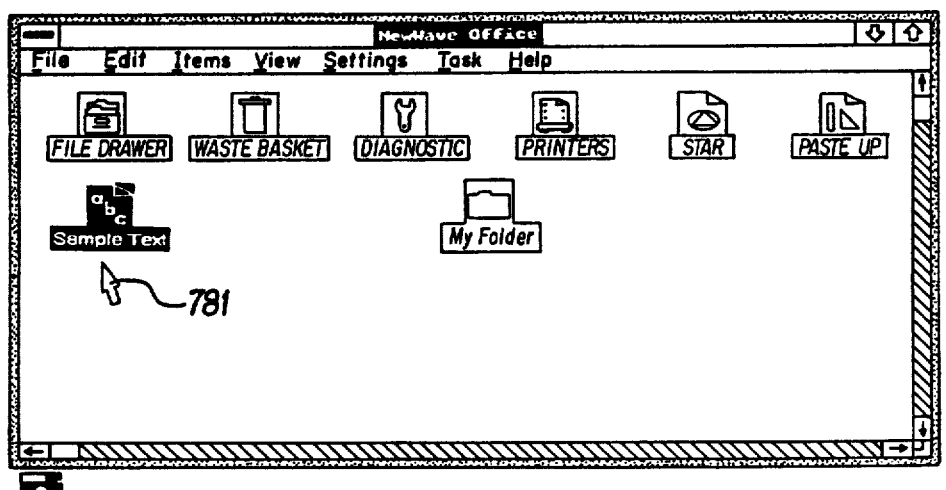
Figure 36:
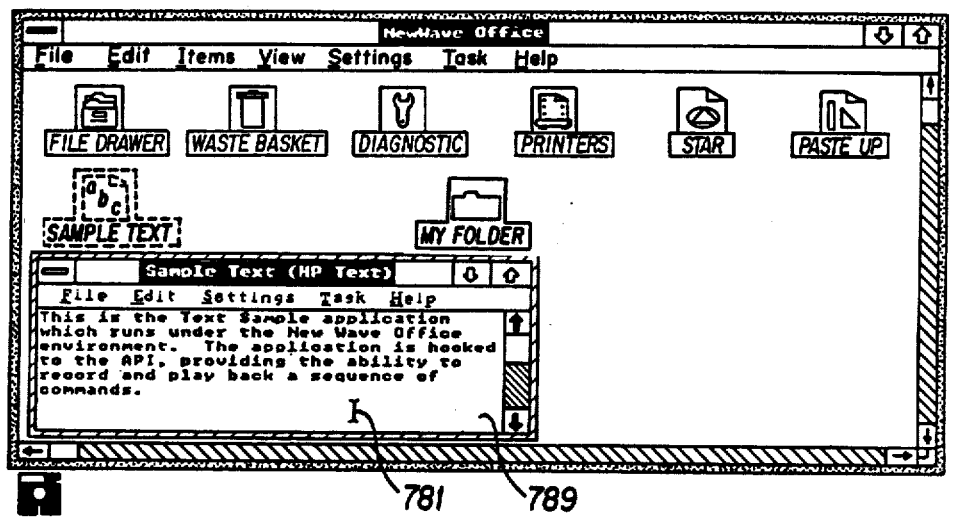

In FIG. 35, placing cursor 781 on the icon "Sample Text" and double clicking a button on mouse 20 results in "Sample Text" being opened. In FIG. 36, an open window 789 for "Sample Text" is shown.

Figure 37:
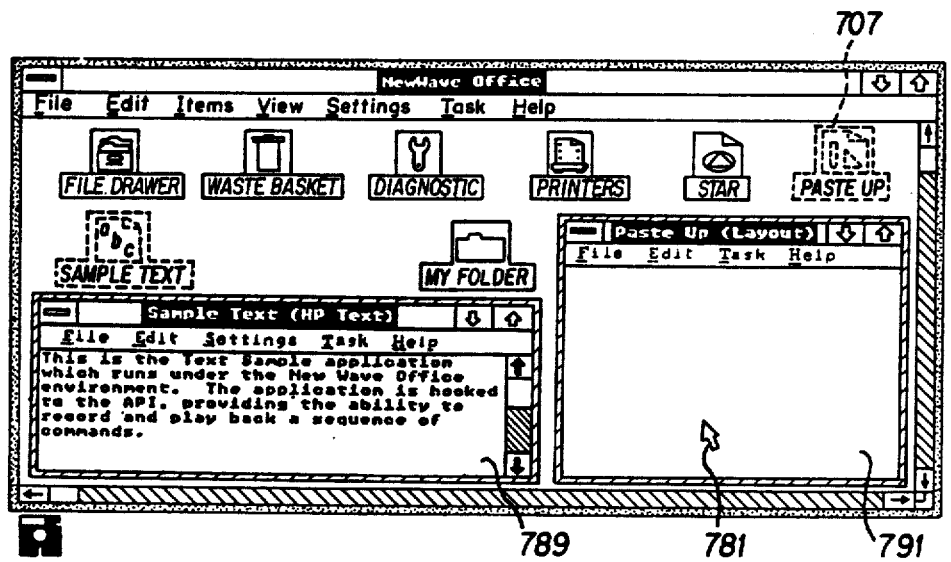
Figure 38:
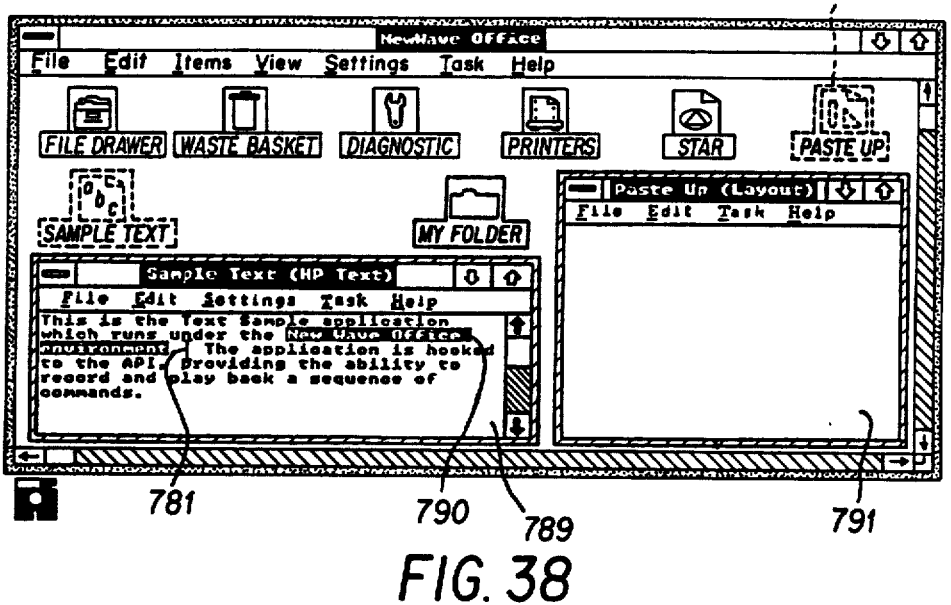

In FIG. 37 a window 791 for "Paste Up" (object 707) has been opened by double clicking on the icon for "Paste Up". In FIG. 38, using Cursor 781, controlled by mouse 20, a portion 790 of the text of "Sample Text" has been selected. The portion in inverse video stating "New Wave Office environment" is portion 790.

Figure 39:
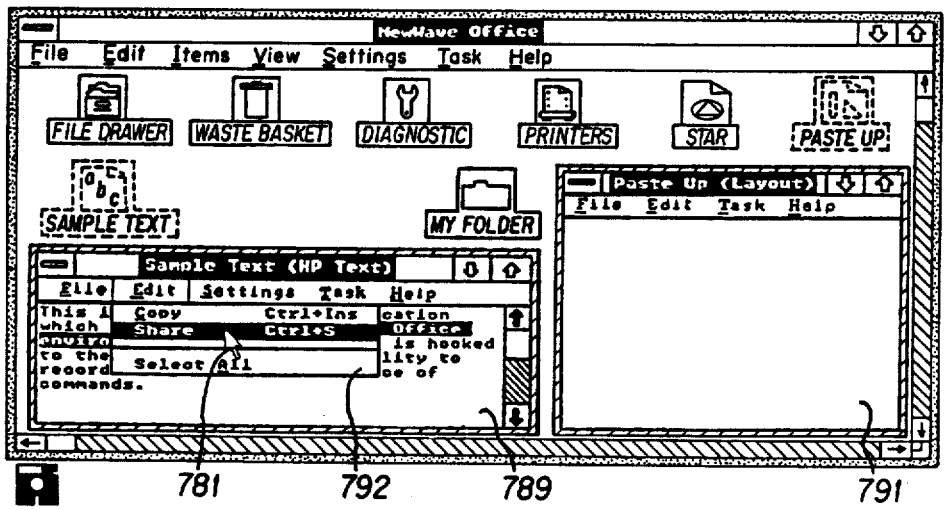
Figure 40:
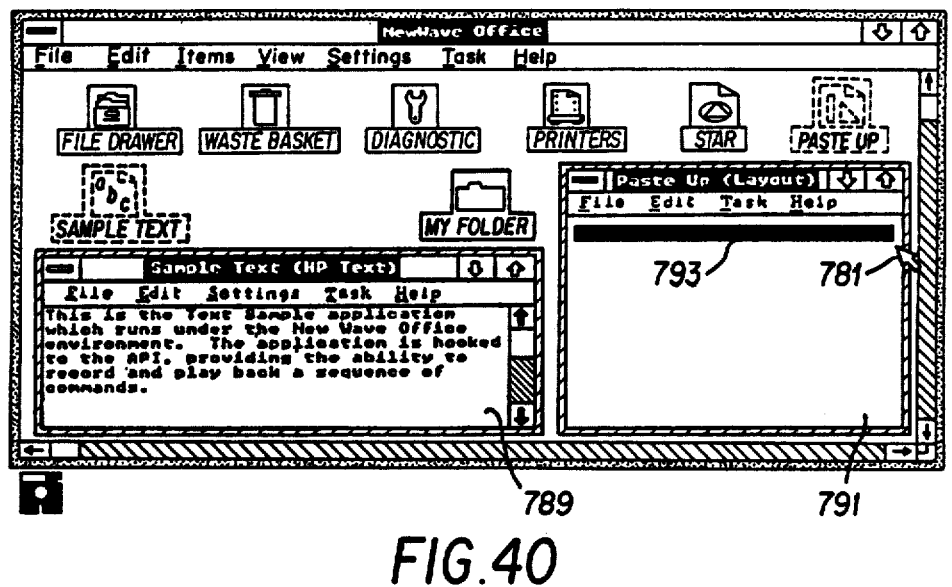
Figure 41:
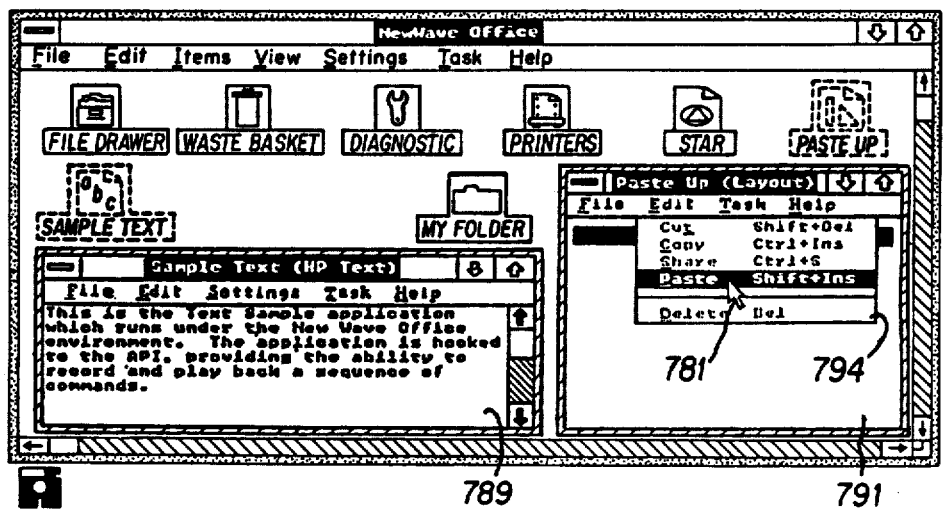
Figure 42:
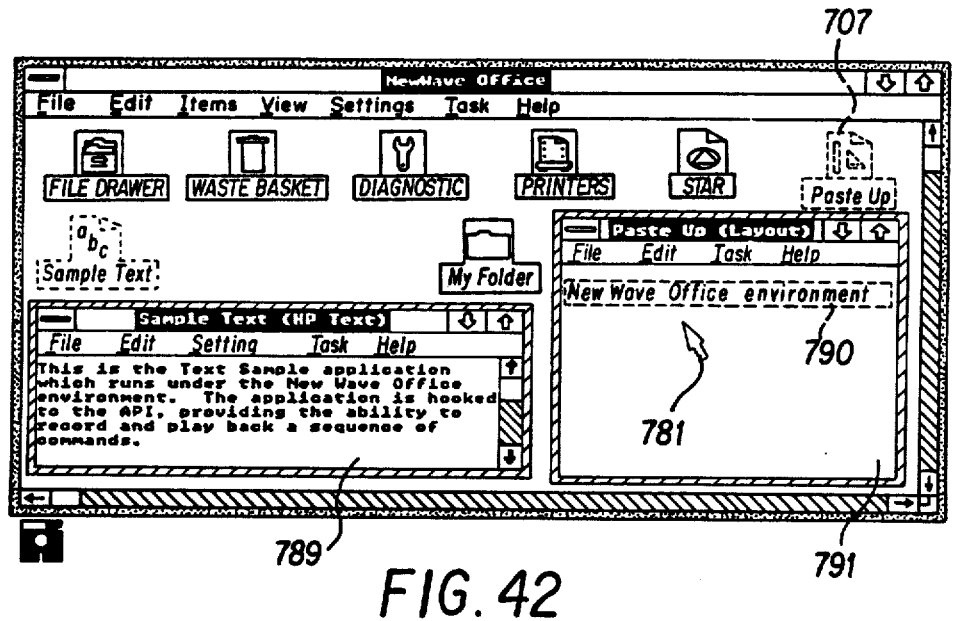
Figure 44:
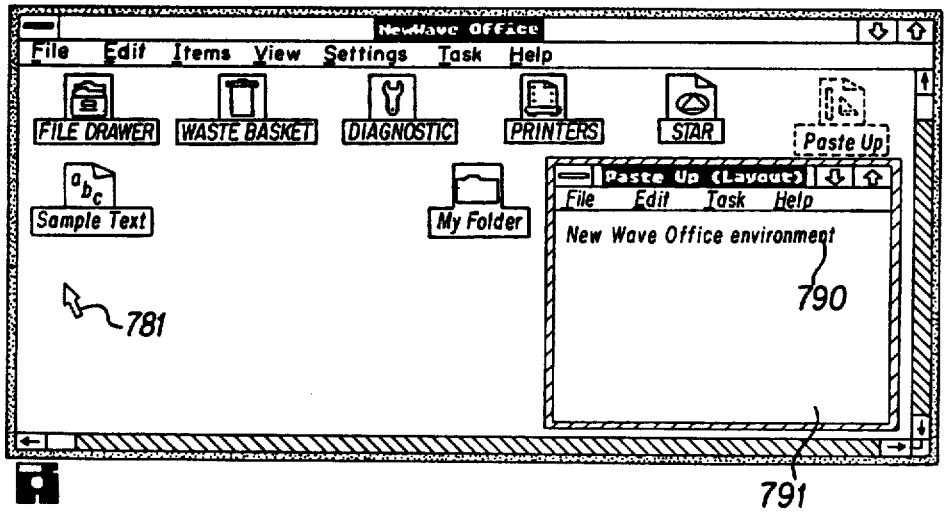
Figure 43:
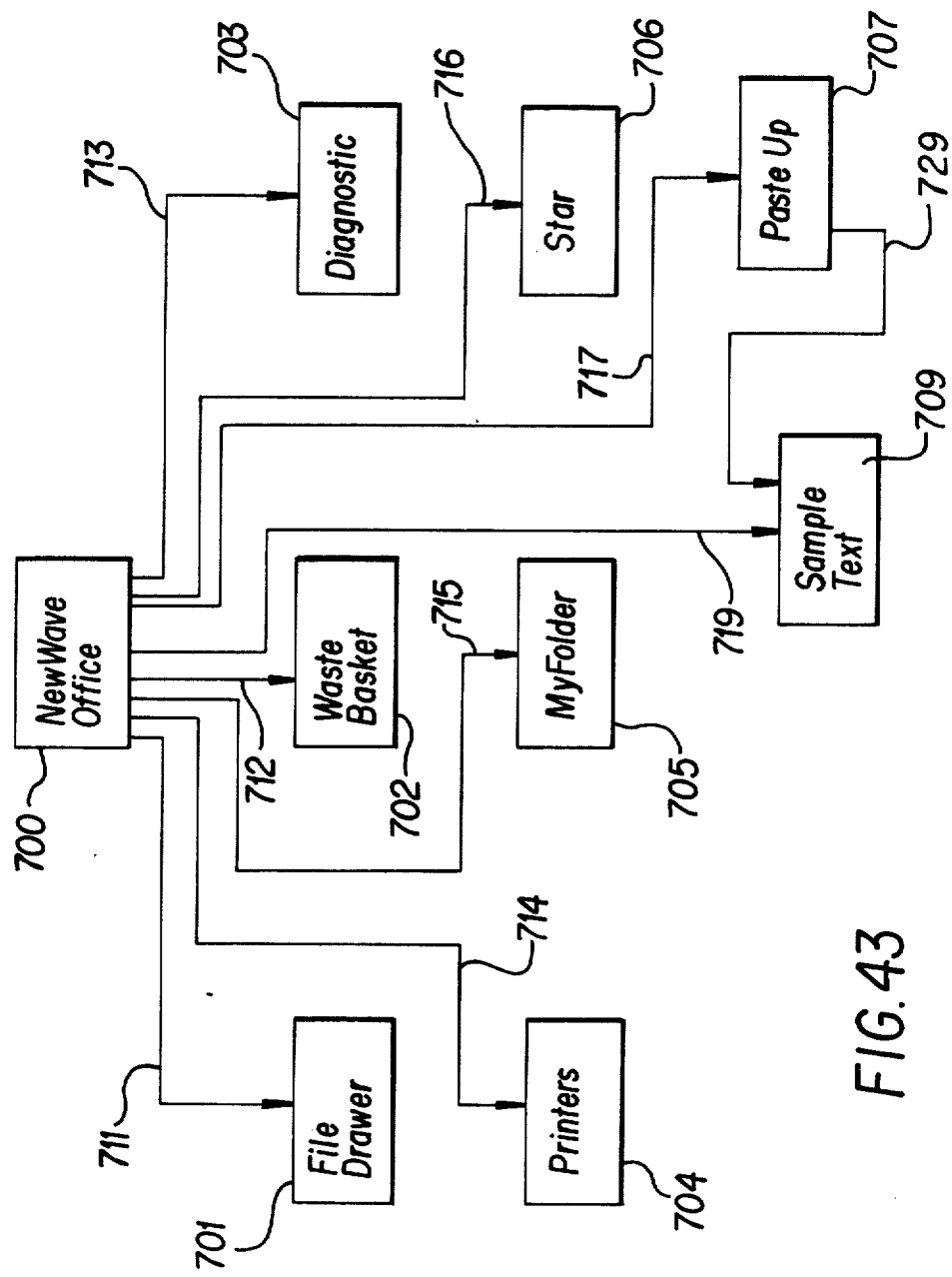

In FIG. 39, cursor 781 is used to select the selection "Share" in a pull down menu 792. In FIG. 40, an area 793 in window 791 is selected using cursor 781. In FIG. 41, a selection "Paste" is selected from a pull down menu 794 using cursor 781. In FIG. 42, "Sample Text" is linked to "Paste Up" (object 707) and displayed text 790 is displayed in "Paste Up" window 791. In FIG. 43 "Sample Text" (object 709) is shown to be a child of "Paste Up" (object 707) through a link 729. In FIG. 42, displayed text 790 is shown in gray because "Star" window 789 is open. In FIG. 44, "Star" window 789 is closed so displayed text 790 is clearly displayed.

Figure 45:
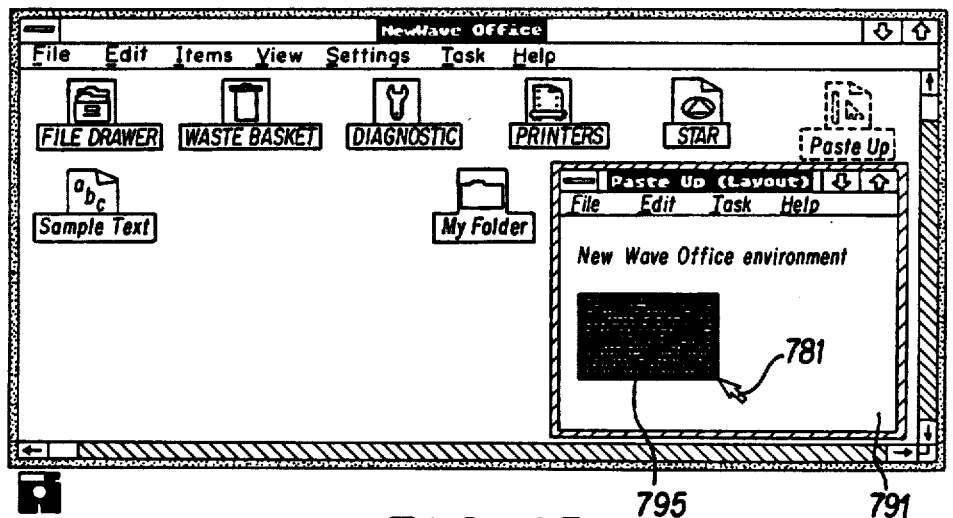
Figure 46:
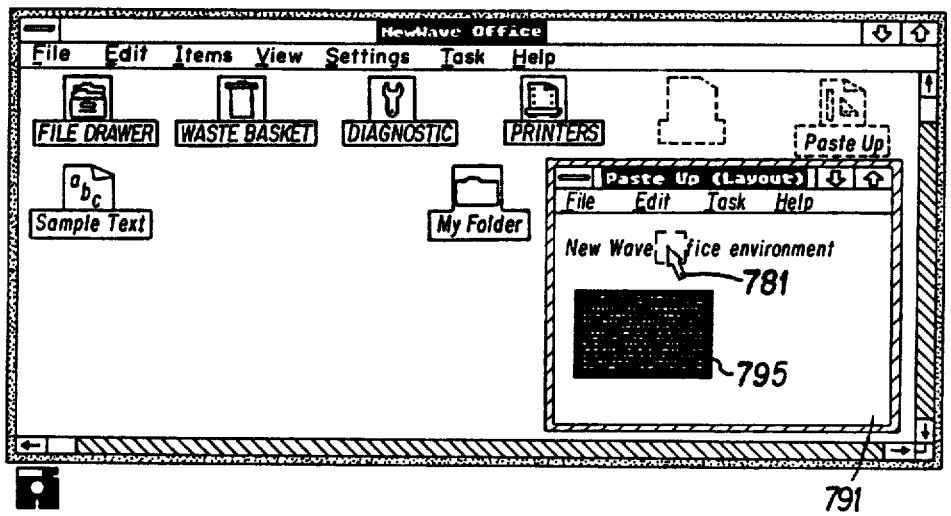

In FIG. 45, a region 795 of window 791 is selected using cursor 781. FIG. 46 shows cursor 781 dragging the icon "Star" into region 795 of window 791.

Figure 47:
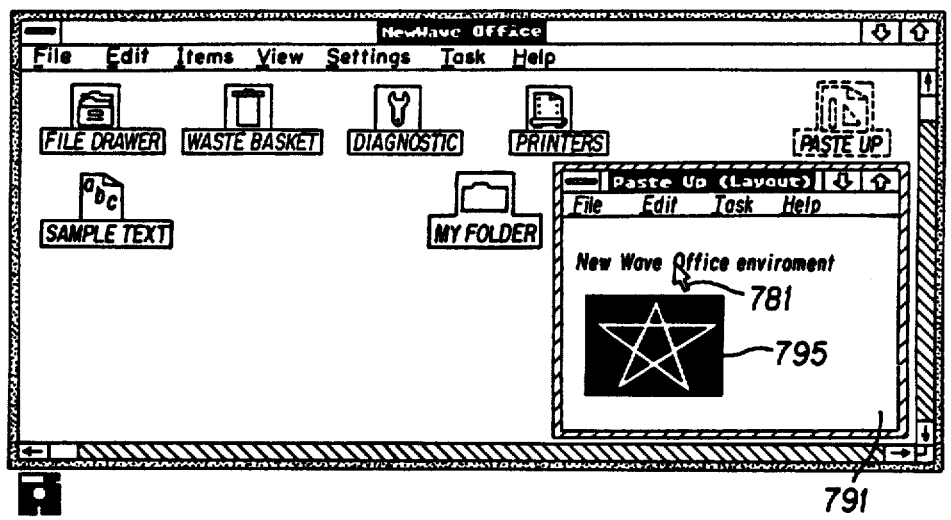
Figure 48:
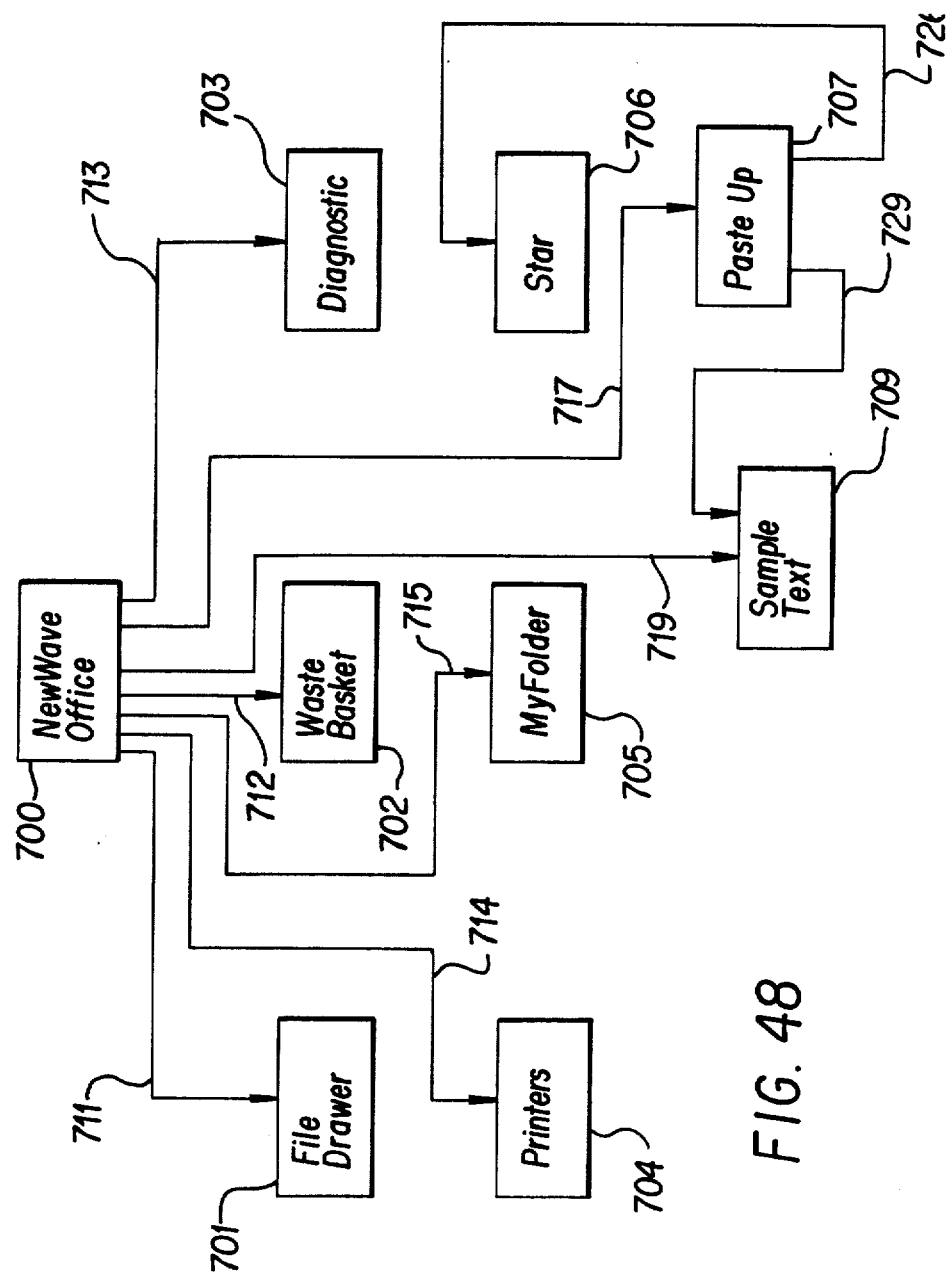
Figure 50:
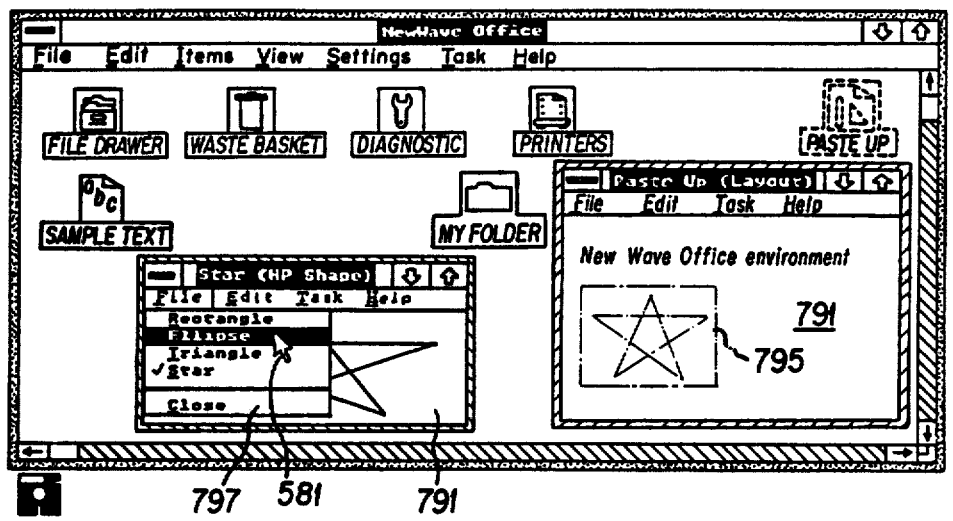

In FIG. 47, data from "Star" (object 706) is now displayed in region 795 of window 791. As may be seen in FIG. 48, "Star" (object 706) is now a child of "Paste Up" (object 707) through a link 726.

Figure 49:
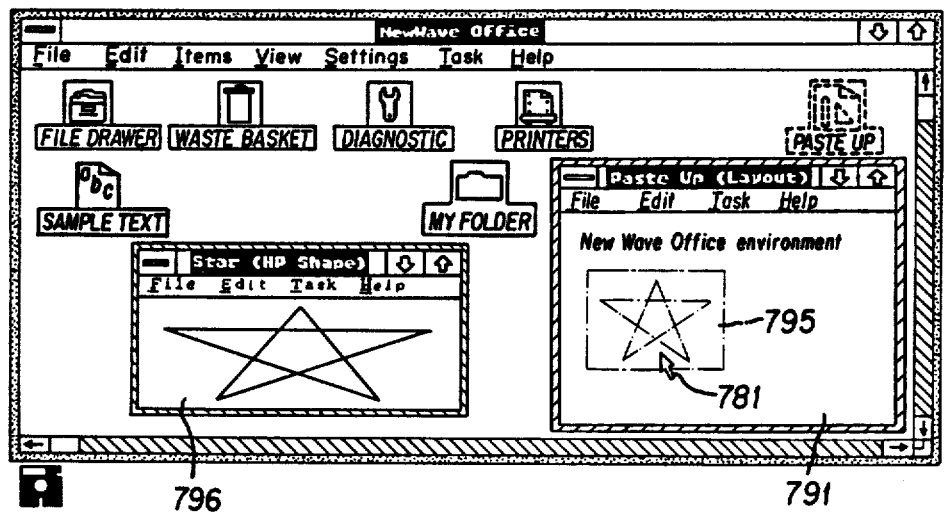
Figure 51:
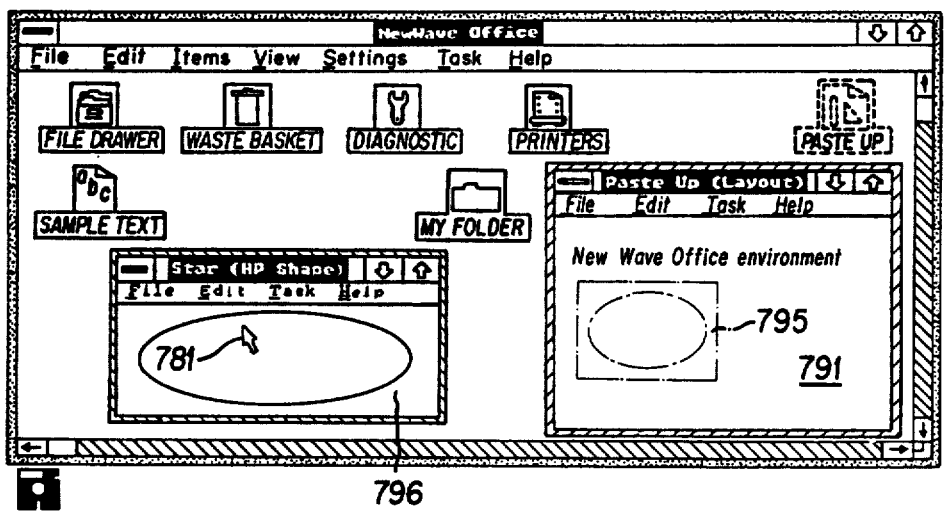

In FIG. 49, a user has placed cursor 781 over region 795 of window 791 and double clicked a button on mouse 20. The result is the opening and display of "Star" (object 706) in a window 796. FIG. 40 shows the use of cursor 781 to select selection "Ellipse" in a menu window 797 which results in the data within "Star" (object 706) being changed from a star to an ellipse. As shown in FIG. 51, the result is a change both in data displayed in window 796 and data displayed in region 795 of window 791.

Figure 52:
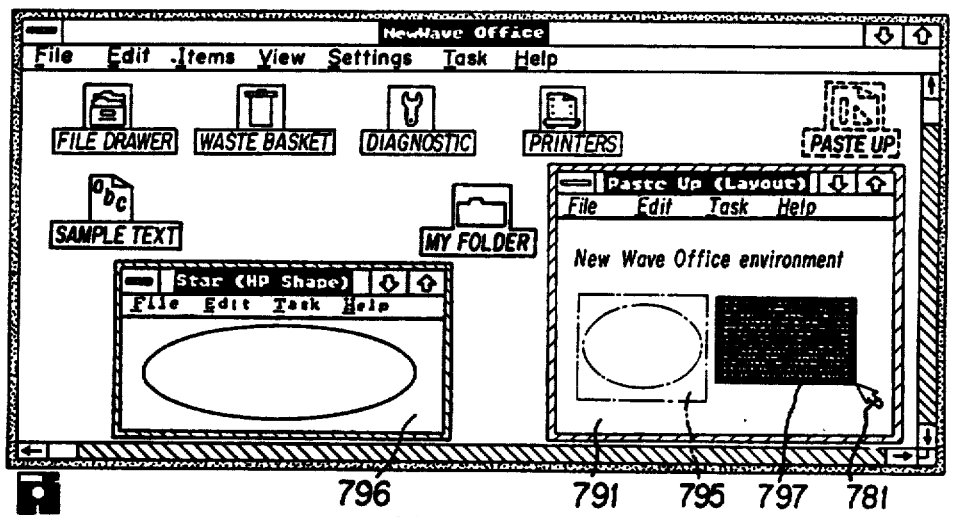
Figure 53:
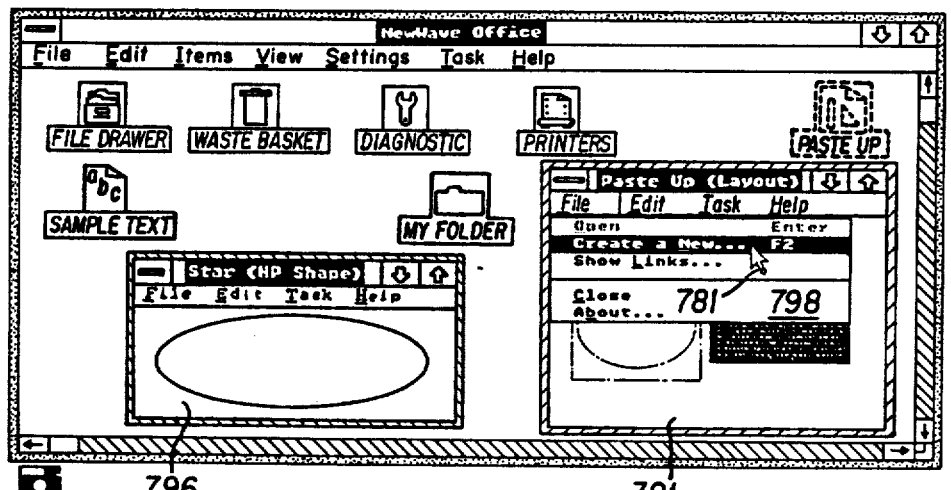
Figure 54:
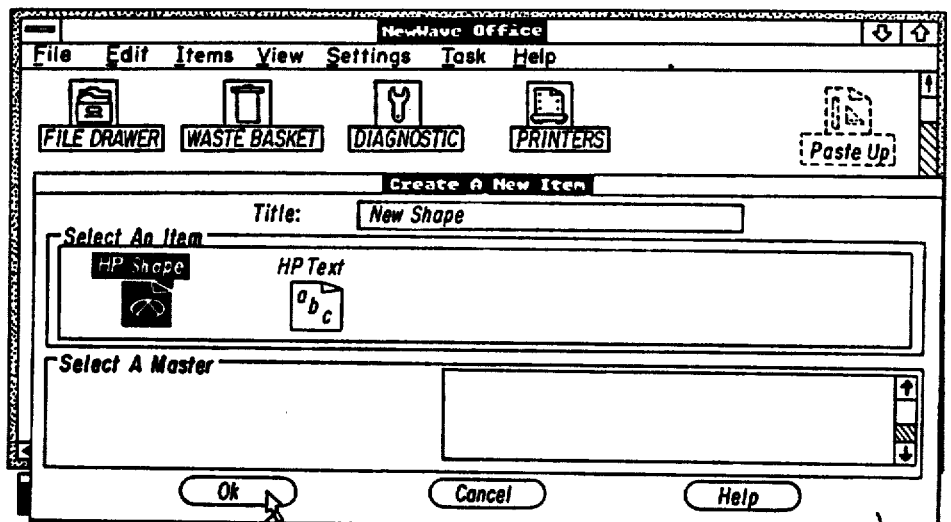
Figure 55:
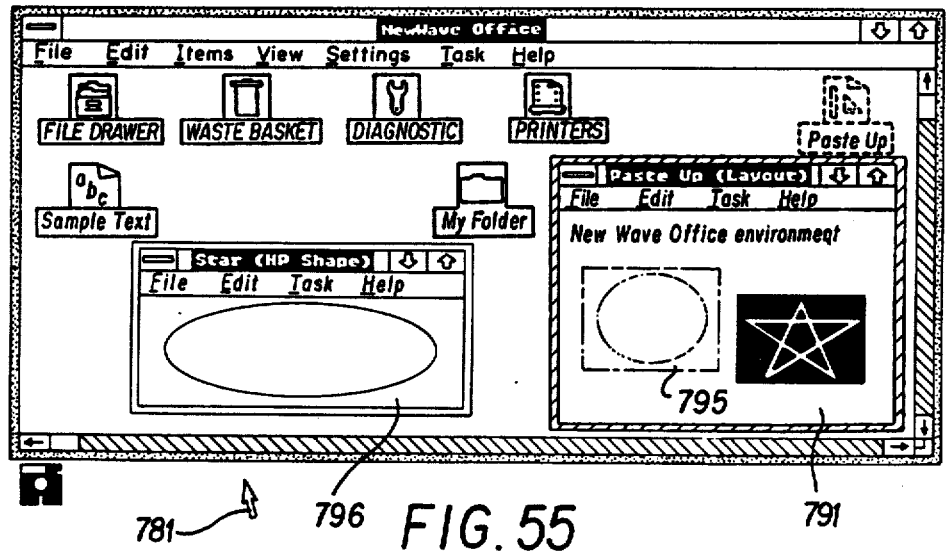
Figure 56:
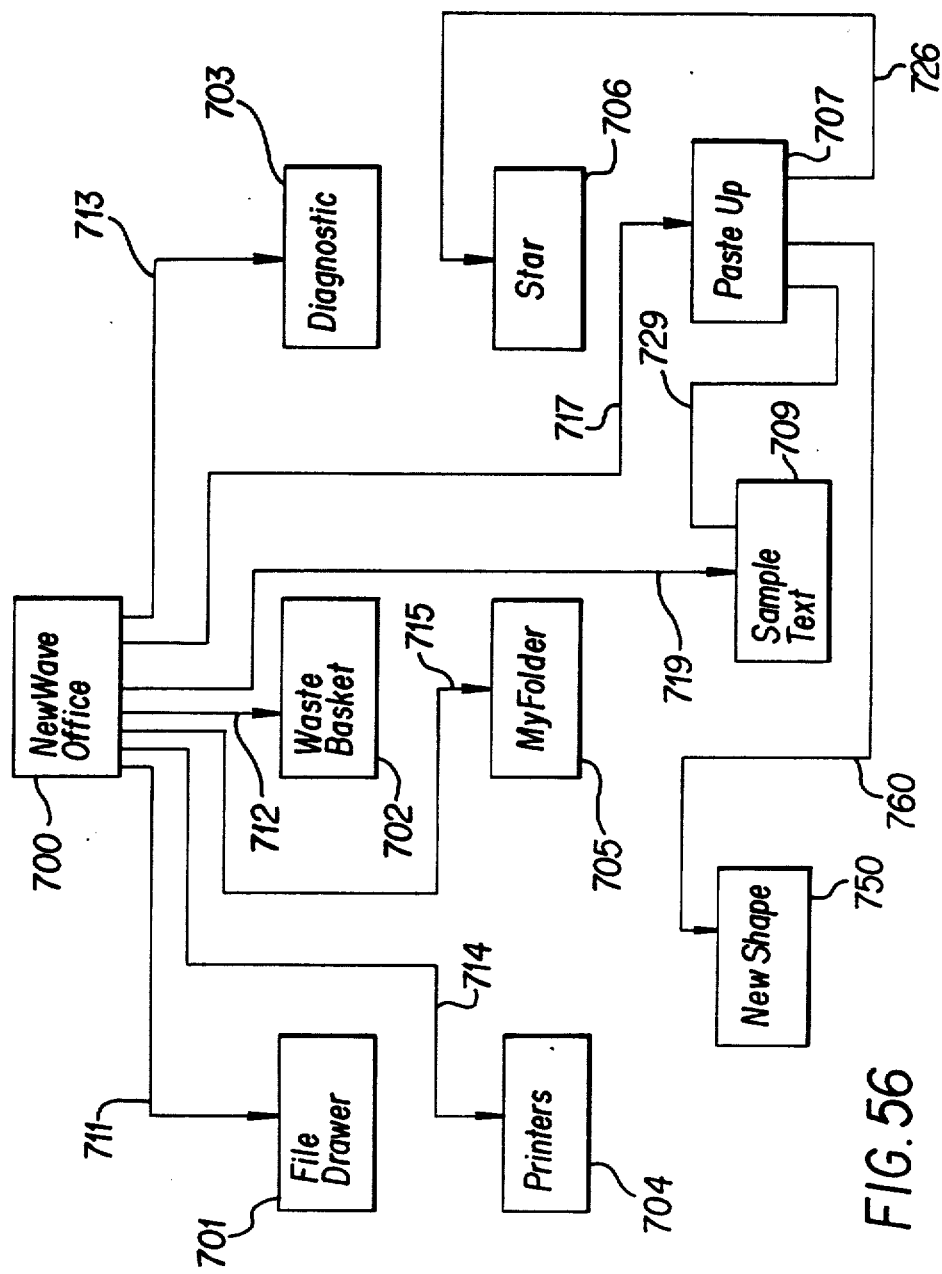

In FIG. 52, cursor 781 is used to define a region 797 in window 791. In FIG. 53, cursor 781 is used to select a selection "Create a New . . . " in pull down menu 798. As a result of this selection dialog box 799 appears in FIG. 54. Dialog box 799 contains icons for the two classes of objects available which are able to display data in region 797 of window 791. Using cursor 781, the icon "HP Shape" has been highlighted. Using keyboard 19 the name "New Shape" has been typed in as the name for a new object to be created. Cursor 781 now points to a regions labelled "OK". Once this region is selected, a new object titled "New Shape" is created. Data for "New Shape" is displayed in region 797 of window 791 as is shown in FIG. 55. In FIG. 56, "New Shape", (object 750) is shown to be a child of "Paste Up" (object 707) through a link 760.

Figure 57:
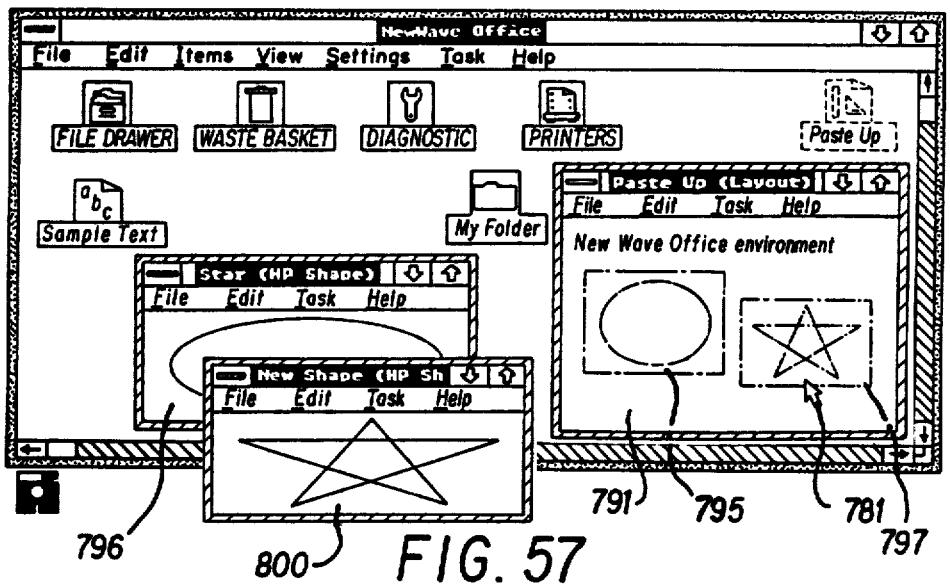
Figure 58:
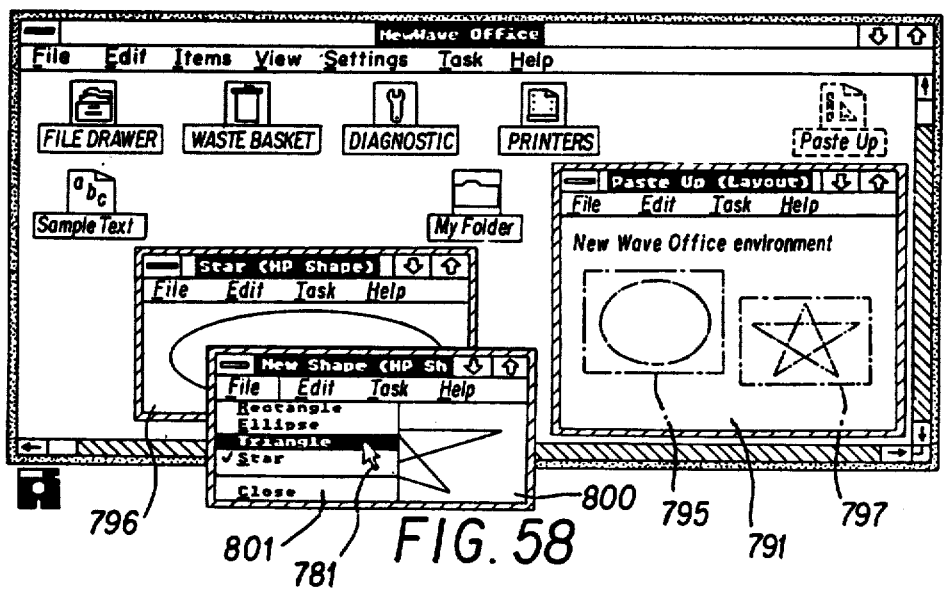
Figure 59:
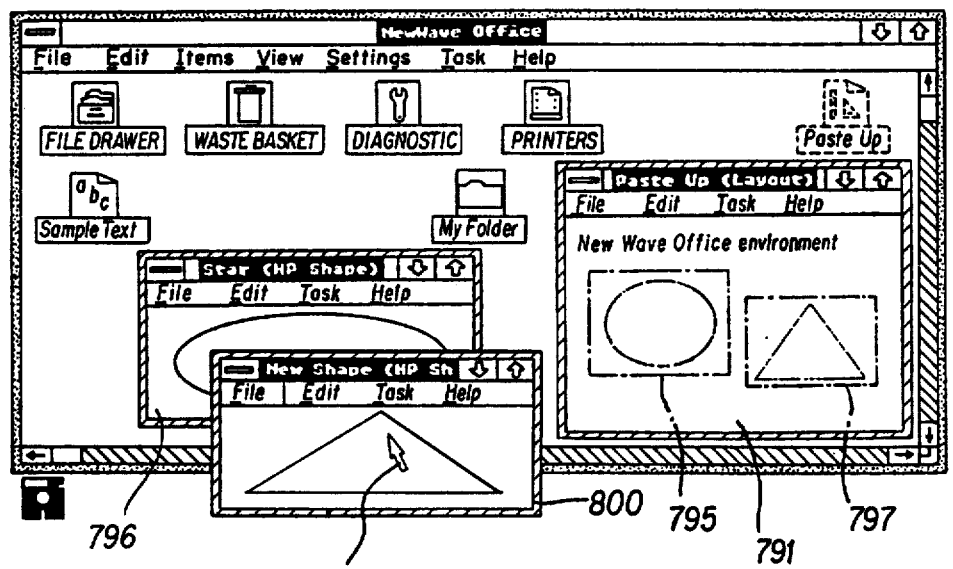

In FIG. 57 a window 800 for "New Shape" was opened by placing cursor 781 over region 797 of window 791 and clicking twice on a button on mouse 20. In FIG. 58, cursor 781 is used to select the selection "Triangle" from a pull down menu 801. The result, as shown in FIG. 59, is that a triangle is now displayed both in window 800 and in region 797 of window 791.

Figure 60:
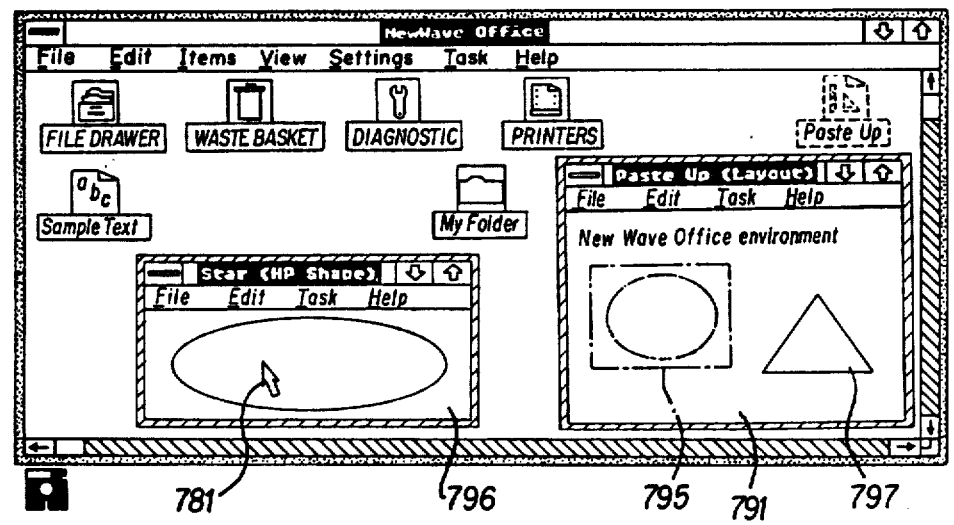
Figure 61:
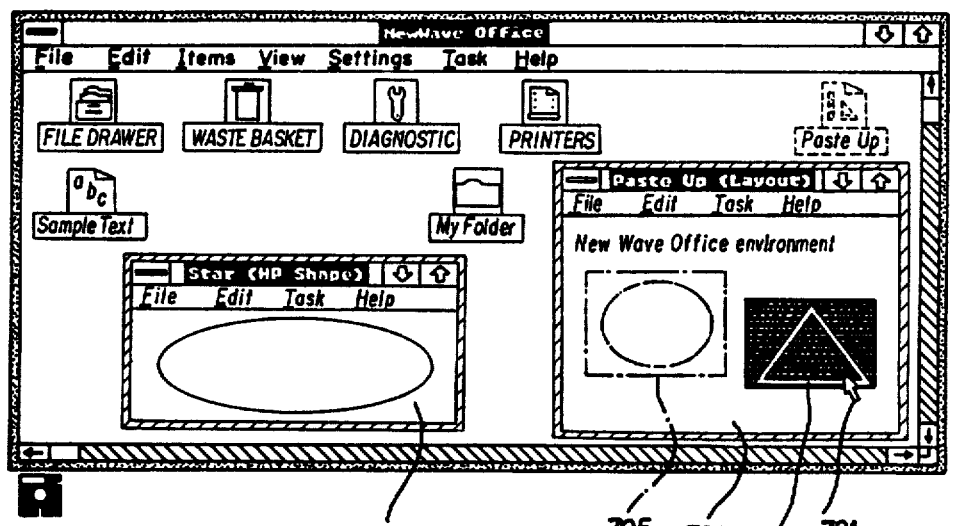
Figure 62:
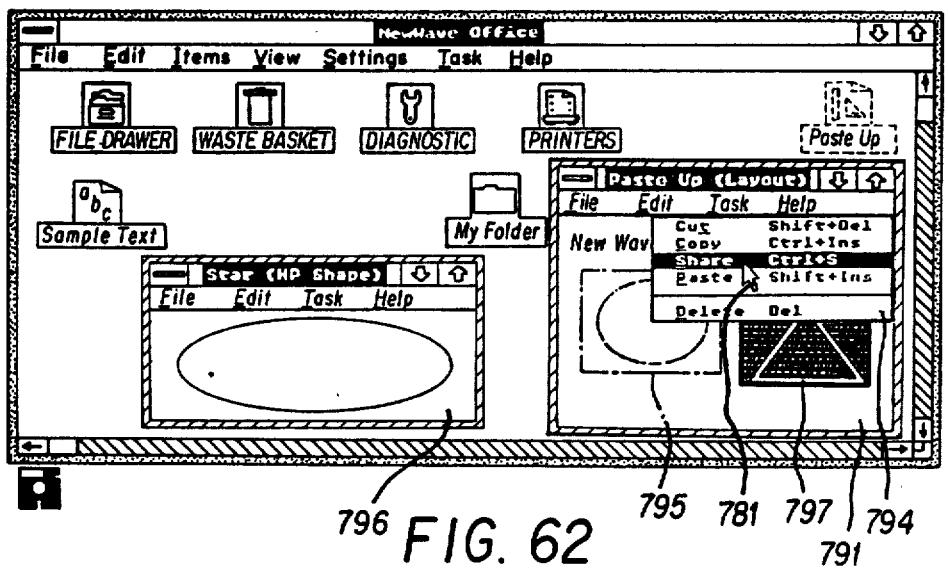
Figure 63:
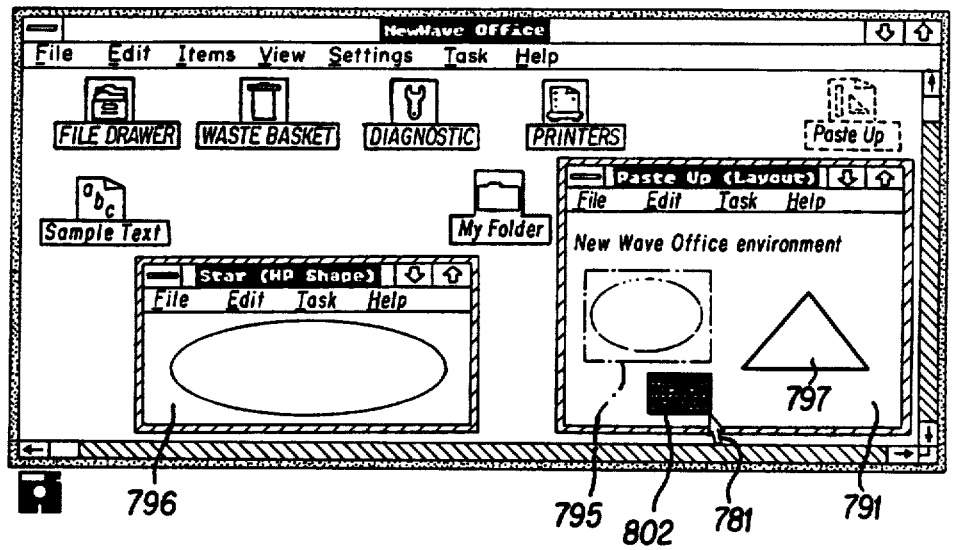
Figure 64:
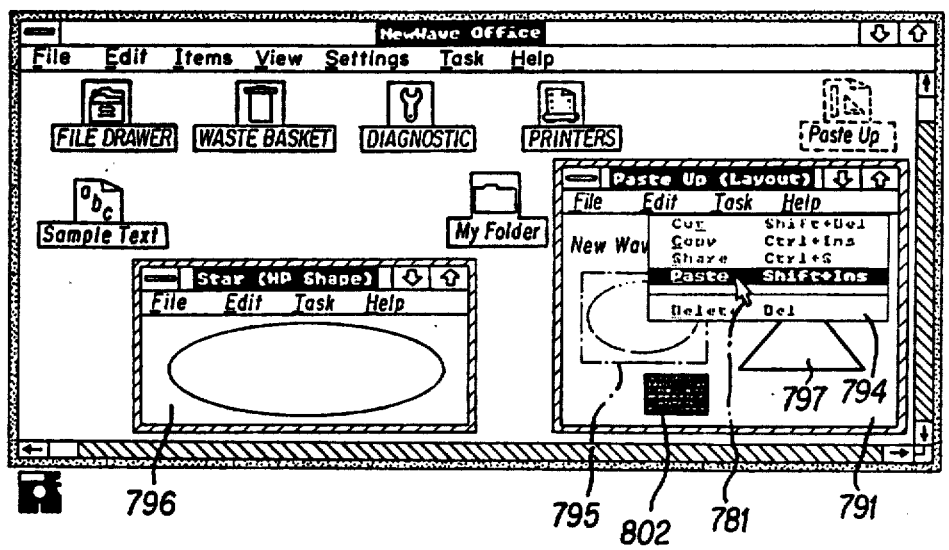
Figure 65:
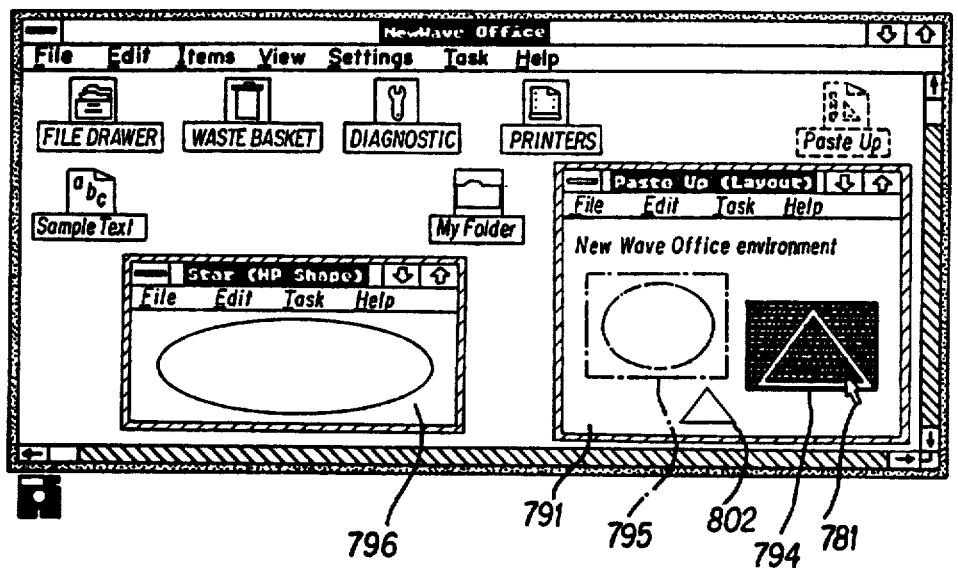
Figure 66:
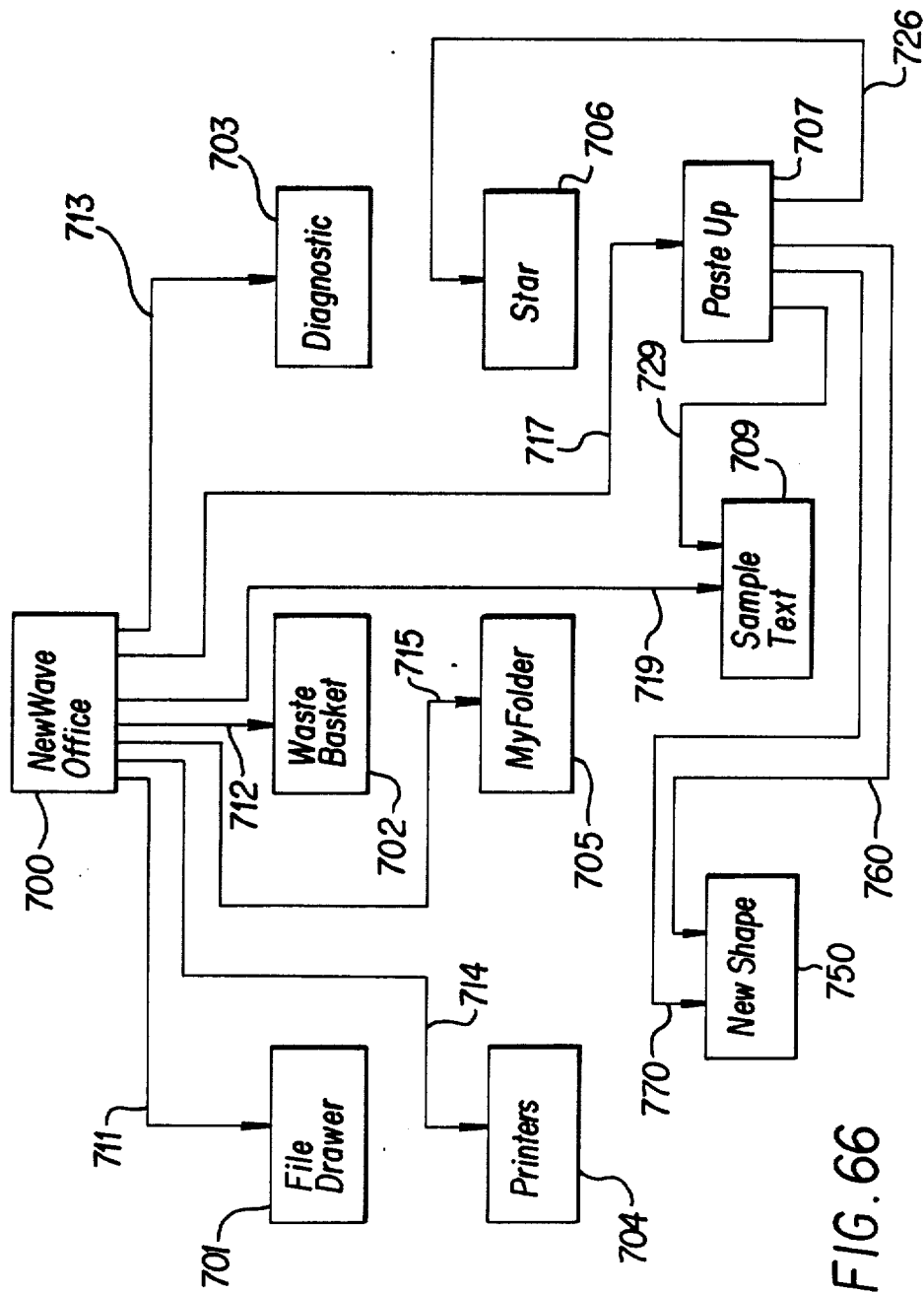

In FIG. 60, window 800 has been closed. In FIG. 61, "New Shape" is selected by placing cursor 781 over region 797 of window 796, and clicking a button on mouse 20. In FIG. 62, cursor 781 is used to select selection "Share" from pull down menu 794. In FIG. 63, cursor 781 is used to select a region 802 of window 791. In FIG. 64, cursor 781 is used to select selection "Paste" from pull down menu 794. The result, as shown in FIG. 65, is the sharing of "New Shape" with data from "New Shape" being displayed in region 797 and in region 802 of window 791. In FIG. 66, "New Shape" (object 750) is shown to have an additional link 770, from its parent "Paste Up" (object 707).

Figure 67:
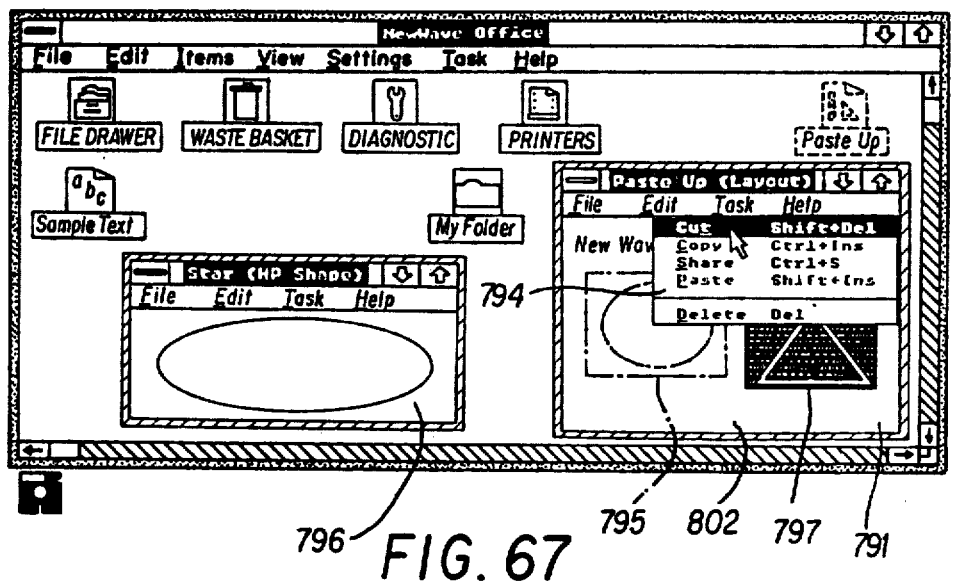
Figure 68:
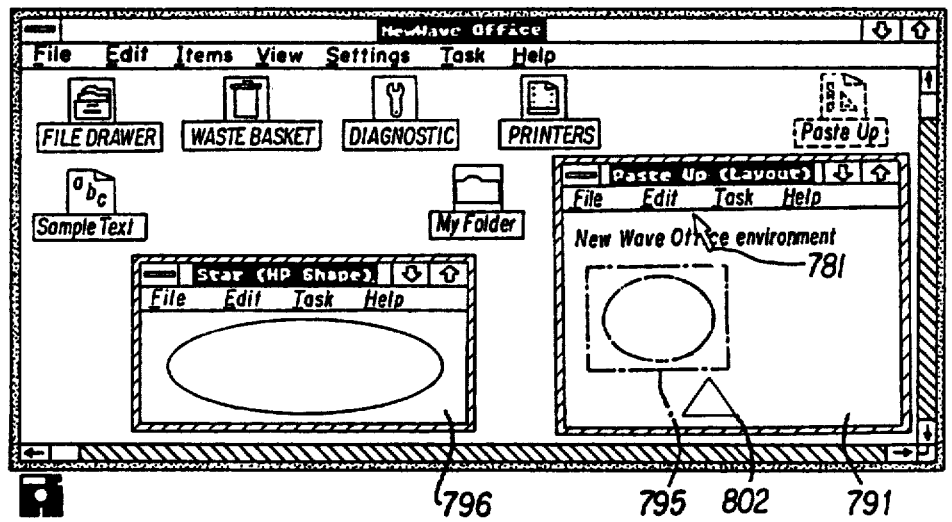
Figure 69:
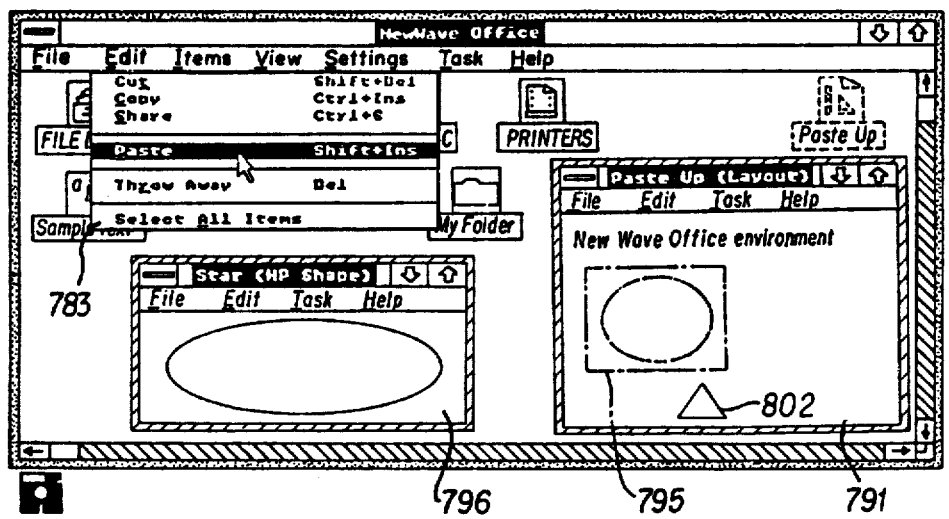
Figure 70:
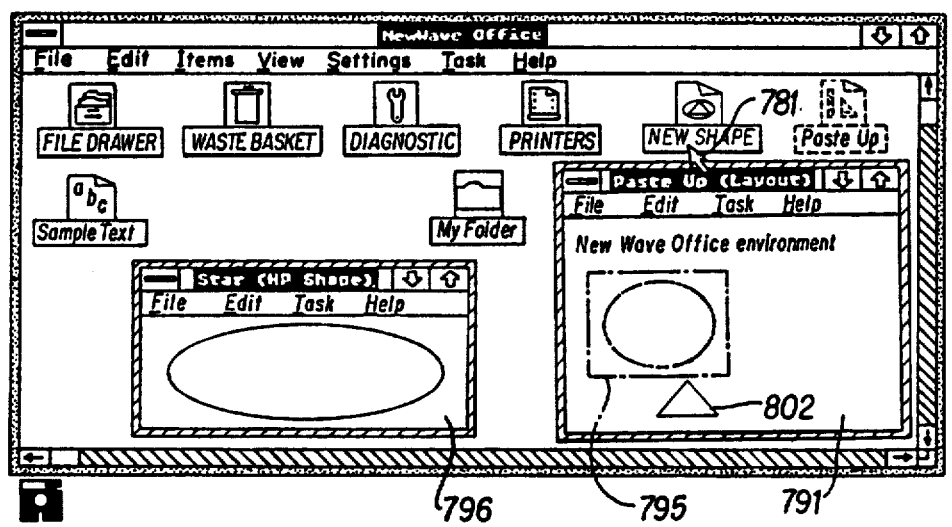

In FIG. 67, region 797 has been selected using cursor 781. Cursor 781 is then used to select selection "Cut" from pull down menu 794. The result, as seen in FIG. 68, is that region 781 has been removed from window 791. In FIG. 69, cursor 781 is used to select selection "Paste" from pull down menu 783. The result, shown in FIG. 70, is an icon for "New Shape", pointed to by cursor 781. In FIG. 71, "New Shape" (object 750) is shown to now be a child of NewWave Office (object 100), through a link 780.

Figure 72:
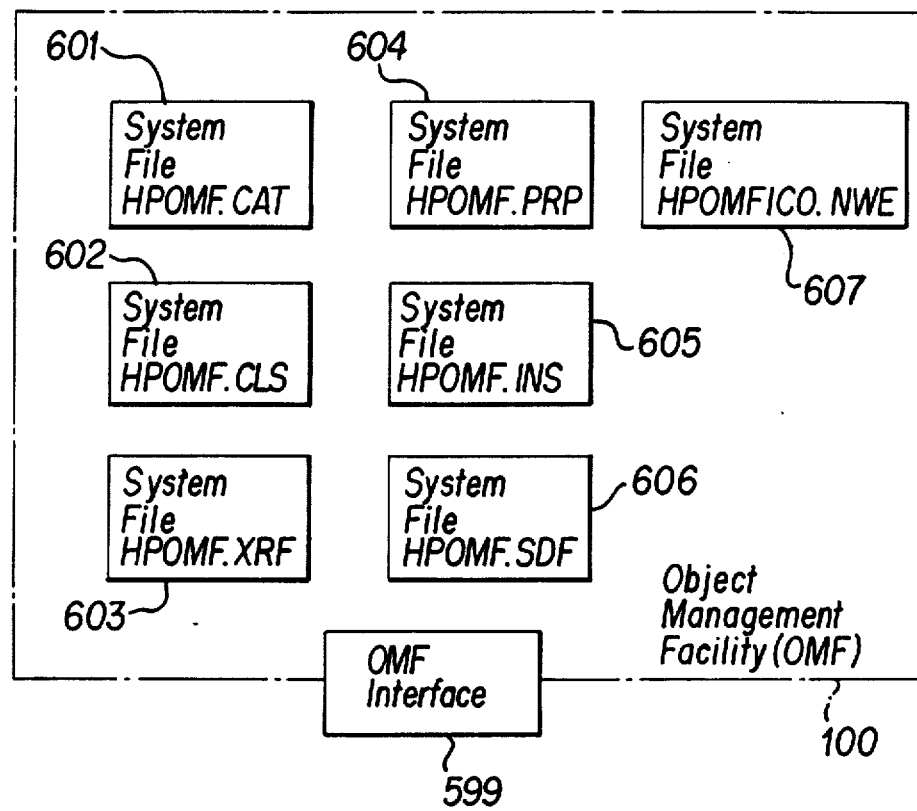
FIG. 72 is a block diagram of an Object Management Facility (OMF) in accordance with the preferred embodiment of the present invention.

In FIG. 72, OMF 100 is shown to contain seven system files: system file 601, system file 602, system file 603, system file 604, system file 605, system file 606 and system file 607. OMF interface 599 serves as interface of OMF to other programs running on computer 18. System files 601–607 serve as a data base that provides various information. They provide information about object properties such as what class each object is what is the name of each object. System files 601–607 provide information about classes of objects such as what application is associated with each class of objects, what icon represents objects of a particular class and lists of what messages (such as those shown in FIG. 2) can be processed by objects of a particular class. System files 601–607 also contain information about links between parent and child objects including a list of parents and reference names of each link from a parent for each object; a list of children and reference names of each link to a child for each object; and additional information to manage data exchange across data links. Additionally, system files 601–607 contain general information such as what files are installed in the operating system for each class that is installed, and what objects have requested automatic restart when the OMF 100 is restarted.

In the preferred embodiment of the present invention system file 601 is referred to as HPOMF.CAT, system file 602 is referred to as HPOMF.CLS, system file 603 is referred to as HPOMF.XRF, system file 604 is referred to as HPOMF.PRP, system file 605 is referred to as HPOMF.INS, system file 606 is referred to as HPOMF.SDF and system file 607 is referred to as HPOMFICO.NWE. A description of each system file is now given.

Figure 73:
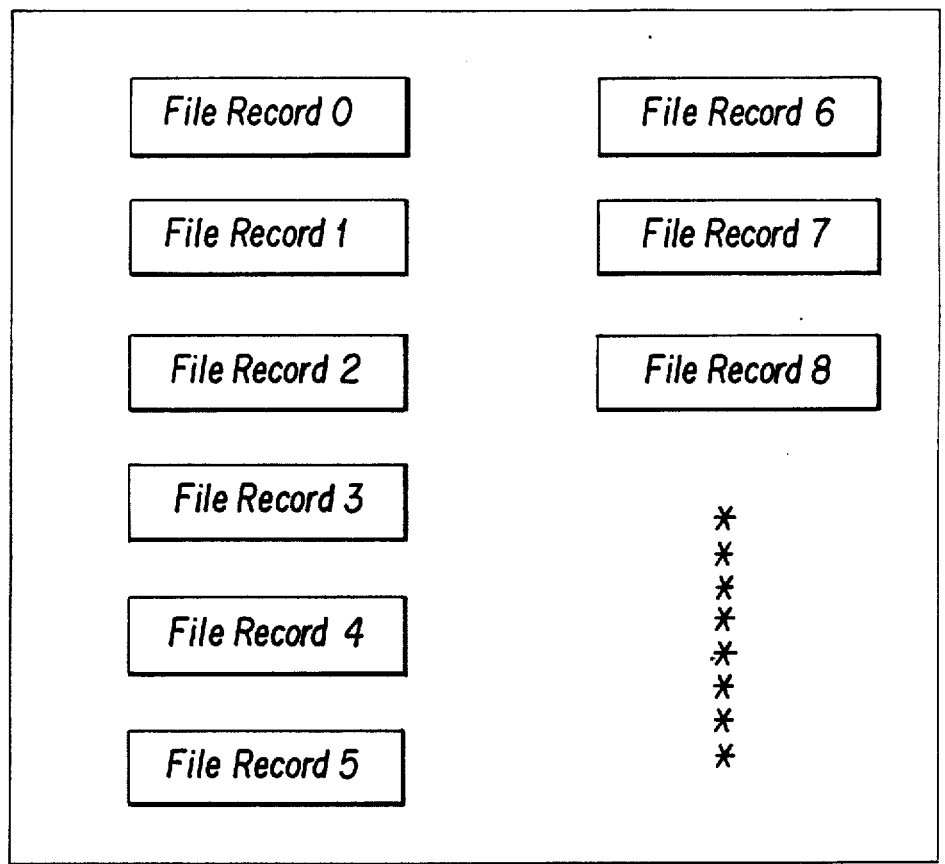
FIG. 73 shows a block diagram of the organization of HPOMF.CAT, a system file included in the OMF shown in FIG. 72.

System file 601, HPOMF.CAT, is also referred to as SYSCAT. HPOMF.CAT is a catalog of all the existing objects in the system. In FIG. 73, HPOMF.CAT is shown to be record oriented. HPOMF.CAT has a plurality of file records. In FIG. 73, file record 0 through file record 8 are shown, although HPOMF.CAT may contain many more file records than are shown in FIG. 73. File record 0 is a header which contains various signatures and is used to manage a list of free file records. A signature is some known value which if present indicates that the file is not corrupted. File record 1 through file record 8 and additional file records (not shown) either define an existing object, or are free. In the preferred embodiment HPOMF.CAT can grow dynamically, as more file records are needed, but cannot shrink.

Figure 74:
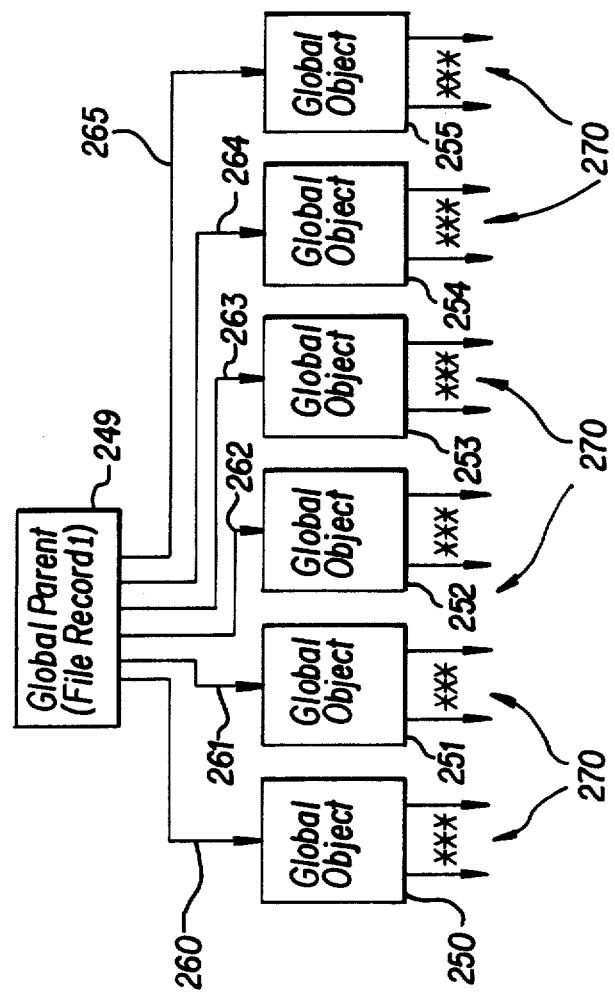
FIG. 74 shows the relation between a global parent and global objects in accordance with the preferred embodiment of the present invention.

File record 1 defines a special object called the global parent. The global parent has a form different than every other object, and may be regarded as a "pseudo" object. FIG. 74 shows the global parent to be the parent of global object 250 through link 260, global object 251 through link 261, global object 252 through link 262, global object 253 through link 263, global object 254 through link 264 and global object 255 through link 265, as shown. Global objects 250–255 are also within HPOMF.CAT. Each global object 250–255 may be a parent of one or more objects in HPOMF.CAT. Each object in HPOMF.CAT which is not a global object, is a descendent of global object. Although FIG. 74 shows only six global objects, the number of global objects operating on a system is a matter of system configuration. Any object in the system can refer to a global object by using the reference name of the link to that global object from the global parent.

As may be seen from FIG. 73, file records in HFOMF.CAT are numbered consecutively. These numbers serve as tags, which identify each object.

In the preferred embodiment of the present invention, each record is 128 bytes in length. The fields for file record 0 are listed in Table 1 below:

TABLE 1

| | |
|---|---|
| lFirstFreeEntry | Contains the record number of the first free record in HPOMF.CAT, or "0" if there are no free records. |
| FileId | Contains the null terminated string "HPOMF.CAT". This serves as a signature. |
| Version | Contains the file format version number, which also serves as a signature. |
| lMaxRecordNumber | Contains the number of the highest record ever allocated from within HPOMF.CAT (this highest record may or may not be free). |

Table 2, below, contains the fields for file records in HPOMF.CAT for file records other than file record 0:

TABLE 2

| | |
|---|---|
| lFirstFreeEntry | Is "−1" if this record defines an object, otherwise this record is free and this field is the record number of the next free record, or "0" if there are no more free records. If the record is free, none of the other fields in the record is meaningful. |
| TypeInClass | Specifies the class of this object. This is the number of the record in HPOMF.CLS that indicates to which class the object belongs (see discussion of class above). |
| SysCatFlags | Specifies if the object is global if the bit masked by the number 20 (hexadecimal) is set in this byte. In the preferred embodiment all other bit positions must contain "0" and are not used. |
| properties | Specifies the number of properties, the length of the property names and the location in HPOMF.PRP of the object's properties. See the description of HPOMF.PRP below for further definition of the structure of this field. |
| fastprops | Certain object properties, such as name, are so heavily accessed that they are stored directly in this field, rather than indirectly in the properties file. Properties stored in this field are called "fast properties." |

System file 602, HPOMF.CLS is also referred to as SYSCLASS. This system file is a list of all installed classes in the system. It is record oriented. The first record, numbered 0, is a header which contains various signatures (see above) and is used to manage a list of free records. All other records either define an installed class or are free. In the preferred embodiment HPOMF.CLS can grow dynamically, but cannot shrink. Each file record in HPOMF.CLS is thirty-two bytes in length. HPOMF.CLS file record 0 (the header) contains the following fields listed in Table 3:

TABLE 3

| | |
|---|---|
| lFirstFreeEntry | Contains the record number of the first free record in HPOMF.CLS, or "0" if there are no free records. |
| FileId | Contains the null terminated string "HPOMF.CLS" |
| Version | Contains the file format version number. |
| lMaxRecordNumber | Contains the number of the highest record ever allocated from within HPOMF.CLS (this highest record may or may not be free). |

Table 4, below, contains the fields for file records in HPOMF.CLS for file records other than file record 0:

TABLE 4

| | |
|---|---|
| lFirstFreeEntry | Is "−1" if this record defines an installed class, otherwise this record is free and this field is the record number of the next free record, or "0" if there are no more free records. If the record is free, none of the other fields in the record is meaningful. |
| ModuleFileName | Specifies the name of the application associated with objects of this class as a null-terminated string. |
| properties | Specifies the number of properties, the length of the property names and the location in HPOMF.PRP of the object's properties. See the description of HPOMF.PRP below for further definition of the structure of this field. |

Figure 75:
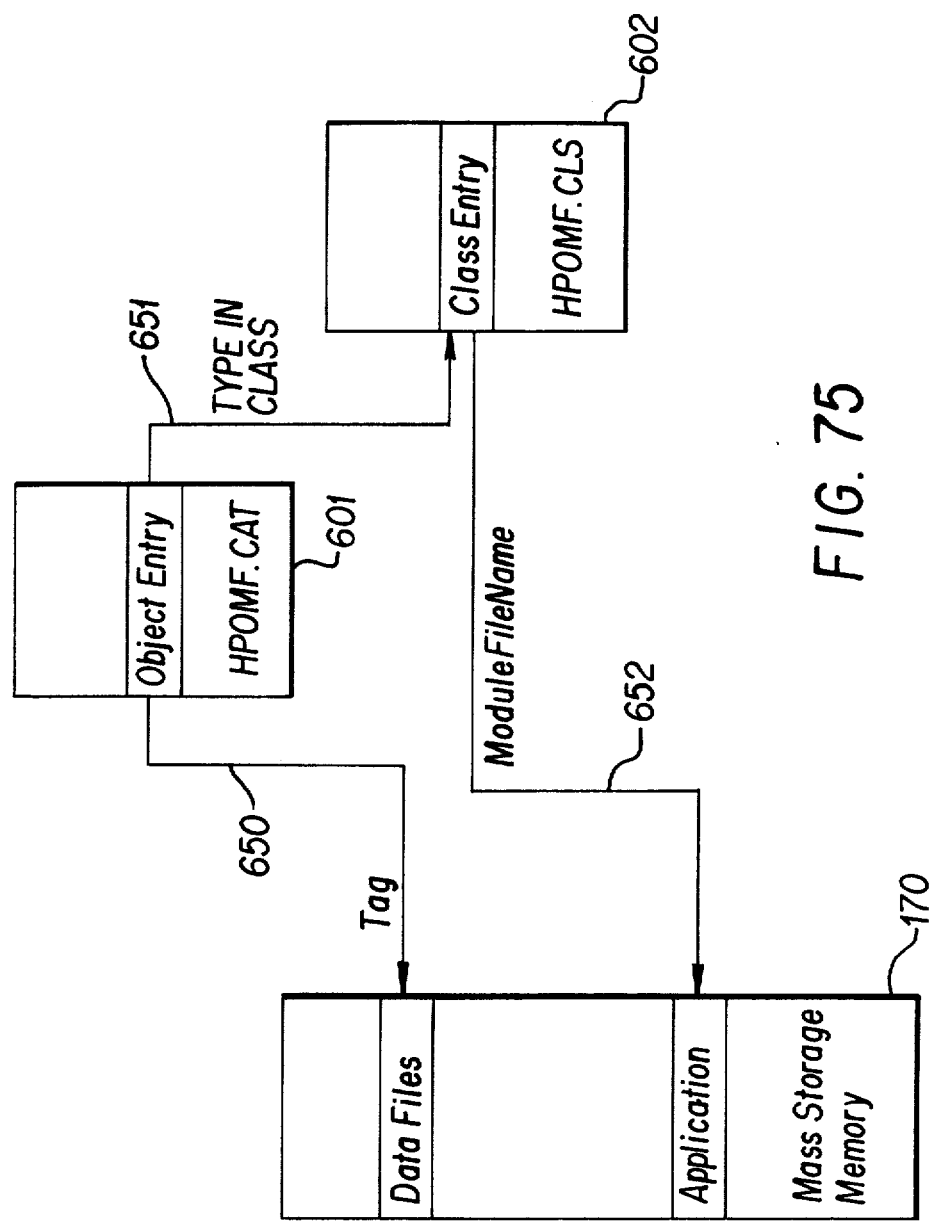
FIG. 75 is a block diagram which shows how system files within the OMF shown in FIG. 72 accesses data files and applications from a memory shown in FIG. 1.

In FIG. 75, the relationship of HPOMF.CAT and HFOMF.CLS is shown. Within each object entry within HPOMF.CAT, the record number, which is an object's tag, serves as an identifier 650 of data files in a mass storage memory 170 associated with the object. The field "TypeInClass" serves as an identifier 651 of the class entry in HPOMF.CLS, which identifies the class of each object. Within each class entry in HPOMF.CLS, the field "ModuleFileName" serves as an identifier 652 of the application file in mass storage memory 170 which is associated with the class.

Figure 76:
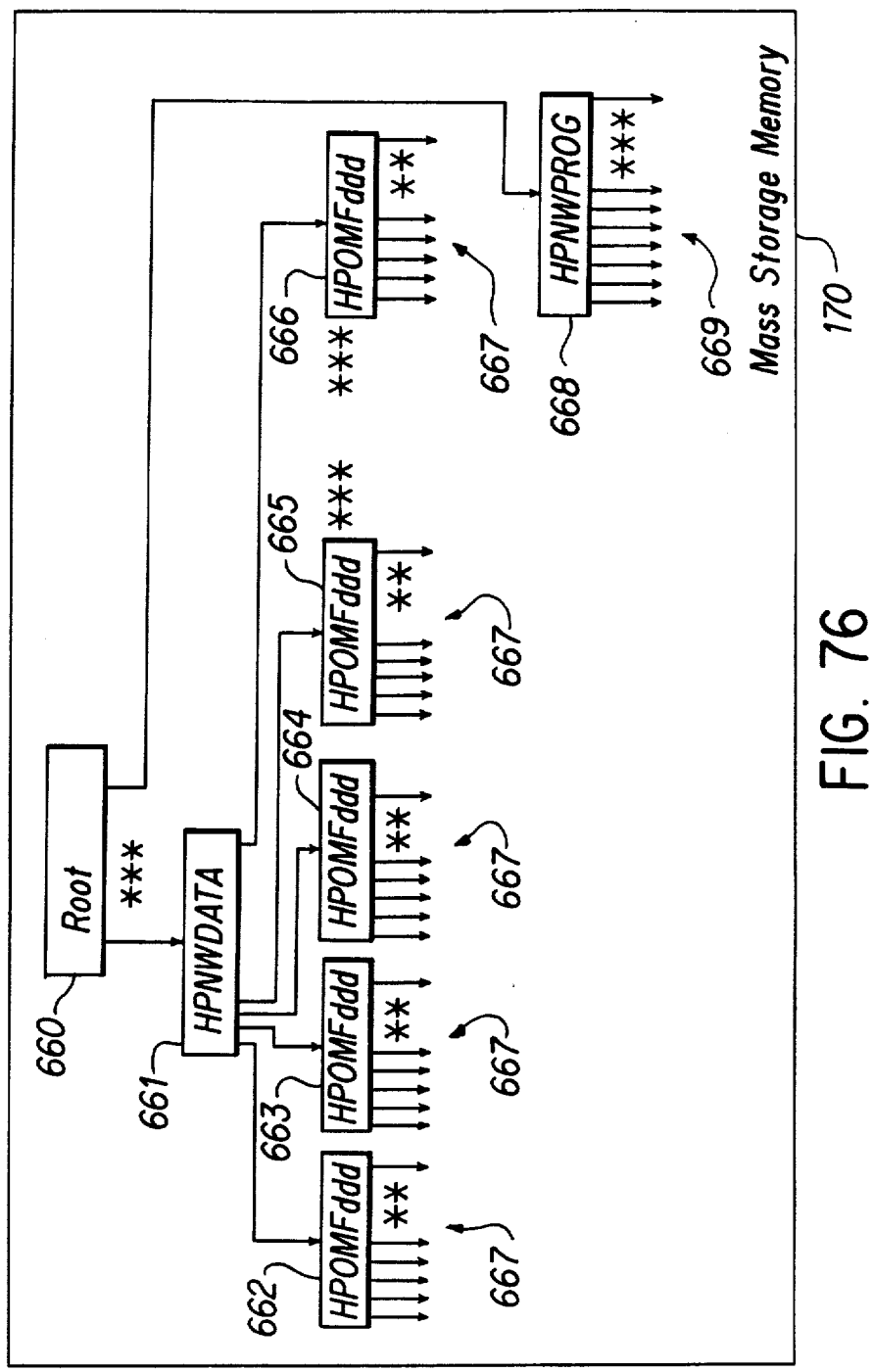
FIG. 76 is a block diagram of the organization of the memory shown in FIG. 75.

In FIG. 76, the organization of a portion of mass storage memory 170 is shown. A root directory 660 contains pointers to an HPNWDATA directory 661 and HPNWPROG directory 668. HPNWPROG directory 668 is the location of storage for applications files, represented by arrows 669. HPNWDATA contains a plurality of HPOMFddd directories, represented by directories 662, 663, 664, 665 and 666. In the HPOMFddd directories are stored data files associated with objects. The "ddd" in HPOMFddd stands for a three digit, leading zeros, hexadecimal number. Each HPOMFddd directory has a different "ddd" hexadecimal number. The "ddd" number indicates which HPOMFddd directory stores data files for a particular object. Data files for a particular object are stored in the HPOMFddd directory which has a "ddd" number equal to the tag for the object divided by an integer number, e.g., fifty four. Within each HPOMFddd directory, files are stored by tag numbers, e.g. data file names have the format xxxxxxxx.111, where "xxxxxxxx" is an eight digit leading zeros hexadecimal tag, and "111" are a reference chosen by the application.

System file 603, HPOMF.XRF is also referred to as SYSXREF. This file is a list of all the links existing in the system. It is record oriented, but does not have a header record. Each record file is either free, or defines an existing link, or is used as an overflow record from the previous record to specify additional view specification information. Records that contain view specifications are called view specification file records. View specification file records can be identified only by a previous record which defines an existing data link; view specification file records cannot be identified by the content within a view specification file record. HPOMF.XRF is increased in size 16K bytes at a time. A newly allocated portion of HPOMF.XRF is filled with zeros. File records within HPOMF.XRF which are free or which define a link have the following fields listed in Table 5:

TABLE 5

| | |
|---|---|
| ParentTag | Contains the tag (HPOMF.CAT record number) of the parent object of this link. If this field is 0, then this record does not define a link and is free. |
| ChildTag | Contains the tag of the child object of this link. If ParentTag in this record is 0, and this field is also 0, then no record beyond this record in HPOMF.XRF defines a link. |
| RefName | Contains the reference name that the parent has assigned to the link. This field is meaningless if ParentTag or ChildTag is zero. Otherwise, if the top three bits of this value are 110, the next record in the file is a view specification. |

File records within HPOMF.XRF which are view specification file records have the following fields listed in Table 5A:

TABLE 5A

| | |
|---|---|
| DataId | Contains the value that the child has assigned to identify the part of itself that is being viewed through the link. |
| Snapshot | Contains the tag (HPOMF.CAT record number) of the object which is the view's snapshot, or if zero, the view has no snapshot. For further discussion of snapshots, see below. |
| Misc | Composed of several bit fields described below; |
| VS_NEWDATASET | Set if child has told OMF that new data is available, but has not been announced to the parent. The hexadecimal number 8000 |

TABLE 5A-continued

| | |
|---|---|
| | 0000 is a mask which indicates which bits are used for this bit field. |
| VS_NEWDATAANNOUNCED | Set if child has told OMF to announce new data to parent, but parent was inactive and was not notified. The hexadecimal number 4000 0000 is a mask which indicates which bits are used for this bit field. |
| VS_SNAPSHOTOLD | Set if child has told OMF that the view's snapshot is out-of-date. The hexadecimal number 2000 0000 is a mask which indicates which bits are used for this bit field. |
| VS_WANTMESSAGES | Set if child has told OMF that it wants to process view messages when snapshot is out-of-date. The hexadecimal number 1000 0000 is a mask which indicates which bits are used for this bit field. |
| VS_TEXTDISKLOC | File position in HPOMF.PRP where a view's 32 character textual data ID is located. This contains zero if no textual data ID has been defined by the child. The low order five bits of the file position are always zero and are thus not stored in the Misc field. The hexadecimal number OFFF FFE0 is a mask which indicates which bits are used for this bit field. |
| VS_INITIALIZED | Set if the view specification has been initialized. If clear, all information in the view specification is zero. The hexadecimal number 0000 0010 is a mask which indicates which bits are used for this bit field. |
| VS_RESERVED | Reserved for future expansion. The hexadecimal number 0000 0008 is a mask which indicates which bits are used for this bit field. |
| VS_VIEWCLASS | Specifies the view class the child assigned to the view. The view class defines what view methods are available to the parent. The hexadecimal number 0000 0007 is a mask which indicates which bits are used for this bit field. |

Figure 77:
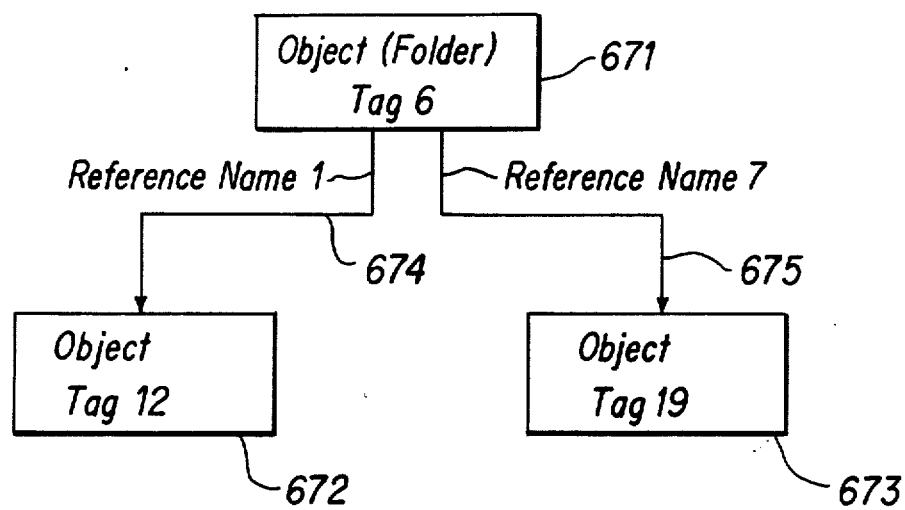
FIG. 77 and FIG. 78 show objects and links in accordance with the preferred embodiment of the present invention.

For example, in FIG. 77, Object 671 is a folder and has a tag of "6". Object 671 is a parent of an object 672 through a link 674 and a parent of an object 673 through a link 675. Object 672 has a tag of "12". Link 674 as a reference name "1". Object 673 has a tag of "19". Link 675 has a reference name "7". Reference names are picked by the parent object and need to be unique for the particular parent object; however, other parents may have a link with the same reference name provided each reference name is unique for each parent.

FIG. 79 shows a block diagram of HPOMF.XRF 603. HPOMF.XRF contains an entry for each link between parents and children. In HPOMF.XRF 603 column 731 contains the tag of the parent for each link. Column 732 contains the tag of the child for each link. Column 733 contains the reference name for each link. The first three bit positions of column 733, shown in FIG. 79 as sub-column 734, indicate whether a view specification file record is present ("110") whether no view specification file record follows ("000") or whether the link is between is a link from the global parent to a global object ("100").

As may be seen, entry 735 is an entry which describes link 674 shown in FIG. 77. That is, in column 731 of entry 7735 there is the parent tag "6". In column 732 there is the child tag "12" and in column 733 there is the reference name "1". Since object 671 is a folder, there is no view, therefore the three bits within subcolumn 734 would be "000".

Similarly, entry 736 is an entry which describes link 675 shown in FIG. 77. That is, in column 731 of entry 736 there is the parent tag "6". In column 732 there is the child tag "19" and in column 733 there is the reference name "7". Since object 671 is a folder, there is no view, therefore the three bits within subcolumn 734 would be "000".

Figure 78:
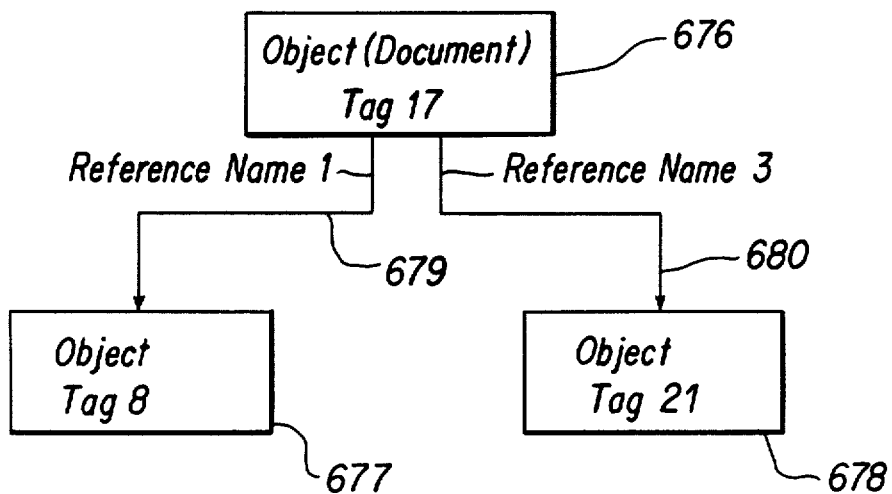

In FIG. 78, Object 676 is a document and has a tag of "17". Object 676 is a parent of an object 677 through a link 679 and a parent of an object 678 through a link 680. Object 677 has a tag of "8". Link 679 as a reference name "1". Object 678 has a tag of "21". Link 680 has a reference name "3".

In FIG. 79, an entry 737 describes link 679 shown in FIG. 78. That is, in column 731 of entry 737 there is the parent tag "17". In column 732 there is the child tag "8" and in column 733 there is the reference name "1". Object 676 is a document, and assuming there is a view associated with link 679, the three bits within subcolumn 734 contain the three bits "110" and entry 738 is a view specification record.

Similarly, an entry 739 describes link 680 shown in FIG. 78. That is, in column 731 of entry 739 there is the parent tag "17". In column 732 there is the child tag "21" and in column 733 there is the reference name "3". Assuming there is a view associated with link 680, the three bits within subcolumn 734 contain the three bits "110" and entry 740 is a view specification record.

Figure 80:
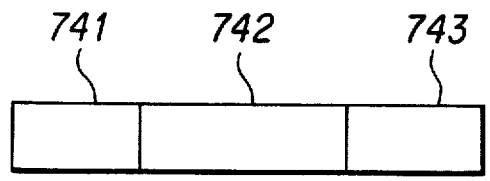
FIG. 80 shows a view specification record in accordance with the preferred embodiment of the present invention.

In FIG. 80, view specification record 740 is shown to include a field 741 which contains a data identification for the view, a field 742 which indicates whether there is a snapshot used in the view, and a field 743 which contains miscellaneous information about the view. The data identification number is used by the child object of the link, to determine what data is sent through the link.

FIGS. 37-43 show the establishment of a link with a view. As has been discussed before, in FIG. 37 window 791 for "Paste Up" (object 707) has been opened by double clicking on the icon for "Paste Up". In FIG. 38, using Cursor 781, controlled by mouse 20, portion 790 of the text of "Sample Text" has been selected. The portion in inverse video stating "New Wave Office environment" is portion 790.

In FIG. 39, cursor 781 is used to select the selection "Share" in a pull down menu 792. Once "Share" is selected, child object 709 ("Sample Text") creates a data identification number which identifies portion 790 of the text to child object 709. Child object 709 also causes OMF 100 to put a link to child object 709 on clipboard 720--Child object 709 communicates to OMF 100 through command set forth in Appendix B, attached hereto--. Child object 709 also informs OMF 100 what data identification number is associated with the new link between the child 709 and clipboard 720. If there is a snapshot associated with the link, child 709 will also inform OMF 100 if there is a snapshot associated with the link. Snapshots are discussed more fully below. As a result OMF 100 will make an entry in HPOMF.XRF 603 for a link between clipboard 720 and child object 709. The view specification record for the link will include the data identification number given to OMF 100 by child 709.

In FIG. 40, area 793 in window 791 is selected using cursor 781. In FIG. 41, a selection "Paste" is selected from a pull down menu 794 using cursor 781. At this point parent object 707 ("Paste Up") requests OMF 100 for a link making him the parent of what is on clipboard 720. The view specification record for the between clipboard 720 and child 709 is copied for link 729 between parent 707 and child 709. In FIG. 43 "Sample Text" (object 709) is shown to be a child of "Paste Up" (object 707) through link 729.

In FIG. 42, "displayed text 790 is displayed in "Paste Up" window 791. In accomplishing this, parent object 707 makes a call to OMF 100 asking that a message be sent to the object identified by the reference name for link 729. This message requests the child object 709 to display data from this link into a location specified by parent object 707. OMF 100 takes the message from parent 707, adds the data identification number from the view specification record for link 729, and delivers the message to child 709. Child 709 displays the data in the specified location, in this case area 793. The name of the message sent from parent 707 to OMF 100 to child 709 is "DISPLAY_VIEW", further described in Appendix B, attached hereto.

Another message "PRINT_SLAVE", also described in Appendix B, may be used when it is desired to print data on a printer rather than display data on a terminal screen.

In addition, Parent 707 may send a "GET_SIZE" message to child object 709. In a "GET_SIZE" message, parent object 707 identifies a reference name for link 729 and indicates coordinates for a display. OMF 100 takes the GET_SIZE message from parent 707, adds the data identification number from the view specification record for link 729, and delivers the message to child 709. Child 709 returns to parent 707 the size of the portion of the specified area that child 709 would use to display the data. This allows parent 707 to modify the region reserved for displaying data from child 709 when child 709 is not able to scale the data to fit in the region specified by parent 707.

When a data from a child object is being displayed by a parent object, and the child object changes the displayed data, the child objects notifies OMF 100 that there has been a change in the data object. For example, as described above, in FIG. 47, data from "Star" (object 706) now displayed in region 795 of window 791. And, as may be seen in FIG. 48, "Star" (object 706) is a child of "Paste Up" (object 707) through a link 726. Since data is being passed from child object 706 to parent object 707, link 726 is a data link which includes a view specification.

In FIG. 49, the method for changing data in child object 706 is shown. A user places cursor 781 over region 795 of window 791 and double clicks a button on mouse 20. The result is the opening and display of "Star" (object 706) in a window 796. Using cursor 781 to select selection "Ellipse" in a menu window 797 results in the data within "Star" (object 706) being changed from a star to an ellipse. As shown in FIG. 51, the result is a change both in data displayed in window 796 and data displayed in region 795 of window 791.

Child object 706 accomplishes this change by making a call to OMF 100 stating that data associated with the data identification number associated with link 726 is changed. OMF 100 looks up all of the links that us the data identification number. If the parent object of any of the links is not active, OMF 100 sets the bit $VS_{13}$ NEWDATAANNOUNCED for that link in HPOMF.XRF. When the parent object is activated, the parent object can then request the new data.

If the parent object is active, OMF 100 will send a message to the parent object saying that new data is available. OMF 100 will identify to the parent object the reference name of the link for which there is additional data. The parent object sends a message to the child object if it wants the new data displayed. In the present case parent object 707 is active, and has requested the new data to be displayed in region 795 of window 791. A further description of the View Specifications are found in Appendixes B, C and D.

The advantage of the present invention is that parent object 707 is able to communicate with child object 706 through OMF 100, without parent object 707 or child object 706 knowing the identity or any other details about each other. The parent object identifies the link using only the reference name of the link. The child object identifies the link using just the data identification number of the link. OMF 100 does all the translation and identification of which links and which objects are involved.

System file 604, HPOMF.PRP, is also referred to as SYSPROP. HPOMF.PRP contains all the object and class properties except for the fast object properties which are contained in HPOMF.CAT. Each record in system file 601 (HPOMF.CAT) and system file 602 (HPOMF.CLS) has a properties field, as described above. Each properties field contains the fields described in Table 6 below:

TABLE 6

| | |
|---|---|
| DirDiskLoc | Contains the position (byte offset) within HPOMF.PRP of the property list directory. |
| nProps | Contains the number of properties in the property list. This is the number of entries in the directory entry array described below. |
| PoolSize | Contains the combined length of all the names of the properties in the property list, including a null-terminating byte for each name. This is the size of the directory name pool described below. |

For each object and for each class, at the DirDiskLoc position in the HPOMF.PRP file is the property directory for that object or that class. The directory has two major portions: the entry array, followed by the name pool. The entry array has one entry for each property in the property list. Each entry has fields set out in Table 7 below:

TABLE 7

| | |
|---|---|
| ValueLen | Specifies the length in bytes of |

TABLE 7-continued

| | |
|---|---|
| | the associated property. This can be zero. |
| ValueDiskLoc | Contains the position within HPOMF.PRP of the value of the associated property. If ValueLen is zero, this is also zero, and there is no value stored anywhere. |
| CacheOffset | This field is only used at run time and is not meaningful in the file. |

Immediately following the entry array is the name pool. This portion of HPOMF.PRP contains the null-terminated names of properties in the property list, in the same order as the entry array. Properties may include such things as titles, user comments, date and time of creation, the user who created the object, etc. For more information on properties, see Appendix D.

HPOMF.PRP grows dynamically as need. At the beginning of HPOMF.PRP there is a 128 byte bitmap which controls the allocation of the first 1024 pages of HPOMF.PRP. Each page is 32 bytes in length. These pages immediately follow the bit map. The bitmap is an array of words with the most significant bit of each word used first. Thus, bits 15 through 0 of the first word of the bitmap control the allocation of pages 0 through 15 of the file, respectively.

When storage in the first 1024 pages is insufficient, a second bitmap is added to the file following page 1023. This bitmap controls the allocation of pages 1024 through 2047, which immediately follow the second bitmap. Additional bitmaps and pages are added in the same way, as needed.

Each directory and property value is stored as a single block in the file, i.e., as a contiguous run of pages that are all allocated in the same bitmap. This causes the restriction that no directory or value can exceed 32K bytes (1024 times 32) in length.

System file 605, HPOMF.INS, is also referred to as SYSINSTL. HPOMF.INS contains a list of the files that were copied to the system when each class was installed. This information is used so that these files can be deleted when the class is de-installed.

The very beginning of HPOMF.INS is a double word value which serves as a validity/version identifier. In the preferred embodiment the value of this double word must be O1O1ABCD hex to be valid. In Table 8, this number is stored as shown because of the protocols for storage in the particular processor used by the preferred embodiment, i.e. an 80286 microprocessor made by Intel Corporation.

Following the double word comes a series of variable length records. There is one record for each installed class. The first word of each record is the length of the rest of the record, in bytes. This is followed by the null terminated class name of the installed class. Then follows the file names of the files copied to the OMF directories, each terminated by a null byte, and preceded by a byte which gives the length of the file name, including the length byte and the null terminator. If the file name begins with the special character "*", the file is assumed to be located in the HPNWPROG directory. If the file name begins with the special character "+" the file is assumed to be located in the HPNWDATA directory.

For example, assume two classes are installed: class "AB" class "CDE". Class "AB" caused two files to be installed: "Z" to HPNWPROG directory 668 and "YY" to the HPNWDATA directory. Class "CDE" caused 1 file to be installed: "XXX" to HPNWPROG directory 668. Given this case Table 8 below shows the contents of HPOMF.INS for this example:

TABLE 8

| offset | content | comments |
|---|---|---|
| 0 | CD AB 01 01 | File header/version check |
| 4 | 0C 00 | Length of AB record (12 decimal) |
| 6 | 41 42 00 | "AB" + Null |
| 9 | 04 | Length of length byte "*Z" + Null |
| A | 2A 5A 00 | "*Z" + Null |
| D | 05 | Length of length byte + "+YY" + Null |
| E | 2B 59 59 00 | "+YY" + Null |
| 12 | 0A 00 | Length of CDE record (10 decimal) |
| 14 | 43 44 45 00 | "CDE" + Null |
| 18 | 06 | Length of length byte + "*XXX" + Null |
| 19 | 2A 58 58 58 00 | "*XXX" + Null |

System File 606, HPOMF.SDF is also referred to as the "shutdown file". HPOMF.SDF exists only when the system has been cleanly shut down. It is deleted as the system starts, and created as it shuts down. On startup, if this file is missing, OMF assumes that the last session ended abnormally, and so it goes through its crash recovery procedures to validate and repair the system files as best it can. The system files can be in an invalid but predictable state on a crash. These errors are corrected without user intervention. Certain other kinds of file consistency errors are detected, but are not really possible from an "ordinary" system crash. These errors are in general not correctable and the OMF will not allow the system to come up in this case.

If HPOMF.SDF is present, it contains a list of objects. When the system is being shut down normally, each object which is active at the time can request that the OMF restart them when the system is restarted. The list of objects, then is the list of tags of objects which have requested that they be restarted when the system is restarted.

The first word in HPOMF.SDF is a flag word. If this word is non-zero, OMF will execute its crash recovery code even though HPOMF.SDF exists. Normal shutdown will set this flag when producing the file if some serious error occurred in the session being ended.

After the first word, the rest of the file is a sequence of three byte records. The first two bytes of each record contain the tag of the object to be restored. The least significant byte is first. The third byte is not used in the preferred embodiment, and is zero.

For example, if the system is shut down cleanly in the last session and two objects, having tags of 2 and 7, respectively, have requested restart, the contents of HPOMF.SDF will be as set out in Table 9 below.

TABLE 9

| offset | content | comments |
|---|---|---|
| 0 | 00 00 | Indicates no crash recovery needed |
| 2 | 02 00 | Tag of first object to restart |
| 4 | 00 | Unused and reserved |
| 5 | 07 00 | Tag of second object to restart |
| 7 | 00 | Unused and reserved |

System file 7, HPOMFICO.NWE, is a Microsoft Windows dynamic library executable file which contains a dummy entry point and no data. Microsoft Windows is a program sold by Microsoft Corporation, having a business address at 16011 NE 36th Way, Redmond, WA 98073-9717. HPOMFICO.NWE also contains as "resources" the icons of each installed class. OMF modifies HPOMFICO.NWE directly during run time, and loads and unloads it to get the icon resources from it. The format of HPOMFICO.NWE is defined in Microsoft Windows documentation distributed by Microsoft Corporation.

Normally working with a view (see discussion on views above) causes a child's application to be invoked. Where large applications are involved, this can cause a lot of unnecessary overhead. The use of snapshots allow this overhead to be eliminated.

A snapshot is an object that uses executable code from a separate library referred to as a dynamic access library (or DAL) rather than using the full application executable code. The only data file associated with a snapshot contains data which is to be sent from a child object to a parent object. The code which encapsulates the data file although referred to as a dynamic library, is still stored in directory HPOMFPROG (directory 668).

Figure 81:
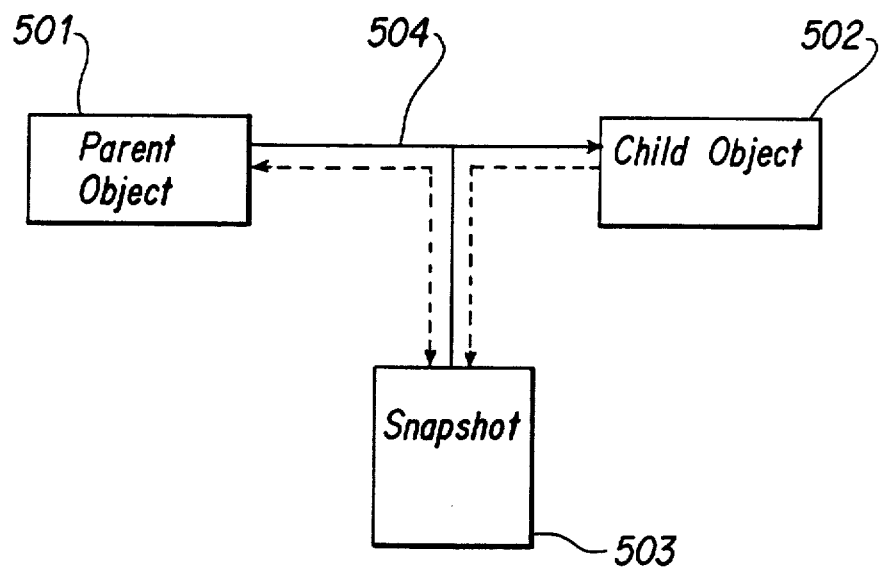
FIG. 81 shows the use of a snapshot in accordance with a preferred embodiment of the present invention.

For example, FIG. 81 shows a parent object 501 linked to a child object 502 through a link 504. Associated with link 504 is a snapshot 503. Once child object has designated snapshot 503 in a view specification record for link 504, snapshot 503 is able to provide data from child object 502 to parent 501 without the necessity of invoking an application associated with child object 502.

Figure 82:
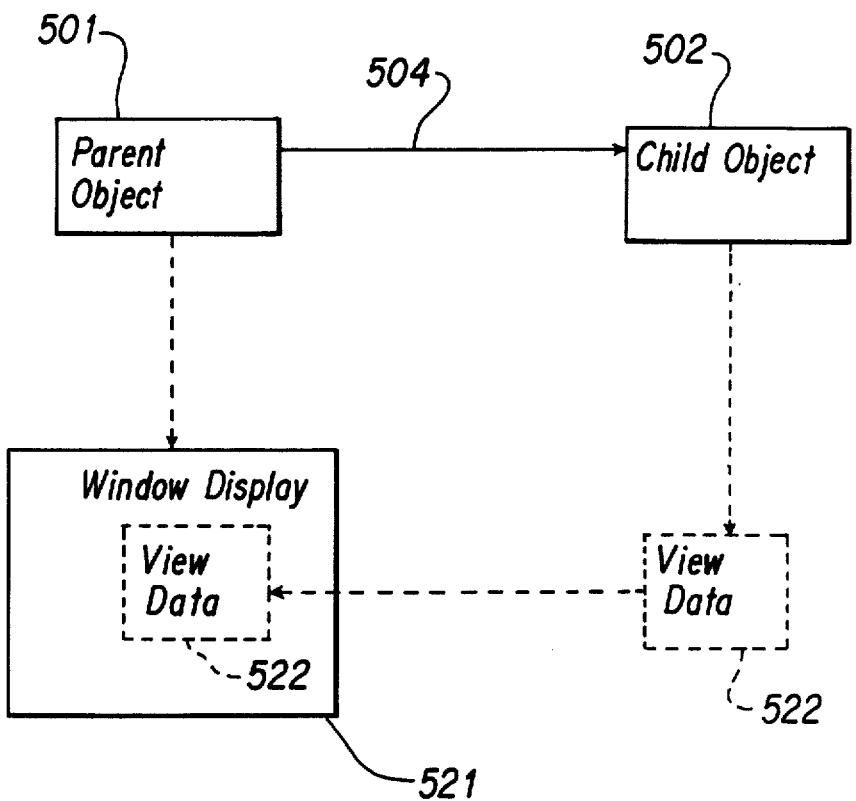
FIG. 82 shows the data path of a view when there is no snapshot, in accordance with a preferred embodiment of the present invention.
Figure 83:
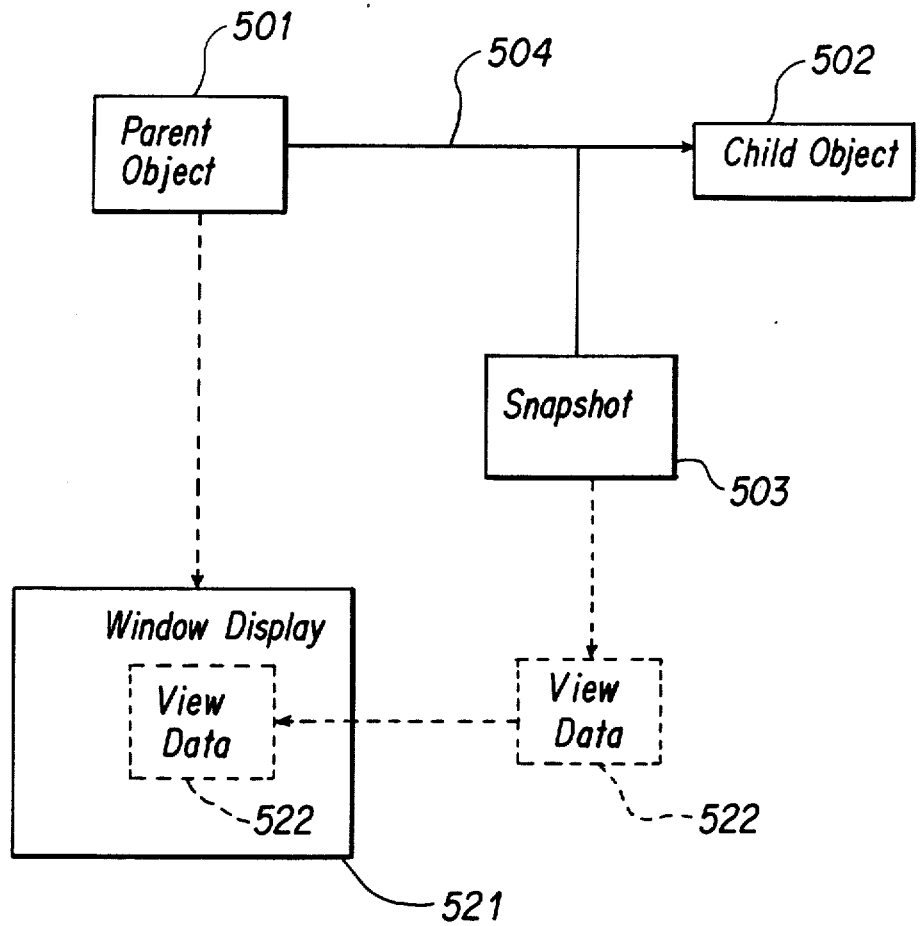

As shown in FIG. 82, when there is no snapshot, child object 502 must be active in order to send view data 522 to parent object 501, in order for parent object 501 to display view data 522 in a window display 521. In FIG. 83, however, snapshot 503 is shown to provide view data 522 to parent object 501 without the necessity of child 502 being active. Further implementation details of snapshots are given is Appendix B, Appendix C and Appendix D.

Appendix A is a list of major data structures within OMF 100.

Appendix B is a description of functions which OMF interface 599 recognizes in the preferred embodiment of the present invention.

Appendix C (HP NewWave Environment: Program Design Examples) Gives examples of how the preferred embodiment of the present invention may be implemented including detail as to how OMF 100 allows data to be viewed between windows displayed on monitor 14.

Appendix D (Chapter 2 of Programmer's Guide) gives a further overview of the preferred embodiment of the present invention. Further detail as to the operation of the preferred embodiment of the present invention.

APPENDIX A

C LANGUAGE STRUCTURE DEFINITIONS FOR OMF FILES

```
/*
**  Structure of properties fields of HPOMF.CAT and HPOMF.CLS.
*/ typedef struct ListDesc {
   unsigned long DirDiskLoc;
   unsigned int  nProps;            /* ==0 implies PoolSize==0    */
   unsigned int  PoolSize;
} LISTDESC;

/*
**  Structure of fastprops field of HPOMF.CAT.
**
**  Each LenXXX field says whether the following property is defined (if the
**  0x80 bit is set) and if so what its length is (LenXXX & ~0x80).
*/ typedef struct {
   unsigned char LenModified;
   unsigned long Modified;
   unsigned char LenLastWriter;
   struct {
      char MailNode [8];
      char MailName [36];
   }             LastWriter;
   unsigned char LenPublic;         /* only zero-length allowed */
   unsigned char LenAddChild;
   struct {
      unsigned long NextRefName;
      unsigned int  SpaceLeft;
   }             AddChild;
```

```
    unsigned char LenSystem;
    int           System;
    unsigned char LenExtraDisk;
    unsigned long ExtraDisk;
    unsigned char LenDesktopFlags;
    unsigned char DesktopFlags;
    unsigned char LenTitle;
    char          Title [32];
} FASTPROPS;

/*
**  Structure of header record (record 0) of HPOMF.CAT and HPOMF.CLS files.
*/ typedef struct OMFFileHeader {
    unsigned long iFirstFreeEntry;   /* record # of 1st free record */
    char          FileId [14];       /* name of file                */
    int           Version;           /* file format version         */
} OMFFILEHEADER;

/*
**  Structure of records in HPOMF.CAT.
*/ typedef struct SysCat {
    unsigned int  TypeInClass;
    unsigned char SysCatFlags;
    LISTDESC      properties;
    FASTPROPS     fastprops;
} SYSCATENTRY;

typedef struct SysCatRec {
    unsigned long lNextFreeEntry;
    SYSCATENTRY   entry;
    unsigned char Filler[128-sizeof(SYSCATENTRY)-sizeof(unsigned long)];
} SYSCATREC;

/*
**  Structure of records in HPOMF.CLS.
*/ typedef struct SysClass {
    char          ModuleFileName[13];
    LISTDESC      properties;
} SYSCLASSENTRY;

typedef struct SysClassRec {
    unsigned long lNextFreeEntry;
    SYSCLASSENTRY entry;
    unsigned char Filler[32-sizeof(SYSCLASSENTRY)-sizeof(unsigned long)];
} SYSCLASSREC;

/*
**  Structure of free and link defining records in HPOMF.XRF.
*/ typedef struct {
    unsigned int  ParentTag;  /* 0 = Available entry */
    unsigned int  ChildTag;   /* 0 = no more used entries beyond this one */
    unsigned long RefName;
} SYSXREFREC;

/*
```

```
/*
** Structure of view specification following link record in HPOMF.XRF that
** has non-zero ParentTag and ChildTag and RefName with high 3 bits of 110.
*/ typedef struct {
   int          DataId;
   unsigned int Snapshot;      /* == 0 -> no snapshot              */
   unsigned long Misc;
} VIEWSPEC;

/*
** Structure of each entry of the entry array of each property list in
** HPOMF.PRP.
*/
typedef struct PropEntry {
   unsigned int  ValueLen;
   unsigned long ValueDiskLoc;
   int           CacheOffset;   /* no meaning in file */
} PROPENTRY;
```

HP NewWave Environment: Programmer Reference Manual

Manual Part No.
D1701-90001

Notice

The information contained in this document is subject to change without notice.

Hewlett-Packard makes no warranty of any kind with regard to this material, including, but not limited to, the implied warranties of merchantability and fitness for a particular purpose. Hewlett-Packard shall not be liable for errors contained herein or for incidental or consequential damages in connection with the furnishing, performance, or use of this material.

Hewlett-Packard assumes no responsibility for the use or reliability of its software on equipment that is not furnished by Hewlett-Packard.

This document contains proprietary information which is protected by copyright. All rights are reserved. No part of this document may be photocopied, reproduced, or translated to another program language without the prior written consent of Hewlett-Packard Company.

Microsoft®, Microsoft® Windows, and MS-DOS® are registered trademarks of Microsoft Corporation.

©1988 by Hewlett-Packard Co.

Personal Software Division
3410 Central Expressway
Santa Clara, CA 95051, U.S.A.

Printing History   First Edition—March, 1988   Printed in U.S.A.

Table of Contents

Chapter 1: Introduction

Purpose . . . . . . . . . . . . . . . . . . . . . 1-1

Organization . . . . . . . . . . . . . . . . . . 1-1

Section 1    Functions

Chapter 2: API Functions and Macros

| | |
|---|---|
| API Function Summary Tables | 2-1 |
| APIChangeCaption | 2-5 |
| APICommandInterface | 2-6 |
| APIDlgCommandInterface | 2-7 |
| APIDlgHelpInterface | 2-8 |
| APIDlgInit | 2-9 |
| APIDlgTerm | 2-10 |
| APIDlgUserActionInterface | 2-11 |
| APIEnableMenuItem | 2-12 |
| APIError | 2-13 |
| APIErrorInterface | 2-14 |
| APIErrorOn | 2-15 |
| APIGetAPIVersion | 2-16 |
| APIHaveButton | 2-17 |
| APIHaveCommand | 2-18 |
| APIHaveDialogCommand | 2-19 |
| APIHaveMenu | 2-20 |
| APIHaveMessage | 2-21 |
| APIInit | 2-22 |
| APIInitMenu | 2-23 |
| APIInterceptOn | 2-24 |
| APILoadAccelerators | 2-25 |
| APIMessageBox | 2-26 |
| APIModelessDlgInit | 2-29 |
| APIModelessDlgTerm | 2-30 |
| APIMonitorOn | 2-31 |
| APINotReady | 2-32 |
| APINoWindowOn | 2-33 |
| APIPlaybackMsg | 2-34 |
| APIPlaybackOn | 2-35 |
| APIReady | 2-36 |

APIRecordInterface . . . . . . . . . . . . 2-37
APIRecordOn . . . . . . . . . . . . . . 2-38
APIReturnInterface . . . . . . . . . . . . 2-39
APITerm . . . . . . . . . . . . . . . . 2-40
APIUserActionInterface . . . . . . . . . . 2-41

Chapter 3: Utility Functions

Utility Function Summary Tables . . . . . . . . 3-1
    LPCAST . . . . . . . . . . . . . . . . 3-5
    lstrcat . . . . . . . . . . . . . . . . . 3-6
    lstrcmp . . . . . . . . . . . . . . . . 3-7
    lstrcpy . . . . . . . . . . . . . . . . . 3-8
    lstrdelete . . . . . . . . . . . . . . . . 3-9
    lstrfill . . . . . . . . . . . . . . . . . 3-10
    lstrinsert . . . . . . . . . . . . . . . . 3-11
    lstrlen . . . . . . . . . . . . . . . . . 3-12
    lstrmove . . . . . . . . . . . . . . . . 3-13
    NW_AnsiToName . . . . . . . . . . . . 3-14
    NW_CreateWindow . . . . . . . . . . . 3-16
    NW_ExecModule . . . . . . . . . . . . 3-18
    NW_FormatFill . . . . . . . . . . . . . 3-19
    NW_GetCurrentTime . . . . . . . . . . . 3-20
    NW_GetExecErr . . . . . . . . . . . . 3-21
    NW_GetNWLIBVersion . . . . . . . . . . 3-22
    NW_InsertMsgNumber . . . . . . . . . . 3-23
    NW_InsertMsgString . . . . . . . . . . . 3-24
    NW_Maximize . . . . . . . . . . . . . 3-25
    NW_MessageFilter . . . . . . . . . . . . 3-26
    NW_Minimize . . . . . . . . . . . . . . 3-27
    NW_NameToAnsi . . . . . . . . . . . . 3-28
    NW_ReadIntl . . . . . . . . . . . . . . 3-29
    NW_Restore . . . . . . . . . . . . . . 3-30
    NW_TelescopeEffect . . . . . . . . . . . 3-31
    NW_TimeToAnsi . . . . . . . . . . . . . 3-32
    NW_TimeToStruct . . . . . . . . . . . . 3-33
    SCOPEOF . . . . . . . . . . . . . . . 3-34
    SIZEOF_CB_OBJECT_STRUCT . . . . . . 3-35

Chapter 4: OMF Functions

OMF Function Summary Tables . . . . . . . . 4-1
    OMF_AddChildTo . . . . . . . . . . . . 4-6

OMF_AnnounceNewData .......... 4-8
OMF_Assign ............... 4-9
OMF_ClearNewData .......... 4-10
OMF_Closing .............. 4-11
OMF_ConfigChange ........... 4-12
OMF_Copy ................ 4-13
OMF_CopyViewSpec .......... 4-15
OMF_DeSerialize ............ 4-16
OMF_EmptyOMFClipboard ....... 4-17
OMF_EnumChildren .......... 4-18
OMF_EnumChildrenOf ......... 4-19
OMF_EnumGlobalObjects ....... 4-20
OMF_EnumObjects ........... 4-21
OMF_EnumParents ........... 4-22
OMF_EnumParentsOf .......... 4-23
OMF_Export .............. 4-24
OMF_FreeDALObject .......... 4-25
OMF_FreeOMFObject .......... 4-26
OMF_FreeProperties .......... 4-27
OMF_FreeView ............. 4-28
OMF_GetChildCountOf ......... 4-29
OMF_GetDALObject ........... 4-30
OMF_GetDataIdText .......... 4-31
OMF_GetDataIdUsage ......... 4-32
OMF_GetDiskSize ............ 4-33
OMF_GetIcon .............. 4-34
OMF_GetMethod ............ 4-35
OMF_GetMethodList .......... 4-36
OMF_GetObjectState .......... 4-37
OMF_GetOMFDirectory ........ 4-38
OMF_GetOMFError .......... 4-39
OMF_GetOMFObject .......... 4-40
OMF_GetOMFVersion ......... 4-41
OMF_GetParentCountOf ........ 4-42
OMF_GetProperties .......... 4-43
OMF_GetSerialData .......... 4-44
OMF_GetSerialDataHandle ....... 4-45
OMF_GetSnapshot ........... 4-46
OMF_GetType ............. 4-47

OMF_GetView . . . . . . . . . . . . . . 4-48
OMF_GetViewMethod . . . . . . . . . . 4-49
OMF_GetViewMethodList . . . . . . . . . 4-50
OMF_ImportObject . . . . . . . . . . . . 4-51
OMF_Init . . . . . . . . . . . . . . . . 4-52
OMF_InitViewSpec . . . . . . . . . . . . 4-54
OMF_IsDescendant . . . . . . . . . . . . 4-56
OMF_MakeObjParam . . . . . . . . . . . 4-57
OMF_ObjectFlag . . . . . . . . . . . . . 4-58
OMF_Opening . . . . . . . . . . . . . . 4-60
OMF_PassWindowHandle . . . . . . . . . 4-61
OMF_PutOnOMFClipboard . . . . . . . . 4-62
OMF_PutSerialData . . . . . . . . . . . 4-63
OMF_PutViewOnOMFClipboard . . . . . . 4-64
OMF_ReadProperty . . . . . . . . . . . 4-65
OMF_ReadPropertyHandle . . . . . . . . 4-67
OMF_RemoveChildFrom . . . . . . . . . 4-68
OMF_RemoveFromOMFClipboard . . . . . 4-69
OMF_Send . . . . . . . . . . . . . . . 4-70
OMF_SendDALMsg . . . . . . . . . . . 4-71
OMF_SendViewMsg . . . . . . . . . . . 4-72
OMF_Serialize . . . . . . . . . . . . . . 4-73
OMF_SetDataIdText . . . . . . . . . . . 4-74
OMF_SetModified . . . . . . . . . . . . 4-75
OMF_SetNewData . . . . . . . . . . . . 4-76
OMF_SetSnapshotState . . . . . . . . . . 4-77
OMF_Shutdown . . . . . . . . . . . . . 4-78
OMF_Term . . . . . . . . . . . . . . . 4-79
OMF_TestNewData . . . . . . . . . . . . 4-80
OMF_WriteProperty . . . . . . . . . . . 4-81

Section 2  Messages

Chapter 5: API Messages

API Message Summary Tables . . . . . . . . . . 5-1
   API_INTERROGATE_MSG . . . . . . . . 5-2
   API_PLAYBACK_MSG . . . . . . . . . . 5-6
   API_SET_MODE_FLAGS_MSG . . . . . . 5-7

Chapter 6: OMF Messages

OMF Message Summary Tables . . . . . . . . . 6-1
- ADD_CHILD . . . . . . . . . . . . 6-6
- ADDED_PARENT . . . . . . . . . . 6-7
- CLASS_CHANGE . . . . . . . . . . 6-8
- CONFIG_CHANGE . . . . . . . . . 6-9
- CONTAINMENT_STATUS . . . . . . . 6-10
- CONVERT . . . . . . . . . . . . . 6-11
- COPY_EXTERNAL . . . . . . . . . . 6-13
- COPY_SELF . . . . . . . . . . . . 6-14
- CREATE_OMF . . . . . . . . . . . 6-16
- DATA_CHANGE . . . . . . . . . . . 6-18
- DATA_CHANGE_END . . . . . . . . . 6-19
- DATAID_CHANGE . . . . . . . . . . 6-20
- DESERIALIZE . . . . . . . . . . . 6-21
- DESTROY_EXTERNAL . . . . . . . . 6-22
- DESTROY_MODELESS . . . . . . . . 6-23
- DIE_PLEASE . . . . . . . . . . . . 6-24
- DISCARD_ICONS . . . . . . . . . . 6-25
- DISPLAY_VIEW . . . . . . . . . . . 6-26
- ENUM_OBJECT . . . . . . . . . . . 6-28
- GET_SIZE . . . . . . . . . . . . . 6-30
- HAS_METHOD . . . . . . . . . . . 6-32
- INIT_VIEW . . . . . . . . . . . . . 6-33
- LIB_COPY_SELF . . . . . . . . . . 6-35
- LIB_OBJ_INIT . . . . . . . . . . . 6-36
- LIB_OBJ_TERMINATE . . . . . . . . 6-37
- LIB_USER_INIT . . . . . . . . . . . 6-38
- LIB_USER_TERMINATE . . . . . . . 6-39
- LOSE_CHILD . . . . . . . . . . . . 6-40
- LOSE_DATAID . . . . . . . . . . . 6-41
- LOST_PARENT . . . . . . . . . . . 6-42
- MULTI_INSERT . . . . . . . . . . . 6-43
- OBJECT_CLOSING . . . . . . . . . 6-44
- OBJECT_OPENING . . . . . . . . . 6-45
- OMF_INSERT . . . . . . . . . . . . 6-46
- OMF_NEW_OBJECT . . . . . . . . . 6-48
- OPEN . . . . . . . . . . . . . . . 6-49
- PREPARE_PRINT . . . . . . . . . . 6-50

```
PRINT_ADD_TO_QUEUE  . . . . . . . .  6-51
PRINT_MASTER  . . . . . . . . . . .  6-53
PRINT_SLAVE  . . . . . . . . . . .  6-55
PROP_CHANGE . . . . . . . . . . . .  6-57
QUERY_SHUTDOWN  . . . . . . . . .  6-58
SERIALIZE  . . . . . . . . . . . . .  6-59
TERMINATE  . . . . . . . . . . . .  6-60
UPDATE_SNAPSHOT  . . . . . . . . .  6-61
WARM_START  . . . . . . . . . . .  6-62
WINDOW_TO_TOP  . . . . . . . . . .  6-63
```

Section 3    Other Information

Chapter 7: Object Properties
PROPERTY FORMATS . . . . . . . . . . . . . 7-1

Chapter 8: Installation
Installing New Wave Objects . . . . . . . . . 8-1
Installation File Commands . . . . . . . . . . 8-4
Example - Template Installation File . . . . . . 8-15
Installation Error Codes . . . . . . . . . . . 8-17

Section 4    Appendices

Appendix A: Other API Information

Appendix B: Building an HP NewWave Application
APPENDIX B-1 - Compiling and Linking
  Your Application . . . . . . . . . . . . . . B-1
APPENDIX B-2 - Internal Naming Rules . . . . B-2
APPENDIX B-3 - Making Help Files . . . . . . B-7
COMMAND OVERVIEW . . . . . . . . . . . B-15

Appendix C: System Services
CREATE A NEW DIALOG BOX PROTOCOL    C-1

Appendix D: Utilities
NewWave DOSCALL Utility . . . . . . . . . . D-1
OMF On-line Diagnostic Utility . . . . . . . . D-7
Performance Utility Programs . . . . . . . . . D-10

Appendix E: Error Codes

Appendix F: Localization Guidelines

Overview . . . . . . . . . . . . . . . . . F-1

Designing International Software . . . . . . . F-1

NewWave Localizability Check-List . . . . . . F-22

Country Dependent Information . . . . . . . F-25

ANSI Upshift Value Table . . . . . . . . . . F-27

Collating Sequences . . . . . . . . . . . . . F-29

Language Dependent Deviations . . . . . . . F-37

Appendix G: Serial File Format

Serial File Format . . . . . . . . . . . . . . G-1

Appendix H: Data Interchange Standards

Appendix I: Encapsulation: Integrating Existing Applications

Overview . . . . . . . . . . . . . . . . . . I-1

Creating the .IN$ File . . . . . . . . . . . . I-3

Special Integration Properties . . . . . . . . . I-5

Setting up the Object Properties Paragraph . . . I-8

The Menu File (.MNU) . . . . . . . . . . . . I-10

The .PIF File . . . . . . . . . . . . . . . . I-14

Keystroke Macro Language . . . . . . . . . . I-14

Keyword Definitions . . . . . . . . . . . . . I-16

1 Introduction

Purpose

This manual is intended for application developers writing software in the NewWave Environment as a reference. Those unfamiliar with the NewWave Environment should refer to "The HP NewWave Environment: Programmer Guide". Those wishing to see sample code showing how the NewWave Environment is implemented are referred to "The HP NewWave Environment: Program Design Examples".

Organization

The manual is organized as follows:

Chapter 1 - Introduction

SECTION 1 - FUNCTIONS

Chapter 2 - API Functions
Chapter 3 - Utility Functions
Chapter 4 - OMF Functions

SECTION 2 - MESSAGES

Chapter 5 - API Messages
Chapter 6 - OMF Messages

SECTION 3 - OTHER INFORMATION

Chapter 7 - Object Properties
Chapter 8 - Installation

SECTION 4 - APPENDICES

Appendix A - Other API Information
Appendix B - Building an HP NewWave Application
Appendix C - System Services
Appendix D - Utility Programs
Appendix E - Error Codes
Appendix F - Localization Guidelines
Appendix G - Serial File Format
Appendix H - Data Interchange Standards
Appendix I - Encapsulation: Integrating Existing Applications

INDEX

At the beginning of each chapter, you will find summary tables briefly describing the items within the chapter.

Each "function" chapter (Chapters 2 - 4) is in alphabetical order with the name of the function printed at the top of the page in large characters for ready identification. In the left margin, you will find some or all of the following topic headings, as appropriate:

- Specification
- Purpose
- Parameters
- Placement
- Return Value
- Special Notes
- Example In similar fashion, each "message" chapter (Chapters 5 and 6) is in alphabetical order with the name of the message in large letters at the top of the page. The pertinent topic headings in the left column for messages are:

- Purpose
- Parameters
- Return Value
- Special Notes

Chapter 7 describes the formats and types of object properties.

Chapter 8 provides information concerning the installation of NewWave applications, including installation command files, installation directories, deinstallation, conventions within the chapter, the commands, two examples of installation files, appropriate installation methods and keywords, and installation error codes.

Appendix A provides miscellaneous information about the Application Program Interface (API) not covered in other chapters. These include: type definitions, API modes, predefined Agent commands, API range coding, API menu control constants, and predefined API errors.

Appendix B provides information necessary for building applications, including "make" files, resources, etc.

Appendix C describes systems services, such as the "Create a New..." command and SPIN, the printing facility.

Appendix D describes utility programs for developing applications in the NewWave environment.

Appendix E is a listing of error codes and their associated ID numbers.

Appendix F describes items to be taken into consideration for localizing your application to a foreign country.

Appendix G shows how objects can be converted to serial format for transmission.

Appendix H lists suggested interchange standards for sharing objects between NewWave applications.

Appendix I describes how existing applications are intergrated into the NewWave Environment.

2 API Functions and Macros

API Function Summary Tables

The API Functions are classified into these categories in the summary tables that follow:

1. API Interface Functions and Macros
2. API Have Test Functions and Macros
3. API Mode Test Functions and Macros
4. Miscellaneous API Functions and Macros All API Functions described in this chapter are defined in the NWAPI.H file.

Table 2-1. API Interface Functions and Macros

| Function/Macro | Description |
| --- | --- |
| APICommandInterface | Used when a command has been generated in the main application or a modeless dialog box. Passes the external form of the command to the Agent. |
| APIDlgCommandInterface | Used when a command comes from a modal dialog box. It passes the external form of the command to be executed to the Agent. |
| APIDlgHelpInterface | Used to provide access to Help from a dialog box executed before APIReady is called. |
| APIDlgInit | Performs initialization when a modal dialog box is opened. It passes the dialog box information to the API environment. |
| APIDlgTerm | Used to terminate a modal dialog box session and API interaction. |
| APIDlgUserActionInterface | Passes a user action (derived from a dialog box) to the Agent, used by CBT and Help. |
| APIEnableMenuItem | Enables, disables or grays a menu item while still allowing Help to access that item. |
| APIError | Returns the error after an API function has been called. |
| APIErrorInterface | When an error is detected by the application, APIErrorInterface signals that an error occurred to the Agent. |

Table 2-1. API Interface Functions and Macros (cont.)

| Function/Macro | Description |
| --- | --- |
| APIInit | Initializes the API data structures and help. |
| APIInitMenu | Adds Task and/or Help menus to an application menu. |
| APIModelessDlgInit | Performs initialization when a modeless dialog box is opened. It passes the modeless dialog box information to the Agent. |
| APIModelessDlgTerm | Used to terminate modeless dialog box and API interaction. |
| APINotReady | Notifies the Agent that the application is not ready to receive messages from the API. |
| APIReady | Informs the Agent that the application is ready to receive API messages (such as set modes or playback). |
| APIRecordInterface | Passes the external form of a command to the Agent for recording. Called after the command has been executed. |
| APIReturnInterface | Tells the Agent that the command is complete and that the application is ready for the next command. |
| APITerm | Signals termination of the use of the API. |
| APIUserActionInterface | Responds to API Menu selections. Passes all messages to the API so that Help or CBT may act on them. |

Table 2-2. API Have Test Functions and Macros

| Function/Macro | Description |
| --- | --- |
| APIHaveButton | Tests if API button has been activated (e.g., Help button). |
| APIHaveCommand | Tests if the user's action(s) have formed a complete command. |
| APIHaveDialogCommand | Tests if the user's action(s) form a complete dialog box command. |
| APIHaveMenu | Tests if an API menu (Task, Help, etc.) has been selected. |
| APIHaveMessage | Determines if a message has been processed and nullified by the API. If not, then the message requires further processing by the application. |
| APIPlaybackMsg | Tests for a playback message. If true, the application should call the Translate To Internal Processor to generate an internal command. |

Table 2-3. API Mode Test Functions and Macros

| Function/Macro | Description |
|---|---|
| APIErrorOn | Signals the application that error capturing has been set by an "ON ERROR DO ..." statement within an Agent task. The error will be handled by the Agent task and does not require any further reporting by the application. |
| APIInterceptOn | Indicates that all messages should be intercepted and processed by APIUserActionInterface. |
| APIMonitorOn | Tests if the application is in CBT mode, in which case commands are passed to the API and may be nullified before they are passed on to the Command Processor. |
| APINoWindowOn | Tests whether application is to run without visible windows. |
| APIPlaybackOn | Tests if the application is in playback mode. |
| APIRecordOn | Tests if the application is in record mode. |

Table 2-4. Miscellaneous API Functions and Macros

| Function/Macro | Description |
|---|---|
| APIChangeCaption | Changes the caption displayed by services like Help. |
| APIGetAPIVersion | Returns the current API version. |
| APIMessageBox | Creates and displays a window containing an application-supplied message and caption, plus some combination of pre-defined icons and push buttons. Use as specified by the NewWave User Interface Rules. |
| APILoadAccelerators | Loads the API Accelerators to support the keyboard accelerators for the Tasks and Help menu items. |

APIChangeCaption

Specification   APIChangeCaption ( hAPI, caption, mode ) : nOK

```
APIHND      hAPI
LPSTR       caption
APIMODETYPE mode
int         nOK
```

Purpose   Changes the caption displayed by services like Help. The new caption remains in effect until the next APIChangeCaption change. Needed when the caption is to be changed after the call to APIInit.

Parameters   *hAPI* is the handle returned to the caller by APIInit.

*caption* refers to the caption to be used by API services like Help.

*mode* - Use API_NO_MODE. (Other modes will be provided later.)

Return Value  *nOK* is FALSE if some error occurred. APIError may be called to return the API error number.

Placement  Any time the caption used by Help needs to be other than that passed in APIInit, and before the user can select the help menu.

Example  `APIChangeCaption ( hAPI, (LPSTR) "New Caption", API_NO_MODE );`

APICommandInterface

Specification  APICommandInterface ( hAPI, applCmd, mode ) : nOK

| | |
|---|---|
| APIHND | hAPI |
| LPAPPLCMDSTRUCT | applCmd |
| APIMODETYPE | mode |
| int | nOK |

Purpose  When you are in Monitor Mode, you use APICommandInterface to pass the external form of the command to the Agent. This occurs after the Windows message has passed through the Action Processor, has become a command to be performed, and has been translated to the external format via Translate To External Processor.

The Agent now has a chance to see the command. It may be passed back unchanged or as a null command. CBT uses this feature to optionally cancel a command before it is executed.

Parameters  *hAPI* is the handle returned to the caller by APIInit.

*applCmd* is the external form of the command.

*mode* - Use API_NO_MODE. (Others modes will be provided later.)

Return Value  *nOK* is FALSE if some error occurred. APIError may be called to return the API error number.

Placement  After a command has been generated, Monitor mode has been checked for, and the command has been translated to its external form, prior to entering the Command Processor. Also used as part of the Modeless Dialog Box Command Interface Component.

Example  from Command Interface Component

```
if (APIMonitorOn(APIModeFlags)) {
    TranslateToExternalProcessor(&intCmd, &extCmd);
    APICommandInterface( hAPI,
                         (LPAPICMDSTRUCT)&extCmd,
                         API_NO_MODE );
    if (extCmd.wCmd == API_NO_CMD)
        intCmd.wCmd = API_NO_CMD;
}
```

APIDlgCommandInterface

Specification  APIDlgCommandInterface( hAPI, applCmd, mode ) : nOK

| APIHND | hAPI |
| LPLPAPPLCMDSTRUCT | applCmd |
| APIMODETYPE | mode |
| int | nOK |

Purpose  This function is analogous to APICommandInterface, but occurs after a command has been generated based on the contents of a modal dialog box. APIDlgCommandInterface is called to pass the external form of the command to the Agent when in Monitor Mode.

The Agent now has a chance to see the command. It may be passed back unchanged or returned as a null command. CBT uses this feature to optionally cancel a command before it is executed.

Parameters  *hAPI* is the handle returned to the caller by APIInit.

*applCmd* is the external form of the command.

*mode* - Use API_NO_MODE. (Other modes will be provided later.)

Return Value  *nOK* is FALSE if some error occurred. APIError may be called to return the API error number.

Placement  After a command has been generated in the application's modal dialog box procedure, after the Translate To External Processor if Monitor Mode is on.

Example  from Modal Dialog Box Command Interface

```
if (APIMonitorOn (APIModeFlags)) {
    TranslateToExternal(&intDlgCmd, &extDlgCmd);
    APIDlgCommandInterface ( hAPI, (LPAPICMDSTRUCT)&extDlgCmd,
                              API_NO_MODE );
    if (extDlgCmd.wCmd == API_NO_CMD)
        intDlgCmd.wCmd = API_NO_CMD;
}
```

APIDlgHelpInterface

Specification  APIDlgHelpInterface (hAPI, DlgID, hDlg, message, wParam, lParam, mode): nOK

| APIHND | hAPI |
| APIDIALOGIDTYPE | DialogID |
| HWND | hDlg |
| LPAPIUNSIGNED | message |
| WORD | wParam |
| LONG | lParam |
| APIMODETYPE | mode |
| int | nOK |

Purpose  Allows the help button to be intercepted in dialog boxes that are displayed before APIReady is called. This is used instead of APIDlgUserActionInterface.

Note that most applications will use APIDlgUserActionInterface instead of this procedure, as they will call APIReady before any dialog boxes are displayed.

Parameters   *hAPI* is the handle returned to the caller by APIInit.

*DlgID* is a unique number identifying the dialog box and is used by Help to reference the help text for the dialog box.

*hDlg* is the handle to the dialog box.

*message* is the number of the message.

*wParam* is additional message information (WORD).

*lParam* is additional message information (LONG).

*mode* - Use API_NO_MODE. (Other modes will be provided later.)

Return Value   *nOK* is FALSE if some error occurred. APIError may be called to return the API error number.

Placement   This function must be the first statement of the dialog box procedure that is called before APIReady.

Example
```
BOOL FAR PASCAL DialogProc( hDlg, message, wParam, lParam )
HWND      hDlg;
unsigned  message;
Word      wParam;
LONG      lParam;
{

APIDlgHelpInterface( hAPI, ID_OF_DBOX, hDlg, (LPAPIUNSIGNED)&message,
                     wParam, lParam, API_NO_MODE );
```

APIDlgInit

Specification   APIDlgInit( hAPI, DlgID, hDlg, mode ) : nOK

| | |
|---|---|
| APIHWND | hAPI |
| APIDIALOGIDTYPE | DlgID |
| HWND | hDlg |
| APIMODETYPE | mode |
| int | nOK |

Purpose   Performs initialization when a modal dialog box is opened. It passes the dialog box information to the Agent.

Parameters   *hAPI* is the handle returned to the caller by APIInit.

*DlgID* is a unique number identifying the dialog box and is used by Help to reference the help text for the dialog box.

*hDlg* is the handle to the dialog box.

*mode* - Use API_NO_MODE. (Other modes will be provided later.)

Return Value   *nOK* is FALSE if some error occurred. APIError may be called to return the API error number.

Placement   In the dialog box procedure as part of Modal Dialog Box Initialization Component.

Example from Modal Dialog Box Initialization Component

```
switch (message) { case WM_INITDIALOG:
    if ( APIPlaybackOn(APIModeFlags)
    ||   APIRecordOn(APIModeFlags)
    ||   APIMonitorOn(APIModeFlags) )
        APIDlgInit (hAPI, ABOUTBOX, hDlg, API_NO_MODE);
    break;
```

APIDlgTerm

| Specification | APIDlgTerm( hAPI, DlgID, hDlg, mode ) : nOK |
|---|---|

| APIHND | hAPI |
| APIDIALOGIDTYPE | DlgID |
| HWND | hDlg |
| APIMODETYPE | mode |
| int | nOK |

Purpose Used to terminate modal dialog box and API interaction.

Parameters *hAPI* is the handle returned to the caller by APIInit.

*DlgID* is a unique number identifying the dialog box and is used by Help to reference the help text for the dialog box.

*hDlg* is the handle to the dialog box.

*mode* - Use API_NO_MODE. (Other modes will be provided later.)

Return Value *nOK* is FALSE if some error occurred. APIError may be called to return the API error number.

Placement Must be called in Modal Dialog Box Termination Component after a command has passed through the Command Interface Component and before EndDialog is called.

Example from Modal Dialog Box Termination Component

```
if (APIHaveCommand(IntCmd.wCmd)) {
    if ( APIPlaybackOn(APIModeFlags)
    ||   APIRecordOn(APIModeFlags)
    ||   APIMonitorOn(APIModeFlags) )
        APIDlgTerm (hAPI, ABOUTBOX, hDlg, API_NO_MODE);
    EndDialog(hDlg,TRUE);
}
```

APIDlgUserActionInterface

| Specification | APIDlgUserActionInterface (hAPI, DlgID, hDlg, message, wParam, lParam, mode): nOK |
|---|---|

| APIHND | hAPI |
| APIDIALOGIDTYPE | DlgID |
| HWND | hDlg |
| unsigned | message |
| WORD | wParam |
| LONG | lParam |
| APIMODETYPE | mode |
| int | nOK |

Purpose This traps API controls within a modeless or modal dialog box, such as the Help button. In addition this will trap all messages while in Intercept mode.

Parameters *hAPI* is the handle returned to the caller by APIInit.

*DlgID* is a unique number identifying the dialog box and is used by Help to reference the help text for the dialog box.

*hDlg* is the handle to the dialog box.

*message* is the number of the message.

*wParam* is additional message information (WORD).

*lParam* is additional message information (LONG).

*mode* - Use API_NO_MODE. (Other modes will be provided later.)

Return Value *nOK* is FALSE if some error occurred. APIError may be called to return the API error number.

Placement This function is part of the Dialog Box Component, which must be the first statements of the dialog box procedure.

Special Notes The application must use the predefined identifiers for API controls, eg API_HELP_BUTTON.

Example from Modal or Modeless Dialog Box User Action Interface Component

```
if ( APIInterceptOn(APIModeflag) || APIHaveButton(message, wParam) )
    APIDlgUserActionInterface( hAPI, ID_OF_DBOX, hDlg,
                               (LPAPIUNSIGNED)&message,
                               wParam, lParam, API_NO_MODE );
```

APIEnableMenuItem

Specification APIEnableMenuItem (hAPI, hMenu, wIDEnableItem, wEnable, mode): nStatus

| APIHND | hAPI |
| HMENU | hMenu |
| WORD | wIDEnableItem |
| WORD | wEnable |
| APIMODETYPE | mode |
| int | nStatus |

Purpose Enables, disables or grays a menu item, and makes the menu item's state available to the API. This is used to allow Help to access disabled or grayed menu items.

Parameters *hAPI* is the handle returned to the caller by APIInit.

*hMenu* is the handle to the Menu.

*wIDEnableItem* is the unique ID of the menu item to be enabled.

*wEnable* is the Window's menu constant specifying the action to be taken. Note that only the MF_BY_COMMAND parameters are supported, not MF_BY_POSITION. The Windows constants are:

MF_DISABLED  - Disable a menu item
MF_ENABLED   - Enable a menu item
MF_GRAYED    - Gray a menu item.
*mode* - Use API_NO_MODE. (Other modes will be provided later.)

| | |
|---|---|
| Return Value | *nStatus* returns the previous state of the menu item. |
| Placement | APIEnableMenuItem should be called instead of the Windows function EnableMenuItem whenever a menu item is to be enabled, disabled, or grayed. |
| Special Notes | APIEnableMenuItem does not work for the system menu. The standard windows function EnableMenuItem should be used here, and items will not be enabled in Help mode. |
| Example | APIEnableMenuItem( hAPI, hMenu, EDIT_MENU, MF_GRAYED, API_NO_MODE ) |

APIError

| | |
|---|---|
| Specification | APIError( hAPI, mode ) : nError<br><br>APIHND      hAPI<br>APIMODETYPE  mode<br>int           nError |
| Purpose | For an application to get the API error number after an API function has failed. |
| Parameters | *hAPI* is the handle returned to the caller by APIInit.<br><br>*mode* - Use API_NO_MODE. (Other modes will be provided later.) |
| Return Value | *nError* is the API error number. |
| Placement | After a call to an API function when the type of error is to be checked. |
| Example | while handling CREATE_OMF message, terminate if a fatal error is detected:<br><br>```
if ( !APIInit( (LPAPIHND)&hAPI, hWnd, hInst, hOMF,
               (LPSTR)szAppHelpFile,
               (LPSTR)szObjTitle, API_NO_MODE ) ) {
    if ( APIError(hAPI, API_NO_MODE) >= API_START_FATAL_ERR )
        return(CO_ERROR);
    .
}
``` |

APIErrorInterface

| | |
|---|---|
| Specification | APIErrorInterface( hAPI, applErr, mode ) : nOK<br><br>APIHND      hAPI<br>APIERRTYPE   applErr<br>APIMODETYPE  mode<br>int           nOK |
| Purpose | This function is called by the application to signal to the Agent that an error has occurred. This should only be called during the execution of an Agent Task while in Error Mode.<br><br>This allows the Agent Task to handle errors using the "ON ERROR DO" statement, without the display of the application's error message box. |

| | |
|---|---|
| Parameters | *hAPI* is the handle returned to the caller by APIInit. |
| | *applErr* is the application's error number. |
| | *mode* - Use API_NO_MODE. (Other modes will be provided later.) |
| Return Value | *nOK* is FALSE if some error occurred. APIError may be called to return the API error number. |
| Placement | When an error is detected that is to be reported to the user and the application is in Error Mode. |
| Special Notes | The error number passed to APIErrorInterface should be the same number as the application would display in its error dialog box or message. |
| | If APIErrorInterface is called then applErr should not be set. |
| | If an error is detected in the Translate To Internal Processor, APIReturnInterface should be called. |
| Example | from the Error Dialog Box Component, called when an error has been detected by the application: |

```
if ( APIErrorOn(APIModeFlags) )
    APIErrorInterface (hAPI, error, API_NO_MODE);
else {
    APIMessageBox( hAPI, wHelpNo, hWnd, (LPSTR)szMsg,
                   (LPSTR)szCaption, MB_OK | MB_ICONEXCLAMATION );
    applErr = error;  /* Set error number for APIReturnInterface */
}
```

Error detected in Translate To Internal Processor

```
applErr = API_COMMAND_ERR;
applCmd.cmd = API_NO_CMD;
APIReturnInterface( hAPI, applErr, API_NO_MODE );
```

APIErrorOn

| | |
|---|---|
| Specification | APIErrorOn( APIModeFlags ) |
| | APIMODEFLAGSTYPE     APIModeFlags |
| Purpose | To test if the Agent Task includes an "ON ERROR DO ..." statement, which implies that the Task is to be notified about the error as opposed to having the application display an error message box. |
| Parameters | *APIModeFlags* are the application's API mode flags, as set by the API_SET_MODE_FLAGS_MSG. |
| Placement | See APIErrorInterface. |
| Special Notes | This is defined as a macro: |

```
#define APIErrorOn( APIModeFlags ) \
    ((APIModeFlags) & (API_ERROR_MODE_ON_FLAG))
```

Example from the Error Dialog Box Component, called when an error has been detected by the application:

```
if ( APIErrorOn(APIModeFlags) )
    APIErrorInterface (hAPI, error, API_NO_MODE);
else {
    APIMessageBox( hAPI, wHelpNo, hWnd, (LPSTR)szMsg,
                   (LPSTR)szCaption, MB_OK | MB_ICONEXCLAMATION );
    applErr = error;  /* Set error number for APIReturnInterface */
}
```

Error detected in Translate To Internal Processor

```
applErr = API_COMMAND_ERR;
applCmd.cmd = API_NO_CMD;
APIReturnInterface( hAPI, applErr, API_NO_MODE );
```

APIGetAPIVersion

Specification APIGetAPIVersion ( hAPI, APIVersion ) : nOK

| APIHND | hAPI |
| LPSTR | APIVersion |
| int | nOK |

Purpose Returns the HP part number and version of the API.

Parameters The string returned *APIVersion* may be up to 32 bytes in size (including the null) and will be of the form:

dddd-dddd  v.uu.ff where "dddd-dddd" is the part number and "v.uu.ff" is the version number, update number, and fix number.

Return Value *nOK* is FALSE if some error occurred. APIError may be called to return the API error number.

Placement Used by the NewWave Office.

APIHaveButton

Specification APIHaveButton ( message, wParam ) : bStatus

| unsigned | message |
| WORD | wParam |
| BOOL | bStatus |

Purpose To test if an API button (Help) has been selected in a modal or modeless dialog box.

Parameters *message* is the number of the message.

*wParam* is additional message information (WORD).

Return Value *bStatus* is TRUE if APIDlgUserActionInterface should be called.

Placement Used as part of the Modal and Modeless Dialog Box User Action Interface Components to determine if APIDlgUserActionInterface is to be called.

| | |
|---|---|
| Special Notes | To use this macro, the application must use the predefined identifiers for the API buttons, eg API_HELP_BUTTON.<br><br>This is defined as a macro:<br><br>```
#define APIHaveButton( message, wParam ) \
    ( ((message) == (WM_COMMAND))
    && ((wParam) >= (API_START_BUTTON_RANGE)) )
``` |
| Example | from Modal or Modeless Dialog Box User Action Interface Component<br><br>```
if ( APIInterceptOn(APIModeFlags) || APIHaveButton(message, wParam) )
    APIDlgUserActionInterface( hAPI, ID_OF_BOX, hDlg,
                               (LPAPIUNSIGNED)&message,
                               wParam, lParam, API_NO_MODE );
``` |

APIHaveCommand

| | |
|---|---|
| Specification | APIHaveCommand ( cmd ) : bStatus<br><br>WORD      cmd<br>BOOL      bStatus |
| Purpose | To test whether a valid command has been formed after either the Action Processor, the Modeless Dialog Box Action Processor, or the Modal Dialog Box Processor. |
| Parameters | *cmd* is the command number. |
| Return Value | *bStatus* is TRUE if cmd is a valid command. |
| Placement | APIHaveCommand may be used before the Command Interface Component and before calling the Command Processor. |
| Special Notes | This is defined as a macro:<br><br>```
#define APIHaveCommand( cmd ) \
    ((cmd) > (API_NO_CMD))
```<br><br>To use APIHaveCommand, it is required that you use the command ranges in NWAPI.H. |
| Example | from Command Interface Component<br><br>```
if (APIHaveCommand( intCmd.cmd ))
    CommandProcessor( hWnd, message, wParam, lParam,
                      &intCmd, &applRtn, &applErr );
``` |

APIHaveDialogCommand

| | |
|---|---|
| Specification | APIHaveDialogCommand( cmd ) : bStatus<br><br>WORD      cmd<br>BOOL      bStatus |
| Purpose | To test whether a valid modal dialog command (i.e., a command to bring up a modal dialog box) has been formed. If a dialog command has been formed, then the next step is to call the Dialog Box Processor. |
| Parameters | *cmd* is the command number. |
| Return Value | *bStatus* is TRUE if cmd is a valid dialog command. |

| | |
|---|---|
| Placement | APIHaveDialogCommand may be tested before calling the Dialog Box Processor. |
| Special Notes | This is defined as a macro:<br>```#define APIHaveDialogCommand( applcmd ) \<br>    ((applcmd) > (API_START_DIALOG_CDCMD))```<br>To use APIHaveDialog Command, it is required that you use the command ranges in NWAPI.H. |
| Example | from Modal Dialog Test Component<br>```if (APIHaveDialogCommand( intCmd.wCmd ))<br>    DialogBoxProcessor(hWnd, &intCmd );``` |

APIHaveMenu

| | |
|---|---|
| Specification | APIHaveMenu ( message, wParam ) : bStatus<br>```unsigned       message<br>WORD           wParam<br>BOOL           bStatus``` |
| Purpose | To test if an API menu (Task, Help, etc.) has been selected. |
| Parameters | *message* is the number of the message.<br>*wParam* is additional message information (WORD). |
| Return Value | *bStatus* is TRUE if an API menu has been selected. |
| Placement | Used as part of the User Action Interface Component to determine if APIUserActionInterface is to be called. |
| Special Notes | This is defined as a macro:<br>```#define APIHaveMenu( message, wParam ) \<br>    (  ((message) == (WM_COMMAND))<br>    && ((wParam) >= (API_START_MENU_RANGE)) )``` |
| Example | from User Action Interface Component<br>```if ( APIInterceptOn(APIModeFlags) || APIHaveMenu(message, wParam) )<br>    APIUserActionInterface( hAPI, hWnd, (LPAPIUNSIGNED)&message,<br>                            wParam, lParam, API_NO_MODE );``` |

APIHaveMessage

| | |
|---|---|
| Specification | APIHaveMessage ( message ) : bStatus<br>```unsigned       message<br>BOOL           bStatus``` |
| Purpose | To determine if there is a message to be processed. If the API has already processed the message this will return FALSE. |
| Parameters | *message* is the number of the message. |
| Return Value | *bStatus* is TRUE if there is a message to be processed. |

| | |
|---|---|
| Placement | It may be used directly after the User Action Interface Component to determine if there is still a message to be processed. |
| Special Notes | This is defined as a macro:<br>```
#define APIHaveMessage( message ) \
    ((message) > (0))
```<br>Note that the API indicates that the message has been processed by setting the message parameter to 0. |
| Example | from User Action Interface Component<br>```
if ( APIInterceptOn(APIModeFlags) || APIHaveMenu(message, wParam) )
    APIUserActionInterface( hAPI, hWnd, (LPAPIUNSIGNED)&message,
                            wParam, lParam, API_NO_MODE );

if ( APIHaveMessage(message) ) {
    /* Process the message */
``` |

APIInit

| | | |
|---|---|---|
| Specification | APIInit (lphAPI, hWnd, hInst, hOMF, lpHelpFile, lpHelpTitle, mode): nOK | |
| | LPAPIHND | lphAPI |
| | HWND | hWnd |
| | HANDLE | hInst |
| | OMFHND | hOMF |
| | LPSTR | lpHelpFile |
| | LPSTR | lpHelpTitle |
| | APIMODETYPE | mode |
| | int | nOK |
| Purpose | To initialize interaction with the API. APIInit registers hWnd with the API, connects with the help file, and sets up the help title. The complementary function, APITerm, terminates interaction with the API. | |
| Parameters | *lphAPI* is a pointer to the API handle which is to be set up by this call.<br><br>*hWnd* is the handle to the window.<br><br>*hInst* is the Windows instance handle of the calling application.<br><br>*hOMF* is the handle that was returned to the caller by OMF_NO_Init.<br><br>*lpHelpFile* points to a string that contains the Help System file name for this object.<br><br>*lpHelpTitle* points to the string that is the title caption that should appear in the caption bar of the Help window when help is active. For data objects this should be the class Text ID; for system objects it should be the actual title.<br><br>*mode* - Use API_NO_MODE. (Other modes will be provided later.) | |
| Return Value | *nOK* is FALSE if some error occurred. APIError may be called to return the API error number. | |
| Placement | This function is called during OMF message processing, in response to the incoming OMF message CREATE_OMF. | |
| Special Notes | Should always be called as a pair with APITerm. Calls to the API functions are not valid before APIInit is called, although the Mode Testing Macros may be used and will return FALSE. | |

If there is no help available, lpHelpFile and lpHelpTitle should be set to null strings. If the caption is changed after the call to APIInit, APIChangeCaption should be called.

Example from the API Initialization Component. This is called from the Action Processor handling a WM_OMF message of type CREATE_OMF:

```
if ( !APIInit( (LPAPIHND)&hAPI, hWnd, hInst, hOMF,
               (LPSTR)szAppHelpFile,
               (LPSTR)szObjTitle, API_NO_MODE ) ) {
    if ( APIError(hAPI, API_NO_MODE) >= API_START_FATAL_ERR )
        return(CO_ERROR);
}
```

APIInitMenu

Specification APIInitMenu ( hAPI, hMenu, wMenus, mode ) : nOK

| APIHND | hAPI |
| HANDLE | hMenu |
| WORD | wMenus |
| APIMODETYPE | mode |
| int | nOK |

Purpose APIInitMenu adds the Task and Help menus to the application's window menu at the end of the menu bar.

Parameters *hAPI* is the handle returned to the caller by APIInit.

*hMenu* is the handle to the menu.

*wMenus* indicates the desired menus to present by means of the API_TASK_MENU and/or API_HELP_MENU constants combined with the bitwise OR operator.

*mode* - Use API_NO_MODE. (Other modes will be provided later.)

Return Value *nOK* is FALSE if some error occurred. APIError may be called to return the API error number.

Placement Directly after the APIInit call and/or when new menus are created.

Special Notes Should be called only once for each window that requires API menus.

Example from the API Initialization component. Called from the Action Processor handling a WM_OMF message of type case CREATE_OMF:

```
if ( !APIInit( (LPAPIHND)&hAPI, hWnd, hInst, hOMF,
               (LPSTR)szAppHelpFile,
               (LPSTR)szObjTitle, API_NO_MODE ) ) {
    if ( APIError(hAPI, API_NO_MODE) >= API_START_API_FATAL_ERR )
        return(CO_ERROR);
}
if ( !APIInitMenu( hAPI, GetMenu(hWnd),
                   API_TASK_MENU | API_HELP_MENU, API_NO_MODE ) ) {
    if ( APIError(hAPI, API_NO_MODE) >= API_START_API_FATAL_ERR ) {
        APITerm(hAPI, hWnd, hInst, hOMF, API_NO_MODE);
        return(CO_ERROR);
    }
}
```

APIInterceptOn

| | |
|---|---|
| Specification | APIInterceptOn( APIModeFlags ) : bStatus |
| | APIMODEFLAGSTYPE   APIModeFlags |
| | BOOL   bStatus |
| Purpose | Tests if API is in Intercept Mode, in which case all messages are to be passed to the API. This mode is used by CBT. |
| Parameters | *APIModeFlags* are the application's API mode flags, as set by the API_SET_MODE_FLAGS_MSG. |
| Return Value | *bStatus* is TRUE if the caller is in Intercept Mode. |
| Placement | Part of the User Action Interface Component, before calling APIUserActionInterface or APIDlgUserActionInterface. |
| Special Notes | This is defined as a macro: |
| | ```#define APIInterceptOn( APIModeFlags ) \
       ((APIModeFlags) & (API_INTERCEPT_MODE_ON_FLAG))``` |
| Example | from User Action Interface Component |
| | ```if ( APIInterceptOn(APIModeFlags) || APIHaveMenu(message, wParam) )
    APIUserActionInterface( hAPI, hWnd, (LPAPIUNSIGNED)&message,
                            wParam, lParam, API_NO_MODE );``` |
| | from Modal or Modeless Dialog Box User Action Interface Component |
| | ```if ( APIInterceptOn(APIModeFlags) || APIHaveButton(message, wParam) )
    APIDlgUserActionInterface( hAPI, DlgID, hDlg,
                               (LPAPIUNSIGNED) &message,
                               wParam, lParam, API_NO_MODE);``` |

APILoadAccelerators

| | |
|---|---|
| Specification | APILoadAccelerators ( ) : hAccelTable |
| Purpose | Loads the API Accelerators to permit keyboard acceleration of some items in the Help and Task menus. |
| Return Value | *hAccelTable* is a handle to the API accelerator table to be passed to TranslateAccelerator. Returns NULL if an error occurred. |
| Placement | Where accelerators are to be loaded within application, usually during the WinMain initialization. The accelerator table is used by TranslateAccelerator in the GetMessage loop of WinMain. |

Example from WinMain of application

```
hAccelTable = LoadAccelerators ( hInstance, (LPSTR) "ApplAccel" );
if (hAccelTable == NULL)
    exit(1);

APIAccelTable = APILoadAccelerators ( );
if (APIAccelTable == NULL)
    exit(1);

while ( GetMessage ((LPMSG)&msg, NULL, 0, 0)) {
    if ( !TranslateAccelerator(hWnd, hAccelTable, (LPMSG)&msg)
    && !TranslateAccelerator(hWnd, APIAccelTable, (LPMSG)&msg) ) {
        TranslateMessage ((LPMSG)&msg);
        DispatchMessage ((LPMSG)&msg);
        }
    }
```

APIMessageBox

Specification APIMessageBox ( hAPI, wHelpID, hWndParent, lpText, lpCaption, wType, mode): nMenuItem

| | |
|---|---|
| APIHND | hAPI |
| unsigned | wHelpID |
| HANDLE | hWndParent |
| LPSTR | lpText |
| LPSTR | lpCaption |
| unsigned | wType |
| APIMODETYPE | mode |
| int | nMenuItem |

Purpose This function creates and displays a window that contains an application-supplied message and caption plus any combination of the pre-defined icons and push buttons described below.

Parameters *hAPI* is the handle returned to the caller by APIInit.

*wHelpID* is an unsigned short integer specifying the help context ID for the Message Box. This value is sent to the NewWave Help Facility when the Help push button is pressed. If this value is non- zero, a help button will be provided in addition to any button selection described below.

*hWndParent* is the handle to the window that owns the message box. The input focus is set to this window when APIMessageBox returns.

*lpText* is a long pointer to the message to be displayed. The string must be a null terminated ANSI string. Newline characters embedded in the text will cause subsequent text to be printed left justified on a new line. Maximum length is 512 bytes.

*lpCaption* is a long pointer to the character string to be used for the dialog box caption. The string must be null terminated. If lpCaption is NULL, then the default caption "Error!" is used. Maximum length is 80 bytes.

*wType* is an unsigned short integer value specifying the contents of the dialog box. It can be a combination of the values in the table below, joined with with the bitwise OR operator. Only one item may be selected for each group: pushbuttons, an icon, a default push button, and either application or system modal.

*mode* - Use API_NO_MODE. (Other modes will be provided later.)

APIMessageBox

Table 2-5. wType Values

| Values | Meaning |
|---|---|
| MB_OK | Message box contains an OK push button. |
| MB_OKCANCEL | Message box contains OK and Cancel push buttons. |
| MB_RETRYCANCEL | Message box contains Retry and Cancel push buttons. |
| MB_ABORTRETRYIGNORE | Message box contains three push buttons: Abort, Retry, and Ignore. |
| MB_YESNO | Message box contains two push buttons: Yes and No. |
| MB_YESNOCANCEL | Message box contains three push buttons: Yes, No, and Cancel. |
| MB_ICONQUESTION | A question mark icon appears in the message box. |
| MB_ICONHAND | A hand icon appears in the message box. |
| MB_ICONEXCLAMATION | An exclamation point icon appears in the message box. |
| MB_ICONASTERISK | An asterisk icon appears in the message box. |
| MB_DEFBUTTON | First button is the default (the first button is always the default unless MB_DEFBUTTON2 or MB_DEFBUTTON3 is specified. |
| MB_DEFBUTTON2 | Second button is the default. |
| MB_DEFBUTTON3 | Third button is the default. |
| MB_APPLMODAL | The user must respond to the message box before continuing work in the window given by hWndParent. However, the user can move to the windows of other applications and work in those windows. (MB_APPLMODAL is the default.) |
| MB_SYSTEMMODAL | All applications are suspended until the user responds to the message box. System modal message boxes are used to notify the user of serious, potentially damaging errors that require immediate attention. The box is automatically made system modal if the current window procedure is processing a message received via the SendMessage function. |

APIMessageBox

Return Value  *nMenuItem* is one of the following returned values:

> IDOK
> IDCANCEL *
> IDABORT
> IDRETRY
> IDIGNORE
> IDYES
> IDNO

> \* Note that if a message box has a Cancel button, the IDCANCEL value will be returned if either Escape or Cancel is pressed. If the message box has no Cancel button, pressing Escape has no effect.

Placement  This function should be used instead of the Window's MessageBox function whenever a NewWave message box is needed.

Special Notes  This function should not be used to indicate a low memory situation - accessing the resources required for this function may fail under low memory conditions.

When the keyboard interface is used to enumerate windows, the message box and its parent are considered to be next to each other.

If a message box is created while a dialog box is present, use the handle of the dialog box as the hWndParent parameter.

No error checking is done on the length of lpText and lpCaption.

Example
```
APIMessageBox ( hAPI, hOMF, hWnd,
                (LPSTR)"Message text",
                (LPSTR)"Caption",
                MB_OK | MB_ICONEXCLAMATION,
                API_NO_MODE );
```

APIModelessDlgInit

Specification  APIModelessDlgInit( hAPI, DlgID, hDlg, mode ) : nOK

| APIHND | hAPI |
| APIDIALOGIDTYPE | DlgID |
| HWND | hDlg |
| APIMODETYPE | mode |
| int | nOK |

Purpose  Performs initialization when a modeless dialog box is opened, to prepare the Agent for handling the modeless dialog box.

Parameters  *hAPI* is the handle returned to the caller by APIInit.

*DlgID* is the unique ID of the dialog box.

*hDlg* is the handle to the modeless dialog box.

*mode* - Use API_NO_MODE. (Other modes will be provided later.)

Return Value *nOK* is FALSE if some error occurred. APIError may be called to return the API error number.

Placement In the Modeless Dialog Action Processor while handling the dialog message WM_INITDIALOG.

Example from the Modeless Dialog Box Initialization Component

```
switch (message) ( case WM_INITDIALOG:
    if ( APIPlaybackOn(APIModeFlags)
    ||  APIRecordOn(APIModeFlags)
    ||  APIMonitorOn(APIModeFlags) )
        APIModelessDlgInit(hAPI, DLG_MODELESS, hDlg, API_NO_MODE);
    break;
```

APIModelessDlgTerm

Specification APIModelessDlgTerm( hAPI, DlgID, hWnd, mode ) : nOK

| APIHND | hAPI |
|---|---|
| APIDIALOGIDTYPE | DlgID |
| HWND | hWnd |
| APIMODETYPE | mode |
| int | nOK |

Purpose Used to terminate modeless dialog box and API interaction.

Parameters *hAPI* is the handle returned to the caller by APIInit.

*DlgID* is the unique ID of the dialog box.

*hDlg* is the handle to the dialog box.

*mode* - Use API_NO_MODE. (Other modes will be provided later.)

Return Value *nOK* is FALSE if some error occurred. APIError may be called to return the API error number.

Placement In the Modeless Dialog Action Processor while handling the dialog message WM_DESTROY.

Example from the Modeless Dialog Box Termination Component

```
switch (message) ( case WM_DESTROY:
    if ( APIPlaybackOn(APIModeFlags)
    ||  APIRecordOn(APIModeFlags)
    ||  APIMonitorOn(APIModeFlags) )
        APIModelessDlgTerm(hAPI, DLG_MODELESS, hDlg, API_NO_MODE);
    break;
```

APIMonitorOn

| | |
|---|---|
| Specification | APIMonitorOn( APIModeFlags ) : bStatus |
| | APIMODEFLAGSTYPE  APIModeFlags |
| | BOOL             bStatus |
| Purpose | Returns TRUE when application is in Monitor Mode, used for CBT. In Monitor Mode, the application must pass the external form of the command to the API before calling the Command Processor. This gives CBT the opportunity of cancelling the command before it has been executed. |
| Parameters | *APIModeFlags* are the application's API mode flags, as set by the API_SET_MODE_FLAGS_MSG. |
| Return Value | *bStatus* is TRUE if the caller is in Monitor Mode. |
| Placement | APIMonitorOn is used in the Command Interface Component and in the Modal and Modeless Dialog Box Command Interface Components. |
| Special Notes | This is defined as a macro: |

```
#define APIMonitorOn( APIModeFlags ) \
        ((APIModeFlags) & (API_MONITOR_MODE_ON_FLAG))
```

| | |
|---|---|
| Example | from Command Interface Component |

```
if (APIMonitorOn(APIModeFlags)) {
    TranslateToExternal Processor(&intCmd, &extCmd);
    APICommandInterface( hAPI,
                         (LPAPICMDSTRUCT)&extCmd,
                         API_NO_MODE );
    if (extCmd.wCmd == API_NO_CMD)
        intCmd.wCmd = API_NO_CMD;
}
```

APINotReady

| | |
|---|---|
| Specification | APINotReady ( hAPI, mode ) : nOK |
| | APIHND       hAPI |
| | APIMODETYPE  mode |
| | int          nOK |
| Purpose | Notifies the Agent that the application is no longer ready, so that the Agent will no longer send messages to the application. This is paired with APIReady. |
| Parameters | *hAPI* is the handle returned to the caller by APIInit. |
| | *mode* - Use API_NO_MODE. (Other modes will be provided later.) |
| Return Value | *nOK* is FALSE if some error occurred. APIError may be called to return the API error number. |
| Placement | As a result of a close message WM_CLOSE, the command processor will process an API_CLOSE_WINDOW_CDCMD command. APINotReady must be called before OMF_Closing. |

Example from the API Not Ready Component

```
case API_CLOSE_WINDOW_CDCMD:

if (APIPlaybackOn(APIModeFlags) || APIRecordOn(APIModeFlags)) {
        if (APIRecordOn(APIModeFlags)) {
            TranslateToExternalProcessor(intCmd, extCmd);
            APIRecordInterface(hAPI, extCmd, API_NO_MODE);
        }
        APIReturnInterface(hAPI, applErr, API_NO_MODE);
    }

APINotReady ( hAPI, API_NO_MODE );
    OMF_Closing ( hOMF, NULL );
```

APINoWindowOn

Specification APINoWindowOn ( APIModeFlags ) : bStatus

APIMODEFLAGSTYPE  mode
    BOOL  bStatus

Purpose Tests if application is in No Window Mode. If TRUE, application should run without displaying a window, if possible.

Parameters *APIModeFlags* are the application's API mode flags, as set by the API_SET_MODE_FLAGS_MSG.

Return Value *bStatus* is TRUE if the caller is in No Window Mode.

Placement After APIReady and before the application opens windows, or the test can be made repeatedly throughout the application.

Special Notes Running without windows is set for all applications prior to performing an Agent Task.

This is implemented as a macro:

```
#define APINoWindowOn( APIModeFlags )\
    ((APIModeFlags) & (API_NO_WINDOW_MODE_ON_FLAG))
```

Example
```
if (APINoWindowOn( APIModeFlags ))
    DisableWindowOpening;
```

APIPlaybackMsg

Specification APIPlaybackMsg (message) : bStatus unsigned  message
    BOOL  bStatus

Purpose APIPlaybackMsg tests for a playback message.

Parameters *message* is the message number.

Return Value *bStatus* is TRUE if the message is a playback message.

Placement It is used in the window procedure after the User Action Interface Component to determine whether to translate a playback message into internal format or to call the Action Processor to handle the message.

Special Notes This is implemented as a macro:

```
#define APIPlaybackMsg( message )\
    ((message) == (API_PLAYBACK_MSG))
```

Example from the window procedure after the User Action Interface Component

```
if (APIHaveMessage(message)) {
    if ( APIPlaybackMsg( message ))
        TranslateToInternal( message, wParam, lParam, &intCmd );
    else
        ActionProcessor( hWnd, message, wParam, lParam,
                         &intCmd, &applRtn, &applErr );
```

APIPlaybackOn

Specification APIPlaybackOn ( APIModeFlags ) : bStatus

```
APIMODEFLAGSTYPE   APIModeFlags
BOOL               bStatus
```

Purpose To test if the application is in Playback Mode. If TRUE the application must call the APIReturnInterface when the command has been processed.

Parameters *APIModeFlags* are the application's API mode flags, as set by the API_SET_MODE_FLAGS_MSG.

Return Value *bStatus* is TRUE if the caller is in Playback Mode.

Placement As part of the Return Interface Component in the window procedure.

Special Notes This is implemented as a macro:

```
#define APIPlaybackOn( APIModeFlags )\
    ((APIModeFlags) & (API_PLAYBACK_MODE_ON_FLAG))
```

Example from Return Interface Component

```
if ( APIPlaybackOn(APIModeFlags) || APIRecordOn(APIModeFlags) ) {
    if ( APIRecordOn(APIModeFlags) ) {
        TranslateToExternal( &intCmd, &extCmd );
        APIRecordInterface ( hAPI, (LPAPICMDSTRUCT)&extCmd,
                             API_NO_MODE );
    }
    APIReturnInterface( hAPI, applerr, API_NO_MODE );
}
```

APIReady

Specification APIReady( hAPI, mode ) : nOK

```
APIHND       hAPI
APIMODETYPE  mode
int          nOK
```

Purpose To inform the API that the application is ready to receive API messages. This will cause the API to set up the application's API Mode Flags. The Agent will start sending playback messages after this call if it is executing a task or if the object has an Autostart Task.

| | |
|---|---|
| Parameters | *hAPI* is the handle returned to the caller by APIInit. |
| | *mode* - Use API_NO_MODE. (Other modes will be provided later.) |
| Return Value | *nOK* is FALSE if some error occurred. APIError may be called to return the API error number. |
| Placement | The last call after all application initialization during OPEN message processing. It may be called before opening any windows if No Window Mode is to be supported. |
| Special Notes | APIReady is paired with APINotReady. Call APIReady before opening any windows to allow your APIModeFlags to be set. This will allow testing for No Window Mode. |
| Example | from API Ready Component: |

```
case OPEN:
    if ( !OMF_Opening(hOMF, NULL) )
        NoteOMFError(hOMF);

APIReady(hAPI, API_NO_MODE);
```

APIRecordInterface

| | |
|---|---|
| Specification | APIRecordInterface( hAPI, applCmd, mode ) : nOK |

| | |
|---|---|
| APIHND | hAPI |
| LPLPAPPLCMDSTRUCT | applCmd |
| APIMODETYPE | mode |
| int | nOK |

| | |
|---|---|
| Purpose | APIRecordInterface is used to record a command after it has been performed. |
| Parameters | *hAPI* is the handle returned to the caller by APIInit. |
| | *applCmd* is the external form of the command. |
| | *mode* - Use API_NO_MODE. (Other modes will be provided later.) |
| Return Value | *nOK* is FALSE if some error occurred. APIError may be called to return the API error number. |
| Placement | APIRecordInterface is part of the Return Interface Component, called after a command has been processed. This component is also called when a close window command is received, before calling APINotReady. |
| Example | from Return Interface Component |

```
if (APIPlaybackOn(APIModeFlags) || APIRecordOn(APIModeFlags)) {
    if (APIRecordOn(APIModeFlags)) {
        TranslateToExternalProcessor(intCmd, extCmd);
        APIRecordInterface(hAPI, extCmd, API_NO_MODE);
    }
    APIReturnInterface(hAPI, applErr, API_NO_MODE);
}
```

APIRecordOn

Specification  APIRecordOn( APIModeFlags ) : bStatus

```
APIMODEFLAGSTYPE    APIModeFlags
BOOL                bStatus
```

Purpose  To test if Record Mode is on. If TRUE, the Agent is recording commands and it is thus necessary to translate a command to external format.

Parameters  *APIModeFlags* are the application's API mode flags, as set by the API_SET_MODE_FLAGS_MSG.

Return Value  *bStatus* is TRUE if the caller is in Record Mode.

Placement  Used in the Return Interface Component, which is placed after the Command Processor.

Special Notes  This is implemented as a macro:

```
#define APIRecordOn( APIModeFlags )\
    ((APIModeFlags) & (API_RECORD_MODE_ON_FLAG))
```

Example  from Return Interface Component

```
if (APIPlaybackOn(APIModeFlags) || APIRecordOn(APIModeFlags)) {
    if (APIRecordOn(APIModeFlags)) {
        TranslateToExternalProcessor(intCmd, extCmd);
        APIRecordInterface(hAPI, extCmd, API_NO_MODE);
    }
    APIReturnInterface(hAPI, applErr, API_NO_MODE);
}
```

APIReturnInterface

Specification  APIReturnInterface( hAPI, applErr, mode ) : nOK

```
APIHND       hAPI
APIERRTYPE   applErr
APIMODETYPE  mode
int          nOK
```

Purpose  Tells the Agent that the command is complete and that the application is ready for the next command.

Parameters  *hAPI* is the handle returned to the caller by APIInit.

*applErr* is the application's error code if there has been an error. This is not set if in Error Mode, as the error will already have been reported via APIErrorInterface.

*mode* - Use API_NO_MODE. (Other modes will be provided later.)

Return Value  *nOK* is FALSE if some error occurred. APIError may be called to return the API error number.

Placement  Used in the Return Interface Component, which is placed after the Command Processor.

Example from Return Interface Component

```
if (APIPlaybackOn(APIModeFlags) || APIRecordOn(APIModeFlags)) {
    if (APIRecordOn(APIModeFlags)) {
        TranslateToExternalProcessor(intCmd, extCmd);
        APIRecordInterface(hAPI, extCmd, API_NO_MODE);
        }
    APIReturnInterface(hAPI, applErr, API_NO_MODE);
    }
```

APITerm

| | |
|---|---|
| Specification | APITerm( hAPI, hWnd, hInst, hOMF, mode ) : nOK |
| | APIHND hAPI |
| | HWND hWnd |
| | HANDLE hInst |
| | OMFHND hOMF |
| | APIMODETYPE mode |
| | int nOK |
| Purpose | Signals termination of the use of the API. |
| Parameters | *hAPI* is the handle returned to the caller by APIInit. |
| | *hWnd* is the handle to the window. |
| | *hInst* is the Windows instance handle of the calling application. |
| | *hOMF* is the handle that was returned to the caller by OMF_Init. |
| | *mode* - Use API_NO_MODE. (Other modes will be provided later.) |
| Return Value | *nOK* is FALSE if some error occurred. |
| Placement | This function is called within TERMINATE processing before OMF_Term is called. |
| Special Notes | Should always be called as a pair with APIInit. After this call has been made, no further calls to the API can be made. |
| Example | from case TERMINATE while handling a message from the OMF in the Action Processor |

```
case TERMINATE:
    APITerm(hAPI, hWnd, hInst, hOMF, API_NO_MODE);
    OMF_Term(hOMF);
    if (LOWORD(lParam))
        return(DONE_UNTIL_WARMSTART);
    else
        return(TERMINATE_OK);
```

APIUserActionInterface

| | |
|---|---|
| Specification | APIUserActionInterface (hAPI, hWnd, message, wParam, lParam, mode): nOK |
| | APIHND hAPI |
| | HWND hWnd |
| | unsigned message |
| | WORD wParam |
| | LONG lParam |
| | APIMODETYPE mode |
| | int nOK |

| | |
|---|---|
| Purpose | The User Action Interface passes all messages to the API to allow CBT and Help to act on messages before the application has processed them. If a message has been handled by the API, APIHaveMessage will return FALSE. |
| Parameters | *hAPI* is the handle returned to the caller by APIInit. |
| | *hWnd* is the handle to the application's window. |
| | *message* is the number of the message. |
| | *wParam* is additional message information (WORD). |
| | *lParam* is additional message information (LONG). |
| | *mode* - Use API_NO_MODE. (Other modes will be provided later.) |
| Return Value | *nOK* is FALSE if some error occurred. APIError may be called to return the API error number. |
| Placement | As part of the User Action Interface Component at the start of the application's window procedure. |
| Example | from User Action Interface Component |

```
if ( APIInterceptOn(APIModeFlags) || APIHaveMenu(message, wParam) )
    APIUserActionInterface( hAPI, hWnd, (LPAPIUNSIGNED)&message,
                            wParam, lParam, API_NO_MODE );
```

3    Utility Functions

The functions in this chapter have to do with the manipulation of strings, bytes, formats, windows management, and several other miscellaneous utility functions. The functions are defined in the NWUTIL.H file (except where otherwise noted).

They are classified into the following categories:

1. String Manipulation Functions
2. Byte Manipulation Functions
3. Window Management
4. Special Library Functions
5. OMF Utility Macros Table 3-1. String Manipulation Functions

| Function/Macro | Description |
|---|---|
| lstrcat | Concatenates one string to another. |
| lstrcmp | Compares the raw byte values of two null terminated strings. |
| lstrcpy | Copies a null terminated string from one location to another. |
| lstrlen | Returns the length of a null terminated string. |

Table 3-2. Byte Manipulation Functions

| Function/Macro | Description |
|---|---|
| lstrdelete | Deletes a specified number of bytes at a designated location. |
| lstrfill | Stores specified number of filler bytes at a designated location. |
| lstrinsert | Inserts space at a specified location. |
| lstrmove | Moves data from one location to another. |

Table 3-3. Windows Management Group

| Function/Macro | Description |
|---|---|
| NW_CreateWindow | Used to create a NewWave application main window. |
| NW_Maximize | Used to maximize an application main window created with NW_CreateWindow. |
| NW_MessageFilter | Called by the window procedure of an application main window created with NW_CreateWindow to provide special handling of certain messages. |
| NW_Minimize | Used to minimize an application main window created with NW_CreateWindow. |
| NW_Restore | Used to restore the size and position of an application main window created with NW_CreateWindow when the window is minimized or maximized. |

Table 3-4. Special Library Functions

| Function/Macro | Description |
| --- | --- |
| NW_AnsiToName | Converts a user name into the USERNAMESTRUCT structure which consists of the mail node and the name itself. |
| NW_AnsiToRoman8 | Converts a null terminated ANSI string to the Roman8 character set. |
| NW_ExecModule | Given a pointer to an executable file name, a command line to be passed, and a cmdshow parameter, this function starts the given program, and returns a success or fail value. |
| NW_FormatFill | Format a number as a string, padded with a leading fill character. |
| NW_GetCurrentTime | Returns the current time in the NewWave format adjusted to the current timezone. (NewWave format is seconds since January 1, 1961 Greenwich Mean Time.) |
| NW_GetExecErr | Returns the MS-DOS error code from the most recent failing call to NW_ExecModule. |
| NW_GetNWLIBVersion | Returns the version of NWLIB. |
| NW_InsertMsgNumber | Scans a template string for "%%" and inserts a signed decimal number there. |
| NW_InsertMsgString | Scans a template string for "%%" and inserts a second string there. |
| NW_NameToAnsi | Converts a USERNAMESTRUCT to a string in user-displayable format. |
| NW_ReadIntl | Reads the internationalization information from WIN.INI. |
| NW_TelescopeEffect | Used to generate the telescoping effect between two rectangles (usually an icon and a window) when opening or closing an object. |
| NW_TimeToAnsi | Converts the New Wave time format to an ANSI character set string. |
| NW_TimeToStruct | Breaks the New Wave time format (seconds since January 1, 1961 Greenwich Meridian Time) down into separate fields as defined in the TIMESTRUCT structure. |

Table 3-5. OMF Utility Macros

| Function/Macro | Description |
|---|---|
| LPCAST | Produces an LPSTR value with 0 in the HIWORD and the specified handle in the LOWORD. This value can in turn be passed as a parameter to any OMF routine that expects an LPSTR. |
| SCOPEOF | Returns the scope of an OBJECTNAME. |
| SIZEOF_CB_OBJECT_STRUCT | Returns the size in bytes of a CB_OBJECT_STRUCT containing a specified number of objects. |

LPCAST

Specification  LPCAST (handle) : lpResult

```
HANDLE    handle
LPSTR     lpResult
```

Purpose  To produce an LPSTR value with 0 in the HIWORD and a specified handle in the LOWORD.

Parameters  *handle* is a global memory handle.

Return Value  *lpResult* is an LPSTR value with zero in the HIWORD and the specified handle in the LOWORD.

Special Notes  This macro is defined in NWOMF.H.

This function returns a value that can be passed as an LPSTR parameter to any OMF function. The advantage in this is that the handle can be passed to the OMF without being locked. This can improve performance and memory utilization.

The handle should be allocated using GMEM_LOWER or GMEM_DDESHARE. If the parameter is providing the OMF with a pointer to return data to, as in OMF_GetOMFVersion, then GMEM_LOWER *must* be used.

lstrcat

Specification  lstrcat (lpStr1, lpStr2)

```
LPSTR     lpStr1
LPSTR     lpStr2
```

Purpose  Concatenates one string to another.

Parameters  *lpStr1* is a long pointer to the string that will be extended.

*lpStr2* is a long pointer to the string that will be appended to the lpStr1 string.

Return Value  None.

Special Notes  lpStr1 is assumed to be in a buffer large enough to hold the concatenation of the strings.

lstrcmp

Specification  lstrcmp (lpStr1, lpStr2): nCompare

```
LPSTR    lpStr1
LPSTR    lpStr2
int      nCompare
```

Purpose  Compares the raw byte values of two null terminated strings.

Parameters  *lpStr1* is a long pointer to the first string in the comparison.

*lpStr2* is a long pointer to the second string in the comparison.

Return Value  *nCompare* returns

```
an integer < 0     if lpStr1 < lpStr2;
0                  if lpStr1 = lpStr2;
an integer > 0     if lpStr1 > lpStr2.
```

Special Notes  This function does not take native language collating sequences into account.

lstrcpy

Specification  lstrcpy (lpTo, lpFrom)

```
LPSTR    lpTo
LPSTR    lpFrom
```

Purpose  Copies a null terminated string from one location to another.

Parameters  *lpTo* is a long pointer to the destination of the string.

*lpFrom* is a long pointer to the source of the string.

Return Value  None.

Special Notes  lpTo is assumed to point to a buffer that is large enough to hold the copied string.

If the source and destination overlap, this function will work only if lpFrom is greater than or equal to lpTo.

lstrdelete

Specification  lstrdelete (lpDelPt, nDelete, nMove )

```
LPSTR           lpDelPt
unsigned int    nDelete
unsigned int    nMove
```

Purpose  Deletes a specified number of bytes at a designated location. It works by moving the data that follows the deletion area on to the deletion area.

| | |
|---|---|
| Parameters | *lpDelPt* is a long pointer to the location where the data is to be deleted. |
| | *nDelete* is the number of bytes to be deleted. |
| | *nMove* is the number of bytes following the end of the deletion area that are to be moved on to the deletion area. |
| Special Notes | The data does not have to be in defined strings. Nulls are treated like any other characters. |
| | The value zero for nDelete or nMove is not considered an error, although either case will result in no deletion taking place. | lstrfill

| | |
|---|---|
| Specification | lstrfill (lpStr, Fillbyte, nBytes) |
| | ```
LPSTR          lpStr
BYTE           Fillbyte
unsigned int   nBytes
``` |
| Purpose | Stores specified number of filler bytes at a designated location. |
| Parameters | *lpStr* is a long pointer to the beginning location at which the fill is to take place. |
| | *Fillbyte* is the byte to be used as a fill byte, i.e., the fill byte will replace the existing characters at location lpStr. |
| | *nBytes* is the number of bytes to be overwritten by the fill byte. |
| Return Value | None. |
| Special Notes | The data does not have to be in defined strings. Nulls are treated like any other characters. | lstrinsert

| | |
|---|---|
| Specification | lstrinsert (lpInsPt, nInsert, nMove ) |
| | ```
LPSTR          lpInsPt
unsigned int   nInsert
unsigned int   nMove
``` |
| Purpose | Inserts data at a specified location by moving the bytes at that location a specified number of bytes. |
| Parameters | *lpInsPt* is a long pointer to the location at which the data is to be inserted. |
| | *nInsert* is the number of bytes to be inserted at lpInsPt. |
| | *nMove* is the number of bytes beginning at lpInsPt to be moved to (lpInsPt + nInsert) in order to make room for the new bytes. |
| Return Value | None. |
| Special Notes | The data is not handled as null terminated strings. Nulls are treated like any other characters. |
| | It is assumed that lpInsPt points to a buffer of at least (nInsert + nMove) bytes. | lstrlen

| | |
|---|---|
| Specification | lstrlen ( lpStr ): nLength<br>`LPSTR        lpStr`<br>`unsigned int nLength` |
| Purpose | Returns the length of a null terminated string (not including the null terminator). |
| Parameters | *lpStr* is a long pointer to the string to be measured. |
| Return Value | *nLength* is the length of the given string in bytes. | lstrmove

| | |
|---|---|
| Specification | lstrmove (lpTo, lpFrom, nBytes )<br>`LPSTR        lpTo`<br>`LPSTR        lpFrom`<br>`unsigned int nBytes` |
| Purpose | Moves data from one location to another. |
| Parameters | *lpTo* is a long pointer to the destination location.<br>*lpFrom* is a long pointer to the source location.<br>*nBytes* is the number of bytes to be moved. |
| Return Value | None. |
| Special Notes | lstrmove uses a combination of byte and word moves in order to achieve the highest possible performance.<br><br>Overlapping regions can be handled by lstrmove, but ONLY if lpTo is less than or equal to lpFrom; otherwise, if lpTo is greater than lpFrom in an overlap situation, use lstrinsert.<br><br>The data is not assumed to be in null terminated strings. Nulls are treated like any other characters.<br><br>A zero value for nBytes will not cause an error. |

NW_AnsiToName

Specification NW_AnsiToName (lpAnsi, lpUserNameStruct): nStatus

```
LPSTR    lpAnsi
LPSTR    lpUserNameStruct
int      nStatus
```

Purpose Converts a user name into the USERNAMESTRUCT structure which consists of the mail node and the name itself.

Parameters *lpAnsi* is a long pointer to the ANSI character string to be converted.

*lpUserNameStruct* is a long pointer to the converted version of the user name. The structure for lpUserNameStruct is as follows:

```
typedef struct {
    char szMailNode [8];       /* no terminating null */
    char szCanonicalName [36]; /* no terminating null */
} USERNAMESTRUCT;
```

Return Value *nStatus* returns 0 if the conversion is successful or a non-zero error code if there is a problem. These error codes are shown in the table on the next page.

Special Notes lpAnsi can be in either of the following two formats (square brackets [ ] denote optional fields):

1. lastname [, firstname [{blank} secondname]] [/location [/node]]

2. [firstname {blank} [secondname {blank}]] lastname [/location [/node]]

Note that in both cases the last name is required.

The required blank spaces are shown explicitly as {blank}. Extra spaces can be added as desired. Names may contain alphabetic characters, upper and lower case, and the apostrophe character ('). Names may end with a period (.). If a name ends with a period, that period will serve as a required space. Location and node may contain alphabetic characters, upper and lower case, and the digits 0 through 9. The location cannot exceed 6 characters, and the node cannot exceed 2 characters.

If you are on the HPDeskManager System, you may wish to include "embedded foreign addresses" as part of the names. Embedded foreign addresses can appear anywhere in the user name that a space can and are enclosed by parentheses "()". However, if a foreign address is specified, you cannot include a second name.

The total number of bytes in the user name cannot exceed 36, including spaces and punctuation. All characters in the USERNAMESTRUCT structure are in the Roman-8 character set. All fields are left justified; filled with blanks; and are NOT null terminated.

NW_AnsiToName

Table 3-6. Naming Error Codes

| Error Name | Code | Description |
|---|---|---|
| NO_ERROR | 0 | Success |
| BIG_LOC | 103 | Location exceeds 6 characters |
| BIG_NODE | 104 | Node exceeds 2 characters |
| ELEMENTS | 105 | Too many name elements |
| NO_LOC | 106 | Missing location |
| NO_FIRST | 107 | Missing first name |
| NO_LAST | 108 | Missing surname |
| COMMAS | 109 | Too many commas |
| BAD_COMMA | 110 | Comma in wrong place |
| NO_NODE | 111 | Missing node |
| BIG_NAME | 112 | Overall name exceeds 36 characters |
| BAD_CHAR | 113 | User name contains illegal character |
| GTO_FA | 114 | More than one bracketed FA |
| BAD_FA | 115 | FA contains brackets or parentheses |
| NO_RESDATA | 116 | Error loading resources |
| BAD_FA_CHAR | 117 | FA contains non-HP-Roman-8 characters |

NW_CreateWindow

Specification NW_CreateWindow ( lpClass, lpCaption, lStyle, x, y, cx, cy, hParent, hMenu, hInstance, lpParms ) : hWnd

```
LPSTR   lpClass
LPSTR   lpCaption
LONG    lStyle
short   x
short   y
short   cx
short   cy
HWND    hParent
HMENU   hMenu
HANDLE  hInstance
LPSTR   lpParms
```

Purpose This function is used to create a NewWave application main window.

Parameters *lpClass* is a long pointer to a string specifying the window class.

*lpCaption* is a long pointer to a string to use as the new window's caption.

*lStyle* is a long value specifying the style of window to create. These are the same styles defined for the ordinary MS Windows CreateWindow call. It is not necessary to specify WS_POPUP or WS_OVERLAPPED as this routine will supply the correct style. WS_CAPTION, WS_BORDER, and WS_SYSMENU are always added to lStyle when creating the window. WS_THICKFRAME, WS_MINIMIZEBOX, and WS_MAXIMIZEBOX must be specified if these attributes are desired.

*x* and *y* specify in screen coordinates where the upper left corner of the window should be. x may be CW_USEDEFAULT, in which case this routine will assign a default position for the window. If a default position is desired, y should be set to NWCW_CENTERPOS (which will center the window) or NWCW_STAGGERPOS (which staggers the window position). NWCW_STAGGERPOS will place the new window approximately halfway down and 1/8 of the distance to the right (staggered down and to the right to account for any windows already placed there).

*cx* and *cy* specify in screen coordinates the width and height of the window. cx may be CW_USEDEFAULT, in which case cy should be zero and the routine will assign a default size for the window.

*hParent* must be NULL.

*hMenu* specifies the menu to use for this window. If NULL, the default menu for the window class will be used.

*hInstance* specifies the instance handle of the caller.

*lpParms* is a pointer to any additional information to be passed to the window in the lParam of its WM_CREATE message.

NW_CreateWindow

Return Value hWnd is a window handle to the window created, or NULL if the window could not be created for some reason.

Special Notes This routine must only be used for application main windows. Use the MS Windows CreateWindow routine to create any other windows.

The window procedure of the application main window must use the NW_MessageFilter, NW_Minimize, NW_Maximize, and NW_Restore functions to assure proper operation of the window.

NW_ExecModule

Specification NW_ExecModule (lp_exefile, lp_cmd, cmdshow ): wAXreturn

```
LPSTR    lp_exefile
LPSTR    lp_cmd
WORD     cmdshow
WORD     wAXreturn
```

Purpose Given a pointer to an executable file name, a command line to be passed, and a cmdshow parameter, this function starts the given program, and returns the value that was in AX after the MS-DOS call, or -1 if the call failed.

Parameters *lp_exefile* is a long pointer to the name of the executable file.

*lp_cmd* is a long pointer to the command line.

*cmdshow* displays the command and is not generally used outside of Windows application programs.

Return Value *wAXreturn* returns the value that was in AX after the MS-DOS call, or -1 if the call failed.

Special Notes Before issuing the exec call, this function locks the segments of lp_exefile and lp_cmd, and the stack and data segments. They are unlocked when the exec call returns.

NW_FormatFill

Specification NW_FormatFill (lNumber, lpBuf, nRadix, nFieldWidth, cFill): lpReturn

```
LONG     lNumber
LPSTR    lpBuf
int      nRadix
int      nFieldWidth
char     cFill
LPSTR    lpReturn
```

Purpose Format a number as a string, padded with a leading fill character.

Parameters *lNumber* is a long, signed integer whose representation is to be converted.

*lpBuf* is a long pointer to the buffer in which the formatted string is to be placed.

*nRadix* is the conversion base and must fall between Base 2 and Base 16.

*nFieldWidth* is the maximum size of the field for right justification. If nFieldwidth is less than the actual size of the converted string, the converted number will be left justified.

*cFill* is the character to be used for leading fill characters.

Return Value *lpReturn* points to the formatted string.

Special Notes The space allocated for lpBuf must be large enough to hold the returned string.

If the radix is 10 and lNumber is negative, a minus sign (-) will be attached to the beginning of the string.

NW_GetCurrentTime

| | |
|---|---|
| Specification | NW_GetCurrentTime ( ): dwTime<br>DWORD    dwTime |
| Purpose | Returns the current MS-DOS time in the New Wave format adjusted to the current timezone. |
| Parameters | None. |
| Return Value | *dwTime* is the current MS-DOS time in the New Wave format adjusted to the current timezone. |
| Special Notes | New Wave format is given in seconds since midnight, January 1, 1961 Greenwich Meridian Time. This can be used to calculate an elapsed time in seconds or converted to a more convenient format as needed. |

NW_GetExecErr

| | |
|---|---|
| Specification | NW_GetExecErr ( ): wError<br>WORD    wError |
| Purpose | Returns the MS-DOS error code from the most recent failing call to NW_ExecModule. |
| Return Value | The MS-DOS error code is returned. The result is undefined if the last call to NW_ExecModule did not return -1. |

NW_GetNWLIBVersion

| | |
|---|---|
| Specification | NW_GetNWLIBVersion ( lpVersion ): nLength<br>LPSTR    lpVersion<br>int      nLength |
| Purpose | Returns the HP part number and version of the NWLIB utility functions in a string. |
| Parameters | *lpVersion* is a long pointer to the buffer for returning the string. |
| Return Value | *nLength* is the size of the string, not including the null terminator. It is 0 if an error has occurred (in which case the buffer content is undefined). |
| Special Notes | The buffer lpVersion must be at least 32 bytes in size. The string returned will contain the HP part number and version in the form:<br><br>    dddd-dddd  v.uu.ff<br><br>where "dddd-dddd" is the part number and "v.uu.ff" is the version number, update number, and fix number. |

NW_InsertMsgNumber

Specification  NW_InsertMsgNumber ( lpMessage, nMaxSize, lNumber ): bStatus

| LPSTR | lpMessage |
|---|---|
| int | nMaxSize |
| long | lNumber |
| BOOL | bStatus |

Purpose  Scans a message for the string "%%" and inserts a signed decimal number in textual form at that position.

Parameters  *lpMessage* is a long pointer to the message that is to receive the insertion.

*nMaxSize* is the maximum size allowable (including the terminating null) for the message after the insertion has been made.

*lNumber* is the long signed decimal that is to be inserted.

Return Value  *bStatus* is TRUE if the insertion is made and FALSE if an error occurred. Exceeding nMaxSize is an error that could occur.

Special Notes  In the case of multiple insertions, the insertion point can be marked by the string "%%n" where "n" is a single digit that designates the order of insertion. For example, the first insertion would take place at "%%", the next at "%%1", the next at "%%2", and so on.

NW_InsertMsgString

Specification  NW_InsertMsgString ( lpMessage, nMaxSize, lpInsert ): bStatus

| LPSTR | lpMessage |
|---|---|
| int | nMaxSize |
| LPSTR | lpInsert |
| BOOL | bStatus |

Purpose  Scans a message for the string "%%" and inserts a string at that position.

Parameters  *lpMessage* is a long pointer to the message that is to receive the insertion.

*nMaxSize* is the maximum size allowable (including the terminating null) for the message after the insertion has been made.

*lpInsert* is the string that is to be inserted.

Return Value  *bStatus* is TRUE if the insertion is made and FALSE if an error occurred. Exceeding nMaxSize is an error that could occur.

Special Notes  In the case of multiple insertions, the insertion point can be marked by the string "%%n" where "n" is a single digit that designates the order of insertion. For example, the first insertion would take place at "%%", the next at "%%1", the next at "%%2", and so on.

NW_Maximize

Specification  NW_Maximize ( hWnd )

```
HWND    hWnd
```

Purpose  This function is used to maximize an application main window created with NW_CreateWindow.

Parameters  *hWnd* is the window handle of the application main window to be maximized.

Return Value  None.

Special Notes  Note that this function does not toggle between maximize and restore. To restore a window after maximizing it, NW_Restore must be used.

NW_MessageFilter

Specification  NW_MessageFilter ( hWnd, message, wParam, lParam, lpReply ) : bProcessed

```
HWND        hWnd
unsigned    message
WORD        wParam
LONG        lParam
LONG FAR    *lpReply
```

Purpose  This function is called by the window procedure of an application main window created with NW_CreateWindow to specially handle some messages.

Parameters  *hWnd* is the window handle of the application main window.

*message* is the message just passed to the window procedure.

*wParam* is the wParam of the message just passed to the window procedure.

*lParam* is the lParam of the message just passed to the window procedure.

*lpReply* is a long pointer to a LONG value. If this function returns TRUE, the window procedure should immediately return that LONG value and not process the message.

Return Value  *bProcessed* is TRUE if this function has fully processed the message. In this case, the window procedure should immediately return the value that was pointed to by lpReply. If bProcessed is FALSE, the message should be processed normally by the window procedure.

Special Notes  A call to this function should be the very first action in the application main window procedure.

Example
```
if ( NW_MessageFilter ( hWnd, message, wParam, lParam,
    (LONG FAR *) &lpReply ) )
    return (lpReply);
```

NW_Minimize

| | |
|---|---|
| Specification | NW_Minimize ( hWnd ) |
| | HWND   hWnd |
| Purpose | This function is used to minimize an application main window created with NW_CreateWindow. |
| Parameters | *hWnd* is the window handle of the application main window to be minimized. |
| Return Value | None. |
| Special Notes | Note that this function does not toggle between minimize and restore. To restore a window after minimizing it, NW_Restore must be used. |

NW_NameToAnsi

| | |
|---|---|
| Specification | NW_NameToAnsi (lpUserNameStruct, lpResult, wFlags ): nStatus |
| | LPSTR   lpUserNameStruct |
| | LPSTR   lpResult |
| | WORD   wFlags |
| | int   nStatus |
| Purpose | Converts a USERNAMESTRUCT to a string in user-displayable format. |
| Parameters | *lpUserNameStruct* is a long pointer to a USERNAMESTRUCT returned by NW_AnsiToName. The structure for USERNAMESTRUCT is as follows: |

```
typedef struct {
    char szMailNode [8];        /* no terminating null */
    char szCanonicalName [36];  /* no terminating null */
} USERNAMESTRUCT;
```

*lpResult* is a long pointer to the buffer for returning the user-displayable string.

*wFlags* is used to choose between the short format (N2A_SHORT), which contains the name only, and the long format (N2A_FULL), which contains the name first followed by the electronic mail address.

| | |
|---|---|
| Return Value | *nStatus* returns 0 if the conversion is successful or a non-zero error code if an error occurs. Currently no errors have been defined. |
| Special Notes | The buffer that is to contain the resulting string must be at least 49 bytes in length for the long format or 37 bytes for the short format. |
| | The returned string will be in the ANSI character set. |

NW_ReadIntl

Specification  NW_ReadIntl ( lpIntlStruct )

LPINTLSTRUCT    lpIntlStruct

Purpose  Reads the internationalization information from WIN.INI.

Parameters  *lpIntlStruct* is a structure that has the following format:

```
typedef struct {
    int    CountryCode;
    BOOL   SuppressLeadingZeros;
    char   ThousandSeparator [6];
    char   DecimalSeparator [6];
    char   ListSeparator [6];
    int    DateOrder;           /* 0=MDY, 1=DMY, 2=YMD */
    char   DateSeparator [6];
    BOOL   TwelveHourClock;
    char   Suffix1159 [6];
    char   Suffix2359 [6];
    char   TimeSeparator [6];
    BOOL   PrefixCurrencySymbol;
    BOOL   NoCurrencySeparation;
    int    CurrencySignificantDigits;
    char   CurrencySymbol;
} INTLSTRUCT, *PINTLSTRUCT, far *LPINTLSTRUCT;
```

Return Value  None.

Special Notes  Any information not defined in WIN.INI will be defaulted to hardcoded (American) default values. Applications that keep this information must respond to the Windows message WM_WININICHANGE and call NW_ReadIntl again if the [intl] section of the file is changed.

NW_Restore

Specification  NW_Restore ( hWnd )

HWND    hWnd

Purpose  This function is used to restore the size and position of an application main window created with NW_CreateWindow when the window is minimized or maximized.

Parameters  *hWnd* is the window handle of the application main window to be restored.

Return Value  None.

NW_TelescopeEffect

Specification  NW_TelescopeEffect ( lpFromRect, lpToRect )

LPRECT    lpFromRect
    LPRECT    lpToRect

Purpose  Used to generate the telescoping effect between two rectangles (usually an icon and a window when opening or closing an object).

Parameters  *lpFromRect* is the long pointer to the "from" rectangle (specified by screen coordinates).

*lpToRect* is the long pointer to the "to" rectangle (specified by screen coordinates).

Return Value  None.

NW_TimeToAnsi

Specification  NW_TimeToAnsi ( dwTime, lpResult, lpIntlStruct, wFlags )

```
DWORD          dwTime
LPSTR          lpResult
LPINTLSTRUCT   lpIntlStruct
WORD           wFlags
```

Purpose  Converts the New Wave time format to an ANSI character set string.

Parameters  *dwTime* contains the time in New Wave format (seconds since midnight, January 1, 1961 Greenwich Meridian Time).

*lpResult* is a long pointer to the return buffer.

*lpIntlStruct* is a long pointer to the internationalization structure INTLSTRUCT, as returned by NW_ReadIntl.

*wFlags* controls the format of the returned string as indicated by one or more of the following flags:

> *T2A_NODATE* suppresses the date from being returned.
>
> *T2A_FULLYEAR* causes a 4 digit year to be returned; otherwise, a 2 digit year is returned.
>
> *T2A_NOTIME* suppresses the time from being returned.
>
> *T2A_SECONDS* causes seconds to be returned; otherwise seconds will be truncated with NO rounding.
>
> *T2A_SHORT* is only applied if the SuppressLeadingZeros field in the lpIntl structure is set to TRUE. It causes any month, day, or hour values consisting of a single digit to be formatted as a single digit. If SuppressLeadingZeros is FALSE, then a leading zero (or blank space if the first field in a time or date) will be added.
>
> *T2A_FIXED* causes all date/times to be returned in the fixed (same length) format defined by the internationalization structure.

Return Value  None.

Special Notes  When both date and time are returned, a single space will separate them.

The longest length string returned by this function is 40 bytes.

The returned time is adjusted by the current time zone.

NW_TimeToStruct

Specification  NW_TimeToStruct ( dwTime, lpTimeStruct )

```
DWORD          dwTime
LPTIMESTRUCT   lpTimeStruct
```

Purpose  Breaks the New Wave time format (seconds since midnight, January 1, 1961 Greenwich Meridian Time) down into separate fields as defined in the TIMESTRUCT structure.

Parameters   *dwTime* is the time expressed in New Wave format (seconds since midnight, January 1, 1961 Greenwich Meridian Time).

*lpTimeStruct* points to the lpTimeStruct which is defined as follows:

```
typedef struct (
    BYTE  Month;    /* 1-12  */
    BYTE  Day;      /* 1-31  */
    int   Year;     /* 1961- */
    BYTE  Hours;    /* 0-23  */
    BYTE  Minutes;  /* 0-60  */
    BYTE  Seconds;  /* 0-60  */
) TIMESTRUCT, *PTIMESTRUCT, far LPTIMESTRUCT;
```

Return Value   None.

Special Notes   The time returned is adjusted for the current time zone.

SCOPEOF

Specification   SCOPEOF (dwName) : dwScope

OBJECTNAME    dwName
    DWORD    dwScope

Purpose   Returns the scope of an object name.

Parameters   *dwName* is the name of an object.

Return Value   *dwScope*, the return value, is a DWORD value equal to one of the following:

GLOBAL

PERSISTENT

DATALINK

PARAMETER

SELF

NULLSCOPE

Special Notes   This macro is defined in NWOMF.H.

SIZEOF_CB_OBJECT_STRUCT

Specification   SIZEOF_CB_OBJECT_STRUCT (nObjects) : wSize int    nObjects
    WORD    wSize

Purpose   Returns the size in bytes of a CB_OBJECT_STRUCT containing a specified number of objects.

Parameters   *nObjects* is the number of objects for which the size is to be computed.

Return Value   *wSize* is the size in bytes of the CB_OBJECT_STRUCT.

Special Notes   This macro is defined in NWOMF.H.

It is especially useful when you are putting objects on the clipboard.

4   OMF Functions

OMF Function Summary Tables

The OMF Functions are classified into these categories in the summary tables that follow:

1. System Functions
2. Status Functions
3. Property Functions
4. Update Functions
5. Clipboard Functions
6. Serialization Functions
7. View Functions
8. Dynamic Access Library Functions All the OMF functions described in this chapter are defined in the NWOMF.H file.

Table 4-1. OMF System Functions

| Function/Macro | Description |
|---|---|
| OMF_Init | Registers with the OMF at startup. |
| OMF_Term | Last OMF call during termination process. |
| OMF_Opening | Informs the OMF that an object is now open. |
| OMF_Closing | Tells the OMF that the user closed the object. |
| OMF_ObjectFlag | Sets (or checks) OMF notification flags. |
| OMF_GetOMFObject | Establishes access to a known object. |
| OMF_FreeOMFObject | Tells the OMF that access to an object is done. |
| OMF_Send | Sends a message to another object. |
| OMF_PassWindowHandle | Tells the OMF that the window handle has changed. |
| OMF_GetOMFVersion | Returns the current OMF version number. |
| OMF_GetOMFDirectory | Returns the drive:path to the OMF files. |
| OMF_GetOMFError | Returns the most recent OMF error code. |
| OMF_Shutdown | Initiates a system shutdown. |
| OMF_ConfigChange | Causes a CONFIG_CHANGE message to be sent to all active objects that have set their FLAG_CONFIGURATION flag when a configuration value has changed. |

Table 4-2. OMF Status Functions

| Function/Macro | Description |
|---|---|
| OMF_EnumObjects | Returns names of generic objects. |
| OMF_EnumGlobalObjects | Returns names of global objects. |
| OMF_EnumChildren | Returns names of caller's child objects. |
| OMF_EnumChildrenOf | Returns names of specified object's child objects. |
| OMF_EnumParents | Returns names of calling object's parent objects. |
| OMF_EnumParentsOf | Returns names of specified object's parent objects. |
| OMF_GetChildCountOf | Gets a specified object's number of child objects. |
| OMF_GetParentCountOf | Returns the number of parents of a specified child object. |
| OMF_IsDescendant | Checks whether two objects are related. |
| OMF_GetMethod | Checks whether a given OMF method is supported by a specified object. |
| OMF_GetMethodList | Returns the complete list of an object's methods. |
| OMF_GetType | Returns the displayable class name. |
| OMF_GetIcon | Returns the handle to the object's icon. |
| OMF_GetObjectState | Checks if an object is open and/or active. |
| OMF_GetDiskSize | Gets the size (in bytes) of an object including its DATALINK descendants. |

Table 4-3. OMF Property Functions

| Function/Macro | Description |
|---|---|
| OMF_GetProperties | Returns the handle to the property list. |
| OMF_FreeProperties | Releases the property list. |
| OMF_ReadProperty | Reads from the property list. |
| OMF_WriteProperty | Writes to the property list. |
| OMF_ReadPropertyHandle | Reads a single property value into a global memory buffer and returns the handle to the buffer. |
| OMF_SetModified | Updates Modified/Last Writer properties. |

Table 4-4. OMF Update Functions

| Function/Macro | Description |
|---|---|
| OMF_MakeObjParam | Gets an object name that can be passed. |
| OMF_Assign | Assigns an object to a reference name. |
| OMF_Copy | Duplicates an existing object. |
| OMF_AddChildTo | Adds a child object to a specified parent object. |
| OMF_RemoveChildFrom | Removes a child object from a specified parent object. |
| OMF_ImportObject | Creates an object from a DOS file. |
| OMF_Export | Copies an object's file to a DOS file. |

Table 4-5. OMF Clipboard Functions

| Function/Macro | Description |
|---|---|
| OMF_PutOnOMFClipboard | Puts an object on the OMF clipboard. |
| OMF_PutViewOnOMFClipboard | Puts an object and a view on the clipboard. |
| OMF_RemoveFromOMFClipboard | Takes an object from the OMF clipboard. |
| OMF_EmptyOMFClipboard | Clears the OMF clipboard. |

Table 4-6. OMF Serial Functions

| Function/Macro | Description |
| --- | --- |
| OMF_Serialize | Creates a serial file from an object. |
| OMF_DeSerialize | Creates an object from a serial file. |
| OMF_GetSerialData | Reads data directly from a serial file. |
| OMF_GetSerialDataHandle | Reads data from a serial file returning a handle to the data. |
| OMF_PutSerialData | Writes data directly to a serial file. |

Table 4-7. OMF View Functions

| Function/Macro | Description |
| --- | --- |
| OMF_InitViewSpec | Used by a child object to initialize a new view. |
| OMF_CopyViewSpec | Copies the viewspec from one view to another view. |
| OMF_SetDataIdText | Changes the view's textual ID. |
| OMF_SetSnapshotState | Allows child object to update the state of the snapshot. |
| OMF_SetNewData | Sets new data flag before announcing it. |
| OMF_AnnounceNewData | Notifies parent objects about new data. |
| OMF_GetDataIdUsage | Allows child object to determine the number of destinations where the data ID is used. |
| OMF_GetSnapshot | Returns the object name of the snapshot to the child object. |
| OMF_GetView | Activates a view in order to send messages to it. |
| OMF_FreeView | Deactivates a view when it is through receiving messages. |
| OMF_GetViewMethod | Tests for a single view method. |
| OMF_GetViewMethodList | Returns a list of view methods. |
| OMF_GetDataIdText | Returns a child object's description of the view. |
| OMF_SendViewMsg | Sends view messages to the child object or snapshot. |
| OMF_ClearNewData | Resets the new data announced flag for a view. |
| OMF_TestNewData | Called by a parent object to test a view's new data announced flag. |

Table 4-8. OMF Dynamic Access Library Functions

| Function/Macro | Description |
| --- | --- |
| OMF_GetDALObject | Activates a dynamic access object. |
| OMF_FreeDALObject | Frees a dynamic access object. |
| OMF_SendDALMsg | Sends a message to a dynamic access object. |

OMF_AddChildTo

Specification  OMF_AddChildTo ( hOMF, dwParent, dwChild ) : dwRefName

```
OMFHND      hOMF
OBJECTNAME  dwParent
OBJECTNAME  dwChild
OBJECTNAME  dwRefName
```

Purpose  To add a child object to a specified parent object.

Parameters  *hOMF* is the handle that was returned to the caller by OMF_Init.

*dwParent* is the object name of the parent to add a child to (for example, the Waste Basket). This name can be of any scope.

*dwChild* is the object name of the child to be added to the parent (for example, the object being thrown away). This name can be of any scope except GLOBAL.

Return Value  *dwRefName*, the return value, is the PERSISTENT reference name that the parent (implicitly) assigned to the new child. NULLOBJECT is returned in the event of an error. This return value is needed to properly implement the Cut command for whole objects.

Special Notes  This function is implemented as a macro:

```
#define OMF_AddChildTo(h,dwP,dwC) \
    OMF_AddChildToWorker(h,dwP,dwC,0)
```

The OMF will only allow this function if dwParent has the ADD_CHILD method. Objects which have this method must also have the property PROP_ADDCHILD. The format of this property is this binary structure:

```
typedef struct {
    OBJECTNAME  NextRefName;
    WORD        SpaceLeft;
} ADDCHILDSTRUCT;
```

The algorithm the OMF follows for OMF_AddChildTo is as follows:

```
If parent does not have the ADD_CHILD method then ERROR
If the parent is currently active then Send the parent an ADD_CHILD message with the
        PARAMETER name of the child in lParam /* In processing the message, the parent must
       assign a reference name to the child, update
       its own PROP_ADDCHILD property, and update its
       own RAM and disk data structures. It should
       return the reference name as the message return
       value if everything succeeds, else it should
       return NULLOBJECT. */

Return the reference name

Else the parent is not currently active...

If the parent does not have the PROP_ADDCHILD property then ERROR
    If SpaceLeft in property is zero then ERROR
    If NextRefName in property is not a valid PERSISTENT reference name
        then ERROR
    RefName = NextRefName
    Create a reference from parent to child with name RefName
    Increment NextRefName, decrement SpaceLeft in property and
        write the property to disk
    Return RefName
```

While an object is active, it is also responsible for updating the NextRefName and SpaceLeft values in the property whenever it gains or loses a child (for example, via an OMF_INSERT message or Cut or Paste command).

Another responsibility that parents which support ADD_CHILD have is to enumerate their children when they are activated to "discover" the children which were added to them while they were inactive.

This entire scheme assumes that the parent does not re-use reference names for its children. [Assuming constant incrementing of the reference name at the rate of once per second, the 29 bits available in the reference name will not roll over for $(2^{**}29) / (60*60*24*365)$ = 17 years.] If somehow the NextRefName value in the property does overflow, the OMF_AddChildTo call will simply fail.

The Desktop and folders perform an OMF_GetMethod (ADD_CHILD) on an object when another object's icon is dragged on top of it. If the method is present, the Desktop and folders will use OMF_AddChildTo rather than the CONTAINMENT_STATUS protocol. The CONTAINMENT_STATUS protocol should only be used by objects that have processing to do when children are added to them.

OMF_AnnounceNewData

Specification OMF_AnnounceNewData ( hOMF ) : bStatus

```
OMFHND    hOMF
BOOL      bStatus
```

Purpose Called by a source object to notify the destination(s) of the views it supplies about new data.

Parameters *hOMF* is the handle returned to this object by the OMF_Init function.

Return Value *bStatus* is TRUE for success or FALSE for an error.

Special Notes Only the destinations of those views that have been marked with OMF_SetNewData will be notified. Inactive objects will not be activated in order to be notified unless they in turn supply views to other destinations; instead those objects will detect the new data when they are next activated by calling OMF_TestNewData. Other open destination object(s) will receive a DATA_CHANGE message for each view they receive that was marked with OMF_SetNewData. Each destination object will receive a DATA_CHANGE_END message after receiving its last DATA_CHANGE message.

OMF_Assign

Specification OMF_Assign( hOMF, ToName, FromName ) : bOk

```
OMFHND      hOMF
OBJECTNAME  ToName
OBJECTNAME  FromName
BOOL        bOk
```

Purpose There are three uses of this function: making new references, renaming references, and deleting references.

New references are made by assigning from a PARAMETER scope name to a PERSISTENT or DATALINK name.

References are renamed by assigning from an existing PERSISTENT or DATALINK name to another unused name of the same scope.

References are deleted by assigning from NULLOBJECT to an existing PERSISTENT or DATALINK name.

Parameters    *hOMF* is the handle returned to this object by the OMF_Init function.

*ToName* is the name the object has to be assigned to. This must be of PERSISTENT or DATALINK scope.

*FromName* is the name of the object being assigned. This must be of PERSISTENT, DATALINK, PARAMETER or NULLSCOPE scope.

Return Value    *bOK* is a boolean signifying whether or not the assign was achieved. (A failure could be caused, for example, by FromName not referencing an object.)

Special Notes    It is an error to attempt to delete an object if the caller has performed an OMF_GetOMFObject on it without a corresponding OMF_FreeOMFObject. When the last reference to an object is deleted, that object is destroyed and the DESTROY_EXTERNAL message will be sent to it if it has that method. Refer to the description of the DESTROY_EXTERNAL message.

It is also an error to delete a reference to an object if it would cause the destruction of an object which is active.

Objects of PERSISTENT, DATALINK, and PARAMETER scope cannot assigned to existing object names.

OMF_ClearNewData

Specification    OMF_ClearNewData ( hOMF, dwRefName ) : bStatus

```
OMFHND      hOMF
OBJECTNAME  dwRefName
BOOL        bStatus
```

Purpose    This function is called by a destination to clear the "new data announced" flag of a view.

Parameters    *hOMF* is the handle returned to this object by the OMF_Init function.

*dwRefName* is the DATALINK reference name assigned to the source object.

Return Value    *bStatus* is TRUE for success or FALSE for an error.

Special Notes    Objects that use the OMF_TestNewData function should call OMF_ClearNewData when they actually read the new data from a view.

OMF_Closing

Specification  OMF_Closing(hOMF, lpRect) : bOK

```
OMFHND    hOMF
LPRECT    lpRect
BOOL      bOK
```

Purpose  Called by an object when it receives a WM_CLOSE message. OMF_Closing notifies all parents of the object and notifies the OMF to perform other housekeeping tasks.

Each active parent will receive an OBJECT_CLOSING message.

If the parent has its FLAG_SENDRECTS set, then the rectangle pointed to by lpRect will also be passed.

If no other object in the system has an outstanding OMF_GetOMFObject on the calling object, then the caller will be sent a TERMINATE message before this function returns. Thus, no other OMF calls should be made while still processing the WM_CLOSE message.

If lpRect is not NULL, this function should be called *just after* the window is hidden (with ShowWindow).

Parameters  *hOMF* is the handle returned to this object by the OMF_Init function.

*lpRect* is a long pointer to a RECT data structure, describing in screen coordinates where the closing window is displayed. lpRect can be NULL, which is equivalent to passing a RECT with all fields zero.

Return Value  *bOK* is a boolean value which, if FALSE, signifies that some error has occurred. An error is returned if OMF_Opening has not been called previously.

Special Notes  All objects should process WM_CLOSE messages by calling ShowWindow to hide their window and then call OMF_Closing.

It is important to realize that the calling object may be re-entered with a TERMINATE message before OMF_Closing returns. For this reason, the call to OMF_Closing must be the last OMF call made while processing WM_CLOSE.

OMF_ConfigChange

Specification  OMF_ConfigChange( hOMF, dwName ) : bOk

```
OMFHND       hOMF
OBJECTNAME   dwName
BOOL         bOk
```

Purpose  Called whenever an object has modified a system configuration value. All active objects that have set their FLAG_CONFIGNOTIFICATION (with OMF_ObjectFlag) will be sent a CONFIG_CHANGE message telling them which configuration value changed.

Configuration values are stored as properties of the Desktop object. Currently, two configuration values are defined:

PROP_TIMEZONE - the configured offset from GMT
PROP_CREATOR - the configured user name

Parameters *hOMF* is the handle returned to this object by the OMF_Init function.

*dwName* is either PROP_TIMEZONE or PROP_CREATOR.

Return Value *bOK* is TRUE for success, FALSE if an error occurs.

OMF_Copy

Specification OMF_Copy( hOMF, ToName, FromName, wFlags ) : bOk

```
OMFHND      hOMF
OBJECTNAME  ToName
OBJECTNAME  FromName
WORD        wFlags
BOOL        bOk
```

Purpose To duplicate an existing object. All of the data files associated with the object FromName and any of its child objects are duplicated recursively. This includes any objects with external storage. Refer to the message COPY_EXTERNAL. The object's property list will be copied unless the COPY_NO_PROPERTIES bit is set in wFlags (this also applies to the object's children's properties).

OMF_Copy specially handles copying of public objects. When a public object's parent is copied, the copy of the parent gets an additional reference to the public object, and the public object and its children are not copied. However, OMF_Copy will check for active descendants, regardless of whether public objects are involved. In other words, even though a public object is not going to be copied, if it or a descendant of it is active, then its parent cannot be copied.

OMF_Copy can be used to copy SELF to a PERSISTENT name. When this is done, the OMF sends the object a COPY_SELF message telling it to produce copies of its data files. While processing COPY_SELF, the object can cause copying of any of its children to be suppressed by calling OMF_Copy with a ToName of NULLOBJECT and a FromName of the reference name of the child not to be copied. (See the description of COPY_SELF for more information.)

Parameters *hOMF* is the handle returned to this object by the OMF_Init function.

*ToName* is the name which the new object is to be given. This must be of PERSISTENT or DATALINK scope. In addition, ToName can be NULLOBJECT if the caller is currently processing a COPY_SELF message.

*FromName* is the name given by the calling object to the object to be copied. This must be of PERSISTENT, DATALINK, or SELF scope. If FromName is SELF, ToName must have PERSISTENT scope. Otherwise, ToName must be of the same scope as FromName (or else be NULLOBJECT).

*wFlags* is a word of flags controlling the copy operation. If the COPY_NO_PROPERTIES bit is set, no property lists will be copied. If the COPY_FORCE_DEEP bit is set, child objects will be copied whether or not they are public.

Return Value *bOK* is a boolean signifying whether or not the copy was achieved.

Special Notes If the object itself or any of its descendants are active, then the copy will not take place, except when *FromName* is SELF. When copying from SELF, OMF will allow active objects so long as they support the COPY_SELF method.

OMF also makes an exception for objects which are active because a destination object has called OMF_GetView on them. These objects can be copied if they support the COPY_SELF method.

OMF_CopyViewSpec

Specification OMF_CopyViewSpec( hOMF, dwToParent, dwToRef, dwFromParent, dwFromRef ) : bStatus

```
OMFHND      hOMF
OBJECTNAME  dwToParent
OBJECTNAME  dwToRef
OBJECTNAME  dwFromParent
OBJECTNAME  dwFromRef
BOOL        bStatus
```

Purpose To copy the view specification of one view to another view. This function is used extensively for managing the views of objects on the Clipboard.

Parameters *hOMF* is the handle returned to this object by the OMF_Init function.

*dwToParent* is the parent object of the link that will receive the view. It can be of any scope. The "to" link must not already have an associated view specification.

*dwToRef* specifies the source object of the link receiving the view specification and must be of the DATALINK scope. This is dwToParent's name for the source object of the "to" link.

*dwFromParent* is the parent object of the link from which the view specification will be copied. It can be of any scope.

*dwFromRef* specifies the source object of the link from which the view specification will be copied and must be of the DATALINK scope. This is dwFromParent's name for the source object of the "from" link.

Return Value *bStatus* is TRUE for success or FALSE for an error.

Special Notes The data ID, textual data ID, view class, and flags are copied literally. If both links refer to the same source object, the snapshot of the "from" link will be shared with the "to" link. Otherwise, a copy of the snapshot is made, which the "to" link receives.

OMF_DeSerialize

Specification OMF_DeSerialize( hOMF, PathName, dwObject, Flags ) : bOK

```
OMFHND      hOMF
LPSTR       PathName    /* in ANSI character set */
OBJECTNAME  dwObject
unsigned    Flags
BOOL        bOK
```

Purpose To create a new object from a serial file.

Parameters *hOMF* is the handle returned to this object by the OMF_Init function.

*PathName* can be either a long pointer to a null terminated string (containing the full pathname of the serial file) or a global handle to a memory block containing the string (using the LPCAST macro defined in NWOMF.H). If a global handle is passed, it must be allocated with the GMEM_LOWER or GMEM_DDESHARE option.

*dwObject* is the new name of the object to be created. This must be of PERSISTENT scope.

*Flags* indicate various conditions about the deserialization. The only flag currently defined is SERIAL_MULTIVOLUME_OK which indicates whether to allow a serial file which spans multiple diskette volumes.

Return Value *bOK* is a boolean value which, if FALSE, signifies that some error has occurred.

Special Notes It is possible to deserialize an object whose class has not been installed. OMF will arbitrarily assign a class, the "?" icon, a text ID of "unknown", and provide an executable file that simply says "Class xxx has not been installed." The object's only method is OPEN. If it was self-serialized, then an image of the self-serialized data is kept in the object's root file name with an extension of ".S#!" When an object that self-serializes is started up, it should check for a proper data file first and then look for a ".S#!" file.

OMF_EmptyOMFClipboard

Specification OMF_EmptyOMFClipboard ( hOMF ) : bOK

```
OMFHND    hOMF
BOOL      bOK
```

Purpose This function enumerates the children of OMF_CLIPBOARD and deletes the references from the clipboard to them.

This function also will delete any files on the OMF system directory whose file name is OMF_CLIPBOARD_FILENAME ("HPOMFCLP") plus any extension. This allows applications to put clipboard data into a file.

This function should be called in addition to the windows call EmptyClipboard after the clipboard has been opened and before any new data is put on the clipboard.

Parameters *hOMF* is the handle that was returned to the caller by OMF_Init.

Return Value *bOK* is a boolean value which, if FALSE, signifies that some error has occurred.

Special Notes The OMF will internally call this function on a system shutdown and during crash recovery.

OMF_EnumChildren

Specification OMF_EnumChildren( hOMF ) : bOK

```
OMFHND    hOMF
BOOL      bOK
```

Purpose Allows an object to receive a series of message(s) enumerating each of its children. This may be particulary useful when an object is starting up after receiving a CREATE_OMF or WARM_START message, because if an error or system crash occurs, its own maintained list of its children may not match the system's list.

Objects with the ADD_CHILD and LOSE_CHILD methods should use this function to "discover" children they may have acquired or lost while they were inactive.

| Parameters | *hOMF* is the handle returned to this object by the OMF_Init function. |
|---|---|
| Return Value | *bOK* is a boolean value which, if FALSE, signifies that some error has occurred. |
| Special Notes | The object will receive an ENUM_OBJECT message for each child that the object has. This message is described in Chapter 6 "OMF Messages" of this manual. |

It is important to realize that these messages will be all be received by the caller before the call to OMF_EnumChildren returns. Thus, your "window proc" is being called recursively – plan your local variables and stack accordingly.

OMF_EnumChildren( ) is actually a macro which does the call:

```
OMF_EnumObjects( hOMF, 1, SELF )
```

OMF_EnumChildrenOf

| Specification | OMF_EnumChildrenOf ( hOMF, dwObject ) : bOK |
|---|---|
| | OMFHND    hOMF |
| | OBJECTNAME dwObject |
| | BOOL      bOK |
| Purpose | Allows any object's children to be enumerated. |
| Parameters | *hOMF* is the handle that was returned to the caller by OMF_Init. |
| | *dwObject* is the name of an object whose children will be enumerated. This can be of any scope. |
| Return Value | *bOK* is a boolean value which, if FALSE, signifies that some error has occurred. |

The caller will receive an ENUM_OBJECT message for each child of the given object. This message is described in Chapter 6.

It is important to realize that these messages will be all be received by the caller before the call to OMF_EnumChildrenOf returns. Thus, your "window proc" is being called recursively – plan your local variables and stack accordingly.

| Special Notes | This is defined as a macro: |
|---|---|

```
#define OMF_EnumChildrenOf(hOMF,dwObject)  \
    OMF_EnumObjects (hOMF, 2, dwObject)
```

The calling object will receive an ENUM_OBJECT message for each of its children.

OMF_EnumGlobalObjects

| Specification | OMF_EnumGlobalObjects( hOMF ) : bOK |
|---|---|
| | OMFHND  hOMF |
| | BOOL    bOK |
| Purpose | Allows an object to receive a series of ENUM_OBJECT message(s) enumerating the GLOBAL reference names of all the global objects in the system. |

Parameters *hOMF* is the handle returned to this object by the OMF_Init function.

Return Value *bOK* is a boolean value which, if FALSE, signifies that some error has occurred.

Special Notes The object will receive an ENUM_OBJECT message for each global object in the system. This message is described in Chapter 6 "OMF Messages" of this document.

It is important to realize that these messages will be all be received by the caller before the call to OMF_EnumGlobalObjects returns. Thus, your "window proc" is being called recursively -- plan your local variables and stack accordingly.

OMF_EnumGlobalObjects( ) is actually a macro which does the call:

```
OMF_EnumObjects( hOMF, 0, NULLOBJECT )
```

OMF_EnumObjects

Specification OMF_EnumObjects ( hOMF, nEnumType, dwObject ) : bOK

```
OMFHND      hOMF
int         nEnumType
OBJECTNAME  dwObject
BOOL        bOK
```

Purpose The caller will receive an ENUM_OBJECT message for each object to be enumerated. The ENUM_OBJECT message is described in Chapter 6 "OMF Messages".

Parameters *hOMF* is the handle that was returned to the caller by OMF_Init.

*nEnumType* specifies which objects are to be enumerated:

0 -> enumerate all global objects

1 -> enumerate dwObject's children

2 -> enumerate dwObject's parents

*dwObject* is the name of an object. This name can be of any scope.

Return Value *bOK*, the return value, is TRUE for success, or FALSE if an error occurred.

Special Notes This function is generally called via the macros OMF_EnumChildren, OMF_EnumChildrenOf, OMF_EnumParents, OMF_EnumParentsOf, and OMF_EnumGlobalObjects.

OMF_EnumParents

Specification OMF_EnumParents ( hOMF ) : bOK

```
OMFHND  hOMF
BOOL    bOK
```

Purpose Allows an object to enumerate its parents.

Parameters *hOMF* is the handle that was returned to the caller by OMF_Init.

Return Value *bOK* is a boolean value which, if FALSE, signifies that some error has occurred.

Special Notes The object will receive an ENUM_OBJECT message for each of its parents. This message is described in Chapter 6 "OMF Messages" in this manual.

It is important to realize that these messages will be all be received by the caller before the call to OMF_EnumChildren returns. Thus, your "window proc" is being called recursively – plan your local variables and stack accordingly.

This is defined as a macro:

```
#define OMF_EnumParents(hOMF)    \
    OMF_EnumObjects (hOMF, 2, SELF)
```

OMF_EnumParentsOf

Specification OMF_EnumParentsOf ( hOMF, dwObject ) : bOK

```
OMFHND      hOMF
OBJECTNAME  dwObject
BOOL        bOK
```

Purpose Allows any object's parents to be enumerated.

Parameters *hOMF* is the handle that was returned to the caller by OMF_Init.

*dwObject* is the name of an object whose parents will be enumerated. This can be of any scope.

Return Value *bOK* is a boolean value which, if FALSE, signifies that some error has occurred.

Special Notes The calling object will receive an ENUM_OBJECT message for each parent of the specified object. This message is described in Chapter 6 "OMF Messages" in this manual.

It is important to realize that these messages will be all be received by the caller before the call to OMF_EnumChildren returns. Thus, your "window proc" is being called recursively – plan your local variables and stack accordingly.

This is defined as a macro:

```
#define OMF_EnumParentsOf(hOMF,dwObject)    \
    OMF_EnumObjects (hOMF, 2, dwObject)
```

OMF_Export

Specification OMF_Export( hOMF, dwObject, lpFileName ) : nCopied

```
OMFHND      hOMF
OBJECTNAME  dwObject
LPSTR       lpFileName  /*in ANSI character set */
int         nCopied
```

Purpose All objects' data files are stored in a special set of directories maintained by the OMF. This call allows the files of simple objects to be copied to the remainder of the DOS filing system. OMF_Export copies all the files associated with the named object to the regular DOS filing system using the same filename extensions which they had in the OMF domain.

Parameters  *hOMF* is the handle returned to this object by the OMF_Init function.

*dwObject* is the name of the object to be exported. This must be of PERSISTENT or SELF scope.

*lpFileName* can be passed with 0 in the HIWORD and a global handle to a memory block containing the null terminated root file name for the exported files in the LOWORD OR as a long pointer to the file name. The LPCAST macro is provided in NWOMF.H to make the appropriate casts to pass the handle in this manner, for example, LPCAST (myhandle). If a full pathname is not given, then the root directory on the system volume is assumed. If a global handle is passed, it must be allocated with the GMEM_LOWER or GMEM_DDESHARE option.

Return Value  *nCopied* is an integer which returns the number of files copied to the DOS file domain (which can be zero). A value of -1 is returned if an error occurs. An error will be returned if the object being exported is active.

Special Notes  lpFileName should have no extension. The extensions of each data file of the object will be appended to the FileName to form the name of the new file.

OMF_FreeDALObject

Specification  OMF_FreeDALObject ( hOMF, hDALObject ) : bOk

```
OMFHND      hOMF
HDALOBJECT  hDALObject
BOOL        bOk
```

Purpose  To deactivate a dynamic access object after messages have been sent to it. The dynamic access object is sent a LIB_USER_TERMINATE message. Then if the caller was the last user of the object, the object will be sent a LIB_OBJ_TERMINATE message. Finally if the caller was the last user of ANY object in this class, the library will be unloaded.

Parameters  *hOMF* is the handle returned to this object by the OMF_Init function.

*hDALObject* is the handle specifying the dynamic access object. It is the handle that was returned when the object was loaded with OMF_GetDALObject.

Return Value  *bOK* is TRUE if the operation was successful and FALSE if there was an error.

OMF_FreeOMFObject

Specification  OMF_FreeOMFObject( hOMF, dwObject ) : bOK

```
OMFHND      hOMF
OBJECTNAME  dwObject
BOOL        bOK
```

Purpose  To inform the OMF that the calling object no longer requires access to the named object.

Parameters  *hOMF* is the handle returned to this object by the OMF_Init function.

*dwObject* is the name of the object to which access is no longer required. This must be of GLOBAL, PERSISTENT, PARAMETER, or SELF scope and the calling object must have previously performed a OMF_GetOMFObject on it.

| | |
|---|---|
| Return Value | *bOK* is a boolean value which, if FALSE, signifies that some error has occurred. |
| Special Notes | After freeing a child object, the caller will still receive any OBJECT_OPENING and OBJECT_CLOSING messages for it. |

OMF_FreeProperties

| | |
|---|---|
| Specification | OMF_FreeProperties( hOMF, hProperties ) : bOK <br> OMFHND     hOMF <br> HPROPERTIES  hProperties <br> BOOL       bOK |
| Purpose | To inform the OMF that the calling object no longer requires the handle to the named property list. |
| Parameters | *hOMF* is the handle returned to this object by the OMF_Init function. <br> *hProperties* is the handle to the property list which is being released, which must have been obtained previously by performing an OMF_GetProperties call. |
| Return Value | *bOK* is a boolean value which, if FALSE, signifies that some error has occurred. |

OMF_FreeView

| | |
|---|---|
| Specification | OMF_FreeView ( hOMF, hView ) : bStatus <br> OMFHND   hOMF <br> HVIEW    hView <br> BOOL     bOk |
| Purpose | To deactivate a view after messages have been sent to it. |
| Parameters | *hOMF* is the handle returned to this object by the OMF_Init function. <br> *hView* is the handle of the active view that was returned by OMF_GetView. |
| Return Value | *bStatus* is TRUE if the operation was successful and FALSE if there was an error. |

OMF_GetChildCountOf

| | |
|---|---|
| Specification | OMF_GetChildCountOf ( hOMF, dwObject ) : nCount <br> OMFHND     hOMF <br> OBJECTNAME  dwObject <br> int        nCount |
| Purpose | To count the number of children belonging to a parent object. |
| Parameters | *hOMF* is the handle that was returned to the caller by OMF_Init. <br> *dwObject* is the name of an object. This name can be of any scope. |
| Return Value | *nCount*, the return value, is the number of objects which are children of the specified object. The count does not include the specified object itself, or any indirect descendants. Two references with different names to a single object will count as two children. A value of -1 is returned if an error occurred. |

OMF_GetDALObject

Specification  OMF_GetDALObject ( hOMF, dwObjectName ) : hDALObject

```
OMFHND       hOMF
OBJECTNAME   dwObjectName
HDALOBJECT   hDALObject
```

Purpose  To activate a dynamic access object so that messages can be sent to it.

Parameters  *hOMF* is the handle returned to this object by the OMF_Init function.

*dwObjectName* is the name of the dynamic access object and may be of any scope.

Return Value  *hDALObject* is the handle to the activated dynamic access object. It identifies the object for subsequent calls to OMF_SendDALMsg and eventually OMF_FreeDALObject. If an error occurs, NULL is returned.

Special Notes  If this is the first loading of the library for any object of this kind, the library's initialization entry point will be called by MS Windows.

If this is the first loading of the library for this particular object, the object's library will be sent a LIB_OBJ_INIT message.

Whether or not this is the first loading of the library for this object, the object's library will be sent a LIB_USER_INIT message.

OMF_GetDataIdText

Specification  OMF_GetDataIdText ( hOMF, dwRefName, ) : hText

```
OMFHND       hOMF
OBJECTNAME   dwRefName
HANDLE       hText
```

Purpose  Called by a destination object in order to return the textual data ID of a DATALINK child.

Parameters  *hOMF* is the handle returned to this object by the OMF_Init function.

*dwRefName* is the DATALINK reference name assigned to the source object.

Return Value  *hText* is NULL if an error occurs. It is 0xFFFF if that view has no textual data ID. Otherwise, hText is a global handle to a buffer containing the null terminated textual data ID of the view. This buffer will contain no more than MAXDATAIDTEXT bytes, not including the null.

Special Notes  IMPORTANT: The caller must free any global handle returned by this function after it has examined or copied the buffer.

OMF_GetDataIdUsage

Specification  OMF_GetDataIdUsage ( hOMF, DataID ) : nCount

```
OMFHND    hOMF
int       DataID
int       nCount
```

Purpose  Called by a source object in order to determine how many views (of which it is the source) use the given data ID. This function should be used when the object is being activated to check if the IDs that it supplies are still being used.

Parameters  *hOMF* is the handle returned to this object by the OMF_Init function.

*DataId* is the data ID whose uses are to be counted.

Return Value  *nCount* is the number of views associated with the given data ID. If the data ID is undefined, 0 is returned. If there is an error condition, -1 is returned.

OMF_GetDiskSize

Specification  OMF_GetDiskSize ( hOMF, dwObject ) : dwBytes

```
OMFHND       hOMF
OBJECTNAME   dwObject
DWORD        dwBytes
```

Purpose  To get the size of an object in bytes. The size of a single object is the sum of the sizes of its data files, plus the value in its PROP_EXTRADISK property, if there is one. Then for each of the object's DATALINK children, the OMF_GetDiskSize of the child is added in also.

Parameters  *hOMF* is the handle that was returned to the caller by OMF_Init.

*dwObject* is the name of the object to return the disk size of. This name can be any scope.

Return Value  *dwBytes*, the return value, is the "size" of the object and its data passing descendants in bytes. A long value of -1L will be returned if an error occurs.

OMF_GetIcon

Specification  OMF_GetIcon( hOMF, dwObject ) : hIcon

```
OMFHND       hOMF
OBJECTNAME   dwObject
HICON        hIcon
```

Purpose  To enable an object to obtain the handle to another object's (or its own) icon.

Parameters  *hOMF* is the handle returned to this object by the OMF_Init function.

*dwObject* is the name of the object whose icon handle is required. This can be of any scope.

Return Value  *hIcon* is the handle to the named object's icon. If OMF_GetIcon is unsuccessful, NULL is returned.

Special Notes  There is no need to have previously performed an OMF_GetOMFObject on the object in order to obtain the icon handle.

When OMF_GetIcon is used, the caller must be prepared to later receive and process the DISCARD_ICONS message. See the description of DISCARD_ICONS in Chapter 6 "OMF Messages".

OMF_GetMethod

Specification  OMF_GetMethod( hOMF, ReferenceName, MethodId) : nResult

```
OMFHND      hOMF
OBJECTNAME  ReferenceName
int         MethodId
int         nResult
```

Purpose  This provides a fast means for one object to determine if another object supports a given OMF message type.

Parameters  *hOMF* is the handle returned to this object by the OMF_Init function.

*ReferenceName* is the reference name of the object. This can be of any scope.

*MethodId* is the OMF message identifier, for example, OPEN.

Return Value  *nResult* is an integer which will be one of the following:

NO_METHOD if the object does not support the method.
METHOD_PRESENT if the object does support the method.
METHOD_ERROR if there is an error; call OMF_GetOMFError for the error code.

Special Notes  This call is preferred over sending the HAS_METHOD message because the object does not have to be activated. The returned value is actually determined by the HAVE_METHODS command in the installation file for the target object's class.

OMF_GetMethodList

| | |
|---|---|
| Specification | OMF_GetMethodList ( hOMF, dwObject ) : hList |
| | OMFHND        hOMF<br>OBJECTNAME    dwObject<br>GLOBALHANDLE  hList |
| Purpose | To obtain a complete list of an object's methods. The list is an array of WORDs, with each WORD specifying the method ID of a supported method. The list is terminated by an entry of -1. |
| Parameters | *hOMF* is the handle returned to this object by the OMF_Init function.<br>*dwObject* specifies the object and is of any scope. |
| Return Value | *hList* is the global handle to the list. NULL is returned if there is an error. |
| Special Notes | IMPORTANT: The caller must free the handle after the list has been examined. |

OMF_GetObjectState

| | |
|---|---|
| Specification | OMF_GetObjectState ( hOMF, dwObject ) : nState |
| | OMFHND        hOMF<br>OBJECTNAME    dwObject<br>int           nState |
| Purpose | To indicate the state of an object, regarding whether it is open; active but not open; or inactive. |
| Parameters | *hOMF* is the handle that was returned to the caller by OMF_Init.<br>*dwObject* is an object name of any scope. |
| Return Value | This function returns one of the following:<br>OS_ERROR (0) if there is an error; call OMF_GetOMFError for the error code.<br>OS_INACTIVE if the object is not active.<br>OS_ACTIVE if the object is active, but not open.<br>OS_OPEN if the object is open. |

OMF_GetOMFDirectory

| | |
|---|---|
| Specification | OMF_GetOMFDirectory ( hOMF, nDirId, lpDirBuf ) : nCount |
| | OMFHND  hOMF<br>int     nDirId<br>LPSTR   lpDirBuf<br>int     nCount |

| | |
|---|---|
| Purpose | This function is provided so that applications can find and locate files on the system and applications directories without hardcoding pathnames into themselves. This is important because the names of these directories are configurable. |
| Parameters | *hOMF* is the handle that was returned to the caller by OMF_Init. hOMF can be NULL if this function needs to be called by a DAL object. |
| | *nDirId* says which directory string to return, one of the following: |
| | If OD_SYSTEM, then return the system directory, if OD_APPLICS, then return the applications directory, if OD_DOSAPPS, then return the DOS applications dirctory. |
| | *lpDirBuf* is a long pointer to character buffer of at least MAXPATHNAMELENGTH bytes. Alternatively, this is a DWORD where the HIWORD is 0 and the LOWORD is a global memory handle to the buffer. If a global handle is passed, it must be allocated with the GMEM_LOWER option. GMEM_DDESHARE may not be used. |
| Return Value | *nCount* returns the number of characters returned in the buffer, not including the null terminator. This is 0 if an error occurred. |
| Special Notes | Note that the string returned already has a trailing backslash. To build a complete filename, just append it. |

OMF_GetOMFError

| | |
|---|---|
| Specification | OMF_GetOMFError( hOMF ) : ErrorCode |
| | OMFHND    hOMF |
| | DWORD     ErrorCode |
| Purpose | To allow applications to obtain a code corresponding to the LAST error that occurred when the calling object made an OMF call. This function will generally be used when the return value from an OMF call is not sufficient for an application's purposes. |
| | Note that the error code is either set or cleared after EVERY OMF call including OMF_GetOMFError. Thus, if you call OMF_GetOMFError twice in a row, the second call will always return NO_ERROR. |
| Parameters | *hOMF* is the handle returned to this object by the OMF_Init function. hOMF can be NULL if this function needs to be called by a DAL object. |
| Return Value | *ErrorCode* is a 32 bit value corresponding to an error which occurred during an OMF call. The HIWORD of this value is always 0. |
| Special Notes | A list of error codes, their constant definitions and the errors to which they correspond is available in Chapter 7 "Error Codes". |

OMF_GetOMFObject

| | |
|---|---|
| Specification | OMF_GetOMFObject( hOMF, dwObject ) : bOk |
| | OMFHND    hOMF<br>OBJECTNAME  dwObject<br>BOOL       bOk |
| Purpose | To allow access to an object which the calling object knows the name of. The OMF will activate this object if it is not active already. Objects can also do OMF_GetOMFObject's on SELF so that they won't be terminated when all of their parents have performed OMF_FreeOMFObject (see also OMF_Opening). |
| Parameters | *hOMF* is the handle returned to this object by the OMF_Init function.<br><br>*dwObject* is the name of the object to which access is required. This must be of GLOBAL, PERSISTENT, PARAMETER, or SELF scope. |
| Return Value | *bOK* is a boolean value which, if FALSE, signifies that some error has occurred. |
| Special Notes | Nesting of OMF_GetOMFObject / OMF_FreeOMFObject calls is allowed. That is, it is legal to perform a OMF_GetOMFObject on an object that was already gotten and not freed. The object will not actually be freed until the number of Free's matches the number of Get's. |

OMF_GetOMFVersion

| | |
|---|---|
| Specification | OMF_GetOMFVersion( hOMF, lpVersion ) : nReturned |
| | OMFHND    hOMF<br>LPSTR     lpVersion<br>int       nReturned |
| Purpose | To return the HP part number and version of the OMF in a string. |
| Parameters | *hOMF* is the handle returned to this object by the OMF_Init function. hOMF can be NULL if this function needs to be called from a DAL object.<br><br>*lpVersion* can either be a long pointer to a buffer, or have 0 in the HIWORD and a global handle to a buffer in the LOWORD. The buffer must contain at least MAXVERSIONSTRLENGTH characters. The LPCAST macro is provided in NWOMF.H to make the appropriate casts to pass the handle in this manner, for example, LPCAST (myhandle). If a global handle is passed, it must be allocated with the GMEM_LOWER option. GMEM_DDESHARE may not be used. |
| Return Value | *nReturned* is the number of characters actually returned in the caller's buffer, not including the null terminator. This will be zero if some kind of error occurred. |
| Special Notes | The string returned will contain the HP part number and version of the OMF in the form:<br><br>    dddd-dddd  v.uu.ff<br><br>where "dddd-dddd" is the part number and "v.uu.ff" are the version, update number, and fix number. |

OMF_GetParentCountOf

Specification   OMF_GetParentCountOf ( hOMF, dwObject ) : nCount

```
OMFHND      hOMF
OBJECTNAME  dwObject
int         nCount
```

Purpose   To count the parents of a child.

Parameters   *hOMF* is the handle that was returned to the caller by OMF_Init.

*dwObject* is the name of an object. This name can be of any scope.

Return Value   *nCount*, the return value, is the number of objects which are parents of the specified object. The count does not include the specified object itself. A value of zero is returned if the object is global (similar to OMF_EnumParentsOf). A value of -1 is returned if an error occurred.

OMF_GetProperties

Specification   OMF_GetProperties( hOMF, dwObject, bClass ) : hProperties

```
OMFHND       hOMF
OBJECTNAME   dwObject
BOOL         bClass
HPROPERTIES  hProperties
```

Purpose   To return a handle to the property list of an object which the calling object knows the name of.

Parameters   *hOMF* is the handle returned to this object by the OMF_Init function.

*dwObject* is the name of the object whose property handle is required. This can be of any scope.

*bClass* is a flag indicating that the property list of the object's class is to be returned.

Return Value   *hProperties* is the handle to the named object's property list. If the object does not yet have a property list, OMF_GetProperties will return a handle to an empty property list. This function returns a NULL if an error occurs.

Special Notes   There is no need to have performed a OMF_GetOMFObject on the object in order to get its property list.

OMF_GetSerialData

Specification   OMF_GetSerialData ( hOMF, hMem , DataLength ) : lnBytes

```
OMFHND    hOMF
HANDLE    hMem
unsigned  DataLength
LONG      lnBytes
```

| | |
|---|---|
| Purpose | To allow a self-serializing object to read data from the serial file when it is processing a DESERIALIZE message. |
| Parameters | *hOMF* is the handle returned to this object by the OMF_Init function. |
| | *hMem* is a handle to an allocated global memory block which is to be the input buffer for receiving the object's data from the serial file. This memory should be allocated with the GMEM_LOWER option. GMEM_DDESHARE may not be used. |
| | *DataLength* is the exact amount of data to be read, in bytes. DataLength must be less than or equal to the allocation size of the global memory block. |
| Return Value | Returns the number of bytes (as a LONG) that it has read, which may be less than the amount requested. The application cannot read more data than was written when the object was serialized. A value of -1L is returned if an error is detected. |
| Special Notes | This call is only legal for objects currently processing a DESERIALIZE message. |

OMF_GetSerialDataHandle

| | |
|---|---|
| Specification | OMF_GetSerialDataHandle ( hOMF, lpHandle, wDataSize ) : lReturn |
| | ```
OMFHND    hOMF
LPHANDLE  lpHandle
unsigned  wDataSize
LONG      lReturn
``` |
| Purpose | To read data from a serial file that is being deserialized. The call allocates a buffer in global memory and returns the handle. |
| Parameters | *hOMF* is the handle returned to this object by the OMF_Init function. |
| | *lpHandle* is a long pointer to a HANDLE. On return, this handle will be NULL (if the function failed) or a global handle to the returned data buffer. It is the caller's responsibility to free this handle. |
| | *wDataSize* is the maximum number of bytes to be read from the serial file. |
| Return Value | *lReturn* is the number of bytes (as a LONG) returned by this function in the buffer, or -1L if an error occurred. |
| Special Notes | The caller should check the value of the returned handle since it can be NULL in some error conditions. |
| | The returned handle is allocated by the OMF with GMEM_DDESHARE so the buffer must not be altered by the application. |
| | This call is only legal for objects currently processing a DESERIALIZE message. |
| Note  | If the returned handle is not NULL, it is the caller's responsibility to free the handle when the caller has finished with it. |

OMF_GetSnapshot

| | |
|---|---|
| Specification | OMF_GetSnapshot ( hOMF, DataId ) : dwSnapshot |
| | OMFHND      hOMF<br>Int         DataId<br>OBJECTNAME  dwSnapshot |
| Purpose | Called by a source object in order to return the PARAMETER scope name of the snapshot associated with the given data ID. |
| Parameters | *hOMF* is the handle returned to this object by the OMF_Init function.<br>*DataId* is the data ID identifying the range of viewed data. |
| Return Value | *dwSnapshot* is the PARAMETER scope name of the snapshot. If no snapshot is associated with the data ID, then NULLOBJECT will be returned. If the data ID is invalid, or if some other error occurs, then 0L will be returned. |
| Special Notes | This function should be used when a source object wants to update a snapshot. OMF_GetDALObject can then be called on the returned name. Source objects are not allowed to keep snapshot names in their data files, so this function is needed to get the name "on the fly." |

OMF_GetType

| | |
|---|---|
| Specification | OMF_GetType( hOMF, dwObject, lpBuffer) : Size |
| | OMFHND      hOMF<br>OBJECTNAME  dwObject<br>LPSTR       lpBuffer<br>Int         Size |
| Purpose | To enable an object to obtain a textual representation of an object which the calling object knows the name of. |
| Parameters | *hOMF* is the handle returned to this object by the OMF_Init function.<br>*dwObject* is the name of the object whose type is required. This can be of any scope.<br>*lpBuffer* can either be a long pointer to a buffer, or have 0 in the HIWORD and a global handle to a buffer in the LOWORD. The buffer must have room for at least (MAXTYPESTRLENGTH + 1) bytes. The buffer will receive the text string containing the named object's type. The LPCAST macro is provided in NWOMF.H to make the appropriate casts to pass the handle in this manner, for example, LPCAST (myhandle). If a global handle is passed, it must be allocated with the GMEM_LOWER option. GMEM_DDESHARE may not be used. |
| Return Value | *Size* is an integer value specifying the actual number of characters in the type string, not including the terminating null. If OMF_GetType is unsuccessful, 0 is returned. |
| Special Notes | There is no need to perform an OMF_GetOMFObject on the object prior to obtaining the type string. |

OMF_GetView

| | |
|---|---|
| Specification | OMF_GetView ( hOMF, dwRefName ) : hView |
| | OMFHND hOMF<br>OBJECTNAME dwRefName<br>HVIEW hView |
| Purpose | Called by a destination object to activate a view for the purpose of sending messages to it. |
| Parameters | *hOMF* is the handle returned to this object by the OMF_Init function.<br><br>*dwRefName* is a DATALINK reference name of the source object of the view. |
| Return Value | *hView* is a handle that should be used in calls to OMF_SendViewMsg and OMF_FreeView so that the view can be identified. NULL is returned in case of an error. |

OMF_GetViewMethod

| | |
|---|---|
| Specification | OMF_GetViewMethod ( hOMF, dwRefName, MethodId ) : nReturn |
| | OMFHND hOMF<br>OBJECTNAME dwRefName<br>int MethodId<br>int nReturn |
| Purpose | Called by a destination object to test a view for support of a single view message. |
| Parameters | *hOMF* is the handle returned to this object by the OMF_Init function.<br><br>*dwRefName* is a DATALINK or PERSISTENT reference name of the source object of the view.<br><br>*MethodId* is an integer containing the method ID. |
| Return Value | *nReturn* is one of the following:<br><br>METHOD_ERROR if there is an error.<br>NO_METHOD if the method is not supported.<br>METHOD_PRESENT if the method is supported. |
| Special Notes | If dwRefName was PERSISTENT, or the given link does not have a view specification associated with it, the methods supported by the initial view class (i.e., class 0) of the source are returned. |

OMF_GetViewMethodList

| | |
|---|---|
| Specification | OMF_GetViewMethodList ( hOMF, dwRefName ) : hMethodList |
| | OMFHND hOMF<br>OBJECTNAME dwRefName<br>GLOBALHANDLE hMethodList |

| | |
|---|---|
| Purpose | Called by a destination object to return a list of the view methods supported by a view. |
| Parameters | *hOMF* is the handle returned to this object by the OMF_Init function. |
| | *dwRefName* is a DATALINK or PERSISTENT reference name of the source object of the view. |
| Return Value | *hMethodList* is a global handle to an array of WORDs. Each word in the array contains the ID number of a supported view method. A value of -1 terminates the list. NULL will be returned if an error occurred. |
| Special Notes | IMPORTANT: It is the caller's responsibility to call GlobalFree on the handle after the list has been examined. |
| | If dwRefName was PERSISTENT, or the given link does not have a view specification associated with it, the methods supported by the initial view class (i.e., class 0) of the source are returned. |

OMF_ImportObject

| | |
|---|---|
| Specification | OMF_ImportObject( hOMF, lpFileName, lpClassName, dwNewName): nCopied |
| | ```
OMFHND      hOMF
LPSTR       lpFileName  /* in ANSI character set */
LPSTR       lpClassName
OBJECTNAME  dwNewName
int         nCopied
``` |
| Purpose | All objects' data files are stored in a special set of directories maintained by the OMF. This call allows a simple object to be created by copying files from the ordinary DOS file system. If the scope of dwNewName is PERSISTENT, the object becomes a child of the caller. |
| Parameters | *hOMF* is the handle returned to this object by the OMF_Init function. |
| | *lpFileName* can either be a long pointer to a null terminated file name, or have 0 in the HIWORD and a global handle to the file name in the LOWORD. The LPCAST macro is provided in NWOMF.H to make the appropriate casts to pass the handle in this manner, for example, LPCAST (myhandle). If a global handle is passed, it must be allocated with the GMEM_LOWER or GMEM_DDESHARE option. |
| | The file name should have no ".xxx" extension, and all files with this root filename will be imported as data files for the imported object. If a full pathname is not given then the root directory on the system volume is assumed. If lpFileName is NULL or points to an empty string, then OMF_ImportObject will create the object with no data files. |
| | *lpClassName* can either be a long pointer to a string, or have 0 in the HIWORD and a global handle to a string in the LOWORD. The string specifies the CLASS_NAME defining what kind of object is being imported. You should use the same string as defined in the installation file for the CLASS_NAME parameter. If a global handle is passed, it must be allocated with the GMEM_LOWER or GMEM_DDESHARE option. |
| | *dwNewName* is the name to be given to the new object created by the import. This must be of GLOBAL or PERSISTENT scope. |

Return Value  *nCopied* is an integer which returns the number of files copied from the DOS file domain (which can be zero). A value of -1 is returned if an error occurred.

Special Notes  If no files corresponding to the passed lpFileName exist, a new object will still be created called dwNewName with no data files.

OMF_Init

Specification  OMF_Init( hWindow, lpszCmdLine, lpPathNameBuffer ) : hOMF

```
HWND      hWindow
LPSTR     lpszCmdLine
LPSTR     lpPathNameBuffer
OMFHND    hOMF
```

Purpose  To register the object's window handle with the OMF and to retrieve the root file name of the object's data files.

Parameters  *hWindow* is the object's window handle.

*lpszCmdLine* is the command line passed to the WinMain procedure.

*lpPathNameBuffer* is a long pointer to the buffer where the root file name of the object's data files will be returned. This must be of size (MAXROOTFILENAMELENGTH + 1). The data files can then be accessed by adding the ".xxx" suffix as required. The file name returned is in the ANSI character set.

Return Value  *hOMF* is the returned handle which should be passed in all further OMF calls to identify the calling object.

0 is returned if the application is being started by the OMF but initialization has failed for some reason (for example, out of memory).

1 is returned if the application was not started up by the OMF. This provides the flexibility of using the same executable file for a standalone version of the application. (See examples below.)

Any other returned value is a valid OMFHND handle to be passed to all subsequent OMF calls.

Example  The following example is typical for NewWave-only applications calling OMF_Init:

```
hOMF = OMF_Init( hWindow, lpszCmdLine, lpPathNameBuffer );
if (hOMF <= 1) {
  /* error processing! */
  DestroyWindow (hWindow);
  exit (1); /* standard C exit */
  }
/* else good OMF startup */
```

The following example is typical for NewWave + standalone applications calling OMF_Init:

```
hOMF = OMF_Init( hWindow, lpszCmdLine, lpPathNameBuffer );
if (hOMF == 0) {
  /* bad OMF startup */
  DestroyWindow (hWindow);
  exit (1); /* standard C exit */
  }
else if (hOMF == 1)
  /* standalone startup */
else
  /* good OMF startup */
```

OMF_Init

Special Notes  Objects should call OMF_Init as soon as they have created their main window. Initialization does not complete until after the GetMessage loop is reached, so no more OMF calls should be made in WinMain. An application can start performing any initialization which is dependent on the OMF when it receives the CREATE_OMF message.

If the object must change its main window handle for any reason after calling OMF_Init, it must re-register its new window handle by calling the OMF_PassWindowHandle function. See documentation on OMF_PassWindowHandle for more information.

Warning  If your application encounters a serious error before or while calling OMF_Init, then it is up to the application to call the standard C exit function in order to terminate itself. If the application has created a window, it must be destroyed prior to exiting.

On the other hand, if the problem occurs after OMF_Init has been called and has returned with a valid handle, then the application should not call the exit function. Rather, it should refuse to process any messages except for TERMINATE, when it should call OMF_Term.

OMF_InitViewSpec

Specification  OMF_InitViewSpec ( hOMF, dwParent, dwRefName, DataId, lpText, ViewClass, lpSnapshotClassName ) : bStatus

```
OMFHND      hOMF
OBJECTNAME  dwParent
OBJECTNAME  dwRefName
int         DataId
LPSTR       lpText
int         ViewClass
LPSTR       lpSnapshotClassName
BOOL        bStatus
```

Purpose  Called by a source object to define the data ID and other view specification information for a link. OMF_InitViewSpec is called while the source object is processing INIT_VIEW messages, splitting a data ID, or putting a view of itself on the clipboard.

Parameters  *hOMF* is the handle returned to this object by the OMF_Init function.

*dwParent* is the name of the parent of the link. It can be of any scope.

*dwRefName* is the DATALINK reference name that the parent has for the source object.

*DataId* is the data ID to associate with the link. If this data ID has already been defined by this source object, then the remaining parameters are ignored, and can be passed as 0 and NULL. The information from the existing data ID definition is used to define this view specification. If the data ID is new then the remaining parameters define the textual data ID, view class, and snapshot class for the view.

*lpText* is either NULL, a long pointer to a buffer, or 0 in the HIWORD with a global handle to a buffer in the LOWORD. If it is NULL, the view will have no textual data ID. Otherwise, the buffer should contain a null terminated string of no more than MAXDATAIDTEXT characters (not counting the null). If a global handle is passed, it must be allocated with the GMEM_LOWER or the GMEM_DDESHARE option.

*ViewClass* is an integer from 0 to 7. If this function is being called while processing an INIT_VIEW message, this should be 0.

*lpSnapshotClassName* is either NULL, a long pointer to a null terminated string, or has 0 in the HIWORD and a global handle to a null terminated string in the LOWORD. If NULL, the view will have no snapshot. Otherwise, the string defines the class of snapshot to create. The new snapshot is then assigned to the view specification. If a global handle is passed, it must be allocated with the GMEM_LOWER or the GMEM_DDESHARE option.

OMF_InitViewSpec

Return Value *bStatus* is TRUE for a successful operation and FALSE if an error occurs.

Special Notes If this is being used to redefine a view (as is needed when "splitting" a data ID), the view class cannot be changed, either by specifying an existing data ID of a different class, or by specifying a new data ID and setting the ViewClass parameter.

When this function is used to define a new data ID, the status flags of the view are initialized as follows:

"new data set" - clear

"new data announced" - clear

"snapshot old" - set

"want messages" - set

OMF_IsDescendant

Specification OMF_IsDescendant ( hOMF, dwParentObject, dwDescendantObject ): nStatus

```
OMFHND      hOMF
OBJECTNAME  dwParentObject
OBJECTNAME  dwDescendantObject
int         nStatus
```

Purpose To determine if an object is a descendant of a second object.

Parameters *hOMF* is the handle that was returned to the caller by OMF_Init.

*dwParentObject* is the name of an object. This name can be any scope.

*dwDescendantObject* is the name of an object. This name can be of any scope.

Return Value *nStatus*, the return value, indicates whether dwDescendantObject is a descendant of dwParentObject. If a value of zero is returned, the answer is no. If a value of 1 is returned, the answer is yes. A value of -1 is returned if some kind of error occurred.

Special Notes Note that an object IS considered to be a descendant of itself.

OMF_MakeObjParam

| | |
|---|---|
| Specification | OMF_MakeObjParam( hOMF, dwName ) : dwParameterName |

```
OMFHND      hOMF
OBJECTNAME  dwName
OBJECTNAME  dwParameterName
```

Purpose To allow applications to pass references to objects.

Parameters *hOMF* is the handle returned to this object by the OMF_Init function.

*dwName* is the name of the object whose PARAMETER name is to be gotten. This can be of any scope.

Return Value *dwParameterName* is the parameter name of the object or 0L if an error has occurred.

Special Notes The parameter name returned by this function is temporary in nature. In particular, if the object being referenced is deleted after this call, the parameter name will become invalid. In general, a parameter name should be sent to its destination and be assigned to a PERSISTENT or DATALINK name there without any intervening calls to the Windows functions DialogBox, MessageBox, GetMessage, PeekMessage, and WaitMessage.

It is not legal to keep the parameter name of any object, including "yourself", for any extended period of time, unless you can guarantee that the referenced object cannot be destroyed, and also that the name would still refer to the right object, even if your object was copied. Applications are strongly discouraged from using a parameter name for anything other than transient purposes.

OMF_ObjectFlag

| | |
|---|---|
| Specification | OMF_ObjectFlag( hOMF, wFlag, bSet, bNewFlag ) : bValue |

```
OMFHND  hOMF
WORD    wFlag
BOOL    bSet
BOOL    bNewFlag
int     bValue
```

Purpose To allow the calling object to get or set a flag. Note that only one flag can be accessed at a time; flag values cannot be or'd in a single call. The following flags are defined:

- FLAG_GLOBALNOTIFICATION - When this flag is set, the object will receive OBJECT_OPENING and OBJECT_CLOSING messages for all global objects. Otherwise, these messages will only be received for the object's direct children.

- FLAG_PROPNOTIFICATION - When this flag is set, the object will receive PROP_CHANGE messages whenever any of its children's (or its own) properties are changed. Otherwise, no PROP_CHANGE messages will be received. If FLAG_GLOBALNOTIFICATION and FLAG_PROPNOTIFICATION are both set, the object will also receive PROP_CHANGE messages whenever the properties of a global object are changed.

OMF_ObjectFlag

- FLAG_QUERYSHUTDOWN - Applications that want to possibly prevent a system shutdown should set this flag. When the user tries to close the Desktop, OMF will send each active object with this flag set a QUERY_SHUTDOWN message. If any object returns FALSE, the shutdown will fail. Note that any object preventing a shutdown has the responsibility of informing the user of the reason why with a system modal message/dialog box before returning from the message.

- FLAG_PARENTNOTIFICATION - When this flag is set, the object will receive ADDED_PARENT and LOST_PARENT messages if it is active and any link to it is made or deleted. This flag should only be set when these messages are actually needed, for example, when the object is displaying its Show/Manage Links dialog box.

- FLAG_CLASSNOTIFICATION - When this flag is set, the object will receive CLASS_CHANGE messages when an existing class is overwritten by installation. Objects that are displaying or buffering information from class properties (for example, text types from OMF_GetType) should set this flag and process CLASS_CHANGE by re-reading the information.

- FLAG_SENDRECTS - When this flag is set, the object will receive OBJECT_OPENING and OBJECT_CLOSING messages with the rectangle information of the child allowing the telescope effect to be shown.

- FLAG_CONFIGNOTIFICATION - When this flag is set, the object will receive CONFIG_CHANGE messages whenever any system configuration variables (user name and time zone) are changed. Any object that is displaying date/time information should set this flag and process the CONFIG_CHANGE message by reformatting the date/time with the new time zone.

- FLAG_DATAIDNOTIFICATION - When this flag is set, the object will receive DATAID_CHANGE messages whenever any of its DATALINK children changes the textual data ID associated with the view. This flag should be set only when this information is being displayed and should be kept up-to-date.

Parameters  *hOMF* is the handle returned to this object by the OMF_Init function.

*wFlag* is the flag to get or set.

*bSet* should be FALSE to get the flag, and TRUE to set the flag.

*bNewFlag* is only meaningful if bSet is TRUE, in which case it is the boolean value to set wFlag.

Return Value  *bValue* returns the boolean state of the flag (before setting it if bSet is TRUE). A value of -1 is returned is returned if there is an error.

Special Notes  These flags are part of the object's working state, i.e. they do not survive the object being terminated and reactivated.

Applications that use FLAG_SENDRECTS should set this flag when they process CREATE_OMF in order to avoid receiving OBJECT_OPENING and OBJECT_CLOSING messages with unexpected parameters.

OMF_Opening

Specification  OMF_Opening( hOMF, lpRect ) : bOK

```
OMFHND    hOMF
LPRECT    lpRect
BOOL      bOK
```

Purpose  Called by an object when it receives an OPEN message to notify its parents that it is opening, and to allow the system to perform other housekeeping tasks.

Each active parent will receive an OBJECT_OPENING message. If the parent has its FLAG_SENDRECTS set, then it will also be passed the rectangle pointed to by lpRect.

If the calling object is referenced by the clipboard, the clipboard will be cleared.

The calling object will remain active at least until it calls OMF_Closing, regardless of whether any other object in the system has an outstanding OMF_GetOMFObject on it.

If *lpRect* is not NULL, this function should be called *just before* the window is actually shown (with ShowWindow).

Parameters  *hOMF* is the handle returned to this object by the OMF_Init function.

*lpRect* is a long pointer to a RECT data structure, describing in screen coordinates where the opening window is going to be displayed. lpRect can be NULL, which is equivalent to passing a RECT with all fields zero.

Return Value  *bOK* is TRUE if successful. If *bOK* is FALSE an error occurred.

OMF_PassWindowHandle

Specification  OMF_PassWindowHandle( hOMF, hNewWindow ) : bOK

```
OMFHND    hOMF
HWND      hNewWindow
BOOL      bOK
```

Purpose  To allow an object to inform the OMF that its window handle has changed. The OMF must be immediately informed of this new handle, or messages destined for the object will result in fatal system errors.

Parameters  *hOMF* is the handle returned to this object by the OMF_Init function.

*hNewWindow* is the object's new window handle.

Return Value  *bOK* is a boolean value which, if FALSE, signifies that some error has occurred.

Special Notes  This call is only necessary when the window handle is changed after calling OMF_Init().

When the handle is changed, it is highly recommended that the application code call OMF_PassWindowHandle immediately afterward.

OMF_Pass_WHandle is recognized as an alias of the procedure.

OMF_PutOnOMFClipboard

| | |
|---|---|
| Specification | OMF_PutOnOMFClipboard ( hOMF, dwObject ) : dwRefName |
| | OMFHND    hOMF <br> OBJECTNAME    dwObject <br> OBJECTNAME    dwRefName |
| Purpose | To place a reference to an object on the OMF Clipboard. |
| Parameters | *hOMF* is the handle that was returned to the caller by OMF_Init. |
| | *dwObject* is the name of the object to be put on the clipboard. This name can be PERSISTENT, PARAMETER, or SELF scope. |
| Return Value | *dwRefName* is the clipboard's reference name for the object, or NULLOBJECT if an error occurred. |
| Special Notes | This function is defined as a macro: <br>     #define OMF_PutOnOMFClipboard(hOMF,dwObject) \ <br>        OMF_AddChildToWorker (hOMF, OMF_CLIPBOARD, dwObject, 0) |

OMF_CLIPBOARD is a global object which is installed when the system is built. The OMF treats this global object special in several ways:

a. The OMF_EmptyOMFClipboard call will delete all references from OMF_CLIPBOARD.

b. On normal shutdown, the OMF will call OMF_EmptyOMFClipboard.

c. On crash recovery startup, the OMF will call OMF_EmptyClipboard (after the other crash recovery).

Note that generally an application will empty the Windows and OMF Clipboards (by calling EmptyClipboard and OMF_EmptyClipboard respectively) before using this function to put objects on the clipboard.

OMF_PutSerialData

| | |
|---|---|
| Specification | OMF_PutSerialData ( hOMF, hMem , DataLength) : bOK |
| | OMFHND    hOMF <br> HANDLE    hMem <br> unsigned    DataLength <br> BOOL    bOK |
| Purpose | To allow a self-serializing object to write data to the serial file while processing a SERIALIZE message. |
| Parameters | *hOMF* is the handle returned to this object by the OMF_Init function. |
| | *hMem* is a handle to an allocated global memory block containing the data to be appended to the serial file. This memory should be allocated with the GMEM_LOWER option or GMEM_DDESHARE. |
| | *DataLength* is the amount of data to be appended. DataLength must be less than or equal to the allocation size of the global memory block. |
| Return Value | *bOK* is a boolean value which, if FALSE, signifies that some error has occurred. |
| Special Notes | This call is only legal for objects currently processing a SERIALIZE message. |

OMF_PutViewOnOMFClipboard

Specification OMF_PutViewOnOMFClipboard ( hOMF, dwObject ) : dwRefName

```
OMFHND      hOMF
OBJECTNAME  dwObject
OBJECTNAME  dwRefName
```

Purpose To place an object on the clipboard with a DATALINK reference name, so that a view specification can be copied or initialized for that object.

Parameters *hOMF* is the handle returned to this object by the OMF_Init function.

*dwObject* is the reference to the object to be put on the clipboard.

Return Value *dwRefName* is the DATALINK name made from the clipboard to dwObject or NULLOBJECT if an error occurs.

Special Notes OMF_CLIPBOARD is a global object which is installed when the system is built. The OMF treats this global object special in several ways:

a. The OMF_EmptyOMFClipboard call will delete all references from OMF_CLIPBOARD.

b. On normal shutdown, the OMF will call OMF_EmptyOMFClipboard.

c. On crash recovery startup, the OMF will call OMF_EmptyClipboard (after the other crash recovery).

Note that generally an application will empty the Windows and OMF Clipboards (by calling EmptyClipboard and OMF_EmptyClipboard respectively) before using this function to put objects on the clipboard.

OMF_ReadProperty

Specification OMF_ReadProperty( hOMF, hProperties, lpPropName, lpValue, nMaxLength ) : nBytes

```
OMFHND      hOMF
HPROPERTIES hProperties
LPSTR       lpPropName
LPSTR       lpValue
int         nMaxLength
int         nBytes
```

Purpose To retrieve one of the values from a property list of an object or class whose property handle the caller has acquired.

Parameters *hOMF* is the handle returned to this object by the OMF_Init function.

*hProperties* is the handle to the property list. This handle must have been returned by OMF_GetProperties.

*lpPropName* can be passed either with 0 in the HIWORD and a global handle to a string in the LOWORD OR as a long pointer to the null terminated name of the property to be read. The LPCAST macro is provided in NWOMF.H to make the appropriate casts to pass the handle in this manner, for example, LPCAST (myhandle). If a global handle is passed, it must be allocated with the GMEM_LOWER or GMEM_DDESHARE option.

OMF_ReadProperty

Properties are also permitted to have numeric property names. A numeric property ID is specified by passing -1 in the HIWORD and a property ID number in the LOWORD of the lpPropName parameter. The advantage is not having to pass a handle for the property name. Another advantage is that less storage is needed, with significant savings in disk and RAM costs. The standard property names are defined in the NWOMF.H file. Currently, these include:

| | |
|---|---|
| PROP_CREATOR | PROP_LASTWRITER |
| PROP_CREATED | PROP_MODIFIED |
| PROP_PUBLIC | PROP_ADDCHILD |
| PROP_COMMENTS | PROP_EXTRADISK |
| PROP_DISPLAY | PROP_SYSTEM |
| PROP_USERSIZE | PROP_CLASSNAME |
| PROP_TEXTID | PROP_METHODS |
| PROP_ICONNAME | PROP_OLDAPPINFO |
| PROP_USERUNITS | PROP_FASTPROPS |
| PROP_TITLE | |

*lpValue* can be passed either with 0 in the HIWORD and a global handle to the buffer in the LOWORD OR as a long pointer to the caller's buffer for returning the property value. If a NULL buffer pointer is passed, the length of the property is the only data that is returned. If a global handle is passed, it must be allocated with the GMEM_LOWER option. GMEM_DDESHARE may not be used.

*nMaxLength* specifies the maximum size of the buffer pointed to by lpValue. If nMaxLength is positive, up to that many bytes will be returned, and no null terminator will be appended. If nMaxLength is negative, up to |nMaxLength| - 1 bytes will be returned, and a null terminator will always be appended.

Return Value  *nBytes* is the number of bytes actually returned in the caller's buffer, not including any null terminator added by this function. A value of -1 is returned if some kind of error occured.

Special Notes  If OMF_ReadProperty is called with PROP_FASTPROPS as a property name, a FASTPROPS data structure will be returned containing the values of these properties:

| | |
|---|---|
| PROP_ADDCHILD | PROP_MODIFIED |
| PROP_DESKTOPFLAGS | PROP_PUBLIC |
| PROP_EXTRADISK | PROP_SYSTEM |
| PROP_LASTWRITER | PROP_TITLE |

Refer to Chapter 7 "Object Properties" for a description of the FASTPROPS data structure.

OMF_ReadPropertyHandle

Specification  OMF_ReadPropertyHandle( hOMF, hProps, lpName, lpHandle, nMaxLength ): nRead

```
OMFHND       hOMF
HPROPERTIES  hProps
LPSTR        lpName
LPHANDLE     lpHandle
int          nMaxLength
int          nRead
```

Purpose  Reads a single property value into a global memory buffer and returns the handle to the buffer.

Parameters  *hOMF* is the handle returned to this object by the OMF_Init function.

*hProps* is the handle to the property list (returned by OMF_GetProperties).

*lpName* is the name of the property to read. It can be passed either with -1 in the HIWORD and the property ID number in the LOWORD, OR as a long pointer to the null terminated string name, OR have zero in the HIWORD and a global handle to the null terminated string name in the LOWORD.

*lpHandle* is a long pointer to a HANDLE. On return, this handle will be NULL (if the function failed) or a global handle to the returned data buffer. It is the caller's responsibility to free this handle. lpHandle can be passed as NULL, in which case the length of the property will be returned without actually reading anything or allocating any buffer.

*nMaxLength* specifies the maximum size of the buffer pointed to by lpValue. If nMaxLength is positive, up to that many bytes will be returned, and no null terminator will be appended. If nMaxLength is negative, up to |nMaxLength| - 1 bytes will be returned, and a null terminator will always be appended. nMaxLength is ignored if lpHandle is NULL.

Return Value  *nRead* is the number of bytes actually returned in the caller's buffer, not including any null added because nMaxLength was negative, or -1 if an error occurred. If lpHandle was NULL, the return value is the length of the property.

Special Notes  The caller should check the value of the returned handle, since it can be NULL in some error conditions.

The returned handle is allocated by the OMF with GMEM_DDESHARE so that the buffer must not be altered by the application.

Note   If the returned handle is not NULL, it is the caller's responsibility to free the handle when it is finished with the handle.

OMF_RemoveChildFrom

Specification  OMF_RemoveChildFrom ( hOMF, dwParent, dwRefName ) : bOK

|            |            |
|------------|------------|
| OMFHND     | hOMF       |
| OBJECTNAME | dwParent   |
| OBJECTNAME | dwRefName  |
| BOOL       | bOK        |

Purpose  To remove a child object from a parent, provided that the parent has the appropriate methods.

Parameters  *hOMF* is the handle that was returned to the caller by OMF_Init.

*dwParent* is the object name of the parent. This name can be GLOBAL, PERSISTENT, or PARAMETER scope.

*dwRefName* is the parent's reference name for the child to remove. This must be PERSISTENT or DATALINK scope.

Return Value  *bOK*, the return value, indicates whether the call was successful.

Special Notes  The algorithm for this call:

```
If parent does not have the LOSE_CHILD method then ERROR
If the parent is currently active then Send the parent a LOSE_CHILD message with dwRefName in LParam /* In processing this message, the parent must delete its
       reference to the child (WITHOUT sending it to the Waste
       Basket!), update its own PROP_ADDCHILD property, and update
       its own RAM and disk data structures. It should return
       with the LOWORD of its return value TRUE if everthing
       succeeds, or FALSE for an error. */

Return the status returned by the parent

Else the parent is not currently active...

If parent does not have PROP_ADDCHILD property then ERROR
    If parent does not have a child named dwRefName then ERROR
    Delete the reference from the parent to the child
    Increment SpaceLeft value in property and write it to disk
    Return Ok
```

OMF_RemoveFromOMFClipboard

Specification  OMF_RemoveFromOMFClipboard ( hOMF, dwRefName ) : bOK

|            |            |
|------------|------------|
| OMFHND     | hOMF       |
| OBJECTNAME | dwRefName  |
| BOOL       | bOK        |

Purpose  To remove an object from the OMF clipboard.

Parameters  *hOMF* is the handle that was returned to the caller by OMF_Init.

*dwRefName* is the reference name that the clipboard has for the object to be removed. This name was returned by OMF_PutOnOMFClipboard or OMF_PutViewOnOMFClipboard.

Return Value  *bOK*, the return value, indicates whether the removal was successful.

Special Notes  This function is defined as a macro:

```
#define OMF_RemoveFromOMFClipboard(hOMF,dwRefName)    \
     OMF_RemoveChildFrom (hOMF, OMF_CLIPBOARD, dwRefName)
```

Note that an application should also remove the object from the data structure on the Windows clipboard when this function is used.

OMF_Send

Specification  OMF_Send( hOMF, ObjectName, Message, lParam ) : lResult

| | |
|---|---|
| OMFHND | hOMF |
| OBJECTNAME | ObjectName |
| WORD | Message |
| LONG | lParam |
| LONG | lResult |

Purpose  To send a message to the named object.

Parameters  *hOMF* is the handle returned to this object by the OMF_Init function.

*ObjectName* is the name of the object intended to receive the message. This can be of any scope.

*Message* can be either:

standard message - defined by the OMF (see below); or non-standard message - defined by the application itself.

*lParam* is an additional message-dependent long word of information.

Return Value  *lResult* is the return value of the method invoked by the message. 0L is returned if the message cannot be sent.

Special Notes  Objects may be sent as parameters by using the OMF_MakeObjParam parameter passing mechanism to generate an object of PARAMETER scope. This can then be sent as a parameter to the message.

The standard messages defined by the OMF are described in Chapter 6 "OMF Messages".

Non-standard messages should only be sent to objects whose class is known to interpret the message as intended. Different classes may interpret the same non-standard message in different ways.

If the message requires passing more than 4 bytes of data (in lParam), then lParam should contain a global handle to the parameters in its LOWORD. The global block should be allocated with the GMEM_LOWER or GMEM_DDESHARE option.

GMEM_DDESHARE can only be used if the receiver of the message only needs read-access to the data. If read and write access are needed, GMEM_LOWER must be used. GMEM_LOWER should be avoided on allocations of more than 100 bytes, if at all possible.

OMF_SendDALMsg

Specification  OMF_SendDALMsg ( hOMF, hDALObject, wMsg, lParam ) : lReturn

```
OMFHND      hOMF
HDALOBJECT  hDALObject
WORD        wMsg
LONG        lParam
LONG        lReturn
```

Purpose  To send a message to the specified dynamic access object.

Parameters  *hOMF* is the handle returned to this object by the OMF_Init function.

*hDALObject* specifies the object that will receive the message. This is the handle returned when the object is loaded with OMF_GetDALObject.

*wMsg* specifies the type of message.

*lParam* contains any additional information that goes along with the message.

Return Value  *lReturn* is returned from the processing of the message by the dynamic access object. If an OMF error occurs, 0L is returned.

Special Notes  Unlike OMF_Send, it is allowable to pass a long pointer in lParam if more than 4 bytes of data need to be passed.

OMF_SendViewMsg

Specification  OMF_SendViewMsg ( hOMF, hView, wMsg, wParam ) : lReturn

```
OMFHND   hOMF
HANDLE   hView
WORD     wMsg
WORD     wParam
LONG     lReturn
```

Purpose  Called by destination objects to send messages to the view, causing the transfer of data.

Parameters  *hOMF* is the handle returned to this object by the OMF_Init function.

*hView* is the handle returned by calling OMF_GetView.

*wMsg* is the method/message ID.

*wParam* is a general WORD parameter to the message.

Return Value  *lReturn* is returned by the snapshot's MessageProc or the source object's window procedure, whichever received the message. A value of 0L is returned if an error has occurred within the OMF.

Special Notes  The message will be routed either to the snapshot of the view or to the source object. This depends on:

1. whether or not there is a snapshot,
2. whether or not the snapshot supports the requested method,
3. whether or not the snapshot is up-to-date, and
4. how the source object told the OMF to handle out-of- date snapshots.

If more than 2 bytes of parameter information (wParam) need to be sent, wParam must contain a global handle to the information. The global handle should be allocated with either the GMEM_LOWER or GMEM_DDESHARE option.

GMEM_DDESHARE can only be used if the receiver of the message needs read-access to the data only. If read and write access to the data are needed, GMEM_LOWER must be used. GMEM_LOWER should not be used for allocations of more than 100 bytes.

OMF_Serialize

Specification  OMF_Serialize( hOMF, dwObject, PathName , Flags ) : bOK

```
OMFHND      hOMF
OBJECTNAME  dwObject
LPSTR       PathName   /* in ANSI character set */
unsigned    Flags
```

Purpose  To create a serial file containing the named object.

Parameters  *hOMF* is the handle returned to this object by the OMF_Init function.

*dwObject* is the name of the object to be serialized. This must be of PERSISTENT scope.

*PathName* can be either a long pointer to a null terminated string (containing the full pathname of the file into which the object is to be serialized) or have 0 in its HIWORD and a global handle in its LOWORD to a memory block containing the string (using the LPCAST macro defined in NWOMF.H). If a global handle is passed, it must be allocated with the GMEM_LOWER or GMEM_DDESHARE option.

If PathName is NULL, the OMF will check the object and its descendants to verify that none of them are active. It will then return TRUE or FALSE without actually trying to create a serial file. This allows you to pre-check that you will be able to serialize an object.

*Flags* indicate various conditions about the serialization. The only flag currently defined is SERIAL_MULTIVOLUME_OK which indicates whether the serial file can spread over multiple diskette volumes if the disk becomes full.

Return Value  *bOK* is a boolean value which, if FALSE, signifies that some error has occurred.

Special Notes  OMF_Serialise is recognized as an alias for this function.

OMF_SetDataIdText

Specification  OMF_SetDataIdText ( hOMF, DataId, lpText ) : bStatus

| OMFHND | hOMF |
|---|---|
| int | DataId |
| LPSTR | lpText |
| BOOL | bStatus |

Purpose  Called by a source object to change the textual ID associated with a given data ID.

Parameters  *hOMF* is the handle returned to this object by the OMF_Init function.

*DataId* is used to identify the range of viewed data whose textual ID will be changed.

*lpText* can be NULL, a long pointer to a string, or it can have 0 in the HIWORD with a global handle to a string in the LOWORD. If it is NULL, the view will have no textual ID. Otherwise, the string will become the textual data ID of the view. It should not have more than MAXDATAIDTEXT characters, not including the null terminator. If a global handle is passed, it must be allocated with the GMEM_LOWER or GMEM_DDESHARE option.

Return Value  *bStatus* is TRUE for a successful operation and FALSE if an error occurs.

Special Notes  If the destination object(s) of this data ID are active, they will be sent a DATAID_CHANGE message to notify them of the change if they have set their FLAG_DATAIDENTIFICATION flag.

OMF_SetModified

Specification  OMF_SetModified ( hOMF ) : bOK

| OMFHND | hOMF |
|---|---|
| BOOL | bOK |

Purpose  To indicate that an object has been modified.

Parameters  *hOMF* is the handle that was returned to the caller by OMF_Init.

Return Value  *bOK*, the return value, is TRUE for success, or FALSE if an error occurred.

Special Notes  This function sets the PROP_MODIFIED property of the calling object, and on all ancestors of the calling object which receive data from it, directly or indirectly.

Any currently active object whose own or child's PROP_MODIFIED property is changed and which has requested property change notification will receive a PROP_CHANGE message.

This function also sets the PROP_LASTWRITER property of the caller to the user name in the Desktop's PROP_CREATOR property.

OMF_SetNewData

| | |
|---|---|
| Specification | OMF_SetNewData ( hOMF, DataId ) : bOK<br><br>OMFHND    hOMF<br>int    DataId<br>BOOL    bOK |
| Purpose | Called by a source object to set the "new data set" flag in all views with the given data ID. When the source object calls OMF_AnnounceNewData, the new data is then made available to the destination object(s). |
| Parameters | *hOMF* is the handle returned to this object by the OMF_Init function.<br><br>*DataId* identifies the range of viewed data that has changed. |
| Return Value | *bOK* is TRUE for a successful operation and FALSE if an error occurs. |

OMF_SetSnapshotState

| | |
|---|---|
| Specification | OMF_SetSnapshotState ( hOMF, DataId, bOutOfDate, bWantMessages) : bOK<br><br>OMFHND    hOMF<br>int    DataId<br>BOOL    bOutOfDate<br>BOOL    bWantMessages<br>BOOL    bOK |
| Purpose | Called by a source object to change the "snapshot out-of-date" and "want messages" flags of all views with the given data ID. |
| Parameters | *hOMF* is the handle returned to this object by the OMF_Init function.<br><br>*DataId* identifies the range of viewed data to be changed.<br><br>*bOutOfDate* is the new value for the "snapshot out-of-date" flag.<br><br>*bWantMessages* is the new value for the "want messages" flag. |
| Return Value | *bOK* is TRUE for a successful operation and FALSE if an error occurs. |

OMF_Shutdown

| | |
|---|---|
| Specification | OMF_Shutdown( hOMF ) : bOk<br><br>OMFHND    hOMF<br>BOOL    bOk |
| Purpose | To close the session so that all other active objects close down cleanly, and the OMF can store the information required to start up the next session with the same active objects. |
| Parameters | *hOMF* is the handle returned to this object by the OMF_Init function. |
| Return Value | *bOK* is a boolean signifying whether or not the system is shutting down. |
| Special Notes | The OMF does not guarantee that a shutdown will take place when this call is issued by any application. Only certain applications will have this capability. |

OMF_Term

| | |
|---|---|
| Specification | OMF_Term ( hOMF) |
| | OMFHND    hOMF |
| Purpose | To free the memory associated with the handle returned by OMF_Init. |
| Parameters | *hOMF* is the handle returned to this object by the OMF_Init function. |
| Return Value | None. |
| Special Notes | It is important that the hOMF returned by OMF_Init be freed using this function before an application quits. |
| Warning  | This call must be the very last OMF call that an application makes. |
| | hOMF is invalid and should not be used for any purpose after calling OMF_Term. |

OMF_TestNewData

| | |
|---|---|
| Specification | OMF_TestNewData ( hOMF, dwRefName ) : bOK |
| | OMFHND    hOMF <br> OBJECTNAME    dwRefName <br> BOOL    bOK |
| Purpose | Called by a destination object to test a view's "new data announced" flag. |
| Parameters | *hOMF* is the handle returned to this object by the OMF_Init function. |
| | *dwRefName* is the caller's reference name for the source object. It must be of DATALINK scope. |
| Return Value | *bOK* is TRUE if the "new data announced" flag is set and FALSE if the flag is clear or if an error occurs. You can detect an error by calling OMF_GetOMFError. |

OMF_WriteProperty

Specification  OMF_WriteProperty( hOMF, hProperties, lpPropName, lpValue, nLength): bOK

```
OMFHND       hOMF
HPROPERTIES  hProperties
LPSTR        lpPropName
LPSTR        lpValue
int          nLength
BOOL         bOK
```

Purpose  To add, replace, or delete one of the values in a property list of an object or class whose property list handle the caller has acquired.

Parameters  *hOMF* is the handle returned to this object by the OMF_Init function.

*hProperties* is the handle to a property list which the caller has acquired previously by performing an OMF_GetProperties call.

*lpPropName* can either have 0 in the HIWORD and a global handle to a block containing a null terminated property name in the LOWORD OR a long pointer to the null terminated property name. The LPCAST macro is provided in NWOMF.H to make the appropriate casts to pass the handle in this manner, for example, LPCAST (myhandle). A property name must be longer than 4 characters in length. Note that if a property's name begins with "$", it will be prevented from being copied or serialized. If a global handle is passed, it must be allocated with the GMEM_LOWER or GMEM_DDESHARE option.

Properties are also permitted to have numeric property names. A numeric property name is specified by passing -1 in the HIWORD and a property ID number in the LOWORD of the lpPropName parameter. The advantage is not having to pass a handle for the property name. Another advantage is that "real" property names are very short, with significant savings in disk and RAM costs. The generic property names are defined in the NWOMF.H file. Currently, these include:

| | |
|---|---|
| PROP_USERUNITS | PROP_CREATOR |
| PROP_LASTWRITER | PROP_CREATED |
| PROP_MODIFIED | PROP_PUBLIC |
| PROP_ADDCHILD | PROP_COMMENTS |
| PROP_EXTRADISK | PROP_DISPLAY |
| PROP_SYSTEM | PROP_USERSIZE |
| PROP_CLASSNAME | PROP_TEXTID |
| PROP_METHODS | PROP_ICONNAME |
| PROP_OLDAPPINFO | PROP_TITLE |

OMF_WriteProperty

Private numeric property names can also be created in the range PROP_USERDEFINED through 0xFFFF. Names that have bit 0x8000 set have the same effect as a leading "$". Private numeric names may only be used when writing to the object's own object and class properties. Do not use a private numeric name to change any other object's properties.

*lpValue* can either have 0 in the HIWORD and a global handle to the value in the LOWORD OR be a long pointer to the value to be written. If NULL, the specified property will be deleted. When writing a zero-length property, a value of (LPSTR)(-1L) must be specified for lpValue. If a global handle is passed, it must be allocated with the GMEM_LOWER or GMEM_DDESHARE option.

*nLength* specifies the length of the property value to be written. If lpValue is NULL, this parameter is ignored. If nlength is negative, lpValue is assumed to point to null terminated string, otherwise, nLength specifies the length of the value in bytes.

Return Value  bOK is a boolean value which, if FALSE, signifies that some error has occurred.

Special Notes  When a property value is changed, the PROP_CHANGE message is sent to the appropriate objects. Refer to the discussion of the PROP_CHANGE message.

5  API Messages

API Message Summary Tables

The API Messages described in this chapter are defined in the NWAPI.H file. They can be summarized as shown in the following table:

Table 5-1. API Messages

| Message | Description |
|---|---|
| API_INTERROGATE_MSG | To allow the Agent to send for read-only information from the application so that the information returned is available within the Agent Task. |
| API_PLAYBACK_MSG | To POST the external form of the command to the application so that it can be translated to the internal form and executed by the application. |
| API_SET_MODE_FLAGS_MSG | To SEND a message to change the mode bits in the APIModeFlags so that the flow of the control inside the application will be changed. |

API_INTERROGATE_MSG

Purpose  To allow the Agent to send for read-only information from the application so that the information returned is available within the Agent Task or set by other variable components.

The Agent thus SENDs the message API_INTERROGATE_MSG. The application looks up the necessary information and passes it back to the Agent. The Agent will then put that information into variables inside the task or will provide it to HELP. The Interrogate message can have many types, as defined in the CLASS INDEPENDENT INTERROGATION FUNCTIONS (refer to Table A-5 in Appendix A), e.g. interrogation for HELP, CBT, or the Agent.

Parameters  wParam is a number that identifies the desired Class Independent Interrogation Function.

lParam is a handle to a global buffer containing information relevant to the interrogation function being called.

Return Value  The return value is dependent on the Class Independent Interrogation Function specified by wParam.

API_WHATS_INSERTABLE_AT_FN

Purpose - This message allows a caller to find out if there are any insertable objects at the specified point. An *insertable* object is one that supports the OMF_INSERT message.

Parameters - The LOWORD of lParam is a handle to global memory allocated with GMEM_LOWER. The memory is (MAXCLASSNAME + MAXTITLE + 2) bytes in size.

MAXCLASSNAME (defined in NWOMF.H) is the maximum length of the PROP_CLASSNAME property. MAXTITLE (also defined in NWOMF.H) is the maximum length of the PROP_TITLE property. The two extra bytes are for NULLs.

HIWORD is not used.

The receiver of this message should lock the handle that was passed and cast the resulting long pointer to an LPPOINT. This point is a screen coordinate position.

API_INTERROGATE_MSG

Return Value - If there is an insertable object at the point that was passed in the receiver's window, it should copy into the shared memory that object's null terminated PROP_CLASSNAME string immediately followed by that object's null terminated PROP_TITLE string. The two strings should be packed into the memory (e.g., "Folder\0June Sales\0" where "\0" indicates the NULL character).

If there is no insertable object at this point in the receiver's window, it should copy a NULL string into the memory.

The handle should be unlocked before returning.

The return value from the call should be -1L to indicate success and 0L to indicate problems. If the receiver does not support insertable children, it is permitted to return 0L without altering shared memory.

Special Notes - It is possible that the screen coordinates passed may specify a point that is not currently in the receiver's client area. If the receiver has a scrollable window, this is not necessarily an error. The receiver should map screen coordinates to his logical space when searching for an insertable child.

API_WHO_ARE_YOU_FN

Purpose - To allow an open object to supply its classname and title to the caller. This need only be handled if the object supports the OMF_INSERT message.

Parameters - The LOWORD of lParam is a handle to global memory allocated with GMEM_LOWER. The memory is (MAXCLASSNAME + MAXTITLE + 2) bytes in size.

MAXCLASSNAME (defined in NWOMF.H) is the maximum length of the PROP_CLASSNAME property. MAXTITLE (also defined in NWOMF.H) is the maximum length of the PROP_TITLE property. The two extra bytes are for NULLs.

HIWORD is not used.

API_INTERROGATE_MSG

Return Value - The receiver of this message should lock the handle that was passed and copy the null terminated PROP_CLASSNAME string immediately followed by the null terminated PROP_TITLE string. The two strings should be packed into memory (e.g., "Desktop\0NewWave\0" where "\0" indicates the NULL character).

The return value from the call should be -1L to indicate success and 0L to indicate a problem.

API_WHERE_IS_FN

Purpose - To allow the caller find the position of a child object of the receiver in screen coordinates. This message need only be supported by container objects that return -1L in response to the API_WHATS_INSERTABLE_AT_FN message.

Parameters - The LOWORD of lParam is a handle to global memory allocated with GMEM_LOWER. The memory is (MAXCLASSNAME + MAXTITLE + 2) bytes in size.

MAXCLASSNAME (defined in NWOMF.H) is the maximum length of the PROP_CLASSNAME property. MAXTITLE (also defined in NWOMF.H) is the maximum length of the PROP_TITLE property. The two extra bytes are for NULLs.

HIWORD is not used.

The receiver of this message should lock the handle that was passed and read the PROP_CLASSNAME string followed by the PROP_TITLE string. The two strings are packed into memory (e.g., "Desktop\0NewWave\0" where "\0" indicates the NULL character).

Return Value - The memory pointer should be cast into a long pointer to a POINT structure. If the above object does exist as a child of the receiver, the position of its representation (view or icon) should be written into shared memory. The value -1 should be written into the word following the point structure in shared memory. If the object does not exist, point.x and point.y should be set to zero and the value zero should be written into the word following the point structure in shared memory.

The handle should be unlocked before returning.

API_INTERROGATE_MSG

The return value from the call should be -1L to indicate success and 0L to indicate a problem.

Special Notes - If the receiver of this message has a scrollable window, and the child object in question does not happen to be visible at the moment, this is NOT an error. The return region, in screen coordinates, should reflect the "correct" position of the child object.

The returned position should be an x,y pair that would have meaning to the object if it received an OMF_INSERT message with these values in the x,y fields of the OMFINSERTSTRUCT. For example, the Desktop responds to this message by returning the exact center of the child object's icon.

API_RENDER_HELP_FN

During Help processing with the question mark cursor, the point in the application display coordinates will be passed in the lParam of this interrogation function. The application will determine the Help ID and pass this back as the return value for this message.

This value will be used to access the help built by the Help Facility and allows Help on user interface elements managed by the application.

API_PLAYBACK_MSG

Purpose To POST the external form of the command to the application so that it can be translated to the internal form and executed by the application.

Parameters *wParam* is ignored (= 0).

*lParam* has a LOWORD that is a handle to a global buffer, containing the external form of the command.

Return Value The return value is TRUE if the message has been accepted.

API_SET_MODE_FLAGS_MSG

Purpose This message requests an application to change the mode bits in the APIModeFlags so that the flow of the control inside the application will be changed.

Parameters *wParam* is either API_SET_MODE_OFF_FLAG or API_SET_MODE_ON_FLAG.

*lParam* is a string of bits that you process in your application. If wParam is in the ON mode, the application should perform a bitwise "OR" with the existing APIModeFlags. If wParam is OFF, then the application should "AND" lParam and the existing APIModeFlags.

Return Value The return value is TRUE if the message has been accepted.

Example
```
case: API_SET_MODE_FLAGS_MSG
    if (wParam == API_SET_MODE_ON_FLAG)
        APIModeFlags = APIModeFlags | lparam;
    else
        APIModeFlags = APIModeFlags & lparam;
    break;
```

6  OMF Messages

OMF MESSAGES This section describes the standard OMF defined messages which objects should process. The OMF messages are defined in the file NWOMF.H.

There are three basic types of OMF messages: *normal*, *library*, and *view*.

*Normal messages* are received by the *window procedure* of the main window of the application. These messages have a message type of WM_OMF and contain the OMF message ID in their *wParam* argument. The *lParam* argument of the message is message-dependent.

*Library messages* are received by the *message procedure* of the library encapsulating a dynamic access object. These messages have a *wMsg* argument that contains the OMF message ID, and an *lParam* argument that is message-dependent. Library messages also have the arguments *hObjData* and *hUserData* that are for the library to store object data and usage data, respectively.

*View messages* are received as either normal messages by the source object of a view or as library messages by the snapshot object associated with a view, depending on how the source object has managed the view. In contrast to normal and library messages, view messages only have a single word, message-dependent argument called *wViewParam*. This word is passed in the low order word of the *lParam* of the normal or library message. When a view message is received as a normal message, the high order word of *lParam* will specify the data ID of the view.

Applications may want to define further messages to send to each other by this mechanism. This is allowed as long as the constant values chosen for the definitions of these messages do not clash with the predefined OMF messages listed above. To do this, applications should use values for such messages greater than or equal to the predefined constant OMF_USER and less than or equal to MAX_METHOD_ID.

Application-defined messages may only be used when communicating with objects of known classes. This is because different classes may interpret the same application-defined message in completely different ways.

The messages can be classified as shown in the following summary tables:

1. OMF Messages Required for Processing
2. Major Event OMF Messages
3. General Information OMF Messages
4. OMF Message Replies
5. OMF Task Messages
6. OMF View Management Messages
7. OMF View Messages
8. OMF Messages to Dynamic Access Objects Table 6-1. OMF Messages Required for Processing

| Message | Description |
| --- | --- |
| HAS_METHOD | Inquires about supported methods. |
| TERMINATE | Informs an object that it has been deactivated. |
| DIE_PLEASE | Tells an object to terminate itself. |
| CREATE_OMF | This is the first message from the OMF when it is activated. |

Table 6-2. Major Event OMF Messages

| Message | Description |
| --- | --- |
| CREATE_OMF | This is the first message from the OMF when it is activated. |
| OPEN | The user has requested the object to open. |
| DISCARD_ICONS | The icon handles returned from OMF_GetIcon are no longer valid. |
| CLASS_CHANGE | A class has been re-installed. |
| CONFIG_CHANGE | Sent to an active object that has set its own FLAG_CONFIGNOTIFICATION flag with OMF_ObjectFlag whenever any object calls OMF_ConfigChange. |
| QUERY_SHUTDOWN | Sent to all active objects that have set their FLAG_QUERYSHUTDOWN (with OMF_ObjectFlag) when the user tries to close the Desktop. |
| WARM_START | The object is being informed of a warm start after a system shutdown. |

Table 6-3. General Information OMF Messages

| Message | Description |
|---|---|
| OBJECT_OPENING | A child (or global) object has been opened. |
| OBJECT_CLOSING | A child (or global) object has been closed. |
| ADD_CHILD | A new child object is being added. |
| LOSE_CHILD | A child is being removed. |
| ADDED_PARENT | A reference to this object was added. |
| LOST_PARENT | A reference to this object was deleted. |
| PROP_CHANGE | The properties of the object, its child object, or a global object were changed. |

Table 6-4. OMF Message Replies

| Message | Description |
|---|---|
| ENUM_OBJECT | This message is returned from an OMF_EnumObjects call. |

Table 6-5. OMF Task Messages

| Message | Description |
|---|---|
| OMF_INSERT | An object is being passed for inclusion. |
| CONTAINMENT_STATUS | Used to test if an object can accept another object being dragged on top of it. |
| CONVERT | Sent to indicate that a conversion is to take place concerning an object and a file or memory block. |
| COPY_EXTERNAL | An object is being copied. |
| DESTROY_EXTERNAL | An object is being destroyed. |
| DESTROY_MODELESS | Used when a dynamic library is called to display a modeless dialog box. |
| SERIALIZE | An object is being serialized. |
| DESERIALIZE | An object is being deserialized. |
| COPY_SELF | Sent when OMF_Copy is called for that object. |
| MULTI_INSERT | Used to test if an object can accept multiple insertions from a group drag move or copy to the object. |
| PREPARE_PRINT | An object is being started by the print spooler. |
| PRINT_ADD_TO_QUEUE | Sent from inside an application to indicate that an object is to be printed. |
| PRINT_MASTER | Tells an object to print itself in entirety. |
| WINDOW_TO_TOP | Tells an object to bring its window to the front. |
| OMF_NEW_OBJECT | Sent when the CREATOR has created a new object at your request. |

Table 6-6. OMF View Management Messages

| Message | Description |
| --- | --- |
| INIT_VIEW | Sent from a parent object to a child object to initialize a new view specification. |
| LOSE_DATAID | Sent from the OMF to a child object to indicate no more requestors remain for a data ID. |
| UPDATE_SNAPSHOT | Sent from the OMF to a child object to update a snapshot. |
| DATA_CHANGE | Sent from the OMF to a parent object to indicate that new data is available. |
| DATA_CHANGE_END | Sent from the OMF to a destination object to indicate that no more new data is available. |
| DATAID_CHANGE | Sent from the OMF to a parent object to indicate that a view's textual data ID is new. |

Table 6-7. OMF View Messages

| Message | Description |
| --- | --- |
| GET_SIZE | Determines the size of a visual view. |
| DISPLAY_VIEW | Display a visual view in another object's window. |
| PRINT_SLAVE | Print a visual view as part of another object. |

Table 6-8. OMF Messages to Dynamic Access Objects

| Message | Description |
| --- | --- |
| LIB_OBJ_INIT | Passes the root filename of the object to a dynamic access library. |
| LIB_OBJ_TERMINATE | Sent to an object when the last outstanding OMF_GetDALObject call on it is being freed up by the OMF_FreeDALObject routine. |
| LIB_USER_INIT | Sent to an object to inform it about another user, that is, that another call to OMF_GetDALObject has been made. |
| LIB_USER_TERMINATE | Sent to an object to inform it that an application using the object has called OMF_FreeDALObject on it. |
| LIB_COPY_SELF | Sent to an object when its data file must be copied. |

ADD_CHILD

Purpose This message will be sent to any object that has this method and is already active when another object calls OMF_AddChildTo to attach a child to it. (See OMF_AddChildTo in Chapter 4 "OMF Routines" section.) If the object does not support the method, the call to OMF_AddChildTo will fail and the object will not receive this message.

Parameters The *lParam* of the message will contain the PARAMETER name of the object that is being attached.

Return Value The return value from this message should be the reference name that was assigned to the child, or NULLOBJECT if an error occurred.

| | |
|---|---|
| Special Notes | The object should assign a PERSISTENT reference name to the child, update its own PROP_ADDCHILD property, update its RAM and disk data structures, and possibly update its display when it receives this message.<br><br>It is important to note that this message is only sent if the object is already active when OMF_AddChildTo is called. If it is not active, the OMF will attach the child to the object using the information in the PROP_ADDCHILD property. It is the parent's responsibility to "discover" these new children when it is next activated by calling OMF_EnumChildren. |

ADDED_PARENT

| | |
|---|---|
| Purpose | This message will be sent to an already active object that has set its FLAG_PARENTNOTIFICATION (using OMF_ObjectFlag) whenever some other object makes a new reference to it. |
| Parameters | The LOWORD of the *lParam* of the message will contain a global handle to a data structure defined like this:<br><br>```\ntypedef struct {\n  OBJECTNAME dwParent;\n  OBJECTNAME dwRefName;\n  WORD       zero;\n} PARENTNOTIFYSTRUCT;\ntypedef PARENTNOTIFYSTRUCT FAR *LPPARENTNOTIFYSTRUCT;\n```<br><br>*dwParent* will contain the PARAMETER scope name of the object's new parent, and *dwRefName* will contain the reference name that the parent assigned.<br><br>The word *zero* will always be zero for now.<br><br>The HIWORD of *lParam* is not used and will be zero. |
| Return Value | The return value from this message is currently ignored, and must be 0L. |
| Special Notes | Objects will need this notification when their Show/Manage Links dialog box is displayed, so that if additional parents are added they will also be displayed. The FLAG_PARENTNOTIFICATION should only be set when this dialog box is displayed and is listing parents (for performance reasons).<br><br>Only the following OMF routines may be called while processing this message:<br><br>OMF_FreeProperties     OMF_GetProperties<br>OMF_GetIcon     OMF_GetType<br>OMF_GetObjectState     OMF_MakeObjParam<br>OMF_GetOMFDirectory     OMF_ReadProperty<br>OMF_GetOMFError     OMF_ReadPropertyHandle<br>OMF_GetOMFVersion |

CLASS_CHANGE

| | |
|---|---|
| Purpose | This message will be sent to all active objects which have their FLAG_CLASSNOTIFICATION flag set whenever installation has caused an existing class to be overwritten. When this message is received, any strings returned from OMF_GetType, or any other class properties being displayed or held in local data structures should be discarded (and gotten again if need be). |
| Parameters | *lParam* is not currently used and will be zero. |
| Return Value | The return value is currently ignored and must be zero. |

CONFIG_CHANGE

Purpose Sent to an active object that has set its own FLAG_CONFIGNOTIFICATION flag with OMF_ObjectFlag whenever any object calls OMF_ConfigChange.

Objects that are displaying date/time information should enable this notification. They should process the message by reformatting and redisplaying the date/time information if lParam is PROP_TIMEZONE.

Parameters *lParam* is the dwName parameter from the OMF_ConfigChange call. This will be either PROP_CREATOR or PROP_TIMEZONE.

Return Value The return value is currently ignored and must be zero.

CONTAINMENT_ STATUS

Purpose Objects that accept other objects being dragged on top of their icon on the Desktop or in a Folder should supply this method. For example, SPIN (the printer icon) supports this method so it can queue an object for printing when it is dragged on top of the SPIN icon.

Special Notes Most objects should not support this message, and should thus not specify this message name in the HAVE_METHODS section of their installation file, and should return NO_METHOD on a HAS_METHOD message for this method.

Note that this method is never actually performed. It only serves to inform the Desktop/Folder that containment is supported.

If the method is supported, the Desktop/Folder will use the OMF_AddChildTo routine (if the ADD_CHILD method is supported) or send an OMF_INSERT message (if ADD_CHILD is not supported) to pass the dragged object to the receiver.

Note ☞ If the receiving object wishes to receive a copy of the dragged object, rather than the object itself, it must NOT support ADD_CHILD. While it processes the OMF_INSERT message, it should make a reference to the passed object, make a copy of that reference to a new reference, delete the reference to the original, and return FALSE in the LOWORD of the message return value.

CONVERT

Purpose Sent to indicate that a conversion is to take place concerning an object and a file or memory block.

Parameters The LOWORD of *lParam* contains a global handle to the parameter structure. This handle must be allocated GMEM_LOWER. The HIWORD of *lParam* is reserved and must be zero.

The parameter structure looks like this:

```
typedef struct {
    WORD        Flags;
    WORD        Type;
    WORD        FileNameOffset;
    HANDLE      hMemory;
    WORD        zero;
} CONVERTSTRUCT;
```

The flags use the following bits:

```
#define CNV_FROM_OBJECT    0x0000    /* Shows the direction */
define CNV_TO_OBJECT      0x0001    /* of the conversion.  */ define CNV_MPE_TYPE       0x0000    /* MPE type?           */
define CNV_STRING_TYPE    0x0002    /* Offset to string?   */
define CNV_NW_TYPE        0x0004    /* NewWave integer?    */ define CNV_FILE           0x0000    /* Transfer file?      */
define CNV_MEMORY         0x0008    /* Transfer memory?    */ define CNV_NO_USER_MSG    0x0010    /* Return -1, no msg   */ define CNV_MERGE          0x0020    /* Merge converted data*/
```

Only one from each of the above groups can be or'd together. Note that CNV_FROM_OBJECT, CNV_MPE_TYPE, and CNV_FILE are 0, thus they are defaults.

If CNV_FILE and/or CNV_STRING_TYPE are set, the structure is followed by one or two null terminated strings. The sender should be careful to set up these strings and the offsets in Type and/or FileNameOffset carefully.

The type may be an MPE file code, an offset from the parameter structure to a null terminated string naming the data type, or a NewWave integer type. String types are for non-HP parties to define new conversion types. These software developers should prefix their string types with their company name (or an abbreviation of it) in order to avoid collisons with each other. General purpose common types should be set up as pre-defined NewWave integer types.

The NewWave integer types are:

```
#define CT_ROMAN8_TEXT   1  /* CF_TEXT with HP Roman8 chars */
#define CT_ANSI_TEXT     2  /* CF_TEXT                      */
#define CT_IBM8_TEXT     3  /* CF_TEXT with IBM-8 chars     */
```

The MPE types are:

```
#define MPE_SOF            1468    /* Serial Object Format */
#define MPE_DL             1166    /* Distribution list    */
#define MPE_TEXT           1167    /* HPDesk text          */
#define MPE_MEMOMAKR       1265    /* MemoMaker            */
#define MPE_DCA_REVISABLE  1270    /* revisable DCA        */
```

All of the above formats are null terminated if in memory, or else they end at the file EOF if in a file.

Return Value  If the requested conversion is not supported, an object receiving this message should return 0 in the LOWORD of the return value. In this case, it is the sender's responsibility to display a message to the user if appropriate. If the conversion is supported but some error occurred during its processing, the receiver should check the CNV_NO_USER_MSG bit; if it is clear, then the appropriate error message should be displayed (in a system-modal dialog/message box). A value of -1 should then be returned in the LOWORD of the return value. If the conversion was successful, then 1 should be returned in the LOWORD of the return value.

The HIWORD of the return value must be zero.

COPY_EXTERNAL

Purpose  When an object with this method is being copied, the OMF will copy the object (including its data files and properties), then activate the copy and send it this message.

This method must be specified in the HAVE_METHODS section of the object's installation file in order for it to receive this message.

Parameters  lParam is not currently used and will be zero.

Return Value  The LOWORD of the return value should be TRUE for success, FALSE for an error. If FALSE is returned, the object will be destroyed and the whole copy operation will fail.

The HIWORD of the return value must be zero.

Special Notes  The object should copy the external data associated with it, and update its data files and/or properties. If user interaction is needed, it must be done with a *system* modal message or dialog box.

Only the following OMF routines may be called while processing this message:

| | |
|---|---|
| OMF_EnumChildren | OMF_GetOMFVersion |
| OMF_EnumChildrenOf | OMF_GetProperties |
| OMF_EnumGlobalObjects | OMF_GetType |
| OMF_EnumObjects | OMF_Init |
| OMF_EnumParents | OMF_MakeObjParam |
| OMF_EnumParentsOf | OMF_ObjectFlag |
| OMF_FreeProperties | OMF_PassWindowHandle |
| OMF_GetIcon | OMF_ReadProperty |
| OMF_GetObjectState | OMF_ReadPropertyHandle |
| OMF_GetOMFDirectory | OMF_WriteProperty |
| OMF_GetOMFError | OMF_Term |

COPY_SELF

Purpose OMF sends this message to any active object that is part of a compound object being copied by a call to OMF_Copy on SELF.

OMF will also send the message to an object if it needs to be copied and it is active only because of an outstanding OMF_GetView request on it.

All data objects and other objects that can be included by data objects should support this method.

Parameters The LOWORD of *lParam* is a global handle to the null terminated root file name of the destination object, in the ANSI character set.

Extensions should not be appended directly to this string. A copy of the string must be made first. The application should not leave this handle locked, and it should not free the handle.

The HIWORD of *lParam* is a flag which will be non-zero if the application is being sent a second COPY_SELF because it returned CS_COPYFILES to the first message.

Return Value The application should return one of these values in the LOWORD of the message return value:

CS_ERROR if some error occurred in the object,
CS_DONE if the object copied the data files successfully,
CS_COPYFILES if the object wants the OMF to copy the files, and then send it another COPY_SELF message.

If CS_COPYFILES is returned from the second COPY_SELF message, it is equivalent to returning CS_DONE.

The HIWORD of the return value must be zero.

Special Notes There are two jobs the application should do while processing this message: (1) control the copying of its children, and (2) copy its data files.

By default, the OMF will copy all of the object's children after it copies the object (or at least make an additional reference to a public child). However, the object can cause the copying of some of its children to be suppressed. It does this by calling OMF_Copy (hOMF, NULLOBJECT, childname, 0) for each child that it wants to suppress copying. This feature can be used to prevent the object being created from getting copies of children which are being temporarily held for Undo or Close, No Save.

The object must create new data files for the copy of itself. In general, it uses the root file name passed as a parameter to build the correct file name(s), and writes to those files the object's current state, but as Saved data. In other words, the destination files(s) should look the same as if the application did a Save, and copied those files. BUT, the application should NOT do a Save. If the application creates the new data files itself, it should return CS_DONE from the message.

Some applications keep both their current and last saved states in their data file(s). These applications can return CS_COPYFILES from the COPY_SELF message to tell the OMF to copy the data files and then send another COPY_SELF message. During the first COPY_SELF message, the application should post any changes to the data files(s). During the second COPY_SELF message, the application should alter the destination file(s) to make its Saved state equal the original's current state.

Only the following routines may be called while processing this message:

| | |
|---|---|
| OMF_Copy | OMF_GetOMFDirectory |
| OMF_EnumChildren | OMF_GetOMFError |
| OMF_EnumChildrenOf | OMF_GetOMFVersion |
| OMF_EnumGlobalObjects | OMF_GetProperties |
| OMF_EnumObjects | OMF_GetType |
| OMF_EnumParents | OMF_MakeObjParam |
| OMF_EnumParentsOf | OMF_ObjectFlag |
| OMF_FreeProperties | OMF_ReadProperty |
| OMF_GetIcon | OMF_ReadPropertyHandle |

CREATE_OMF

Purpose This message is the first OMF message an object will receive. Objects should defer any OMF dependent initialization (other than calling OMF_Init) until they get this message, because the OMF has not fully initialized the object until then.

Parameters lParam contains a value that allows the object to determine why it is being activated. It will be one of the following:

```
ABOUT_TO_WARMSTART   - system startup.
ABOUT_TO_COPY        - to receive COPY_EXTERNAL.
ABOUT_TO_DESTROY     - to receive DESTROY_EXTERNAL.
ABOUT_TO_SERIALIZE   - to receive SERIALIZE.
ABOUT_TO_DESERIALIZE - to receive DESERIALIZE.
ABOUT_TO_VIEW        - to receive a view message.
ABOUT_TO_DATA_CHANGE - to receive DATA_CHANGE.
USER_ACTIVATE        - a call to OMF_GetOMFObject.
```

Return Value The LOWORD of the return value should specify whether or not the object was able to initialize itself. CO_OK should be returned if initialization was successful or CO_ERROR if it was not. If CO_ERROR is returned, the object will immediately be sent TERMINATE and DIE_PLEASE messages. The HIWORD of the return value is not currently used and must be zero.

Special Notes When lParam is ABOUT_TO_COPY, only the following OMF routines may be called:

| | |
|---|---|
| OMF_EnumChildren | OMF_GetOMFVersion |
| OMF_EnumChildrenOf | OMF_GetProperties |
| OMF_EnumGlobalObjects | OMF_GetType |
| OMF_EnumObjects | OMF_Init |
| OMF_EnumParents | OMF_MakeObjParam |
| OMF_EnumParentsOf | OMF_ObjectFlag |
| OMF_FreeProperties | OMF_PassWindowHandle |
| OMF_GetIcon | OMF_ReadProperty |
| OMF_GetObjectState | OMF_ReadPropertyHandle |
| OMF_GetOMFDirectory | OMF_WriteProperty |
| OMF_GetOMFError | OMF_Term |

CREATE_OMF

When lParam is ABOUT_TO_DESTROY, only the following OMF routines may be used:

OMF_EnumChildren
OMF_EnumChildrenOf
OMF_EnumGlobalObjects
OMF_EnumObjects
OMF_EnumParents
OMF_EnumParentsOf
OMF_FreeProperties
OMF_GetIcon
OMF_GetObjectState
OMF_GetOMFDirectory
OMF_GetOMFError OMF_GetOMFVersion
OMF_GetProperties
OMF_GetType
OMF_Init
OMF_MakeObjParam
OMF_ObjectFlag
OMF_PassWindowHandle
OMF_ReadProperty
OMF_ReadPropertyHandle
OMF_Term When lParam is ABOUT_TO_SERIALIZE, only the following OMF routines may be used:

OMF_EnumChildren
OMF_EnumChildrenOf
OMF_EnumGlobalObjects
OMF_EnumObjects
OMF_EnumParents
OMF_EnumParentsOf
OMF_FreeProperties
OMF_GetIcon
OMF_GetObjectState
OMF_GetOMFDirectory
OMF_GetOMFError OMF_GetOMFVersion
OMF_GetProperties
OMF_GetType
OMF_Init
OMF_MakeObjParam
OMF_ObjectFlag
OMF_PassWindowHandle
OMF_PutSerialData
OMF_ReadProperty
OMF_ReadPropertyHandle
OMF_Term When lParam is ABOUT_TO_DESERIALIZE, only the following OMF routines may be used:

OMF_EnumChildren
OMF_EnumChildrenOf
OMF_EnumGlobalObjects
OMF_EnumObjects
OMF_EnumParents
OMF_EnumParentsOf
OMF_FreeProperties
OMF_GetIcon
OMF_GetObjectState
OMF_GetOMFDirectory
OMF_GetOMFError
OMF_GetOMFVersion OMF_GetProperties
OMF_GetSerialData
OMF_GetSerialDataHandle
OMF_GetType
OMF_Init
OMF_MakeObjParam
OMF_ObjectFlag
OMF_PassWindowHandle
OMF_ReadProperty
OMF_ReadPropertyHandle
OMF_Term
OMF_WriteProperty

DATA_CHANGE

| | |
|---|---|
| Purpose | Sent from a source object (by calling OMF_AnnounceNewData) to a destination object to announce that new data is available through a view. |
| Parameters | *lParam* of the message contains the DATALINK reference name that the destination has for the source object and view. |
| Return Value | The return value is not currently used and must be zero. |
| Special Notes | If the destination is inactive and is not itself the source of any views, then it will not receive this message. |
| | While processing this message, the destination object may use OMF_SendViewMsg to read the new data from the view. It may also call OMF_SetNewData to mark any views for which it is the source if the data associated with them has changed. However, it *should not* call OMF_AnnounceNewData while processing this message. Instead, it should defer calling OMF_AnnounceNewData until a DATA_CHANGE_End message is received. |

DATA_CHANGE_END

| | |
|---|---|
| Purpose | Sent to a destination object following a series of one or more DATA_CHANGE messages. If the destination object in turn is itself a source of views that were changed while processing the DATA_CHANGE messages, then that object should call OMF_AnnounceNewData to announce the availability of the new data. |
| Parameters | *lParam* is not used and will be zero. |
| Return Value | The return value is currently ignored and must be zero. |

DATAID_CHANGE

| | |
|---|---|
| Purpose | Sent to a destination object of a view if it is active when the source object calls OMF_SetDataIdText on the data ID of the view. The object must have set its own FLAG_DATAIDNOTIFICATION flag (with the OMF_ObjectFlag routine) to receive this message. |
| Parameters | The *lParam* of the message contains the DATALINK reference name of the source object whose data ID has changed. |
| Return Value | The return value is not used and must be zero. |
| Special Notes | Only the following OMF routine may be called while processing this message: |
| | OMF_GetDataIdText |

DESERIALIZE

Purpose  This message allows the OMF to inform an application to deserialize its own data. The application must have the DESERIALIZE method specified in the HAVE_METHODS clause of its installation file in order to receive this message.

Parameters  lParam is not used and will be zero.

Return Value  The LOWORD of the return value is a boolean value which, if FALSE, specifies that the object's self-deserialization failed. A value of TRUE indicates success.

The HIWORD of the return value must be zero.

Special Notes  Applications should use the OMF_GetSerialData and OMF_GetSerialDataHandle calls to read all of their own self-serialized data before returning from the DESERIALIZE message.

Applications should not yield while deserializing their data. Error reports should use MessageBox with a type of MB_SYSTEMMODAL.

Only the following OMF routines may be called while processing this message:

| | |
|---|---|
| OMF_EnumChildren | OMF_GetProperties |
| OMF_EnumChildrenOf | OMF_GetSerialData |
| OMF_EnumGlobalObjects | OMF_GetSerialDataHandle |
| OMF_EnumObjects | OMF_GetType |
| OMF_EnumParents | OMF_Init |
| OMF_EnumParentsOf | OMF_MakeObjParam |
| OMF_FreeProperties | OMF_ObjectFlag |
| OMF_GetIcon | OMF_PassWindowHandle |
| OMF_GetObjectState | OMF_ReadProperty |
| OMF_GetOMFDirectory | OMF_ReadPropertyHandle |
| OMF_GetOMFError | OMF_Term |
| OMF_GetOMFVersion | OMF_WriteProperty |

Note   It is possible to deserialize an object whose class has not been installed. OMF will arbitrarily assign a class, icon, and text ID, and provide an executable file that simply says "Class xxx has not been installed." The object's only method is OPEN. If it was self-serialized, then an image of the self-serialized data is kept in the object's root file name with an extension of ".S#!" When an object is started up, the object should check for a proper data file first and then look for a ".S#!" file.

DESTROY_EXTERNAL

| | |
|---|---|
| Purpose | When an object with this method is about to be destroyed, the OMF will activate it and send it this message. This is done before the object's data files and properties are destroyed. |
| | The HAVE_METHODS section of the object's installation file must specify the method in order for the object to receive this message. |
| Parameters | *lParam* is not currently used and must be zero. |
| Return Value | The return value from the message is not currently used and must be zero. |
| Special Notes | The object should destroy any external data associated with it. It need not update its data files and/or properties (as they are about to be destroyed). If user interaction is needed, it *must be* system modal. |
| | Only the following OMF routines may be called while processing this message: |

OMF_EnumChildren
OMF_EnumChildrenOf
OMF_EnumGlobalObjects
OMF_EnumObjects
OMF_EnumParents
OMF_EnumParentsOf
OMF_FreeProperties
OMF_GetIcon
OMF_GetObjectState
OMF_GetOMFDirectory
OMF_GetOMFError OMF_GetOMFVersion
OMF_GetProperties
OMF_GetType
OMF_Init
OMF_MakeObjParam
OMF_ObjectFlag
OMF_PassWindowHandle
OMF_ReadProperty
OMF_ReadPropertyHandle
OMF_Term

DESTROY_MODELESS

| | |
|---|---|
| Purpose | Used when a dynamic library is called to display a modeless dialog box. When the dialog box is to be closed, the library will send the application a DESTROY_MODELESS message, indicating that any reference to the dialog box handle should be changed to NULL. |
| Parameters | The LOWORD of *lParam* contains the handle to the modeless dialog box. |
| Return Value | The return value is not used and must be zero. |

DIE_PLEASE

| | |
|---|---|
| Purpose | This message tells an object to terminate itself. The object should destroy its window and call PostQuitMessage when it receives this message. |
| Parameters | *lParam* is not used and will be zero. |
| Return Value | The return value is not used and must be zero. |
| Special Notes | If a NewWave system shutdown is also shutting Windows down, objects will not receive this message. Because of this, DIE_PLEASE should not be used to free any disk resources. |

DISCARD_ICONS

Purpose The OMF may send a DISCARD_ICONS message to any active object which has performed an OMF_GetIcon call since it was activated. The message is sent when the OMF's icon library has been modified, thereby invalidating any handles previously returned from OMF_GetIcon. The application should repeat the OMF_GetIcon call to get new handles for any required icons before issuing DrawIcon calls.

Parameters *lParam* is not currently used and will be zero.

Return Value The return value is not currently used and must be zero.

Special Notes Any application doing an OMF_GetIcon call must be prepared to receive this message. It is also imperative that any icon handles held from previous OMF_GetIcon calls be discarded, since using them to DrawIcon can result in a crash of the system.

DISPLAY_VIEW

Purpose This is a view message. Its purpose is to display all or part of an object in another object's window. It is the CRT analog to PRINT_SLAVE.

Parameters The LOWORD of *lParam* contains the global handle to the parameter structure. The handle must be allocated with GMEM_LOWER or GMEM_DDESHARE. The HIWORD of *lParam* is zero for a snapshot. For a source object processing this message, the HIWORD is the data ID.

The parameter structure is defined as follows:

```
typedef struct {
    HDC     hDC;
    RECT    Whole;
    RECT    Part;
    WORD    Flags;
    int     Rotation;
    char    Printer[40];
    char    reserved[40];
    DWORD   rgbBkColor;
} DISPLAYSTRUCT;
```

*hDC* is the handle to the display context.

*Whole* defines the size of the rectangle containing the object (in device units).

*Part* is a subset of Whole and defines that portion of the object that is actually going to be displayed (in device units).

*Flags* is not currently used and must be zero.

*Rotation* is set by the destination object as the rotation of the view (in degrees in a clockwise direction relative to the orientation of the display context). The rotation can be between 0 and 359 degrees.

*Printer* and *reserved* are not currently used and must be filled with nulls.

*rgbBkColor* refers to the preferred background color of the parent object (red / green / blue).

| | |
|---|---|
| Return Value | The LOWORD of the return value returns 0 if an error occurs or 1 if the display is successful. |
| Special Notes | The clip region is set by the child object. The parent object supplies default values for the display context that can be used or overridden by the child object. These defaults are generally only overridden when the child object has specific values required. These attributes include: |

- Current brush and pen, including color (not usually used by child),
- Text color,
- Background color (to be used for text or non-solid paints)
- Background mode (usually opaque but may be transparent to allow for overlapping objects).

An additional parameter is passed in the display context that specifies the window background. This is normally the same as the system background (which is the default) but can be different if required.

The rectangle to be painted should be cleared to the background color by the parent to facilitate use of the transparent feature in the future.

The child should restore the display context to its original state prior to returning it to the parent.

When the rotation field is set to something other than 0, 90, 180, or 270, RealHeight and RealWidth (see the OMF message GET_SIZE) are set to the height and width of the rectangle containing the rotated view rather than actual size of the view.

ENUM_OBJECT

| | |
|---|---|
| Purpose | This message is sent to an object which has called OMF_EnumObjects, OMF_EnumGlobalObjects, OMF_EnumChildren, OMF_EnumChildrenOf, OMF_EnumParents, or OMF_EnumParentsOf. One message is sent for each object to be enumerated. |
| Parameters | The LOWORD of *lParam* contains a global handle to a structure defined like this: |

```
typedef struct {
    OBJECTNAME    dwParentName;
    OBJECTNAME    dwRefName;
    BOOL          IsActive;
    BOOL          IsOpen;
    WORD          EnumMode;
    WORD          Flags;
    OBJECTNAME    dwChildParamName;
    int           nDataId;
} ENUMOBJECTSTRUCT;
typedef ENUMOBJECTSTRUCT FAR *LPENUMOBJECTSTRUCT;
```

When enumerating global objects, *dwParentName* is always NULLOBJECT, and *dwRefName* is the GLOBAL reference name of the object.

When enumerating children or parents, *dwParentName* is the PARAMETER name of the parent object, and *dwRefName* is the reference name that the parent has for the child. When enumerating children, each message will have the same dwParentName and a different dwRefName; when enumerating parents, each message will have a different dwParentName and dwRefName (referring to the same child object, though).

The flags *IsActive* and *IsOpen* say whether the enumerated object is active and open, respectively.

*EnumMode* is always the nEnumType parameter from the EnumObjects call, i.e. 0 for global objects, 1 for children, or 2 for parents.

The word *Flags* has the bit EO_NODATAID set if dwRefName is a DATALINK name but the view specification is not initialized. In such a case, the field nDataId in this structure is not meaningful.

The field *dwChildParamName* contains the PARAMETER scope name of the child of the relationship. Thus, when enumerating children, this is the parameter name of the child, but when enumerating parents, this is always the parameter name of the object whose parents are being enumerated. When enumerating global objects, this is always the parameter name of the global object.

The HIWORD of *lParam* is not used and will be zero.

Return Value A value of TRUE or FALSE should be returned in the LOWQRD of the return value of the message. FALSE will end the enumeration, but will NOT cause the enumeration call to fail. If the object ends the enumeration prematurely with an error, and wants to know this on the return from the enumeration call, it must set a global flag.

The HIWORD of the return value must be zero.

Special Notes Any OMF routine except for OMF_Closing, and OMF_FreeOMFObject may be called while processing this message.

GET_SIZE

Purpose This is a view message. It enables an object to find the size of another object for the purpose of including the object.

Parameters The LOWORD of *lParam* is a global handle to the parameter structure, which must be allocated using GMEM_LOWER or GMEM_DDESHARE. The HIWORD of *lParam* will be zero for a snapshot or the data ID of the view for a source object.

The parameter structure is defined as follows:

```
typedef struct
    {
    int     MaxHeight;
    int     MaxWidth;
    int     Rotation;
    BOOL    PreserveAspect;
    BOOL    PreferredSize;
    char    Printer[40];
    char    reserved[40];
    WORD    zero;
    } GETSIZESTRUCT;
```

*MaxHeight* and *MaxWidth* describe the largest rectangle in which the view can fit (in units of 1/100 inch).

*Rotation* is set by the destination object as the rotation of the view (in degrees in a clockwise direction from the orientation of the display context). The rotation can be between 0 and 359 degrees. However, when this field is set to something other than 0, 90, 180, or 270, RealHeight and RealWidth are set to the height and width of the rectangle containing the rotated view rather than actual size of the view.

*PreserveAspect* is used by the destination object to set the aspect ratio of the view (height by width) as actual (TRUE) or as the largest rectangle that can fit the view (FALSE). For example, if a source object is square, a PreserveAspect value of TRUE would ensure that it is displayed at the destination as a square and not a rectangle.

*PreferredSize* is used by the destination object to set the size of the view as actual (TRUE) or as the largest rectangle that can fit the view (FALSE). If the source object has a preferred size, then use that size; otherwise, use a size appropriate to the application.

*Printer* and *reserved* are not currently used and must be filled with nulls.

*zero* is not currently used and must be zero.

Return Value  The LOWORD of the return value contains a global handle to the returned information. This handle is allocated by the receiver using GMEM_LOWER or GMEM_DDESHARE. The handle is freed by the sender after it has examined the return information.

The HIWORD of the return value must be zero.

The return information structure is defined as follows:

```
typedef struct
    {
    int     RealHeight;
    int     RealWidth;
    int     Baseline;
    int     RealRotation;
    WORD    zero;
    } RETURNSIZESTRUCT;
```

*RealHeight* and *RealWidth* refer to the actual size of the view (in units of 1/100 inch). If the source cannot stretch, then it will return the actual size regardless of the settings of the fields (unless the actual size is larger than the maximum size, in which case it will be clipped to stay within the maximum).

*Baseline* is the offset from the baseline of the view to the top of the rectangle. Except for logos, most objects will use the RealHeight as their Baseline value.

*RealRotation* is the actual rotation of the view (in degrees in a clockwise direction from the orientation of the display context). The field can be used by the destination to check whether the desired rotation was obtained.

*zero* may be used in future versions.

Special Notes  Except for having to return a size equal to or smaller than the maximum, the source can return any size that it chooses. None of the other fields in the GETSIZESTRUCT force the view to be a particular size; they are merely requests by the destination.

When a view is displayed or printed, the RealHeight, RealWidth, RealRotation, Printer, and reserved values will be passed to the source so that the view will be the same as described by the RETURNSIZESTRUCT.

If an object does not support the GET_SIZE message, the destination object will send a DISPLAY_VIEW or PRINT_SLAVE message with the whole rectangle set to the desired size, and it will be left up to the source to decide what size the views actually turn out.

Note  It is the sender's responsibility to free the return information structure after it has been examined.

HAS_METHOD

Purpose  To allow other objects to find out whether or not the object receiving the message offers processing of a message corresponding to the specified method. For example, if an application offers a serialize method, then there will be a switch in its window procedure to call the method on receipt of a SERIALIZE message.

Parameters  The LOWORD of *lParam* should be cast to an unsigned integer. It then corresponds to the appropriate message number for the method being tested.

With one exception, the HIWORD is not used and should be zero. If the LOWORD of *lParam* is MULTI_INSERT, the HIWORD will be a global handle to a structure:

```
typedef struct (
  int x, y
) XYSTRUCT;
```

*x* and *y* are the screen coordinates of the mouse button-up of a group move or copy. The receiver of the message can optionally compare the position against the positions of things inside its own window to determine what its return value should be.

Return Value  Return in the LOWORD of the return value:

METHOD_PRESENT if the object does support the method.
NO_METHOD if the object does not support the method.

The HIWORD of the return value must be zero.

Special Notes  This message must be processed by all applications.

This message should only be used when only a window handle is available. (The window handle may or may not be part of an object.) If NOT_AN_OBJECT (0L) is returned, the window should generally be checked to see if it has a parent. If so, the HAS_METHOD message should be sent again to the parent.

INIT_VIEW

Purpose  Sent by a destination object to a source object in order to initialize a new view specification. This occurs, for example, when a spreadsheet icon is dragged into a document.

If this method is supported, it must be specified in the HAVE_METHODS section of the object's installation file.

Parameters  The *lParam* of this message contains a global handle in its LOWORD.

The global memory block contains a structure that is filled in by the destination object before sending the message. The sender must allocate this block with the GMEM_LOWER or GMEM_DDESHARE options. The structure is defined as follows:

```
typedef struct (
  OBJECTNAME  duDestination;
  OBJECTNAME  duRefName;
  WORD        zero;
  WORD        MethodHints [1]; /* may be more than one */
) INITVIEWSTRUCT;
``` where:

*dwDestination* is the PARAMETER scope name of the view's destination object. The destination object fills in dwDestination before sending the message by calling OMF_MakeObjParam on SELF.

*dwRefName* is the DATALINK reference name that the destination uses for the source object and view.

*zero* is always set to zero by the destination object before sending the message. This may be useful if we need to add information to the structure in the future.

*MethodHints* is an array of view method IDs that will be used by the destination. It is terminated by an entry of -1. The first word of the array may be -1, meaning that the destination is not supplying any hints. The source object may optionally examine these hints to determine which type of snapshot to use for this view.

The MethodHints protocol must be used with great care. A source object snapshot must still be able to execute any of the methods advertised in the source object's PROP_VIEWMETHODS for view class 0. Note also that once a snapshot has been created for a particular data ID, its class cannot be changed. Thus, the snapshot originally created to serve one destination may eventually be required to service other destinations of different types. For this reason, a source object should be careful not to choose an overly specialized snapshot.

The HIWORD of *lParam* is not used and must be zero.

Return Value The source object should set the LOWORD of its return value to TRUE, unless it was unable to initialize the view specification in which case it should return FALSE.

The HIWORD of the return value must be zero.

Special Notes While processing the message, the source object must call OMF_InitViewSpec to initialize the view specification, using dwDestination and dwRefName to identify the link.

The ViewClass parameter to OMF_InitViewSpec must be zero while processing this message because the destination object has already tested and accepted the view methods of that view class.

LIB_COPY_SELF

Purpose This is a library message. OMF sends this message to any active snapshot that needs to be copied due to a call to OMF_Copy.

All dynamic access library objects (DALs) that are used as snapshots should support this method.

Parameters *hObjData* is the handle that the object returned when it processed the LIB_OBJ_INIT message.

*hUserData* is always NULL.

*lParam* is a long pointer to the null terminated root file name of the destination object. Extensions should not be appended directly to this string. A copy of the string must be made first. This filename is in the ANSI character set.

| | |
|---|---|
| Return Value | The application should return one of these values in the LOWORD of the message return value:<br><br>CS_ERROR if some error occurred in the object.<br>CS_DONE if the snapshot copied the data files successfully.<br>CS_COPYFILES if the snapshot has updated its own files and wants the OMF to copy them. |
| Special Notes | While processing this message, the DAL object should create new files using the destination root file name. The new files should represent the same state of the snapshot as if the snapshot was inactive and its files were copied.<br><br>Alternatively the snapshot can check that its data files are up-to-date and return CS_COPYFILES from the LIB_COPY_SELF message. The OMF will then simply copy the snapshot's data files.<br><br>The snapshot object should list this method in the HAVE_METHODS section of the installation file.<br><br>Note that the LIB_COPY_SELF protocol differs from the COPY_SELF protocol in that no second message is sent if CS_COPYFILES is returned. |

LIB_OBJ_INIT

| | |
|---|---|
| Purpose | This is a library message. It passes the root filename of the object to a dynamic access library. The message is sent when the first OMF_GetDALObject call for the object is made. Until the first OMF_GetDALObject call for the object is matched by an OMF_FreeDALObject, no further LIB_OBJ_INIT messages will be sent. LIB_OBJ_INIT will always be the first message sent to a DAL object. |
| Parameters | *hObjData* and *hUserData* will both be NULL for this message.<br><br>*lParam* contains a long pointer to the root filename of the object, as a null terminated string.<br><br>This filename is in the ANSI character set. An extension should not be appended directly to this string. A copy of the string must be made first. |
| Return Value | The library should return a handle in the LOWORD of its return value. All subsequent messages sent to this object will pass this handle in the hObjData parameter. NULL should be returned if an error occurs.<br><br>The returned handle can either be from LocalAlloc or GlobalAlloc. If GlobalAlloc is used, the GMEM_LOWER option must be used. At the very least, the library must copy the root filename to this memory block.<br><br>GMEM_DDESHARE can also be used, but if so, the memory block will be read-only on all subsequent messages.<br><br>The HIWORD of the return value must be zero. |
| Special Notes | If the library opens the object data file while processing this message, it must not leave the file open when it returns. |

LIB_OBJ_TERMINATE

Purpose This is a library message. It is sent to an object when the last outstanding OMF_GetDALObject call on it is being freed up by OMF_FreeDALObject. This is the last message that an object will receive without receiving another LIB_OBJ_INIT message.

Parameters *hObjData* will be the handle that was returned by the object when it received the LIB_OBJ_INIT message.

*hUserData* will be NULL.

*lParam* is not used and will be zero.

Return Value A non-zero value (TRUE) should be returned in the LOWORD of the return value, unless there is an error in which case zero is returned.

The HIWORD of the return value must be zero.

Special Notes The object should free the handle hObjData. Any other resources for this object should be freed.

LIB_USER_INIT

Purpose This is a library message. It is sent to an object to inform it about another user, that is, that another call to OMF_GetDALObject has been made. Unlike LIB_OBJ_INIT, the object receives a LIB_USER_INIT message for each call to OMF_GetDALObject.

Parameters *hObjData* will be the handle returned by the object when it received the LIB_OBJ_INIT message.

*hUserData* is NULL.

*lParam* is not used and will be zero.

Return Value The object should return a handle in the LOWORD of its return value. All subsequent messages to this object by the same user will pass this handle in the hUserData parameter. NULL should be returned if an error occurs. If the library does not maintain user-specific data for the object, -1 can be returned without causing an error.

The returned handle can either be from LocalAlloc or GlobalAlloc. If GlobalAlloc is used, the GMEM_LOWER option should be used. GMEM_DDESHARE can also be used, but if so, the memory block will be read-only on all subsequent messages.

The HIWORD of the return value must be zero.

Special Notes If the library opens the object data file while processing this message, it must not leave the file open when it returns.

LIB_USER_TERMINATE

| | |
|---|---|
| Purpose | This is a library message. It is sent to an object to inform it that an application using the object has called OMF_FreeDALObject on it. |
| Parameters | *hObjData* will be the handle returned when this object received the LIB_OBJ_INIT message. |
| | *hUserData* will be the handle returned when this object received the LIB_USER_INIT message. |
| | *lParam* is not used and will be zero. |
| Return Value | A non-zero value (TRUE) should be returned in the LOWORD of return value, unless there is an error in which case zero is returned. |
| | The HIWORD of the return value must be zero. |
| Special Notes | The object should free the handle hUserData (if the library is maintaining user-specific data for the object). |

LOSE_CHILD

| | |
|---|---|
| Purpose | This message will be sent to any object that has this method and is already active when another object calls OMF_RemoveChildFrom to remove a child from it. (See OMF_RemoveChildFrom in Chapter 4 "OMF Routines".) If the object does not support the method, the call to OMF_RemoveChildFrom will fail and the object will not receive this message. |
| Parameters | The *lParam* of the message will contain the reference name of the child that is to be removed. |
| | The object should delete its reference to the child, update its own PROP_ADDCHILD property, update its own RAM and disk data structures, and possibly update its display. |
| Return Value | The LOWORD of the message return value should be TRUE if everthing was successful, otherwise FALSE should be returned. This return value is passed back from OMF_RemoveChildFrom. |
| | The HIWORD must be zero. |
| Special Notes | It is important to note that this message is only sent if the parent is already active. If it is not active, the OMF will remove the child and update the PROP_ADDCHILD property. It is the responsibility of the object when it is next activated to discover that it has lost children by calling OMF_EnumChildren. |

LOSE_DATAID

| | |
|---|---|
| Purpose | Sent to a source object if that object is already active when a DATALINK to it is deleted and that link was the last link using a particular data ID. |

| | |
|---|---|
| Parameters | The LOWORD of *lParam* of the message will contain the data ID that is no longer in use. |
| | The HIWORD of *lParam* is not used and will be zero. |
| Return Value | The return value is currently ignored and must be zero. |
| Special Notes | The object should reclaim any storage associated with the data ID. |
| | Since the notification is only sent to already active objects, source objects should use OMF_GetDataIdUsage while processing CREATE_OMF to determine if any data IDs were lost while the object was inactive. |
| | Only the following OMF routines may be called while processing this message: |
| | OMF_FreeDALObject |
| | OMF_SendDALMsg |

LOST_PARENT

| | |
|---|---|
| Purpose | This message will be sent to an already active object that has set its FLAG_PARENTNOTIFICATION (using OMF_ObjectFlag) whenever some other object deletes a reference to it. |
| Parameters | The LOWORD of the *lParam* of the message will contain a global handle to a data structure defined like this: |

```
typedef struct (
    OBJECTNAME  dwParent;
    OBJECTNAME  dwRefName;
    WORD        zero;
) PARENTNOTIFYSTRUCT;
typdef PARENTNOTIFYSTRUCT far *LPPARENTNOTIFYSTRUCT;
```

| | |
|---|---|
| | *dwParent* will contain the PARAMETER scope name of the object's parent that is deleting the reference, and *dwRefName* will contain the reference name that is being deleted. |
| | The word *zero* is set to zero. |
| | The HIWORD of *lParam* is not used and is zero. |
| Return Value | The return value from this message is currently ignored and must be zero. |
| Special Notes | Objects will need this notification when their Show / Manage Links dialog box is displayed, so that if a parent deletes a reference to the object that link will be removed from the list of parents. For performance reasons, objects should only set their FLAG_PARENTNOTIFICATION when they have this dialog box displayed and are listing parents. |
| | Only the following OMF routines may be used while processing this message: |
| |     OMF_FreeProperties |
| |     OMF_GetIcon |
| |     OMF_GetObjectState |
| |     OMF_GetOMFDirectory |
| |     OMF_GetOMFError |
| |     OMF_GetOMFVersion |
| |     OMF_GetProperties |
| |     OMF_GetType |
| |     OMF_MakeObjParam |
| |     OMF_ReadProperty |
| |     OMF_ReadPropertyHandle |

MULTI_INSERT

Purpose Containers will test this method before sending multiple OMF_INSERT messages from a group drag move or copy to the object. Objects which do not support accepting multiple objects in a single operation should NOT support this method.

Special Notes This message is never actually sent. If the method is supported, OMF_INSERT messages will be sent, otherwise no messages are sent.

The HAS_METHOD message sent to test if an object supports MULTI_INSERT will also pass the screen position of the mouse button-up (see HAS_METHOD description). The receiver can use this position to determine whether to return METHOD_PRESENT or NO_METHOD.

OBJECT_CLOSING

Purpose This message is sent to all active parents of an object calling OMF_Closing. Parents should ungray any representation of the child that is on the display.

This message is also sent to any objects which have an outstanding OMF_GetOMFObject call on the object calling OMF_Closing.

If an object has set its FLAG_GLOBALNOTIFICATION, then it will also receive this message whenever any global object calls OMF_Closing.

Parents wishing to provide the "telescope effect" when their children are closed should set their own FLAG_SENDRECTS, so that they will receive the window rectangle of the child.

Parameters If the receiving parent *has not* set its FLAG_SENDRECTS, then *lParam* is the OBJECTNAME of the child that is closing.

If the receiving parent *has* set its FLAG_SENDRECTS, then the LOWORD of *lParam* is a global handle to a structure:

```
typedef struct {
   OBJECTNAME RefName;
   RECT       Rect;
} CHILDRECTSTRUCT,
  far *LPCHILDRECTSTRUCT;
```

*RefName* is the OBJECTNAME of the child that is closing.

*Rect* is the rectangle passed by the child to OMF_ Closing. If the child passed NULL for the rectangle, then all fields of *Rect* will be zero. The NW_TelescopeEffect routine should be used to produce the telescope effect from the Rect parameter to the icon of the object in the receiver's window. NW_TelescopeEffect should not be called if Rect.bottom is zero.

The HIWORD of *lParam* is not used and will be zero.

Return Value The return value is currently ignored and should be zero.

Special Notes Note that objects that set FLAG_SENDRECTS should do so while processing CREATE_OMF to avoid the possibility of receiving OBJECT_CLOSING with an OBJECTNAME in lParam when a handle is expected.

OBJECT_OPENING

Purpose This message is sent to all active parents of an object calling OMF_Opening. Parents should gray any representation of the child that is on the display.

This message is also sent to any objects that have an outstanding OMF_GetOMFObject call on the object that called OMF_Opening.

If an object has set its FLAG_GLOBALNOTIFICATION flag, then it will also receive this message whenever a global object calls OMF_Opening.

Parents wishing to provide the "telescope effect" when their children are opened should set their own FLAG_SENDRECTS, so that they will receive the window rectangle of the child.

Parameters If the receiving parent *has not* set its FLAG_SENDRECTS, then *lParam* is the OBJECTNAME of the child that is opening.

If the receiving parent *has* set its FLAG_SENDRECTS, then the LOWORD of *lParam* is a global handle to a structure:

```
typedef struct (
    OBJECTNAME  RefName;
    RECT        Rect;
) CHILDRECTSTRUCT,
far *LPCHILDRECTSTRUCT;
```

*RefName* is the OBJECTNAME of the child that is opening. *Rect* is the rectangle passed by the child to OMF_Opening. If the child passed NULL for the rectangle, then all fields of Rect will be zero. The NW_TelescopeEffect routine should be used to produce the telescope effect from the icon of the object in the receiver's window to the Rect parameter. NW_TelescopeEffect should not be called if Rect.bottom is zero.

The HIWORD of *lParam* is not used and will be zero.

Return Value Is ignored and should be zero.

Special Notes Note that objects that set FLAG_SENDRECTS should do so while processing CREATE_OMF to avoid the possibility of receiving OBJECT_CLOSING with an OBJECTNAME in lParam when a handle is expected.

OMF_INSERT

Purpose This message should be processed by an application if it has the capability to include complete objects within itself via direct manipulation.

The method called when this message is processed will be expected to assign the object being inserted as one of its children. This is accomplished by the OMF_Assign call.

Parameters The LOWORD of *lParam* will contain a global handle to the message parameters. The HIWORD must be zero. The message parameters are in the following structure:

```
typedef struct (
    OBJECTNAME  dwObject;
    OBJECTNAME  dwSenderName;
    OBJECTNAME  dwDataLinkName;
    int         x, y;
    WORD        Flags;
) OMFINSERTSTRUCT,
far *LPOMFINSERTSTRUCT;
``` where:

*dwObject* is set by the sender to the PARAMETER scope name of the object being inserted.

*dwSenderName* is set by the sender to the PARAMETER scope name of itself. This field need only be set if the sender has a DATALINK scope name for the object it is passing in dwObject. Otherwise, this field should be set to 0L.

*dwDataLinkName* is set by the sender to the DATALINK scope name that the sender has for the object being inserted, or 0L if the sender does not have a DATALINK name for the object being inserted. Receivers may check if this field is a DATALINK name (using the SCOPEOF macro), and if so, copy the viewspec (using OMF_CopyViewSpec with dwSenderName and dwDataLinkName) for their own DATALINK name.

*x, y* are set by the sender to the position of the mouse cursor, in screen coordinates, when the mouse button was released. Both x and y can be set to -1, in which case the receiver will place the inserted object in its next available position. However, in most cases, the OMF_AddChildTo routine is the preferable way to accomplish this.

When handling multi-object insert, the receiver may update *x* and *y* values for subsequent messages. Thus the sender should only set them before sending the first message of a multi-object insert.

*Flags* is used for communication between the sender and receiver, and between the receiver and itself.

> Bits 0xFFF0 are not currently used, and must be set to zero by the sender.
>
> Bits 0x000F are reserved for the receiver to communicate with himself when multi-object insert is being done. The sender must zero these bits before sending the first OMF_INSERT of a multi-insert, and then leave these bits undisturbed on subsequent messages.

Senders of OMF_INSERT must allocate the message parameter structure from the global heap using the GMEM_LOWER option. It is the sender's responsibility to free the memory after the message has been sent.

Return Value   The receiver should return TRUE in the LOWORD of the message return value if the insert was successful; otherwise FALSE should be returned.

The HIWORD of the return value should always be zero.

If a receiver returns FALSE, it should also display an error message to the user with a system modal message box.

It is acceptable to return FALSE when the operation was successful, but the sender should not delete its link to the passed object to be processed.

OMF_NEW_OBJECT

Purpose   This message MAY be sent to an object that previously sent an OPEN_DBOX message to the CREATOR object.

Parameters   The *lParam* of the message contains a reference, of PARAMETER scope, to the newly created object.

Return Value   The return is not currently used and should be zero.

Special Notes   When processing this message, the object should assign the PARAMETER name to a PERSISTENT or DATALINK name.

OPEN

| | |
|---|---|
| Purpose | This message will normally be sent to an object when the user indicates that he wishes to examine or modify the content of the object. The object receiving this message should display its window to become interactive with the user and should call the OMF_Opening routine to allow it to remain active even if its parents are all closed. |
| Parameters | lParam contains a code indicating whether the shift key was down when the mouse or keyboard command was given to open the object. If the shift key was down, then the bit OP_ALTERNATE will be set. |
| Return Value | The return value is currently unused and must be zero. |
| Special Notes | All senders of OPEN should check for the shift key and set OP_ALTERNATE if appropriate. |
| | Most receivers of OPEN will ignore lParam. Shells used to encapsulate existing applications use this option to determine whether to open the shell user interface (OP_ALTERNATE set) or go straight to the standard application (OP_ALTERNATE clear). |
| | Senders cannot assume that the receiver was successful in opening. If they want to know, they should call OMF_GetObjectState on the receiver. |

PREPARE_PRINT

| | |
|---|---|
| Purpose | Objects that want to delegate their printing function to another object should support this method. When an object is dragged into SPIN's window, SPIN will check if the object has this method. If it does not have the method, SPIN will make a copy of the object and place the copy into its queue. If the object does have the method, SPIN will activate the object, send it the message, and place the object returned (the print object) into the queue. SPIN will then send a second PREPARE_PRINT so the receiver can delete his reference to the print object. |
| | Any other object that wants to send a PRINT_MASTER message to another object (i.e. for recursive printing) must test for PREPARE_PRINT, and if it is present, use the above protocol rather than PRINT_MASTER. |
| Parameters | The LOWORD of lParam is a flag to indicate whether this is the first or second message of the protocol. It is FALSE for the first message and TRUE for the second. |
| | The HIWORD of lParam is not used and must be zero. |
| Return Value | If the LOWORD of lParam was FALSE, the PARAMETER scope name of the print object should be returned, or 0L if the print object could not be created. If 0L is returned, it is the receiver's responsibility to inform the user of the error (if appropriate). |
| | If the LOWORD of lParam was TRUE, the LOWORD of the return value should contain a boolean which is TRUE for success, FALSE for an error. The HIWORD of the return value should always be zero. If an error is returned, it is the receiver's responsibility to inform the user (if appropriate). |

Special Notes  Objects that need something other than a copy of themselves to be put in the print queue should support this method. When the first message is received, the receiver should create an object for printing (e.g. by creating a text primitive) and return the PARAMETER scope name of this object (the print object) as the message return value. 0L should be returned if the print object cannot be returned. If a name is returned, the sender must assign a PERSISTENT name to the print object (thus making the print object become one of its children), and then send a second PREPARE_PRINT message to the receiver. The receiver should then delete its reference to the print object and return.

PRINT_ADD_TO_QUEUE

Purpose  The PRINT_ADD_TO_QUEUE message is sent from an application to SPIN to indicate that an object is to be printed.

Parameters  The LOWORD of *lParam* contains a global handle to the parameter structure. The handle must be allocated using GMEM_LOWER or GMEM_DDESHARE. The HIWORD of *lParam* is not used and must be zero.

The parameter structure is defined as follows:

```
typedef struct {
    OBJECTNAME  ObjectToPrint;
    char        ObjectTitle[MAX_TEXT];
    char        DeviceName[MAX_DEVNAME];
    int         NumCopies;
    BOOL        DraftMode;
} SPINSTRUCT;
```

*ObjectToPrint* gives the PARAMETER scope name of the object which is to be printed.

*ObjectTitle* gives a title for the printer output. This generally should be set to the title of the object being printed.

*DeviceName* gives the name of the device to be used.

*NumCopies* tells SPIN how many copies should be printed. This can range from 1 to 9999.

*DraftMode* is a flag which will be passed to the print object in its PRINT_MASTER message. If set, the flag tells the object to attempt to print more quickly at the cost of lost resolution or fidelity.

Return Value  OMF returns a value of 0L if the message could not be delivered to SPIN.

Otherwise, SPIN returns the status of the print request by one of the following values:

```
#define   SE_NOERROR         0x00000001L
#define   SE_NOPRINTMETHOD   0x00000002L
#define   SE_INVALIDOBJECT   0x00000003L
#define   SE_BADDEVICE       0x00000004L
#define   SE_BADCOPIES       0x00000005L
#define   SE_BADHANDLE       0x00000006L
#define   SE_QUEUEFULL       0x00000007L
#define   SE_NOSPOOLSPACE    0x00000008L
#define   SE_OUTOFMEM        0x00000009L
#define   SE_INTERNAL        0x0000000AL
#define   SE_BUSY            0x0000000BL
#define   SE_NODEVICE        0x0000000CL
#define   SE_TOOMANYDEV      0x0000000DL
```

```
#define    SE_ABORTJOB         0x0000000EL
#define    SE_SPINBUSY         0x0000000FL
#define    SE_METHODPRESENT    0x00000010L
#define    SE_METHODABSENT     0x00000011L
#define    SE_PREPAREPRINT     0x00000012L
```

SE_NOERROR indicates that the print request was successful. All other values indicate error conditions of various sorts. If an error occurred, SPIN will notify the user, so the object should not display an error message of its own.

Special Notes When the object is to be printed, the first step is to call OMF_Copy on SELF so that a copy for printing purposes is created. Then OMF_MakeObjParam is called on the copy and that result put in the ObjectToPrint field of the parameter structure. The DeviceName field is then filled in with the name of the device to be used. The other fields of the structure must also be initialized. Then the structure is passed to SPIN with the PRINT_ADD_TO_QUEUE message. If the print request is successful, a PRINT_MASTER message will be sent to the copied object when it has reached the front of the print queue.

PRINT_MASTER

Purpose This message is sent by SPIN to tell an object to print the next portion of itself. Usually the object will receive one of these messages for each printer page output. However, when the object includes other objects through visual views, it will process multiple messages for a single printer page.

Each message passes the name of a metafile. The object should create a metafile with this name, and write the data to be printed to it. If the next portion to be printed is an included visual view, the object just passes the name of the metafile to the view in the PRINT_SLAVE message and the view creates the metafile and writes data to it.

Parameters The LOWORD of *lParam* contains a global handle to a parameter structure. The HIWORD of *lParam* is not used and will be zero.

The parameter structure is defined as follows:

```
typedef struct {
    HDC              hDC;
    char             MetaFileName[MAX_MFNAME + 1];
    BOOL             DraftMode;
    DEVICEINFOSTRUCT Device;
} PRINTMASTERSTRUCT;
```

*hDC* is the handle to the display context of the device. This display context is only provided for the object to retrieve device information; the object should NOT output to this display context.

*MetaFileName* is the name of the metafile the object should create and write to while processing this message. After the object has finished writing output to this metafile, it should close it and delete the handle to the metafile.

*DraftMode* indicates the quality of the printed output to be used. If this is non-zero, the object may lose resolution or fidelity while printing in order to print faster.

*Device* is a structure containing the following information:

```
typedef struct {
    char    Name[MAX_DEVNAME + 1];
    char    DriverName[MAX_DRIVERNAME + 1];
    char    Port[MAX_PORTNAME + 1];
```

```
    BOOL      SeparatorPage;
    BOOL      Pause;
    )         DEVICEINFOSTRUCT;
``` where:

*Name* is the name of the device being used.

*DriverName* is the name of the device driver.

*Port* is the name of the communications port being used.

*SeparatorPage* is non-zero if a separator page is printed for this device.

*Pause* is not meaningful in this context.

Return Value   The return value indicates the status of the object as follows:

| | |
|---|---|
| PM_DONE | Should be returned when the object is completely finished printed. SPIN will send the object no more PRINT_MASTER messages after this. |
| PM_NEXT_PAGE | Should be returned when the current printer page is finished. SPIN will send another PRINT_MASTER message for the next page. |
| PM_EXTERNAL | Should be returned just before and just after sending a PRINT_SLAVE view message to an included visual view. SPIN will send another PRINT_MASTER message for the next portion of the same printer page. The visual view must be printed as a separate portion so that the view can print to its own metafile. |
| PM_PASSTHROUGH | This can only be returned from the very first PRINT_MASTER message received. SPIN will send another PRINT_MASTER message, and all data written to the metafiles will be sent directly to the device in "pass through mode". |
| PM_OUTOFMEM | Should be returned if the object was unable to print because not enough memory was available. |
| PM_ERR_INTERNAL | Should be returned if the object encountered some other kind of internal error. |

PRINT_SLAVE

Purpose   This is a view message. Its purpose is to print a visual view as part of another document. It is the printer analog to DISPLAY_VIEW. The destination object will send this message to a view using the OMF_SendViewMsg function.

Parameters  The LOWORD of *lParam* contains a global handle to the parameter structure. The handle must be allocated using GMEM_LOWER or GMEM_DDESHARE. This is the value passed as wParam to the OMF_SendViewMsg function.

The parameter structure is defined as follows:

```
typedef struct (
    HDC     hDC;
    RECT    Whole;
    RECT    Part;
    WORD    Flags;
    char    MetaFileName[MAXROOTFILENAMELENGTH];
    int     Rotation;
    char    Printer[40];
    char    reserved[40];
    DWORD   rgbBkColor;
) PRINTSLAVESTRUCT;
```

*hDC* is the handle to display context for the device. This display context is only provided for you to retrieve device information; you should NOT do outut to this display context.

*Whole* defines the size of the rectangle containing the object (in device units). The view should scale its output to this rectangle even if not all of the view will be printed.

*Part* is a subset of Whole and defines that portion of the object that is actually going to be printed (in device units).

*Flags* is not currently used and must be zero.

*MetaFileName* is the name of the metafile to print to. The view must create a metafile with this name, print its data to it, close the metafile, and delete the metafile handle before returning.

*Rotation* is set by the destination object as the rotation of the view (in degrees in a clockwise direction relative to the orientation of the display context). The rotation can be between 0 and 359 degrees. However, when this field is set to something other than 0, 90, 180, or 270, RealHeight and RealWidth are set to the height and width of the rectangle containing the rotated view rather than actual size of the view (see the OMF message GET_SIZE).

*Printer* and *reserved* are not currently used and must be filled with nulls.

*rgbBkColor* refers to the preferred background color of the parent object (red / green / blue).

Return Value  The LOWORD of the return value is 0 if an error occurred or 1 if the print was successful. The HIWORD of the return value is currently not used and must be zero.

Special Notes  When the rotation field is set to something other than 0, 90, 180, or 270, RealHeight and RealWidth (see the OMF message GET_SIZE) are set to the height and width of the rectangle containing the rotated view rather than actual size of the view.

The clipping region is set by the view. The parent object supplies default values for the display context that can be used or overridden by the view.

PROP_CHANGE

Purpose Objects that have set their FLAG_PROPNOTIFICATION (using OMF_ObjectFlag) will receive this message each time their own property list, or one of their children's property lists is changed. Objects which have also set their FLAG_GLOBALNOTIFICATION will also receive this message when any global object's property list is changed.

If enabled, this message will also be sent to an object if it has an outstanding OMF_GetOMFObject call on the object whose property list has been changed.

Parameters The LOWORD of the *lParam* of this message contains a global handle to a structure defined like this:

```
typedef struct (
   OBJECTNAME  dwObject;
   DWORD       dwPropName;
   WORD        zero;
) PROPCHANGESTRUCT;
typedef PROPCHANGESTRUCT FAR *LPPROPCHANGESTRUCT;
```

*dwObject* will contain the name of the object whose property list changed. If an object is being notified that one of its own properties has been changed, this will be SELF. If the notification concerns one of the object's children, dwObject will be the reference name that the parent has for the child. If the notification concerns a global object, dwObject will be that object's GLOBAL name.

*dwPropName* will be the name of the affected property. If the HIWORD of dwPropName is non-zero, the dwPropName will be a numeric property ID (i.e., -1 in the HIWORD, *prop ID* in the LOWORD). If the HIWORD of dwPropName is zero, then the LOWORD is a global handle to the null terminated ASCII name of the affected property.

The word *zero* will always be zero for now. This field may come in handy in the future if we need to add something to the structure.

The HIWORD of *lParam* is not used and will be zero.

Return Value The return value from this message is currently ignored and must be zero.

Special Notes If a parent has multiple links to a child, it will receive multiple PROP_CHANGE messages when the child's properties are changed. Each message will have a different dwObject parameter.

QUERY_SHUTDOWN

Purpose This message is sent to all active objects that have set their FLAG_QUERYSHUTDOWN (with OMF_ObjectFlag) when the user tries to close the Desktop.

Parameters *lParam* is not used and will be zero.

Return Value In the LOWORD, TRUE allows shutdown and FALSE prevents it. The HIWORD must be zero.

Special Notes Applications that enable this message and want to prevent a shutdown are responsible for informing the user of the reason for a system model message/dialog box.

All objects should ignore the Windows messages WM_QUERYENDSESSION and WM_ENDSESSION, and should use the QUERY_SHUTDOWN and TERMINATE messages for shutdown processing.

Only the following OMF calls may be made while processing this message:

OMF_FreeProperties
OMF_GetIcon
OMF_GetObjectState
OMF_GetOMFDirectory
OMF_GetOMFError
OMF_GetOMFVersion
OMF_GetProperties
OMF_GetType
OMF_MakeObjParam
OMF_ReadProperty

SERIALIZE

Purpose This message allows the OMF to inform an application to serialize its own data. The application must have the SERIALIZE method specified in the HAVE_METHODS clause of its installation file in order to receive this message.

Parameters *lParam* is not used and will be zero.

Return Value The LOWORD of the return value is a boolean value which, if FALSE, specifies that the object's self-serialization failed. A value of TRUE indicates success.

The HIWORD must be zero.

Special Notes Applications should not yield while serializing their data. Error reports should use MessageBox with type of MB_SYSTEMMODAL.

Only the following OMF routines may be called while processing this message:

| | |
|---|---|
| OMF_EnumChildren | OMF_GetOMFVersion |
| OMF_EnumChildrenOf | OMF_GetProperties |
| OMF_EnumGlobalObjects | OMF_GetType |
| OMF_EnumObjects | OMF_Init |
| OMF_EnumParents | OMF_MakeObjParam |
| OMF_EnumParentsOf | OMF_ObjectFlag |
| OMF_FreeProperties | OMF_PassWindowHandle |
| OMF_GetIcon | OMF_PutSerialData |
| OMF_GetObjectState | OMF_ReadProperty |
| OMF_GetOMFDirectory | OMF_ReadPropertyHandle |
| OMF_GetOMFError | OMF_Term |

Note  It is possible to deserialize an object whose class has not been installed. OMF will arbitrarily assign a class icon and a text ID, and provide an executable file that simply says "Class xxx has not been installed." The object's only method is OPEN. If it was self-serialized, then an image of the self-serialized data is kept in the object's root file name with an extension of ".S#!" When an object is started up, the object should check for a proper data file first and then look for a ".S#!" file.

TERMINATE

Purpose This message is sent by the OMF to an object that is being deactivated.

There are two cases when an object could receive this message: (1) when there is a full shutdown in progress or (2) when the object receiving the message is no longer required by any other.

Normal processing on termination would include the closing of files, releasing of handles, saving of context information, etc.

Parameters The LOWORD of *lParam* is a boolean value which is set to TRUE if a full shutdown is in progress and FALSE otherwise.

The HIWORD is currently not used and is zero.

Return Value TERMINATE_OK when the termination is complete. If a full shutdown is in progress, the object can return DONE_UNTIL_WARMSTART, in which case the object will be restarted and sent a WARM_START message when the system is restarted.

Special Notes This message must be processed by all applications.

The application should not destroy its window when processing this message. The window should be destroyed on receipt of the DIE_PLEASE message.

Objects that have a Save command should internally perform this command if a full shutdown is in progress. They should not ask the user whether or not changes should be saved; the Desktop has already done this.

All objects should ignore the Windows messages WM_QUERYENDSESSION and WM_ENDSESSION, and should use the QUERY_SHUTDOWN and TERMINATE messages for shutdown processing.

If an application is re-entered with a TERMINATE message when it calls OMF_Closing, OMF_GetObjectState will return OS_ACTIVE, not OS_OPEN.

Note  Objects in general only return DONE_UNTIL_WARMSTART if they are open; and TERMINATE_OK if they are active but not open. OMF_GetObjectState can be used to determine this.

UPDATE_SNAPSHOT

Purpose Sent to a source object when a view message is sent to a view (of which that object is the source) that has an out-of-date snapshot without the "want messages" flag being set.

The source object should update the snapshot contents, call OMF_SetSnapshotState to clear the "snapshot out-of-date" flag, and return. The snapshot will then be sent the view message. The source object should get the snapshot's PARAMETER name by calling OMF_GetSnapshot.

Parameters The LOWORD of the message *lParam* is the data ID of the snapshot that needs to be updated. The HIWORD of *lParam* is not used and will be zero.

| | |
|---|---|
| Return Value | The return value should have TRUE in its LOWORD, unless there is an error and the snapshot has not been updated, in which case FALSE should be returned in the LOWORD. |
| | The HIWORD must be zero. |

WARM_START

| | |
|---|---|
| Purpose | If the shutdown of the previous session was successful, and hence all objects are in a consistent state, an object will be sent a WARM_START message when the system is restarted. |
| | Thus an object processing this message can use any context and state information which it had stored from the previous session as valid. |
| Parameters | *lParam* is not used and will be zero. |
| Return Value | The return value is currently not used and must be zero. |
| Special Notes | Objects should process this message much as they do OPEN, with possibly some additional context information being used. |

WINDOW_TO_TOP

| | |
|---|---|
| Purpose | This message is sent by the Desktop to an already open object if the user clicks on the grayed icon. The object should process the message by bringing its window to the "top" of the display (i.e. make it the frontmost window). |
| Parameters | *lParam* is not currently used and will be zero. |
| Return Value | The return value is not currently used and should be zero. |
| Special Notes | The application should process this message by calling the Windows routine BringWindowToTop on its main application window. |

7  Object Properties

PROPERTY FORMATS

| | |
|---|---|
| Property Names | Property names can be either a pre-defined generic property name from NWOMF.H, a private numeric name, or a null terminated string. The pre-defined and numeric names are actually special DWORD numbers with -1 in the HIWORD and any integer ID in the LOWORD, which are recognized by the OMF. If the 0x8000 bit is set in the ID, the property will not be copied or serialized when the object is copied or mailed. (This bit should not be used on a class property.) String property names are case sensitive; property "FOO" is not the same property as "foo". If the first letter of the property name is a dollar sign ($), the property will not be copied or mailed when the object is copied or mailed. String property names should have at least 5 characters to avoid collisions with numeric names. |

Property Formats Three common formats are used for property values:

*-1 ascii* - Null terminated ASCII strings, written by passing -1 as the parameter nLength to OMF_WriteProperty, and read by passing -(buffer size) to OMF_ReadProperty. The terminating null is not actually stored, but is added back when the property is read. This is the preferred way to store strings as property values.

*binary* - Arbitrary binary information up to 32k in length.

*existence* - Boolean values represented by the existence of the property. If the property does not exist, the value is FALSE; if it does, the value is TRUE. A zero-length value is written to define the property. This way of representing boolean values has significant storage and access time advantages.

Generic Property Formats The following table shows the format for the pre-defined properties and whether they are an object property or class property.

Table 7-1. Object Properties

| Property Name | Type | Format | Comments |
| --- | --- | --- | --- |
| PROP_ADDCHILD | Object | Binary | Contained in FASTPROPS structure. |
| PROP_CLASSNAME | Class | Ascii | NOT localized. |
| PROP_COMMENTS | Object | Ascii | |
| PROP_CREATED | Object | Binary | |
| PROP_CREATOR | Object | Binary | |
| PROP_DALNAME | Class | Ascii | Dynamic Access Objects ONLY. |
| PROP_DESKTOPFLAGS | Object | Binary | Encapsulated DOS applications only. Contained in FASTPROPS structure. |
| PROP_EVENTTRIGGERS | Class | Ascii | Global objects only. |
| PROP_EXTRADISK | Object | Binary | Contained in FASTPROPS structure. |
| PROP_FASTPROPS | Object | Binary | For reading all FASTPROPS as a structure. |
| PROP_FORMATTEDFOR | Object | Binary | WYSIWYG objects only. |
| PROP_ICONNAME | Class | Ascii | |
| PROP_ISANNOTATION | Object | Existence | Annotations only. |
| PROP_LASTWRITER | Object | Binary | Contained in FASTPROPS structure. |
| PROP_METHODS | Class | Binary | |
| PROP_MODIFIED | Object | Binary | Contained in FASTPROPS structure. |
| PROP_OLDAPPINFO | Object | Binary | Encapsulated DOS applications ONLY. |
| PROP_PUBLIC | Object | Existence | Contained in FASTPROPS structure. |
| PROP_RECEIVED | Object | Binary | Envelopes only. |
| PROP_SENDER | Object | Binary | Envelopes only. |
| PROP_SYSTEM | Object | Binary | Contained in FASTPROPS structure. |
| PROP_TEXTID | Class | Ascii | Localized. |
| PROP_TITLE | Object | Ascii | Contained in FASTPROPS structure. |
| PROP_TIMEZONE | Object | Binary | The Desktop object only. |
| PROP_USERSIZE | Object | Ascii | |
| PROP_USERUNITS | Class | Ascii | Localized. |
| PROP_VIEWMETHODS | Class | Binary | Used by source objects of views. |

PROP_ADDCHILD

*binary* - Defined as:

```
typedef struct (
   OBJECTNAME   NextRefName;
   WORD         SpaceLeft;
) ADDCHILDPROPSTRUCT;
```

Only used for objects which will allow children to be added to them while they are inactive. See the descriptions of the OMF_AddChildTo and OMF_RemoveChildFrom routines in Chapter 4 "OMF Routines" for more information.

PROP_CLASSNAME

*-1 ASCII* - This is a class property. It defines the class name for the class. This string is not ever displayed to the user; it is not localizable. This is the only unique identifier of a class of objects. Its maximum size is 64 characters, not including a null. It is defined by the installation file for the class with the CLASS_NAME statement.

*This property should never be written by applications!*

PROP_COMMENTS

*-1 ASCII* - User comments on the object. Up to 4K bytes.

PROP_CREATED

*binary DWORD* - Date and time the object was created by the "Create a New" dialog box. This is stored as seconds since 12:00 AM, January 1, 1961, Greenwich Meridian Time. This property should be considered read-only.

PROP_CREATOR

*binary structure* - The structure is defined as follows:

```
typedef struct (
   char   szMailNode [8];
   char   szCanonicalName [36];
) USERNAMESTRUCT;
```

User name of the user who created this object. This is set by the "Create a New" dialog box from the PROP_CREATOR property value of the Desktop when the object is created. Thereafter, this property should be considered read-only.

Both *szMailNode* and *szCanonicalName* contain HP Roman-8 characters; are left-justified and blank-filled; and do NOT end with a null.

Any object that changes the PROP_CREATOR of the Desktop must call OMF_ConfigChange. Calling OMF_ConfigChange causes all active objects that have set their own FLAG_CONFIGNOTIFICATION flag to receive a CONFIG_CHANGE message. The CONFIG_CHANGE message informs them which configuration variable has changed.

The library functions NW_NameToAnsi and NW_AnsiToName can convert betwen this structure and a string.

PROP_DALNAME

*-1 ASCII* - This property specifies the name of the dynamic library associated with a dynamic access library object. Only DAL objects should specify this property.

*This property should never be written by applications!*

PROP_DESKTOPFLAGS

*binary BYTE* - Used to determine whether an encapsulated DOS application object's title can be edited or not, and also whether the DOS files are destroyed when the Waste Basket is emptied.

This byte contains these flags:

0x01 - title editing allowed if set.
0x02 - data files are in DOS domain if set.
0x04 - DOS domain data files will be deleted when object is destroyed if set.
0x08 - set for all DOS objects.
0x70 - unused, must be 0.
0x80 - protects object from *move, copy, cut, share* if set.

These options are used internally by the DOS application shell and the Desktop. Applications should never write this property. Installation files may specify bits 0x04 and/or 0x80 as needed.

PROP_EVENTTRIGGERS

*-1 ASCII* - Used by the Agent to identify tasks for which this object class may be utilized.

PROP_EXTRADISK

*binary DWORD* - Most objects will not have this property, but those objects which have data stored external to the OMF data base (e.g. DOS objects) should maintain this property with the size in bytes of that external storage. This property is used by the OMF when computing the return value for OMF_GetDiskSize.

PROP_FASTPROPS

*binary* - Defined as:

```
typedef struct {
    /* PROP_MODIFIED */
    BYTE              LenModified;
    OMFDATEANDTIME    Modified;

/* PROP_LASTWRITER */
    BYTE              LenLastWriter;
    USERNAMESTRUCT    LastWriter;

/* PROP_PUBLIC */
    BYTE              LenPublic;

/* PROP_ADDCHILD */
    BYTE              LenAddChild;
    ADDCHILDPROPSTRUCT Addchild;

/* PROP_SYSTEM */
    BYTE              LenSystem;
    int               System;

/* PROP_EXTRADISK */
    BYTE              LenExtraDisk;
    DWORD             ExtraDisk;

/* PROP_DESKTOPFLAGS */
    BYTE              LenDesktopFlags;
    BYTE              DesktopFlags;

/* PROP_TITLE */
    BYTE              LenTitle;
    char              Title [32];

} FASTPROPS;
```

This property allows the values of PROP_MODIFIED, PROP_LASTWRITER, PROP_PUBLIC, PROP_ADDCHILD, PROP_SYSTEM, PROP_EXTRADISK, PROP_DESKTOPFLAGS, and PROP_TITLE to be read with a single call to OMF_ReadProperty.

Each Len... item in the structure defines the length of the associated property with the value PROPEXISTS (0x80) or'd in. A value of 0 indicates that the property does not exist. Note that the Title field is NOT null-terminated; LenTitle defines its true length.

Writing of PROP_FASTPROPS is not supported.

PROP_FORMATTEDFOR

*binary* - Defined as:

```
typedef struct (
    WORD  Flags;
    char  Device [1];
) FORMATTEDFOR;
```

This property is used by "What You See Is What You Get" (WYSIWYG) objects to identify the device for which they have been formatted. The print spooler (SPIN) will use this device, if possible, when the object is dragged to the SPIN icon, or if the object is printed from the Desktop/Filing system.

*Device* holds the null-terminated device name, as recorded in WIN.INI. *Flags* contains the flag PF_WARN. If this flag is set and the user forces SPIN to use a different device than named in Device, then the user will be warned.

PROP_ICONNAME

*-1 ASCII* - This is a class property. It defines the name of the class icon specified by the installation file. Its maximum length is 64, not including nulls. The OMF_GetIcon routine uses this property.

*This property should never be written by applications!*

PROP_ISANNOTATION

*existence* - This property exists for objects that are annotations. This determines how they will be pasted into other objects when they are on the clipboard.

PROP_LASTWRITER

*binary structure* - The structure is defined as follows:

```
typedef struct (
    char  szMailNode [8];
    char  szCanonicalName [36];
) USERNAMESTRUCT;
```

User name of the user who last modified this object. The OMF will update this when an object calls OMF_SetModified (Save for data objects, Close for others). The user name written then is the PROP_CREATOR property value of the Desktop at that time.

Both szMailNode and szCanonicalName contain HP Roman-8 characters; are left-justified and blank-filled; and do NOT end with a null.

PROP_METHODS

*binary, array of WORD* - This is a class property. It defines what methods are supported by the class. Each word in the property contains the message ID of a supported method. The length of the property is not limited. The OMF_GetMethod routine accesses this property.

*This property should never be written by applications!*

PROP_MODIFIED

*binary DWORD* - Date and time of the last modification to this object or to any of its descendants that pass data to it. This is stored as seconds since 12:00 AM, January 1, 1961, Greenwich Meridian Time. Objects should not modify this property directly, but rather should call OMF_SetModified. Objects with a Save command should make this call when the user saves them. Other objects (e.g. Folders) should do this when they are closed.

PROP_OLDAPPINFO

*binary* - This property is defined only for encapsulated DOS objects. It stores information about the DOS object.

PROP_PUBLIC

*existence* - Determines how this object will be treated when one of its parents is copied. If this property exists, the object will not be copied when one of its parents is being copied; instead the copy of the parent will get another link to this object.

PROP_RECEIVED

*binary DWORD* (same format as PROP_CREATED) - This property is set for objects that have been received through the mail system. It is only defined for objects that are in a received mail envelope. It records the date and time at which the object was received.

PROP_SENDER

*binary structure* - The structure is defined as follows:

```
typedef struct (
   char    szMailNode [8];
   char    szCanonicalName [36];
   ) USERNAMESTRUCT;
```

This property is set for objects that have been received through the mail system. It is only defined for objects that are in a received mail envelope. It records the user name of the user who mailed the object.

PROP_SYSTEM

*binary WORD* - This property controls how objects are installed. It is interpreted differently depending on whether the object being installed is GLOBAL or PERSISTENT.

For a GLOBAL object, PROP_SYSTEM should be specified in the installation file as one of the following values:

0 - The object will be permanently invisible to the user.

1 - The object is initially hidden but can be made visible by the user.

2 - The object is initially visible.

In addition, 0x0100 can be combined with one of the above values. This will prevent the user from changing the title of the object.

For a PERSISTENT object, PROP_SYSTEM determines whether the object is the "blank" for its class. There can only be one blank for each object class, and it cannot be deleted from the "Create a New" dialog box unless the application is de-installed. The blank object should have PROP_SYSTEM specified as a WORD value of zero in its installation file.

Non-blank objects (called "user masters") can be installed as well. These masters can be removed from the "Create a New" Dialog Box by the user. Masters should not specify PROP_SYSTEM at all in their installation file. Note that an install file that contains masters must also contain the blank for that class as the last object installed in that file.

PROP_TEXTID

*-1 ASCII* - This is a class property. It defines the user visible name of the class, and is localized. Its maximum size is 25 characters. This is the string that the OMF_GetType routine returns. It is defined by the installation file for the class with the TEXT_ID statement.

*This property should never be written by applications!*

PROP_TIMEZONE

*binary signed long* - The offset (in seconds) of the user's time zone from Greenwich, England (GMT). All locations west of Greenwich have negative offsets. For example, a user on Pacific Standard Time would have a PROP_TIMEZONE equal to:

-8 (timezones) * 3600 (seconds / hour) = -28800 (seconds of offset).

This property only exists for the Desktop.

Any object that changes the PROP_TIMEZONE value of the Desktop must call OMF_ConfigChange. Calling OMF_ConfigChange causes all active objects that have set their own FLAG_CONFIGNOTIFICATION flag to receive a CONFIG_CHANGE message. The CONFIG_CHANGE message informs them which configuration variable has changed.

Objects that display date or time information must enable this notification and reformat the date/time (using NW_TimeToAnsi) whenever CONFIG_CHANGE for the object property, PROP_TIMEZONE, is received. Date/time information is stored relative to Greenwich Meridian Time, so that the configured time zone affects the format of the result.

PROP_TITLE

*-1 ASCII* - No more than 32 characters long (not including the null).

PROP_USERSIZE

*-1 ASCII* - This is the "size" of the object in user terms, e.g. "16 pages" for a document, "34 objects" for a Folder.

To aid localization, this property actually only contains the size part of the message, and not the units. For example, a document's property might be the string "16", a folder's "34". The units of the message come from a class property (PROP_USERUNITS), which is of the form "! pages" where the "!" character is an insertion placeholder for the 16. Since class properties are not mailed, and are installed locally, a foreign receiver will see a localized result.

The PROP_USERSIZE property may contain more than one dimension for something like a spreadsheet. The user should see something like "43r x 10c". In this case, the USERSIZE property would be "43!10", and the USERUNITS class property would be "!1r x !2c", where the digit following the "!" indicates which string should be inserted where.

Special mention should be made of the system's behaviour when the receiver of a mailed object does not own the class. In this case, the class property will not exist. The Desktop/Folder recognizes this and does not show any user size information.

Objects are responsible for updating this property when the user Saves them (or when they are closed for non-data objects). The Desktop/Filing system will not display more than 16 characters. The maximum size of the PROP_USERSIZE and PROP_USERUNITS properties themselves are also 16 characters (without a null). Objects must do something reasonable if it is so large that USERSIZE would be more than 16 characters, e.g. "> > > pages".

PROP_USERUNITS

*-1 ASCII* - This is a class property. See PROP_USERSIZE above for its format and usage.

PROP_VIEWMETHODS

*binary, array of WORD* - This is actually a set of properties named PROP_VIEWMETHODS + 0 through PROP_VIEWMETHODS + 7. These are class properties. The class properties specify those view methods that are supported by the object's views. The view methods correspond to the view class value (between 0 and 7).

Each property is just a list of WORDs, where each WORD specifies a supported view method. Each property is a separate list defining the methods for a different view class.

The routines OMF_GetViewMethod and OMF_GetViewMethodList access these properties.

Note that the methods specified for view class 0 are special in that they are the methods that will be inspected by a prospective destination when it is deciding whether to create a new DATALINK.

*This property should never be written by applications!*

8 Installation

Installing New Wave Objects

Introduction

This chapter describes the format of installation files and discusses the ramifications that go along with selecting certain options. Sample installation files are provided which can serve as templates for typical types of installations.

Installation Command Files

Applications are installed on a NewWave system by the use of installation command files shipped on the same media as the application and its template object files. The installation files are intended to be totally self-contained so that no user interaction is required other than designating what is to be installed, and then mounting additional media if necessary.

A great deal of flexibility is provided within the installation files. For example, it is possible to install compound objects and to provide updates for previously installed applications with or without altering preexisting objects of the installed class.

Installation Directories

The command files are set up to install the application files in a directory file called the application directory, typically "\HPNWPROG". Module files can also be copied to the OMF system (or data) directory, typically "\HPNWDATA". Furthermore, sub-directories of these directories can be created and used.

Deinstallation

Should it become necessary, object classes can be deinstalled from the system. The OMF will then delete any module files from the user's disk that were copied when the class was originally installed. If the same module file is in use for more than one class, the file will not be deleted until all referencing classes are deinstalled. In addition, when a previously installed object class is reinstalled, the module files previously installed are deleted, i.e., files no longer in use are deleted from the user's disk in the process.

Existing objects of the deinstalled class will not be deleted. Their object files and properties are saved so that if the class is later reinstalled, the objects will again be usable. However, any attempt to open them while the class is deinstalled will result in an error message. A special icon is used to designate objects of deinstalled classes.

Objects of deinstalled classes can still be serialized/mailed, providing that the deinstalled class does not require the object to self-serialize itself. If this was the case, the OMF will refuse to serialize the object (or compound object of which the object is a component).

Conventions

The installation file is an ASCII file consisting of a series of command keywords and the information associated with those keywords for each installed class of object. Pre-defined command keywords and other keywords are always all upper case.

In the following description, < > indicates required parameters, { } indicates optional parameters. Individual parameters may be separated by blanks, tabs, or newlines.

Strings are enclosed in double quotes ("). Strings are only used to specify parameters which become class or object properties. That is why, for example, the CLASS_NAME parameter is quoted, and the ICON_FILE parameter is not. Note that all property strings are case-sensitive.

Within a string, C language conventions may be used to specify quotes (\"), continuation lines (\NEWLINE), and the backslash itself (\\). If a tab character is encountered in a string, it is replaced by a single space.

Where file names to be copied are specified, a pathname excluding drive identifier may be used. Multiple disk volumes are supported. Filenames are not enclosed in strings.

If a semicolon (;) is found, the remainder of the line it is on will be treated as a comment, unless the semicolon occurs in a quoted string.

Installation File Commands

CLASS_NAME

CLASS_NAME <"string">

This command defines a string of up to 64 characters which uniquely defines this type of object.

This name should be universally unique to this object class. The name is kept as a class property. If this CLASS_NAME already exists on the target system, the application will be updated based on the other supplied information for the class.

This is the same class name which is used on the OMF_ImportObject() call and is contained in the headers of serialised objects.

You should specify CLASS_NAME before specifying other keywords of each class/object.

Refer to Appendix B "Building an HP NewWave Application" for the
conventions used in choosing a class name.

TEXT_ID

TEXT_ID <"string">

This command defines a string of up to 25 characters to be returned by an
OMF_GetType call. This is kept as a class property. This is a localized string
that may be displayed to the user to identify the class.

ICON_NAME

ICON_NAME <"string">

This command specifies a name up to 64 characters used to identify the icon
resource for the application. NewWave applications do not use this name at
run-time, since they use reference names of objects to call OMF_GetIcon.
Icons are kept in a dynamic library. The string is used as the name of the
resource in the library itself. If an icon resource of the same name already
exists in the icon library and you also specify an ICON_FILE, then that icon will
replace the icon returned on an OMF_GetIcon() of any object whose class was
installed with the same ICON_NAME.

In general, this string should be the same as the class name.

EXECUTABLE_FILE

EXECUTABLE_FILE <filename>

The filename given must be the name of the executable file for the object.
Specify the filename only, not the path. The EXECUTABLE_FILE command
does not require the filename to be present on the installation disk. The
MODULE_FILENAMES command should also be used if you wish to actually
install the file onto the application directory.

Refer to Appendix B "Building an HP NewWave Application" for the
conventions used in naming your executable file.

MODULE_FILENAMES

```
MODULE_FILENAMES
     <wildcard 1>  ( dest-directory altdir 1 )
     (wildcard 2)  ( dest-directory altdir 2 )
     :
     (wildcard n)  ( dest-directory altdir n )
END_NAMES
```

Wildcards are of the form : {path\} <filename> {.ext} {VOLUME n
{VOLUME_LABEL label} }.

An * or ? may appear in file name.ext as well. Be sure that using a wildcard will
not cause any extraneous file with matching name and extension to be copied
over.

After the last wildcard, an END_NAMES statement is required. A maximum
of 8 wildcards is permitted. If you are installing more than one class that uses
the same module files, it is not necessary to copy the MODULE_FILENAMES
files on the subsequent classes. However, the OMF needs to keep track of
which module files are associated with each class. Classes which share the same
module files and are installed at the same time, can use the installation
command "MODULE_FILENAMES_NO_COPY" instead of the
MODULE_FILENAMES command. This will allow the OMF's data base to be
updated but will not actually (redundantly) copy the files.

Warning  When MODULE_FILENAMES have been specified, if the user attempts to install the class while any preexisting objects of any class using the same executable file are currently active on the target system, the installation will fail.

The optional VOLUME keyword is used when the installation files occupy more than 1 physical medium. The installation program presumes that volume 1 is mounted when it is first started. It will then prompt the user to mount subsequent volumes when it is ready for each volume designated by VOLUME keywords. Be sure to group the files on multiple volumes in sensible order. For a complete description of VOLUME and VOLUME_LABEL see "VOLUME" command later in this chapter.

The installation file itself is always on volume 1. If no volume is specified, it is presumed the file is on volume 1.

An error ("INSTALL_NO_MODULES_ON_VOL") is returned from an install when no files match the wildcard in a MODULE_FILENAMES command.

After each MODULE_FILENAMES wildcard, the keyword "APP_DIRECTORY" or "SYS_DIRECTORY" followed by the name of an alternative directory may be optionally used. All module files on the installation disk matching the wildcard will be copied to the specified directory on the target disk. For example,

```
MODULE_FILENAMES
    base.exe
    \srcdir\sub*.dat   APP_DIRECTORY  mydir
    *.wrk      SYS_DIRECTORY  workdir
    applic.cfg SYS_DIRECTORY
    \subdir\*.*   APP_DIRECTORY  mydir\subdir
END_NAMES
```

In this example, base.exe will go to the application directory. Note that the executable file for a class should always go there.

All files on the installation disk subdirectory "\srcdir" that match the wildcard "sub*.dat" will be copied to the directory "mydir" in the application directory. If "mydir" does not exist in the application directory, it will be created by the installation process.

All files on the current dir of the installation disk matching the wildcard "*.wrk" will be copied to the subdirectory "workdir" from the system/data directory. If the subdirectory does not exist, it will be created.

The file "applic.cfg" on the current directory of the installation disk will be copied directly to the system/data directory.

All files in the "\subdir" directory of the installation disk will be copied to the directory "mydir\subdir" in the application directory. Note that the directory "mydir" must already exist; installation will create only the last directory in a multi-directory path.

The OMF keeps the entire pathname for each module file copied to a destination directory, so that the disk can be cleaned-up when a class is reinstalled or deinstalled. It can differentiate between module files of the same name on different directories.

Refer to Appendix B for conventions to be used when choosing module file names.

OBJECT_FILENAMES

```
OBJECT_FILENAMES
    (wildcard 1)  (VOLUME 1  (VOLUME_LABEL label1) )
    (wildcard 2)  (VOLUME 2  (VOLUME_LABEL label2) )
         :
    (wildcard n)  (VOLUME n  (VOLUME_LABEL labeln) )
END_NAMES
```

This command specifies the ({path}\<wildcard> of the object files required for each instance of the object class. Do not specify file extensions, since any file that matches the filename wildcard on the specified installation disk directory will be copied regardless of extension.

After the last filename, an END_NAMES statement is required.

It is permissible to have no files that go along with the object, in which case the command should be:

```
OBJECT_FILENAMES    END_NAMES
```

If the files occupy more than 1 physical medium, specify volume numbers in sequential order. The MODULE_FILENAMES are copied before the OBJECT_FILENAMES, so the latter should generally be on higher numbered volumes. For a complete description of VOLUME and VOLUME_LABEL see "VOLUME" command later in this chapter.

The OBJECT_FILENAMES command is required unless the NO_OBJECT command is specified.

An error ("INSTALL_NO_ OBJ_FILES_ON_VOL") is returned from an install when no files match the wildcard on a volume designated by the OBJECT_FILENAMES command.

ICON_FILE

```
ICON_FILE
    <(path\)filename.ext>  <(VOLUME n (VOLUME_LABEL label) )>
END_NAMES
```

Specifies the fully qualified pathname of the file (usually with file extension ".ICO") which is to be added to the icon library. The END_NAMES keyword is required.

For a complete description of VOLUME and VOLUME_LABEL see "VOLUME" command later in this chapter.

HAVE_METHODS

```
HAVE_METHODS
    <method keyword 1>
    ...
    (method keyword n)
END_METHODS
```

A list of the OMF methods which the application supports. The methods can be identified by name (e.g., "OPEN") or by ID number, specified in either decimal or hexadecimal.

This results in a class property being built. This property can then be examined at run-time by the OMF_GetMethod() routine, avoiding the overhead of having to start the application to find out the same information. If a given method keyword is not specified in the list, other applications will assume at run-time that the installed application does not support that method.

- HAS_METHOD is sent to all objects and MUST NOT be specified in the HAVE_METHODS clause.

All other methods supported by the application should be included in the HAVE_METHODS section.

After the last method name, an END_METHODS statement is required. The method names to be used are the same as the messages defined in Chapter 4 - "OMF Messages".

NEXT_OBJECT_CLASS

```
NEXT_OBJECT_CLASS
```

This command can be used when an application consists of several classes of objects. It is a separator between the information for each object class. When this keyword is encountered, the previously defined class/(object) will be installed in the OMF system before continuing processing of the next class. If a failure occurs during installation of one of the class/objects, the previously installed class/objects in the installation file will remain installed.

GLOBAL_REF_NAME

GLOBAL_REF_NAME

Requires the numeric reference name to be used by a GLOBAL object. The name can be specified in decimal or hexadecimal (e.g. 0x3fff). Values should not exceed 0x1fffffff. The scope bits (high-order 3 bits) are not required.

If the class of an installing GLOBAL object already exists (the installation will fail unless the keyword OVERWRITE_OLD_OBJECT is used), any global object with the specified GLOBAL_REF_NAME will be deleted. If the previous installation of the class used a different GLOBAL_REF_NAME, the old global object will not be deleted, so developers should take care in choosing and renaming their global objects.

Refer to Appendix B "Building an HP NewWave Application" for the conventions used to select global reference names.

PERSISTENT_REF_NAME

PERSISTENT_REF_NAME

This command is ONLY valid for children of a compound object that is being installed. It should not be specified for the parent.

Requires the numeric reference name to be used by the parent of the object. The name can be specified in decimal or hexadecimal. The scope bits are not required.

In a non-compound object, the reference name is assigned by the installing program (usually the CREATOR object), so the PERSISTENT_REF_NAME would not be used.

In a compound object, it is necessary to specify the names by which parents refer to their children. The application could have these same names initially hard-coded, or preferably could use the OMF_EnumChildren() routine at run-time to determine its children's names.

If the class of an installing PERSISTENT object already exists and the object is not a child within a compound object being installed (the installation will fail unless the keyword OVERWRITE_OLD_OBJECT is used), any masters or blanks in the class will be deleted.

NO_OBJECT

NO_OBJECT

This command indicates that no instances of the class are to be created at this time. An installation will be aborted if this command is specified and commands such as PARENT_IS or OBJECT_FILENAMES are also specified for the object class, since they imply that an initial instance of the object class is expected.

Note  This is NOT the same as specifying no filenames with the OBJECT_FILENAMES command. In that case, an object is still created; it just has no data files.

This keyword might be used, for example, to do a field update of an application's code when the changes do not affect the contents of preexisting object data.

PARENT_IS

```
PARENT_IS   <"string">
```

Used ONLY when defining compound objects, this command can designate which initial instance of the previously defined classes in the installation file is to be the parent of the initial instance of the current object class. The "string" must be identical to a previously defined CLASS_NAME in the installation file.

It is also necessary to specify the PERSISTENT reference name to be used by the parent to designate the current object (see above). It is an error to specify PARENT_IS of a GLOBAL object. Only one parent per object can be specified at the time of installation. This command only works if exactly one instance of the parent class has been installed so far.

OVERWRITE_OLD_OBJECT

```
OVERWRITE_OLD_OBJECT
```

If this keyword is specified and the object's class already exists on the target system, it will allow new objects of the class to be installed and preexisting children of the same class and parent on the target system to be deleted and the new object to be created.

If the OVERWRITE_OLD_OBJECT keyword is not specified, an installation of an object of a preexisting class will fail. See also PERSISTENT_REF_NAME and GLOBAL_REF_NAME above.

OTHER_CLASS_PROPERTIES

```
OTHER_CLASS_PROPERTIES
      <prop name 1>  <prop value 1>
      :
      <prop name n>  <prop value n>
END_PROPERTIES
```

This command allows the installation file to define any other properties for the object class and their associated values as desired by the application. These strings will be maintained internally in the class property list.

<prop name> can be a pre-defined keyword, a number, or a string. The keywords are the property names defined in Chapter 7 - Object Properties. Numbers must be specified in hexadecimal and must be of the form "0xFFFFdddd", where "dddd" is a hexadecimal number from 0000 to 7FFF. If a string name is specified, it must be enclosed in quotes.

<prop value> is either a string enclosed in quotes or a binary value specified as

```
BEGIN_VALUES <byte 1> ... <byte n> END_VALUES.
```

Each byte may be specified in hexadecimal or decimal. If a byte value exceeds 255, then the high byte of the value will be stored following the low byte. A zero length property may be defined by specifying

```
BEGIN_VALUES END_VALUES.
```

Byte values may be separated by spaces, tabs, or new lines.

OBJECT_PROPERTIES

```
OBJECT_PROPERTIES
      <prop name 1>  <prop value 1>
      :
      <prop name n>  <prop value n>
END_PROPERTIES
```

This command allows the installation file to define properties for the object and their associated string values. These strings will be maintained internally in the object property list. You cannot specify OBJECT_PROPERTIES if you also specified NO_OBJECT.

<prop name> can be a pre-defined keyword, a number, or a string. The keywords are the property names defined in Chapter 7 - "Object Properties". Numbers must be specified in hexadecimal and must be of the form "0xFFFFdddd", where "dddd" is a hexadecimal number from 0000 to 7FFF. If the property is to be a non-copy property, add 0x8000 to the number. If a string name is specified, it must be enclosed in quotes.

<prop value> is either a string enclosed in quotes or a binary value specified as BEGIN_VALUES <byte 1> ... <byte n> END_VALUES.

Each byte may be specified in hexadecimal or decimal. If a byte value exceeds 255, then the high byte of the value will be stored following the low byte. A zero length property may be defined by specifying

BEGIN_VALUES END_VALUES.

Byte values may be separated by spaces, tabs, or new lines.

The object property "PROP_TITLE" should be included if the object created is global and will appear on the NewWave Office.

If the object created is a blank for the "Create a New" dialog box, then the property "PROP_SYSTEM" with zero length value,

BEGIN_VALUES END_VALUES must be included. Ordinary masters should not specify PROP_SYSTEM. Global objects should specify a value for PROP_SYSTEM as specified in Chapter 7 - "Object Properties" to control the visibility of the object.

VOLUME

VOLUME_LABEL

Volume labels can optionally be designated in installation files with the ICON_FILE, each MODULE_FILENAMES wildcard, and each OBJECT_FILENAMES volume. Volume labels can only be specified after the VOLUME number has already been specified. The syntax is :

VOLUME <volume number> VOLUME_LABEL <label> should match the label on the installation diskette as produced by the DOS label command. It may be from 1 to 11 characters. If the label is greater than 8 characters, the <label> field must contain a period (.) separating the filename from the .ext.

When a VOLUME is designated without a VOLUME_LABEL, the installation process will check that the <volume number> matches the number it thinks is presently mounted, and if it matches, will proceed with the current diskette. If it does not match, the user is prompted to mount the designated volume, and if the response is OK, it is assumed that the volume is actually now mounted. The only guarantee is the user's word.

By using the VOLUME_LABEL command, the installation process can verify that the user really mounted the proper volume, and can in addition avoid extraneous prompts if the correct volume is already mounted. The VOLUME number is required because it is needed in the prompt message.

Whenever a VOLUME_LABEL is specified, the OMF will read the installation diskette's label before copying files. If the label does not match, the prompt will occur. When the user responds OK, the label will be rechecked and if it still does not match, the prompt will be repeated until the correct volume is mounted, or the user cancels.

Example - Template Installation File

```
;  Example # 1
;     This is an example of a simple installation file.
;     It can be used as a template for your own installation file.

CLASS_NAME      "HPSIMPLE"
TEXT_ID         "Simple Application"
ICON_NAME       "HPSIMPLE"
ICON_FILE       hpsimple.ico    END_NAMES ; Allow re-installation to update.
OVERWRITE_OLD_OBJECT EXECUTABLE_FILE  hpsimple.nwe    ; Don't have to use .EXE.

MODULE_FILENAMES
    hpsimple.nwe
  END_NAMES

OBJECT_FILENAMES  END_NAMES  ; This object has no initial data files.

HAVE_METHODS
    CREATE_OMF
    OPEN
    OMF_INSERT
    TERMINATE
    DIE_PLEASE
  END_METHODS

OBJECT_PROPERTIES
    PROP_TITLE   "Simple Application"
    PROP_SYSTEM  BEGIN_VALUES END_VALUES  ; This is the blank master.
  END_PROPERTIES ; Example #2 - Multi-object Installation File
;
; This is an example of a more complex installation of a compound
; object.

CLASS_NAME  "HPCMPLX"
TEXT_ID     "Complex Application"

; Allow re-installation to update.
OVERWRITE_OLD_OBJECT

ICON_NAME   "HPCMPLX"
ICON_FILE   hpcmplx.ico  VOLUME 1 VOLUME_LABEL hpcmplx.v1 END_NAMES EXECUTABLE_FILE   hpcmplx.nwe MODULE_FILENAMES
    hpcmplx.nwe  VOLUME 1 VOLUME_LABEL hpcmplx.v1
    hpcmplx.hlp  VOLUME 1 VOLUME_LABEL hpcmplx.v1
    ; Copy all files in this sub-dirrectory.
    hpcmplx\*.*  APP_DIRECTORY hpcmplx VOLUME 2   VOLUME_LABEL
hpcmplx.v2
  END_NAMES ; A30 = ((('H'-0x20)<<6)|('P'-0x20)) : the "devcode" of all HP apps
;  23 = HP-specific "project number"
;  07 = project-specific code GLOBAL_REF_NAME 0xA302307

HAVE_METHODS
    OPEN
    OMF_INSERT
    CONTAINMENT_STATUS
  END_METHODS

OBJECT_PROPERTIES
    PROP_TITLE   "Complex Global Application"
    PROP_SYSTEM  BEGIN_VALUES 2 0 END_VALUES    ; Make visible on
Desktop.
  END_PROPERTIES NEXT_OBJECT_CLASS    ; Begin next object of multi-object
OVERWRITE_OLD_OBJECT    ; installation.
```

```
; Installing child of HPCMPLX.

CLASS_NAME      "HPCMPLX1"
TEXT_ID         "Complex App's Child"

ICON_NAME       "HPCMPLX1"
ICON_FILE       hpcmplx1.ico VOLUME 2 VOLUME_LABEL hpcmplx.v2 END_NAMES EXECUTABLE_FILE hpcmplx1.nwe MODULE_FILENAMES
    hpcmplx1.nwe  VOLUME 2 VOLUME_LABEL hpcmplx.v2
    hpcmplx1.hlp  VOLUME 2 VOLUME_LABEL hpcmplx.v2
  END_NAMES PERSISTENT_REF_NAME  1          ; Valid because child of HPCMPLX.

PARENT_IS       "HPCMPLX"       ; Specify class name of parent.

HAVE_METHODS
    OPEN
  END_METHODS
```

Installation Error Codes

The following errors may be displayed when installing applications from the NewWave Desktop. The explanation of the error and its possible recovery action is listed with the error code.

52 RESCLASS_TABLE_FULL

The target system cannot add any more classes. Currently we allow up to 64 classes at one time.

76 DELETE_WITH_ACTIVE_ DESCENDANTS

An existing object of the same name had active children. Only occurs if installation file had specified OVERWRITE_OLD_OBJECT. All children of the object being replaced must be terminated before we can delete the old object (and the children if they had no additional parents).

1F5 BAD_INFO_STRUCTURE

Indicates an internal OMF error.

1F6 CLASS_NAME

Indicates an internal OMF error.

1F7 USER_CANCEL

Displayed when a user has aborted an install by clicking "cancel" when prompted for a volume.

1F8 ICONLIB

Error occurred trying to open the icon library.

1F9 ICOFILE

Error occurred trying to open ICON_FILE.

1FA NOTNEWEXE

The icon library is not a valid file.

1FB EXEACCESS

The icon library data is corrupt, or a disk error occurred while accessing it.

1FC HAS_ACTIVE_OBJECT

MODULE_FILENAMES were specified for a pre-existing class which presently has an active object. (System errors could occur if we delete an executable file from which Windows might load a segment.)

1FD PREEXISTING_OBJECT

The object being installed already exists, i.e. the parent object already has a child of the same reference name. If you add the OVERWRITE_OLD_OBJECT keyword to the installation file, the old object will be deleted and the new object will replace it.

1FE REFNAME

An object reference name was not specified or the parameter specified for PERSISTENT or GLOBAL reference name had improper syntax.

1FF EXPECTED_STRING

A string was expected in the installation file. Check that a string was defined for one of the variables denoting properties, e.g. CLASS_NAME, ICON_NAME, TEXT_ID, etc.

200 MISSINGPARAM

One of the required parameters was not specified for an class/object. Required parameters are: CLASS_NAME, EXECUTABLE_FILE, TEXT_ID, ICON_NAME.

201 EXPECTED_FILENAME

A file name was expected, but file contained another type of parameter, e.g. a keyword or a string. Or a pathname was specified for EXECUTABLE_FILE.

202 TOO_MANY_PATHS

More than 8 file paths were specified for MODULE_FILENAMES.

203 BADMETHODNAME

Check spelling of HAVE_METHODS names. Check that you have an END_METHODS keyword.

204 BADFILEDATA

Unexpected data in the installation file. Check that a CLASS_NAME is specified first for the class/object. Check if a string was specified where it was not expected. Be sure END_NAMES completed your ICON_FILE or MODULE_FILENAMES command.

205 EXPECTED_KEYWORD

A parameter was found where a pre-defined keyword was expected.

206 PARAMETER_SIZE

A parameter's size exceeded its maximum. See the keyword definitions for maximum sizes of their various parameters.

207 TOO_MANY_PROPS

Installation file specified either more than 16 OTHER_CLASS_PROPERTIES or more than 16 OBJECT_PROPERTIES.

208 BADPARENT

The PARENT_IS parameter did not designate a CLASS_NAME that was previously installed in the installation file; or the parent CLASS_NAME was defined, but there was NO_OBJECT; or the PARENT_IS parameter was specified with a GLOBAL_REFERENCE_NAME.

209 TOOMANYCLASSES

Only up to 32 classes can be installed from one file.

20A BADVOLUME

The parameter after the VOLUME keyword was not a number between 1 and 8.

20B MEMORY_ERROR

Error occurred while trying to allocate global memory for the installation process, or a handle to global memory could not subsequently be locked.

20C DUPLICATE_KEYWORD

A command keyword was used more than once for a single class/object.

20D CANT_OPEN_FILE

An error occurred while trying to open the installation file.

20E BADPROPERTY

A property was designated improperly. Be sure the OBJECT_PROPERTIES and OTHER_CLASS_PROPERTIES names and values are in quoted strings, and each list is terminated by an END_PROPERTIES statement.

20F OBJECT_PARAM

A command was specified that applied to an object, but NO_OBJECT was also specified. For example, it makes no sense to specify OBJECT_PROPERTIES or OBJECT_FILENAMES when there is NO_OBJECT.

210 CANT_COPY_FILE

An error occurred while accessing the disks to copy a file. Possibly there is a bad directory pathname, the destination disc is short on space, or a physical disc problem occurred.

211 TOO_MANY_METHODS

More than 256 methods were specified under HAVE_METHODS.

212 BAD_PROPVALUE

A property value was incorrectly specified. See OTHER_CLASS_PROPERITIES or OBJECT_PROPERTIES sections.

213 DEINSTALL_NOT_ENOUGH_MEMORY

There is insufficient global memory to perform a deinstallation.

214 DEINSTALL_FILE_CORRUPT

The system file for installation has been corrupted.

215 DEINSTALL_FILE_ACCESS_ERROR

An error has occurred while opening, reading, or writing the installation system file.

216 INSTALL_BAD_DESTDIR

The destination directory is incorrectly specified. Be sure the size of the path is 64 characters or less.

217 DEINSTALL_HAS_ACTIVE_OBJECT

It is illegal to deinstall a class while any objects of that class are active.

218 INSTALL_COMPONENT_MISMATCH

The revisions of the OMF and the program invoking OMF_Install (usually the "Create a New" dialog box) have incompatible revision numbers.

219 INSTALL_BAD_VOLUME_LABEL

Volume label specified incorrectly. Be sure a VOLUME has already been specified for the associated file(s)/wildcard. Be sure the label doesn't exceed the size of a valid filename. Don't use a string or one of the predefined keywords in the installation file as a VOLUME_LABEL.

21A INSTALL_NO_ MODULES_ON_VOL

No files on the installation volume/directory matched a MODULE_FILENAMES wildcard specification.

21B INSTALL_NO_OBJ_ FILES_ON_VOL

No files on the installation volume/directory matched an OBJECT_FILENAMES wildcard specification.

21C DEINSTALL_NO_SUCH_CLASS

The OMF could not find a preexisting class when invoked to do a deinstallation.

A  Other API Information

Other Application Program Interface Information

This section contains reference material pertaining to the Application Program Interface. It is split up into the following sections:

- Type Definitions
- API Modes
- Predefined Agent Commands
- API Range Coding
- API Menu Control Constants
- API Predefined Errors

Type Definitions For the Application Program Interface, type definitions not provided with the C compiler or Microsoft Windows will be contained in the application program interface header file, "NWAPI.H" (which also includes the header file for error messages, "NWAPIERR.H"). All applications must include "NWAPI.H". The following is a summary of the specific applications interface types used in the calls:

```
typedef WORD              APICMDTYPE;
typedef WORD              APIERRTYPE;
typedef WORD              APILENTYPE;
typedef LONG              APIRTNTYPE;
typedef WORD              APIDIALOGIDTYPE;
typedef WORD              APIEVENTIDTYPE;
typedef LONG              APIMODEFLAGSTYPE;
typedef WORD              APIMODETYPE;
typedef HANDLE            APIHND;
typedef APIHND            FAR *LPAPIHND;
typedef HANDLE            APIACCELTABLETYPE;
typedef APIMODEFLAGSTYPE  FAR *LPAPIMODEFLAGS;
typedef APICMDSTRUCT      FAR *LPAPICMDSTRUCT;
typedef unsigned int      FAR *LPAPIUNSIGNED;
```

API Modes The modes that are passed to API routines are shown in the following table.

Table A-1. API Modes

| Name | No. | Description |
|---|---|---|
| API_NO_MODE | 00000 | Indicates no mode is being used. |
| API_NO_HELP_MODE | 00001 | Indicates no help is to be presented. |
| API_HELP_MODE | 00002 | Indicates help is to be presented. |

API Mode Flags The modes that are set within the application via the API_SET_MODE_FLAGS_MSG are shown in the following table.

Table A-2. API Mode Flags

| Name | No. | Description |
| --- | --- | --- |
| API_ERROR_MODE_ON_FLAG | 0x00000001L | Sets error interception within the application. |
| API_INTERCEPT_MODE_ON_FLAG | 0x00000002L | Sets interception of all messages into the Window Procedure. |
| API_MONITOR_MODE_ON_FLAG | 0x00000004L | Sets monitoring of commands. |
| API_NO_WINDOW_MODE_ON_FLAG | 0x00000008L | Indicates to the application to run without a window. |
| API_PLAYBACK_MODE_ON_FLAG | 0x00000010L | Sets notification of command completion during playback. |
| API_RECORD_MODE_ON_FLAG | 0x00000020L | Sets notification of the executed command for recording. |
| API_ERROR_MODE_OFF_FLAG | 0xFFFFFFFEL | Clears error interception within the application. |
| API_INTERCEPT_MODE_OFF_FLAG | 0xFFFFFFFDL | Clears interception of all messages into the Window Procedure. |
| API_MONITOR_MODE_OFF_FLAG | 0xFFFFFFFBL | Clears monitoring of commands. |
| API_NO_WINDOW_MODE_OFF_FLAG | 0xFFFFFFF7L | Clears indication to the application to run without a window. |
| API_PLAYBACK_MODE_OFF_FLAG | 0xFFFFFFEFL | Clears notification of command completion during playback. |
| API_RECORD_MODE_OFF_FLAG | 0xFFFFFFDFL | Clears notification of the executed command for recording. |
| API_SET_MODE_ON_FLAG | TRUE | Indicates that the mode is to be set on. |
| API_SET_MODE_OFF_FLAG | FALSE | Indicates that the mode is to be set off. |

Predefined Agent Commands  Writing a NewWave application requires developing a task language specific to the application. To assist the development of the task language, a number of predefined commands and functions are available. They fall into the following categories:

1. Class Dependent Commands
2. Class Dependent Dialog Commands
3. Class Independent Interrogation Functions Table A-3. Predefined Class Dependent Commands

| COMMAND | No. | Description |
| --- | --- | --- |
| API_ABOUT_CDCMD | 253 | About (not used in most cases.) |
| API_ADD_A_MASTER_CDCMD | 212 | Add a master object. |
| API_ADD_SELECTION_CDCMD | 218 | Add an object to be selected. |
| API_ADD_SELECTION_BY_LCTN_CDCMD | 244 | Add a location to a selection. |
| API_ADJUST_WINDOW_CDCMD | 251 | Adjust the size and position of applications window. |
| API_ANNOTATE_CDCMD | 107 | Annotate. |
| API_ATTRIBUTES_CDCMD | 254 | Attributes of the current object. |
| API_CANCEL_CDCMD | 220 | Cancel. |
| API_CHANGE_ATTRIBUTES_CDCMD | 240 | Change the attributes of a selected object. |
| API_CLASS_SETTINGS_CDCMD | 255 | Class settings for all objects of the current object's class. |
| API_CLEAR_CDCMD | 256 | Clears whatever is selected. |
| API_CLOSE_WINDOW_CDCMD | 2 | Close window. |
| API_CONVERT_CDCMD | 257 | Convert to and from DOS files. |
| API_CONVERT_FROM_CDCMD | 109 | Convert from. |
| API_CONVERT_TO_CDCMD | 110 | Convert to. |
| API_COORDINATE_SELECT_CDCMD | 220 | Select a coordinate. |
| API_COPY_CDCMD | 203 | Copy. |
| API_COPY_TO_CDCMD | 224 | Copy to a specific icon. |
| API_COPY_TO_DESKTOP_CDCMD | 102 | Copy to Desktop. |
| API_COPY_TO_ID_CDCMD | 227 | Copy to a specific logical ID within the object. |

Table A-3. Predefined Class Dependent Commands (cont.)

| COMMAND | No. | Description |
|---|---|---|
| API_COPY_TO_LOCATION_CDCMD | 226 | Copy to a specific logical location within the object. |
| API_COPY_TO_WITHIN_CDCMD | 233 | Copy to a specific icon within an open object. |
| API_COPY_TO_WITHIN_OF_CDCMD | 245 | Copy to a specific icon within an open object's captioned child window. |
| API_COPY_WITHIN_CDCMD | 225 | Copy to an opened object. |
| API_COPY_WITHIN_OF_CDCMD | 246 | Copy to an opened object's child window. |
| API_CREATE_A_NEW_CDCMD | 106 | Create a new object. |
| API_CREATE_DOS_FILE_CDCMD | 250 | Create a DOS file after copy of an encapsulated DOS object. |
| API_CREATE_TEXT_ANNOTATN_CDCMD | 258 | Create Text Annotation within the current object. |
| API_CREATE_VOICE_ANNOTATN_CDCMD | 259 | Create Voice Annotation within the current object. |
| API_CUT_CDCMD | 202 | Cut. |
| API_DESELECT_CDCMD | 216 | Deselect an object. |
| API_DESELECT_ALL_CDCMD | 238 | Deselect all. |
| API_DO_KEYSTROKES_CDCMD | 249 | Passes keystrokes to an integrated DOS application via the shell. |
| API_INSERT_CDCMD | 207 | Insert |
| API_LIST_CDCMD | 103 | List |
| API_LIST_TO_PRINTER_CDCMD | 260 | List To Printer the contents of the container object in list format. |
| API_MAXIMIZE_WINDOW_CDCMD | 6 | Make window full screen size (zoomed). |
| API_MINIMIZE_WINDOW_CDCMD | 5 | Minimize window (iconized). |
| API_MOVE_TO_CDCMD | 222 | Move to a specific icon. |
| API_MOVE_TO_ID_CDCMD | 229 | Move to a specific ID within the object. |
| API_MOVE_TO_LOCATION_CDCMD | 228 | Move to a specific location within the object. |

Table A-3. Predefined Class Dependent Commands (cont.)

| COMMAND | No. | Description |
| --- | --- | --- |
| API_MOVE_TO_WITHIN_ CDCMD | 232 | Move to a specific icon within an open object. |
| API_MOVE_TO_WITHIN_ OF_CDCMD | 247 | Move to a specific icon within an open object's captioned child window. |
| API_MOVE_WITHIN_CDCMD | 223 | Move within an opened object. |
| API_MOVE_WITHIN_OF_ CDCMD | 248 | Move within an opened object's captioned child window. |
| API_NO_WINDOW_UPDATE_ CDCMD | 221 | Do not update open windows during subsequent command execution. |
| API_OPEN_ALTERNATE_CDCMD | 1 | Open an object with alternate flag set. |
| API_OPEN_CDCMD | 1 | Open an object. |
| API_PASTE_CDCMD | 205 | Paste from the clipboard. |
| API_PASTE_LOCATION_CDCMD | 230 | Paste location is set to a specific logical coordinate within the object. |
| API_PASTE_LOCATION_ID_ CDCMD | 231 | Paste location is set to a specific logical ID within the object. |
| API_PASTE_SPECIAL_CDCMD | 206 | Paste special. |
| API_PRINT_CDCMD | 104 | Print. |
| API_PRINT_SETTINGS_CDCMD | 261 | Print Settings of the print features and printer configuration. |
| API_REDO_CDCMD | 214 | Redo. |
| API_RESTORE_WINDOW_CDCMD | 252 | Restore window to previous size. |
| API_SAVE_CDCMD | 101 | Save. |
| API_SELECT_CDCMD | 211 | Select object. |
| API_SELECT_ALL_CDCMD | 210 | Select all. |
| API_SELECT_BY_ID_ CDCMD | 235 | Select the predefined ID within the object. |

Table A-3. Predefined Class Dependent Commands (cont.)

| COMMAND | No. | Description |
|---|---|---|
| API_SELECT_BY_NAME_CDCMD | 234 | Select the user defined name within the object. |
| API_SELECT_LOCATION_CDCMD | 232 | Select the area defined by two coordinates. |
| API_SELECT_MY_OPENED_PRNT_CDCMD | 243 | Select my opened parent within Manage Links. |
| API_SELECT_OPENED_CDCMD | 237 | Select the opened object to bring it to the top. |
| API_SELECT_OPENED_PARENT_CDCMD | 242 | Select the opened parent within Manage Links. |
| API_SELECT_PARENT_CDCMD | 241 | Select the parent within Manage Links. |
| API_LOWER_CDCMD | 204 | Share. |
| API_SHOW_ANNOTATIONS_CDCMD | 262 | Show Annotations icon on or off. |
| API_TYPE_CDCMD | 219 | Type. |
| API_THROW_AWAY_CDCMD | 8 | Delete object to Waste Basket |
| API_UNDO_CDCMD | 201 | Undo. |
| API_UNICONIZE_CDCMD | 239 | Uniconize an iconized object. |
| API_UPDATE_DESTINATIONS_CDCMD | 263 | Update Destination parent objects with the current object's shared data. |

Table A-4. Predefined Class Dependent Dialog Commands

| COMMAND | No. | Description |
|---|---|---|
| API_ABOUT_CDDCMD | 16003 | About. |
| API_ATTRIBUTES_CDDCMD | 16011 | Attributes. |
| API_CHANGE_ATTRIBUTES_CDDCMD | 16000 | Change the attributes of a selected object |
| API_CLASS_SETTINGS_CDDCMD | 16012 | Class Settings. |
| API_CONVERT_CDDCMD | 16008 | Convert. |
| API_COPY_TO_DESKTOP_CDDCMD | 16004 | Copy To Desktop. |
| API_CREATE_A_NEW_CDDCMD | 16007 | Create A New. |
| API_LIST_TO_PRINTER_CDDCMD | 16006 | List to Printer. |
| API_PASTE_SPECIAL_CDDCMD | 16009 | Paste Special. |
| API_PRINT_CDDCMD | 16005 | Print. |
| API_PRINT_SETTINGS_CDDCMD | 16010 | Print Settings. |
| API_SHOW_PARENT_CDDCMD | 16001 | Show the parent of a selected object |

Table A-5. API Class Independent Interrogation Functions

| Name | No. | Description |
|---|---|---|
| API_RENDER_HELP_FN | 1 | Return Help index function. |
| API_WHATS_INSERTABLE_AT_FN | 1001 | Return what's at screen coordinates if it accepts insertion. |
| API_WHERE_IS_FN | 1009 | Return screen location of child if object accepts insertion. |
| API_WHO_ARE_YOU_FN | 1002 | Return the object's class and title if object accepts insertion. |

API Range Coding  In order to make use of range checking of commands and functions, use the following ranges for API Commands, API Interrogation Functions, API Messages, and API Errors.

Table A-6. API Command Range

| Range Name | Start of Range | Description |
|---|---|---|
| API_NO_CMD | 00000 | No command generated. |
| API_START_RESERVED_CMD_1 | 1 - | Reserved for future Predefined Class Dependent Commands. |
| API_START_CDCMD | 8000 - | Start of Class Dependent Commands. |
| API_START_RESERVED_CMD_2 | 16000 - | Reserved for future use by Predefined Dialog Commands. |
| API_START_DIALOG_CDCMD | 24000 - | Top number for Class Dependent Commands. |
| API_START_MENU_RANGE | 0xE000 - | Start the range for API installed menus. |
| API_END_MENU_RANGE | 0xEFFF - | End the range for API installed menus. |

Table A-7. API Button Range

| Range Name | Start of Range | Description |
|---|---|---|
| API_START_BUTTON_RANGE | 0xE000 - | Start the range for API buttons used in dialog boxes. |
| API_HELP_BUTTON | 0xE108 | Help button for dialog boxes. |
| API_END_BUTTON_RANGE | 0xEFFF | End the range for API buttons used in dialog boxes. |

Table A-8. API Interrogation Function Range

| Range Name | Start of Range | Description |
|---|---|---|
| API_START_HELP_FN | 1 - | Start of predefined Help Interrogation Functions. |
| API_START_AGENT_FN | 1000 - | Start of predefined Agent Interrogation Functions. |
| API_START_CBT_FN | 2000 - | Start of predefined CBT Interrogation Functions. |
| API_START_RESERVED_FN | 3000 - | Start of reserved Interrogation Functions. |
| API_START_CLASS_DEPENDENT_FN | 5000 - | Start of class dependent interrogation Functions. |

Table A-9. API Message Range

| Range Name | Start of Range | Description |
|---|---|---|
| API_MSG_START | (WM_USER + 4854) - | The start of the API message range. |
| API_MSG_END | (WM_USER + 4954) | The end of the API message range. |

Table A-10. API Error Range

| Range Name | Start of Range | Description |
|---|---|---|
| API_START_APPL_ERR | 1 - | Start of application errors. |
| API_START_PREDEFINED_APPL_ERR | 500 - | Start of predefined application errors. |
| API_START_API_ERR | 0x0A00 - | Start of API routine errors. |
| API_START_API_AGENT_ERR | 0x0B00 - | Start of API routine errors returned from the Agent portion of the API. |
| API_START_API_HELP_ERR | 0x0C00 - | Start of API routine errors returned from the Help portion of the API. |
| API_START_API_FATAL_ERR | 0x1A00 - | Start of API routine fatal errors. |

API Menu Control Constants   The API Menu Control Constants define identifiers for the API menus.

Table A-1. API Menu Control Constants

| Menu | No. | Description |
|---|---|---|
| API_HELP_MENU | 0x01 | Append HELP to menu. |
| API_TASK_MENU | 0x02 | Append TASKS to menu. |
| API_TEST_TOOL_MENU | 0x03 | Append TASKS to menu for API Test Tool Use. |

API PREDEFINED ERRORS   A number of predefined errors are provided as shown in the following two tables.

Table A-2. Predefined Errors

| COMMAND | No. | Description |
|---|---|---|
| API_NO_ERR | 0 | No error. |
| API_CAN_NOT_PLAYBACK_NOW_ERR | 6 | The command is not allowed to be played back and is disabled. |
| API_COMMAND_NOT_DONE_ERR | 1 | A command was valid but cannot be executed at this time. |
| API_INVALID_COMMAND_ERR | 0 | An invalid command was sent to the application. |
| API_INVALID_PARAMETERS_ERR | 5 | An invalid parameter was sent to the appliction. |
| API_TRANSLATE_AMBIGUOUS_ERR | 4 | Translate To Internal detected an ambiguous command. |
| API_TRANSLATE_TO_EXTERNAL_ERR | 3 | An error occurred during Translate To External. |
| API_TRANSLATE_TO_INTERNAL_ERR | 2 | An error occurred during Translate To Internal. |

Table A-13. API Routine Errors

| COMMAND | No. | Description |
|---|---|---|
| API_AGENTLIB_ERR | 0x0B00 | Error occurred in the Agent Lib portion of the API (Embedded Tasks). |
| API_GET_AGENT_ERR | 0x0A09 | Could not get the Agent to communicate with. |
| API_GLOBAL_ALLOC_ERR | 0x0A02 | Could not alloc global memory. |
| API_GLOBAL_FREE_ERR | 0x0A03 | Could not free global memory. |
| API_GLOBAL_LOCK_ERR | 0x0A04 | Could not lock global memory. |
| API_HELPLIB_ERR | 0x0C00 | Error occurred in the Help Lib portion of the API. |
| API_MEMORY_LOCK_ERR | 0x0A01 | Could not lock memory for API data structure. |

B  Building an HP NewWave Application

APPENDIX B-1 - Compiling and Linking Your Application

An example of a simple AUTOEXEC.BAT file for a development environment follows:

```
PATH = C:\MSC\BIN; C:\WINDOWS; C:\WINDOWS\BIN
SET INCLUDE = C:\WINDOWS\INCLUDE; C:\MSC\INCLUDE; C:\HPNWDEV
SET LIB     = C:\MSC\LIB; C:\WINDOWS\LIB; C:\HPNWDEV
SET TEMP = C:\TEMP
SET TMP  = C:\TEMP
```

This file is shown as an example that you can build from. Note that the OMF support directory needs to be listed in the INCLUDE and LIB environment variables. \MSC\BIN is not required if your compiler is in the \WINDOWS\BIN sub-directory. Note also that the amount of environment space can be increased if required for the added environment variable definitions.

The compiling and linking process will have to be customized for your particular application. As an aid, the process for a typical NewWave application program is shown in Figure B-1. Those files that refer generically to the application use the symbol <app>.

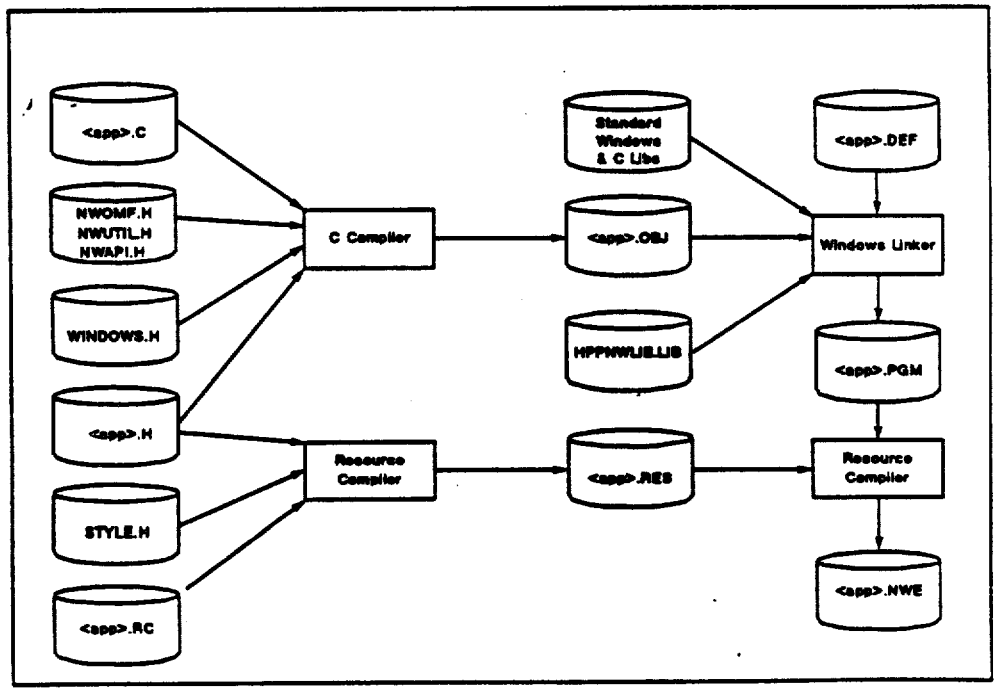

Figure B-1. Compiling & Linking Process of a Typical Application

APPENDIX B-2 - Internal Naming Rules

This section describes a set of rules which developers should follow in choosing names for files, directories, object class names, TEXT_IDs, icon names, global object names, window class names, and clipboard data format names. The purpose of these rules is to minimize the potential for unwanted name collisions between separate software developers.

Developer Codes

Each company developing NewWave software needs to internally decide on a two character developer code made up from upper case letters and digits. Hewlett-Packard will maintain a registry of all these codes as they are reported to HP. This will help avoid independent developers from choosing the same code. Hewlett-Packard reserves the developer codes "HP" and "NW" for its own software.

The developer code (DEVCODE) is used as a prefix for constructing the various names.

Application Codes

Each developer needs to maintain an internal registry of his own NewWave applications. Each application developer should choose a 5-6 character string to identify his application. Within the 5-6 character limitation, this string should be as descriptive of the application as possible. The two character DEVCODE is combined with this string to form the application code or APPCODE. For example, the NewWave Office's APPCODE is HPOFFICE.

File Locations

NewWave maintains two major directories on a users hard disc, the data directory (typically \HPNWDATA) and the application directory (typically \HPNWPROG). When an application is installed, files can be copied to both of these directories.

Note: Applications should not attempt to remember or "hard-code" the actual names of these directories, as they are configurable. Instead, the directory names should always be retrieved at runtime by using the OMF_GetOMFDirectory call.

There is one important restriction: all files copied to the application directory must be completely static. It is not allowable to have any dynamic or user-specific information stored in the application directory. In other words, an installation can copy files to the application directory, but from that time on, those files must be considered read-only. This restriction is made to allow this directory to become a shared network resource in the future.

All executable, overlay, library, help, font, driver, and static data files should be stored in the application directory.

Dynamic or user-specific information must be stored in the data directory. Where possible, class properties should be used in preference to files in the data directory to store user configuration information.

Files should not be located anywhere other than the data and application directories.

For performance reasons and to reduce clutter, no more than four files should be placed in either the application or data directories. If more than four files are needed, a sub-directory of the application or data directory can be created during installation, and as many files as desired can be copied to it.

File Naming

File names should all begin with the application's APPCODE. If the APPCODE is only 7 characters, an addition character may be appended if desired (MS-DOS allows up to 8 characters in a file name). Any extension from 0 to 3 characters can be appended to the base file name. If a sub-directory is created in either the data or application directories, its name must also follow this rule. It is recommended that the directory name have no extension. It is also recommended that all non-directory file names have an extension to leave the sub-directory name available for future use.

Application executable files, both application and dynamic library, and help files, *must* be located in the application directory, not in some lower sub-directory.

Note that it is not required that application executable files use the .EXE extension, as long as the file name is correctly specified in the EXECUTABLE_FILE statement of the application's installation file. Not using .EXE prevents a curious user from wandering into the application directory with the MS-DOS Executive and attempting to execute NewWave applications without NewWave. However, a properly designed NewWave application should detect if it is launched improperly and provide the user an appropriate error message before terminating. Dynamic library executables loaded at runtime (by calling the MS Windows function LoadLibrary) also are not required to have the .EXE extension. However, dynamic libraries loaded at application load time (via the IMPLIB mechanism) must use the .EXE extension.

If the .EXE extension is not used, we recommend .NWE (for NewWave executable) for application executable files and .NWL (for NewWave library) for dynamic library executables.

Object Class Names

It is critically important that all applications have unique class names. The class name is the only unique identifier the OMF has to keep track of the various applications.

Object class names should be the APPCODE of the application which supports the class. In cases where a single application supports multiple classes, an appropriate suffix should be appended to the APPCODE to form each unique class name.

The object class name, as specified by the CLASS_NAME statement in the installation file, can be up to 64 characters. The class name should be at least seven characters long, but no longer than sixteen characters to keep it manageable.

TEXT_ID Standards

The TEXT_ID for a NewWave object is the user-visible form of the class name. Unlike the class name, it is localizable, and there is no technical restriction why multiple objects cannot use the same TEXT_ID. However, TEXT_IDs need to be unique to avoid confusing end-users of NewWave. One standardized exception to this rule is that we recommend that all global objects installed use the TEXT_ID "System" or the appropriate localized equivalent.

Hewlett-Packard will also maintain a registry of all TEXT_IDs reported to us. Developers can use this registry to avoid confusing name collisions with other independent developers.

Icon Names

Icon names, as specified by the ICON_NAME statement in the installation file, should be the same as the class name. Except where an executable is used by more than one class, this should be the same as the APPCODE.

Global Object Reference Numbers

Certain applications are installed as global objects, available through the Desktop, and controlled by the "Manage Tools..." dialog. In addition to having a unique class name, each global object must have a unique global reference number, specified by the GLOBAL_REF_NAME statement in the installation file. The global reference number is a 28-bit value (the top 4 bits of the 32-bit doubleword are reserved for use by the OMF) composed as follows:

```
**** DDDD DDDD DDDD PPPP PPPP UUUU UUUU
....  ................  .........  .........
   |        |                |         |_____ Unassigned. Can be used
   |        |                |                   as required by the project.
   |        |                |
   |        |                |_____ Project code. Registered
   |        |                                   to each project within an
   |        |                                   organization.
   |        |
   |        |_____ Developer number. Derived
   |                                            from the 2-character DEVCODE
   |                                            prefix used for class names.
   |
   |_____ Reserved by the OMF.
```

The 12-bit developer's number is made up of two 6-bit tokens that represent the 2-character DEVCODE prefix. Each 6-bit token is derived by subtracting 0x20 from each DEVCODE byte. For example, the developer's number for Hewlett-Packard (HP) is:

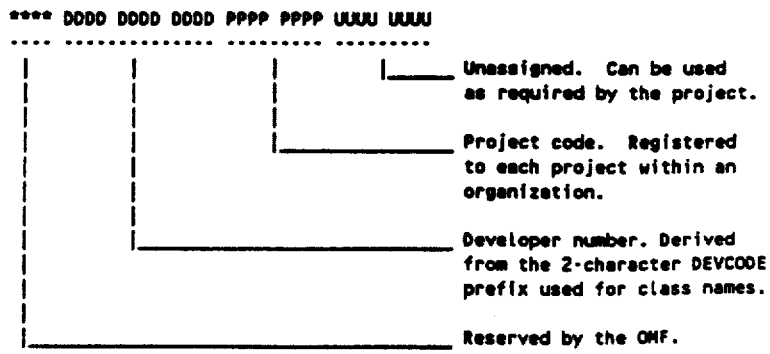

Developer's number 0x000 is also reserved by Hewlett-Packard for the NewWave architectural components.

The 16-bit combination of project code and unassigned bits can actually be carved up as each devloper sees fit, for example, using 12 bits as a project code and only allowing 4 bits for use within each project. Using 8 bits for each is only a recommendation.

MS Windows Window Class Names

For each type of window displayed, an application must register a window class name with MS Windows. This is completely separate from the NewWave object class name tracked by the OMF. To avoid collisions, all window class names should be prefixed with the APPCODE. If the application only registers a single window, then the APPCODE itself can be used as the class name. Otherwise, an appropriate suffix should be appended for each window class that is registered.

MS Windows Clipboard Data Format Names

To prevent unwanted collisions, clipboard data format names should use the 2-character DEVCODE, followed by a hyphen, followed by an appropriate descriptive name provided by the developer.

The NewWave architecture currently defines three different clipboard formats:

-hp- This is a special OMF token which is used as an OMF clipboard placeholder.
NW-Objects When one or more objects are placed on the clipboard.
NW-Annotation When an annotation objects is placed on the clipboard.

If formats for use by more than one developer are needed, these should be registered with Hewlett-Packard and will be assigned a name beginning with NW. These format descriptions can then be made available to all developers.

Summary What Hewlett-Packard will do:

- Maintain a registry of all known DEVCODEs and make this information available to all developers.
- Maintain a registry of all known TEXT_IDs and make this information available to all developers.
- Maintain a registry of all known "NW-" clipboard format names and their descriptions and make this information available to all developers.
- Use "HP" and "NW" as the DEVCODE in all of its names.

What an independent developer should do:

- Register the DEVCODE with Hewlett-Packard.
- Register the TEXT_IDs with Hewlett-Packard.
- Register any clipboard formats for use by other developers ("NW-" prefixed) with Hewlett-Packard.
- Use the DEVCODE in all of the application names.
- Maintain an internal registry of the APPCODEs, object class names, TEXT_IDs, global reference name project numbers, MS Windows class names, and clipboard data format names used by its own applications.

APPENDIX B-3 - Making Help Files

The HPHELPFL program is a utility that converts ASCII files to the formatted files that can be read by the Help Facility. The HPHELPFL utility makes the data structures that are needed to display the help text in the window.

There are no installation procedures for HPHELPFL. Simply make sure HPHELPFL is available on the system, and run it. The file to execute is HPHELPFL.EXE.

Using HPHELPFL from MS-DOS

The user interface is a question and answer type format. The inputs to HPHELPFL are two file names.

The first file (referred to as *source*) is the file to be converted; the file that the Help text author entered.

The second file, *destination*, is the name of the help file that will be used by the Help Facility. The help filename must be different than the "source" file name. HPHELPFL will not do the conversion if the names are the same.

HPHELPFL also needs to know which country the help file is being written for. A question asks for the input.

A session of using HPHELPFL might look like this, with the user's entries shown in bold:

```
HPHELPFL
Type in the file name to convert ‾ desktop.bld
Type in the name of the help file ‾ desktop.hlp
The file desktop.bld will be used to form the file
desktop.hlp.
Display all messages (yes/no) ? no 45 - Denmark
47 - Norway
34 - Spain
58 - Latin America
46 - Sweden
158 - Finland Enter the country code the help file is being written for - 34

Conversion Complete
```

In this example, the user starts the process by typing HPHELPFL, enters desktop.bld as the source file, desktop.hlp as the destination file, requests no messages, and enters 34 signifying Spain as the country for which the help file is being written. When HPHELPFL is finished, the message Conversion Complete will be displayed.

When typing in the filenames for both source and destination, the input string must include the directory name if necessary. When the user responds yes to displaying all messages, HPHELPFL will display messages to let the user know which section of the file is being processed. An example of one of these messages is:

Processing Topic - Close.

HPHELPFL can also be invoked using a command line format:

<source-filename> <help-filename> yes 0

This format would not ask the questions as above. The yes in the command line format signals the display messages feature is turned on, and the 0 (zero) indicates that the help file is a U.S. version.

Batch Files

Because of the command line format, the writers may wish to use a batch file to run HPHELPFL. Within this batch file, use the commands (with the correct file and directory names):

erase desktop.hlp
    HPHELPFL desktop.bld desktop.hlp n 0

The "erase" command is used to erase the old help file (since you are creating a new one), and the "overwrite existing file?" message will not be displayed.

Using HPHELPFL from WINDOWS

To execute HPHELPFL from Windows, double click on the HPHELPFL.PIF or HPHELPFL.EXE filenames. Windows will prompt for the parameters needed, source and destination filenames. Note that you will have to create a PIF file compatible with your particular system, according to Windows guidelines.

Caution 

If you experience system crashes after HPHELPFL has completed the conversion, the correct mouse drivers may not be installed on the system. Proper installation of the appropriate mouse drivers will fix this problem.

File Names

The file extensions used in the examples above are BLD for the source file, and HLP for the destination file. The writers of help text, so far, have used these file extensions for their file names and these file conventions are suggested for future help text writers.

Because of the batch and PIF file formats, the writers should standardize the file names on a per application basis.

DATA FILES

This section discusses the format of the ASCII data files for the help messages that are the input for HPHELPFL (and will be written by the Help text author). This file is not the actual file used by the Help Facility, but only the source file. The HPHELPFL utility will be used to translate these ASCII files to the files that the Help Facility reads.

Help Topic Format

Basically, one frame of the file will consist of control strings and the text. The file will be made up of a series of these frames (help screens). A single help frame might look like:

```
/context=100
/synonym=Work Area
/topic=Client Area
This is the topic for client area. The Client area
is where all the application activity occurs....
etc....
/end
```

The lines with the forward slash ("/") are control strings that identify features pertaining to the help screen. In the example above, the control strings shown are "context", "synonym", "topic" and "end".

The text for the help screens starts on the line following the "topic" control string, and each line of text can have about 60 characters. The length of a line can vary in the Help Facility window because a proportional font is used. The entire text block can contain any number of lines, because the text is scrollable in the Help Facility window. Enhancements can be inserted into the text, and related topics can be indicated by using special sequences (specified in "Text Enhancements" section).

The control string "/end" signals the end of a help screen. All text between the "/topic" and the "/end" commands will be shown in the the Help Facility window as one (scrollable if necessary) help screen.

Extended Topic

The following illustration shows the format of a screen with a subtopic:

```
/context=100
/topic=System Menu
The system menu contains the commands:
Close, Zoom, etc.......
/subtopic=Close
/indent=Close
/related=Window Operations
To close a /Rwindow/N, etc......
/end
```

The "/end" command is important, because it signals the end of the current topic and that a new help topic is following.

A subtopic is contained in the same screen as a main topic, and is defined by the "/subtopic" or the "/indent" control string. The "/subtopic" string is listed in the index in alphabetical order like main topics. There are no limits on the number of subtopics per help screen.

The "/indent" command is used to indent a subtopic in the index. The indented subtopic will be placed in the index, indented under the main topic. A subtopic will not be indented in the index unless an "/indent" statement is used. The indent command is independent of the subtopic command; the two commands DO NOT have to be used together.

When the text is longer than the Help Facility window, all the information is available for viewing by scrolling the text into the windows.

Control Strings

The control strings must be on single lines; one statement per line. The slash must be in column one. The text must be on the line following the topic and subtopic commands. The currently defined control strings are:

Table B-1. Control String Definitions

| Control String | Definition |
|---|---|
| /context= | Makes this screen context sensitive and accessable through question-mark mode |
| /synonym= | Is listed in the index as a main entry (not indented) |
| /related= | Specifies a related topic is following and should point to the specified topic |
| /subtopic= | Is listed in the index as a main entry |
| /indent= | Is listed in the index as an indented entry under the topic |
| /topic= | Main entry in the index and is displayed in the Help Facility window |
| /first= | Specifies the first index entry |
| /end | End of help topic - required for each topic |
| /include=filename | Include another file, which will be processed into current file |
| /* | Beginning of a comment - lines ignored by HPHELPFL |
| */ | End of comment |
| /fontfile= | Specifies the alternate font filename |
| /fontface= | Specifies the alternate font face name |

When a "/context" control string is present, the screen is accessible through the question-mark mode in the Help Facility. When there is a "/topic" control string, the screen is available through the index. The control strings that are REQUIRED for a help screen are: /end and /topic. All other control strings are optional.

The purpose of the "/include=" command is to place generic messages in separate files. Help messages that will be used by more than one application should be placed in separate files. For example, the topic "Using Help" should be in a separate file, since it will be used by all applications. This feature means the writers will produce only one message for applications, and the localizers only translate the message once. The file, which contains the help text that will be included, must be of the same format stated in this document. However, the text within the include file can be just part of a screen, as long as one screen results from the text in both files (included and main). Include statements cannot be nested; an include file cannot have an include statement in it.

Comments can be added to the text, which will be ignored by HPHELPFL. The writer may wish to add comments to the localizers, or for future updates to the file, or just for a reference. These comments are for the source file only, and are ignored by HPHELPFL (not placed in the Help Facility file). The format of a comment is a "/*" in column one, and "*/" in column one is the end of comment delimiter. All lines in between are the comment lines. Any lines outside the "/topic" and "/end" statements are also ignored.

Related topics are specified by the "/related" command, as shown in the extended topic example. The related topic declaration must be in the same format as a topic declaration elsewhere in the file. Each "/related" command must be paired with a "/R" text enhancement. The "/related" commands match up sequentially to "/R" text enhancements.

The fontfile and fontface commands are used together and only once per help file.

Text Enhancements  Text enhancements are used to signal a variation in the font, or display a related topic field. These enhancements are imbedded directly into the text, but do not show in the Help Facility window because the Help Facility will display the text in the specified enhancement.

The "/" (forward slash) will signal the beginning (and end) of an enhanced word or phrase. The forward slash character with be used in conjunction will another character. The second character will represent the enhancement that will be used. For example, the writer wishes to use bold font on a string, that line of text will look like:

/BUsing Help/N

The phrase "Using Help" will appear in the Help Facility window as bold type.
The following represents the sequences that are currently defined:

Table B-2. Special Text Enhancement Sequences

| Sequence | Definition |
| --- | --- |
| /N | (forward slash, N) end of enhancement, or back to normal |
| /B | (forward slash, B) bold |
| /U | (forward slash, U) underline |
| /R | (forward slash, R) related topic |
| // | to show a single "/" |
| /A | to select alternate font characters |

To indicate that a word or phrase is a related topic, the writer would use the following format:

/RRelated topic here/N

The phrase "Related topic here" would be highlighted as a related topic that is selectable in the Help Facility window. Related topics cannot be enhanced with bold or underline; they will be highlighted in another manner.

If the writer wishes to include a slash within the text, two slashes must be typed in order for one to show.

File Generation

It is suggested that the writers use the MS Write word processor, under Windows, for these reasons:

- MS Write saves the text in ANSI, and the Help Facility displays the text in ANSI. Therefore, MS Write will use the characters that are expected. The localizers must use MS Write to allow for international characters.

- The window size can be scaled down to the approximate size of the Help Facility window. This would give the writer some limits on the length of the text lines.

- The writer can use the same font and spacing that will be displayed in the Help Facility window. The font used in Help Facility is Helv, 12 point. This would give the writer a fairly good idea of what the help screen will look like.

Other word processors can be used for U.S. English help text; if alternate characters (valued greater than 128) are to be used, MS Write should be used.

TIP: MS Write defaults to the font that is supported on the printer that is configured on a system. Therefore, if your printer does not support the Helvetica font, you may want to disconnect the printer while running MS Write to edit help screens.

TIP: Make a template of HPHELPFL commands that can be used to make help files. The template can be appended to a file as new help screens are written.

COMMAND OVERVIEW

The commands listed here must start in column 1 and be on a single line.

/topic= Topic strings are main level entries (not indented) in the index. One topic string is required for each help topic. The topic name is displayed above the text in the Help Facility window. Example shown below:

/topic=File Menu

/subtopic= A subtopic is contained in the same screen as a main topic and it is also a main level entry in the index. When help is requested for a subtopic, the subtopic text is shown in the Help Facility window; however, the user can scroll up to the main topic. The main topic string is shown above the text in the Help Facility window, even though a subtopic is selected for help. Example:

/subtopic=Create a New . . .

The indent command is not required with this command; "subtopic" can be used on its own.

/indent= The indent command is used to indent an index entry in the index, under the main topic. Example:

/indent=Open

/synonym= The synonym is used to put words of similar meaning in the index. A synonym is a main level entry in the index. Writers beware! When the user selects a synonym from the index, the actual topic name will show above the text in the window. Therefore, when declaring a synonym, it is suggested that the actual topic name is put in parenthesis next to the synonym. Example:

```
/synonym=Delete Items (Throw Away)
```

/context= If a context control string is present, the help screen is accessible through the question-mark mode in the Help Facility. The context numbers are provided by the application development team, and these numbers represent menu items, display fields, and program states. The application sends a message, containing the context number, to the Help Facility. The Help Facility will display the message for that context number.

The number must be a decimal or hexadecimal value. Hex is specified with a "0x" (zero, x) preceding the hex digits. The maximum value a context number can be is: 65535 or 0xFFFF, and the values 0xE000 through 0xE200 are reserved for the Help Facility menus. Example:

```
/context=0xABC3
```

Warning  To Programmers: Do not use values below 100 or > = 0xE000 for menu item IDs. These values are used by the Help Facility as context numbers for the caption bar, scroll bars, non-client area items, etc.

Warning  To Help Authors: Be sure to use the values in the table below as context numbers of help topics for the caption bar, scroll bars, non-client area items, etc.

| Context Number | Usage |
|---|---|
| 2 | Window caption bar. |
| 6 | Horizontal scroll bar. |
| 7 | Vertical scroll bar. |
| 8 | Minimize icon in caption bar. |
| 9 | Maximize icon in caption bar. |
| 10-17 | Thick window border (for sizing). |

/related= Related topic commands must have the string in the same format as a topic string (elsewhere within the file). The related command must be paired with the text enhancement string. There must be one related command for each related text enhancement in a topic. /Related statements match up sequentially with /R text enhancements. An example of related topics is shown below.

```
/related=Close (a window)
    /r Close a window /n
/related=Icon
    /r Iconize the Desktop /n
```

/include= The include command will read in a separate file that contains help text. The purpose of this command is to place the generic messages in separate files, so that all applications will use the same help text.

An include file cannot contain an include statement. The file declaration for the include statement must contain the directory name, if necessary. Example:

```
/include=usinghlp.bld
```

/end  The end command is required to end each help screen.

/first= This command is like the topic command, except that the entry is the first one in the index. This allows for a special entry, such as "Table of Contents" or "Using Help", to be placed at the top of the index for "higher visibility."

There can only be one first command per help file. Example:

```
/first=Table of Contents
```

/* Begin comment. Any lines between begin and end comment are ignored by HPHELPFL.

*/ End comment. Example:

```
/* This is the beginning of a comment.
A comment can be placed anywhere in a
source file.
*/
```

/fontfile= These two commands are used together to specify the alternate font filename
/fontface= and alternate font face name. Both commands are needed and can only be used once per help file.

ERROR MESSAGES    HPHELPFL will flag errors and discrepancies for the "source" file. The currently defined errors are:

Table B-3. Error Messages and Meanings/Actions

| Error Message | Reason |
|---|---|
| Source and Help file must have different names | Need to use different names, or different directories |
| Cannot open the file | File does not exist or not available |
| Check spelling on file and path names | Warning for file errors |
| Destination file already exists | |
| No source file specified | |
| Non-valid control string or text enhancement | A "/" was found with non- valid command - correct or change to "//" |
| Duplicate context number | |
| Duplicate index entries | |
| Duplicate indented entries | |
| Related topics are out of sync | Related commands and "/R" enhancements do not match up |
| Text enhancements cannot be nested-this line is thrown out | A "/N" was not found before text enhancement |
| Duplicate FIRST entry | |
| No memory available for allocation | If using Windows, close programs |
| Related topic not found | Related string does not match topic string |
| Include file already open | Cannot nest include files |
| There is no topic for this context number | Topic commands are required (context # is decimal) |
| Help file not produced | An unrecoverable error occured - valid help file could not be produced |
| Cannot process NULL control strings | Only "/subtopic" can be NULL |
| No end help topic found | |
| No topic statement found | |
| No end-of-comment found /* | |
| No end-of-text-enhancement found /N | |
| Too many related topics for one topic | |
| Duplicate alternate font statement | |
| Need to specify both font file and face names | |

SAMPLE FILES    The following is an example file used for the Layout application. This is not a complete help file, but it shows how to format the text.

```
/*
File: LAYOUT.BLD
last edited: 02/03/88

This help source file documents commands and areas
in Layout. It includes two other help source files:

• LAYOUTP.BLD documents procedures
 • LAYOUTE.BLD documents error message help

When editing this file, use the template below to size the
MS-Write window; then the window will be the same size
as the Layout help window.  Also, make sure that the
``` character font is Helv 10 to match what appears in the
Layout help window.
xxxxxxxxxxxxxxxxxxxxxxxxxxxxxxxxxxxxxxxxxxxxxxxxxx
x
x
x
x
x
x
x
x
x
x
x
x
x
xxxxxxxxxxxxxxxxxxxxxxxxxxxxxxxxxxxxxxxxxxxxxxxxxx
*/
/include=layoutp.bld
/include=layoute.bld
/*
The following help text is structured so that "Edit menu
commands" is a main entry in the help index (/topic), and
the individual commands are its indented sub-entries
(/indent). The commands are also main entries in the
index (/synonym).

This structure allows for scrolling through the "Edit menu commands"
help to get to the individual command help. It
provides hot buttons in the "Edit menu commands" help
to eliminate the need to scroll.
*/

/topic=Edit menu commands
/related=Cut
/related=Copy
/related=Paste
/related=Share
/related=Delete The Edit menu contains the commands associated
with the Clipboard. You use the Clipboard to transfer
information from one item to another.

The Edit menu contains commands that allow you to:

/R Cut an item/N
/R Copy an item/N
/R Paste an item/N
/R Share an item /N
/R Delete an item/N .
/*
The "." on the preceding line indicates the last (14th) line
of text about "Edit menu commands" which will appear in
the window. It allows a full 14 text lines per topic or
subtopic to avoid displaying text of the next subtopic.
(Note that the blank lines before the "." act as padding.)
*/
/context=104
/indent=Cut
/synonym=Cut
/related=Cutting an item
/related=Moving an item
/BCut/N Moves the item you have selected to the Clipboard.
Once the item is on the Clipboard, you can use the Paste
command from the Edit menu to transfer the item from
the clipboard to another item.

For information on how to use Cut, see:

/R Cutting an item /N
   /R Moving an item /N

```
/context=105
/indent=Copy
/synonym=Copy
/related=Copying an item
/BCopy/N
```

Places a copy of the item you have selected on the Clipboard. Once the copy is on the Clipboard, you can use the Paste command from the Edit menu to transfer the copy from the Clipboard to another item.

For information on how to use Copy, see:

/R Copying an item /N

```
/context=107
/indent=Paste
/synonym=Paste
/related=Pasting the Clipboard contents
/related=Copying an item
/related=Moving an item
/related=Sharing an item
/BPaste/N
```

Copies the content of the Clipboard to the selected area. You use this command in combination with Copy, Cut, or Share to transfer information through the Clipboard.

For information on how to use Paste, see:

/R Pasting the Clipboard contents /N
  /R Copying an item /N
  /R Moving (cutting and pasting) an item /N
  /R Sharing an item /N

```
/context=106
/indent=Share
/synonym=Share
/related=Sharing an item
/BShare/N
```

Places on the Clipboard a share (or link) to the item you have selected. Once the share is on the Clipboard, you can use the Paste command from the Edit menu to transfer the share from the Clipboard to another item.

For information on how to use Share, see:

/R Sharing an item /N

```
/context=108
/indent=Delete
/synonym=Delete
/related=Deleting an item
/BDelete/N
```

Transfers the selected item(s) to the Waste Basket.

For information on how to use Delete, see:

/R Deleting an item /N

```
/end
/topic=File menu commands
/related=Open
/related=Create a New
/related=Close
/related=Show Links
/related=About
```

The File menu contains commands that allow you to:

/R Open an item /N
  /R Create a new item /N
  /R Close the Layout window /N
  /R List the titles of all the items in Layout /N
  /R See information about Layout /N

```
/context=103
/indent=About
/synonym=About
/BAbout/N
```

Verifies the version number of your Layout software. The version number appears in a message box in the upper left corner of the screen.

```
/context=100
/indent=Close
/synonym=Close
/BClose/N
```

Closes the Layout window. Any items in Layout which are open remain open.

```
/context=102
/indent=Create a New
/synonym=Create a New
/related=Creating an item
/BCreate a New/N
```

Creates a new item to place in the selected area. When you create a new item, it can be either blank, or a copy of an item that you have set up as a master.

For information on how to use Create a New, see:

/R Creating an item /N

```
/context=111
/indent=Show Links
/synonym=Show Links
/related=Displaying links
/BShow Links/N
```

Displays a dialog box that lists all of the items in the Layout window.

For information on how to display links, see:

/R Displaying links /N

```
/context=101
/indent=Open
/synonym=Open
/related=Opening an item
/BOpen/N
```

Opens the window associated with the item selected in the Layout window.

For information on how to open an item, see:

/R Opening an item /N

```
/end
/context=201
/topic=Items in Layout
```

Items in the Layout window can be moved, copied, shared, and deleted. They can also be opened for editing.

```
/end
```

```
/first=Layout - overview
```

Layout is a sample application for developers.

It allows you to add items to its window. You do this by first selecting a rectangular area in the window, then adding the item to the selected area.

```
Items in the Layout window can be moved, copied,
shared, and deleted. They can also be opened for
editing.

/end
/context=200
/topic=Layout window
/related=Selecting an area
/related=Creating an item
/related=Dragging an icon
/related=Copying an item
/related=Sharing an item You can add items to this window.

In general terms, you add an item to the Layout window
by selecting the area where you want the item to appear
in the window, then putting the item in the selected area.

You can create a new item to put in the selected area,
or "drag" an icon from the Office window to the selected
area. You can also add an item by copying from or
sharing with an existing item.

For more information, see:

/R Selecting an area /N
   /R Creating an item /N
   /R Dragging an icon /N
   /R Copying an item /N
   /R Sharing an item /N /end
/context=203
/topic=Selected item
/related=Copying an item
/related=Deleting an item
/related=Moving an item
/related=Opening an item
/related=Sharing an item You can perform these procedures on the selected
item:

/R Copying /N
   /R Deleting /N
   /R Moving /N
   /R Opening /N
   /R Sharing /N /end
```

C    System Services

CREATE A NEW DIALOG BOX PROTOCOL

The "Create a New" dialog box allows any object to display the dialog box with a set of choices (possibly limited) and to be sent an object created from the master selected by the user.

To start the "Create a New" dialog box, do the following:

```
if ( ! OMF_GetOMFObject( hOMF, CREATOR ) )
  /* error ... */ lResult = OMF_Send( hOMF, CREATOR, OPEN_DBOX, lParam ) )
if ( lResult == 0L )
  /* OMF error ... */ if ( LOWORD( lResult ) == 1 )
  /* CREATOR is busy, try again later */ if ( LOWORD( lResult ) == 2 )
  /* call succeeded */ if ( ! OMF_FreeOMFObject( hOMF, CREATOR ) )
  /* error */
```

The value of lParam depends on whether you want ALL the masters to be displayed or whether you want to limit the set of choices.

If you want ALL the masters to be displayed, lParam should consist of:

```
MAKELONG( (WORD)hWnd, 0 )
``` where

*hWnd* is your window handle.

If you want to limit the set of choices, lParam should consist of:

```
MAKELONG( (WORD)hMem, (nMethods + 3) )
``` where

*hMem* is a global memory handle to an array of WORDS. The first two words are reserved (for backward compatibility). The third word should be set to your window handle. The remaining words specify methods that a master must support in order to be displayed. These methods specify a boolean expression of the form:

```
Method and Method and Method ...
OR   Method and Method and Method ...
OR   ...
```

The ANDs are implicit between adjacent words. The ORs are represented by a -1 word.

Those methods that are view methods must be bitwise or'd with the value VIEWMETHODFLAG (0x8000).

*nMethods* is the number of methods, including the -1 ORs (but not including the first three words) that are in the hMem array. If the total size of the hMem array will be less than 128 bytes, allocate the memory using the GMEM_LOWER option. If the total size will be greater than 128 bytes, allocate the memory using the GMEM_DDESHARE option.

Note  The CREATOR object uses the OMF_GetMethod and OMF_GetViewMethod routines to test the methods of the masters. Thus, methods must be specified in the HAVE_METHODS clause (or under the class property PROP_VIEWMETHODS for view methods) in the installation file of the master in order for the CREATOR to find them.

Example

To cause objects to be displayed which have OPEN and CONTAINMENT_STATUS, or OPEN and OMF_INSERT, construct hMem as follows:

```
HANDLE    hMem;
WORD FAR *lpMem;

hMem = GlobalAlloc( GMEM_LOWER | GMEM_MOVEABLE | GMEM_ZEROINIT,
            sizeof(WORD) * (5 + 3) );
if ( hMem == NULL )
    /* error ... */
lpMem = (WORD FAR *) GlobalLock( hMem );

/* lpMem[0] is reserved - should be 0 */
/* lpMem[1] is reserved - should be 0 */
lpMem[2] = ghWnd;      /* your main window handle */
lpMem[3] = OPEN;
lpMem[4] = CONTAINMENT_STATUS;
lpMem[5] = -1;
lpMem[6] = OPEN;
lpMem[7] = OMF_INSERT;

GlobalUnlock( hMem );
```

Checking CREATOR Status

The CREATOR object can only process one request to "Create A New" at a time. If it is busy, then it will display an appropriate message to the user and return the value 1 in the LOWORD of the return value of the OMF_Send call. It is, of course, a good idea to gray out the "Create A New" menu item when the CREATOR is busy. You can do that by calling

```
OMF_GetObjectState( hOMF, CREATOR )
``` during processing of the WM_INITMENUPOPUP message. You should gray the menu item if the return value is OS_OPEN. Note that if OS_ACTIVE is returned, you should NOT gray the menu item.

Getting the New Object

When the user closes the "Create a New" dialog box after picking an object to create, the CREATOR object will send an OMF_NEW_OBJECT message to the window handle that was passed. The lParam of this message is a PARAMETER scope name of the object that was created. The object should process this message by assigning the PARAMETER name to a PERSISTENT or DATALINK name.

```
case OMF_NEW_OBJECT:
    if ( ! OMF_Assign( hOMF, oNewPersistentName, lParam ) )
        /* error */
    break;
```

If the user cancels the "Create A New" dialog box without creating an object, you will not receive this message or any other from the CREATOR object.

Your window will be disabled from the time you send the OPEN_DBOX message to the CREATOR, until the dialog box is taken down by the user (OK or Cancel).

D  Utilities

NewWave DOSCALL Utility

This utility consists of an include file DOSCALL.H to include in your application and another file DOSCALL.OBJ to link into your application.

Your application can then make calls to MS-DOS through this interface. Any MS-DOS function request can be made, although only the most common calls are supported with pre-defined macros.

Specification

The following two functions are defined:

```
doscall   (    AX, BX, CX, DX, SI, DI) : bOk
dsdoscall (DS, AX, BX, CX, DX, SI, DI) : bOk
```

The doscall function uses the current DS, whereas dsdoscall allows you to specify a DS value for the call. Both calls set ES to equal DS for the MS-DOS call.

All parameters are of type unsigned int. Unnecessary trailing parameters can be omitted. For example, the MS-DOS function 19h "Get Current Disk" requires no parameters except the function code in AH. This call can be made as

```
doscall (0x1900);
```

The return value from both functions depends on the value passed as the HIBYTE of AX. For values below 2Fh, the return value is whatever was in the AX register when MS-DOS returned. For functions 2Fh and above, the return value is a boolean TRUE if the carry flag was clear on return, and FALSE if the carry flag was set.

In all cases, the return values of the registers AX, BX, CX, DX, and ES are available in the external global variables AX_retrn, BX_retrn, CX_retrn, DX_retrn, and ES_retrn. These values remain unchanged until the next call to doscall or dsdoscall. These variables are of type unsigned int.

Data Structures

DOSCALL.H defines the following data structure for use with the MS-DOS functions Find First File (4Eh) and FindNextFile (4Fh):

```
typedef struct_dosdatablock (
    char            fn[21];          /* MS-DOS stuff        */
    unsigned char   attributes;      /* file attributes     */
    unsigned int    timelastwrite;   /* time last written   */
    unsigned int    datelastwrite;   /* date last written   */
    long            filesize;        /* size in bytes       */
    char            name[13];        /* file name string    */
) DOSDATABLOCK, *PDOSDATABLOCK;
```

Helper Macros

DOSCALL.H also defines a number of macros to aid in calling the most common MS-DOS functions. These macros are described below.

doschdir doschdir (pPath) : bOk

Function 3Bh. Changes the current directory to the string pPath.

dosclose dosclose (nFile) : bOk

Function 3Eh. Closes the file handle nFile.

doscreat doscreat (pPath, wAttrs) : bOk

Function 3Ch. Creates a new, empty file named pPath, with file attributes wAttrs. If successful, file handle is returned in AX_retrn.

dosdiskinfo dosdiskinfo (nDisk)

Function 36h. Gets information about a disk nDisk; 0 is current disk, 1 is A:, 2 is B:, etc. On return, AX_retrn is FFFFh if the function failed, otherwise AX_retrn is the number of secters per cluster, BX_retrn is the number of free clusters, CX_retrn is the number of bytes per sector, and DX_retrn is the number of clusters on the disk.

dosdup dosdup (nFile) : bOk

Function 45h. Duplicates a file handle nFile. If successful, the duplicate file handle is returned in AX_retrn.

dosexec dosexec (pParms, pPath) : bOk

Function 4Bh. "Exec's" another program. pParms points to the parameter block for the call, pPath points to name of the executable file.

dosfindfirst

`dosfindfirst (pWildPath, wAttrs) : bOk`

Function 4Eh. Find a file with matching the wildcarded name pWildPath and attributes wAttrs. Writes a DOSDATABLOCK structure at the current Disk Transfer Address (also known as the DMA address). If wAttrs is ALL_FILES, all files (but not directories) matching the wildcard will be found. If wAttrs is DIR_ATTR, only directory entries will be found.

dosfindnext

`dosfindnext () : bOk`

Function 4Fh. Find the next file matching the specification given to dosfindfirst. Updates the DOSDATABLOCK at the current Disk Transfer Address (DMA).

dosgetattrib

`dosgetattrib (pPath) : bOk`

Function 4300h. Get the attributes of the file specified by pPath. If successful, the attributes are returned in CX_retrn.

dosgetdate

`dosgetdate ()`

Function 2Ah. Get the current system date. Returns the day of the week in the LOBYTE of AX_retrn (0 = Sun, 1 = Mon, etc), the year in CX_retrn, the month in the HIBYTE of DX_retrn (1 = Jan, 2 = Feb, etc), and the day of the month in the LOBYTE of DX_retrn (1 through 31).

dosgetdir

`dosgetdir (pPath) : bOk`

Function 47h. Return the current directory (of the current drive) in the buffer pPath.

dosgetdisk

`dosgetdisk ()`

Function 19h. Return the current disk in the LOBYTE of AX_retrn, 0 = A:, 1 = B:, etc.

dosgetdma

`dosgetdma ()`

Function 1Ah. Return the current Disk Transfer Address (DMA) in ES_retrn and BX_retrn.

dosgettime

`dosgettime ()`

Function 2Ch. Get the current system time. Returns the hour in the HIBYTE of CX_retrn (0 through 23), the minutes in the LOBYTE of CX_retrn (0 through 59), the seconds in the HIBYTE of DX_retrn (0 through 59), and hundredths of seconds in the LOBYTE of DX_retrn (0 through 99).

dosgettimestamp

`dosgettimestamp (nFile) : bOk`

Function 5700h. Get the last written date and time for the file handle nFile. If successful, CX_retrn contains the time, and DX_retrn the date.

dosiseek

`dosiseek (nFile, lPos, nMode) : bOk`

Function 42h. Move the I/O pointer of the file handle nFile by lPos bytes from the origin specified by nMode, one of FROM_START, FROM_CURRENT, or FROM_END. If successful, returns the HIWORD of the resulting absolute position in DX_retrn and the LOWORD in AX_retrn.

dosmkdir

`dosmkdir (pPath) : bOk`

Function 39h. Creates a directory with name pPath.

dosopen

`dosopen (pPath, nMode) : bOk`

Function 3Dh. Opens an existing file pPath with access nMode, one of O_READ, O_WRITE, or O_RD_WR. If successful, the file handle is returned in AX_retrn.

dosread

`dosread (nFile, pBuf, nBytes) : bOk`

Function 3Fh. Reads nBytes bytes from file nFile into buffer pBuf. If successful, AX_retrn returns the number of bytes actually read.

dosrename

`dosrename (pOld, pNew) : bOk`

Function 56h. Renames or moves a file or directory from path pOld to path pNew.

dosrmdir

`dosrmdir (pPath) : bOk`

Function 3Ah. Deletes a directory pPath.

dossetattrib

`dossetattrib (pPath, wAttrs) : bOk`

Function 4301h. Sets the attributes of a file pPath to wAttrs.

dossetdisk

`dossetdisk (nDisk)`

Function 0Eh. Sets the current disk to nDisk, 0 = A:, 1 = B:, etc.

dossetdma

`dossetdma (pBuf)`

Function 1Ah. Sets the Disk Transfer Address (DMA) to pBuf.

dossettimestamp

`dossettimestamp (nFile, wTime, wDate) : bOk`

Function 5701h. Sets the date/time of last writing on the file handle nFile to wTime and wDate.

dosunlink

`dosunlink (pPath) : bOk`

Function 41h. Unlinks (deletes) the file pPath.

doswrite

`doswrite (nFile, pBuf, nBytes) : bOk`

Function 40h. Writes nBytes bytes from buffer pBuf to file nFile. If successful, AX retrn returns the number of bytes actually written.

ldoscreat

`ldoscreat (lpPath, wAttrs) : bOk`

Function 3Ch. Creates a new, empty file named lpPath (a long pointer), with file attributes wAttrs. If successful, file handle is returned in AX retrn.

ldosopen

`ldosopen (lpPath, nMode) : bOk`

Function 3Dh. Opens an existing file lpPath (a long pointer) with access nMode, one of O_READ, O_WRITE, or O_RD_WR. If successful, the file handle is returned in AX retrn.

ldosread

`ldosread (nFile, lpBuf, nBytes) : bOk`

Function 3Fh. Reads nBytes bytes from file nFile into buffer lpBuf (a long pointer). If successful, AX retrn returns the number of bytes actually read.

ldossetdma

`ldossetdma (wSeg, wPtr)`

Function 1Ah. Sets the Disk Transfer Address (DMA) to segment wSeg, offset wPtr.

ldoswrite

`ldoswrite (nFile, lpBuf, nBytes) : bOk`

Function 40h. Writes nBytes bytes from buffer lpBuf (a long pointer) to file nFile. If successful, AX retrn returns the number of bytes actually written.

OMF On-line Diagnostic Utility

Description

The OMF on-line diagnostic utility is used to capture communication between objects and the OMF (Object Management Facility) during a NewWave session. It is used primarily for debugging NewWave application programs in which there may be problems with the OMF.

The diagnostic utility provides these three primary functions with variations as described later:

1. Displays an object in the diagnostic window in context with the rest of its "family tree".

2. Shows the properties of an object through use of the commands in the *Prop_Display* pull-down menu.

3. Traces of OMF calls dumped to a file and/or window as desired. This is accessed via the *Trace_Control* pull-down menu.

The Diagnostic Window

The following characteristics of object are automatically displayed within the diagnostic window:

*Displaying Object Tag* is the OMF's internal unique identifier (the tag) of the object being displayed.

*Class Name* is the name of the object's class.

*Object Title* is the specific title of the object (if it has one; it may be untitled). "Form Letter 5" would be a typical example. The total size of the object's data files in bytes is also provided on this line.

*Object Filepath* identifies the root file name of the object along with the directory and subdirectories in which it resides. "C:\HPNWDATA\HPOMF002\00000029" is an example.

At the bottom of the diagnostic window, objects which are linked to the selected object are displayed. These objects are identified by their tag number and by their reference name (in hexadecimal). In the left column, the object's parents are displayed. On the right, any child objects belonging to the selected object are shown.

You can click on the tag number of a displayed parent or child to cause that object to become the displayed object.

In addition, you may drag an object from the NW Office window or a folder into the diagnostic window to cause that object to be displayed.

Displaying Object Properties

The property display options are used to display the OMF properties of the selected object. The OMF properties are displayed by using the commands from the *Prop_Display* pull-down menu:

*Don't Show Props* is the default mode of operation and closes a properties window if one is open.

*Show Object Props* shows the object properties of the selected object.

*Show Class Props* shows the class properties of the selected object.

Once the *Show Object Props* or *Show Class Props* command has been given, a window showing the names of the properties is displayed. To show the value of any property, simply click on the name of the property, and another window showing the value of that property will be shown.

Diagnostic Tracing

There are two types of traces that can be requested:

1. OMF Call Tracing
2. OMF Error Tracing

*OMF calls* refer to any OMF functions that are invoked during a NewWave session. One trace statement is produced when the call begins and another statement when the call completes. A typical OMF call would be:

```
Obj #2:     finishing OMF_FreeOMFObject
Obj #2:     starting OMF_FreeOMFObject -> 29 <Global 200>
```

*Obj #2* shows the tag of the object making the call to OMF_FreeOMFObject. *29* refers to the tag of the object being freed by the call. *Global 200* gives the scope and value of the reference name used in the call.

Note also that the trace statements appear in *reverse* chronological order with the "finishing" part of the call before the "starting" part.

*OMF error tracing* provides a trace statement each time an OMF call returns an error, anywhere in the system.

Note that it is a useful technique to make use of error tracing and minimize the main diagnostic window. Turning on the error trace causes very little system overhead while providing a log of problems involving interaction between the application and the OMF. This is particularly useful when errors returned by the OMF are not readily apparent.

Tracing with the diagnostic utility is controlled with the following commands (in the *Trace_Control* pull-down menu):

*Trace Errors Only*, as its name implies, provides notifications only when a call to the OMF results in an error.

*Trace all OMF Calls* causes ALL calls to the OMF to be traced.

*No Tracing* turns off the tracing facility altogether.

*Trace to Window* maintains a list of the OMF calls in the diagnostic window. Note that new entries are added to the top of the list as they occur so that the chronological order goes from the bottom of the window to the top. The window holds up to 512 notifications before discarding old ones.

*Trace to File* deposits the OMF calls to an ASCII file "C:\TRACED.OMF". Whenever you turn file tracing on, a message is written to the file so that you can be aware of breaks in the data. Note that this is not the same trace file used by the standard NewWave tracing facility.

*Trace to File and Window* deposits OMF call notifications in both the "\TRACED.OMF" file and the diagnostic window.

*OMF Trace Off* turns off tracing to the standard NewWave trace file. It does not affect the NewWave tracing mode of the OMF or any other application.

*OMF Trace On* causes all trace messages by the diagnostic utility to also be output to the standard NewWave trace file "C:\TRACE.OMF". Using this command does not affect the NewWave tracing mode of the OMF or any other application. This command can be used in addition to the window and file tracing described above.

*Sure File Trace* ensures that all trace statements are posted to the disk so that in the event of a crash the last OMF call will be captured. This is the default option.

*Fast File Trace* takes up less overhead but runs the risk of lost calls and file corruption in the event of a system crash.

Performance Utility Programs

The purpose of the Performance Utility programs is to provide the following performance measurement capabilities for programs running under Microsoft Windows 2.0:

- Recording segment load information.
- Timing of activities under windows.
- Controlling memory allocation.
- Measuring disk input and output.

The following files are provided in the \perform subdirectory:

- READ.ME - For instruction
- SEGTRAK.COM - segment load tracker
- PERF.EXE - windows performance tool
- PERF.SYM - the .SYM file for PERF.EXE

Installing the Performance Package.

- Copy \PERFORM\SEGTRAK.COM into the root directory or any convenient subdirectory that can be accessed by your path specifications.

- Copy PERF.EXE to a convenient subdirectory. You will be running PERF.EXE from Windows.

SEGTRAK *SEGTRAK.COM* is a Terminate-stay-resident (TSR) program that provides segment tracking. The syntax to run SEGTRAK is:

SEGTRAK

Loads SEGTRAK.COM as a Terminate-stay-resident (TSR) program that hooks into the Windows segment tracking interface.

SEGTRAK /U

Unloads SEGTRAK. This can only be done if no other programs have been loaded above (after) SEGTRAK.

SEGTRAK generates SEGTRKnn.TXT files in the directory that is active when it is started. *SEGTRKnn.TXT* is an ASCII file containing segment loading and annotatation information. Multiple ASCII files may be generated (at user request) during the course of a Windows session. For a given Windows session, SEGTRKnn.TXT files are numbered starting at nn = 00, up to nn = 99 (after which point they wrap back to 00).

Refer to the SEGTRAK window description below for details on the commands that control the generation of these files.

PERF *PERF.EXE* is the main controller program for performance measurement under Windows.

The main window is captioned "Performance Tool". It continuously displays the currently available free memory under Windows (updated once per second), as returned from a call to GlobalCompact(0), whether it is iconized or displayed.

PERF.EXE has three popup menus:

- Open Menu: Used to open the popups if you have closed them.

- Close Menu: Used to close any of the popups. They can also be closed from their system menus.

- Mode Menu: Used to set the mode. The following options may be selected:

- *Manual* changes the Timer Menu from "Set Reset" to "Start Stop" and decouples the other popup windows from the "Timer" window (see below). In this mode, the "Timer" window functions as a simple stop watch.

- *Auto Show* sets "Auto" mode (see "Timer" window). A popup window remains visible on the screen during timer activities, unless it is overlaid by another window in the same part of the screen.

- *Auto Hide* sets "Auto" mode (see "Timer" window). Popup windows are killed during timer activities and recreated at the termination of a timer activity (see "Timer" window).

Timer Popup Window

This window operates in one of the three modes described above. Manual mode operation, as described, is self-explanatory. In either of the "Auto" modes, timer activities are triggered by the "Set" menu. When "Set" is selected, the "Timer" window waits until it receives a WM_ACTIVATEAPP message with a wParam of 0, indicating that it is being deactivated. At that point, it starts a 1/10th second timer and waits until it receives two consecutive WM_TIMER messages in less than a 1/2 second interval. When this occurs, "Timer" assumes that the timer event has completed and then terminates the timer activity.

It is IMPORTANT to note that this definition of a timer activity is based on the timed event not yielding to Windows until completion.

A typical use of an "Auto" timer activity is measuring the time it takes to start an application. To do this, you select "Set" in the "Timer" window and then double-click on the icon or program.

The "Reset" menu can be used to cancel a "Set" trigger if you forget to do something that has to be done (e.g., changing subdirectories) before starting your timer activity.

Note

Once you have triggered a timer activity with the "Set" menu, ANYTHING you do that causes the "Timer" window to be de-activated will be interpreted as the start of the timer activity. This will result in a spurious timer activity if you do something inadvertant, such as single- click on another window, or, as mentioned above, try to interpose some intervening activity such as changing subdirectories.

- As noted above, in "Auto Show" mode, the popups remain visible (except as previously noted) during a timer activity. In "Auto Hide" mode, all of the popups except "Timer" itself are killed when "Set" is selected. When the timer activity starts, "Timer" kills itself. When the timer activity completes, the popups are re-created. Note that the popups are actually destroyed, not just hidden. This allows timing of screen-intensive events that would otherwise be distorted by the presence of an invisible popup.

Memory Popup Window

This window's primary function is to allow timed activities to be performed in various available memory sizes, and to report available memory as various operations are performed.

"Memory" has three popup menus. "Allocate" and "Free" are more or less self-explanatory; they simply perform global memory allocations and frees as requested. "Memory" always maintains only one global allocation block. Additional allocation requests after the first are done via GlobalReAlloc.

The "Compact" menu performs a GlobalCompact(-1), which is supposed to discard everything that is discardable and not locked. The function of "GC(-1) in 10 seconds" selection is to allow the tester to perform other (limited) operations before the GC(-1) is done. This is useful in segment tracing when you want to see exactly which segments are invoked for a particular operation. It allows you to give the focus to the window being tested before the GC(-1) takes place, so that segments brought in as a result of getting focus can be kicked out.

Unlike the main PERF window, "Memory" does not update its available memory except as a result of an explicit or implicit action; it is only updated at the completion of an "Auto" mode timer activity, or when the "Memory" window is given the focus (i.e., receives a WM_SETFOCUS message.

DiskIO Popup Window

If you have an HP Vectra ES and are using the HP disk cache "HPCACHE.COM", PERF displays the DiskIO popup windows. It displays the logical and physical disk I/O's as maintained by the HPCACHE.COM TSR program.

The numbers are not particularly meaningful unless you are running with only one MS-DOS disk buffer configured in CONFIG.SYS, since HPCACHE caches below the MS-DOS buffering level.

This window has two menus:

- The Reset Window, which resets the disk IO counters to zero;
- The Flush Window, which flushes (empties) the cache.

As noted in the "Timer" window, timer activities automatically do a "Reset" at the start and update the "DiskIO" window on completion. Otherwise, as in case of the "Memory" window, the "DiskIO" window is updated only when it is given the focus.

Segtrak Popup Window

This window is the main Windows interface to SEGTRAK.COM. It appears only if SEGTRAK.COM is installed, and the version and update level (v.uu of v.uu.ff of Version.Update.Fix) are the same for PERF.EXE and SEGTRAK.COM.

SEGTRAK has two popup menus:

- The Control menu which has the following commands:
    - New Trace File: Writes and closes current "SEGTRKnn.TXT" file, increments nn and opens next.
    - Annotate: Opens a dialog box in which you can enter text you want to be included in a trace file. This text is inserted in sequence in the current trace file, and is useful for noting (commenting) before or after an event.
- The Mode menu which has the following commands:
    - Everything: This is the default mode. Segment tracking is performed on everything running under Windows.
    - Module: Opens a dialog box in which you can enter a module name. Restricts segment tracking to specific module. In some cases, the module name will not be the same as the .EXE file. It must be same as it would appear in Heapwalk. If you are not sure what the module name is, use Heapwalk to check it.

E  Error Codes

The following is a listing of the file data from the file "NWOMFERR.H". This contains a list of all the error codes which can be generated by the OMF. This file will normally be included by "NWOMF.H" but can be compiled out by defining the flag NO_OMF_ERR.

Errors in the range 0x0001 to 0x0FFF are non-fatal. Many of these will occur as a result of an illegal request to the OMF.

| | |
|---|---|
| INVALID_SCOPE | 0x0050 |
| PASSED_HWND_NO_MATCH | 0x0051 |
| RESCLASS_TABLE_FULL | 0x0052 |
| OUT_OF_LOCAL_MEMORY | 0x0053 |
| RESCAT_TABLE_FULL | 0x0054 |
| RESXREF_TABLE_FULL | 0x0055 |
| ILLEGAL_ROUTINEID | 0x0058 |
| ILLEGAL_REENTRY | 0x0059 |
| OMFLIB_GLOBAL_MEMORY_ERROR | 0x0060 |

| 407 | 408 |
|---|---|
| GET_ON_UNKNOWN_OBJECT | 0x0063 |
| GET_ON_ACTIVE_LIBRARY | 0x0065 |
| LOAD_OBJECT_UNABLE_TO_GET_HWND | 0x0066 |
| EXEC_FAIL_FILE_NOT_FOUND | 0x0067 |
| EXEC_FAIL_NOT_ENOUGH_MEMORY | 0x0068 |
| FREEING_NON_EXISTENT_REFERENCE | 0x0069 |
| ASSIGN_CIRCULAR_REFERENCE | 0x006f |
| ASSIGN_ON_WRONG_FROM_SCOPE | 0x0070 |
| ASSIGN_ON_WRONG_TO_SCOPE | 0x0071 |
| ASSIGN_WITH_NO_FROM_OBJECT | 0x0072 |
| ASSIGN_WITH_EXISTING_TONAME | 0x0073 |
| ASSIGN_TO_NULL_WITH_NO_TONAME | 0x0074 |
| DELETE_WITH_OUTSTANDING_GET | 0x0075 |
| DELETE_WITH_ACTIVE_DESCENDANTS | 0x0076 |
| ASSIGN_FROM_OUTSTANDING_GET | 0x0077 |
| COPY_WITH_WRONG_FROM_SCOPE | 0x0078 |
| COPY_WITH_WRONG_TO_SCOPE | 0x0079 |
| COPY_NO_GLOBAL_MEMORY | 0x007A |
| COPY_TO_EXISTING_OBJECT | 0x007B |
| COPY_WITH_OBJECTS_ACTIVE | 0x007C |
| COPY_FROM_UNKNOWN_OBJECT | 0x007D |
| COPY_EXTERNAL_FAILED | 0x007E |
| ASSIGN_SCOPE_MISMATCH | 0x007F |
| COPY_SELF_FAILED | 0x0080 |
| OBJECT_NOT_OPEN | 0x0081 |
| OBJECT_ALREADY_OPEN | 0x0082 |
| ILLEGAL_COPY_CALL | 0x0085 |
| ACTIVE_OBJECT_WINDOW_HANDLE_BAD | 0x0090 |
| UNABLE_TO_IMPORT_DATA_FILES | 0x0092 |
| IMPORT_WITH_NONEXISTING_CLASS | 0x0093 |
| IMPORT_TO_EXISTING_OBJECT | 0x0094 |
| IMPORT_WITH_WRONG_TO_SCOPE | 0x0095 |
| EXPORT_OF_NONEXISTENT_OBJECT | 0x0096 |
| EXPORT_WITH_WRONG_FROM_SCOPE | 0x0097 |
| EXPORT_OF_ACTIVE_OBJECT | 0x0098 |
| UNABLE_TO_LOAD_TYPESTRING | 0x00a0 |
| SEND_WITHOUT_GETOMFOBJECT | 0x0101 |
| SEND_BAD_WINDOW_HANDLE | 0x0102 |
| GET_CLASS_ON_UNKNOWN_OBJECT | 0x0106 |
| MAKEOBJPARAM_UNKNOWN_OBJECT | 0x0107 |
| SERIALISE_WRITE_ERROR | 0x0130 |
| SERIALISE_USER_CANCEL | 0x0132 |
| SERIALISE_BAD_REFNAME | 0x0133 |
| SERIALISE_WITH_WRONG_SCOPE | 0x0134 |
| SERIALISE_IS_IN_PROGRESS | 0x0135 |
| SERIALISE_ERROR_CREATING_FILE | 0x0136 |
| SERIALISE_WITH_OBJECTS_ACTIVE | 0x0137 |
| SERIALISE_FAILED_ON_OBJECT_FILE | 0x0139 |
| SERIALISE_BAD_CLASS_NAME | 0x013a |
| SERIALISE_OUT_OF_GLOBALMEMORY | 0x013b |
| CANT_LOCK_SERIALDATA_MEMORY | 0x013c |
| SELFSERIAL_OBJECT_FAILED | 0x013d |
| ERROR_NOT_SERIALISING | 0x013e |
| SERIALISE_DEINSTALLED_CLASS | 0x013f |

| | |
|---|---|
| DESERIALISE_WITH_WRONG_SCOPE | 0x0150 |
| DESERIALISE_TO_EXISTING_OBJECT | 0x0151 |
| DESERIALISE_ERROR_OPENING_FILE | 0x0152 |
| DESERIALISE_READ_ERROR | 0x0153 |
| DESERIALISE_FILE_HAS_BAD_DATA | 0x0154 |
| DESERIALISE_OUT_OF_LOCALMEMORY | 0x0155 |
| DESERIALISE_OBJECT_FILE_FAILED | 0x0158 |
| DESERIALISE_TOO_MANY_CLASSES | 0x0159 |
| ERROR_NOT_DESERIALISING | 0x015a |
| DESERIALISE_WRONG_VOLUME | 0x015b |
| DESERIALISE_INVALID_RECORD_ID | 0x015c |
| NOT_A_DESERIALISE_FILE | 0x015d |
| INVALID_WINDOW_HANDLE | 0x0161 |
| CANT_LOCK_GLOBAL_PARAMETER | 0x0162 |
| COPYFILE_PARTIAL_READ | 0x0166 |
| COPYFILE_PARTIAL_WRITE | 0x0167 |
| UNABLE_TO_COPY_FILE | 0x0168 |
| UNABLE_TO_DELETE_FILE | 0x0169 |
| CANT_ACCESS_FILE_TO_COPY | 0x016a |
| OMF_WINDOW_HANDLE_BAD | 0x0171 |
| RECOVERY_OUTOF_MEMORY | 0x0172 |
| NO_SUCH_PROPERTY | 0x0181 |
| BAD_PROPERTY_LENGTH | 0x0182 |
| PROPERTY_DIRECTORY_FULL | 0x0183 |
| PROP_NO_LOCAL_MEMORY | 0x0184 |
| BAD_PROPERTY_NAME | 0x0185 |
| BAD_HPROPERTIES | 0x0186 |
| BAD_PROP_SIGNATURE | 0x0187 |
| HPROP_LOCK_FAILED | 0x0189 |
| PROP_UNKNOWN_OBJECT | 0x018B |
| PROP_NO_GLOBAL_MEMORY | 0x018C |
| PROP_FILE_FULL | 0x0194 |
| TOO_MANY_DESCENDANT_GENERATIONS | 0x01c0 |
| ISDESCENDANT_BAD_NAME | 0x01c1 |
| ENUMOBJECT_GLOBAL_MEMORY_FAILED | 0x01c8 |
| ENUMOBJECT_PARAMETER_ERROR | 0x01c9 |
| ENUMOBJECT_NAME_ERROR | 0x01ca |
| CONFIG_BAD_NAME | 0x01d0 |
| SETMODIFIED_TOO_DEEP | 0x01e0 |

/* Installation successful returns */

| | |
|---|---|
| INSTALL_NO_ERROR | 0 |
| INSTALL_NEW_REFNAME | 1 |
| INSTALL_NO_OBJECT_INSTANCE | 2 |

/* Installation errors */

| | |
|---|---|
| INSTALL_BAD_INFO_STRUCTURE | 0x01f5 |
| INSTALL_CLASS_NAME | 0x01f6 |
| INSTALL_USER_CANCEL | 0x01f7 |
| INSTALL_ICONLIB | 0x01f8 |
| INSTALL_ICOFILE | 0x01f9 |
| INSTALL_NOTNEWEXE | 0x01fa |
| INSTALL_EXEACCESS | 0x01fb |
| INSTALL_HAS_ACTIVE_OBJECT | 0x01fc |
| INSTALL_PREEXISTING_OBJECT | 0x01fd |
| INSTALL_REFNAME | 0x01fe |
| INSTALL_EXPECTED_STRING | 0x01ff |
| INSTALL_MISSINGPARAM | 0x0200 |

| 411 | 412 |
|---|---|
| INSTALL_EXPECTED_FILENAME | 0x0201 |
| INSTALL_TOO_MANY_PATHS | 0x0202 |
| INSTALL_BADMETHODNAME | 0x0203 |
| INSTALL_BADFILEDATA | 0x0204 |
| INSTALL_EXPECTED_KEYWORD | 0x0205 |
| INSTALL_PARAMETER_SIZE | 0x0206 |
| INSTALL_TOO_MANY_PROPS | 0x0207 |
| INSTALL_BADPARENT | 0x0208 |
| INSTALL_TOOMANYCLASSES | 0x0209 |
| INSTALL_BADVOLUME | 0x020a |
| INSTALL_MEMORY_ERROR | 0x020b |
| INSTALL_DUPLICATE_KEYWORD | 0x020c |
| INSTALL_CANT_OPEN_FILE | 0x020d |
| INSTALL_BADPROPERTY | 0x020e |
| INSTALL_OBJECT_PARAM | 0x020f |
| INSTALL_CANT_COPY_FILE | 0x0210 |
| INSTALL_TOO_MANY_METHODS | 0x0211 |
| INSTALL_BAD_PROPVALUE | 0x0212 |
| DEINSTALL_NOT_ENOUGH_MEMORY | 0x0213 |
| DEINSTALL_FILE_CORRUPT | 0x0214 |
| DEINSTALL_FILE_ACCESS_ERROR | 0x0215 |
| INSTALL_BAD_DESTDIR | 0x0216 |
| DEINSTALL_HAS_ACTIVE_OBJECT | 0x0217 |
| INSTALL_COMPONENT_MISMATCH | 0x0218 |
| INSTALL_BAD_VOLUME_LABEL | 0x0219 |
| INSTALL_NO_MODULES_ON_VOL | 0x021a |
| INSTALL_NO_OBJ_FILES_ON_VOL | 0x021b |
| DEINSTALL_NO_SUCH_CLASS | 0x021c |
| DISKSIZE_BAD_CHILD_NAME | 0x0221 |
| SHUTDOWN_REFUSED_BY_OBJECT | 0x0243 |
| NO_GLOBAL_MEMORY_TO_WARMSTART | 0x0250 |
| REMCHILD_BAD_PARENT_NAME | 0x0300 |
| REMCHILD_BAD_CHILD_NAME | 0x0301 |
| REMCHILD_PARENT_NO_METHOD | 0x0302 |
| REMCHILD_ACTIVE_PARENT_FAILED | 0x0303 |
| REMCHILD_PROP_BAD_OR_MISSING | 0x0304 |
| REMCHILD_PROP_UPDATE_ERROR | 0x0305 |
| ADDCHILD_BAD_PARENT_NAME | 0x0310 |
| ADDCHILD_BAD_CHILD_NAME | 0x0311 |
| ADDCHILD_PARENT_NO_METHOD | 0x0312 |
| ADDCHILD_ACTIVE_PARENT_FAILED | 0x0313 |
| ADDCHILD_PROP_BAD_OR_MISSING | 0x0314 |
| ADDCHILD_PROP_ZERO_SPACELEFT | 0x0315 |
| ADDCHILD_PROP_BAD_NEXTREFNAME | 0x0316 |
| ADDCHILD_PROP_UPDATE_ERROR | 0x0317 |
| ADDCHILD_CIRCULAR_REFERENCE | 0x0318 |
| ADDCHILD_CHILD_EXISTS | 0x0319 |
| GETLINK_BAD_OBJECTNAME | 0x0320 |
| FLAG_BAD_FLAG_TO_SET | 0x0330 |
| GETMETHOD_BAD_OBJECTNAME | 0x0340 |
| GETMETHOD_NO_GLOBAL_MEMORY | 0x0341 |
| EMPTY_NO_CLIPBOARD | 0x0350 |
| EMPTY_ERROR_DELETING_FILE | 0x0351 |
| NOTIFY_BAD_HPROPERTIES | 0x0361 |
| NOTIFY_GLOBAL_ALLOC_FAILED | 0x0362 |
| NOTIFY_GLOBAL_LOCK_FAILED | 0x0363 |
| NOTIFY_CORRUPT_LIST | 0x0364 |
| GETSTATE_BAD_OBJECTNAME | 0x0370 |

| | |
|---|---|
| GETDIRECTORY_BAD_ID | 0x0380 |
| DIAGERR_GLOBAL_MEMORY_FAILURE | 0x0390 |
| DIAGERR_BAD_TYPE | 0x0391 |
| DIAGERR_BUFFER_TOO_SMALL | 0x0392 |
| DIAGERR_BAD_WINDOWHANDLE | 0x0393 |
| DAL_BAD_OBJECTNAME | 0x03a0 |
| DAL_ACTIVE_OBJECT | 0x03a1 |
| DAL_NO_LIB_FILE | 0x03a3 |
| DAL_INSUFFICIENT_MEMORY | 0x03a4 |
| DAL_LOADLIB_ERROR | 0x03a5 |
| DAL_NO_MESSAGEPROC | 0x03a6 |
| DAL_NO_LOCAL_MEMORY | 0x03a7 |
| DAL_NO_GLOBAL_MEMORY | 0x03a8 |
| DAL_LIB_INIT_ERROR | 0x03a9 |
| DAL_USER_INIT_ERROR | 0x03aa |
| DAL_LIB_TERMINATE_ERROR | 0x03ab |
| DAL_USER_TERMINATE_ERROR | 0x03ac |
| DAL_SEND_BAD_HDALOBJECT | 0x03ad |
| DAL_FREE_BAD_HDALOBJECT | 0x03ae |
| | |
| VIEW_BAD_HVIEW | 0x03b0 |
| VIEW_NOT_DATALINK | 0x03b1 |
| VIEW_NO_GLOBAL_MEMORY | 0x03b2 |
| VIEW_BAD_OBJECTNAME | 0x03b3 |
| VIEW_NOT_INITIALIZED | 0x03b4 |
| VIEW_NOT_ACTIVE | 0x03b5 |
| VIEW_SEND_NO_METHOD | 0x03b6 |
| VIEW_SEND_UPDATE_FAILED | 0x03b7 |
| VIEW_BAD_FUNCTION | 0x03b8 |
| VIEW_BAD_TEXT_HANDLE | 0x03b9 |
| VIEW_UNDEFINED_DATAID | 0x03ba |
| VIEW_BAD_PARENT | 0x03bb |
| VIEW_BAD_SNAPCLASS | 0x03bc |
| VIEW_BAD_VIEWCLASS | 0x03bd |
| VIEW_ALREADY_INITIALIZED | 0x03be |
| VIEW_BACKGROUND_CALLER | 0x03bf |
| VIEW_NO_LOCAL_MEMORY | 0x03c0 |
| VIEW_DEAD_SNAPSHOT | 0x03c1 |

0xA00 to 0xFFF are for non-fatal API errors.

Errors with value above 0x1000 are regarded as FATAL errors, which will usually indicate that some UNRECOVERABLE error has occurred. OMF will already have displayed a generic error message when one of these errors is returned. Actual severity varies, but in all cases it would be best to shut the system down soon.

FATAL errors >= DISK_ERROR (0x1400) are probable disk errors.

| | |
|---|---|
| FATAL_ERROR | 0x1000 |
| DISK_ERROR | 0x1400 |
| OMF_INTERNAL_RES_TABLES_CORRUPT | 0x1005 |
| OMF_INTERNAL_SYSCAT_FILE_BAD | 0x1007 |
| OMF_INTERNAL_TOO_MANY_CLASSES | 0x100A |
| UNABLE_TO_ACCESS_SYS_DIRECTORY | 0x1010 |
| UNABLE_TO_ACCESS_LOG_DIRECTORY | 0x1011 |
| UNABLE_TO_ACCESS_APP_DIRECTORY | 0x1012 |
| UNABLE_TO_OPEN_FILE | 0x1013 |
| MISSING_FILE_HEADER_BLOCK | 0x1015 |

| 415 | 416 |
|---|---|
| INVALID_FILE_SIZE | 0x1016 |
| UNABLE_TO_ACCESS_DOSAPP_DIR | 0x1017 |
| INVALID_FILEID_STRING_IN_HEADER | 0x101B |
| INVALID_FILE_VERSION_NUMBER | 0x101C |
| REACHED_END_OF_FILE | 0x1020 |
| INVALID_RECORD_NUMBER | 0x1021 |
| INVALID_FIRST_FREE_RECORD | 0x1024 |
| UNABLE_TO_ALLOCATE_RECORD | 0x1025 |
| FREE_RECORD_READ | 0x1028 |
| UNABLE_TO_DUPLICATE_HANDLE | 0x102A |
| UNABLE_TO_OPEN_CONFIG_FILE | 0x102C |
| INVALID_CONFIG_KEYWORD | 0x102D |
| MISSING_CONFIG_VARIABLE | 0x102F |
| EXEC_FAIL_INVALID_FUNCTION | 0x1040 |
| EXEC_FAIL_BAD_ENVIRONMENT | 0x1043 |
| EXEC_FAIL_BAD_FORMAT | 0x1044 |
| UNABLE_TO_EXEC_RESOURCE_FILE | 0x1046 |
| INVALID_DISC_DRIVE_ID | 0x1049 |
| CHILD_FAILED_TO_TERMINATE | 0x1053 |
| UNABLE_TO_LOAD_ICON | 0x1058 |
| XREF_GLOBAL_MEMORY_FAILURE | 0x1070 |
| XREF_LOCAL_MEMORY_FAILURE | 0x1071 |
| XREF_BAD_DATA | 0x1074 |
| UNABLE_TO_LOAD_RESOURCES | 0x1080 |
| DISK_ERROR_ICONLIB_MAY_BE_BAD | 0x1081 |
| DAL_LIBCAT_CORRUPT | 0x1090 |
| DAL_LIBXREF_CORRUPT | 0x1091 |
| VIEW_CORRUPT_VIEW_XREF | 0x10a0 |
| INIT_NO_LOCAL_MEMORY | 0x10b0 |
| INIT_CREATEWINDOW_FAILED | 0x10b1 |
| INIT_REGISTERCLASS_FAILED | 0x10b2 |
| INIT_LOGO_DISPLAY_FAILED | 0x10b3 |

Property file consistency errors follow.

| | |
|---|---|
| PROP_BAD_LISTDESC | 0x10c0 |
| PROP_BAD_NAME_POOL | 0x10c1 |
| PROP_BAD_PROPENTRY | 0x10c2 |
| PROP_DIR_PAST_EOF | 0x10c3 |
| PROP_VALUE_PAST_EOF | 0x10c4 |
| PROP_DIR_NOT_ALLOCATED | 0x10c5 |
| PROP_VALUE_NOT_ALLOCATED | 0x10c6 |
| PROP_DIR_DUP_ALLOCATED | 0x10c7 |
| PROP_VALUE_DUP_ALLOCATED | 0x10c8 |
| PROP_DIR_BAD_DISKLOC | 0x10c9 |
| PROP_VALUE_BAD_DISKLOC | 0x10ca |
| PROP_DIR_BAD_LENGTH | 0x10cb |
| PROP_VALUE_BAD_LENGTH | 0x10cc |
| CORRUPT_HPROPLIST | 0x10d0 |
| UNABLE_TO_FREE_LOCAL_MEMORY | 0x01d8 |

Disk errors follow.

| | |
|---|---|
| OMF_INTERNAL_INVALID_PATHNAME | 0x1400 |
| OMF_INTERNAL_DIR_CREATE_FAILED | 0x1401 |
| OMF_INTERNAL_CORRUPT_SYSCLASS | 0x1402 |
| UNABLE_TO_CLOSE_FILE | 0x1403 |
| UNABLE_TO_SEEK_TO_START | 0x1404 |
| UNABLE_TO_READ_OMF_HEADER | 0x1405 |

| | |
|---|---|
| UNABLE_TO_WRITE_OMF_HEADER | 0x1406 |
| UNABLE_TO_SEEK_TO_RECORD | 0x1407 |
| UNABLE_TO_READ_OMF_RECORD | 0x1408 |
| UNABLE_TO_WRITE_OMF_RECORD | 0x1409 |
| UNABLE_TO_DELETE_OMF_RECORD | 0x140a |
| UNABLE_TO_FLUSH_FILE | 0x140b |
| XREF_FILE_READ_ERROR | 0x1410 |
| XREF_FILE_WRITE_ERROR | 0x1411 |
| PROP_FILE_SIZE_FAILED | 0x1420 |
| PROP_FILE_READ_FAILED | 0x1421 |
| PROP_FILE_WRITE_FAILED | 0x1422 |
| PROP_FILE_FLUSH_FAILED | 0x1423 |
| PROP_FILE_CLOSE_FAILED | 0x1424 |
| PROP_FILE_LSEEK_FAILED | 0x1425 |
| UNABLE_TO_PRODUCE_SHUTDOWN_FILE | 0x1430 |

0x1A00 and above are for API fatal errors.

F   Localization Guidelines

Overview

This appendix provides information to aid the development of localizable software. It addresses the issues which must be dealt with at the time of software design and implementation. It covers in detail the technical solutions for international features of software developed in the NewWave and Microsoft Windows program development environment.

Note

Some of the NewWave utility functions described in this appendix are currently implemented in a localization dynamic library which is separate from the standard HPNWLIB library. If you use these functions in your application, your source files must include the file HPNLSLIB.H to define these functions and their associated types. Then when you link your application, link with the library HPNLSLIB.LIB in addition to HPNWLIB.LIB and the Windows library.

Designing International Software

A design objective in the NewWave is to make the U.S. product as international as possible. Since Windows 2.0 is Western-language based, the NewWave running in the Windows environment is constrained to supporting Western European languages only. NewWave is further constrained by the Windows-supported hardware configurations. The following keyboards are supported by Windows and therefore U.S. NewWave:

- U.S. keyboard
- British keyboard
- Danish keyboard
- French keyboard
- German keyboard
- Italian keyboard
- Norwegian keyboard
- Swedish/Finnish keyboard
- Spanish national keyboard
- Swiss French keyboard
- Swiss German keyboard
- Driver from a disk provided by the hardware manufacturer Product features which require special attention for our non-U.S. customers fall generally into four categories, both from the customer's perspective and technically:

- data integrity;
- character handling;
- user interface;
- local conventions.

This document will discuss how an application determines which country and / or language to use, and each of the four categories of features which are affected accordingly.

Country / Language Selection

Because NewWave features integration across installations and hardware, there are two types of country/language selection: user installation configuration, and data object country ID.

User Installation Configuration

The user configures the international behavior of his installation by running CONTROL.EXE. He can select such things as country ID and date/time/currency formats. These settings are stored in the INTL section of WIN.INI. The WIN.INI format is documented in the Microsoft Windows Programmer's Reference Manual.

To the extent possible, the NewWave user interface will behave according to the international settings in WIN.INI at the time the application is invoked. For example, it is this country ID which will be used for such things as date/time formatting.

In HPNWLIB, NW_ReadIntl reads the international information from WIN.INI:

```
NW_ReadIntl (lpIntlStruct )
```

*lpIntlStruct* is a long pointer to the INTLSTRUCT structure.

If WIN.INI does not contain an INTL section (as is the case with the U.S. version of Windows when it is shipped), the default will be the U.S. configuration.

Data Object Country ID

Data object attributes are to be handled differently. Because of the distributed environment supported in the NewWave, it is to be expected that users will want to create multi-lingual composite objects. The need to support these has motivated the definition of a new acronym:

- WCSIWYG: What creator saw is what you get.

For example, if someone mails a French spreadsheet object for inclusion into a user's English document, it would retain its French attributes (e.g. French currency formatting) unless explicitly changed by the recipient.

It should be noted that the data object country ID is independent of the installation configuration.

The data object country ID determines how the data is displayed to the user. It affects such things as currency formatting, spell-checking language, and hyphenation. It is a user-configurable object attribute.

HP has supplied a function in the localization dynamic library to return, for a given country code, information about date, time, currency, and number formatting:

```
NW_GetLangInfo (nCountry, lpLangInfo)
```

*lpLangInfo* is a long pointer to a structure defined as follows:

```
typedef struct {
    int iDate;      /* 0=MDY, 1=DMY, 2=YMD */
    int iCurrency;
    /* 0 for currency symbol prefix, no separation
       1 for currency symbol sufix, no separation
       2 for currency symbol prefix, 1 character separation
       3 for currency symbol suffix, 1 character separation */
    int iDigits;    /* number of significant decimal digits in currency */
    int iTime;      /* 0 for 12 hour clock, 1 for 24 hour clock */
    int iLzero;     /* 0 for no leading zeros, 1 for leading zeros */
    char s1159[6];  /* Trailing string from 0:00 to 11:59
                       can be "AM" or "NONE"      */
    char s2359[6];  /* Trailing string from 12:00 to 23:59
                       can be "PM" or "NONE" */
    char sCurrency[4]; /* Currency symbol string */
    char sThousand[2]; /* Thousands separator string
                          NO thousand separator in Belgium,
                          French and Finnish */
    char sDecimal[2];  /* Decimal seperator string */
    char sDate[2];     /* Date seperator string */
    char sTime[2];     /* Time seperator string */
    char sList[2];     /* List seperator string */
} LANGINFOSTRUCT, *PLANGINFOSTRUCT, far *LPLANGINFOSTRUCT;
```

Note that this structure is not the same as the INTLSTRUCT structure returned by the NW_ReadIntl function of NWLIB.

Please note that both data object and installation international settings are independent of the language in which the .RC file text is stored. This means that the U.S. product, with English-language message boxes, has the versatility to display international dates and spell-check a French document.

Data Integrity  Textual data is represented by a character set. A character set consists of the character images and their numeric representation. The industry standard (more or less) for U.S. characters is U.S. ASCII.

There is no industry-standard character set for representing international textual data. The Windows environment uses the "ANSI" character set. It is a superset of U.S. ASCII, and is close to but not quite the standard adopted by the European Computer Manufacturers' Association (ECMA) for Western European languages. This set differs from ROMAN8 (HP's standard), various versions of the IBM PC's IBM8, Lotus's LICS, and IBM's EBCDIC in both the characters and their numeric representations.

ANSI is the set to be used by the NewWave since it comes with the Windows environment. To the extent that the NewWave leaves the Windows environment (e.g. NewWave Mail), it will need to support the character sets of the external environment.

Since the Windows character set supports only Western European languages, this means the NewWave will only support those languages at first release. The reason for this restriction is technical: the non-Western languages of the world have additional requirements. These requirements are described in the following table for a representative selection of languages:

Table F-1. Non-Western Language Requirements

| Language | Character Set | Standard? | Bits / Character | Directionality | Script? |
|---|---|---|---|---|---|
| Traditional Chinese | Traditional Chinese | no | 16 | L-to-R (horiz)/ R-to-L (vert) | no |
| Simplified Chinese | Simplified Chinese | no | 16 | * | no |
| Japanese | Katakana/Kanji | no | 16 | * | no |
| Korean | Hangul/Trad.Ch. | no | 16 | * | no |
| Hebrew | Hebrew | no | 8 | bidirectional | no |
| Arabic | Arabic | no | 8 | bidirectional | yes |
| Turkish | Turkish | no | 8 | L-to-R | no |
| Greek | Greek | no | 8 | L-to-R | no |
| Portuguese | "Western +" | no | 8 | L-to-R | no |
| U.S. | U.S. ASCII | yes | 7 | L-to-R | no |
| West. Europe | Windows | no | 8 | L-to-R | no |

In general, the places in a program where data integrity must be handled are the following:

- keyboard input
- screen output
- text printing
- transfer to another environment
- file/directory names
- run-time internal representation
- data stored in files
- Windows / NewWave Clipboard
- Data Communications

Keyboard Input

In the NewWave environment, Windows handles keyboard input by converting the hardware character typed by the user into the corresponding Windows character - that is what is furnished by the WM_CHAR message in wParam. The virtual keystroke is converted to a Windows text character in the TranslateMessage routine.

All characters in the Windows character set (including those not on the keyboard) are available to all users. There are two ways for a user to enter characters which are not on the keyboard itself. In both cases the user presses the Alt key and types onto the numeric keypad either the 3-digit decimal IBM code for the desired character or the 3-digit decimal Windows character, preceded by a zero.

For example, to type an uppercase Ç cedille, within Windows you would enter the IBM code (= 128 decimal) by typing:

<Alt> 128;

or, alternately, you would enter the Windows code (=199 decimal) by typing:

<Alt> 0199.

The code chart for the Windows character set is documented in the Microsoft Windows Programmer's Reference Manual. Code charts for hardware character sets such as those on the Vectra are documented in the hardware manuals.

Windows supports a set of input functions which allows the application to control input from the keyboard. Non-U.S. hardware configurations include different keyboards. These keyboards are supported by the U.S version of Windows, and thus by the U.S. version of NewWave.

The Windows virtual keyboards are defined with several types of virtual keys, some of which are common to all keyboards (standard), and some of which are not (OEM-specific). If you make use of virtual keys in any way, you will want to consult the Microsoft discussion of this topic. It is contained in an appendix of the Windows Programmer's Reference Manual. Examples of places where virtual keys are used are:

- Accelerator definition in the resource file;
- processing of WM_KEYDOWN/KEYUP and WM_SYSKEYDOWN/SYSKEYUP messages;
- GetKeyState(nVirtKey) : nState.

Screen Output

All Windows screen output is bit-mapped. Textual data is stored internally in the Windows character set. Thus, no additional conversion is needed.

Text Printing

All necessary conversions to the printer character set (which may be different than the Windows character set) will be done by SPIN. SPIN assumes the textual data given to it is stored in the Windows character set.

Transfer to Another Environment

There are three notable places within the NewWave where data will be stored and manipulated outside of the NewWave environment:

- NewWave Mail messages (integration with HP's ROMAN8-based minicomputers);
- data files of encapsulated versions of DOS applications (e.g., Lotus uses LICS, its proprietary character set);
- OPUS read/write support of external text and document files.

Since the environments are not homogeneous each project will need to address its character set conversion requirements accordingly. There are Windows routines to convert to/from the Windows/hardware character sets:

```
OemToAnsi(lpOemStr,lpAnsiStr) : bTranslated;
AnsiToOem(lpAnsiStr,lpOemStr) : bTranslated.
```

There are also routines in NWLib to convert to and from HP's ROMAN8 and Windows character sets.

```
NW_AnsiToRoman8 ( lpAnsi, lpRoman ) : bTranslated
```

Converts a null-terminated ANSI string to Roman8 character set. *bTranslated* is returned TRUE if the conversion was successful.

```
NW_Roman8ToAnsi ( lpRoman, lpAnsi ) : bTranslated
```

Converts a null-terminated Roman8 string to ANSI character set. *bTranslated* is returned TRUE if the conversion was successful.

File/Directory Names

Files and directories are created by the operating system with a name supplied by the requesting program. If a program internally uses a character set other than that of the hardware, as is the case with a Windows program and its Windows character set, it must be responsible for converting that filename to the character set which the file system is expecting.

Windows provides a file routine which does the conversion automatically:

```
OpenFile(lpFileName,lpReOpenBuff,wStyle) : hFile
```

If a NewWave application performs file operations with a user- supplied file or directory name, this command must be used.

It should be noted that the DOS file system nominally (in documentation) does not support filenames containing non-U.S. characters. In practice, the system (and OpenFile) do nothing to prevent the user from using them. The NewWave allows filenames containing non-U.S. characters to the extent that the file system and OpenFile do.

Run-time Internal Representation

As discussed above, the NewWave uses the Windows character set internally. Thus, any application reading textual data from a different charcter set in an external file will need to convert it upon input.

Data Stored In Files

All NewWave data objects have a character set attribute. It represents the set in which the object's data is stored. For first release, the only supported set is the Windows character set, but once Microsoft releases future versions of Windows with non-Latin language support, other sets will be supported by the NewWave as well.

This feature will enable the object to determine if it can display an instance, and if not tell the user so.

NewWave data objects also have a country ID attribute. This is discussed in the section entitled country/language ID. Support of features which are dependent on country ID can be implemented in one of several ways: by storing the country-specific formatting information with the data (typically done with a spreadsheet), or by storing only the country code with real-time formatting as needed. This is implementation-specific, and is left to the designer to determine which is the best approach for his application.

NewWave Clipboard

NewWave uses the Windows clipboard. All textual data which is read from or written to the clipboard is stored in the Windows character set.

There is one exception to this which presents a problem. It is because of the way Winoldap uses the clipboard. Winoldap reads/writes DOS application data from display memory for clipboard use. It assumes the DOS data is stored in the OEM character set. This is always the case, UNLESS the DOS application has downloaded a font to an EGA display, and the font is stored in something other than the OEM character set.

An example of this is HP's AdvanceLink terminal emulator running in HP (ROMAN8) mode. Winoldap takes the ROMAN8 text, converts it from OEM to ANSI, and puts it onto the clipboard. The result is corrupted data.

Character Handling Character handling is a category which is generally defined to mean tests and operations which are performed on textual data. The features of a program which require international functionality are:

- parsing;
- character typing/validation;
- upshifting/downshifting;
- collating/comparing;
- hyphenation;
- justification;
- cursor positioning;
- spell-checking.

Please note that pre-Windows code which perform these operations are typically based on the hardware character set, and will not work correctly in the Windows environment. An example of this would be Microsoft C string-handling routines. Most routines of this type will require modification to work correctly with the Windows character set.

Parsing

There are two reasons that a parsing routine which works for the English language may not be international. The first is that punctuation characters and rules regarding their use are language-specific. This means that what constitutes a valid token in English may not in a different language. The NewWave program development environment does not currently include international parsing routines. Please refer to the "COUNTRY DEPENDENT INFORMATION" section of this document for punctuation rules.

The second is that the next character in a string is not necessarily physically stored in the next byte to the right. This is because as described above, not all languages use 8-bit, left-to-right character sets. Since the Windows environment does not support these languages at present, there is not a great deal we can do about this. However, to the extent that Windows has supplied the hooks for future support of these languages, use what is there, namely...

```
AnsiNext(lpCurrentChar) : lpNextChar;
AnsiPrev(lpStart,lpCurrentChar) : lpPrevChar.
```

Character Typing/Validation

Character typing routines do things like check to see if a character string is alphabetic, numeric, a symbol, etc.

Ideally, these should be implemented with a look-up table to simplify modification. There are no routines available to do this at present. The reason that this needs to be international is because if a different character set is used, the definition of what is/is not a valid character changes. This can even be a problem within the Western language world - what is or is not an uppercase letter differs by country.

It is strongly recommended that you implement these type of functions as look-up tables in the .RC file.

Upshifting/downshifting

This is country-dependent. Windows provides routines to perform these operations, but they are not country-specific:

```
AnsiUpper(lpStr) : cChar;
AnsiLower(lpStr) : cChar.
```

Do not use these routines.

HP has written country-specific equivalents to these; they are available in the localization dynamic library:

```
NW_Upshift (nCountry, lpStr) : cChar
```

This function handles the country-specific upshifting rules. It converts a string or a character to upper case based on the provided country code. This function works similar to the AnsiUpper routine but it has two parameters instead of one:

*nCountry* is an integer contains the country code value. This value is be a standard country code consistent with the value returned by the NW_ReadIntl function. Country codes 32, 33 and 41 specify the "European French" upshifting rule. Country code 34 specifies the Spanish upshifting rule. These rules are documented in the *Country Dependent Information* section.

*lpStr* is a long pointer to a null terminated string or a single character.

If a single character is given, this function will return cChar a BYTE value which is the corrected uppercase character. Otherwise, this function will return the correspondent upshifted character string based on the provided country code.

```
NW_AccentUpper (nCountry, lpStr);
```

This function fills in the correct uppercase of the accented lowercase characters (from 0xC0 to 0xDF in the ANSI character set) based on the provided country code. It has two parameters:

*nCountry* is an integer contains the country code value. This value is be a standard country code consistent with the value returned by the NW_ReadIntl function. Country codes 32, 33 and 41 specify the "European French" upshifting rule. Country code 34 specifies the Spanish upshifting rule.

*lpStr* is a long pointer to an empty string of 32 elements. On the return this string will contain the correct accented upper case characters base on the provided country code. This returned string is a one part of the whole upshifted ANSI table.

The objective of designing this function is user can save the overhead time by calling the NW_AccentUpper only one time when the country code is changed.

Collating/Comparing

The collating sequences use accent priority and case priority. What this means is that:

- an accented letter and non-accented letter are considered to be the same letter and

- an uppercase and lowercase letters are considered to be the same letter unless both string are "the same". Accents and cases will be used to break ties; accented characters are collated after non-accented characters and lowercase letters are collated after uppercase letters.

Collating order is also country-specific. HP has written routines to do case-dependent and case-independent string compares. They are available in the localization dynamic library.

```
NW_Cicompare (nStrLn2, lpStr2, nStrLn1, lpStr1,
    lpnLanguage):nResult;
NW_Cdcompare (nStrLn2, lpStr2, nStrLn1, lpStr1,
    lpnLanguage):nResult;
```

These routines perform a language dependent string comparison of two strings. *NW_Cicompare* is equivalent to *NW_Cdcompare* with the exception that NW_Cicompare treats the lowercase letters as same as the corresponding uppercase letters. It is not necessary to upshift beofre calling NW_Cicompare (and upshifting first could alter the result).

*nStrLn2* is an integer value specifies the length of the second string ('\0' is not included ).

*lpStr2* is a long pointer to the second string.

*nStrLn1* is an integer value specifies the length of the first string ('\0' is not included ).

*lpStr2* is a long pointer to the first string.

*lpnLanguage* is a long pointer to an integer value specifying the language.

The return value *nResult* is a word which may have the following values

-2 - > The first string is before the second.
    -1 - > The first string is a prefix of the second.
    0 - > Both strings are the same.
    1 - > The second string is prefix of the first.
    2 - > The second string before the first.

If one or both string length are negative, 0 will returned. All blanks are considered to be significant including trailing blanks.

The lpnLanguage is the language parameter. It is a standard country code and determines the collating sequence.

Hyphenation

Hyphenation rules are, of course, very language-dependent. Features which use it should be modularly designed so as to be readily modified or eliminated with minimal engineering effort.

Justification

Since not all languages are read and written left-to-right, justification is not necessarily defaulted to left. An example of where this might be pertinent would be in implementing bullets for text formatting. In order to simplify future support of non-Western languages, it is recommended that code which implements justification be designed in a way that changes for right justification are isolated.

Spell-checking

Spell checkers do not exist for all languages into which we would like to localize our products. Furthermore, many of our customers are multi-lingual, and would like to purchase a product with the capability to spell-check in more than one language. This means that a modularly designed spell-checking facility which allows user installable/selectable spell-checkers is highly desirable.

The implementation of spell-checking is much harder than it sounds. For example, in the United States, we spell the word "localize" with a "z". In the U.K., it is spelled with an "s". Thus, at least two versions of a spell-checker is needed for the English language alone, and when you look at other languages the problems get harder, not easier.

For the NewWave, we are making every effort to make our spell-checking facility modular and linguistically correct.

User Interface    All user interface text is implemented as resources which will be read from resource files. In the Windows environment these strings can be output in a number of ways. These are listed below with a discussion of pertinent localization issues for each. All resource file text is stored in the Windows character set.

TextOut(hDC,X,Y,lpString,nCount)

*nCount* is the length of lpString. This value must not be hard-coded since the size of a string will undoubtedly change with translation. To calculate it at run-time, use the Windows routine

```
strlen(lpString) : nCount.
```

Likewise, the buffer which is used to contain the string must be large enough to accomodate the maximum allowable length for the string in question, and the maximum must be documented in the resource file.

```
DrawText(hDC,lpString,nCount,lpRect,wFormat)
```

The same caveats apply here as listed for TextOut: the translated text may be greater in length, so any restrictions regarding expansion must be documented in the resource file; since the translated length will change, do not hard-code nCount.

```
GrayString(hDC,hBrush,lpOutputFunc,lpData,nCount,X,Y,nWidth,
    nHeight) : bDrawn
```

This is typically used with TextOut, so all restrictions which apply the use of TextOut apply to GrayString. GrayString has an additional feature that is useful: if nCount is zero, Windows will calculate the length for you.

```
MessageBox(hWndParent,lpText,lpCaption,wType) : nMenuItem
```

The control text (OK, YES, NO, etc.) belongs to Windows, and will thus be in the language of the Windows version under which NewWave is running. *lpText* and *lpCaption* are strings containing text which must be read from the resource file. Be sure to document well in the message file the use of these strings, their context, and meaning, since out of context they may be hard to translate correctly.

WindowText

WindowText is a window's caption title, or, in the case of a control, the text within a control. It is manipulated with a set of operations. Listed below are those which use the text:

```
SetWindowText(hWnd,lpString)
GetWindowText(hWnd,lpString,nMaxCount) : nCopied
GetWindowTextLength(hWnd) : nLength
```

Since the text and its length will change with localization, neither the string nor its length should be hard-coded.

Menus

Menus are defined along with their text in the resource file. The text of menus will be translated. A menu bar can be more than one line in length by using the MENUBREAK option. This is useful for localization since translation of a menu's MENUITEM text could necessitate expansion to one or more additional lines. Popup menus an expand to more than one column by using the MENUBREAK option.

Menus can be modified dynamically with the following Windows command:

```
ChangeMenu(hMenu,wIDChangeItem,lpNewItem,wIDNewItem,
    wChange) : bChanged
```

All text must be in the resource file; it would be helpful to translators to document well how these resources are dynamically manipulated.

```
GetMenuString(hMenu,wIDItem,lpString,nMaxCount,wFlag) : nCopied
```

The only pertinent comment here is that the string length will vary with localized versions.

Dialog Boxes

Dialog boxes and their text are defined in the resource file. The dialog box editor DIALOG will be used by the localizers to localize these resources. This raises a number of issues regarding dialog by design. One is that it it would be nice to restrict the localizer to only using DIALOG, and not allow direct manipulation of the dialog box section of the resource file. This would make their job easier. This means that any needed modifications must be supported by DIALOG. Since DIALOG cannot edit custom controls, these should not be used.

If they ARE used, document well exactly which parts of the DIALOG definition should be changed, and which should not.

DIALOG is also very powerful, which means dangerous. For example, if text expansion is great enough, the localizer will want to increase the dimensions of the box unless it has been designed with enough white space. If he expands it, that means that parts of the underlying windows will be covered up which weren't in the U.S. version. If the box takes up the entire screen in English, either:

- add a scroll bar so that the localizer can expand as needed; or
- break it up into two boxes.

It's also dangerous because the dialog box function which processes its dialog box messages must by design make assumptions about features which can be changed with DIALOG.

Also, the steps which a programmer or localizer follows to incorporate the modified box into a program is very accident-prone.

This means that what a localizer should and should not do with DIALOG will need to be well-documented, and the results will need to be well-tested.

To the extent that a control requires special attention, it is discussed below:

- LTEXT, RTEXT, CTEXT

Windows formats the text automatically. This means that the localizer can expand his text as needed.

- LISTBOX

LBS_SORT is a class option which causes the strings of a listbox to be sorted alphabetically. The sort is done internally be Windows, so probably does not match (in some cases) the sort done by the NewWave routines. There is little that can be done about this.

The Windows dialog box procedures which require attention for international are discussed below:

```
DlgDirList (hDlg, lpPathSpec, nIDListBox, nIDStaticPath,
    wFiletype) : bListed
```

In theory, this routine should do the needed character set conversion to correctly display file and directory names. In practice, it does not - there appears to be a defect in this routine. If it works correctly, it should require no additional attention for international.

```
DlgDirSelect (hDlg, lpString, nIDListBox) : bDirectory
```

Since this routine gets its string from DlgDirList, it is affected by the defect described above. Again, in theory, it should require no additional attention.

```
SetDlgItemInt (hDlg, nIDDlgItem, wValue, bSigned)
GetDlgItemInt (hDlg, nIDDlgItem, lpTranslated, bSigned) : wValue
```

These routines do, respectively, ASCII-to-integer and integer-to-ASCII conversions out of and into the text of a dialog item. These have not been tested by HP. The expectation is that they format numbers consistent with the settings in WIN.INI INTL.

```
SetDlgItemText (hDlg, nIDDlgItem, lpString)
GetDlgItemText (hDlg, nIDDlgItem, lpString, nMaxCount) : nCopied
```

*SetDlgItemText* should never use hard-coded text in lpString. *GetDlgItemText* is typically the way to get user-supplied filenames. If that is what you are using it for, refer to the previous discussion of character sets.

Text strings

These are stored in the resource file and retrieved with

```
LoadString (hInstance, wID, lpBuffer, nBufferMax) : nSize
```

The strings in the resource file MUST be well-documented, including nBufferMax.

The Windows Programmer's Reference Guide recommends a format for run-time insertion of parameters into strings. It is incomplete. HP has defined a standard format for specifying parameters in the source message string, and for manipulating it at run-time. The following routines are included in NewWave library:

```
NW_InsertMsgString (lpMessage, nMaxSize, lpInsert) : bStatus
```

This routine will scan lpMessage for "%%", optionally followed by a single digit. The insertion point is the first solitary "%%" digit with the lowest digit.

- lpMessage is a long pointer to the string which may contain the insertion marker "%%".

- nMaxSize is an integer specifies the maximum string length which can be the allocated buffer length for lpMessage.

- lpInsert is a long pointer to the string which is the insertion string.

- bStatus is a boolean value which is used to inform user that the string is inserted or not.

If the resulting string and its terminating null would be longer than nMaxsize, no insertion is done and FALSE is returned. If no insertion point is found, FALSE is also return. True is returned otherwise.

```
NW_InsertMsgNumber (lpMessage, nMaxSize, lNumber) : bStatus
```

This routine is the same as NW_InsertMsgString except that the *lNumber* string is convert to a signed decimal number for insertion.

General caveats regarding the use of strings:

- Allow for 30 - 40% expansion by translation.

- One message, one string - do not use the same string in more that one context, since the multiple meanings are impossible to translate into one sentence. Example: "Read file" could mean the present tense or past tense in English, and it might be tempting to use it for both. DON'T!

- one sentence, one string - do not compose sentences with fragments stored in different strings. These are also impossible to translate. The exception to this is parameters supplied at run-time. See the above discussion of the facility to do this.

- Avoid idioms. The meaning and user-friendliness do not travel well across languages. An example of an idiom is "Warm boot." In Britain, this means "warm car trunk"; in French, it means "hot shoe". They are also bad because we ship English versions of our products around the world, and the idioms don't always make much sense, even in English.

- Nouns have gender in some languages. This means that the phrase "The xxx", where xxx is to be filled in at run-time, may not be localizable since xxx may be masculine in one case and would require a masculine article, and feminine in another with a feminine article. This would be avoided by using two separate messages.

Icons

These will not be localized. It is therefore very important that the images be internationally recognizable and meaningful.

Cursors

Cursors will not be localized. This presents no known problems.

Accelerators

Accelerators are defined the resource file. The keystroke combination is defined in terms of virtual keys. Please refer to the discussion of keyboard input in the data integrity section of these guidelines for a discussion of which virtual keys will work with all supported keyboards.

Fonts

No additional attention is needed for international unless and until Windows is extended to support other character sets. The hook for support of additional character sets exists in the form of the tmCharSet field of the TEXTMETRIC data structure.

Bitmaps

No additional attention needed for international.

RAM Space for Resources

The set of Loadxxx commands are used to load in resources, and they calculate the size of the resource, so the fact that a resource size may change by translation requires no attention by the programmer. The one exception to this is LoadString, as discussed above.

The alternate way to load resources uses the following set of commands:

- AccessResource()
- FindResource()
- LoadResource()
- etc.

These differ from Loadxxx commands in that the resources use local memory. If you use these, please be aware that you will need to allocate enough local memory to store the larger translated resources.

Documenting Resource Files

Resource files must be well-documented for use by localizers. The more information given them about what they are translating, the easier it is for them to do their job, and the better the quality is of the resulting product.

The information they need is:

- context in which the message appears;
- the meaning;
- how to invoke it, if not obvious; and
- where it is used, if in more than one place.

Help

The Lifeguard subsystem is designed for creating HELP text files and processing HELP text at run-time. It is designed facilitate localization, and should be used accordingly.

Local Conventions This is a collection of whatever doesn't fit well into the three previous categories. It is not an inclusive set; there is always more to learn about what it means to support international features!

Defaults

Default settings should be localizer-configurable, NOT hard-coded. All country convention defaults should be localizer-configurable, as should be default filenames, printer configurations, etc.

Date/time formats

These routines are available in HPNWLIB.

Days/months

Days and months and their abbreviations should be implemented as table-lookups which are country-dependent and localizer-configurable. It is expected that these routines will be supported in a future release.

Numeric/currency formats

These are mentioned previously in the context of dialog boxes. We do not have generalized routines at present, although the formatting data is available in WIN.INI INTL. It is expected that these routines will be supported in a future release.

Paper size 8-1/2 X 11" is neither available nor standard internationally. The user can select from a variety of paper sizes for the purposes of page layout. For example, user can select paper size either in metric or U.S. system

- European Letter size (210 X 297 millimeter)
- U.S. Letter size (8.5 X 11 inches)

Units

Inches, feet, Farenheit - none of these are international. Support of multiple types of units (metric and English system) affects things such as margins, pagination, and scaling. These must be user-configurable.

Character Availability

The following characters are not available on all Vectra/IBM keyboards, and should therefore not be used as special characters, wildcards, etc.:

- @ # ] [ { } | \

Note that these, of course, are accessible by the keyboard entry method described previously: by typing <Alt> xxx. Thus, this recommendation is made from the standpoint of ease-of-use.

Punctuation

Punctuation conventions are not international. Thus, things like sentence terminators, string quoters, sentence spacing, etc., should be localizer-configurable.

Indentation

In some countries, TAB is not 5 characters to the right. This should not be hard-coded.

YES/NO

Yes, No, Y, and N are not international. Since these will be handled through Windows resources, routines which parse this type of user input are not needed EXCEPT possibly by an installation routine.

NewWave Localizability Check-List

1. Data Integrity (Applies only to those using non-ASCII character sets or I/O interfaces other than Windows.)

Have you made proper character set conversions in interfaces to Windows (using ANSI) considering transfer...

- from keyboard?
   - to screen?
   - to printer?

Have you made proper character set conversions in interfaces to Windows (using ANSI) considering transfer to other environments through...

- NewWave mail messages?
   - data files of encapsulated versions of DOS-applications?
   - converted files from other applications?

Have you made proper character set conversions in interfaces to Windows (using ANSI) considering transfers ...

- of file names from applications to the file system?
   - of share data during run-time?
   - of data stored inside NewWave?
   - to / from Windows clipboard?
   - to / from NewWave clipboard?
   - through data communications?
   - Have you avoided using the high-bit in ANSI-byte as a flag or marker?

2. Character handling

- Does your parsing routine support a full ANSI character set ?
   - Have you included the special foreign characters in your character validation routines?

You can skip the next 3 questions if you are using the NewWave international routines provided.

- Have you implemented use of local up- and down-shifting rules?
   - Have you implemented use of local collating sequences?
   - Have you implemented use of local hyphenation rules?
   - Do your spell-checking routines support local languages?

3. User interface

- Have you allowed for 30-40% expansion by translation of strings?
   - Have you avoided using the same string in different messages?
   - Have you avoided composing sentences with fragments stored in different strings?

- Have you avoided idioms in your text?

- Are your icons easy to understand for foreigners also?

- Have you considered the consequences of expanding dialog boxes and menus allowing for expansion by translation?

- Have you avoided hard-coding any messages or strings (double-quotes (") is an illegal character in source code)?

- Have you stored all text in a file separated from the source code?

- Are all messages and strings well documented?

4. Local conventions

Do your routines support all the different time formats considering...

- 12-hour or 24-hour system?

- different separators (:, /, ., -, and space)?

Do your routines support all the different date formats considering...

- sequences (DMY, MDY and YMD)?

- separators (/, -, ., and space)?

Do your routines support all the different currency formats considering...

- symbols ( $, £, Kr, DM, etc.)?

- prefix/suffix symbol location?

- paper-sizes ( A, A4, etc.)?

Do your routines support all the different number formats considering...

- types of thousand separators (1.000, 1,000 or none at all 1 000)?

- types decimal separators (9.50, 9,50, or none at all 9 50)?

- leading zeros or not (0.25 or .25)?

- TAB jump-length conventions?

- Can all the local conventions be configured readily without modifying the defaults (See the ReadIntl routine to determine the different formats)?

Have you avoided hard-coding the following as user responses...

- characters that do not exist on some foreign keyboards (|, }, {, ', and ~)?

- characters that require more than two keys to be pressed on some foreign keyboards (\, [, ], @, #, and ^)?

- Have you avoided hard-coding "YES", "NO", "Y" and "N"?

Country Dependent Information

The following table contains the country dependent information available from Windows. This table has six columns.

The first column is the country name supported by the Windows and HP products.

The second column contains the international telephone country code, which is obtained from the Windows control panel.

The third column contains the local language. The product suffix code (used by HP for product numbers) is in parentheses.

The fourth column contains date formats. These can be *dd/mm/yy, yy/mm/dd, mm/dd/yy, d.m.y, m-d-y, d m y,* or *yy mm dd*.

The fifth column contains the time format (either 12 hour time or 24 hour time).

The sixth column contains the currency symbol and numerical format. It indicates how 1,000.00 (one thousand with no decimal fraction) units of currency would be shown for that country.

Table F-1. Country Dependent Information Table

| Country | Country Code | Language | Date Format | Time Format | Currency |
|---|---|---|---|---|---|
| Arabic | 785 | Arabic (V) | yy/mm/dd | 24:00 | |
| Belgium | 32 | Dutch (W) | d/m/y | 24:00 | 1.000,00F |
| Canada (Eng.) | 1 | English (L) | m-d-y | 12:00a/p | $1,000.00 |
| Canada (Fr.) | 2 | French (C) | dd/mm/yy | 24:00 | 1.000, 00$ |
| Denmark | 45 | Danish (Y) | d/m/y | 24.00 | 1.000,00 KR |
| Finland | 358 | Finnish (X) | d-m-y | 24:00 | 1.000,00 MK |
| France | 33 | French (F) | d/m/y | 24:00 | 1.000,00 F |
| Germany | 49 | German (D) | d.m.y | 24.00 | 1.000,00 DM |
| Hebrew | 972 | Hebrew (T) | d m y | 12:00a/p | $1.000.00 |
| Italy | 39 | Italian (Z) | d/m/y | 24:00 | L. 1.000,00 |
| Latin America | 3 | Spanish (M) | dd/mm/yy | 24:00 | Bs1.000,00 |
| Mexico | 58 | Spanish (M) | dd/mm/yy | 24:00 | P1,000.00 |
| Netherlands | 31 | Dutch (H) | d-m-y | 24:00 | fl 1.000,00 |
| Norway | 47 | Norwegian (N) | d/m/y | 24.00 | KR 1.000,00 |

Table F-1. Country Dependent Information Table

| Country | Country Code | Language | Date Format | Time Format | Currency |
|---|---|---|---|---|---|
| Spain | 34 | Spanish (E) | d/m/y | 24:00 | 1.000,00 Pts |
| Sweden | 46 | Swedish (S) | d-m-y | 24.00 | KR 1.000,00 |
| Switzerland (Fr.) | 41 | French (Q) | d.m.y | 24.00 | FR 1.000,00 |
| Switzerland (Ger.) | 41 | German (P) | | | |
| United Kingdom | 44 | English (U) | d.m.y | 24:00 | £ 1,000.00 |
| United States | 1 | English | m-d-y | 12:00a/p | $1,000.00 |

ANSI Upshift Value Table

The following table lists the upshift values for the local language characters. Basically, there are three rules for upshifting:

1. Canadian-French: All accented characters are upshifted to uppercase accented characters.

2. European French: French accented characters are upshifted to non-accented uppercase characters. All other non French accented characters are upshifted to their coresponding accented uppercase characters. The French accented characters are:

à â ç é ê ë è î ï ô û ù

3. Spanish: Spanish accented vowels are upshifted to non-accented uppercase characters. All other accented characters are upshifted to their coresponding accented uppercase characters. The Spanish accented vowels are:

á é í ó ú

Table F-1. Upshift Values

| Lowercase Character | Canadian French | Uppercase Character European French | Spanish |
|---|---|---|---|
| á a-acute | Á | Á | A |
| à a-grave | À | A | À |
| â a-circumflex | Â | A | Â |
| ä a-umlaut | Ä | Ä | Ä |
| å a-degree | Å | Å | Å |
| æ ae ligature | Æ | Æ | Æ |
| ç c-cedilla | Ç | C | Ç |

Table F-1. Upshift Values (cont.)

| Lowercase Character | | Canadian French | Uppercase Character European French | Spanish |
|---|---|---|---|---|
| d | d-stroke | Đ | Đ | Đ |
| é | e-acute | É | E | E |
| è | e-grave | È | E | È |
| ê | e-circumflex | Ê | E | Ê |
| ë | e-umlaut | Ë | E | Ë |
| í | i-accute | Í | Í | I |
| ì | i-grave | Ì | Ì | Ì |
| î | i-circumflex | Î | I | Î |
| ï | i-umlaut | Ï | I | Ï |
| ñ | n-tilde | Ñ | Ñ | Ñ |
| ó | o-accute | Ó | Ó | O |
| ò | o-grave | Ò | Ò | Ò |
| ô | o-circumflex | Ô | O | Ô |
| ö | o-umlaut | Ö | Ö | Ö |
| õ | o-tilde | Õ | Õ | Õ |
| ø | o-slash | Ø | Ø | Ø |
| ú | u-accute | Ú | Ú | U |
| ù | u-grave | Ù | U | Ù |
| û | u-circumflex | Û | U | Û |
| ü | u-umlaut | Ü | Ü | Ü |
| ý | y-acute | Ý | Ý | Ý |
| þ | p-thorn | Þ | Þ | Þ |
| ÿ | y-umlaut | ÿ | ÿ | ÿ |

Collating Sequences

The following pages contains the collating sequence in the ANSI character set. There are three columns in the collating sequence table. The first one is the graphic presentation of the character. The second column gives the decimal equivalent of the character based on the ANSI character set. The third column describes the character.

The collating sequence is depended on the local language. We have special collating sequence for Spanish, Danish, Norwegian, Swedish and Finnish.

Table F-2. ANSI Character Collating Sequence

| | Dec | Hex | Character |
|---|---|---|---|
| | 32 | 20 | space |
| | 160 | A0 | do not use |
| 0 | 48 | 30 | zero |

Table F-2. ANSI Character Collating Sequence (cont.)

| | Dec | Hex | Character |
|---|---|---|---|
| 1 | 49 | 31 | one |
| 2 | 50 | 32 | two |
| 3 | 51 | 33 | three |
| 4 | 52 | 34 | four |
| 5 | 53 | 35 | five |
| 6 | 54 | 36 | six |
| 7 | 55 | 37 | seven |
| 8 | 56 | 38 | eight |
| 9 | 57 | 39 | nine |
| A | 65 | 41 | uppercase A |
| a | 97 | 61 | lowercase a |
| Á | 193 | C1 | uppercase A acute |
| á | 225 | E1 | lowercase a acute |
| À | 192 | C0 | uppercase A grave |
| à | 224 | E0 | lowercase a grave |
| Â | 194 | C2 | uppercase A circumflex |
| â | 226 | E2 | lowercase a circumflex |
| Ä | 196 | C4 | uppercase A umlaut |
| ä | 228 | E4 | lowercase a umlaut |
| Å | 197 | C5 | uppercase A degree |
| å | 229 | E5 | lowercase a degree |
| Ã | 195 | C3 | uppercase A tilde |
| ã | 227 | E3 | lowercase a tilde |
| Æ | 198 | C6 | uppercase AE ligature |
| æ | 230 | E6 | lowercase ae ligature |

The Æ and æ ligatures are expanded to AE and ae and collate as follows:

ad
AE
Ae
Æ
aE
ae
æ
AF

| | Dec | Hex | Character |
|---|---|---|---|
| B | 66 | 42 | uppercase B |
| b | 98 | 62 | lowercase b |
| C | 67 | 43 | uppercase C |
| c | 99 | 63 | lowercase c |
| Ç | 199 | C7 | uppercase C cedilla |
| ç | 231 | E7 | lowercase c cedilla |
| D | 68 | 44 | uppercase D |
| d | 100 | 64 | lowercase d |
| Ð | 208 | D0 | uppercase D stroke |
| đ | 240 | F0 | lowercase d stroke |
| E | 69 | 45 | uppercase E |
| e | 101 | 65 | lowercase e |

Table F-2. ANSI Character Collating Sequence (cont.)

| Character | Dec | Hex | Character |
|---|---|---|---|
| É | 201 | C9 | uppercase E acute |
| é | 233 | E9 | lowercase e acute |
| È | 200 | C8 | uppercase E grave |
| è | 232 | E8 | lowercase e grave |
| Ê | 202 | CA | uppercase E circumflex |
| ê | 234 | EA | lowercase e circumflex |
| Ë | 203 | CB | uppercase E umlaut |
| ë | 235 | EB | lowercase e umlaut |
| F | 70 | 46 | uppercase F |
| f | 102 | 66 | lowercase f |
| G | 71 | 47 | uppercase G |
| g | 103 | 67 | lowercase g |
| H | 72 | 48 | uppercase H |
| h | 104 | 68 | lowercase h |
| I | 73 | 49 | uppercase I |
| i | 105 | 69 | lowercase i |
| Í | 205 | CD | uppercase I acute |
| í | 237 | ED | lowercase i acute |
| Ì | 204 | CC | uppercase I grave |
| ì | 236 | EC | lowercase i grave |
| Î | 206 | CE | uppercase I circumflex |
| î | 238 | EE | lowercase i circumflex |
| Ï | 207 | CF | uppercase I umlaut |
| ï | 239 | EF | lowercase i umlaut |
| J | 74 | 4A | uppercase J |
| j | 106 | 6A | lowercase j |
| K | 75 | 4B | uppercase K |
| k | 107 | 6B | lowercase k |
| L | 76 | 4C | uppercase L |
| l | 108 | 6C | lowercase l |
| M | 77 | 4D | uppercase M |
| m | 109 | 6D | lowercase m |
| N | 78 | 4E | uppercase N |
| n | 110 | 6E | lowercase n |
| Ñ | 209 | D1 | uppercase N tilde |
| ñ | 241 | F1 | lowercase n tilde |
| O | 79 | 4F | uppercase O |
| o | 111 | 6F | lowercase o |
| Ó | 211 | D3 | uppercase O acute |
| ó | 243 | F3 | lowercase o acute |
| Ò | 210 | D2 | uppercase O grave |

Table F-2. ANSI Character Collating Sequence (cont.)

| | Dec | Hex | Character |
|---|---|---|---|
| ò | 242 | F2 | lowercase o grave |
| Ô | 212 | D4 | uppercase O circumflex |
| ô | 244 | F4 | lowercase o circumflex |
| Ö | 214 | D6 | uppercase O umlaut |
| ö | 246 | F6 | lowercase o umlaut |
| Õ | 213 | D5 | uppercase O tilde |
| õ | 245 | F5 | lowercase o tilde |
| Ø | 216 | D8 | uppercase O crossbar |
| ø | 248 | F8 | lowercase o crossbar |
| P | 80 | 50 | uppercase P |
| p | 112 | 70 | lowercase p |
| Q | 81 | 51 | uppercase Q |
| q | 113 | 71 | lowercase q |
| R | 82 | 52 | uppercase R |
| r | 114 | 72 | lowercase r |
| S | 83 | 53 | uppercase S |
| s | 115 | 73 | lowercase s |
| ß | 223 | DF | sharp s |

The sharp s is expanded to ss according to the German standard and collates as follows:

sr
ß
ss
st

| | Dec | Hex | Character |
|---|---|---|---|
| T | 84 | 54 | uppercase T |
| t | 116 | 74 | lowercase t |
| U | 85 | 55 | uppercase U |
| u | 117 | 75 | lowercase u |
| Ú | 218 | DA | uppercase U acute |
| ú | 250 | FA | lowercase u acute |
| Ù | 217 | D9 | uppercase U grave |
| ù | 249 | F9 | lowercase u grave |
| Û | 219 | DB | uppercase U circumflex |
| û | 251 | FB | lowercase u circumflex |
| Ü | 220 | DC | uppercase U umlaut |
| ü | 252 | FC | lowercase u umlaut |
| V | 86 | 56 | uppercase V |
| v | 118 | 76 | lowercse v |
| W | 87 | 57 | uppercase W |
| w | 119 | 77 | lowercase w |
| X | 88 | 58 | uppercase X |

Table F-2. ANSI Character Collating Sequence (cont.)

| | Dec | Hex | Character |
|---|---|---|---|
| x | 120 | 78 | lowercase x |
| Y | 89 | 59 | uppercase Y |
| y | 121 | 79 | lowercase y |
| Ý | 221 | DD | uppercase Y acute |
| ý | 253 | FD | lowercase y acute |
| ÿ | 255 | FF | lowercase y umlaut |
| Z | 90 | 5A | uppercase Z |
| z | 122 | 7A | lowercase z |
| Þ | 222 | DE | uppercase thorn |
| þ | 254 | FE | lowercase thorn |
| ( | 40 | 28 | left parenthesis |
| ) | 41 | 29 | right parenthesis |
| [ | 91 | 5B | left bracket |
| ] | 93 | 5D | right bracket |
| lb | 123 | 7B | left brace |
| rb | 125 | 7D | right brace |
| « | 171 | AB | left guillemets |
| » | 187 | BB | right guillemets |
| < | 60 | 3C | less than sign |
| > | 62 | 3E | greater than sign |
| = | 61 | 3D | equal sign |
| + | 43 | 2B | plus sign |
| - | 45 | 2D | minus sign |
| ± | 177 | B1 | plus/minus sign |
| ¼ | 188 | BC | one quarter |
| ½ | 189 | BD | one half |
| 3/4 | 190 | BE | three quarters |
| 1 | 185 | B9 | one footnote |
| 2 | 178 | B2 | two footnote |
| 3 | 179 | B3 | three footnote |
| ° | 176 | B0 | degree (ring) |
| % | 37 | 25 | percent |
| * | 42 | 2A | asterick |
| · | 183 | B7 | centered dot |
| . | 46 | 2E | period |
| , | 44 | 2C | comma |
| ; | 59 | 3B | semicolon |
| : | 58 | 3A | colon |
| ¿ | 191 | BF | inverse question mark |
| ? | 63 | 3F | question mark |
| ¡ | 161 | A1 | inverse exclamation point |
| ! | 33 | 21 | exclamation point |
| / | 47 | 2F | forward slant |
| sl | 92 | 5C | reverse slant |
| \| | 124 | 7C | vertical bar |
| \| | 166 | A6 | vertical bar |
| @ | 64 | 40 | at sign |

Table F-2. ANSI Character Collating Sequence (cont.)

| | Dec | Hex | Character |
|---|---|---|---|
| & | 38 | 26 | ampersand |
| # | 35 | 23 | number sign |
| § | 167 | A7 | section |
| $ | 36 | 24 | U.S. dollar sign |
| ¢ | 162 | A2 | U.S. cent sign |
| £ | 163 | A3 | British Pound sign |
| ¥ | 165 | A5 | Japenese Yen sign |
| ¤ | 164 | A4 | general currency sign |
| µ | 181 | B5 | mu character |
| ¶ | 182 | B6 | paragraph symbol |
| © | 169 | A9 | copyright symbol |
| ® | 174 | AE | trademark symbol |
| " | 34 | 22 | double quote |
| ' | 96 | 60 | opening single quote |
| ' | 39 | 27 | closing single quote |
| ^ | 94 | 5E | caret |
| ~ | 126 | 8E | tilde |
| ´ | 180 | B4 | acute accent |
| ¨ | 168 | A8 | umlaut accent |
| ¸ | 184 | B8 | cedilla accent |
| _ | 95 | 5F | underscore |
| ‾ | 175 | AF | overline |
| ª | 170 | AA | feminine ordinal indicator |
| º | 186 | BA | masculine ordinal indicator |
| ¬ | 172 | AC | line drawing character |
| - | 173 | AD | short dash |
| ■ | 215 | D7 | solid or undefined |
| ≈ | 247 | F7 | double wave |

Table F-3. Character Code Usage

| Code | Description |
|---|---|
| 0-32 (0-20 Hex) | Control codes |
| 33-126 | lower range ASCII characters |
| 127 (7F Hex) | do not use |
| 128-157 (80-9F Hex) | currently undefined control codes |

Language Dependent Deviations

SPANISH    SPANISH considers "CH" to be a separate character, which collates between "C" and "D". The same applies to "LL", which collates after "L" and before "M". The Spanish table therefore has these sequences:

c@
CH
Ch cH
ch
D?

l*
LL
Ll
lL
ll
M?

Where:

? means anything
@ means anything except h
* means anything except l

Thus, CH comes after c followed by anything, and before D followed by anything.

Also, in Spanish the N and Ñ are not to be considered the same in collating (this also applies to n and ñ). They are really different characters, following one another in the collating sequence. Consequently, the Spanish sequence shows:

| | | |
|---|---|---|
| N | 78 | uppercase N |
| n | 110 | lowercase n |
| Ñ | 209 | uppercase N-tilde |
| ñ | 241 | lowercase n-tilde |

DANISH and NORWEGIAN DANISH and NORWEGIAN collate the #, # and # at the end of the alphabet. So the Danish and Norwegian collating sequences show:

| | | |
|---|---|---|
| Z | 90 | uppercase Z |
| z | 122 | lowercase z |
| Æ | 198 | uppercase Æ |
| æ | 230 | lowercase æ |
| Ø | 216 | uppercase Ø |
| ø | 248 | lowercase ø |
| Å | 197 | uppercase Å |
| å | 229 | lowercase å |
| Þ | 222 | uppercase Þ |
| þ | 254 | lowercase þ |

SWEDISH SWEDISH collates the Å, Ä, and Ö at the end of the alphabet. So the Swedish collating sequence shows:

| | | |
|---|---|---|
| Z | 90 | uppercase Z |
| z | 122 | lowercase z |

|   |     |              |
|---|-----|--------------|
| Å | 197 | uppercase Å  |
| å | 229 | lowercase å  |
| Ä | 196 | uppercase Ä  |
| ä | 228 | lowercase ä  |
| Ö | 214 | uppercase Ö  |
| ö | 246 | lowercase ö  |
| Þ | 222 | uppercase Þ  |
| þ | 254 | lowercase þ  |

FINNISH FINNISH treats the Å, # and Ö the same as Swedish, and considers Ø to be the same character as Ö. Apart from that, V and W are regarded as the same character, and so are Y and Ÿ. The Finish collating sequence therefore looks like:

|   |     |              |
|---|-----|--------------|
| U | 85  | uppercase U  |
| u | 117 | lowercase u  |
| Ú | 218 | uppercase Ú  |
| ú | 250 | lowercase ú  |
| Ù | 217 | uppercase Ù  |
| ù | 249 | lowercase ù  |
| Û | 219 | uppercase Û  |
| û | 251 | lowercase û  |
| V | 86  | uppercase V  |
| v | 118 | lowercase v  |
| W | 87  | uppercase W  |
| w | 119 | lowercase w  |
| X | 88  | uppercase X  |
| x | 120 | lowercase x  |
| Y | 89  | uppercase Y  |
| y | 121 | lowercase y  |
| ÿ | 255 | lowercase ÿ  |
| Ü | 220 | uppercase Ü  |
| ü | 252 | lowercase ü  |
| Z | 90  | uppercase Z  |
| z | 122 | lowercase z  |
| Å | 197 | uppercase Å  |
| å | 229 | lowercase å  |
| Ä | 196 | uppercase Ä  |
| ä | 228 | lowercase ä  |
| Ö | 214 | uppercase Ö  |
| ö | 246 | lowercase ö  |
| Ø | 216 | uppercase Ø  |
| ø | 248 | lowercase ø  |
| Þ | 222 | uppercase Þ  |
| þ | 254 | lowercase þ  |

G  Serial File Format

Serial File Format  This appendix outlines the file format for files produced by the OMF Serialize function.

Note  Normally, applications do not provide a serialize or deserialize function. When they do provide the functions, the OMF uses the format described herein to serialize and deserialize an object. The format is described for those who wish to write a serial file browser or are simply curious about the layout of the serialized object file.

A serialized data file consists of a file header and serialized objects. The file structure is:

```
FileHeader
Object #1
    :
Object #n
<EOF>
```

The file header contains:

1. a count of the number of objects that are serialized in this file,
2. the time of creation,
3. the type of system that created the file, and
4. other data that allows a serialized file to span more than one physical disk volume.

If an object is split across volumes, there will be a file header at the front of each volume. It is possible for certain files, for example, data files, to be split across volumes. The details of how such files are split and how this affects the contents of the data file headers is not discussed here.

The File Header  The file header structure is as follows:

```
typedef struct SF_FileHeader {
    unsigned long   MagicNumber;
    unsigned int    Version;
    unsigned int    SystemID;
    unsigned int    ObjectCount;
    unsigned int    VolumeNo;
    BOOL            More;
    unsigned int    Year;
    BYTE            Month;
    BYTE            Day;
    BYTE            Hour;
    BYTE            Minute;
} SFFILEHEADER;
``` where the parameters are:

*MagicNumber* - If the OMF finds this number as the first thing in the file, it is likely to be a serialized object file.

*Version* - the OMF version number that produced this file.

*SystemID* - a value of 1 indicates 8086 architecture.

*ObjectCount* - the total number of objects that are serialized in this file.

*VolumeNo* - the current volume number. (It might take more than one volume to serialize a particular object entirely). VolumeNo is in ASCII and begins with 1.

*More* - a value of TRUE if the object continues on another volume.

*Year, Month, Day, Hour, Minute* - when the file was created.

Serialized Data Object A serialized data object is composed of an ObjectHeader and other data items as enumerated in the list below. An explanation of each item follows this list.

```
Object Structure is :
    ObjectHeader
    ClassName (no null terminator)
    ChildRef #1
        :
    ChildRef #n
    PropertyDirectory/Name Pool
    PropertyValue #1
        :
    PropertyValue #n (n = Object_Header.nProps)
    DataFileHeader #1
    FileData
        :
    DataFileHeader #n
    FileData
    <EOF>
```

ObjectHeader

The object header describes various properties of an object, such as:

- How many children this object has.

- How much space is used in this file for property lists of the objects that are serialized here

- How many object properties are stored in the property list.

- The length of the object's class name.

- A flag that specifies whether the object serialized itself

- How many file are serialized here (total, all objects).

- What is the length of all serialized files (total).

- At what offset from the beginning of the file does the first data file begin.

The actual data structure that makes up an object header follows. Note that there is one object header for each object.

```
typedef struct SF_ObjectHeader {
    RECPTR          First_DataFileOffset;
    unsigned long   AllFilesLength;
    unsigned int    ChildCount;
    unsigned int    nProps;
    unsigned int    Prop_Poolsize;
    unsigned int    FileCount;
    unsigned int    ClassNameSize;
    BOOL            Flags;
} SFOBJHEADER;

typedef SFOBJHEADER *PSFOBJHEADER;
#define SF_MAGIC_NUMBER   0xaffable
#define INTEL_8086        1

/* Flags in the object header */
#define SF_SELFSERIALISE  1
#define SPLIT_VOLUME      2
``` where the parameters are as follows:

*AllFilesLength* - the length of all files that make up this object, not counting the file headers. Valid only if the Flags parameter does not indicate SPLIT_VOLUME (that is, if binary bit 2 of Flags is not a 1).

*ChildCount* - number of child objects owned by this object.

*nProps* - number of properties possessed by this object.

*Prop_Poolsize* - the total length of the property pool, including terminating nulls on the property values.

*FileCount* - number of data files (with headers) contained on this volume for this object.

*Flags* - this parameter currently defines two flags:

SELF_SERIALIZE (binary bit position 0)

SPLIT_VOLUME (binary bit position 1).

If SELF_SERIALIZE is a 1, the object serialized itself. If SPLIT_VOLUME is a 1, the object needed more than one disk volume to hold all of its data files.

*ClassName* - an ASCII string whose length is specified in the header. It is the name of this class of object. As noted in the data structure description, the ClassName is stored WITHOUT a trailing NULL (0) character.

Child References

If an object has children, it has assigned names of those children to specific unique PERSISTENT variables using the OMF_Assign function. The set of Child References is simply that list of names and identifiers that indicate the sequence in which the objects have been serialized. Passing the identifiers also allows the Deserialize function to rebuild the object with all of its interrelationships intact where the data is received.

The data structure that defines a child reference looks like this (one for each parent-child relationship):

```
typedef struct SF_ChildRef {
    SF_OBJECT_ID  ChildID;  /* childs
position in */
                            /* serial file (1-n) */
    OBJECTNAME    ReferenceName;
                            /* Parents name for the child */
} SFCHILDREF;
```

Property Name Pool

The property name pool contains a directory of properties and a list of properties for the object. This is represented by the subset of the serialized object structure above:

```
Property Directory
Property Value #1
..
Property Value #N
```

The Property Directory specifies the length of the items in the property value array as well as the name by which that property is called. For example, there might be a property list such as:

| Property Name    | Property Value |
|------------------|----------------|
| "Graphic Object" | "Yes"          |
| "Department"     | 100            |

The PropEntry data structure appears as follows:

```
typedef struct PropEntry {
    unsigned ValueLen;
    LONG     ValueDiskLoc;
    int      CacheOffset;
} PROPENTRY;
``` where the parameters are as follows:

*ValueLen* - the length of the property value data.
*ValueDiskLoc* - no meaning in current release.
*CacheOffset* - no meaning in current release.

For the sample property list, the length of the property "Graphic Object" is 3, i.e. the length of the ASCII string "Yes". The length of the property "Department" could be either 1 or 2, depending on how the system treats integer values as properties (however many bytes it takes to represent that item).

Thus, the complete property list for the example would look like:

```
PropEntry #1:   3
        (LONG data)     ;no meaning in current release
        (int data)      ;no meaning in current release
PropEntry #2:   2       ;lets call it an integer
        (LONG data)
        (int data)
        Graphic Object\0    ;null terminated string
        Department\0        ;null terminated string
PropValue #1    Yes\0       ;takes 3 bytes to store
        100         ;integer, takes 2 bytes in file.
```

In summary, here is the appearance of the property list structure of the data object:

```
Property Directory Structure & Name Pool is :
    PropEntry #1
        :
    PropEntry #n        (n = Object_Header.nProps)
    PropNameString #1   ( NULL terminated string)
        :
    PropNameString #n   (n = Object_Header.nProps)
```

Data Files

Following the property lists are the data files for the object. When an object performs an OMF_Initialize, it receives, in return, a pathname that serves as the permanent name for all data files associated with that object. The object uses as many extensions (such as ".dta" for data files or ".inx" for index files) as the application requires. If they are not self-serialized, all of the objects data files are simply copied, each with a header file containing information primarily from DOS, indicating the size of the file, its extension name, creation time and file attributes.

The following is a definition of the file header (one required for each data file of the object):

```
typedef struct SF_DataFileHeader {
    long        Length;
    char        Extension [ 5 ];
    BYTE        Attribute;
    unsigned    Timestamp;
    unsigned    Datestamp;
}SFDATAFILEHEADER;
``` where the parameters are as follows:

*Length* - the length of the file in bytes.
*Extension* - the file extension, up to 3 characters, such as "dta", with a leading period and a trailing zero (i.e., a null terminated string).
*Attribute* - the file attribute information.
*Timestamp* - the file time of creation (from DOS).
*Datestamp* - the file date of creation (from DOS).

Miscellaneous Definitions

The following defines and typedefs are also used in the description of the serial file format:

```
typedef unsigned int    SF_OBJECT_ID;
typedef unsigned long   RECPTR
#define OBJECTNAME DWORD
```

Objects and Serialization

The file format described above is fully utilized when an object provides no method for responding to a request to SERIALIZE or DESERIALIZE itself. In the installation file, if these keywords are omitted from the HAS_METHOD section, the OMF will use this format to automatically handle all serialize or deserialize operations.

If an object should, for some reason, decide that it absolutely NEEDS to do its own serialize or deserialize (perhaps because some form of file conversion or state saving has to be done before it can be serialized, possibly due to file security) then the application must provide BOTH methods, i.e. both serialize and deserialize. The format for the data for the object itself, then, will be application specific, with the header for the file provided by the system, and the data for child objects either formatted or not, depending on the methods that the child objects may have provided.

The application, when asked to SERIALIZE itself, will simply format its data as it sees fit, then call OMF_PutSerialData to cause the OMF to append its data to the file. (Buffering of the output data can be done any way appropriate for the application.) The function OMF_PutSerialData is simply used as the vehicle to output the data to the file.) Conversely, when asked to DESERIALIZE itself, it will use the function OMF_GetSerialData, then decompose that data itself into its composite files.

This still allows a consistency, of sorts, for the resultant file. However, each object must provide either no method, or both methods (serialize and deserialize), or else the data file will be not be available to the object at the receiving end of a serial transmission.

H  Data Interchange Standards

When a source object is connected to a destination object by a datalink, the information from the source can be displayed or printed directly on the CRT or printer on behalf of the destination, or it can be transferred to the destination for further processing. The former is a *visual* datalink protocol; the latter is a *data passing* protocol.

There are three OMF messages involved in the visual datalink protocol:

1. GET_SIZE, used by a destination object to determine the size of the source object to be included;

2. DISPLAY_VIEW, used to display the included object on a CRT screen; and

3. PRINT_SLAVE, which is used to print out the included object when making a hard copy.

The definitions of these messages in Chapter 6 - "OMF Messages" describe the protocol required. Any object that supports these methods can be included as a child of a parent by using this visual protocol. The Layout sample application demonstrates these relationships.

A set of data passing protocols is also required to specify data interchange where the data is to be processed by the destination object rather than being displayed unchanged. Protocols for interchanging tabular and textual data will be specified; the planned tabular methods include both binary and ASCII forms. Each protocol will consist of a set of standard messages/methods for negotiating and then executing the transfer. These protocols are currently under development and will be distributed as Technical Notes when they are finalized.

Future releases of the New Wave architecture will also provide implementations of standard snapshots suitable for supporting these protocols (as well as the visual protocols).

Encapsulation: Integrating Existing Applications

Overview

Existing MS-DOS and Windows applications can be integrated into the NewWave environment via encapsulation. Both standard non-Windows applications and Windows applications can be encapsulated into the NewWave environment so they display many NewWave features. For example, when encapsulated, an application's objects can hold data and new objects can be created through the "Create a New..." menu function. The user can also make use of the "mark:", "cut", "copy", and "paste" clipboard commands. Plus, new menus and menu commands can be implemented as needed.

To encapsulate existing applications, you must perform the following actions:

- Create an icon to represent the application by using the Windows program ICONEDIT (.ICO file);
- Define the command line options or keystroke macro required to load a data file on startup;
- Set up empty template data files for the application masters contained in the Creator object;
- Build a menu definition file (.MNU) that includes macros for pop-up menus and their associated keystroke macros;
- Create a special installation file (.IN$) that installs the application to the Desktop and defines the necessary components required class properties;
- Set up a Program Information File (.PIF) as required by Windows.

Encapsulating oldaps and winaps

An existing MS-DOS, non-Windows application (a "standard" application) is called an *oldap* in this appendix. An existing Windows applications is referred to as a *winap*.

To encapsulate oldaps, five different files must be created:

- NewWave object installation (.IN$) file;
- object icon (.ICO) file;
- empty template data file(s);
- Program Information File (.PIF) normally required by Windows;
- menu/macro definition (.MNU) file.

Winaps are not managed by WINOLDAP (the Windows utility for invoking non-Windows applications) and therefore do not require .PIF files. Furthermore, because the menus of winaps cannot be altered by encapsulation, winaps do not require .MNU files.

To ensure that encapsulation is as efficient as possible (both in memory and speed), it includes a parser to process the configuration information. As a result, the syntax of the .IN$ and .MNU files is complex, and must be specified carefully to ensure correct operation.

Creating the .IN$ File

The .IN$ file installs the application in the OMF. It specifies the information required by the OMF to invoke the application, including files to be installed, executable filename, object icon and the methods that the object class supports. It also specifies the class properties and the object properties for the master installed in the Creator object or as a global object. Refer to Chapter 8, "Installing NewWave Objects", for complete details on the NewWave installation file format. The following entries are required for encapsulation. (Note that your own particular names are to be inserted within the angle brackets (< >).)

```
EXECUTABLE_FILE HPENCAPS.EXE
```

HPENCAPS.EXE is always specified as the executable file for encapsulated applications. The initial installation of the NewWave environment includes in the HPNWPROG subdirectory the files HPENCAPS.EXE (the NewWave application that controls the running of an encapsulated application), along with HPENCAPT.EXE (the winap message trap library) and HPENCAPD.EXE (the special MS-DOS file management library).

```
MODULE_FILENAMES
    \<path> \<application>.MNU
    \<path> \<application>.PIF
END_NAMES
```

For oldaps, the menu definition file (.MNU) and program information file (.PIF) should be copied to the default HPNWPROG subdirectory as part of the installation process. Note that these are the only application files specified at installation. As described earlier, the executables HPENCAPS.EXE, HPENCAPT.EXE, and HPENCAPD.EXE, are part of the architecture, and do not need to be installed by the individual encapsulated applications.

The application is typically installed in a subdirectory of its own if it can also be called from outside of the NewWave environment. If that is not the case, it should be stored in the HPNWPROG subdirectory.

```
OBJECT_FILENAMES
    \tplpath\tplfiles
END_NAMES
```

As with OMF objects, these files represent a new, empty dataset for the application. When a new instance is created using the "Create a New..." command, the master file is copied as a new, empty data file. All files that match the specified path and root filename will be copied as part of the template fileset, regardless of extension.

```
HAVE_METHODS
    OPEN TERMINATE      DIE_PLEASE          WARM_START
    COPY_EXTERNAL       DESTROY_EXTERNAL
    SERIALIZE           DESERIALIZE         0x0D
    OMF_INSERT          CONTAINMENT_STATUS
END_METHODS
```

The OPEN, TERMINATE, DIE_PLEASE, WARM'pass {ul }'START, COPY_EXTERNAL, DESTROY_EXTERNAL, SERIALIZE, DESERIALIZE, and 0x0D methods must be specified for all encapsulated applications. The 0x0D method is not currently recognized by the installation parser, and so must be specified as a number. The OMF INSERT and CONTAINMENT_STATUS methods are only required for encapsulated applications that support containment.

```
OTHER_CLASS_PROPERTIES
    <propertyname>      <propertyvalue>
END_PROPERTIES
```

A number of class properties must be defined for encapsulated applications. These special properties are described in the following section.

Special Encapsulation Properties

The following class properties are used by encapsulated applications. Those properties which have string names are enclosed in quotes.

"AppToRun" — A text string containing the drive, path, filename and extension of the file to be executed to invoke this application. This is typically an .EXE file for winaps and a .PIF file for oldaps. If AppToRun is entered as a null string, it is assumed that the file identification information will be provided in some combination of the properties AppFile, NWAppDir, and AppDir.

"AppFile" — A text string containing the file name and extension of the .EXE file (for winaps) or .PIF file (for oldaps) that is executed to invoke this application. If the AppToRun property has been specified, AppFile must be entered as a null string.

"NWAppDir" — A text string specifying the subdirectory under the HPNWPROG directory for the location of the AppFile file to be executed to invoke this application. If either the AppToRun or AppDir property is specified, NWAppDir must be entered as a null string.

"AppDir" — A text string containing the path to the location of the AppFile file used to invoke the application. If either the AppToRun or NWAppDir property is specified, AppDir must be entered as a null string.

"NWDataDir" — A text string specifying the subdirectory under the HPNWDOS directory to be used (and created) as the default data directory for the application. If the DataDir property is specified, NWDataDir should be defined as a null string.

"DataDir" — A text string specifying the path to be used (and created) as the default data directory for the application. If NWDataDir is specified, the DataDir property should be defined as a null string.

"CmdLine" — This property is only used when it is desirable to invoke the application with an argument(s). CmdLine is a text string containing the command line to be appended to the application filename when the application is invoked. This command line can contain variables which will be filled in when the application is run. The syntax of the command line is described below in the "Keystroke Macro Language" section.

"MenuFile" — A text string specifying the filename of the menu definition file (.MNU). The filename should not include any path specification since it is placed in the HPNWPROG directory during installation.

"AppWinClass" — A text string specifying the Windows class name for the Windows application. This property is only required for winaps.

"AppTitle" — A text string specifying the title to appear in the caption bar of the application's main window. This property is only required for winaps.

"KeyExt" — A text string specifying the file extension (1-3 characters) for the keyfile (the term for the data file in each instance of this object.) The presence of an existing keyfile is checked whenever there is a new instance of the application.

"Container" — This property is a text string specifying the class name of an object that can accept insertion by this class of data object.

PROP_ENCAPFLAGS This application defined property's name is not recognized by the installation
(0xffff0801) parser, so it must be specified as 0xffff0801. This property is a byte containing binary flags related to the nature of the application. The settings are shown in the table on the next page.

Table I-1. Binary Flag Values for PROP_ENCAPFLAGS

| Bitmask | Value | Description |
|---|---|---|
| 0x01 | 0 | Index-type encapsulation. This is the normal form of encapsulation. |
|  | 1 | OMF-type encapsulation. This mode is a special form of encapsulation that overrides all other encapsulation specifications. It causes data for the application to be maintained in the OMF subdirectories and is primarily useful for certain global object applications. |
| 0x02 | 0 | Oldap. This is a non-Windows application, requiring a .PIF file. |
|  | 1 | Winap. This is a Windows application. |
| 0x04 | 0 | Reserved. This bit must be set to 0. |
| 0x08 | 0 | No Containment. Containment of other objects is not supported by this object. |
|  | 1 | Containment. This object supports copy-mode containment using the Ctrl-Drag feature. That is, when a valid object is passed via this feature, a copy of the original is moved to the container object (including the necessary filename parameters) and the original is left intact in its original position. |
| 0x10 | 0 | Reserved. This bit must be set to 0. |
| 0x20 | 0 | Reserved. This bit must be set to 0. |
| 0x40 | 0 | Filename Title. The root portion (1-8 character base name, without path or extension) of the referenced data filename is displayed as the object title. |
|  | 1 | Object Title. The original object property title is maintained as the displayed title, and can be edited like other object titles. This is useful for encapsulated global objects. |
| 0x80 | 0 | Reserved. This bit must be set to 0. |

Setting up the Object Properties Paragraph

The Object Properties paragraph of the .IN$ file sets specific properties associated with the master object stored in the Creator object (the Create a New... dialog process) or for a global object. The paragraph has the following form:

```
OBJECT_PROPERTIES
    PROP_TITLE "title string"
    PROP_SYSTEM
    BEGIN_VALUES pp qq END_VALUES
    PROP_DESKTOPFLAGS
    BEGIN_VALUES nn END_VALUES
END_PROPERTIES
```

The required properties and their arguments are defined as follows:

PROP_TITLE
"title string"
This property is not required for the initial installation of persistent data objects. If there are additional installations of persistent data objects, this title is required for the master object.

For global objects, this is the default object title as it appears on the Desktop, and in the Attributes... and Manage Masters... dialogs.

PROP_SYSTEM
pp qq
For initial installations of persistent data objects, this property should be specified with both pp and qq equal to 0. This property should be omitted completely to install subsequent instances.

For global objects, both the pp and qq values must be specified as described below. No other values should be used.

pp=0 specifies that the object is never to be displayed on the Desktop. This should only be used under special circumstances when the global object can only be accessed via an OMF'pass {ul }'INSERT message sent by a cooperating application.

pp=1 specifies that the object is not initially displayed on the Desktop.

pp=2 specifies that the object is initially displayed on the Desktop.

qq=0 specifies that the user is allowed to edit the title. This is the default and is recommended for all global objects.

qq=1 specifies that the user is not allowed to edit the title. This should only be used if there are strong reasons to ensure that the title of the global object is never changed.

PROP_DESKTOPFLAGS
nn
nn = 8 specifies an encapsulated persistent data object.

nn = 9 specifies an encapsulated global object.

No other values should be used for this property.

Notes on the Installation File
Encapsulated applications use the information in the AppToRun, NWAppDir, AppDir and AppFile properties to determine the exact location of the file required to invoke the application. If the AppToRun property is present and not null, it is used as the application's file name. Otherwise, if the NWAppDir property is present and not null, the AppToRun property is created by concatenating the APPLICSDIR specification from the HPOMF.INI file (typically \HPNWPROG), the NWAppDir property and the AppFile property. Otherwise, if the AppDir property is present and not null, the AppToRun property is created by concatenating the AppDir property and the AppFile property.

For encapsulated winaps that can be accessed from outside the NewWave environment as well, the appropriate AppDir and AppFile properties should be provided, and the AppToRun and NWAppDir properties should be specified as null strings. The AppToRun property is created and used internally to access the application.

For encapsulated oldaps that can be accessed from outside the NewWave environment as well, a .PIF file should be installed in the \HPNWPROG directory. The .PIF file should specify the the filename and path required to access the application. The .PIF file should be specified in the AppFile property and the AppToRun, NWAppDir and AppDir properties should be specified as null strings. The AppToRun property is created and used internally to access the application.

For encapsulated applications that can only be run in their encapsulated form, it may be desirable to have the entire application installed in a subdirectory within the \HPNWPROG directory at installation time. The appropriate NWAppDir and AppFile properties should be provided, and the AppToRun and AppDir properties should be specified as null strings. The AppToRun property is created and used internally to access the application.

Encapsulated applications use either the DataDir or NWDataDir property to determine the default subdirectory for storing and retrieving their data files. If the DataDir property is present and not null, it is used as the data file path. Otherwise, if the NWDataDir property is present and not null, the DataDir property is created by concatenating the DOSAPPSDIR specification from the HPOMF.INI file (typically \HPNWDOS) and the NWDataDir property.

In most cases, the NWDataDir property should be provided, and DataDir should be specified as null. The DataDir property is created and used internally. The DataDir property can then be specified in the command line specification or oldap keystroke macros to access the application's data files. In rare situations where the default data directory should not be within the \HPNWDOS directory, the installation file can specify DataDir directly.

The Menu File (.MNU)

This file defines the pull-down menus and their associated keystroke macros for oldaps. This feature is based on the extensions provided in the Windows 2.0 WINOLDAP utility, and is not available for encapsulated Windows applications. The .MNU file is stored in the HPNWPROG directory and referenced using the MenuFile class property contained in the .IN$ file described above.

All menu and macro definitions are stored in a memory data structure that must be resident while the oldap is running. The absolute maximum size for this buffer is 64K. However, depending on the memory requirements of the application being run, the actual limit might be less. It is recommended that every effort be made to keep the macro definitions as concise as possible.

The format of the macro file is designed to minimize the code, thus improving execution performance of the macros. Specifically, it uses a convention that requires two fixed fields for proper parsing.

Each record in the file consists of fields separated by colons (:). The syntax is:

```
lnum:cmd:argument [:argument]
```

All lines must be 80 characters or less and cannot contain any tabs or other special formatting characters.

The meaning of the fields is as follows:

*lnum* is the line number of the record. These numbers are used as references in the arguments of certain commands. The line number MUST be placed in the first two columns of the record starting in column 1, and must be followed by a colon in the third column. If a line does not contain a colon in the third column, it is interpreted as a continuation of the previous line, and it is parsed beginning in column 9. Continuation lines do not have line numbers.

*cmd* is a one- or two-letter command from the set described below.

The *argument* field is made up of one or two arguments for the command. The exact syntax depends on the specific command.

The valid cmd values and their associated arguments values are in the table that follows.

Table I-2. Macro Commands

| Command Value / Name | Syntax | Description |
|---|---|---|
| P<br>Popup Menu | P <nn>:<name> | Defines a new popup menu on the menu bar. It must be followed by E, GE, L, LE or S commands.<br><br>*nn* is the line number of another macro or 0 if not used.<br><br>*name* is the string that will appear in the menu bar associated with this pulldown menu. |
| (G)E<br>(Grayed) Menu Item | (G)E <menu>:<name> | Defines an active menu item. When selected, the referenced macro is executed. If preceded by a G, the menu item is initially grayed. If this command follows a P command, it will appear as part of that pulldown menu. Otherwise, this will be an active command on the menu bar.<br><br>*menu* is the line number of the menu (M) command to be executed when this command is selected.<br><br>*name* is the string that will appear in the menu. |
| (G)L<br>(Grayed) Last Menu Item | (G)L <menu>:<name> | Defines the last command in a pulldown menu. When selected, the referenced macro is executed. If preceded by a G, the menu item is initially grayed. Every P command must be followed by an L or GL command.<br><br>*menu* is the line number of the menu (M) command to be executed when this command is selected.<br><br>*name* is the string that will appear in the menu. |

Table I-2. Macro Commands (cont.)

| S<br>Separator | S <nn>: | Defines a separator line in a pulldown menu. This command can only appear between a P command and a GL or L command.<br><br>*nn* is the line number of another macro or 0 if not used. |
|---|---|---|
| M<br>Macro | M <macro string> | Defines a keystroke macro. There can be as many macro commands in a file as required, up to the buffer limit. The macro syntax allows a macro to be chained or nested, or have its commands to be redefined dynamically.<br><br>*macrostring* contains the macro definition, in the syntax described below. The macro definition can extend across multiple lines using the continuation line syntax described above. When creating multi-line records, it is important that no extraneous blank spaces be placed at the ends of lines, as these will not be trimmed. Also, information on continuation lines must begin in column 9, with no colon in column 3. |
| A<br>Autostart Macro | A <macro string> | Defines the macro to be automatically executed when the application is first executed.<br><br>*macrostring* contains the macro definition, in the syntax described later in this document. The macro definition can extend across multiple lines using the continuation line syntax described above. When creating multi-line records, it is important that no extraneous blank spaces be placed at the end of lines, as these will not be trimmed. Also, information on continuation lines must begin in column 9, with no colon in column 3. |

Table I-2. Macro Commands (cont.)

| O<br>Switch-out Macro | O <macro string> | Defines the macro to be executed just before the focus is taken away from the application via a context switch.<br><br>*macrostring* contains the macro definition, in the syntax described later in this document. The macro definition can extend across multiple lines using the continuation line syntax described above. When creating multi-line records, it is important that no extraneous blank spaces be placed at the end of lines, as these will not be trimmed. Also, information on continuation lines must begin in column 9, with no colon in column 3. |
|---|---|---|
| X<br>Exit Macro | X <macro string> | Defines the macro to be executed after the application terminates. This is only useful for capturing the final screen image to the clipboard.<br><br>*macrostring* contains the macro definition, in the syntax described later in this document. The macro definition can extend across multiple lines using the continuation line syntax described above. When creating multi-line records, it is important that no extraneous blank spaces be placed at the end of lines, as these will not be trimmed. Also, information on continuation lines must begin in column 9, with no colon in column 3. |
| Z<br>End of File | Z | This command is required as the last line in the menu file. |

The .PIF File

There is nothing special about the .PIF file required for encapsulation. It is created (using the PIFEDIT utility provided as part of Windows) exactly the same as when running the oldap under Windows. It must *not* specify that the application directly modifies the keyboard or directly modifies memory. Either of these settings prevents concurrent operation with Windows, and, therefore, with the NewWave environment. The .PIF file can either be stored in the HPNWPROG directory and specify the default application directory, or it can be stored in the same directory with the application, in which case the default directory field can be left blank. The command line field is not required, as this field is superceded by the value specified in the CmdLine property. A .PIF file is not used for encapsulated Windows applications, winaps.

Keystroke Macro Language

Encapsulation uses a keystroke macro syntax similar to that defined by Microsoft for use with DDE, with extensions to support the necessary added functionality. The full definition of the syntax is shown in the table on the next page.

Table I-3. Macro Language Syntax

| | | |
|---|---|---|
| <macro string> | := | [<token>] <macro string> |
| <token> | := | <keystroke> \| <app code> |
| <keystroke> | := | [<modifier>] <character> \| [<modifier>] <key equivalent> |
| <modifer> | := | [<shift>] [<control>] [<alt>] |
| <shift> | := | + |
| <control> | := | ^ |
| <alt> | := | ~ |
| <character> | := | <letter> \| <digit> \| <symbol> \| <quoted character> |
| <letter> | := | a \| A \| ... \| z \| Z |
| <digit> | := | 0 \| 1 \| 2 \| 3 \| 4 \| 5 \| 6 \| 7 \| 8 \| 9 |
| <symbol> | := | \| \| ! \| @ \| # \| $ \| % \| & \| * \| ? \| ( \| ) \| - \| _ \| = \| ' \| ; \| : \| ' \| " \| , \| < \| . \| > \| / \| \ |
| <quoted character> | := | <escape character1> <escape character1> |
| <escape character> | := | [ \| { \| ] \| } \| + \| ~ \| ^ |
| <key equivalent> | := | { <keyword> } |
| <keyword> | := | TAB \| ESC \| ENTER \| HOME \| END \| LEFT \| RIGHT \| UP \| DOWN \| PGUP \| PGDN \| NUM \| SCROLL \| SYS \| PRTSC \| BREAK \| <function key> \| NULL |
| <function key> | := | F1 \| F2 \| F3 \| F4 \| F5 \| F6 \| F7 \| F8 \| F9 \| F10 \| F11 \| F12 |
| <number> | := | <digit> [<number>] |
| <appcode> | := | [<oldap opcode>] \| [<Encap opcode>] |
| <oldap opcode> | := | ABORT <abort switch> \| COPY \| MACRO <macro id> \| MARK [<mark param>] \| MENU <menu id>,<menu style>,<macro id> \| PASTE \| SCANCODE <keycode> \| SCROLL \| SWITCH |
| <abort switch> | := | ON \| OFF |
| <macro id> | := | <number> |
| <mark param> | := | SCREEN\| <number>, <number>, <number>, <number> |
| <menu id> | := | <number> |
| <menu style> | := | <menu flag> ["\|"<menu style>] |
| <menu flag> | := | MF_GRAYED \| MF_ENABLED \| MF_DISABLED \| MF_CHECKED \| MF_UNCHECKED |
| <keycode> | := | <hexdigit> <hexdigit> <hexdigit> <hexdigit> |
| <hexdigit> | := | <digit> \| A \| B \| C \| D \| E \| F |
| <Encap opcode> | := | FILENAME \| FILEDIR \| PROP [<class>] <property> \| SYSDIR \| APPLICSDIR \| DOSAPPSDIR |
| <class> | := | <name> |
| <property> | := | <name> |
| <name> | := | <namechar> [<name>] |
| <namechar> | := | <letter> \| <digit> \| - \| _ |

| | |
|---|---|
| Keyword Definitions | Encapsulation recognizes the <Encap opcode> values specified in the above macro language syntax and performs the following string substitutions before the macros are made available to the application. ALL KEYWORDS ARE CASE-SENSITIVE. |
| [FILENAME] | Specifies the 1-8 character root filename of the MS-DOS file referenced by this instance of the application. In the case of an application that allows containment accepting an insert message, it is the root filename of the MS-DOS file referenced by the encapsulated object being inserted. |
| [FILEDIR] | Specifies the drive designation and path associated with the referenced MS-DOS file. THE REFERENCE INCLUDES A TRAILING BACKSLASH (\) CHARACTER. |
| [SYSDIR] | Specifies the drive designation and path of the configured OMF data directory as specified in the HPOMF.INI file, typically the HPNWDATA subdirectory. THE REFERENCE INCLUDES A TRAILING BACKSLASH CHARACTER. |
| [APPLICSDIR] | Specifies the drive designation and path of the configured OMF program directory as specified in the HPOMF.INI file, typically the HPNWPROG subdirectory. THE REFERENCE INCLUDES A TRAILING BACKSLASH CHARACTER. |
| [DOSAPPSDIR] | Specifies the drive designation and path to the data file as specified in the HPOMF.INI file, typically the HPNWDOS subdirectory. THE REFERENCE INCLUDES A TRAILING BACKSLASH CHARACTER. |
| [PROP propname] | Specifies the value of any of the class properties for this object, typically defined at installation time (via the .IN$ file). Only text properties should be specified; binary or existence properties will be ignored. This allows variables to be defined within the installation file without making any changes to the .MNU file. |
| [PROP class propname] | Specifies the value of a class property. Specify text properties only; binary or existence properties will be ignored. This is typically used to create macros that reference arbitrary class properties of any application class, including other encapsulated applications. |

Index

A

ADD_CHILD 6-6
ADDED_PARENT 6-7
API_INTERROGATE_MSG 5-2
API_PLAYBACK_MSG 5-6
API_SET_MODE_FLAGS_MSG 5-7
APIChangeCaption 2-5
APICommandInterface 2-6
APIDlgCommandInterface 2-7
APIDlgHelpInterface 2-8
APIDlgInit 2-9
APIDlgTerm 2-10
APIDlgUserActionInterface 2-11
APIEnableMenuItem 2-12
APIError 2-13
APIErrorInterface 2-14
APIErrorOn 2-15
APIGetAPIVersion 2-16
APIHaveButton 2-17
APIHaveCommand 2-18
APIHaveDialogCommand 2-19
APIHaveMenu 2-20
APIHaveMessage 2-21
APIInit 2-22
APIInitMenu 2-23
APIInterceptOn 2-24
APILoadAccelerators 2-25
APIMessageBox 2-26
APIModelessDlgInit 2-29
APIModelessDlgTerm 2-30
APIMonitorOn 2-31
APINotReady 2-32
APINoWindowOn 2-33
APIPlaybackMsg 2-34
APIPlaybackOn 2-35
APIReady 2-36
APIRecordInterface 2-37
APIRecordOn 2-38
APIReturnInterface 2-39
APITerm 2-40
APIUserActionInterface 2-41

C

CLASS_CHANGE 6-8
CLASS_NAME 8-4
CONFIG_CHANGE 6-9
CONTAINMENT_STATUS 6-10
CONVERT 6-11
COPY_EXTERNAL 6-13
COPY_SELF 6-14
CREATE_OMF 6-16

D

DATA_CHANGE 6-18
DATA_CHANGE_END 6-19
DATAID_CHANGE 6-20
Deinstallation 8-2
DESERIALIZE 6-21
DESTROY_EXTERNAL 6-22
DESTROY_MODELESS 6-23
DIE_PLEASE 6-24
DISCARD_ICONS 6-25
DISPLAY_VIEW 6-26

E

ENUM_OBJECT 6-28
EXECUTABLE_FILE 8-5

G

GET_SIZE 6-30
GLOBAL_REF_NAME 8-10

H

HAS_METHOD 6-32
HAVE_METHODS 8-9

I

ICON_FILE 8-8
ICON_NAME 8-4
INIT_VIEW 6-33
Installation Command Files 8-1
Installation Directories 8-1
Installation Error Codes 8-17

L

LIB_COPY_SELF 6-35
LIB_OBJ_INIT 6-36
LIB_OBJ_TERMINATE 6-37
LIB_USER_INIT 6-38
LIB_USER_TERMINATE 6-39
LOSE_CHILD 6-40
LOSE_DATAID 6-41
LOST_PARENT 6-42
LPCAST 3-5
lstrcat 3-6
lstrcmp 3-7
lstrcpy 3-8
lstrdelete 3-9
lstrfill 3-10
lstrinsert 3-11
lstrlen 3-12
lstrmove 3-13

M

MODULE_FILENAMES 8-5
MULTI_INSERT 6-43

N

NEXT_OBJECT_CLASS 8-10
NO_OBJECT 8-11
NW_AnsiToName 3-14
NW_CreateWindow 3-16
NW_ExecModule 3-18
NW_FormatFill 3-19
NW_GetCurrentTime 3-20
NW_GetExecEnv 3-21
NW_GetNWLIBVersion 3-22
NW_InsertMsgNumber 3-23
NW_InsertMsgString 3-24
NW_Maximize 3-25
NW_MessageFilter 3-26
NW_Minimize 3-27
NW_NameToAnsi 3-28
NW_ReadIni 3-29
NW_Restore 3-30
NW_TelescopeEffect 3-31
NW_TimeToAnsi 3-32
NW_TimeToStruct 3-33

O

OBJECT_CLOSING 6-44
OBJECT_FILENAMES 8-8
OBJECT_OPENING 6-45
OBJECT_PROPERTIES 8-13
OMF_AddChildTo 4-6
OMF_AnnounceNewData 4-8
OMF_Assign 4-9
OMF_ClearNewData 4-10
OMF_Closing 4-11
OMF_ConfigChange 4-12
OMF_Copy 4-13
OMF_CopyViewSpec 4-15
OMF_DeSerialize 4-16
OMF_EmptyOMFClipboard 4-17
OMF_EnumChildren 4-18
OMF_EnumChildrenOf 4-19
OMF_EnumGlobalObjects 4-20
OMF_EnumObjects 4-21
OMF_EnumParents 4-22
OMF_EnumParentsOf 4-23
OMF_Export 4-24
OMF_FreeDALObject 4-25
OMF_FreeOMFObject 4-26
OMF_FreeProperties 4-27
OMF_FreeView 4-28
OMF_GetChildCountOf 4-29
OMF_GetDALObject 4-30
OMF_GetDataIdText 4-31
OMF_GetDataIdUsage 4-32
OMF_GetDiskSize 4-33
OMF_GetIcon 4-34
OMF_GetMethod 4-35
OMF_GetMethodList 4-36
OMF_GetObjectState 4-37
OMF_GetOMFDirectory 4-38
OMF_GetOMFError 4-39
OMF_GetOMFObject 4-40
OMF_GetOMFVersion 4-41
OMF_GetParentCountOf 4-42
OMF_GetProperties 4-43
OMF_GetSerialData 4-44
OMF_GetSerialDataHandle 4-45
OMF_GetSnapshot 4-46
OMF_GetType 4-47
OMF_GetView 4-48
OMF_GetViewMethod 4-49
OMF_GetViewMethodList 4-50
OMF_ImportObject 4-51
OMF_Init 4-52
OMF_InitViewSpec 4-54
OMF_INSERT 6-46
OMF_IsDescendant 4-56
OMF_MakeObjParam 4-57
OMF_NEW_OBJECT 6-48
OMF_ObjectFlag 4-58
OMF_Opening 4-60
OMF_PassWindowHandle 4-61
OMF_PutOnOMFClipboard 4-62
OMF_PutSerialData 4-63
OMF_PutViewOnOMFClipboard 4-64
OMF_ReadProperty 4-65
OMF_ReadPropertyHandle 4-67
OMF_RemoveChildFrom 4-68
OMF_RemoveFromOMFClipboard 4-69
OMF_Send 4-70
OMF_SendDALMsg 4-71
OMF_SendViewMsg 4-72
OMF_Serialize 4-73
OMF_SetDataIdText 4-74
OMF_SetModified 4-75
OMF_SetNewData 4-76
OMF_SetSnapshotState 4-77
OMF_Shutdown 4-78
OMF_Term 4-79
OMF_TestNewData 4-80
OMF_WriteProperty 4-81
OPEN 6-49
OTHER_CLASS_PROPERTIES 8-12
OVERWRITE_OLD_OBJECT 8-12

P

PARENT_IS 8-11
PERSISTENT_REF_NAME 8-10
PREPARE_PRINT 6-50
PRINT_ADD_TO_QUEUE 6-51
PRINT_MASTER 6-53
PRINT_SLAVE 6-55
PROP_ADDCHILD 7-3
PROP_CHANGE 6-57
PROP_CLASSNAME 7-3
PROP_COMMENTS 7-3
PROP_CREATED 7-3
PROP_CREATOR 7-4
PROP_DALNAME 7-4
PROP_DESKTOPFLAGS 7-5
PROP_EVENTTRIGGERS 7-5
PROP_EXTRADISK 7-5
PROP_FASTPROPS 7-6
PROP_FORMATTEDFOR 7-7
PROP_ICONNAME 7-7
PROP_ISANNOTATION 7-7
PROP_LASTWRITER 7-8
PROP_METHODS 7-8
PROP_MODIFIED 7-8
PROP_OLDAPPINFO 7-9
PROP_PUBLIC 7-9
PROP_RECEIVED 7-9
PROP_SENDER 7-9
PROP_SYSTEM 7-10
PROP_TEXTID 7-10
PROP_TIMEZONE 7-11
PROP_TITLE 7-11
PROP_USERSIZE 7-11
PROP_USERUNITS 7-12
PROP_VIEWMETHODS 7-12

Q

QUERY_SHUTDOWN 6-58

S

SCOPEOF 3-34
SERIALIZE 6-59
SIZEOF_CB_OBJECT_STRUCT 3-35

T

TERMINATE 6-60
TEXT_ID 8-4

U

UPDATE_SNAPSHOT 6-61

V

VOLUME 8-14
VOLUME_LABEL 8-14

W

WARM_START 6-62
WINDOW_TO_TOP 6-63

HP NewWave Environment:
Program Design Examples

HEWLETT
PACKARD

Notice

The information contained in this document is subject to change without notice.

Hewlett-Packard makes no warranty of any kind with regard to this material, including, but not limited to, the implied warranties of merchantability and fitness for a particular purpose. Hewlett-Packard shall not be liable for errors contained herein or for incidental or consequential damages in connection with the furnishing, performance, or use of this material.

Hewlett-Packard assumes no responsibility for the use or reliability of its software on equipment that is not furnished by Hewlett-Packard.

This document contains proprietary information which is protected by copyright. All rights are reserved. No part of this document may be photocopied, reproduced, or translated to another program language without the prior written consent of Hewlett-Packard Company.

Microsoft® and Microsoft® Windows, and MS-DOS® are registered trademarks of Microsoft Corporation.

©1988 by Hewlett-Packard Co.

Personal Software Division
3410 Central Expressway
Santa Clara, CA 95051, U.S.A.

Printing History

First Edition - March, 1988          Printed in U.S.A.

Table of Contents

Chapter 1: Introduction to Program Design Examples

HP NewWave Environment: Program
        Design Examples . . . . . . . . . . . . . 1-1

Organization . . . . . . . . . . . . . . . . 1-1

Chapter 2: Object Properties

Overview of Object Properties . . . . . . . . . . 2-1

Chapter Organization . . . . . . . . . . . . 2-2

Defining Properties in the Installation
        File . . . . . . . . . . . . . . . . . . . . 2-3

Reading and Writing Properties . . . . . . . . 2-4

Private Properties . . . . . . . . . . . . . . 2-6

Reading PROP_FASTPROPS . . . . . . . . . 2-9

Defining Properties That Are Not Copied
        with the Object . . . . . . . . . . . . . . 2-11

Chapter 3: Inserting Child Objects

Chapter 4: Destination Object View Processing

Overview of Destination Object View
        Processing . . . . . . . . . . . . . . . . 4-1

Chapter Organization . . . . . . . . . . . . 4-2

Methods to Support . . . . . . . . . . . . . 4-3

Creating A View . . . . . . . . . . . . . . . 4-4

Processing the OMF_INSERT Message . . . 4-4

Processing the OMF_NEW_OBJECT
            Message . . . . . . . . . . . . . . . . 4-7

Checking View Methods . . . . . . . . . . 4-9

Sending the INIT_VIEW message . . . . . . 4-10

Getting a View . . . . . . . . . . . . . . . . 4-12

Getting the Size of a Visual View . . . . . . . 4-13

Displaying a Visual View . . . . . . . . . . . 4-16

Updating a View . . . . . . . . . . . . . . 4-18

Freeing a View . . . . . . . . . . . . . . . 4-19

Chapter 5: Source Object View Processing

Overview of Source Object View Processing . . . 5-1

Chapter Organization . . . . . . . . . . . . 5-2

Methods to Support . . . . . . . . . . . . . 5-2

Creating a View . . . . . . . . . . . . . . . 5-3

Processing the Share Command . . . . . . . 5-3

Processing an INIT_VIEW Message . . . . . . 5-5

Managing the Source Specification . . . . . . . 5-7

Creating and Storing a Data Id . . . . . . . 5-7

Deleting Data IDs . . . . . . . . . . . . . 5-9

Validating Data Ids . . . . . . . . . . . . 5-10

Changing the Size of Viewed Data . . . . . . 5-10

Displaying Views . . . . . . . . . . . . . . 5-12

Informing Destination Objects of New Data . . . . . . . . . . . . . . . . . . . 5-14

Copying an Active Source Object . . . . . . . 5-16

Chapter 6: Snapshot View Processing

Overview of Snapshot View Processing . . . . 6-1

Chapter Organization . . . . . . . . . . . . 6-2

Supporting a Snapshot from a Source Object . . . 6-3

Global Declarations in the Source Object . . . 6-3

Creating a Snapshot from the Source Object . . . . . . . . . . . . . . . . . . 6-4

Immediate Snapshot Updating from the Source Object . . . . . . . . . . . . 6-6

Deferred Snapshot Updating from the Source Object . . . . . . . . . . . . 6-9

Internal Code of a Snapshot DAL . . . . . . . 6-12

Methods to Support . . . . . . . . . . . . 6-12

Global Declarations in the DAL . . . . . . . 6-13

Setting up the DAL Message Processing Procedure . . . . . . . . . . . . . . . . 6-14

Processing the LIB_OBJ_INIT Message . . . 6-16

Processing the LIB_USER_INIT Message . . 6-18

Processing the LIB_USER_TERMINATE Message . . . . . . . . . . . . . . . . . 6-19

Processing the LIB_OBJ_TERMINATE Message . . . . . . . . . . . . . . . . . 6-20

Processing the LIB_COPY_SELF message . . 6-22

Processing an "Update File" message . . . . . 6-23

Processing the DISPLAY_VIEW Message . . 6-25

Chapter 7: Using the Clipboard

Overview of Clipboard Usage . . . . . . . . . 7-1

The Windows Clipboard . . . . . . . . . . 7-1

The NewWave Enhancements . . . . . . . 7-1

Chapter Organization . . . . . . . . . . . 7-2

Windows Clipboard Background . . . . . . . 7-3

OMF Clipboard Support . . . . . . . . . . . . . 7-5
    Clipboard Data in Temporary Files . . . . . . 7-5
    Objects on the Clipboard . . . . . . . . . . . 7-6
    Compound Data on the Clipboard . . . . . . . 7-9
Putting Objects and Views on the Clipboard . . . 7-11
    Putting Objects on the Clipboard
    - Examples . . . . . . . . . . . . . . . . 7-11
    Processing the Cut, Copy, and Share
    Commands . . . . . . . . . . . . . . . . 7-12
    Putting a View on the Clipboard - Example . . 7-15
Retrieving an Object or View from the
Clipboard . . . . . . . . . . . . . . . . . . 7-17
    Retrieving an Object from the Clipboard
    - Example . . . . . . . . . . . . . . . . 7-17
    Retrieving a View from the Clipboard
    - Example . . . . . . . . . . . . . . . . 7-22

Chapter 8: Printing in the NewWave Environment

Overview of the Print Process . . . . . . . . . . 8-1
    Chapter Organization . . . . . . . . . . . . 8-1
Printing from an Object Window - PrintIt
Procedure . . . . . . . . . . . . . . . . . . 8-2
Printing an Object - PrintMaster Procedure . . . 8-5
Printing a View - PrintSlave Procedure . . . . . 8-11

Chapter 9: Providing HELP

Chapter 10: API Techniques

Table of Examples

Chapter 2: Object Properties

2-1. Setting Additional Class Properties in the .IN$ File - demonstrates how to set class properties in an application's installation file . . . . . . . . . . . . . . . . 2-3

2-2. Setting Master Object Properties in the .IN$ File - demonstrates how to set properties of an application's master object . . . . . . . . . . . . . . . . . 2-3

2-3. Reading Property with Pre-defined Numeric Name - demonstrates how an object reads properties with pre-defined numeric names . . . . . . . . . . . . . . . . 2-4

2-4. Writing Property with Pre-defined Numeric Name - demonstrates how an object writes properties with pre-defined numeric names . . . . . . . . . . . . . . . . 2-5

2-5. Reading Property with String Name - demonstrates how an object may read properties with string names . . . . . . 2-5

2-6. Writing Property with String Name - demonstrates how an object may write properties with string names . . . . . 2-5

2-7. Defining and Using Private Properties - demonstrates how to declare and make use of private properties in the application and installation files . . . . . . 2-6

2-8. Accessing PROP_FASTPROPS - demonstrates how an object uses the PROP_FASTPROPS data structure to retrieve a property . . . . . . . . . . . 2-10

2-9. Defining Properties not to be Copied - demonstrates how to define properties whose values are not copied with the object . . . . . . . . . . . . . . . . . . . . 2-11

Chapter 4: Destination Object View Processing

4-1. InsertObject - demonstrates how a destination object processes the OMF_INSERT message to create a view when a source object is dropped onto its open window . . . . . . . . . . . . . 4-5

4-2. NewObject - demonstrates how a destination object processes the OMF_NEW_OBJECT message to create a view when the "Create a New" command is selected . . . . . 4-8

4-3. CheckMethods - demonstrates how a destination object verifies that a view can support the view methods the destination requires . . . . . . . . . . . 4-9

4-4. CreateView - demonstrates how
the destination object sends an INIT_VIEW
message to a source object to carry
out the initialization of a view . . . . . . . . . 4-10

4-5. Calling OMF_GetView - demonstrates
how a destination object calls the OMF_GetView
function to activate an already existing
view . . . . . . . . . . . . . . . . . . . 4-12

4-6. GetViewSize - demonstrates how
a destination object sends the GET_SIZE
message to determine the preferred
size of a visual view . . . . . . . . . . . . . 4-14

4-7. PaintChild - demonstrates how a
destination object sets up a display
context and sends a DISPLAY_VIEW
message to a visual view to tell the view
to display itself within the destination
object . . . . . . . . . . . . . . . . . . . 4-17

4-8. Processing DATA_CHANGE Message -
demonstrates how a destination object
processes a DATA_CHANGE message
to display changed data in a view . . . . . . 4-18

4-9. Calling OMF_FreeView - demonstrates
how a destination object can call the
OMF_FreeView function to deactivate
a view . . . . . . . . . . . . . . . . . . . 4-19

Chapter 5: Source Object View Processing

5-1. ProcessShareCmd - demonstrates
how a source object creates a view if
the Share command is selected within
the source object window . . . . . . . . . . 5-4

5-2. ProcessInitView - demonstrates
how a source object processes an INIT_VIEW
message to create a view when the view
creation process is initiated outside
the source object window . . . . . . . . . . 5-6

5-3. CreateDataId - demonstrates one
way for a source object to assign a data
ID to a range of viewed data and store
this record in a source specification
table . . . . . . . . . . . . . . . . . . . . 5-8

5-4. DeleteDataId - demonstrates how
a source object deletes a data ID and
a data range from its source specification
table when it finds out that data ID
is no longer in use . . . . . . . . . . . . . 5-9

5-5. ValidateDataId - demonstrates how
a source object, on being activated,
determines if the ranges of viewed data
that are listed in its specification table
have been freed . . . . . . . . . . . . . . . 5-10

5-6. ModifySharedRange - demonstrates
how a source object modifies a range
of viewed data for a given view and
assigns a new data ID if the original
range is used by other views . . . . . . . . . 5-11

5-7. DisplayView - demonstrates how
a source object may process a DISPLAY_VIEW
message to display a view in a destination
object . . . . . . . . . . . . . . . . . . . . 5-13

5-8. AnnounceNewData - demonstrates
how a source object informs destination
objects of changes in viewed data . . . . . . . 5-15

5-9. CopySelf - demonstrates how a source
object may process a COPY_SELF
message to make a copy of itself even
if it is active when the copy is requested . . . 5-17

Chapter 6: Snapshot View Processing 6-1. Source Object Global Declarations -
demonstrates global declarations to
make in a source object supporting
snapshots . . . . . . . . . . . . . . . . . . 6-3

6-2. CreateSnapShot - demonstrates
how a source object processes an INIT_VIEW
message to create a snapshot . . . . . . . . . 6-5

6-3. UpdateNow - demonstrates how
a source object with changed viewed
data may update a snapshot before
informing the OMF to set the "new
data marked" flag in the associated
view specification . . . . . . . . . . . . . . 6-6

6-4. UpdateDAL - demonstrates how
a source object actually carries out
the update of a snapshot . . . . . . . . . . . 6-8

6-5. UpdateLater - demonstrates how
a source object with a changed view
may defer updating its snapshot, but
set the "snapshot out-of-date" and "new
data announced" flags in the associated
view specification . . . . . . . . . . . . . . 6-10

6-6. UpdateSnapshot - demonstrates
how a source object may process the
UPDATE_SNAPSHOT message to
carry out deferred snapshot updating . . . . . 6-11

6-7. DAL Global Declarations - demonstrates
global declarations made in a snapshot
DAL . . . . . . . . . . . . . . . . . . . . 6-13

6-8. DAL MessageProc - demonstrates
how a snapshot DAL handles incoming
messages . . . . . . . . . . . . . . . . . . 6-15

6-9. LibObjInit - demonstrates how a
snapshot DAL processes the LIB_OBJ_INIT
message to start up a snapshot . . . . . . . . 6-17

6-10. LibUserInit - demonstrates how
a snapshot DAL initiates a new USER
for a given snapshot . . . . . . . . . . . . . 6-18

6-11. LibUserTerminate - demonstrates
how a snapshot DAL may terminate
a USER for a given snapshot . . . . . . . . . 6-19

6-12. LibObjTerminate - demonstrates
how a snapshot terminates itself . . . . . . . . 6-21

6-13. CopySelf - demonstrates how a
snapshot DAL can make a copy of a
snapshot even if that snapshot is active
at the time the copy is requested . . . . . . 6-22

6-14. LibUpdateFile - demonstrates how
a snapshot may update its contents
when given new data by the source
object . . . . . . . . . . . . . . . . . . . . 6-24

6-15. DisplayView - demonstrates how
a snapshot displays its data within a
destination object . . . . . . . . . . . . . . 6-26

Chapter 7: Using the Clipboard

7-1. AddToClipboard (for Objects) -
demonstrates how a container object
processes the API "Cut," "Copy," and
"Share" commands to place objects
on the Clipboard . . . . . . . . . . . . . . 7-13

7-2. AddToClipboard (for Views) - demonstrates
how a data object puts a view on the
Clipboard . . . . . . . . . . . . . . . . . 7-16

7-3. GetObjFromClipboard (for Objects) -
demonstrates how a container object
Pastes an object from the Clipboard . . . . . 7-19

7-4. GetObjFromClipboard (for Views) -
demonstrates how a compound object
Pastes a view from the Clipboard . . . . . . 7-23

Chapter 8: Printing in the NewWave Environment

8-1. PrintIt - demonstrates how an object
starts the print process when the
Print command is selected within that
object's open window . . . . . . . . . . . 8-3

8-2. PrintMaster - demonstrates how
an object processes the PRINT_MASTER
message to carry out the printing task . . . . 8-7

8-3. PrintSlave - demonstrates how a
source object or snapshot processes
the PRINT_SLAVE message to send
viewed data to the printer when requested
by the destination object . . . . . . . . . . 8-12

1 Introduction to Program Design Examples

HP NewWave Environment: Program Design Examples

This manual, "The HP NewWave Environment: Program Design Examples," is intended to supplement "The HP NewWave Environment: Programmer Guide." It provides examples of code to implement the concepts described in that document.

The reader of this manual is assumed to have a solid grounding in MS-DOS, Microsoft Windows, and the C language. The reader is also assumed to have read the "Programmer Guide" and perhaps familiarized him or herself with the source code for the sample HPSHAPE, HPTEXT, and HPLAYOUT applications provided on diskette with the HP NewWave Developer Kit.

The reader is advised to consult the "HP NewWave Environment: Programmer Reference Manual" and the glossary to the "Programmer Guide" for the meaning of unfamiliar terms.

Note 

In this manual the terms "NewWave Office" and "Desktop" are used interchangeably. In all cases, they are synonomous.

Organization

This manual consists of the following chapters.

Chapter 1 - Introduction to Program Design Examples

Chapter 1 describes the contents of "The HP NewWave Environment: Program Design Examples" document.

Chapter 2 - Object Properties

Chapter 2 provides examples of code declaring object properties.

Chapter 3 - Inserting Child Objects

Chapter 3 provides examples of code to support a container object, such as a folder, to include a child object.

Chapter 4 - Destination Object View Processing

Chapter 4 provides examples of code in a destination application that enables that application to support views.

Chapter 5 - Source Object View Processing

Chapter 5 provides examples of code in a source application that enables that application to support views.

Chapter 6 - Snapshot View Processing

Chapter 6 provides examples of code in a source application and a snapshot DAL that enables those entities to create and support snapshots.

Chapter 7 - Using the Clipboard

Chapter 7 explains the use of the Windows Clipboard, describes NewWave enhancements to the Clipboard, and provides examples of code to enable objects to access the Clipboard.

Chapter 8 - Printing in the NewWave Environment

Chapter 8 provides examples of code in an application that enable its objects to be printed.

Chapter 9 - Providing HELP

Chapter 9 provides examples of code to enable an object to provide online help to its end users.

Chapter 10 - API Techniques

Chapter 10 provides examples of code to enable applications to implement API features.

2 Object Properties

Overview of Object Properties

This chapter details the functions of object properties and gives example code for declaring and modifying them.

As described in Chapter 2 of the "HP NewWave Environment: Programmer Guide," properties are characteristics used to describe an object. Each object has properties associated with it, containing information on the object title, the application class name, the name of the object's creator, the icon name, and other characteristics. NewWave supplies a number of *pre-defined properties* that can be used by all objects. Objects can create additional properties as needed. Refer to the "Programmer Guide" for a more detailed definition of properties. Also, refer to the "HP NewWave Environment: Programmer Reference Manual" for a listing of NewWave pre-defined properties.

All objects on the NewWave system can access information about all other objects. Objects can read and write their own properties as well as any other object's properties, as long as they have a valid OMF reference name for the other object.

As a result of this capability, objects can change the property values of other objects, including parent and child objects. For example, the NewWave Office object allows users to change other object titles. The NewWave Office simply writes the new title to the selected object's PROP_TITLE property. When opened, the selected object must read its current PROP_TITLE property before using its title.

Objects may access other object properties to determine how they can work together. For example, suppose the user has opened an HPLAYOUT object. HPLAYOUT can display views of other objects within its window. Now suppose the user drops an HPSHAPE object onto an HPLAYOUT object's window. HPLAYOUT then checks HPSHAPE's PROP_VIEWMETHODS (by calling the OMF_GetViewMethod function) to determine if HPSHAPE can display a view of itself within HPLAYOUT.

Objects can create their own properties to store changing information about themselves. These self-defined properties are called *private properties*. Other objects cannot read private properties because they do not know their names or formats. One example of a private property could be the sample POSITION_PROP property used to store an object's window position, as described later in this chapter.

*PROP_FASTPROPS* is a NewWave supplied data structure of commonly used properties. An application that needs several of these property values can reduce read time by getting the PROP_FASTPROPS structure rather than reading each individual property.

By default, object property values are copied when an object is copied. However, a property can be named to prevent the copying of its value when the object is copied.

The OMF stores all object properties for a NewWave system in its disk-based data structures. Property values are cached, but every property write is posted to the disk before OMF_WriteProperty returns. This posting makes properties more reliable, but also means that properties should not be used to store frequently changing data.

Objects can change most property values at any time; however, objects cannot change NewWave defined read-only properties such as class name. These read-only properties are noted in the "Programmer Reference Manual."

Chapter Organization This chapter includes the following sections:

Defining Property Values in the Installation File - shows how to set property values in an application's .IN$ file.

Reading and Writing Properties - provides code samples which allow objects to read and write properties at any point their application code.

Private Properties - demonstrates code that declares and makes use of private properties.

Reading PROP_FASTPROPS - demonstrates the use of PROP_FASTPROPS to get an object's title.

Defining Properties that are not Copied with the Object - demonstrates how to prevent a property from being copied along with its object.

Defining Properties in the Installation File

This section shows how to set property values in an application's installation (.IN$) file.

If property values are not set in the .IN$ file, they must be written before they are read within the application. An object can write over the properties set in the .IN$ file (except for those noted as read-only) at any time.

The OMF automatically initializes some class property values when it reads an application's .IN$ file. These include the PROP_CLASSNAME, PROP_TEXTID, and PROP_ICONNAME properties, which are set by the installation file commands CLASS_NAME, TEXT_ID, and ICON_NAME, respectively.

Code Example 2-1: Setting Additional Class Properties in the .IN$ File

The developer can set additional class properties in the .IN$ file using the "OTHER_CLASS_PROPERTIES" command, as shown below:

```
OTHER_CLASS_PROPERTIES
    PROP_VIEWMETHODS              ; This is an array of methods
                                  ; supported by the object's view
        BEGIN_VALUES
            0x26 0x00             ; DISPLAY_VIEW
            0x31 0x00             ; PRINT_SLAVE
        END_VALUES
END PROPERTIES
```

Code Example 2-2: Setting Master Object Properties in the .IN$ File

Finally, the developer can set object properties of the master object in the .IN$ file using the "OBJECT_PROPERTIES" command, as follows:

```
OBJECT_PROPERTIES
    PROP_SYSTEM
        BEGIN_VALUES              ; Defines PROP_SYSTEM as 0 length,
        END_VALUES                ; meaning a blank master object
    PROP_TITLE    "HP Shape"      ; Defines PROP_TITLE as "HP Shape"
END_PROPERTIES
```

Refer to the "Programmer Reference Manual," Installation section, for more on the command syntax within the .IN$ file.

Note  *Master objects* are template objects that are copied to create new objects when the "Create a New" command is selected.

Reading and Writing Properties

Applications can read and write properties at any point within their code. These properties can have either pre-defined numeric names, such as PROP_TITLE, or string names, such as "MYTITLE". The following code provides an example of reading and writing properties with pre-defined numeric and string names. At some point in the code, the application must:

1. Get the object or class properties handle from the OMF. This can be the handle for the object's own properties or for another object's properties.

2. Read or write the property from the list of properties kept by the OMF.

3. Free the properties handle.

Code Example 2-3: Reading Property with Pre-defined Numeric Name

```
HPROPERTIES hProps;
char    Caption[MAXTITLE+1];   /* MAXTITLE is defined in NWOMF.H */
.
.
.

/* SELF is the name of this object, FALSE indicates Object props,
** TRUE indicates Class props. To get another object's property
** handle, use a valid OMF reference name for that object.
*/ hProps = OMF_GetProperties( hOMF, SELF, FALSE );
if (hProps == NULL) {
   /* Error handling */
}

/* The last parameter specifies how many bytes we want the OMF
** to return. By specifying a negative number, we are telling the
** OMF to append a null on the end. Specifying -(MAXTITLE+1) will
** get us MAXTITLE characters plus one null terminator.
*/ if ( OMF_ReadProperty(  hOMF,
                        hProps,
                        PROP_TITLE,
                        (LPSTR)Caption,
                        -(MAXTITLE+1) ) == -1 ) {
   /* Error */
   Caption[0] = '\0';
}

/* Free the properties handle.
*/

OMF_FreeProperties( hOMF, hProps );
```

Code Example 2-4: Writing Property with Pre-defined Numeric Name

```
/* Get property handle from OMF */
hProps = OMF_GetProperties( hOMF, SELF, FALSE );

/* Write property value to the property list. The last parameter */
/* is the length of the value to write. By specifying -1, we tell */
/* the OMF to assume the value is a null-terminated string.       */
OMF_WriteProperty(  hOMF,
                    hProps,
                    PROP_TITLE,
                    (LPSTR)Caption,
                    -1 );

/* Free property handle */
OMF_FreeProperties( hOMF, hProps );
```

Code Example 2-5: Reading Property with String Name

```
hProps = OMF_GetProperties( hOMF, SELF, FALSE );
if (hProps == NULL) {
   /* Error handling */
}

OMF_ReadProperty( hOMF,
                  hProps,
                  (LPSTR)"MYTITLE",
                  (LPSTR)Caption,
                  -(MAXTITLE+1) );

OMF_FreeProperties( hOMF, hProps );
```

Code Example 2-6: Writing Property with String Name

```
hProps = OMF_GetProperties( hOMF, SELF, FALSE );
if (hProps == NULL) {
   /* Error handling */
}

OMF_WriteProperty( hOMF,
                   hProps,
                   (LPSTR)"MYTITLE",
                   (LPSTR)Caption,
                   strlen(Caption) );

OMF_FreeProperties( hOMF, hProps );
```

Private Properties

This section demonstrates code that declares and makes use of private properties. In this case, a private property called POSITION_PROP is defined and used to store the position of a window on the screen.

PROP_USERDEFINED and PROP_MAXUSERDEFINED are the minimum and maximum values of private property names that can be defined by the application developer. They are defined in the NWOMF.H file. Objects can define their own properties by specifying values within this range. They can also define their own properties using a character string as the property name.

Code Example 2-7: Defining and Using Private Properties

1. First, the developer defines the property in the application code.

```
   #define POSITION_PROP   (PROP_USERDEFINED + 1)
   ```

When using a string for the property name, the developer skips this step.

2. Second, the developer declares a global of type RECT.

```
   RECT   gRect;
   ```

3. Next, the developer adds the following code to the application's processing of the OPEN message:

```
   case OPEN:

/* FALSE as last param indicates object properties, TRUE
      ** indicates class properties.
      */
      hProps = OMF_GetProperties( hOMF, SELF, FALSE );
      if (hProps == NULL) {
         /* Error handling. */
      }

/* For a string property name, such as "Position", replace
      ** POSITION_PROP with "Position".
      */
      if ( OMF_ReadProperty( hOMF,
                             hProps,
                             (LPSTR)POSITION_PROP,
                             (LPSTR)&gRect,
                             sizeof(RECT) ) == -1 ) {
   ```

```
/* Can't find property. Set size to a nice default. */
GetDefaultRect (&gRect);
}

OMF_FreeProperties( hOMF, hProps );

MoveWindow( hWnd,
            gRect.left,
            gRect.top,
            gRect.right - gRect.left,
            gRect.bottom - gRect.top,
            FALSE );
OMF_Opening( hOMF, (LPRECT)&gRect );
ShowWindow( hWnd, SW_SHOWNORMAL );
UpdateWindow( hWnd );
APIReady( hAPI, API_NO_MODE );
return(0L);
```

4. Next, the developer adds the following code to the command processor to handle the API_CLOSE_WINDOW_CDCMD command:

```
case API_CLOSE_WINDOW_CDCMD:

GetWindowRect( hWnd, (LPRECT)&gRect );
   hProps = OMF_GetProperties( hOMF, SELF, FALSE );

/* For a string property name, such as "Position", replace
   ** POSITION_PROP with "Position".
   */
   if (hProps != NULL) {
      OMF_WriteProperty( hOMF,
                         hProps,
                         POSITION_PROP,
                         (LPSTR)&gRect,
                         sizeof(RECT) );
      OMF_FreeProperties( hOMF, hProps );
   }

ShowWindow( hWnd, SW_HIDE );
   OMF_Closing( hOMF, (LPRECT)&gRect );
   APINotReady( hAPI, API_NO_MODE);
   break;
```

5. Finally, the developer adds the following code to the .IN$ file :

```
OBJECT_PROPERTIES
     0xFFFF0801 BEGIN_VALUES
              0x14 0x00 0x20 0x00 0x15E 0x113
              END_VALUES
     .... plus other properties ....
END_PROPERTIES
```

The above property is (PROP_USERDEFINED + 1). The property name must be entered as a hexadecimal value (0xFFFF0801) because the installation file does not allow the use of preprocessor constants (#define's).

The above property values represent the initial values for a window position. In this case: 0x14 0x00 maps to Rect.left; 0x20 0x00 maps to Rect.top; 0x15E maps to Rect.right; and 0x113 maps to Rect.bottom.

Because the first two values are less than 0xFF they require leading zeroes to be mentioned explicitly in low byte, high byte order.

Additional Comments to the Last Example

The following additional comments apply to defining and using private properties and Code Example 2-7.

- The developer probably won't want to "hard code" an initial window position in the .IN$ file as these values are monitor dependent. It is better to compute an initial position based on screen metrics or some other known, or discoverable, metrics, or use the default position and size function of NW_CreateWindow.

- Using a property is not the only way to store window size. If the developer has a data file in which he or she stores other information, it is probably more efficient to store the window size in that file.

- For a string property name, such as "Position", the developer replaces the numeric property name, 0xFFFF0801, with "Position".

Reading PROP_FASTPROPS

This section explains and demonstrates the use of PROP_FASTPROPS data structure to get an object's title.

PROP_FASTPROPS is the name of a data structure supplied by NewWave containing the values of commonly used properties. An application that needs several of these property values can reduce read time by getting the PROP_FASTPROPS structure rather than getting each individual property.

When the OMF_ReadProperty function is called with PROP_FASTPROPS, the OMF returns a data structure containing the values of these properties:

```
PROP_ADDCHILD         PROP_MODIFIED
PROP_DESKTOPFLAGS     PROP_PUBLIC
PROP_EXTRADISK        PROP_SYSTEM
PROP_LASTWRITER       PROP_TITLE
```

The following example shows how PROP_FASTPROPS can be used to get the object title. Note that a real application should only use PROP_FASTPROPS when several properties are needed.

In this code, a buffer is allocated for the PROP_FASTPROPS data structure. The handle to this buffer is a global variable. The handle will be passed to the OMF, and the OMF will fill the buffer. Note that the memory must be shareable.

Code Example 2-8: Accessing PROP_FASTPROPS

```
HPROPERTIES  hProps;
FASTPROPS    FAR * lpProps;
char         title [MAXTITLE+1];

...

if ( ( ghFastProps = GlobalAlloc( GMEM_LOWER | GMEM_MOVEABLE |
                                  GMEM_ZEROINIT,
                                  (LONG) sizeof(FASTPROPS) )
                   ) == NULL ) {
    /* Process error here. */
    return (FALSE);
} hProps = OMF_GetProperties( hOMF, SELF, FALSE );
if (hProps == NULL) {
    /* Error handling. */
} if ( OMF_ReadProperty( hOMF,
                       hProps,
                       PROP_FASTPROPS,
                       (LPSTR)MAKELONG( ghFastProps, 0),
                       sizeof(FASTPROPS) ) == -1 ) {
    /* Process error here. */
    OMF_FreeProperties( hOMF, hProps );
    return( FALSE ) );
}

OMF_FreeProperties( hOMF, hProps );

if ( (lpProps = (FASTPROPS FAR *)GlobalLock(ghFastProps)) == NULL ) {
    /* ghFastProps became invalid somehow, process error here. */
}
```

```
/* Get PROP_TITLE and write into data structure. Notice how we
** extract the length of the string. The field LenTitle is the length
** of the property with the PROPEXISTS flag OR'd into it. Fast Prop
** strings do NOT have null terminators on them, so we fill the title
** array with nulls before moving title there.
*/ lstrfill( (LPSTR)title, 0, sizeof(title) );

if ( lpProps->LenTitle & PROPEXISTS ) {
  lstrmove( (LPSTR)title,
            lpProps->Title,
            lpProps->LenTitle & PROPEXISTS );

}

GlobalUnlock( ghFastProps );

/* Free the fast prop buffer. */
GlobalFree( ghFastProps );
```

Defining Properties That Are Not Copied with the Object

By default, object property values are copied when an object is copied. However, a property name can be defined to prevent copying of the property value with the object.

For numeric property names, the 0x8000 bit must be set to prevent copying of the property value when the object is copied.

Code Example 2-9: Defining Properties not to be Copied

For example, setting the non-copy bit of property MY_PROP could be done as follows:

```
#define MY_PROP (LPSTR)((LONG)(PROP_USERDEFINED + 1)|0x8000)
```

This example assumes that MY_PROP would have otherwise been defined as shown below.

```
#define MY_PROP   (PROP_USERDEFINED + 1)
```

Note that this bit must also be set in the property names listed in the .IN$ file.

To accomplish this with string property names, the string must be preceded by a dollar sign ("$"). For example, the property otherwise called "MYPROP" would be called "$MYPROP".

3 Inserting Child Objects

This chapter will be released shortly. It will be mailed to the address supplied on the "Update Reply Card."

4. Destination Object View Processing

Overview of Destination Object View Processing

This chapter describes code to include in a destination application to support the placing of views in that object.

A view from the source object can be placed in a destination object in a number of ways:

One method calls for the user to select an object from the "Create a New" dialog box within a destination object. This selection prompts the OMF_NEW_OBJECT message to be sent to the destination object.

A second method calls for the user to drag the source object into the open destination window. An OMF_INSERT message is then sent to the destination object.

Note   A third method, not covered in this chapter, calls for the user to Paste a view from a source object that has already been stored on the OMF_CLIPBOARD. This method is described in Chapter 7, "Using the Clipboard."

In some cases, the destination object determines if there is a view specification already defined by the source object. If there isn't a current view, the destination object sends an INIT_VIEW message to the source object to create a new view (Chapter 5, "Source Object View Processing," describes how a source object creates a view specification).

In other cases (e.g., the Clipboard) the source object may already have a view, that is, a description of what part of the source object's data is to be displayed or requested.

When a destination (parent) object includes a visual view from a source object, the destination object is responsible for specifying the size and placement of the view in the destination window or printed document, while the source object (or snapshot) does the actual displaying or printing.

However, the destination object may request the view for information about the view's preferred size. For example, the view may wish to preserve its aspect ratio. The destination object may send the GET_SIZE message to request size information from the view. Views with no preferred size need not support this message.

The destination object then sends a DISPLAY_VIEW message to the view, signaling the view to display itself. The DISPLAY_VIEW message includes the destination object's display context, a rectangle to contain the whole of the view and a rectangle of the part of the view to actually display.

The destination object requests a view to redisplay itself whenever it needs to repaint the part of the screen that includes the view. The destination object also requests the view to redisplay itself if the source object has changed its data. The destination object is notified of this change in the source object by receiving a DATA_CHANGE message from the OMF.

Chapter Organization

This chapter describes the code that must be included in a destination object to support displaying views.

To support displaying of views, a destination application must include procedures that carry out the following functions: Creating a view, getting a view, getting the size of a view, displaying a view, updating a view, and freeing a view.

This chapter includes the following sections:

Creating a View - describes the code for initiating a new view, either by processing the OMF_INSERT message or by processing the OMF_NEW_OBJECT message. The sample CheckMethods procedure shows how to check for the view methods the destination object requires. Then the sample CreateView procedure that actually sends an INIT_VIEW message is described.

Getting a View - describes code to activate a view by making an OMF_GetView call in preparation for sending messages to the view.

Getting the Size of a View - describes code to send a GET_SIZE message to the view to determine its size and orientation.

Displaying a View - describes a procedure to send a DISPLAY_VIEW message to the view.

Updating a View - describes code to process a DATA_CHANGE message from the OMF and to send a DISPLAY_VIEW message to the view telling it to redisplay itself.

Freeing a View - describes code to terminate a view.

In this chapter, code from the sample application, HPLAYOUT, is used to demonstrate code to carry out the above functions. For further information on how this is performed, please refer to the sample application code from HPLAYOUT.

Although the above functions are shown in separate sections, almost all of these functions are required in order to display a view of a source object in the destination object. Requesting the view for its desired size for its view is optional.

Methods to Support  Include the following methods in the .INS file in the HAVE_METHODS section, and in the application's code HAS_METHOD section.

```
OMF_INSERT
OMF_NEW_OBJECT
DATA_CHANGE
DATA_CHANGE_END
```

Creating A View

As previously stated, there are basically three ways that a view is created from the destination object. This section describes two ways to carry this out: by processing the OMF_INSERT message (generated by dropping the source object icon into the open destination window) and by processing the OMF_NEW_OBJECT message (generated by selecting the "Create a New" command in the destination object).

Code to support Pasting an object or a view from the Clipboard is described in in Chapter 7, "Using the Clipboard."

Processing the OMF_INSERT Message  One way of inserting a view from a source object into a destination object is for the user to drag the icon of that source object and drop it into the open window of that destination object. This way of inserting an object causes the object which originally contained the source object to send an OMF_INSERT message to the destination object.

The destination object then processes the OMF_INSERT message as follows:

1. First, a DATALINK reference name is generated and assigned to the source object.

2. If the object which sent the OMF_INSERT message already had a view of the source object then:

a. The OMF_CopyViewSpec function is called to copy the view specification from that view to the new view being created.

b. The view methods of the view are checked for acceptability.

3. If the object which sent the OMF_INSERT message did not have a view of the source, then:

a. The default view methods of the source object are checked for acceptability.

b. The CreateView sample procedure is called to send an INIT_VIEW message to the source object.

4. After the view has been created, the destination object updates its own data structures and displays the view.

Note that if an existing view specification is being copied, the view methods are checked after copying the view specification. This is necessary because the existing view may not be using the default view class (zero). On the other hand, if a new view specification must be initialized by sending the INIT_VIEW message, the view methods should be checked before incurring the expense of activating the source object.

The following sample procedure InsertObject is based on code in the HPLAYOUT sample application. This procedure processes the OMF_INSERT message. The sample procedures CreateView and CheckMethods, which are called within InsertObject, are detailed later in this section.

Code Example 4-1: InsertObject

```
/* Handle the OMF_INSERT message in the procedure which processes  */
/* messages from the OMF (i.e. the MessageFromOMF procedure).       */ case OMF_INSERT:

return ( InsertObject ((HANDLE)LOWORD(lParam)) );

/******************************************************************/
/*                        InsertObject                             */
/******************************************************************/ long PASCAL InsertObject (hInsert)    /* process OMF_INSERT message */
HANDLE hInsert;
{
LPINSERTSTRUCT lpInsert;
OBJECTNAME     oObjRef;     /* DATALINK name to assign to the object */
OBJECTNAME     oParam;
OBJECTNAME     oSender;
OBJECTNAME     oDataLink;

/* Access the message parameters. */
lpInsert = (LPINSERTSTRUCT) GlobalLock (hInsert);
if (lpInsert == NULL)
    return ((long)FALSE);

oParam    = lpInsert->dwObject;
oSender   = lpInsert->dwSenderName;
oDataLink = lpInsert->dwDataLinkName;
GlobalUnlock (hInsert);

/* This sample uses an always increasing counter for generating new */
/* datalink reference names.                                        */
oObjRef = DATALINK | gNextDataLinkName++;

/* Assign the object to be our new datalink child. */
if ( !OMF_Assign (ghOMF, oObjRef, oParam) ) {
    NoteOMFError (ghOMF);
    return ((long)FALSE);
    }
```

```
/* If view specification exists, copy it */
if (SCOPEOF (oDataLink) == DATALINK) { if ( !OMF_CopyViewSpec (ghOMF, SELF, oObjRef,
                            oSender, oDataLink) ) {
        NoteOMFError (ghOMF);
        if ( !OMF_Assign (ghOMF, oObjRef, NULLOBJECT) )
            NoteOMFError (ghOMF);
        return ((long)FALSE);
    }

/* Check for required view methods. */
    if ( !CheckMethods (oObjRef) ) {
        if ( !OMF_Assign (ghOMF, oObjRef, NULLOBJECT) )
            NoteOMFError (ghOMF);
        return ((long)FALSE);
    }

} /* End Copying View Spec */ else { /* View specification does not exist, so create one. */

/* In this case, we check for the required view methods first.  */
    /* This causes the view methods supported by the default view   */
    /* class (class 0) to be checked. This is why the source object */
    /* must always use view class 0 when processing INIT_VIEW.      */ if ( !CheckMethods (oObjRef) ) {
        if ( !OMF_Assign (ghOMF, oObjRef, NULLOBJECT) )
            NoteOMFError (ghOMF);
        return ((long)FALSE);
    }

/* Call application function CreateView to send an  */
    /* INIT_VIEW message to the source object.          */ if ( !CreateView (oObjRef) ) {
        if ( !OMF_Assign (ghOMF, oObjRef, NULLOBJECT) )
            NoteOMFError (ghOMF);
        return ((long)FALSE);
    }

} /* End Creating New View Spec */

/* YOUR CODE HERE would update your application data structures and */
/* display the view (which is described later).                     */ return ((long)TRUE);

} /* End InsertObject Procedure */
```

Processing the OMF_NEW_OBJECT Message

If the user creates a new view by selecting the "Create a New" command from the File menu, the "Create a New" dialog box is displayed. The user, at this point, can select an object to be inserted into the destination object from the master list. When the user selects an object from the "Create a New" dialog box, the Creator object (dialog box) sends the destination object an OMF_NEW_OBJECT message.

Note  A complete description on how to use the "Create a New" dialog box is given in Chapter 3 - "Inserting Child Objects."

The destination object processes the OMF_NEW_OBJECT message by calling the CreateView sample procedure which sends an INIT_VIEW message to the new source object.

The following sample procedure NewObject is based on code in the HPLAYOUT sample application. This procedure processes the OMF_NEW_OBJECT message. Note that it is not necessary to check the view methods while processing the OMF_NEW_OBJECT message because the destination object tells the Creator object to only display those masters with acceptable methods.

Code Example 4-2: NewObject

```
/* Handle the OMF_NEW_OBJECT message in the procedure which    */
/* processes messages from the OMF (i.e. MessageFromOMF).      */ case OMF_NEW_OBJECT:

NewObject ((OBJECTNAME)lParam);
    return (0L);

/*************************************************************/
/*                      NewObject                            */
/*************************************************************/ void PASCAL NewObject (oParam)       /* process OMF_NEW_OBJECT message */
OBJECTNAME oParam;
{
OBJECTNAME oObjRef;          /* DATALINK name to assign to the object */

/* This sample uses an always increasing counter for generating new */
/* datalink reference names.                                        */
oObjRef = DATALINK | gNextDataLinkName++;

/* Assign the object to be our new datalink child. */
if ( !OMF_Assign (ghOMF, oObjRef, oParam) ) {
   NoteOMFError (ghOMF);
   return;
}

/* Call application function CreateView to send an INIT_VIEW message to */
/* the source object to initialize the view specification.             */ if ( !CreateView (oObjRef) ) {
   if ( !OMF_Assign (ghOMF, oObjRef, NULLOBJECT) )
      NoteOMFError (ghOMF);
   return;
}

/* YOUR CODE HERE would update your application data structures and */
/* display the view (which is described later).                     */

} /* End NewObject Procedure */
```

Checking View Methods  The sample procedure CheckMethods is called to verify that a view can support all of the view methods that the destination object requires.

Code Example 4-3: CheckMethods

```
/*************************************************************/
/*                     CheckMethods                          */
/*************************************************************/

BOOL PASCAL CheckMethods (oObjRef)
OBJECTNAME oObjRef;
{
int method;

method = OMF_GetViewMethod (ghOMF, oObjRef, DISPLAY_VIEW);

if (method == METHOD_ERROR) {
   NoteOMFError (ghOMF);
   return (FALSE);
} if (method == NO_METHOD) {

/* YOUR CODE HERE should display an error message telling the user */
   /* that the object dragged into this window cannot be inserted into */
   /* this application.                                               */ return (FALSE);
} return (TRUE);
}
```

Sending the INIT_VIEW message

The sample CreateView procedure, below, is called by both of the above samples to carry out the sending of the INIT_VIEW message.

Code Example 4-4: CreateView

```
/************************************************************/
/*                     CreateView                           */
/*                                                          */
/* Send an INIT_VIEW message to the object to initialize a new view. */
/************************************************************/

BOOL PASCAL CreateView (oDataLink)
OBJECTNAME oDataLink;
{
HANDLE           hMem;
LPINITVIEWSTRUCT lpInitView;   /* handle to parm structure */
OBJECTNAME       oParam;

/* Get the parameter name of SELF in order to pass to source object. */
oParam = OMF_MakeObjParam (ghOMF, SELF);
if (oParam == OL) {
   NoteOMFError (ghOMF);
   return (FALSE);
   }

/* Allocate memory for the parameter structure to be placed in. */
hMem = GlobalAlloc( GMEM_LOWER | GMEM_MOVEABLE,
                    (long)(sizeof(INITVIEWSTRUCT)) );
if (hMem == NULL) {
   NoteError (ERR_MEMORY);
   return (FALSE);
   }

/* Get a pointer to the parameter structure in memory. */
lpInitView = (LPINITVIEWSTRUCT)GlobalLock( hMem );
if (lpInitView == NULL) {
   NoteError (ERR_MEMORY);
   GlobalFree (hMem);
   return (FALSE);
   }

/* Set up the parameter structure. */
lpInitView->dwDestination = oParam;
lpInitView->dwRefName     = oDataLink;
lpInitView->zero          = 0;
lpInitView->MethodHints[0] = (WORD)-1;

GlobalUnlock (hMem);

/* Now activate the source object and send an INIT_VIEW message to it. */
if ( !OMF_GetOMFObject (ghOMF, oDataLink) ) {
   NoteOMFError (ghOMF);
   GlobalFree (hMem);
   return (FALSE);
   }
if ( !LOWORD (OMF_Send (ghOMF, oDataLink, INIT_VIEW, (LONG)hMem)) ) {
   NoteOMFError (ghOMF);
   OMF_FreeOMFObject (ghOMF, oDataLink);
   GlobalFree (hMem);
   return (FALSE);
   }
GlobalFree (hMem);

/* Deactivate the source object. */
if ( !OMF_FreeOMFObject (ghOMF, oDataLink) ) {
   NoteOMFError (ghOMF);
   return (FALSE);
   }
return (TRUE);

} /* End CreateView Procedure */
```

Getting a View

If the destination object wants to send a message to a view already defined, the destination object must activate that view beforehand. This step is done by making an OMF_GetView call in order to get a handle to the source object's view before sending any view messages, such as DISPLAY_VIEW, to the view.

Note that anytime a destination object "gets a view," that view needs to be released later. This step is explained in the last section of this chapter.

Code Example 4-5: Calling OMF_GetView

```
/* This code can be placed in any procedure, or in it's own procedure. */
/* It must be called before a message can be sent to the view.         */

HVIEW hView;

...

/* oObject is the DATALINK reference name */
/* of the source object of the view.      */ hView = OMF_GetView (ghOMF, oObject);
if (hView == NULL)
    NoteOMFError (ghOMF);
```

Getting the Size of a Visual View

When a visual view is included in a destination object, the destination object may ask the view to specify a preferred size within a given size limit. This action allows the destination object to determine exactly how much space the view needs to use.

The sample procedure GetViewSize determines the size of a visual view as follows:

1. The procedure first checks to see if the view supports the GET_SIZE view method. If not, the requested size is used as a default.

2. A parameter structure is allocated and filled in with the requested orientation.

3. The view is activated and sent the GET_SIZE message.

4. The return values from the view are saved for return.

5. The view is deactivated.

A destination object which sends the GET_SIZE message should do so when the view is first created, and then again each time it receives a DATA_CHANGE message for that view.

Code Example 4-6: GetViewSize

```
/*****************************************************************/
/*                        GetViewSize                            */
/*****************************************************************/ void PASCAL GetViewSize (oObjRef, reqHeight, reqWidth,
                         reqOrientation, reqPreserveAspect,
                         reqPreferredSize, pRealHeight,
                         pRealWidth, pBaseline)
OBJECTNAME oObjRef;
int        reqHeight, reqWidth, reqOrientation;
BOOL       reqPreserveAspect, reqPreferredSize;
int        *pRealHeight, *pRealWidth, *pBaseline;
{
HANDLE             hView, hGetSize, hReturnSize;
LPGETSIZESTRUCT    lpGetSize;
LPRETURNSIZESTRUCT lpReturnSize;

/* Set up default return values. */

*pRealHeight = reqHeight;
*pRealWidth  = reqWidth;
*pBaseline   = reqHeight;

/* If view doesn't support GET_SIZE, just return defaults. */
if (OMF_GetViewMethod (ghOMF, oObjRef, GET_SIZE) != METHOD_PRESENT)
   return;

/* Allocate and fill in parameter structure. */
if ( (hGetSize = GlobalAlloc( GMEM_MOVEABLE | GMEM_LOWER | GMEM_ZEROINIT,
                              (long)sizeof(GETSIZESTRUCT) )) == NULL ||
     (lpGetSize = (LPGETSIZESTRUCT) GlobalLock ( hGetSize )) == NULL ) {
   NoteError (ERR_MEMORY);
   return;
   }
lpGetSize->MaxHeight      = reqHeight;
lpGetSize->MaxWidth       = reqWidth;
lpGetSize->Rotation       = reqOrientation;
lpGetSize->PreserveAspect = reqPreserveAspect;
lpGetSize->PreferredSize  = reqPreferredSize;

GlobalUnlock( hGetSize );

/* Activate the view. */
if ( (hView = OMF_GetView( ghOMF, oObjRef )) == NULL ) {
   NoteOMFError (ghOMF);
   GlobalFree (hGetSize);
   return;
   }

/* Send the message. */
   hReturnSize = LOWORD( OMF_SendViewMsg( ghOMF, hView,
                                     GET_SIZE, (WORD)hGetSize ) );
   if ( hReturnSize != NULL ) { lpReturnSize = (LPRETURNSTRUCT)GlobalLock( hReturnSize );
      if ( lpReturnSize != NULL ) {

/* Save the returned values. */
         *pRealHeight   = lpReturnSize->RealHeight;
         *pRealWidth    = lpReturnSize->RealWidth;
         *pRealBaseline = lpReturnSize->BaseLine;
         GlobalUnlock( hReturnSize );
         }
      GlobalFree( hReturnSize );
      } /* if ( hReturnSize != NULL ) */
   /* Deactivate the view. */
   if ( !OMF_FreeView( ghOMF, hView ) )
      NoteOMFError (ghOMF);

GlobalFree( hGetSize );

} /* End GetViewSize Procedure */
```

Displaying a Visual View

When a destination object includes a visual view from a source object for the first time, or after a DATA_CHANGE message is received, the view needs to be displayed.

In the sample HPLAYOUT application the PaintChild sample procedure is called to carry this out. PaintChild sends a DISPLAY_VIEW message to the view with a request to paint the whole of the view. Partial display requests may also be sent in response to the destination's paint messages.

To display the whole view, the PaintChild procedure is called with the *rcPart* rectangle parameter of the display context set to be the same as the *rcWhole* rectangle parameter. If the destination object is processing its own paint message, PaintChild is called with the *rcPart* rectangle set to the intersection of the *rcWhole* rectangle and the paint region.

The major steps in the PaintChild procedure are as follows:

1. The procedure paints a dummy rectangle for the view to reside in with the background color for the child. This step marks an area within HPLAYOUT's window that the view displays within.

2. The procedure sets the display context for the view by using its own display context to set the current defaults.

3. The procedure sends a DISPLAY_VIEW message to the view.

4. The procedure grays the rectangle if the source object is open.

Code Example 4-7: PaintChild

```
/****************************************************************/
/*                        PaintChild                            */
/*                                                              */
/* Send DISPLAY_VIEW message to a view with the given portion to display. */
/****************************************************************/ void PASCAL PaintChild (hDC, prcWhole, prcPart, hView, bObjOpen)
HDC             hDC;
PRECT           prcWhole, prcPart;
HVIEW           hView;
BOOL            bObjOpen;
{
HANDLE          hMem;
LPDISPLAYSTRUCT lpDisplayView;

/* YOUR CODE HERE should fill the destination rectangle with whatever */
/* background color is appropriate.                                   */

/* YOUR CODE HERE should make any changes to the DC that you want the */
/* view to use as defaults.                                           */

/* Allocate the parameter structure: */
hMem = GlobalAlloc( GMEM_LOWER | GMEM_MOVEABLE | GMEM_ZEROINIT,
                    (long)sizeof(DISPLAYSTRUCT) );
if (hMem == NULL) {
   NoteError (ERR_MEMORY);
   return;
}

/* Get pointer to parameter structure and fill it in. */
lpDisplayView = (LPDISPLAYSTRUCT)GlobalLock( hMem );
if (lpDisplayView == NULL) {
   NoteError (ERR_MEMORY);
   GlobalFree (hMem);
   return;
}
```

```
lpDisplayView->hDC         = hDC;
lpDisplayView->Flags       = 0;
lpDisplayView->Whole       = *prcWhole;
lpDisplayView->Part        = *prcPart;
lpDisplayView->rgbBkColor  = RGB(0xFF, 0xFF, 0xFF);  /* white */

GlobalUnlock (hMem);

/* Send the message. */
if ( !OMF_SendViewMsg (ghOMF, hView, DISPLAY_VIEW, (WORD)hMem))
   NoteOMFError (ghOMF);

GlobalFree (hMem);

/* Gray the child if it is open. */
if (bObjOpen)
   GrayRect (hDC, prcPart);

} /* End PaintChild */
```

Updating a View

When the data for a view is changed in a source object, the source object calls the OMF_AnnounceNewData function. This call causes the destination object(s) for that view to receive a DATA_CHANGE message. The destination object should process the DATA_CHANGE message by requesting the appropriate view to redisplay itself if the view is currently on screen. If the destination object is using the GET_SIZE protocol described earlier, it should send another GET_SIZE message so that changes in the size of the view are handled properly.

The DATA_CHANGE_END message need not be processed unless the destination object is included in a view to yet another object, in which case it should call OMF_AnnounceNewData when the message is received.

The following example code shows how to process the DATA_CHANGE message when it is received in the MessageFromOMF procedure of the HPLAYOUT sample application.

Code Example 4-8: Processing DATA_CHANGE Message

```
PRECT  prcWhole;
HVIEW  hView;
BOOL   bObjOpen;

....

/* Handle the DATA_CHANGE message in the procedure which processes  */
      /* messages from the OMF (i.e. the MessageFromOMF procedure).       */ case DATA_CHANGE:    /* Source object has changed - update display. */

/* Get a DC with all our favorite modes. */
         hDC = SetupDC (hWnd);
         if (hDC == NULL)
            return (0L);

for (every source object that is currently displayed)

if (object.oObject == (OBJECTNAME) lParam) {

/* YOUR CODE HERE should set prcWhole to point to the       */
               /* rectangle of the whole view, hView to the handle to the  */
               /* activated view, and bObjOpen to indicate whether the     */
               /* source object is currently open.                         */

PaintChild (hDC, prcWhole, prcWhole, hView, bObjOpen)
            }

ReleaseDC (hWnd, hDC);

return (0L);  /* End DATA_CHANGE Processing */
```

Freeing a View

When the destination object is finished sending messages to a view, it calls the OMF_FreeView function to deactivate it.

The destination object is responsible for deciding how long to keep active views of the source objects. A simple destination object might activate all the views of its source objects on start-up and to free them all when the destination object is closed. However, accessing views in this way does consume considerable system resources. A more sophisticated destination object might keep active only those source objects whose views are actually being displayed on the screen.

Code Example 4-9: Calling OMF_FreeView

```
/* This code can be placed in any procedure, or in it's own procedure. */
/* It must be called before the destination object terminates.         */

HVIEW hView;

...

/* hView is the handle returned by OMF_GetView when this view was */
/* activated, or NULL if this view is not currently active.       */ if (hView != NULL) {  /* currently active... */ if ( !OMF_FreeView (ghOMF, hView) )  /* deactivate view */
        NoteOMFError (ghOMF);

hView = NULL;
}
```

5 Source Object View Processing

Overview of Source Object View Processing

This chapter details the processing of views in source objects. To repeat some major points regarding views:

A *view*, as defined in Chapter 2 of the "HP NewWave Environment: Programmer Guide," is data in a source object that is shared with or *linked* to a given *destination object*. The viewed data is used by the destination object in some way (e.g., as part of the destination's output).

A single view can include all of the source object's data or simply a portion of the source object's data. Multiple views of a source object may exist. The location and area of a view, as defined by its beginning and end points, is called its *range*.

For this chapter it is important to note that *view* and *range* are not synonymous. One *view* is distinguished from another by its destination; whereas, a *range* of viewed data is distinguished by its selected location and area within the source object.

Thus, the same *range* of source data, shared or linked to several different destinations, is defined as several different *views*. Each of these views, however, has the same range.

Each range of viewed data that exists in a source object is listed in an internal data structure for that source object called the *source specification table*. In the source specification table, each range is assigned a unique sixteen-bit integer called a *data ID*.

For each view (i.e., source-to-destination link) that exists, the OMF maintains a separate structure of vital information called a *view specification*. One element included in each view specification is the data ID for the range of data a given view covers. If a given range of viewed data is claimed by several different views, the data ID for that range is assigned to each of those views.

When a destination object requests access to a view, the data ID in the associated OMF view specification is passed back to the source object. The source object then matches that data ID to the range listed in its source specification table and displays or returns the range of data the destination object needs.

Any object that can be included within another object, must have the ability to make a copy of itself. This ability enables an object to be copied even if that object is active (e.g., supplying a view to another destination object) at the time the copying is being carried out.

Chapter Organization This chapter provides sample procedures that are typical of those included in a source application to supply a destination object with a view. In the following sections, sample procedures supporting the following tasks are described:

Creating the View - describes procedures for creating a view by either processing the INIT_VIEW message, or processing the Share command.

Managing the Source Specifications - describes procedures for creating data IDs, deleting data IDs, validating data IDs, and changing the range of the viewed data.

Displaying Views - describes the procedure for displaying a view.

Informing Destination Objects of New Data - describes the procedure for notifying destination objects when viewed data has changed in the source object.

Copying an Active Object - describes procedures that enable a child or source object to be copied even if it is active (e.g., supplying a view to a destination object) at the time of copying.

Sample procedures for most of these sections are based on the sample application called HPTEXT, supplied on the disks that come with the NewWave Developer's Kit.

Methods to Support The following is a list of required and optional methods that must be supported by the source object. These methods should be listed in the HAVE_METHODS section of the .IN$ file, and in the HAS_METHOD section of the application's code.

```
INIT_VIEW
DISPLAY_VIEW
LOSE_DATAID
PRINT_SLAVE (optional, covered in Chapter 8)
GET_SIZE (optional)
COPY_SELF
```

The following messages are included in the OTHER_CLASS_PROPERTIES, PROP_VIEWMETHODS section of the .IN$ file.

```
DISPLAY_VIEW
PRINT_SLAVE (optional, covered in Chapter 8)
GET_SIZE (optional)
```

Creating a View

In the NewWave environment a user can create a view from either inside or outside the source window.

If the source object allows the user to create a view from within the source window, then the user starts the process by selecting the data to be included and then selecting the Share command from the source object's pull-down menu.

Creating a view from outside the source window typically requires the user to use one of the following techniques: to select the "Create a New" command in the destination window; or to drop the source object icon directly into a reserved spot on the destination window. Either sequence causes the destination object to send the source object an INIT_VIEW message.

Note  A third alternative, Pasting an object into another object from the Clipboard is not covered in this chapter.

The first sample procedure in this section, ProcessShareCmd might be included in a source application to support the creation of a view from within a source window.

The second sample procedure ProcessInitView might be included in a source application to support the creation of a view from outside the source window.

Processing the Share Command

If a Share command is selected from within a source window, the source object, by means of the ProcessShareCmd sample procedure, described below, establishes a view between the selected data and the OMF_CLIPBOARD (See Chapter 7, "Using the Clipboard," for an explanation of the OMF_CLIPBOARD). This view is later shifted to the destination object when the user Pastes that data into the destination window (For more detail on this process refer to Chapter 7, "Using the Clipboard").

Description

When processing the Share command, the ProcessShareCmd sample procedure carries out the following steps:

1. The procedure calls the CreateDataId procedure to create a unique data ID to identify the data to be viewed. See the section titled "Creating a Data ID" in this chapter for details.

2. The procedure gets ownership of the Windows Clipboard.

3. The procedure clears the Windows Clipboard.

4. The procedure clears the OMF_CLIPBOARD by calling OMF_EmptyOMFClipboard.

5. The procedure puts the source object on the OMF_CLIPBOARD by calling OMF_PutViewOnClipboard, which returns the Clipboard's reference name for that object.

6. The procedure calls the OMF to bind the Clipboard's reference name for the source object with the source object's unique data ID. The OMF function OMF_InitViewSpec does this binding.

7. The procedure allocates and initializes a CB_OBJECT_STRUCT structure with information that describes the object on the OMF_CLIPBOARD.

8. The procedure registers the OMF data format CFN_OBJECT with the Windows Clipboard, places the CB_OBJECT_STRUCT structure on the Windows Clipboard, and closes the Windows Clipboard.

Code Example 5-1: ProcessShareCmd

```
/****************************************************************/
/*                      ProcessShareCmd                         */
/****************************************************************/

WORD PASCAL ProcessShareCmd (hWnd)
HANDLE   hWnd;
{
WORD                    dataid;
OBJECTNAME              oCBDataRef;
GLOBALHANDLE            hMem;
CB_OBJECT_STRUCT FAR    *lpCBData;
unsigned short int      CBFormat;
LONG                    selection;

/* get selection from edit control */
selection = SendMessage (ghEdit, EM_GETSEL, (WORD)NULL, (LONG)NULL);
if (LOWORD(selection) == HIWORD(selection))
   return (IDS_SHARE_ERROR);   /* empty selection not allowed */

/* get dataid to describe the view being created */
if (!(CreateDataId (selection, &dataid)))
   return (IDS_SHARE_ID_ERROR);

if (!OpenClipboard (hWnd))
   return (IDS_OPEN_ERROR);

if (!EmptyClipboard ()) {
   CloseClipboard ();
   return (IDS_COPY_ERROR);
   } if (!OMF_EmptyOMFClipboard (ghOMF)) {
   CloseClipboard ();
   return (IDS_OMF_ERROR);
   }

/* place self on the OMF clipboard */
/* return value is datalink reference from OMF clipboard self */ oCBDataRef = OMF_PutViewOnOMFClipboard (ghOMF, SELF);
if (oCBDataRef == NULLOBJECT) {
   CloseClipboard ();
   return (IDS_OMF_ERROR);
   }

/* init view spec of view from clipboard to self */
if (!OMF_InitViewSpec (ghOMF, OMF_CLIPBOARD, oCBDataRef, dataid,
                     (LPSTR)NULL, cDEFAULTVIEWCLASS, (LPSTR)NULL)) {
   CloseClipboard ();
   return (IDS_OMF_ERROR);
   }
```

Methods to Support:

List the following method in the HAVE_METHODS section of the .IN$ file and in the HAS_METHOD section of the application's code.

INIT_VIEW

Code Example 5-2: ProcessInitView

```
/* Process the INIT_VIEW message in the procedure that processes the */
/* messages from the OMF, i.e. MessageFromOMF.                       */ case INIT_VIEW:

return ( ProcessInitView ((HANDLE)LOWORD(lParam)) );

/****************************************************************/
/*                      ProcessInitView                         */
/****************************************************************/

LONG PASCAL ProcessInitView (hViewStruct)
HANDLE       hViewStruct;
{
LPINITVIEWSTRUCT    lpview;     /* long ptr to parameter struct */
```

```
    OBJECTNAME         oDestination;
    OBJECTNAME         oRefName;
    WORD               dataid;
    WORD               lastchar;

/* lock the parameter structure */
    if (!(lpview = (LPINITVIEWSTRUCT)GlobalLock (hViewStruct)))
       return ((LONG)FALSE);

oDestination = lpview->dwDestination;
    oRefName     = lpview->dwRefName;

GlobalUnlock (hViewStruct);

/* get number of characters in edit control */
    lastchar = LOWORD (SendMessage (ghEdit, WM_GETTEXTLENGTH,
                                    (WORD)NULL, (LONG)NULL));

/* assign a dataid to describe this view */
    if (!(CreateDataid (MAKELONG (0, lastchar), &dataid)))
       return ((LONG)FALSE);

/* init the view spec with the new dataid. Note that we MUST use
       a view class of 0 for this call since the view methods that the
       destination has already accepted were for that view class */
    if (!OMF_InitViewSpec (ghOMF, oDestination, oRefName, dataid,
                           (LPSTR)"Entire Object",
                           cDEFAULTVIEWCLASS, (LPSTR)NULL))
       return ((LONG)FALSE);

return ((LONG)TRUE);

}  /* End of ProcessInitView Procedure */

/* allocate object structure that will be placed on Windows clipboard */
    if (!(hMem = GlobalAlloc (GMEM_MOVEABLE,
                              (LONG)SIZEOF_CB_OBJECT_STRUCT(1)))) {
       CloseClipboard ();
       return (IDS_MEMALLOC_ERROR);
       } if (!(lpCBData = (CB_OBJECT_STRUCT FAR *)GlobalLock (hMem))) {
       GlobalFree (hMem);
       CloseClipboard ();
       return (IDS_MEMALLOC_ERROR);
       }

/* info for Windows clipboard to define object on the OMF clipboard */
    lpCBData->Header.wFlags    = CB_SHARE;
    lpCBData->Header.nObjects  = 1;
    lpCBData->List[0].dwCBName = oCBDataRef;
    lpCBData->List[0].dwWBName = 0L;

if (!(lpCBData->List[0].dwParmName = OMF_MakeObjParam (ghOMF, SELF))) {
       GlobalUnlock (hMem);
       GlobalFree (hMem);
       CloseClipboard ();
       return (IDS_OMF_ERROR);
       }

GlobalUnlock (hMem);

/* get format id for object data type and put data on clipboard */
    CBFormat = RegisterClipboardFormat ((LPSTR)CFN_OBJECT);
    SetClipboardData (CBFormat, (HANDLE)hMem);
    CloseClipboard ();

return (NO_ERR);

}  /* End of ProcessShareCmd */
```

Processing an INIT_VIEW Message

If the user creates a view from outside the source object window (by one of the methods described at the start of this section), the destination object sends the source object an INIT_VIEW message, which is processed by the ProcessInitView sample procedure in the source application.

Description

When processing the INIT_VIEW message, the ProcessInitView sample procedure carries out the following steps:

1. The procedure calls the CreateDataID procedure to create a unique data ID to identify the data to be viewed. See the section titled "Creating the Data ID" for details.

2. The procedure locks the handle passed in the LOWORD of the *lParam* of the INIT_VIEW message. This structure contains the OMF name of the destination object requesting the view and the reference name that the destination object has for the source object.

3. The procedure calls the OMF to bind the destination object's reference name for this object with the source object's unique data ID. The OMF function OMF_InitViewSpec performs this binding.

Managing the Source Specification

A source application that supports views must include procedures to manage its source specification table. The source specification table, as described in the overview section, is a data structure of some sort (e.g., a linked list or array) that lists data IDs and the ranges of viewed data to which those data IDs refer.

The CreateDataId sample procedure is one way to set up a source specification table and create and store data IDs for ranges of viewed data.

The ValidateDataId sample procedure confirms that a range of viewed data listed in the source specification table is still being used by its destination object(s).

The DeleteDataId sample procedure deletes a data ID and data range from the source specification table when a procedure like the ValidateDataId procedure determines that a given data ID is no longer in use.

The ModifySharedRange sample procedure supports changing the range of viewed data for a view that already exists.

Creating and Storing a Data Id

The source application must create and assign unique data IDs to to each range of viewed data and store this mapping in a source specification table.

The CreateDataId sample procedure accesses an array that holds a fixed number of ranges for viewed data. A range of viewed data is recorded in this array and assigned a data ID (which serves as its index within the array). Deleted data IDs can be re-used if this technique is used.

Code Example 5-3: CreateDataId

Note

For simplicity the examples used in this chapter assign a different data ID each time a new view is initialized; also for simplicity, this application accesses a fixed array. Your application should search its source specification table and return an existing data ID if the data range is one that is already in the table; also your application should use an expandable array or a linked list structure as a specification table.

```
/* GLOBAL VARIABLES AND TYPES */ typedef struct {
  BOOL emptyviewrec;
  LONG selection;
} tVIEWREC;
```

```
/********************************************************************/
/*                       CreateDataID                               */
/********************************************************************/

BOOL PASCAL CreateDataId (textrange, pdataid)
LONG  textrange;
WORD  *pdataid;
{
register i;

/* scan source spec table for dataid not currently in use */
i = 0;
while (i < cMAXVIEWS) {
   if (gViewTable[i].emptyviewrec)
      break;
   i++;
   } if (i < cMAXVIEWS) {

/* store range in source spec table */
   gViewTable[i].emptyviewrec = FALSE;
   gViewTable[i].selection    = textrange;
   *pdataid = i;
   } return ((BOOL)(i < cMAXVIEWS));

} /* End of CreateDataId Procedure */
```

Deleting Data IDs When the last destination object using a given range of viewed data frees that view, that data range no longer needs to be defined and kept track of by the source object. If the source object is active when the last view using a given data ID is freed, the OMF sends that object a LOSE_DATAID message. When processing this message, the source object must delete the data range and associated data ID from its source specification table.

Note  LOSE_DATAID messages are not sent or buffered up for a source object that is not active. When the source object is activated, it needs to check the status of the outstanding data IDs that it has to see if any of them are no longer in use. This process is covered in the next section, "Validating Data IDs."

The DeleteDataId sample procedure, provided here, shows how to delete the references when the data IDs are created using the CreateDataId procedure described earlier.

Methods to Support:

List the following method in the HAVE_METHODS section of the .INS file and in the HAS_METHODS section of the application's code.

LOSE_DATAID

Code Example 5-4: DeleteDataId

```
/* Process the LOSE_DATAID message in the procedure that processes the */
/* messages from the OMF, i.e. MessageFromOMF.                         */ case LOSE_DATAID:

DeleteDataId (LOWORD(lParam));
   break;

/********************************************************************/
/*                       DeleteDataID Procedure                     */
/********************************************************************/

VOID PASCAL DeleteDataId (dataid)
register dataid;
{
```

```
/* remove source specification from table */
if (dataid < cMAXVIEWS) {

/* indicate that table entry is empty */
    gViewTable[dataid].emptyviewrec = TRUE;
    gViewTable[dataid].selection    = 0L;
    }

} /* End of DeleteDataID Procedure */
```

Validating Data Ids

When a source object is activated, it must determine if any data IDs listed in the source specification table are no longer in use; that is, if any of the associated ranges of viewed data have been freed while the source object was inactive. This task is called "validating" data IDs.

For each range of viewed data listed in the source specification table, the ValidateDataId sample procedure calls the OMF function, OMF_GetDataIdUsage. This function returns the number of destinations for that range. If the usage number returned for any given range of viewed data is zero, the procedure calls the DeleteDataId sample procedure (described above) to delete that data range and its associated data ID from the source specification table.

Code Example 5-5: ValidateDataId

```
/* Process the CREATE_OMF message in the procedure that processes the */
/* messages from the OMF, i.e. MessagefromOMF.                        */ case CREATE_OMF:

/* check to see if any data ids are now unused */
    ValidateDataIds ();
    ...
    break;

/******************************************************************/
/*                    ValidateDataID Procedure                    */
/******************************************************************/

VOID PASCAL ValidateDataIds ()
{
register i;

/* check each data id to make sure it has at least 1 destination.    */
/* the last view using a given data id could have been deleted while */
/* this object was closed                                            */ for (i = 0; i < cMAXVIEWS; i++) { if ( !gViewTable[i].emptyviewrec ) {

/* if dataid usage is 0, remove it from source spec table */
        if (!OMF_GetDataIdUsage (ghOMF, i))
           DeleteDataId (i);
        }
    }

} /* End of ValidateDataID Procedure */
```

Changing the Size of Viewed Data

If a range of viewed data has more than one destination, and the user chooses in the source object to modify that range for a particular destination, a new data ID must be created and assigned to the modified view. This step is to prevent the original range of data, still being used by the remaining destinations, from being changed also.

For example, if a certain range of cells from a spreadsheet (source object) is contained in several documents (destination objects), and the user activates the spreadsheet and changes the range of cells that are shown for one document, this change in the range should show up only in that one document.

The ModifySharedRange sample procedure calls OMF_GetDataIdUsage to determine if a modified range has more than one destination, adds the case, and then calls OMF_InitViewSpec to change the data ID in the view specification table for the view being modified.

Code Example 5-6: ModifySharedRange

```
/******************************************************************/
/*                    ModifySharedRange Procedure                 */
/******************************************************************/

WORD PASCAL ModifySharedRange (olddataid, oParentName, oRefName,
                              newselection, pdataid)
WORD            olddataid;
OBJECTNAME      oParentName;
OBJECTNAME      oRefName;
LONG            newselection;
WORD            *pdataid;
{

*pdataid = olddataid;

/* if dataid has > 1 user, must split dataid */
if (OMF_GetDataIdUsage (ghOMF, *pdataid) > 1) {

/* put a new dataid into the source specification table */
    if (!CreateDataId (newselection, pdataid))
       return( IDS_SHARE_ID_ERROR );

/* assign the new dataid to the existing data reference name */
    if (!OMF_InitViewSpec (ghOMF, oParentName, oRefName, *pdataid,
                          (LPSTR)NULL, cDEFAULTVIEWCLASS, (LPSTR)NULL))
       return( IDS_OMF_ERROR );

} /* End if OMF_GetDataIdUsage */ else /* only 1 destination for the existing dataid */

/* modify range for existing dataid */
    gViewTable[*pdataid].selection = newselection;

return (NO_ERR);

} /* End of ModifySharedRange Procedure */
```

Displaying Views

When the destination object of a visual view requires that view to be displayed, it sends a DISPLAY_VIEW message to that view. The OMF redirects that message to that view's source object or to its *snapshot* (Snapshots are discussed in Chapter 6, "Snapshot View Processing"). The source object must be able to paint the view into the display context specified by the destination object. The destination object passes a handle to a DISPLAYSTRUCT structure in the LOWORD of the *lParam* of the DISPLAY_VIEW message. When the source object receives the DISPLAY_VIEW message, the LOWORD of *lParam* contains the handle to the DISPLAYSTRUCT and the HIWORD of *lParam* contains the data ID of the view to be displayed.

Description

When processing the DISPLAY_VIEW message in the source application (or in the snapshot DAL), the sample DisplayView procedure carries out the following steps:

1. The procedure locks the handle passed in the LOWORD word of the *lParam* of the DISPLAY_VIEW message. This structure contains a handle to a display context, a rectangle describing the total area of the view, and a rectangle describing the part of the total area that needs to be redisplayed.

2. The procedure saves the state of the passed display context before any changes are made to it.

3. The procedure sets the mapping mode that is appropriate to the view being

4. The procedure creates and selects a clipping region for the display context. The clipping region should be equal to the part rectangle in the DISPLAYSTRUCT structure.

5. The procedure displays the view in the given display context.

6. The procedure restores the original display context.

Methods to Support:

List the following method in the HAVE_METHODS section and the OTHER_CLASS_PROPERTIES, PROP_VIEWMETHODS sections of the .INS file. Also list this method in the HAS_METHOD section of the application's code.

DISPLAY_VIEW

Code Example 5-7: DisplayView

```
/* Process the DISPLAY_VIEW message in the procedure that processes  */
/* the messages from the OMF, i.e. MessageFromOMF.                   */ case DISPLAY_VIEW:

return ( DisplayView ((HANDLE)LOWORD(lParam), HIWORD(lParam));

/***************************************************************************/
/*                      DisplayView Procedure                               */
/***************************************************************************/

LONG PASCAL DisplayView (hDisplay, dataId)
HANDLE hDisplay;
WORD   dataId;
{
LPDISPLAYSTRUCT  lpDisplay;
HDC              hTargetDC;
RECT             whole;
RECT             part;
HANDLE           hRgn;

/* lock the structure contains the parameters */
if (!(lpDisplay = (LPDISPLAYSTRUCT)GlobalLock (hDisplay)))
    return ((LONG)FALSE);

hTargetDC = lpDisplay->hDC;
whole     = lpDisplay->Whole;
part      = lpDisplay->Part;
GlobalUnlock (hDisplay);

/* save the destination object's DC */
if (!SaveDC (hTargetDC))
    return ((LONG)FALSE);

/* set mapping mode of target DC */
SetMapMode (hTargetDC, MM_TEXT);

/* create a region to use as the new clipping region */
if (!(hRgn = CreateRectRgnIndirect ((LPRECT)&part)))
    return ((LONG)FALSE);

/* select a new clipping region */
SelectClipRgn (hTargetDC, hRgn);

/* delete the region after is copied into the DC */
DeleteObject (hRgn);

/* your code here displays the viewed data */
/* the dataId describes what data should be painted */

/* restore the destination object's DC */
RestoreDC (hTargetDC, -1);

return ((LONG)TRUE);

} /* End of DisplayView Procedure */
```

Informing Destination Objects of New Data

When data within a source object is changed, the source object should notify its destination object(s) of any views for which new data is available. The destination object(s) can then request the source object to redisplay the view.

The source application can be programmed to defer notifying its destinations of new data if the source object has an internal flag that turns off automatic updates of destination objects.

This delay is accomplished by delaying the call to OMF_SetNewData in the procedure described below. Not making this call leaves the "new data marked" flag in the OMF view specification unset, thus preventing an automatic update; however, the source object MUST update its destinations before terminating.

Description

When informing destinations that new data is available, the AnnounceNewData sample procedure carries out the following steps:

1. For each data ID or range of viewed data that is listed in the source specification table and that has changed data, the procedure calls the OMF function OMF_SetNewData. This function instructs the OMF to set a flag in the associated view specification that new data is available.

Note that in this example, the procedure assumes that all ranges have new data.

2. After OMF_SetNewData is called for each defined data ID, the procedure calls the OMF function OMF_AnnounceNewData.

OMF_AnnounceNewData causes the OMF to send a DATA_CHANGE message to the destination object of each view that has been marked as having new data available. A single destination object may receive more than one DATA_CHANGE message if it is the owner of more than one view that has been changed.

The OMF sends a DATA_CHANGE_END message to destination objects after the last DATA_CHANGE message has been sent.

Code Example 5-8: AnnounceNewData

```
/*****************************************************************/
/*                    AnnounceNewData Procedure                  */
/*****************************************************************/
WORD PASCAL AnnounceNewData ()
{
register i;
BOOL announce;

announce = FALSE;

/* scan source spec table for defined dataids */
for (i = 0; i < cMAXVIEWS; i++) { if ( !gViewTable[i].emptyviewrec ) {

/* call OMF to set bit indicating that new data is available */
        if (!OMF_SetNewData (ghOMF, i))
            return (IDS_OMF_ERROR);

announce = TRUE;
    }
}

/* if at least 1 dataid outstanding, tell OMF to announce to all  */
/* destinations that new data is available                        */
```

```
if (!OMF_AnnounceNewData (ghOMF))
    return (IDS_OMF_ERROR);
} return (NO_ERR);

} /* End of AnnounceNewData Procedure */
```

Copying an Active Source Object

All objects that can be a source of a view should support the COPY_SELF method. This method enables a source object that is part of a destination object to be copied as part of that destination object, even if the source object happens to be active (e.g., being viewed by a second destination object) at the moment it must be copied.

The OMF sends the COPY_SELF message to any active object that is part of a compound object being copied due to a call to OMF_Copy. There are basically two strategies that a source object can use to process the COPY_SELF message:

- The first and simpler strategy is for the object to save its current state using the root filename that OMF has passed as a parameter to the message. In effect, the object is doing its normal Save processing, except to a different target data file. It should not modify its own data files in this process. When done, the object should return a value of CS_DONE to the OMF.

- The second, more complicated strategy is for an object that maintains both the current and last saved states in data sets in its data files.

When this object receives a COPY_SELF message, it first updates its current state data set with changes from memory. It then returns a CS_COPYFILES value to the OMF. This return value tells the OMF to make a copy of this object and to send a second COPY_SELF message.

After a copy of the original object is made, the OMF sends the second COPY_SELF message to the original object. The original object then modifies the copy's data sets to make the copy's last saved state equal to the original object's current state. The original object then returns CS_DONE to the OMF.

Thus, at least at the time of creation, the saved state of the copy object is the same as the current state of the still active original object.

Another task that a source object can carry out while processing COPY_SELF is to suppress the copying of any of its children which are not part of its current state. By default, the OMF copies all of the object's children after it copies the object. However, the object can cause the copying of some of its children to be suppressed. This is done by calling OMF_Copy(hOMF, NULLOBJECT, childname, 0) for each child that is not to be copied.

For simplicity, the CopySelf sample procedure, given below, only deals with the first strategy (just saving its current state to the file supplied by the OMF), and does not suppress the copying of any child objects.

Description

The sample CopySelf procedure is called to process the COPY_SELF message. It carries out the following steps:

1. The procedure creates a new data file using the file name passed as a parameter to the message, using the proper file name extension.

2. The procedure writes out the object's current state to the file.

Code Example 5-9: CopySelf

```
/* Process the COPY_SELF message in the procedure that processes the   */
/* messages from the OMF - ie. MessageFromOMF.                          */ case COPY_SELF:

return ( CopySelf ((HANDLE)LOWORD(lParam));

/***************************************************************************/
/*                          CopySelf                                       */
/***************************************************************************/

LONG PASCAL CopySelf (hData)
HANDLE    hData;
{
char    fname [MAXROOTFILENAMELENGTH+1];
LPSTR   lpText;
int     hFile;

/* lock handle that contains DOS file name of new object */
if (!(lpText = GlobalLock (hData)))
    return ((LONG)CS_ERROR);

/* copy file name to local buffer and append our extension */
lstrcpy ((LPSTR)fname, lpText);
strcat (fname, ".TXT");

GlobalUnlock (hData);

/* create new binary data file for new object */
hFile = OpenFile ((LPSTR)fname, (LPOFSTRUCT)&gReOpenBuff, OF_CREATE);
if (hFile == -1)
    return ((LONG)CS_ERROR);

/* write out current state of object to new file */
ldoswrite (hFile, glpTextBuffer, gnBytes);
dosclose (hFile);

return ((LONG)CS_DONE);

} /* End of CopySelf Procedure */
```

6  Snapshot View Processing

Overview of Snapshot View Processing

This section details the processing of views through snapshots. The use of a snapshot is described in Chapter 2 of "The HP NewWave Environment: Programmer Guide." To review some major points regarding snapshots:

A snapshot is a special object, an "intelligent buffer," whose data file contains data from the viewed portion of the source object and whose sole function is to display this view in or return data to a destination object.

The use of a snapshot to display a view eliminates the need to activate the source object of that view. Snapshots should be used in place of the source object when they are more efficient than activating the source object. This condition is generally true if the snapshot contains less data than the source object or involves loading less code than the source object.

When a source object that supports snapshots is asked to provide a new view for a destination object, that source object writes the data to be viewed to a snapshot. The snapshot then processes view messages sent by the destination object. Each time that the destination object requests to access that view, the view message is sent to the snapshot instead of to the source object itself.

Like the source object, the snapshot consists of both data (in this case the viewed data) and executable code.

Unlike the source object, the snapshot is called only by another application and is not directly accessible by the user. The use of a snapshot is invisible to the user.

The code to execute a snapshot is contained in an entity called a *Dynamic Access Library* (DAL). A DAL can be written for any source application that might benefit in terms of memory savings. Most OMF calls cannot be made from DAL code. Code in a snapshot DAL simply processes view and library messages from the source object, the destination object, or the OMF itself for the sole purpose of displaying a view or passing data from that view.

Objects such as snapshots that are executed by DALs are known as *dynamic access objects*. In this chapter, however, we refer to a dynamic access object as a snapshot. In cases where we need to distinguish DALs that support snapshots from DALs existing for some other purpose, we use the term *snapshot DALs*.

A snapshot DAL does not have to support all view messages supported by the view. If a snapshot DAL does not support a particular view message, the OMF passes that message on to the source object.

When processing a request for a view, the OMF checks the view specification to determine whether a view is displayed or otherwise managed by a snapshot. As is shown in Figure 2-8, "How Views Deal with Incoming Messages," in the "Programmer Guide," the OMF uses a special algorithm to determine where a view message should be delivered.

Chapter Organization  The first part of this chapter, Supporting a Snapshot from a Source Object, describes the code necessary to support a snapshot from the source object code. It includes the following sections:

Global Declarations in the Source Object - describes the declarations that must be made in a source application to support a snapshot.

Creating a Snapshot from a Source Object - describes the CreateSnapshot sample procedure, which is included in the source application to call a DAL to create a snapshot.

Updating a Snapshot from a Source Object - describes two ways of updating a snapshot after viewed data has been changed in the source object.

The second part of this chapter, Internal Code of a Snapshot DAL, describes code that must be included in the snapshot DAL itself. The following sections are included:

Methods to Support - lists the methods that a DAL must support.

Global Declarations in the DAL - lists some of the declarations that must be made at the beginning of the DAL code.

Setting up the Message Processing Procedure - describes the procedure to receive all messages to a DAL.

Processing the LIB_OBJ_INIT Message - describes a DAL procedure to initialize a snapshot.

Processing the LIB_USER_INIT Message - describes a DAL procedure to initiate a USER of a given snapshot.

Note  The term *USER* refers to the object accessing a snapshot, whether that entity is a source object or a destination object. Messages sent to a snapshot DAL can be triggered by requests from either of these objects. In such cases, the accessing object is referred to as the USER.

Processing the LIB_USER_TERMINATE Message - describes a DAL procedure to deactivate a USER of a given snapshot.

Processing the LIB_OBJ_TERMINATE Message - describes a DAL procedure to terminate a snapshot.

Processing the LIB_COPY_SELF Message - describes a procedure that enables an active snapshot to be copied as part of a destination object.

Processing an "Update File" Message - describes a DAL procedure to update the contents of a snapshot.

Processing the DISPLAY_VIEW Message - describes a DAL procedure to display viewed data assigned to a snapshot.

Supporting a Snapshot from a Source Object

This section details the global constants and data structures that must be defined in a source object supporting snapshots and describes sample procedures included in the source application to access a snapshot.

To support a snapshot a source application must include: a special set of global declarations; and procedures to create and update a snapshot.

Global Declarations in the Source Object

In a source application supporting snapshots a typical declaration of constants and data structures includes the following:

Code Example 6-1: Source Object Global Declarations

```
#define UPDATE_FILE      (OMF_USER+8)

#define  SnapShotOutOfDate   TRUE
#define  SnapShotIsCurrent   FALSE
#define  SendMsgToSnapshot   FALSE
```

The declarations are explained below:

```
#define UPDATE_FILE      (OMF_USER+8)
```

This declaration defines UPDATE_FILE, a private message which is defined by the application/snapshot developer. This particular private message can be sent directly to a snapshot to inform it to update its data file to provide a current view of source object information.

The application developer can define and send private messages to a snapshot for any type of action he wants the snapshot to perform. Independence is not a strong goal for private messages, since the developer knows exactly what kind of object the snapshot is.

```
#define  SnapShotOutOfDate   TRUE
#define  SnapShotIsCurrent   FALSE
#define  SendMsgToSnapshot   FALSE
```

These flags are used to inform the OMF of the status of a snapshot through the function call OMF_SetSnapshotState.

Code Example 6-2: CreateSnapShot

```
/********************************************************************/
/*                     CreateSnapshot                                */
/********************************************************************/
LONG PASCAL CreateSnapshot (lParam)    /* processes INIT_VIEW message */
LONG lParam;                           /* lParam of the message       */
{
BOOL              bStatus;
LPINITVIEWSTRUCT  lpView;
OBJECTNAME        dwDestination;
OBJECTNAME        dwRefName;

/* Get view parameters. */
lpView = (LPINITVIEWSTRUCT) GlobalLock ((HANDLE)(LOWORD (lParam)));
if (lpView == NULL) {
   return ((LONG)FALSE);
```

```
dwDestination = lpView->dwDestination;
dwRefName     = lpView->dwRefName;
GlobalUnlock ((HANDLE) LOWORD (lParam) );

/* Now init the view spec for the new view. */

/* Notice that the last parameter of the OMF_InitViewSpec is now   */
/* specified. This tells the OMF that a snapshot is to be created  */
/* and that szSnapClass is the name of the class of the snapshot.  */ bStatus = OMF_InitViewSpec (hOMF, dwDestination, dwRefName,
                            0, (LPSTR) NULL, 0, (LPSTR) szSnapClass);
if (bStatus) {

/* If we were successful about setting up the view spec, then use */
    /* UpdateDAL to initialize the snapshot's contents.               */ bStatus = UpdateDAL ();

/* If initialized snapshot, tell OMF it is ready to get messages. */ if (bStatus)

bStatus = OMF_SetSnapshotState (hOMF, 0,
                                       SnapShotIsCurrent,
                                       SendMsgToSnapshot);
} return((LONG)bStatus);

}
```

Creating a Snapshot from the Source Object

Creation of a snapshot is preceded by the creation of a view, as described in the Section called "Creating a View" in Chapter 5, Source Object View Processing.

In this chapter we are only considering the case where a new destination object has sent an INIT_VIEW message to the source object. While that message is processed, the OMF_InitViewSpec function is called. In order for the source to create a snapshot, nothing more is required than filling in the last parameter of the OMF_InitViewSpec function. This parameter is filled in with a long pointer to the name of the snapshot class, which is contained in the character array *szSnapClass*.

The CreateSnapshot sample procedure, below, shows how a source object creates a snapshot to manage a view. Note that for this example, we are using a data ID of zero.

We also use a *view class* of zero, which is required while the procedure is processing the INIT_VIEW message.

Immediate Snapshot Updating from the Source Object

When viewed data in a source object is changed, the snapshot for that view now contains out-of-date information. In this situation, the source object needs to inform its snapshot to update its data.

The source application can be programmed to either update the content of a snapshot immediately, before announcing data changes to the OMF, or afterwards, while it processes an UPDATE_SNAPSHOT message sent from the OMF.

If the source application is programmed to update the snapshot before announcing changes to the OMF, it calls a procedure like the sample UpdateNow. This procedure updates the snapshot contents by calling UpdateDAL and then announces to the OMF that new data is available.

Description

The UpdateNow procedure demonstrates code that updates a snapshot before telling the OMF to set the "new data marked" flag in the view specification. The source object should call this routine to inform its destination(s) that new data is available.

1. The procedure first updates the contents of the snapshot by calling the UpdateDAL sample procedure.

2. Then the procedure informs the OMF to update the the "new data marked" flag in all view specifications with the data ID for this range of viewed data and then tells the OMF to announce the new data to the destination object(s).

Code Example 6-3: UpdateNow

```
/******************************************************************/
/*                       UpdateNow                                */
/******************************************************************/

BOOL PASCAL UpdateNow ()
{
BOOL bStatus;

/* First, update the contents of the snapshot. */

/* This example assumes that the new data is in the global data */
/* structure GlobalData.                                         */ bStatus = UpdateDAL ( (LPSTR)&GlobalData );

/* If the snapshot was updated, inform the OMF to update views. */
if (bStatus) { bStatus = OMF_SetNewData (hOMF, 0);  /* only using data ID 0 */
   if (bStatus)
      bStatus = OMF_AnnounceNewData (hOMF);
   } return (bStatus);

}  /* End of UpdateNow Procedure */
```

The UpdateDAL Procedure

The following sample procedure UpdateDAL demonstrates code to update the contents of a snapshot. In this example, updating is performed by accessing the snapshot through OMF calls and sending the snapshot its new data.

1. Updating of the snapshot is performed by first getting the snapshot's PARAMETER name by calling OMF_GetSnapshot. This call is a required step since a source object is not allowed to keep snapshot names in its data files.

2. The procedure then activates the snapshot through the OMF_GetDALObject call.

3. The procedure then sends the snapshot the source application's private message, UPDATE_FILE, passing it the new data through the OMF_SendDALMsg call.

In this private message, the source object provides a long pointer to the new data. The format of the new data must be agreed upon by the snapshot DAL and the source object.

4. Once the snapshot has copied the new data to its own data file and returned, the procedure deactivates the snapshot by using the OMF_FreeDALObject function.

Code Example 6-4: UpdateDAL

```
/****************************************************************/
/*                       UpdateDAL                              */
/****************************************************************/

BOOL PASCAL UpdateDAL (lpNewData)    /* Updates contents of snapshot. */
LPSTR lpNewData;                     /* Ptr to new data to pass to   */
                                     /* the snapshot.                */

{
BOOL            bStatus;
OBJECTNAME      dwSnapshot;
HANDLE          hDAL;

/* Get name of snapshot so we can activate it. Note we are only */
/* using data ID 0 in this sample.                              */
dwSnapshot = OMF_GetSnapshot (hOMF, 0);
if (dwSnapshot != 0L) {

/* Now activate snapshot so we can send a message to it. */
    hDAL = OMF_GetDALObject (hOMF, dwSnapshot);
    if (hDAL != NULL) {

/* Send snapshot our private message passing it the new data. */

/* Note that it is safe to pass a long pointer as a parameter */
        /* to OMF_SendDALMsg (unlike OMF_Send and OMF_SendViewMsg)    */
        /* because the message does not cross an MS-Windows "task"    */
        /* boundary.                                                  */

OMF_SendDALMsg (hOMF, hDAL, UPDATE_FILE, (LONG)lpNewData);

bStatus = OMF_FreeDALObject (hOMF, hDAL);
    }
    else /* OMF_GetDALObject failed */
        bStatus = FALSE;
}
else /* OMF_GetSnapshot failed */
    bStatus = FALSE;

return (bStatus);

}  /* End of UpdateDAL Procedure */
```

Deferred Snapshot Updating from the Source Object

If data in a given view in the source object is changed, and the source application is programmed to defer updating of the snapshot, it first calls a procedure like the sample UpdateLater procedure.

This procedure sets the "snapshot out-of-date" and "new data announced" flags in the view specification for that view.

The next time the destination object calls the OMF_SendViewMsg function for that view, the OMF sends an UPDATE_SNAPSHOT message to the source object.

The source object should then call a procedure like the sample UpdateSnapshot to process that message. Then, within UpdateSnapshot, the UpdateDAL procedure is called to actually carry out the snapshot update.

The "snapshot out-of-date" flag is then cleared in the view specification for that view.

Note  If the source object defers updating the snapshot, it must update that snapshot when it receives a TERMINATE message. Otherwise, the OMF will have to re-activate the source object to send it an UPDATE_SNAPSHOT message the next time the destination object requests a display of data from the view.

The UpdateLater Procedure

The UpdateLater procedure demonstrates deferred updating of snapshots. The source object would call this routine each time it wanted to announce new data to its destination objects.

1. The procedure first tells the OMF that the snapshot is out-of-date by calling the OMF_Set SnapshotState function. The last parameter to this function tells the OMF that the source object wants to receive an UPDATE_SNAPSHOT message the next time the snapshot is needed by a destination object.

2. Then the procedure calls OMF_ SetNewData to set the "new data marked" flag for all views using the data ID of the range whose data changed (always zero in this example). Then OMF_AnnounceNewData is called to inform the destination object(s) that new data is available.

Code Example 6-5: UpdateLater

```
/***********************************************************/
/*                    UpdateLater                          */
/***********************************************************/

BOOL PASCAL UpdateLater ()
{
BOOL bStatus;

/* Inform OMF that snapshot is out-of-date and that we want to */
/* get an UPDATE_SNAPSHOT when the snapshot is next needed.    */ bStatus = OMF_SetSnapshotState (hOMF, 0, SnapShotOutOfDate,
                                        SendMsgToSnapshot);

/* If snapshot state set, inform the OMF to update views. */
if (bStatus) { bStatus = OMF_SetNewData (hOMF, 0);  /* only using data ID 0 */
   if (bStatus)
      bStatus = OMF_AnnounceNewData (hOMF);
   } return (bStatus);

} /* End of UpdateLater Procedure */
```

The UpdateSnapshot Procedure

The OMF sends an UPDATE_SNAPSHOT message to a source object when a view message is sent to a view that has its "snapshot out-of-date" flag set and its "want messages" flag clear in its view specification. The sample procedure UpdateSnapshot is called to process this message.

1. First the snapshot is updated by calling the UpdateDAL procedure, which was described earlier.

2. Then UpdateSnapshot calls OMF_SetSnapshotState to inform the OMF that the snapshot is up to date.

Code Example 6-6: UpdateSnapshot

```
/* Process the UPDATE_SNAPSHOT message in the procedure that */
/* processes messages from the OMF, i.e. MessageFromOMF.     */ case UPDATE_SNAPSHOT:

return (UpdateSnapshot ());

/***********************************************************/
/*                    UpdateSnapshot                       */
/***********************************************************/

LONG PASCAL UpdateSnapshot ()
{
BOOL bStatus;
```

```
/* Update the contents of the snapshot. */

/* This example assumes that the new data is in the global data */
/* structure GlobalData.                                         */ bStatus = UpdateDAL ( (LPSTR)&GlobalData );

/* If snapshot was updated, tell OMF to clear "out-of-date" flag. */
if (bStatus) {

/* Note this example only uses data ID zero. */
   bStatus = OMF_SetSnapshotState (hOMF, 0, SnapShotIsCurrent,
                                               SendMsgToSnapshot);
   } return ((long)bStatus);

} /* End of UpdateSnapshot Procedure */
```

Internal Code of a Snapshot DAL

The function of the internal DAL code is to process messages sent from the destination or source objects or the OMF.

A snapshot DAL must include procedures to initialize a snapshot; initiate a USER; terminate a snapshot; terminate a USER; copy an active snapshot; update a snapshot's contents, and display or return viewed data to the destination object.

---

Note  The term *USER* refers to the object accessing a snapshot, whether that entity is a source object or a destination object. Messages sent to a snapshot DAL can be triggered by requests from either of these objects. In such cases, the accessing object is referred to as the USER.

---

This section describes code for a sample snapshot DAL. It lists the methods to be supported, lists the global declarations needed, describes how to set up the main message processing procedure, and describes the sub-procedures for processing individual messages.

Methods to Support

List the following methods in the HAVE_METHODS section of the snapshot DAL's .IN$ file. Note that snapshot DALs do not have a HAS_METHOD section in their code.

DISPLAY_VIEW (required for a visual view)
   LIB_COPY_SELF
   LIB_OBJ_INIT
   LIB_USER_INIT
   LIB_USER_TERMINATE
   LIB_OBJ_TERMINATE The following methods are also suggested for visual views:

PRINT_SLAVE
   GET_SIZE

Global Declarations in the DAL

The following data structures, declared below, are used throughout this sample snapshot DAL:

Code Example 6-7: DAL Global Declarations

```
/* Define the private message that the source object sends the */
/* snapshot DAL to update its contents.                        */ define UPDATE_FILE    (OMF_USER+6)

/* Define the structure allocated at LIB_OBJ_INIT. All we will */
/* keep here is the name of the snapshot's data file, not any  */
/* of the actual data.                                         */ typedef struct {
   char FileName [MAXROOTFILENAMELENGTH+1];
} OBJDATASTRUCT;

typedef ObjData FAR *LPOBJDATASTRUCT;
```

Setting up the DAL Message Processing Procedure

All DALs must contain an EXPORTed entry point to process messages sent to snapshot. The actual name of the entry point does not matter; but the DAL's module DEF file must EXPORT the routine as ordinal entry point "@1". It is recommended that this be the only EXPORTed entry point for the DAL.

In the sample DAL code used in this chapter, the procedure to handle messages to the DAL is called DAL_MessageProc. This procedure is declared with the following syntax in the DAL code:

```
LONG FAR PASCAL
DAL_MessageProc(hObjData,hUserData,wMsg,lParam)
```

The parameters to the DAL_MessageProc declaration are explained as follows:

*hObjData*

This parameter is the handle returned by the snapshot DAL when it was sent the LIB_OBJ_INIT message for this snapshot. This parameter allows the DAL to determine which snapshot is receiving the message. If the message being received is LIB_OBJ_INIT, this parameter will be NULL.

*hUserData*

This parameter is the handle returned by the DAL when it was sent the LIB_USER_INIT message. This parameter allows the DAL to determine which USER of the snapshot is sending the message. If the message being received is LIB_USER_INIT, this parameter will be NULL.

*wMsg*

This parameter is the message type that the USER specifies in the OMF_SendDALMsg call.

*lParam*

This parameter is the lParam that the USER specifies in the OMF_SendDALMsg call. Interpretation of this value varies for different message types.

Code Example 6-8: DAL_MessageProc

The structure for the sample DAL_MessageProc procedure appears as follows:

```
/******************************************************************/
/*                    DAL_MessageProc                            */
/******************************************************************/
LONG FAR PASCAL DAL_MessageProc (hObjData, hUserData, wMsg, lParam)
HANDLE hObjData;
HANDLE hUserData;
WORD   wMsg;
LONG   lParam;
{ switch (wMsg) { case LIB_OBJ_INIT:

/* Passed a long pointer to name of snapshot data file. */
     return( (long)LibObjInit( (char FAR *)lParam ) );

case LIB_USER_INIT:

return( (long)LibUserInit( ) );

case LIB_USER_TERMINATE:

return( (long)LibUserTerminate( hUserData ) );

case LIB_OBJ_TERMINATE:

return( (long)LibObjTerminate( hObjData ) );
```

```
    return( (long)CopySelf() );

case UPDATE_FILE:  /* private message from source object */

/* Passed long pointer to new data for snapshot. */
    return( (long)LibUpdateFile( (LPSTR)lParam, hObjData );

case DISPLAY_VIEW:

return( (long)DisplayView( (HANDLE)LOWORD(lParam),
                                hObjData );

} /* End switch. */

} /* End DAL_MessageProc Procedure */
```

Descriptions of each of the seven individual message processing procedures that can be called from DAL_MessageProc follow. The procedures described are LibObjInit, LibUserInit, LibUserTerminate, LibObjTerminate, LibCopySelf, LibUpdateFile, and DisplayView.

Processing the LIB_OBJ_INIT Message

The LIB_OBJ_INIT message is processed by the LibObjInit sample procedure. This procedure enables a snapshot DAL to initialize its *hObjData* data structure.

The *hObjData* data structure allows the snapshot to maintain any common information about the snapshot. The snapshot data file name should always be part of this structure. In our example no other information is maintained.

LIB_OBJ_INIT is always the first message sent to a snapshot DAL for a given snapshot.

The LIB_OBJ_INIT message is sent by the OMF to the DAL when the first OMF_GetDALObject call is made from a source object or a OMF_GetView call is made from a destination object. This library message passes the root filename of the snapshot to the snapshot DAL.

No additional LIB_OBJ_INIT message for this particular snapshot is sent from the OMF until all OMF_GetDALObject calls in the source object, or all OMF_GetView calls in the destination object have been matched by an OMF_FreeDALObject and OMF_FreeView calls.

The following parameter values are passed with the LIB_OBJ_INIT message:

*hObjData* and *hUserData* - are both NULL on this message.

*lParam* - contains a long pointer to the root filename of the snapshot as a null-terminated string.

The snapshot DAL should return with a handle to its *hObjData* data structure in the LOWORD of its return value. All subsequent messages sent to this snapshot pass this handle in the *hObjData* parameter. NULL should be returned if an error occurs.

The returned handle can either be from LocalAlloc or GlobalAlloc. If GlobalAlloc is used, the GMEM_LOWER option must be used.

Code Example 6-9: LibObjInit

```
/******************************************************************/
/*                      LibObjInit                                */
/******************************************************************/

HANDLE PASCAL LibObjInit (lpRootFilename)  /* processes LIB_OBJ_INIT */
LPSTR  lpRootFileName;
{
HANDLE hObjData = NULL;            /* handle to application-defined
                                      data structure             */
LPOBJDATASTRUCT lpObjDataStruct;   /* long pointer to app-defined
```

```
/* Allocate Object Data Structure. */ hObjData = GlobalAlloc ( GMEM_ZEROINIT | GMEM_MOVEABLE | GMEM_LOWER,
                         (DWORD)sizeof(OBJDATASTRUCT) );
if (hObjData == NULL)
   return (NULL);

/* Lock Object Data Structure. */ lpObjDataStruct = (LPOBJDATASTRUCT)GlobalLock( hObjData );
if (lpObjDataStruct == NULL) {
   GlobalFree (hObjData);
   return (NULL);
   }

/* Save root file name.  Your snapshot may also initialize */
/* additional data in the Object Data Structure.           */ lstrcpy( (LPSTR)lpObjDataStruct->FileName, lpRootFilename );

/* Append application-specific filename extension. */ lstrcat( (LPSTR)lpObjDataStruct->FileName, (LPSTR)".EXT" );

GlobalUnlock (hObjData);

/* Return handle to Object Data Structure. */ return( hObjData );

} /* End LibObjInit Procedure */
```

Processing the LIB_USER_INIT Message

The LIB_USER_INIT message is processed by the DAL LibUserInit sample procedure. This procedure initiates a new USER for a given snapshot by adding that USER to the internal USER data structure of the snapshot (This data structure is used to maintain any information that is specific to a particular USER of the snapshot).

The LIB_USER_INIT message is sent to a snapshot by the OMF immediately after that snapshot has been initialized with a LIB_OBJ_INIT message. The purpose of the message in this instance is to initiate the first USER, whose call to the DAL initiated that snapshot.

Thereafter, any number of these messages can be sent to a snapshot as additional USERs access that snapshot. The snapshot receives a LIB_USER_INIT message each time another USER makes an OMF_GetDALObject call or OMF_GetView call to access the snapshot.

The following parameter values are passed with the LIB_USER_INIT message:

*hObjData* - is the handle returned by this snapshot when it received a LIB_OBJ_INIT message.

*hUserData* - is NULL.

*lParam* - is not used and is zero.

The snapshot should return a handle to its USER data structure in the LOWORD of its return value. All subsequent messages to this snapshot from the same USER pass this handle back to the snapshot DAL in the *hUserData* parameter. NULL should be returned if an error occurs. If the snapshot DAL does not maintain USER-specific data for the snapshot, -1 can be returned without causing an error.

The returned handle can either be from LocalAlloc or GlobalAlloc.

Code Example 6-10: LibUserInit

```
/*****************************************************************/
/*                      LibUserInit                             */
/*****************************************************************/

HANDLE PASCAL LibUserInit ( )           /* processes LIB_USER_INIT */
{

/* In this example, we have no USER-specific data to maintain, so */
/* we just need to return (HANDLE)(-1) from this message.         */ return ( (HANDLE)(-1) );

} /* End of LibObjInit Procedure */
```

Processing the LIB_USER_TERMINATE Message

The LIB_USER_TERMINATE message is processed by the LibUserTerminate sample procedure. This procedure deactivates a USER of a snapshot by deleting that USER from the snapshot's internal user data structure.

The LIB_USER_TERMINATE message is sent to a snapshot by the OMF to inform it that a USER of that snapshot has called OMF_FreeDalObject (or OMF_FreeView). This call means that the USER no longer wishes to send messages to the snapshot.

The following parameter values are passed with the LIB_USER_TERMINATE message:

*hObjData* - is the handle returned when this snapshot received the LIB_OBJ_INIT message.

*hUserData* - is the handle returned when this snapshot received the LIB_USER_INIT message.

*lParam* - is not used and is zero.

The snapshot should free the handle *hUserData* (if the DAL is maintaining USER-specific data for the snapshot). Any other USER-specific resources should be freed.

A non-zero value (TRUE) should be returned in the LOWORD of return value, unless there was an error, in which case zero should be returned.

Code Example 6-11: LibUserTerminate

```
/*****************************************************************/
/*                      LibUserTerminate                        */
/*****************************************************************/

BOOL PASCAL LibUserTerminate (hUserData)    /* processes
                                               LIB_USER_TERMINATE */
HANDLE hUserData;
{

/* Since we do not maintain any USER-specific information, we did */
/* not allocate an hUserData. Thus we don't have to free it. We   */
/* just need to return TRUE to indicate success.                  */ return (TRUE);

} /* End LibUserTerminate Procedure */
```

Processing the LIB_OBJ_TERMINATE Message

The LIB_OBJ_TERMINATE message is processed by the DAL LibObjTerminate sample procedure. This procedure terminates the snapshot receiving this message.

The LIB_OBJ_TERMINATE message is sent to a snapshot by the OMF when the last outstanding OMF_GetDALObject/OMF_GetView call is being freed with an OMF_FreeDALObject/OMF_FreeView call. In other words LIB_OBJ_TERMINATE is sent when the last USER of the snapshot has indicated that the snapshot should be deactivated.

Receiving the LIB_OBJ_TERMINATE message does not necessarily mean that a DAL that supports the terminated snapshot will be unloaded, since that DAL may also be supporting other snapshots. A DAL is unloaded by the OMF only after all snapshots supported by that DAL have been terminated.

LIB_OBJ_TERMINATE is the last message that a snapshot receives.

The following parameter values are passed with the LIB_OBJ_TERMINATE message:

*hObjData* - is the handle returned by the snapshot when it received the LIB_OBJ_INIT message.

*hUserData* - will be NULL.

*lParam* - is not used and will be zero.

The snapshot should free the handle *hObjData*. Any other resources for this snapshot should be freed.

A non-zero value (TRUE) should be returned in the LOWORD of the return value, unless there was an error, in which case zero should be returned.

Code Example 6-12: LibObjTerminate

```
/*********************************************************************/
/*                       LibObjTerminate                             */
/*********************************************************************/

BOOL PASCAL LibObjTerminate (hObjData)
HANDLE hObjData;
{

/* Return error if hObjdata is NULL. */
if ( !hObjData )
    return (FALSE);

/* Free the global memory associated with the Object Data Structure. */

GlobalFree (hObjData);

/* Indicate success. */ return (TRUE);

} /* End of LibObjTerminate Procedure */
```

Processing the LIB_COPY_SELF message

The LIB_COPY_SELF message is processed by the DAL CopySelf sample procedure. This procedure enables an active snapshot to be copied as part of a parent (destination) object.

The OMF sends the LIB_COPY_SELF message to any active snapshot that needs to be copied due to an OMF_Copy call.

The following parameter values are passed with the LIB_COPY_SELF message:

*hObjData* - is the handle to the object returned when it processed the LIB_OBJ_INIT message.

*hUserData* - is always NULL.

*lParam* - is a long pointer to the null-terminated root DOS file name of the copy of the snapshot that is being made. Extensions should not be appended directly to this string; a copy of the string must be made first.

While processing the LIB_COPY_SELF message, the snapshot should create new files using the destination root file name. The new files should represent the state of the snapshot as if the snapshot were inactive and its files were copied.

Alternatively, the snapshot can make sure its data files are up-to-date and return the CS_COPYFILES value from the LIB_COPY_SELF message. The OMF then copies the snapshot's data files. This is what our example does.

The snapshot should return one of the following values in the LOWORD of the message return value:

CS_ERROR - if some error occurred in the snapshot.
CS_DONE - if the snapshot has copied the data files successfully.
CS_COPYFILES - if the snapshot has updated its own files and wants the OMF to copy them.

Code Example 6-13: CopySelf

```
/****************************************************************/
/*                       CopySelf                               */
/****************************************************************/ int PASCAL CopySelf ()
{

/* Since our data file is always up-to-date, we can just return */
/* CS_COPYFILES without any additional work.                    */ return (CS_COPYFILES);

}
```

Processing an "Update File" message

Earlier in this chapter, the sample UpdateDAL procedure in the source object sent the private UPDATE_FILE message directly to a snapshot that needed updating. The *lParam* of this application-specific message was a long pointer to the snapshot's new data.

UPDATE_FILE in our sample source application code is a private message, defined in the global declarations section of the source object code (see Code Example 6-1) and the snapshot object's code. In this section, the UPDATE_FILE message is processed in the snapshot by the LibUpdateFile sample procedure.

Since the source object is using the OMF_GetDALObject, OMF_SendDALMsg, and OMF_FreeDALObject calls to access the snapshot directly, it may use the full *lParam* in OMF_SendDALMsg, and may pass long pointers because no task switch is involved.

Code Example 6-14: LibUpdateFile

```
/****************************************************************/
/*                      LibUpdateFile                           */
/****************************************************************/ int PASCAL LibUpdateFile (lpNewData, hObjData) /* processes
                                                  UPDATE_FILE    */
LPSTR  lpNewData;      /* long pointer to new data             */
HANDLE hObjData;       /* handle to Object Data Structure */
{
LPOBJDATASTRUCT lpObjDataStruct;   /* long ptr to app-specific
                                      Object Data Structure    */
OFSTRUCT ReOpenBuf;                /* buffer for using OpenFile */
int hSnapshotFile;                 /* handle to data file      */

/* Lock the Object Data Structure. */
lpObjDataStruct = (LPOBJDATASTRUCT)GlobalLock( hObjData );
if (lpObjDataStruct == NULL)
   return (FALSE);

/* Open the snapshot's data file. */
hSnapshotFile = OpenFile( (LPSTR)lpObjDataStruct->FileName,
                          (LPOFSTRUCT)&ReOpenBuf, OF_CREATE );
if (hSnapshotFile == -1) {
   GlobalUnlock (hObjData);
   return (FALSE);
   }

/* For this example, assume that the data is a null-terminated */
/* string, so we can use lstrlen to get the length of it.      */

/* Write the new data to the snapshot's data file. */
if ( !ldoswrite (hSnapshotFile, lpNewData, lstrlen (lpNewData)) ||
     AX_retrn != lstrlen (lpNewData) ) {
   dosclose (hSnapshotFile);
   GlobalUnlock (hNewData);
   return (FALSE);
   } dosclose (hSnapshotFile);

GlobalUnlock (hObjData);

return (TRUE);

}
```

Processing the DISPLAY_VIEW Message

The DISPLAY_VIEW message is processed by the sample DAL DisplayView procedure. This procedure enables a snapshot to display its data within a destination object.

The DISPLAY_VIEW message is sent to the view by a destination object by making an OMF_SendViewMsg call with the DISPLAY_VIEW message in its *wMsg* parameter.

The following parameter values are passed with the DISPLAY_VIEW message:

*hObjData* - is the handle returned when this snapshot received the LIB_OBJ_INIT message.

*hUserData* - is the handle returned when this snapshot received the LIB_USER_INIT message.

The LOWORD of *lParam* - is the handle to DISPLAYSTRUCT. This is the value that the destination object passed as *wParam* to OMF_SendViewMsg.

The snapshot should display itself within the destination's display context.

Code Example 6-15: DisplayView

```c
/***************************************************************/
/*                        DisplayView                           */
/***************************************************************/ int DisplayView (hDisplayStruct, hObjData)
HANDLE hDisplayStruct;
HANDLE hObjData;
{
LPDISPLAYSTRUCT  lpDisplay;
LPOBJDATASTRUCT  lpObjDataStruct;
HREGION          hRgn;
HDC              hTargetDC;
RECT             rWhole;
RECT             rPart;
DWORD            rgbBkColor;

/* Get the parameters passed by the destination object. */
lpDisplay = (LPDISPLAYSTRUCT)GlobalLock( hDisplay );
if (lpDisplay == NULL)
    return (FALSE);

hTargetDC   = lpDisplay->hDC;
rWhole      = lpDisplay->Whole;
rPart       = lpDipelay->Part;
rgbBkColor  = lpDisplay->rgbBkColor;

GlobalUnlock(hDisplay)

/* Lock the Object Data Structure. */
lpObjDataStruct = (LPOBJDATASTRUCT)GlobalLock( hObjData );
if (lpObjDataStruct == NULL)
    return (FALSE);

/* Prepare the DC for painting. The mapping_mode, x_origin,   */
/* y_origin, x_extent, and y_extent are all dependent on what */
/* kind of data you will be displaying.                       */

SaveDC (hTargetDC);
SetMapMode (hTargetDC, mapping_mode);
SetWindowOrg (hTargetDC, x_origin, y_origin);
SetWindowExt (hTargetDC, x_extent, y_extent);

/* Set background color, viewport, and clipping region based on */
/* the parameters passed by the destination.                    */

SetBkColor (hTargetDC, rgbBkColor);
SetViewportOrg (hTargetDC, rWhole.left, rWhole.top);
SetViewportExt (hTargetDC, hWhole.right - rWhole.left,
                           rWhole.bottom - rWhole.top );
hRgn = CreateRectRgn (rPart.left, rPart.top,
                      rPart.right, rPart.bottom);
SelectClipRgn (hTargetDC, hRgn);
DeleteObject (hRgn);

/* Since we don't keep any data except in the file, we need to open */
/* the file here, read the data, and display it in in whatever form */
/* is appropriate for your application. We call a procedure called  */
/* DisplayDataFile to do this. This example does not show that      */
/* procedure as it is application-dependent.                        */

DisplayDataFile (lpObjDataStruct->FileName, hTargetDC);

/* Clean up and return. */

RestoreDC (hTargetDC, -1);
GlobalUnlock (hObjData);

return (TRUE);

}
```

 Using the Clipboard

Overview of Clipboard Usage

This chapter describes the use of the Windows Clipboard in NewWave. NewWave enhancements to the Clipboard, and sample code included in applications to support these enhancements are described.

The Windows Clipboard

The Windows Clipboard is a temporary storage area to which data is moved in and from which data is moved out. It is a mechanism which enables the transfer of information from one part of an application to another part of the same application and sometimes from one application to another.

Within Windows, two commands, Cut and Copy, are used to place information on the Clipboard. One command, Paste, is used to retrieve information off the Clipboard.

To place information on the Clipboard, the user selects the information that is to be put onto the Clipboard, pulls down on the Edit menu, and selects the Cut or Copy command.

Once the selected information is on the Clipboard, the information can be inserted elsewhere by selecting the Paste command from the Edit Menu.

The NewWave Enhancements

Within the NewWave system, applications can also use the Clipboard as described above. In addition, NewWave provides OMF function calls to augment the uses of the Clipboard:

- In the NewWave environment, substantial amounts of Clipboard data can be conveniently stored in data files rather than in global memory.

- In the NewWave environment, a special Clipboard format (CFN_OBJECT) is provided to enable NewWave *user objects* to be placed on the Clipboard and transferred into another object (NewWave *system objects*, such as the Waste Basket, which may not be created, copied or destroyed, may not be placed on the Clipboard).

- In the NewWave environment, a *view* or *compound data* (non-view data containing a view) can be placed on the Clipboard and moved elsewhere.

- And in the NewWave environment, the Share command can be used in addition to the Cut and Copy commands to put objects or data on the Clipboard.

Chapter Organization

This chapter includes the following sections:

Windows Clipboard Background - reviews some points about the use of formats, global memory, and about promises to store data on the Windows Clipboard unenhanced by NewWave. Important points concerning the use of promises are noted.

OMF Clipboard Support - details some NewWave/OMF enhancements to the functionality of the Windows Clipboard, such as storing Clipboard data in temporary files, storing objects on the Clipboard, and storing compound data on the Clipboard.

Putting Objects and Views on the Clipboard - details the steps required to place an object or a view on the Clipboard.

Retrieving Objects and Views from the Clipboard - details the steps required to retrieve an object or a view from the Clipboard.

Note  This chapter does not cover using standard Windows Clipboard formats such as CF_TEXT, CF_DIF, and CF_METAFILEPICT. This chapter only encompasses the use of a new format, CFN_OBJECT, which allows NewWave objects to be placed onto the Clipboard.

Windows Clipboard Background

This section reviews some important points concerning the Windows Clipboard and lists some precautions to take when making promises on the Windows Clipboard.

Clipboard Formats

Logically, only one item can be stored on the Clipboard at a time; however, this one item can be stored in a variety of *formats*. For example a range of cells from a spreadsheet can be stored on the Clipboard in text, values-only, and formula formats.

Clipboard formats are identified with 16-bit WORD values. Some values are defined for standard Windows formats; another range of values is for display formats; another range of values is reserved for private formats.

It is recommended that all formats other than those pre-defined by Windows be registered with string identifiers. To avoid taxing system resources, these strings should be made as short as possible. Refer to Appendix B, "Building an HP NewWave Application" in "The HP NewWave Environment: Programmer Reference Manual" for conventions regarding Clipboard format names.

Windows Global Memory

Information on the Clipboard in its various formats is most commonly stored in memory from the Windows global heap. To put information on the Clipboard, an application allocates a block of global memory, stores the information in that memory, and gives the memory handle to Windows to put on the Clipboard.

Promised Data

For large amounts of data (more than a few kilobytes) the information may be "promised" to the Clipboard rather than actually stored in global memory. When the Windows SetClipboardData function is called by an application, it is given a NULL memory handle for the data. The effect of this assignment is that the application is promising to provide that format of data, if any object asks for it.

The following cautionary notes apply when making promises to the Windows Clipboard.

- The application which last called EmptyClipboard is always sent a WM_RENDERALLFORMATS when its window is being destroyed, whether it has any promised formats on the Clipboard or not. This means that an application must remember at all times which formats it has (or hasn't) promised.

- Although normally an application must call the Windows OpenClipboard function in order to call SetClipboardData, this is not true when processing a WM_RENDERFORMAT message. The application developer should be especially careful to not call the Windows CloseClipboard function while processing WM_RENDERFORMAT as this can cause serious problems. On the other hand, OpenClipboard and CloseClipboard must be used to call SetClipboardData while processing WM_RENDERALLFORMATS.

- If the Clipboard owner does not call SetClipboardData when it receives a WM_RENDERFORMAT message, the GetClipboardData call which triggered the message returns NULL. However, the format is still remembered as being promised, and another call to GetClipboardData results in another WM_RENDERFORMAT message being sent.

- If the Clipboard owner does not call SetClipboardData when it receives a WM_RENDERALLFORMATS message, Windows removes any still promised formats from the Clipboard entirely (i.e., the Windows EnumClipboardFormats function does not return those formats, and the GetClipboardData function on them returns NULL).

- The WM_RENDERFORMAT message is always sent to the Clipboard owner, regardless of who actually called SetClipboardData to make the promise. For this reason, only the last caller of the Windows EmptyClipboard function can put promises on the Clipboard.

Because all promised formats must be rendered when the application is closed, it is recommended that if the information is very substantial, the data be stored in a file (using the OMF support described in the next section). Of course, this recommendation can only be used with NewWave specific formats. For Windows defined formats, promises are the only method of storing substantial amounts of data on the Clipboard.

Caution  If you do not destroy your window until receiving the OMF DIE_PLEASE message and want to process WM_RENDERALLFORMATS, you cannot make any OMF or API calls at that time. If this is a problem in your application, do your DestroyWindow while processing TERMINATE, or honor your promises while processing TERMINATE and ignore WM_RENDERALLFORMATS.

OMF Clipboard Support

This section covers NewWave OMF function calls and structures to enhance the Windows Clipboard.

OMF function calls enhance the operation of the Clipboard in three ways: they support storing Clipboard information in a temporary file rather than in global memory; they support placing references to OMF objects on the Clipboard; and they support placing compound data on the Clipboard.

Clipboard Data in Temporary Files

Storing Clipboard information in temporary data files provides an alternative method to promises for handling substantial amounts of information on the Clipboard.

Naming Temporary Clipboard Data Files

NewWave applications create temporary Clipboard data file names by calling the OMF_GetOMFDirectory function to get the pathname of the OMF system directory and appending OMF_CLIPBOARD_FILENAME ("HPOMFCLP") to that pathname. The application developer can optionally append a period (".") followed by a 1 to 3 letter extension.

Some global memory data must still be associated with each file-based format on the Windows Clipboard; otherwise, Windows assumes a promise is on the Clipboard. One useful technique is to have the global data contain a flag indicating whether the real Clipboard data is in the global memory block, or in a corresponding temporary file.

Recovering Disk Space

Even without special OMF function calls, Clipboard information can be stored in a temporary file. The one problem with doing so is recovering the disk space.

As long as the Clipboard owner (i.e., the last application to call EmptyClipboard) is still running, it receives a WM_DESTROYCLIPBOARD message when the Windows EmptyClipboard function is called next. The application could then delete the temporary Clipboard data file.

After the Clipboard owner is closed, however, no WM_DESTROYCLIPBOARD message is sent. It is generally not reasonable for an application to delete the temporary Clipboard data file when that application is being closed, and of course the closed application can't delete the data file afterwards.

The solution to the above problem is to let the OMF take care of deleting the data file when the Clipboard is emptied. Whenever a NewWave application calls the Windows EmptyClipboard function, it also calls the OMF_EmptyOMFClipboard function.

The OMF_EmptyOMFClipboard function deletes all files matching the wildcard "HPOMFCLP.*" on the OMF system directory. In addition, OMF internally calls the OMF_EmptyOMFClipboard function on system shutdown or crash recovery.

The only drawback to the methods mentioned above is that if a non-NewWave application or a dialog box empties the Clipboard, the OMF does not know of this action, and disk space used by the temporary data file will not be recovered until sometime later.

Disk recovery in this situation can be improved if NewWave applications call OMF_EmptyOMFClipboard when they receive the WM_DESTROYCLIPBOARD message; however, this call is optional.

Objects on the Clipboard

One of the more important features of New Wave is that the same commands used to transfer data within objects are also used for entire objects. Thus, an object can be Cut, Copied, or Shared by selecting its icon from the NewWave Office or a folder, and giving the appropriate command.

Putting an Object on the Clipboard

The most straightforward way to put an object on the Clipboard is to put a PARAMETER scope name of the object in the data structure on the Windows Clipboard.

A parameter name must be used since a parameter name is the only name that references the same object regardless of who uses it. There is an important restriction on parameter names, though. A parameter name is only reliable so long as it is certain that the object that the name refers to is not destroyed.

For most purposes, parameter names are obtained, then immediately used and forgotten, so ensuring the object's preservation isn't a problem; but it is possible for data to stay on the Clipboard long enough for the object to which the parameter name refers to be destroyed.

The solution to the above problem is to use the NewWave *OMF_CLIPBOARD* object. The OMF_CLIPBOARD is a global object built into the OMF (and invisible to the end-user). Since an object can only be destroyed if it has no link to another object, you can guarantee the preservation of the object to which the parameter name refers by linking it to the OMF_CLIPBOARD.

Using the OMF_CLIPBOARD

The OMF_PutOnOMFClipboard function is provided to place a link on the OMF_CLIPBOARD. Placing a link to an object on the OMF_CLIPBOARD causes a PERSISTENT reference name from the OMF_CLIPBOARD to be defined to a specific object.

If a DATALINK reference name is needed (i.e., there is a view specification to be maintained), the OMF_PutViewOnOMFClipboard function should be used. The OMF_InitViewSpec or the OMF_CopyViewSpec function can then be used to initiate the view specification of the new link.

The OMF_EmptyOMFClipboard function deletes all references from OMF_CLIPBOARD to other objects. The OMF internally calls OMF_EmptyOMFClipboard on system shutdown and crash recovery.

Using the CFN_OBJECT Clipboard Format

NewWave provides a publicly known Clipboard format that is used when the Clipboard contains objects. The string registered name for this format, "NW-Objects", is defined as CFN_OBJECT in the NWOMF.H file.

This format is used and accepted by many different NewWave applications when putting data on or reading data from the Clipboard. This format enables an icon to be Cut from a folder and Pasted into a document, and the resulting view representation to be Cut from the document and Pasted back into the folder.

The CFN_OBJECT data structure placed on the Windows Clipboard is defined as follows in the NWOMF.H file provided by NewWave:

```
/***************************************************************
      Structures and defines for accessing Clipboard.
***************************************************************/

/* string names for registered formats */ define CFN_OBJECT      "NW-Objects"

/* header for global memory structure */ typedef struct {
    WORD  wFlags;
    int   nObjects;
    } CB_OBJECT_HEADER;

/* flags */ define CB_CUT          0x0001    /* only 1 of CUT, COPY, and */
define CB_COPY         0x0002    /*    SHARE can be set or   */
#define CB_SHARE        0x0004    /*    result is unpredictable */
define CB_BEENPASTED   0x0008 typedef struct {            /* for each object on the Clipboard... */
    OBJECTNAME  dwParmName;     /* Parameter name */
    OBJECTNAME  dwWBName;       /* Waste Basket name; only for Cut */
    OBJECTNAME  dwCBName;       /* Clipboard name */
    } CB_OBJECT_NAMES;

typedef struct {            /* overall global memory structure */
    CB_OBJECT_HEADER  Header;
    CB_OBJECT_NAMES   List [1];     /* may be more then one... */
    } CB_OBJECT_STRUCT;

/* macro for computing size of the global memory block */ define SIZEOF_CB_OBJECT_STRUCT(nObjects)           \
     (sizeof(CB_OBJECT_HEADER) + nObjects * sizeof(CB_OBJECT_NAMES))

/***************************************************************/
```

In the above file, the header of the global memory structure tells how many objects are on the Clipboard, whether those objects have been Cut, Copied or Shared onto the Clipboard, and whether those objects have been Pasted. Most objects should only allow Paste if *nObjects* is 1.

For each object that is on the Clipboard, there are three names in the data structure: its parameter name, its reference name from the Waste Basket (only used for Cut operations) and its reference name from the OMF_CLIPBOARD.

Limitations on Promising Objects

There is an important limitation when it comes to promising a CFN_OBJECT format (or other formats containing objects) to the Windows Clipboard. Promising is only allowable when the object being placed on the Clipboard does not yet exist but will be newly created if its format is requested.

For example, when a paragraph is Copied from a document object to the Clipboard, one of the formats offered might be a document containing only the selected paragraph.

The CFN_OBJECT format would be used so the new document could be Pasted on the NewWave Office or in a folder. In this case, the format could be promised and the new document object would not actually be created unless the format was requested (via WM_RENDERFORMAT or WM_RENDERALLFORMATS).

Limitations on Additional Object Formats

The above example of Copying a paragraph in a document illustrates another limitation involving objects on the Clipboard: No more than one format can contain references to objects; however, any number of "just data" formats (i.e., formats not containing references to objects) can be offered in addition to the format containing objects.

Thus, when the application copies paragraphs to the Clipboard, it offers a new document in CFN_OBJECT format, and it also offers several "just data" formats, including a document internal data structure (format, fonts and plain text).

Note that this restriction does not imply that only one object can be on the Clipboard: the CFN_OBJECT format can support multiple objects, but those objects are all referenced in one format.

Neither does the above restriction imply that the CFN_OBJECT format is the only format that can contain an object. Developers are free to define their own application specific formats (however, developers must be careful to match the functionality of the CFN_OBJECT format).

Compound Data on the Clipboard

*Compound data* is data that contains viewed data embedded within it. For example, in a text application, selecting a page of text that contains within it a figure from another object and then selecting the Cut command puts compound data on the Clipboard.

Compound data is handled by combining the techniques for putting data and objects on the Clipboard. The data can be either provided as a global memory block or as a file.

Because correct implementation of Cut, Copy, and Share of compound data requires the same information defined for the CFN_OBJECT format, it is recommended that the same data structure (CB_OBJECT_STRUCT) that was defined previously in the NWOMF.H file be used.

However, in the case of compound data, that data structure should be included on the Clipboard as part of a private object format rather than as the CFN_OBJECT format.

The source object(s) of the embedded view(s) must be made children of the OMF_CLIPBOARD so that the parameter names of these objects remain valid.

To carry out this task, the current object (the object doing the Cutting, Copying, or Sharing) calls the OMF_PutViewOnOMFClipboard function. To put the view specification of the embedded view on the Clipboard, the current object calls the OMF_CopyViewSpec function.

The OMF_CLIPBOARD's reference name for the view is placed in the private format's data structure along with the source object's parameter name (and the Waste Basket's reference name if the compound data has been Cut to the Clipboard).

Even if the data (the non-view) portion of the compound data is put in a temporary file, the private format's data structure, referencing the embedded view(s), must be in global memory. Placement of the private format's data structure in global memory is necessary because its contents need to be changed by the application which Pastes from it (this is explained in more detail below). The temporary data file can contain indexes into the private format's data structure describing the embedded views to indicate which embedded view goes where.

Putting Only the Embedded View on the Clipboard

A special case occurs when the user selects and Cuts, Copies, or Shares an embedded view to the Clipboard without including any of the surrounding non-view data.

In this case the CFN_OBJECT format is used on the Clipboard to place the embedded view on the OMF_CLIPBOARD. The source object of that view can then be Pasted to the NewWave Office or a folder. The current application should also put a private data format on the Clipboard to accomodate other information, such as display specifications. This private data format does not contain the CB_OBJECT_STRUCT data structure that describes the embedded view.

For example, if the embedded view is a figure in a document, the private data format might contain information such as the size of the figure. The private data format should not contain explicit references to the source object of the view.

Putting Objects and Views on the Clipboard

This section provides examples of code for placing objects or views on the Clipboard. Objects or views can be placed on the Clipboard by selecting one of those items and then selecting the Cut, Copy, or Share command.

When a user selects the Cut, Copy, Share or Paste command, a menu selection number is sent to the application along with the appropriate message. The application's action processor receives this message and generates a command.

The command processor then acts on the command.

Please note that in the examples that follow, the Cut, Copy, Share and Paste commands are handled by setting the message to an API command within the application's action processor and calling the application's command processor.

The examples within this section of the manual use the commands, API_CUT_CDCMD, API_COPY_CDCMD, API_SHARE_CDCMD, and API_PASTE_CDCMD, which are defined in the NWAPI.H file.

Putting Objects on the Clipboard - Examples

In this section, we discuss placing an object on the Clipboard. The code included here illustrates how a container object such as a folder puts objects on the Clipboard.

The discussion on how to place a *view* of an object on the Clipboard is in the next section.

An object is first selected within the container object and the container object's Cut, Copy, or Share command is selected.

- If the Cut command is selected, the API_CUT_CDCMD command is sent to the container object's command processor. The container puts the selected object on the Clipboard, deletes it from the container, and also places that object in the Waste Basket (as a safety measure).

- If the Copy command is selected, the API_COPY_CDCMD command is sent to the container object's command processor. The container makes a copy of the selected object and places it on the Clipboard – nothing is deleted or put in the Waste Basket.

- If the Share command is selected, an API_SHARE_CDCMD command is sent to the container object's command processor. The container object then puts a reference to the selected object on the Clipboard.

Processing the Cut, Copy, and Share Commands

The sample AddToClipboard procedure, below, is called in the container object's application to process the commands mentioned above:

1. The procedure prepares the Clipboard to place the object on it. First it opens the Clipboard and empties any previous data from the Clipboard using the function calls OpenClipboard, EmptyClipboard and OMF_EmptyOMFClipboard.

2. The procedure places a reference name to the selected object on OMF_CLIPBOARD using the OMF_PutOnOMFClipboard function. This function returns a reference name for the link from the OMF_CLIPBOARD to the selected object. Remember that this action only places a reference to the selected object (or a link), not the selected object itself.

3. If processing a Cut command, the procedure must also place the selected object in the Waste Basket. This action is carried out by calling the OMF_AddChildTo function. This function basically places the selected object into the the Waste Basket. This function returns a reference name (PERSISTENT) of the Waste Basket's new link to the selected object.

4. The procedure allocates and initializes a CB_OBJECT_STRUCT data structure with information that describes the selected object. The parameter name of the selected object is put into this data structure by calling the OMF_MakeObjParam function. After all the necessary information is set up in this structure, the procedure unlocks the handle to the memory.

5. The procedure registers the format that is to be used on the Clipboard by calling the Windows function RegisterClipboardFormat. The string used to register the format is CFN_OBJECT.

6. Once the above steps have been carried out, the handle of the data structure must be placed in the Windows Clipboard. The procedure calls the Windows SetClipboardData function to do this. At this point, the Clipboard is now the "owner" of the global memory. The Clipboard assigns a new handle to this memory, and the original handle to the memory is no longer valid.

7. The procedure closes the Clipboard with the Windows CloseClipboard function.

Code Example 7-1: AddToClipboard (for Objects)

```
/* Process the following messages in your command processor. */
/* Assume that oObject contains the reference name of the    */
/* selected object.                                          */ case API_SHARE_CDCMD:
    /* Share the currently selected object to the Clipboard. */
    AddToClipboard (oObject, CB_SHARE);
    break;

case API_CUT_CDCMD:
    /* Add the currently selected object to the Clipboard and delete. */
    AddToClipboard (oObject, CB_CUT);
    if (IOMF_Assign (ghOMF, oObject, NULLOBJECT))
        NoteOMFError (ghOMF);

/* YOUR CODE HERE would remove the object from the display
       and data structures. */ break;

case API_COPY_CDCMD:
    /* Copy the currently selected object to the Clipboard. */
    /* Assume that oTemp is some reference name that we do  */
    /* not use normally. We must have crash-recovery code   */
    /* that deletes this name at startup, or handle errors  */
    /* from the copy call by deleting and retrying.         */
    if (IOMF_Copy (ghOMF, oTemp, oObject, 0)) {
        NoteOMFError (ghOMF);
        break;
    }
    AddToClipboard (oTemp, CB_COPY);
    if (IOMF_Assign (ghOMF, oTemp, NULLOBJECT))
        NoteOMFError (ghOMF);
    break;

/**************************************************************/
/*                      AddToClipboard                        */
/*                                                            */
/* Add the given object to the Clipboard. For CUT, also add to Waste Basket. */
/**************************************************************/

VOID PASCAL AddToClipboard(oObject, wFlags)
OBJECTNAME      oObject;
WORD            wFlags;
{
    OBJECTNAME  oCBName, oWBName;
    HANDLE      hMem;
    CB_OBJECT_STRUCT FAR * lpCBObject;
    WORD        wFormat;
```

```
if (!OpenClipboard (ghWnd)) {
   NoteError (ERR_CLIPBOARD);
   return;
   } if (!OMF_EmptyOMFClipboard (ghOMF)) {
   NoteOMFError (ghOMF);
   CloseClipboard ();
   return;
   } if (!EmptyClipboard ()) {
   NoteError (ERR_CLIPBOARD);
   CloseClipboard ();
   return;
   }
oCBName = OMF_PutOnOMFClipboard (ghOMF, oObject);
if (oCBName == NULLOBJECT) {
   NoteOMFError (ghOMF);
   CloseClipboard ();
   return;
   }
if (wFlags == CB_CUT) {
   oWBName = OMF_AddChildTo (ghOMF, WASTEBASKET, oObject);
   if (oWBName == NULLOBJECT)
      NoteOMFError (ghOMF);
   }
else
   oWBName = NULLOBJECT;

/* Allocate global memory for ONE object. */
hMem = GlobalAlloc (GMEM_MOVEABLE, (DWORD)SIZEOF_CB_OBJECT_STRUCT(1));
if (hMem == NULL) {
   NoteError (ERR_MEMORY);
   CloseClipboard ();
   return;
   }
lpCBObject = (CB_OBJECT_STRUCT FAR *)GlobalLock (hMem);
if (lpCBObject == NULL) {
   NoteError (ERR_MEMORY);
   GlobalFree (hMem);
   CloseClipboard ();
   return;
   }
lpCBObject->Header.wFlags = wFlags;
lpCBObject->Header.nObjects = 1;

lpCBObject->List[0].dwParmName = OMF_MakeObjParam (ghOMF, oObject);
if (lpCBObject->List[0].dwParmName == 0L) {
   NoteOMFError (ghOMF);
   GlobalUnlock (hMem);
   GlobalFree (hMem);
   CloseClipboard ();
   return;
   }
lpCBObject->List[0].dwWBName = oWBName;
lpCBObject->List[0].dwCBName = oCBName;

GlobalUnlock (hMem);

wFormat = RegisterClipboardFormat (CFN_OBJECT);
if (wFormat == 0) {
   NoteError (ERR_CLIPBOARD);
   GlobalFree (hMem);
   CloseClipboard ();
   return;
   }
SetClipboardData (wFormat, hMem);    /* No need to free this memory */ if (!CloseClipboard ())
   NoteError (ERR_CLIPBOARD);

} /* End AddToClipboard */
```

Putting a View on the Clipboard - Example

Within data objects such as a document, child objects are generally included as views. The user may place a view of an object on the Clipboard with the same options of Cut, Copy, and Share that he or she has when putting an object on the Clipboard.

Therefore, like the container object in the preceding section, the data object still receives the API_CUT_CDCMD, API_COPY_CDCMD, and the API_SHARE_CDCMD commands. The data object's command processor checks for these messages in the same manner as described for container objects. The only differences are with the AddToClipboard procedure.

If the selected data is more than just a single view (i.e., includes some non-view data), and the user has selected the Share command, the object containing the selected data may then create a new view (refer to Chapter 5, "Source Object View Processing").

If the selected data is more than a single view, and the user has selected the Cut or Copy command, the object containing the selected data should put one or more private data formats on the Clipboard.

If the selected data is only a single view, the object containing the view should put the view on the Clipboard using the CFN_OBJECT format. This case is the only case handled by Code Example 7-2, below. Refer to the previous section, "Putting Only the Embedded View on the Clipboard," for more information.

Note 

The sample HPLAYOUT application, on which the examples in this chapter are based, only contains embedded views and not any data of its own. For this reason, some of the complexities of dealing with compound data are not illustrated.

The code example below demonstrates how to put a view on the Clipboard.

Code Example 7-2: AddToClipboard (for Views)

In the command processor of the object containing the selected view(s), the Cut, Copy, and Share commands are handled the same as in Code Example 7-1; however, the Cut command must deactivate the embedded view(s) before the link(s) between the source object(s) and the object containing the view(s) can be deleted.

The AddToClipboard procedure is the same as before except that instead of calling OMF_PutOnOMFClipboard it calls the following:

```
...
/* OMF_PutViewOnOMFClipboard places an object on the Clipboard   */
/* with a DATALINK reference name, so that the view spec can be  */
/* copied or initialized for that link.  ghOMF is the handle     */
/* that was returned by OMF_Init.  oObject is the reference      */
/* name of the selected object to be put on the Clipboard.       */ oCBName = OMF_PutViewOnOMFClipboard (ghOMF, oObject);
if (oCBName == NULLOBJECT) {
   NoteOMFError (ghOMF);
   CloseClipboard ();
   return;
}

/* The OMF_CopyViewSpec copies the view specifications of one    */
/* view to another view.  OMF_CLIPBOARD is the destination object*/
/* that will receive the view.  oCBName specifies the source     */
/* object of the link receiving the view specification.  SELF is */
/* destination object of the view whose specification is to be   */
/* copied, and oObject is the reference name that SELF has for   */
/* the source object of the view whose spec is being copied.     */
```

```
if (!OMF_CopyViewSpec (ghOMF, OMF_CLIPBOARD, oCBName, SELF, oObject)) {
    NoteOMFError (ghOMF);
    CloseClipboard ();
    return;
}
...
```

Once the calls in the above example are made, the object containing the selected view adds the source object of the selected view to the Waste Basket if a Cut was performed, allocates and initializes the CB_OBJECT_STRUCT data structure with information that describes the view and its source object, registers the CNF_OBJECT data format with the Windows Clipboard, and puts the structure on the Windows Clipboard.

All these steps are the same as when an object is put on the Clipboard.

Retrieving an Object or View from the Clipboard

Once an object or view is on the Clipboard, it may then be transferred to another object. This is referred to as Pasting. Pasting is handled differently depending on which method was used for placing the object or view on the Clipboard, whether this is the first Paste or not, and whether the Pasting object is a container or compound object.

As mentioned earlier, a NewWave object may Paste objects or views from the Clipboard. It is the Pasting object's responsibility to determine if it wants to Paste a view or a simple link to the object referenced by the Clipboard.

Not all objects can Paste a view. A container object, such as a folder, is an example of an object which may only Paste simple links. Therefore, if a folder retrieves an object off the Clipboard (the Clipboard data must be of the format CFN_OBJECT), it retrieves that object as a simple link – not a view of the object.

Retrieving an Object from the Clipboard - Example

In this section we examine retrieving an object which is on the Clipboard (it may or may not have a view specification) into a Pasting object which only supports simple links.

- If the object on the Clipboard has been placed there with a Cut command, the Paste process is handled as follows:

The Pasting object must get the object from the Clipboard and include that object within itself.

The Pasting object must also delete the object referenced by the Clipboard from the Waste Basket if this is the first Paste of that object.

- If the object on the Clipboard has been placed there with a Copy command, the Paste command is processed as follows:

The Pasting object must get the object referenced by the Clipboard. If this is the first Paste of that object, that object is included in the Pasting object.

However, if this is not the first Paste of the object referenced by the Clipboard, the Pasting object makes a copy of the object on the Clipboard, removes the original object from the Clipboard, and then places the copy of that object back on the Clipboard. The copy is then included in the Pasting object.

The Pasting object does not have to make a copy the first time that the Paste is done because a copy was created by the application that placed the object on the Clipboard.

- If the object on the Clipboard has been placed there with a Share command, the Paste command is handled as follows:

The object reference on the Clipboard is retrieved from the Clipboard and included in the Pasting application. In this case nothing is removed from the Clipboard and no copies are made of the object referenced by the Clipboard.

In the Pasting application, the command processor and the sample GetObjFromClipboard procedure carry out the following steps to retrieve an object from the Clipboard:

1. First, the command processor opens the Clipboard so that it can retrieve the information by calling the Windows OpenClipboard function.

2. With the Clipboard open, the command processor determines if there is information on the Clipboard in the appropriate CFN_OBJECT format. After the command processor checks the above criterion, it can retrieve the data, in this case the object from the Clipboard, by calling the GetObjFromClipboard procedure.

3. The GetObjFromClipboard procedure calls the GetClipboardData function to retrieve a handle of the data structure on the Windows Clipboard.

4. The procedure checks if the object was put on the Clipboard with a Copy command. If a Copy command was used and the object has already been Pasted once, the procedure makes a copy of the object on the Clipboard.

This copy is then placed in the Pasting object. The object is copied, and the copy is placed into the Pasting object with the OMF_Assign and OMF_Copy functions.

If the Copy command was not used or this is the first Paste, the Pasting object simply includes the object that is on the Clipboard. This step is carried out by calling the OMF_Assign function.

5. If the object on the Clipboard was placed there with the Cut command and this is the first Paste, the procedure calls the OMF_RemoveChildFrom function to delete that object from the Waste Basket (remember that in the case of a Cut command, the Cutting application places the selected object in the Waste Basket as well as on the Clipboard).

6. If the object on the Clipboard was placed there with the Copy command and this is not the first Paste, the procedure must place the copy made in step 4 on the Clipboard.

If the original object on the Clipboard includes a view, the copy is put on the Clipboard with the OMF_PutViewOnOMFClipboard function and the original view specification is copied to this new view using the OMF_CopyViewSpec function; otherwise, the copy is put on the Clipboard with the OMF_PutOnOMFClipboard function.

Finally, the original is removed from the Clipboard, and the data structure on the Windows Clipboard is updated to reference the copy.

Code Example 7-3: GetObjFromClipboard (for Objects)

```
/* In the command processor of the Pasting application add this case
   to handle the PASTE command: */ case API_PASTE_CDCMD:
    if (!OpenClipboard (hWnd)) {
       NoteError (ERR_CLIPBOARD);
       break;
    }
```

```c
/* Is there an object on the Clipboard? */
wFormat = RegisterClipboardFormat (CFM_OBJECT);
if (wFormat == 0) {
   NoteError (ERR_CLIPBOARD);
   CloseClipboard ();
   break;
   } if (!IsClipboardFormatAvailable (wFormat)) {
   CloseClipboard ();
   /* Note error here - no object available. */
   break;
   }

/* Get the object from Clipboard */
if (!GetObjFromClipboard (goNextObjectRef, wFormat)) {
   CloseClipboard ();
   break;
   }

CloseClipboard ();

/* Object has been pasted from Clipboard. */

/* YOUR CODE HERE should add the reference goNextObjectRef */
/* to your data structures and display.                    */

/* Increment for next object. */
goNextObjectRef++;

break; /* End API_PASTE_CDCMD */

/************************************************************/
/*                    GetObjFromClipboard                   */
/*                                                           */
/* Get object from the Clipboard. If object is a copy already pasted, copy */
/* the object. Copy the view spec if one exists, otherwise create a new    */
/* view. If cut and not pasted before, remove object from Waste Basket.    */
/************************************************************/

BOOL PASCAL GetObjFromClipboard (oObject, wFormat)
OBJECTNAME    oObject;
WORD          wFormat;
{
   HANDLE            hMem;
   CB_OBJECT_STRUCT FAR * lpCBObject;
   WORD FAR *        lpFlags;
   OBJECTNAME        oTemp;

hMem = GetClipboardData (wFormat);
   if (hMem == NULL) {
      NoteError (ERR_CLIPBOARD);
      return (FALSE);
      } lpCBObject = (CB_OBJECT_STRUCT FAR *)GlobalLock( hMem );
   if (lpCBObject == NULL) {
      NoteError (ERR_MEMORY);
      return (FALSE);
      }

/* Only accept ONE object, if more, then this is an error. */
   /* This is only true for this example - some applications  */
   /* allow pasting of multiple objects.                      */ if (lpCBObject->Header.nObjects != 1) {
      ErrorMsg (IDS_MULTIPLEOBJ, ERR_CLIPBOARD, 0, FALSE);
      GlobalUnlock (hMem);
      return (FALSE);
      } lpFlags = &lpCBObject->Header.wFlags;

/* Take copy of object if it is a copy already pasted. */
   if ((*lpFlags & CB_COPY) && (*lpFlags & CB_BEENPASTED)) { oTemp = 0x0FFFFFFF;
```

```
      if (!OMF_Assign (ghOMF, oTemp, lpCBObject->List[0].dwParmName)) {
         NoteOMFError (ghOMF);
         GlobalUnlock (hMem);
         return (FALSE);
      } if (!OMF_Copy (ghOMF, oObject, oTemp, 0)) {
         NoteOMFError (ghOMF);
         OMF_Assign (ghOMF, oTemp, NULLOBJECT);
         GlobalUnlock (hMem);
         return (FALSE);
      } if (!OMF_Assign (ghOMF, oTemp, NULLOBJECT))
         NoteOMFError (ghOMF);
   } else {    /* Do not need to make a copy. */ if (!OMF_Assign (ghOMF, oObject, lpCBObject->List[0].dwParmName)) {
         NoteOMFError (ghOMF);
         GlobalUnlock (hMem);
         return (FALSE);
      }
   }

/******* Note 1 (see next section) *****************************************/

/* If Cut and first paste, remove from Waste Basket. */
   if ( (*lpFlags & CB_CUT) && !(*lpFlags & CB_BEENPASTED) ) {
      /* Do not care if an error occurs, as user may have deleted item */
      OMF_RemoveChildFrom (ghOMF, WASTEBASKET, lpCBObject->List[0].dwWBName);
   }
   /* If a Copy and not first paste, put copy back on the Clipboard, and  */
   /* remove the object that was there.  Thus the object on the clipboard */
   /* is always the result of the most recent copy.                       */ if ( (*lpFlags & CB_COPY) && (*lpFlags & CB_BEENPASTED) ) {

/* If have a view on the clipboard, put copy on as a view as well, */
      /* and copy the original view spec to the new view.                */ if (SCOPEOF(lpCBObject->List[0].dwCBName) == DATALINK) {
         oTemp = OMF_PutViewOnOMFClipboard (ghOMF, oObject);
         if (oTemp == NULLOBJECT)
            NoteOMFError (ghOMF);
         if (!OMF_CopyViewSpec (ghOMF, OMF_CLIPBOARD, oTemp, SELF, oObject))
            NoteOMFError (ghOMF);
      } else { /* There is no view on Clipboard. */
         oTemp = OMF_PutOnOMFClipboard (ghOMF, oObject);
         if (oTemp == NULLOBJECT)
            NoteOMFError (ghOMF);
      }

/* Remove the old Clipboard item and update the Windows clipboard to */
      /* reference the new copy.                                           */ if (!OMF_RemoveFromOMFClipboard (ghOMF, lpCBObject->List[0].dwCBName))
         NoteOMFError (ghOMF);
      lpCBObject->List[0].dwParmName = OMF_MakeObjParam (ghOMF, oObject);
      lpCBObject->List[0].dwCBName   = oTemp;
   }

/* Flag that object has been pasted at least once. */
   *lpFlags = *lpFlags | CB_BEENPASTED;

GlobalUnlock (hMem);
   return (TRUE);

} /* End GetObjFromClipboard */
```

Retrieving a View from the Clipboard - Example

Pasting a view of an object is much like Pasting a simple link to an object. Depending on what type of object the Pasting object is, it may or may not Paste a view.

As stated earlier, a file folder (a container object) would never have to concern itself with Pasting a view - it only has to worry about preserving a view of an object.

However, a compound object (such as HPLAYOUT) does not Paste an object without a view.

When the user selects the Paste command, the Pasting object must open the Clipboard, check if the CFN_OBJECT format is available, and check if the object on the Clipboard has the methods needed to be included into the Pasting object (in our application, the object being Pasted must be able to display itself).

If all the above criteria are met, the Pasting object retrieves the information.

For a Pasting object to retrieve an object with a view, the same procedure may be used as was shown in the previous example. The command processor code remains the same, but there are a few changes in the GetObjFromClipboard code.

These changes are inserted in the GetObjFromClipboard procedure of Code Example 7-3 at the "Note 1" comment. The additional steps to be carried out are described below:

1. The procedure determines if the object on the Clipboard has a view specification. This determination is done by checking the scope of the Clipboard's reference name to that object. If there is a view specification that is defined, it must be copied with the OMF_CopyViewSpec function.

The procedure then checks if the required view methods are supported.

2. If a view specification does not yet exist, the procedure first checks if the required view methods are supported by the object referenced by the Clipboard.

If this check is successful, the procedure then sends an INIT_VIEW message to the object referenced by the Clipboard to create the view.

Reference Chapter 4, "Destination Object View Processing" and its discussion on how to create views. The sample CreateView procedure, also described in Chapter 4, is called in the example below.

Code Example 7-4: GetObjFromClipboard (for Views)

```
/* If view already exists, copy its view spec BEFORE testing methods. */
if (SCOPEOF(lpCBObject->List[0].dwCBName) == DATALINK) { if ( !OMF_CopyViewSpec( ghOMF, SELF, oObject,
                            OMF_CLIPBOARD,
                            lpCBObject->List[0].dwCBName ) ) {
        NoteOMFError (ghOMF);
        GlobalUnlock (hMem);
        OMF_Assign (ghOMF, oObject, NULLOBJECT);
        return (FALSE);
    }

/* Use the CheckMethods procedure described in Chapter 4 - */
    /* Views for Destination Objects.                           */
    if (!CheckMethods (oObject)) {
        GlobalUnlock (hMem);
        OMF_Assign (ghOMF, oObject, NULLOBJECT);
        return (FALSE);
    }
}
```

```
else { /* View does not already exist... */
    /* In this case, we check for the required view methods first.  */
    /* This causes the view methods supported by the default view   */
    /* class (class 0) to be checked. This is why the source object */
    /* must always use view class 0 when processing INIT_VIEW.      */
    /* The CheckMethods procedure is described in Chapter 4 - Views */
    /* for Destination Objects.                                     */ if (!CheckMethods (oObject)) {
        GlobalUnlock (hMem);
        OMF_Assign (ghOMF, oObject, NULLOBJECT);
        return (FALSE);
    }

/* Send a message to the source object to create */
    /* view - the following routine is documented in */
    /* Chapter 4 - Views for Destination Objects.    */
    if (!CreateView (oObject)) {
        GlobalUnlock (hMem);
        OMF_Assign (ghOMF, oObject, NULLOBJECT);
        return (FALSE);
    }

} /* End of creating new view. */
```

8 Printing in the NewWave Environment

Overview of the Print Process

Printing in the NewWave environment can be performed by the user in two different ways: the user can print an object from outside the object window in the NewWave Office; or the user can print an object from within the object window.

Printing an object from outside the object window requires the user to select the object's icon and drop it onto the printer (SPIN) icon in the NewWave Office. When this action occurs a copy of the object is made for SPIN's queue. Then a PRINT_MASTER message is sent by the SPIN utility to the copy of the object, telling the copy to print itself.

If the object to be printed allows the user to select a Print command from within the object window, then the object must make a copy of itself and send a PRINT_ADD_TO_QUEUE message directly to the SPIN utility, passing the copy as the object to be printed. The SPIN utility, in turn, sends a PRINT_MASTER message to the copy (also an object), which processes the message in the manner described above.

If the object receiving a PRINT_MASTER message is a *destination* object and includes a visual *view*, the destination object must send the view a PRINT_SLAVE message. The PRINT_SLAVE message is the view message that causes the view to be included in the output to the printer.

Chapter Organization

This chapter provides three sample procedures that demonstrate how to support printing objects and views in the NewWave environment.

The PrintIt procedure - triggers the print process from within an object's window. If the user selects a Print command from within an object window, this procedure is called. The PrintMaster procedure can then complete the printing task.

The PrintMaster procedure - processes the SPIN utility PRINT_MASTER message to actually carry out a printing task whether that task originated from inside or outside the object window.

The PrintSlave procedure - included in the source object application, or the snapshot DAL, enables that code to process the PRINT_SLAVE message and print viewed data.

Printing from an Object Window - PrintIt Procedure

The PrintIt sample procedure supports printing an object from within the object window. This procedure is used when the application has a pull down menu that allows the user to print while the object is opened. It enables the application to use the PrintMaster procedure, described in the next section, to complete the printing task.

Description

After the Print command has been selected by the user and processed in the application, the PrintIt sample procedure carries out the following steps:

1. The procedure calls OMF_Copy to make a copy of its object for printing purposes.

2. The procedure then calls OMF_MakeObjParam on the copy of the object. This call allows applications to pass object references to other objects. The result of this call is then placed in the ObjectToPrint field of the parameter structure to be passed to SPIN.

3. The procedure then passes this parameter structure with the PRINT_ADD_TO_QUEUE message to the SPIN utility. Sending this message causes the SPIN utility to generate and send a PRINT_MASTER message to the copy of the object when it reaches the front of the print queue (Processing of the PRINT_MASTER message is discussed in the next section).

Methods to Support

Since OMF_Copy is used to make a copy of SELF, the COPY_SELF method must be supported, and thus listed in the HAVE_METHODS section of the .IN$ file and the HAS_METHOD section of the application's code.

Code Example 8-1: PrintIt

```
/***************************************************************
 *                                                             *
 *   Function:   PrintIt                                       *
 *   Comment:    This is the routine that is called when "Print" *
 *               is selected from within the application.      *
 *                                                             *
 ***************************************************************/

/* Use a unique number for the object that you're going to print.
   If your program crashes between the copy of the object and
   before the release you should on start up of your application
   clean up the links to the object. */ define PR_OBJECT      0x1FFFFFFFL   /* Last PERSISTENT NAME.
                                        Used as a name for a
                                        temporary copy of ourself. */ int NEAR PASCAL PrintIt()

{
HANDLE         hSpinData;        /* Handle to the global memory. */
int            iStatus;          /* Status to return. */
SPINSTRUCT FAR *lpSpinData;      /* Pointer to the SPIN structure. */
SPINSTRUCT     ssData;           /* The SPIN structure. */
HPROPERTIES    hProps;           /* Handle to own properties. */

/* In this example ghOMF is a global containing the handle that was
   returned when we called OMF_Init. */

/* A copy of the object is created. The copied object will do the
   printing. */ if (!OMF_Copy(ghOMF, PR_OBJECT, SELF, 0)) {
    return(PR_ERR_NO_COPY);   /* If no copy can be made, return with
                                 an error message. */
```

```
}
/* Allocate and lock the memory for SPIN data. */ if (((hSpinData = GlobalAlloc(GMEM_MOVEABLE |
                              GMEM_DDESHARE |
                              GMEM_ZEROINIT,
                              (DWORD)sizeof(SPINSTRUCT))) == NULL) ||
   ((lpSpinData = (SPINSTRUCT FAR *)GlobalLock(hSpinData)) == NULL)) {
  iStatus = PR_ERR_NO_MEMORY;  /* Not enough memory available. */
  }
else {
  /* YOUR CODE HERE should get the print time information such as
     device name, number of copies, draft mode, page range, etc.
     Copy the print information into the ssData structure.
     Application-specific information, like the page range, can be
     stored in the properties of the object to be printed. */

/* This will uniquely identify the object to be printed. */ ssData.ObjectToPrint = OMF_MakeObjParam(ghOMF, PR_OBJECT);

/* Object title should also be placed into the ssData structure. */ if ((hProps = OMF_GetProperties (ghOMF, SELF, FALSE))) {
    if (OMF_ReadProperty (ghOMF, hProps, PROP_TITLE,
                        (LPSTR)ssData.ObjectTitle,
                        -sizeof(ssData.ObjectTitle))) == -1)
      ssData.ObjectTitle[0] = 0;
    OMF_FreeProperties (ghOMF, hProps);
    }

/* Copy the ssData structure into memory we will send to SPIN. */

*lpSpinData = ssData;
  GlobalUnlock(hSpinData);

/* Activate SPIN so we can send it a message. */ if (!OMF_GetOMFObject(ghOMF, SPIN)) {
    /* This means that SPIN doesn't exist or cannot be activated. */
    iStatus = PR_ERR_NO_SPIN;
    }
  else {
    /* Now that SPIN is active and the printing structure is set,
       the object is sent to SPIN for printing. */ if (OMF_Send(ghOMF, SPIN, PRINT_ADD_TO_QUEUE,
                MAKELONG((int)hSpinData, 0)) == SE_NOERROR) {
      iStatus = PR_OK;           /* Object sent to SPIN. */
    else
      iStatus = PR_ERR_SPIN_FAIL;  /* Error, object not sent to SPIN. */

/* Tell OMF we are done talking to SPIN. */

OMF_FreeOMFObject(ghOMF, SPIN);
    }
  }

/* Free the memory that was allocated above. */ if (hSpinData != NULL)
  GlobalFree(hSpinData);

/* Need to break the link to the object after it's been sent to SPIN. */

OMF_Assign(ghOMF, PR_OBJECT, NULLOBJECT);

return(iStatus);  /* Return status. */

} /* End of PrintIt() routine. */
```

Printing an Object - PrintMaster Procedure

The PrintMaster sample procedure processes the PRINT_MASTER message, which is sent by the SPIN utility to an object to tell it to print itself.

A PRINT_MASTER message is sent to an object either when an object icon is moved to the SPIN utility icon from outside the object window, or when a PRINT_ADD_TO_QUEUE message is sent directly from an object to the SPIN utility as described in the PrintIt procedure.

The PRINT_MASTER message is not sent until the object to be printed reaches the front of the print queue.

An object actually receives a series of PRINT_MASTER messages to produce a printout. In general, the object processes one message for each printed page it wants to output.

For each PRINT_MASTER message, the object creates a metafile using a filename supplied by SPIN. SPIN collects these metafiles until the printout is complete. Then it plays them to the destination device.

The value the object returns from the PRINT_MASTER message tells SPIN when the printout is complete (PM_DONE versus PM_NEXT_PAGE).

Handling of views requires some special effort. The object being printed must return a value (PM_EXTERNAL) to SPIN indicating that another message is needed (so a new metafile can be created), but that this metafile should become part of the same printed page as the current metafile.

The object returns PM_EXTERNAL again after printing the view so that the output made after the view continues on the same page.

Description

When the PRINT_MASTER message is received by the object, the PrintMaster procedure carries out the following steps to print itself:

1. If this is the first message, the object accesses information set up in the PrintIt procedure (the number of copies, draft mode, page range, etc.).

2. If the next item to be printed is a view of a source object, then the procedure incorporates the view as follows:

a. The procedure activates the view of the source object, allocates memory for the parameter structure for a PRINT_SLAVE message, and locks that memory.

b. The procedure then fills the parameter structure with such information such as the *hDC*, rotation, printer, flags, etc.

c. The procedure copies the metafile name from SPIN to the parameter structure, and passes the structure with the PRINT_SLAVE message to the view. The view writes its information into the metafile sent by the destination object. Once this is finished, the source object view is deactivated.

d. The parameter structure is freed and a value of PM_EXTERNAL is returned to SPIN.

3. If the next item to be printed is not a view, the procedure creates a metafile for its own information to be printed. The mapping mode is then set.

4. While printing to the metafile, this sample procedure checks for three items: end of the page; end of the data; any external (source) objects encountered. Until one of these occurs, the object continues printing to the metafile.

a. If the end of the page is set, the procedure returns PM_NEXT_PAGE to SPIN. SPIN then sends another message with a new metafile for the next printer page.

b. If the end of the data is encountered, then the procedure informs the SPIN utility that it is done, by returning PM_DONE. SPIN does not send any more messages after this.

c. If a view of an external (source) object is encountered, then the procedure sets a flag to indicate that the next thing to be printed is a view. It then returns PM_EXTERNAL to SPIN. SPIN will send another messge and a new metafile that will continue on the same page. This message will be processed by step 2 above to include the view in the printout.

d. In all three of the above cases, the procedure closes the current metafile and deletes the Windows metafile handle before returning to SPIN. Note that this does not actually delete the metafile.

Methods to Support

To support an object printing itself, list the following method in the HAVE_METHODS section of the .IN$ file and in the HAS_METHOD section of the application's code:

PRINT_MASTER

Code Example 8-2: PrintMaster

```
/* In this sample code, the following global declarations are
   assumed.                                                       */

/* This is a two state machine, depending on your application you may
   need to add more states. */ define PR_EXTOBJ_NONE    0 /* Not about to print external object. */
define PR_EXTOBJ_PENDING 1 /* About to print an external object.  */

BYTE        pRExtObjFlag = PR_EXTOBJ_NONE; /* No ext. object yet.  */
OBJECTNAME  pRExtObjName;       /* External object name to print.  */

BOOL        pRFirstSpin = TRUE; /* TRUE => first message from SPIN. */
HDC         pRhMFDC;            /* hDC of metafile.                 */
OMFHND      ghOMF;              /* Handle from calling OMF_init.    */
LONG        lSpinParam;         /* Parm from and return to SPIN.    */

/* Your procedure which processes OMF messages, the object  needs to
   respond to the PRINT_MASTER message:                             */ case PRINT_MASTER:

/* Call your printing routine from here. */ lSpinParam = lParam;    /* lParam is the message parameter. */
   PrintMaster();
   return (lSpinParam);    /* PrintMaster modified this global. */

/************************************************************
 *                                                          *
 *    Function:    PrintMaster                              *
 *    Comment:     This is the routine that actually prints the *
 *                 object in response to a PRINT_MASTER message. *
 *                                                          *
 ************************************************************/

VOID NEAR PASCAL PrintMaster()

{
HVIEW              hView;   /* Handle to activated view.           */
HANDLE             hPMS,    /* Handle to the PRINTMASTERSTRUCT.    */
                   hPSS;    /* Handle to the PRINTSLAVESTRUCT.     */
LPPRINTMASTERSTRUCT lpPMS;  /* Pointer to the PRINTMASTERSTRUCT.   */
```

```
LPPRINTSLAVESTRUCT  lpPSS;      /* Pointer to the PRINTSLAVESTRUCT.  */
PRINTMASTERSTRUCT   pmsData;    /* PRINTMASTERSTRUCT for this object.*/
PRINTSLAVESTRUCT    pssData;    /* PRINTSLAVESTRUCT for views.       */ hPMS = (HANDLE)LOWORD(lSpinParam);      /* Get handle to parameters. */ if (!(lpPMS = (LPPRINTMASTERSTRUCT)GlobalLock(hPMS))) {  /* Failed: */
  lSpinParam = (LONG) PM_OUTOFMEM;      /* We don't have enough memory */
  return;                               /* to get the parameters.    */
} pmsData = *lpPMS;   /* Copy information to local structure. */
GlobalUnlock(hPMS);

if (pRFirstSpin) {
  pRFirstSpin = FALSE;

/* First time SPIN called to print our object.

YOUR CODE HERE should access the information which affects the
     whole print job such as draft mode and page range.              */
} if (pRExtObjFlag == PR_EXTOBJ_PENDING) {

/* If we returned last time because we found an external object,
     then activate the view and allocate the memory necessary for the
     parameters we will send to the source object.                   */ hPSS = NULL;
  if (((hView = OMF_GetView(ghOMF, pRExtObjName)) == NULL) ||
      ((hPSS = GlobalAlloc(GMEM_MOVEABLE |
                           GMEM_DDESHARE |
                           GMEM_ZEROINIT,
                           (long)sizeof(PRINTSLAVESTRUCT))) == NULL) ||
      ((lpPSS = (LPPRINTSLAVESTRUCT)GlobalLock(hPSS)) == NULL)) {

/* Error recovery: Undo anything we have done and return an error
       to SPIN. */ if (hView != NULL)
      OMF_FreeView(ghOMF, hView);
    if (hPSS != NULL)
      GlobalFree(hPSS);

lSpinParam = (LONG) PM_OUTOFMEM;
    return;
  }

/* YOUR CODE HERE should fill in the following fields in pssData:

Whole       Rectangle for the view to print to,
                    in device coords, without regard to page
                    edges. The view should scale its output
                    based on Whole, even though only some of it
                    may be actually printed.

Part        Subset of the Whole rectangle which should
                    actually be printed.

rgbBkColor  Background color for view to use.
  */

/* Initialize other fields of parameter structure. */ pssData.hDC      = pmsData.hDC;     /* Pass on the display context. */
  pssData.Rotation = 0;               /* Normal rotation.             */

/* Pass the name of the metafile that SPIN passed us to the view
     so the view can print to it. */ strcpy(pssData.MetaFileName, pmsData.MetaFileName);

/* Copy message parameter structure to the global memory block. */

*lpPSS = pssData;
  GlobalUnlock(hPSS);

/* Send the view the PRINT_SLAVE message. */
```

```
OMF_SendViewMsg(ghOMF, hView, PRINT_SLAVE, (WORD)hPSS);
OMF_FreeView(ghOMF, hView);
GlobalFree(hPSS);

/* External object is finished printing. */ pRExtObjFlag = PR_EXTOBJ_NONE;
lSpinParam = (LONG) PM_EXTERNAL;   /* Tell SPIN done printing the */
                                   /* external object.            */
return;
}

/* Not about to print an external object. So create a metafile with
   the name SPIN gave us and initialized its mapping mode. */ if (!(pRhMFDC = (HDC)CreateMetaFile((LPSTR)pmsData.MetaFileName))) {
    lSpinParam = (LONG) PM_OUTOFMEM;
    return;
}

SetMapMode(pRhMFDC, /* put the mode you are printing in here */);

/* Now you should begin printing to the metafile (pRhMFDC) until one
   of these three things happen:  (1) end of your data, (2) end of
   the current print page, or (3) an external object (view) is
   encountered. Handling of these events is shown below... */ while ( !( /* at end of data   */ ) &&
        !( /* at end of page   */ ) &&
        !( /* external object */ ) ) {

/* YOUR CODE HERE should print data to the metafile. */

} if ( /* external object */ ) {

/* If you encounter an external object (child) the code below is an
       example of what is needed. */ pRExtObjName = (OBJECTNAME) /* Save the OBJECTNAME of the child
                                   so when SPIN sends us our next
                                   PRINT_MASTER message we know what
                                   view should be printed. */

/* Set the flag to say that we need to send a PRINT_SLAVE message
       to the view in order for the included object to be printed to
       the next metafile. */ pRExtObjFlag = PR_EXTOBJ_PENDING;

/* This return value to SPIN tells it to send us another PRINT_MASTER
       message with another metafile, but to stay on the same printer
       page. */ lSpinParam = (LONG) PM_EXTERNAL;
}
else if ( /* end of current printer page */ ) {

/* If you encounter the end of a page: This return value to SPIN
       tells it that we are done with the current printer page. SPIN
       then sends us another PRINT_MASTER message with another metafile
       to begin output on the next page. */ lSpinParam = (LONG) PM_NEXT_PAGE;
}
else { /* must have encountered end of our own data to be printed */

/* If you encounter the end of the data to be printed: This return
       value to SPIN tells it that this print job is complete. SPIN
       will not send us any more PRINT_MASTER messages for this print
       job. */ lSpinParam = (LONG) PM_DONE;

/* This object will never receive another PRINT_MASTER message
       because SPIN destroys objects when they are done printing.
       (Remember that the object SPIN is printing is always a copy of
       the real object.) But just in case, we will reset our internal
       flag so if we do receive another PRINT_MASTER we would treat it
       as the start of another print job. */
```

```
pRFirstSpin = TRUE;
}

/* Finished with this PRINT_MASTER message. Close the metafile and
   delete the Windows handle to it. The file is NOT deleted. SPIN
   will later play this metafile to the device to produce output. */

DeleteMetaFile(CloseMetaFile(pRhMFDC));

} /* End of PrintMaster() procedure. */
```

Printing a View - PrintSlave Procedure

The PrintSlave sample procedure should be included in the source application or in the code for a snapshot DAL. This procedure processes a PRINT_SLAVE message, passed from a destination object to a view to enable that view to be printed as part of the destination object's output.

Description

When the PRINT_SLAVE message is passed down from a destination object, the sample PrintSlave procedure is called to create a metafile containing a printed view.

1. The procedure accesses the parameter structure (which has been passed from the destination object as the PRINTSLAVESTRUCT structure). This structure contains printing information such as the name of the metafile to create, rotation, background color, whole, part, etc.

2. The procedure then creates a metafile using the passed name.

3. Next, the procedure sets up a mapping mode and viewing transform for the metafile so Windows can handle the conversion between coordinate systems. The background color is also set.

4. The procedure sets up a clipping region for output using the *Part* rectangle passed in the parameter structure.

5. The procedure then prints to the metafile.

6. Finally, the procedure closes the metafile and deletes the metafile handle. The metafile itself is not deleted.

Methods to Support

To support printing a view, list the following method in the OTHER_CLASS_PROPERTIES, PROP_VIEWMETHODS section of the .INS file for your application:

> PRINT_SLAVE

If this view method will be supported directly by the source object of the view, then PRINT_SLAVE should also be listed in the HAVE_METHODS section of the .INS file and in the HAS_METHOD area of the source application code.

If a snapshot is used to support this view method, then list this method in the HAVE_METHODS section of the .INS file of the snapshot DAL.

Code Example 8-3: PrintSlave

Somewhere in the code of your source object (or snapshot) you will need to process the PRINT_SLAVE message. This is shown below.

```
case PRINT_SLAVE:
    /* Call function to process PRINT_SLAVE. Pass handle to
       PRINTSLAVESTRUCT that destination object sent. */
```

```
  return ( (long) PrintSlave ( (HANDLE)LOWORD(lParam) ) );

/****************************************************************
 *                                                              *
 *    Function:   PrintSlave                                    *
 *    Comment:    This is the routine that is called when the   *
 *                PRINT_SLAVE message is received.              *
 *                                                              *
 ****************************************************************/

BOOL PASCAL PrintSlave (hPrintStruct);    /* Returns TRUE on success, */
                                          /* FALSE on failure.        */

HANDLE hPrintStruct                       /* Handle to PRINTSLAVESTRUCT. */
{
LPPRINTSLAVESTRUCT lpSlaveStruct;  /* Contains DC to output device  */
                                   /* Two rectangles: Whole and Part */
                                   /* Flags word: currently not used */
                                   /* Name of metafile to create:    */
                                   /*                  MetaFileName  */
                                   /* Rotation: currently not used   */
                                   /* rgbkColor: background to use   */

HDC MetaFileDC;              /* Handle to metafile display context */
HANDLE hMetaFile;            /* Handle to metafile                  */
BOOL bStatus = FALSE;        /* Holds return value                  */

/* Get PRINTSLAVESTRUCT information. */ lpSlaveStruct = (LPPRINTSLAVESTRUCT)GlobalLock((HANDLE)hPrintStruct);
if (lpSlaveStruct == NULL) {
  return (FALSE);
  }

/* Create the metafile. */

MetaFileDC = (HDC)CreateMetaFile((LPSTR)lpSlaveStruct->MetaFileName);
if (MetaFileDC) {

/* Windows calls to prepare for output. */

SaveDC (MetaFileDC);

/* Set up a mapping mode and "window" origin and extent that make
     sense for your data. */

SetMapMode (MetaFileDC, mapping_mode);

SetWindowOrg (MetaFileDC, x_origin, y_origin);
  SetWindowExt (MetaFileDC, x_extent, y_extent);

/* Set up "viewport" to be Whole rectangle sent by the
     destination object. */

SetViewportOrg ( MetaFileDC,
                   lpSlaveStruct->Whole.left,
                   lpSlaveStruct->Whole.top );
  SetViewportExt ( MetaFileDC,
           lpSlaveStruct->Whole.right  - lpSlaveStruct->Whole.left,
           lpSlaveStruct->Whole.bottom - lpSlaveStruct->Whole.top  );

/* Set background color as requested by the destination object. */

SetBkColor (hMetaFileDC, lpSlaveStruct->rgbBkColor);

/* Select clipping region to be the Part rectangle sent by the
     destination object. */ hRgn = CreateRectRgn ( lpSlaveStruct->Part.left,
                         lpSlaveStruct->Part.top,
                         lpSlaveStruct->Part.right,
                         lpSlaveStruct->Part.bottom );
  SelectClipRgn (hMetaFileDC, hRgn);
  DeleteObject (hRgn);

/* YOUR CODE HERE should print into the MetaFileDC... */

/* Now done printing: Restore the DC state, close the metafile and
     delete the metafile handle, which does NOT delete the metafile! */
```

```
RestoreDC (MetaFileDC, -1);
hMetaFile = (HANDLE)CloseMetaFile (MetaFileDC);
if (hMetaFile)
   bStatus = (BOOL)DeleteMetaFile (hMetaFile);
}

GlobalUnlock ((HANDLE)hPrintStruct);

return (bStatus);
}
```

9 Providing HELP

This chapter will be released shortly. It will be mailed to the address supplied on the "Update Reply Card."

10 API Techniques

This chapter will be released shortly. It will be mailed to the address supplied on the "Update Reply Card."

2 Introduction to the OMF

Overview of the OMF

In conventional MS-DOS applications, a user types a command to start the application, waits for the application to start up, and then accesses the file to be worked on. In NewWave, this is a one-step process; the user double clicks on an object and the application is brought up automatically with the file to be worked on.

The main purpose of the Object Management Facility (OMF) is to perform the "housekeeping" necessary to provide the end user with an easy to use, object-oriented environment. Specifically, the OMF performs the following functions:

- Binds an object's data to an application's executable file and creates a running process of that application whenever the object is accessed;

- Keeps track of relationships between objects so that related objects can be treated as a single entity when copied, mailed, or destroyed, and so that objects are notified when associated objects have changes;

- Manages communication between objects through a set of defined messages;

- Maintains data files for the objects. The OMF provides a unique root file name for an object (typically a number, such as 000039) and stores the object's files in a special directory. The application can use its own unique file extensions. This frees the user from having to worry how files are stored by MS-DOS.

This chapter is divided up into the following sections:

Object Definitions - Describes the different classifications and types of objects.

Properties - Defines class-level and object-level properties, property names, and property formats.

Messages and Methods - Defines messages and methods and discusses what happens when a message is sent and received. Identifies required methods and optional methods and describes class-specific methods.

OMF Links - Defines links, parent and child objects, simple links, and views in terms of both data passing and visual views.

View Specifications - Discusses the specific items that must be in place in order for a view to work.

Snapshots - Defines snapshots and how they relate to dynamic access library objects.

Maintaining a View - Describes the communication between objects that must take place when a view is to be updated or deleted.

Actions Performed on Objects - Describes what can happen to an object from its creation through normal interaction to its removal from the system.

Serialization - Describes the serialization and deserialization of objects.

OMF Function Summary - Provides summary tables for all OMF functions.

OMF Message Summary - Provides summary tables for all OMF messages.

Object Property Summary - Provides summary tables for OMF class and object properties.

Figure 2:
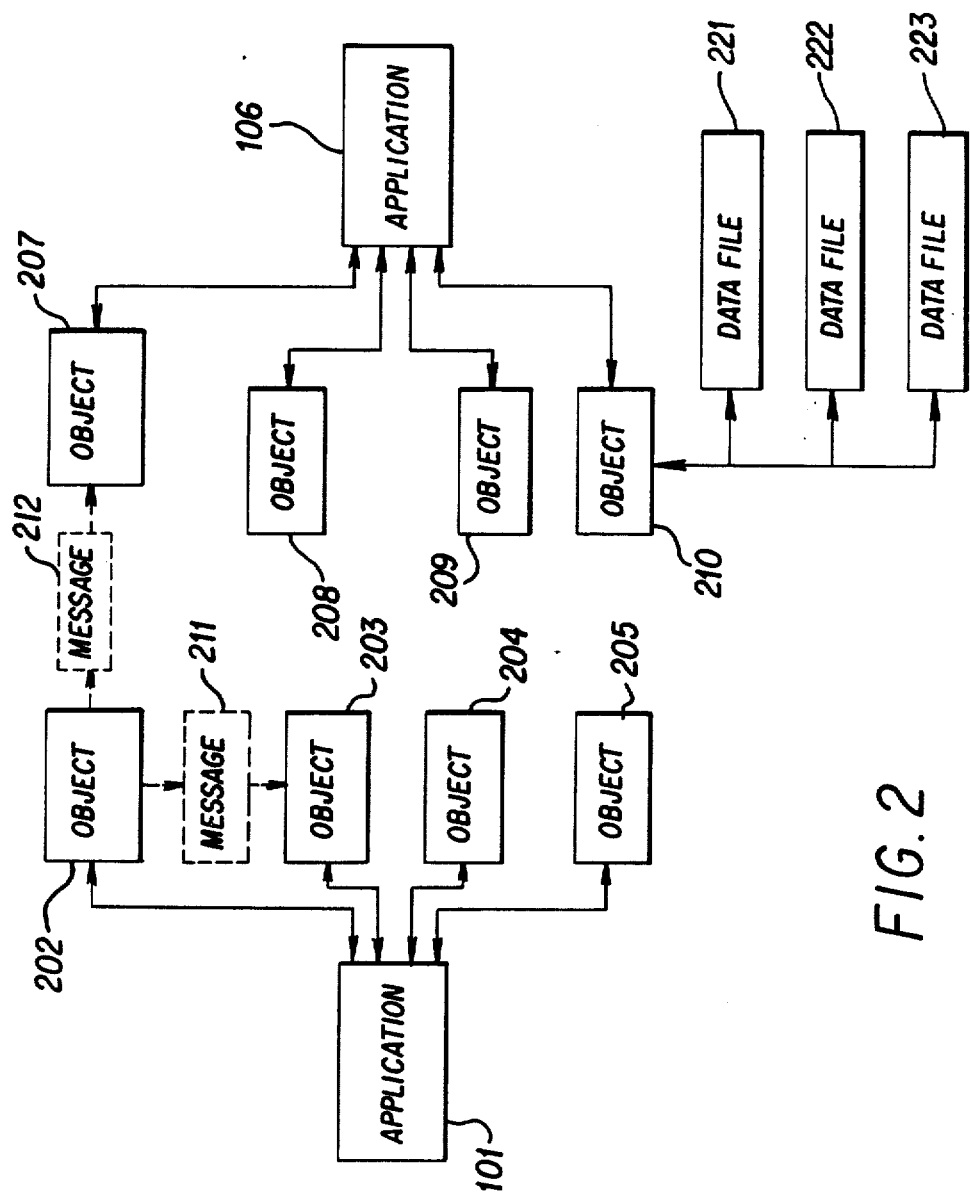
FIGS. 2 and 2A show block diagrams which illustrate the relationship between objects, applications and data files in accordance with the preferred embodiment of the present invention.
Figure 2A:
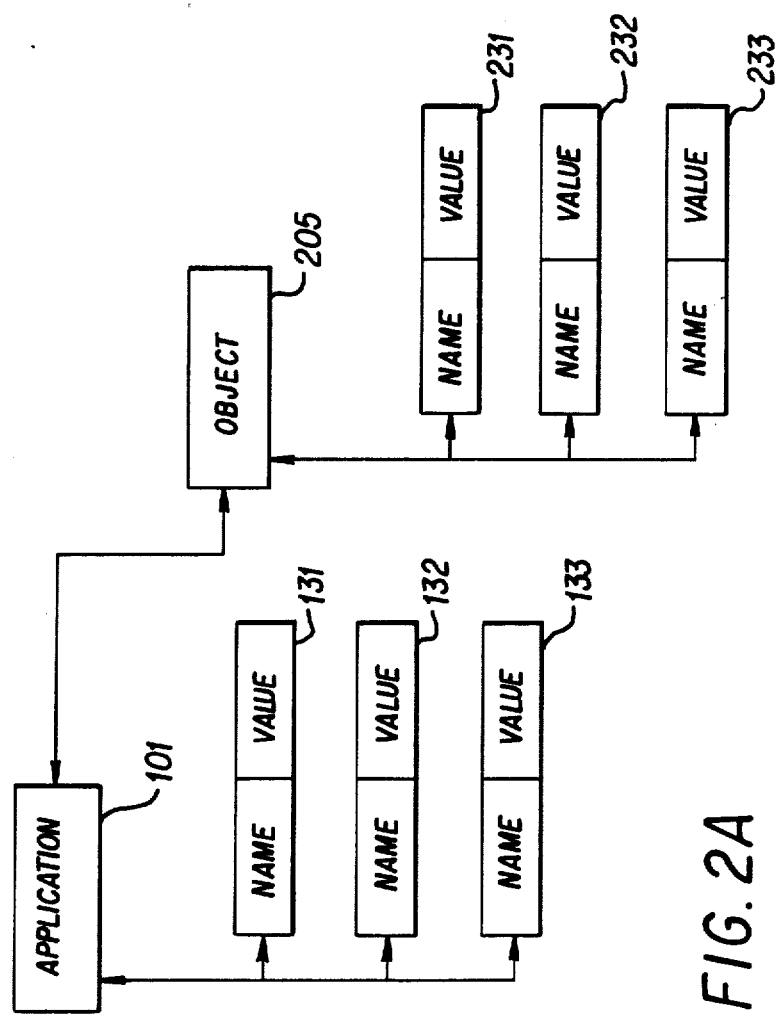

Throughout this chapter, we will be referring to the example depicted in Figure 2-1. In the example, there is a report folder in the NewWave Office window. In the folder, there are two reports produced by a word processing program (WORDPROC.NWE): "Financial Report" and "Annual Report". Financial Report uses three columns of data from a spreadsheet object entitled "6 Months Sales", produced by a spreadsheet program (SPREAD.NWE). Annual Report includes "Sales Chart" which is produced by a graphics program (CHART.NWE). Sales Chart is derived from one column of data from the same spreadsheet "6 Month Sales". Note that all of the application programs used in the examples in this chapter are fictitious names and are used for illustration purposes only.

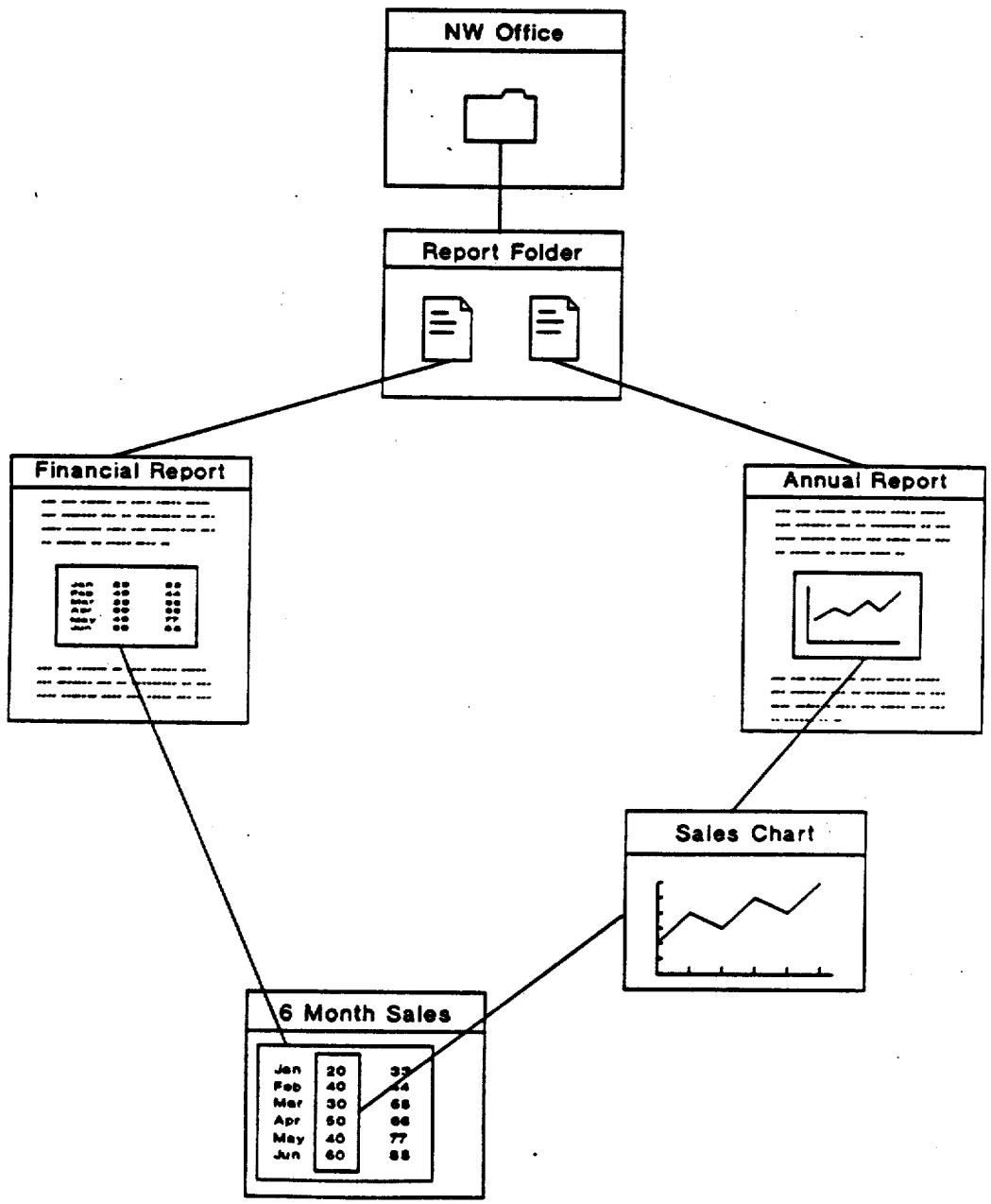

Figure 2-1. Example Scenario

Object Definitions

In the NewWave environment, an *object* is an entity comprised of data (stored in one or more data file(s)) and the name of an executable file that can interpret the data files. It is the job of the OMF to know which application works with a particular set of information. Objects that are bound to the same application are considered to be of the same *class*.

Figure 2-2 illustrates one way to think of an object, that is, as an entity that is part application (WORDPROC.NWE) and part data, and associated with the window that the user sees. The object has properties related to its application referred to as class properties, and it has unique properties referred to as object properties. This is described in detail later in the chapter. In Figure 2-3, the objects from the example are shown connected to the data windows that the user sees.

An important feature of an object is that its data is contained within the object, i.e., the form of the data is known only to that object's executable code. Changes cannot occur to the data except through the interface supplied by the object's code.

In general, an object is represented on the screen as an icon when it is in a closed state. After a user opens the object's icon, the icon is grayed and a window displaying its data appears in the NewWave Office.

The two major classifications of objects are system objects and user objects. Object types are described in detail in the text that follows.

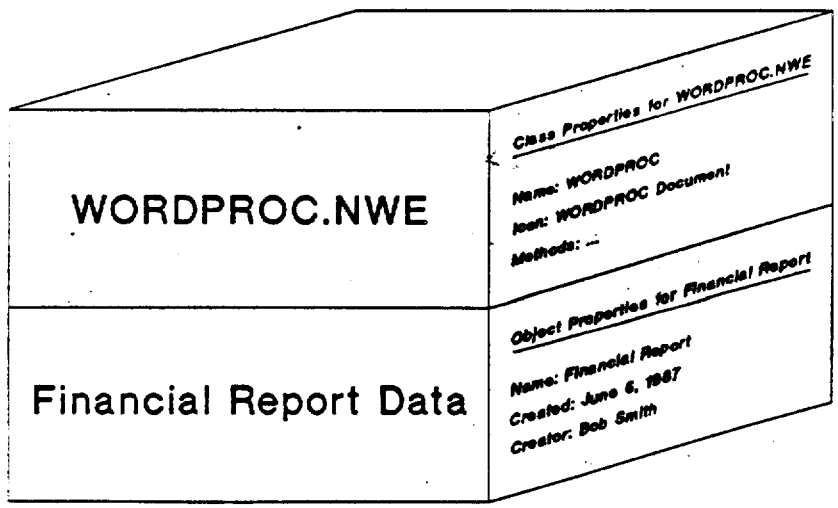

Figure 2-2. Artist's conception of an Object

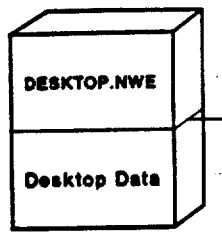
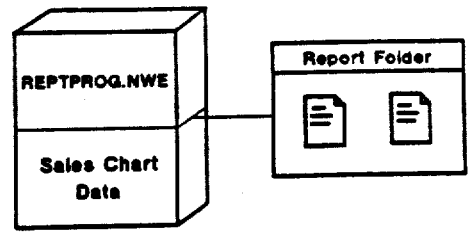
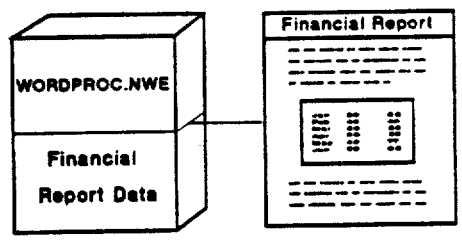
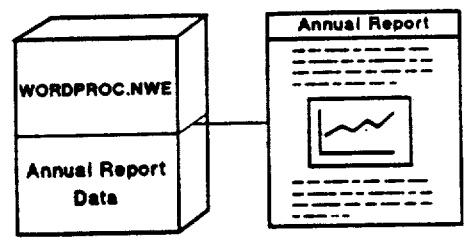
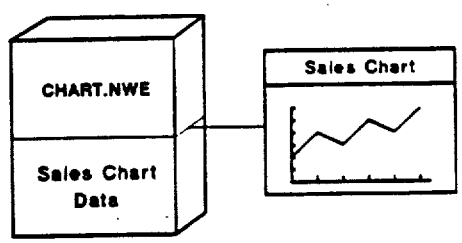
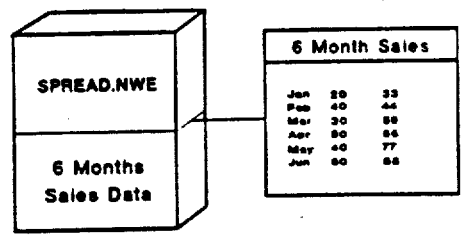

System Object Classification

A *system object* represents a single fixed resource in the NewWave system. System objects cannot be cut, copied or shared by the user. The NewWave Office, the File Drawer, and the Waste Basket are all system objects. In general, the NewWave Office displays the icons of system objects; however they can be accessed by any application through OMF function calls. System objects are installed and de-installed on the user's system by selecting the desired objects through the NewWave Office's Manage Tools command of the Settings menu.

There are two types of system objects: system tools and system containers. A *system tool* is a general utility application, such as a calculator or a popup calendar. System container objects are described below under the "Container Objects" heading.

User Object Classification

In contrast to system objects, a user has complete control over user objects. A *user object* can be freely created, copied, or destroyed by the user.

Container Objects

*Container objects* hold other objects. A container object shows the icons and/or titles of the objects that it contains.

A folder is an example of a *user container object*. It contains user objects and possibly other file folders. In Figure 2-4, the report folder from the example is shown. It is a typical example of a user container object.

The File Drawer and Waste Basket are examples of *system container objects*. System containers generally exist to perform some operation on the objects they contain or to hold objects created by the system itself (as well as user objects).

When a container object includes another object, the container shows an icon and/or title as a representation of the inclusion. The container obtains this information from the OMF and does not need to call the application code associated with the included object.

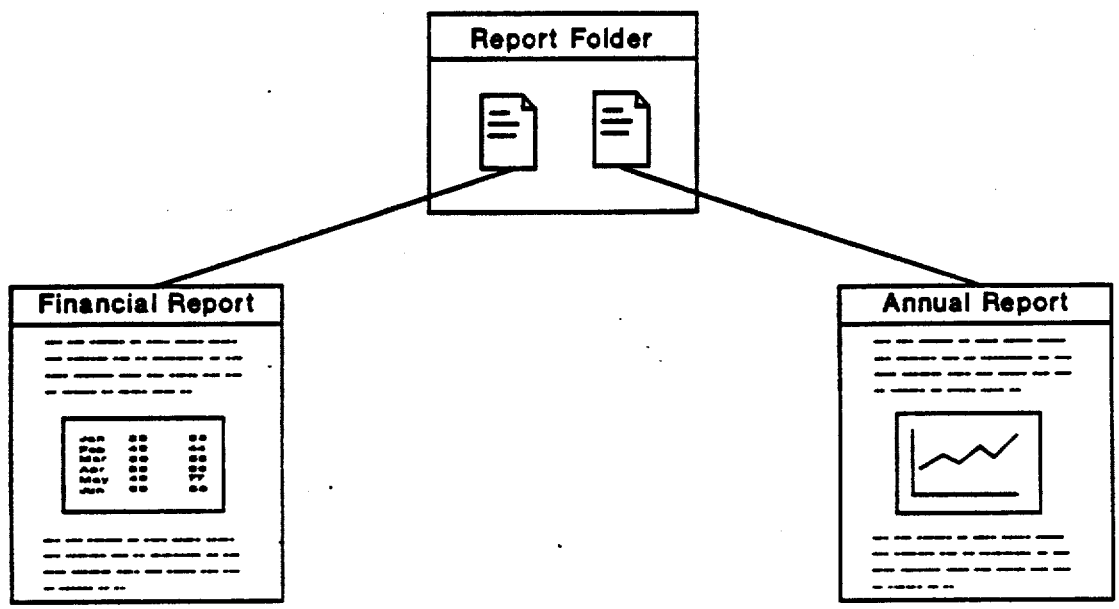
Figure 2-4. Example of a Container Object
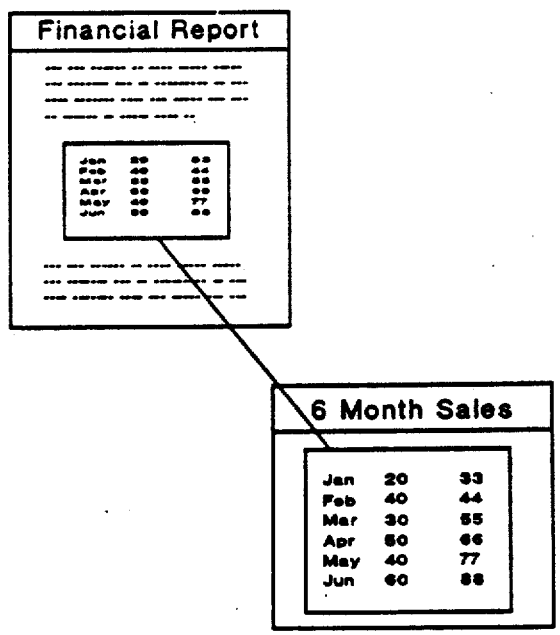
Figure 2-5. Example of a Compound Object

Data Objects: Simple and Compound

*Data objects* are user objects that directly hold actual data. They are tied to more "traditional" applications, such as spreadsheets, word processors, and graphics programs.

Data objects come in two types: simple and compound.

A *simple data object* contains "homogeneous" data, that is, all of the data is bound to the same application and can be edited without references to other objects.

When a data object includes another object, it is referred to as a *compound object* or *composite object* (the terms are synonymous). Figure 2-5 shows a typical compound object, the Financial Report from our example. It fits the definition of a compound object because it includes data from the spreadsheet.

As opposed to simple data objects, compound objects must have the ability to include other objects. A compound object must be able to respond to commands as if it were a single entity. For example, when a compound object receives a message to print itself, it must notify all of the objects that it contains.

Examples of Object Types

The different types of objects are summarized in the table below:

Table 2-1. Types of Objects

| Object Type | Object Classification | Example |
| --- | --- | --- |
| System Container | System | File Cabinet, Waste Basket, NewWave Office |
| System Tool | System | Calculator, Calendar |
| User Container | User | Report Folder |
| Simple Data | User | "6 Month Sales" spreadsheet |
| Compound Data | User | "Annual Report", "Financial Report", "Sales Chart" graph |

Note that the "Sales Chart" graph fits the definition of a compound object, because it includes data from the "6 Month Sales" spreadsheet.

Properties

The NewWave environment has defined characteristics of objects that are referred to as *properties*. These properties are assigned by you as a software developer depending on which characteristics you want your objects to have. You can also define your own set of properties and assign them as needed.

All properties consist of a name and a value. Property names can be standard NewWave names, numbers, or text strings. Property values can be any data structure and are determined by the nature of the property. There are two different categories of properties: class and object.

The properties of a particular object can be accessed by other objects through the functions, OMF_ReadProperty and OMF_WriteProperty.

Class Properties

The *class properties* for an object are the characteristics that carry over to each and every object associated with the same application.

Once a class is defined and installed on the NewWave Office, the icon representing that class is shown in the "Create A New..." dialog box of the NewWave Office. Typical class properties include the name of the class, the name of the icon, the methods supported by the class, etc. (For a complete list of the standard class properties, refer to the OMF Property Summary Tables section at the end of this chapter.)

Object Properties

*Object properties* relate to the unique characteristics of a particular object. For example, both the Annual Report and the Financial Report are represented by the same kind of icon in the NewWave Office window, meaning that they are of the same class. However, they do have different object property information, such as their titles, user comments, date and time of creation, the user who created the object, etc. These are all typical object properties. (For a complete list of the standard object properties, refer to the OMF Property Summary Tables section at the end of this chapter.)

The object properties are used by the OMF and other applications to determine how the object behaves and/or its characteristics.

Property Names

Each object and class property has a name. Property names are assigned by the application developer and can be 1. a pre-defined standard property name from the include file "NWOMF.H", e.g., PROP_TITLE, 2. a private numeric name, e.g., 0xFFFF0801, or 3. a null terminated string, e.g., "Position".

The pre-defined and numeric names are actually special DWORD numbers with -1 in the HIWORD and an integer ID in the LOWORD. (Note that if the 0x8000 bit is set in the ID, the property is not transferred if the object is copied or mailed. This is useful if a property is not appropriate for a transferred version of the object. The bit should not be used on a class property.) The advantage of using numeric names is in space savings, since they only require one DWORD.

Private numeric names must be greater than or equal to PROP_USERDEFINED (equal to 0x800) to avoid conflict with the pre-defined names.

String property names are case sensitive; property "Doc" is not the same property as "doc". If the first letter of the property name is a dollar sign ($), the property is protected from being transferred as in the 0x8000 bit described above for predefined and numeric names. String property names must be at least 5 characters long to avoid collisions with numeric names. The advantage of using string property names is the uniqueness of the name.

Private numeric and string property names should only be used to access an object's own object and class properties. This is to avoid conflicts over use of the same property names.

In general, there are performance and storage space advantages to using private numeric names rather than strings.

Property Formats

Property values can be any kind of data up to 32,767 bytes in length. There are three general formats:

1. Null-terminated character strings,

2. Binary data structures of various kinds, and

3. Existence, that is, using the existence of a propery to represent a TRUE value and non-existence to represent a FALSE value.

The formats of the standard properties are described in detail in the "HP NewWave Environment: Programmer Reference Manual".

Messages and Methods

The OMF provides the ability for objects to communicate with each other (or with the OMF itself) via messages.

The code that an object executes in response to a specific type of message is called a *method*. Saying that an object has an "X" method simply means that it knows how to process the "X" message.

Sending Messages

By sending a message, one object can cause another object to perform a particular task without the sender having to know what kind of object is being asked to perform the task. The actual code executed when a message is received depends on the kind of object receiving the message. For example, if a message to print is received by a word processing object like "Financial Report", the word processor code for printing the document is executed. If the same message is received by "6 Month Sales" (the spreadsheet object) the spreadsheet program code for printing is executed. When new object types are added to the system, they become fully integrated into the system and only need to respond to appropriate messages.

Sending a message to an object is very similar to calling a subroutine in the receiving application. In fact, like all messages in Windows, messages are accepted by the receiving application's main window procedure. Control flow is exactly the same as with a procedure call, including the possibility of the receiver sending messages back to the sender while processing the message. Recursion, both direct and indirect, is possible. Deadlock cannot occur, because the sender is re-entered to process messages even while waiting for the return of a message it has sent. On the other hand, stack overflow can occur and Basically, the message processing scheme described above is a behavior protocol. This protocol is independent of specific objects, thus providing a consistent behavior between objects. Therefore, applications are modular. They all follow the same rules for message passing. The protocol is also extensible, allowing for an application to create specific messages for its own application to process without restructuring the basis of the OMF.

Receiving Messages

As discussed above, the code that an object executes when it receives each type of message is referred to as a method. The application must state which methods its class of objects supports, and be able to process the messages that it receives. To get an idea of the methods that an application could potentially support, refer to the OMF Message Section at the end of this chapter.

To inform the OMF that your application knows how to respond to specified message types, you must:

1. Provide code to respond to the HAS_METHOD message, and

2. List the method types in the HAVE_METHODS section of your installation file (installation files are described in detail in Chapter 8 of the "HP NewWave Environment: Programmer Reference Manual").

The HAS_METHOD message is sent to your application to ask if it can handle a specific OMF (or your own defined) message. Either METHOD_PRESENT or NO_METHOD is returned, depending on whether or not it supports that method.

HAVE_METHODS is an installation file command and is applied when your application is first installed. By listing a method type in HAVE_METHODS, you enable other applications to use the function OMF_GetMethod to see if a method is handled by your application.

Depending on the circumstances, the OMF may use either the HAS_METHOD message or the HAVE_METHODS installation command. HAS_METHOD requires activating an object whereas with HAVE_METHODS activating the object is not necessary. Thus, your application must declare the same set of methods in both places.

Required Methods

Although most methods are optional, each application is required to support the following methods:

CREATE_OMF,

TERMINATE,

HAS_METHOD,

DIE_PLEASE.

These messages can be sent to all objects and the objects must respond accordingly.

Since HAS_METHOD is required of all objects, it is assumed to be an included method and is not to be listed in the HAVE_METHODS clause of the installation file.

Optional Methods

All other methods are optional depending on what you wish to support in the application. No extra code is required for messages that are not appropriate to your application.

Class-Specific Methods

As a developer, you can define your own set of messages for use in your applications. You must make sure that class-specific methods are only sent to objects of the correct class, since some other class could be using the same method ID for its own class-specific methods.

Class-specific methods use codes between OMF_USER (0x100) and MAX_METHOD_ID (0x7FFF).

OMF Links

As discussed earlier, a major function of the OMF is to keep track of object relationships. A *link* is a defined connection between a parent object and a child object; it is tracked by the OMF.

A *child object* is the subordinate partner in a link and is either contained by the parent or provides data to the parent. By definition, a user object must be a child object to at least one parent. Since links can be readily changed and there can be more than one link to a child object, a child object can have any number of parents. Note also that a child object can also serve as a parent object to other child objects.

A *parent object* is either a container (e.g. file folder) or a compound object. A parent object (for example, "Financial Report") can have any number of children.

A parent object must assign a unique reference name to each of its child objects. A *reference name* is a 32-bit number and will be discussed later in greater detail. (It is often practical to use an index into an array as a reference name.) Reference names need only be meaningful and unique to the parent object. Thus, the same reference name can be used by different parent objects on the system. In like manner, the same child object can be referred to by different reference names from different parent objects.

Figure 2-6 shows the parent child relationships in the example and demonstrates how reference names might be assigned. Note that both "Financial Report" and "Annual Report" have "Report Folder" as a parent. Accordingly, they must have different reference names for those links, so that Report Folder can tell them apart. On the other hand, "6 Month Sales" is child to both "Financial Report" and "Sales Chart"; there is no requirement for its parents to call it by the same name.

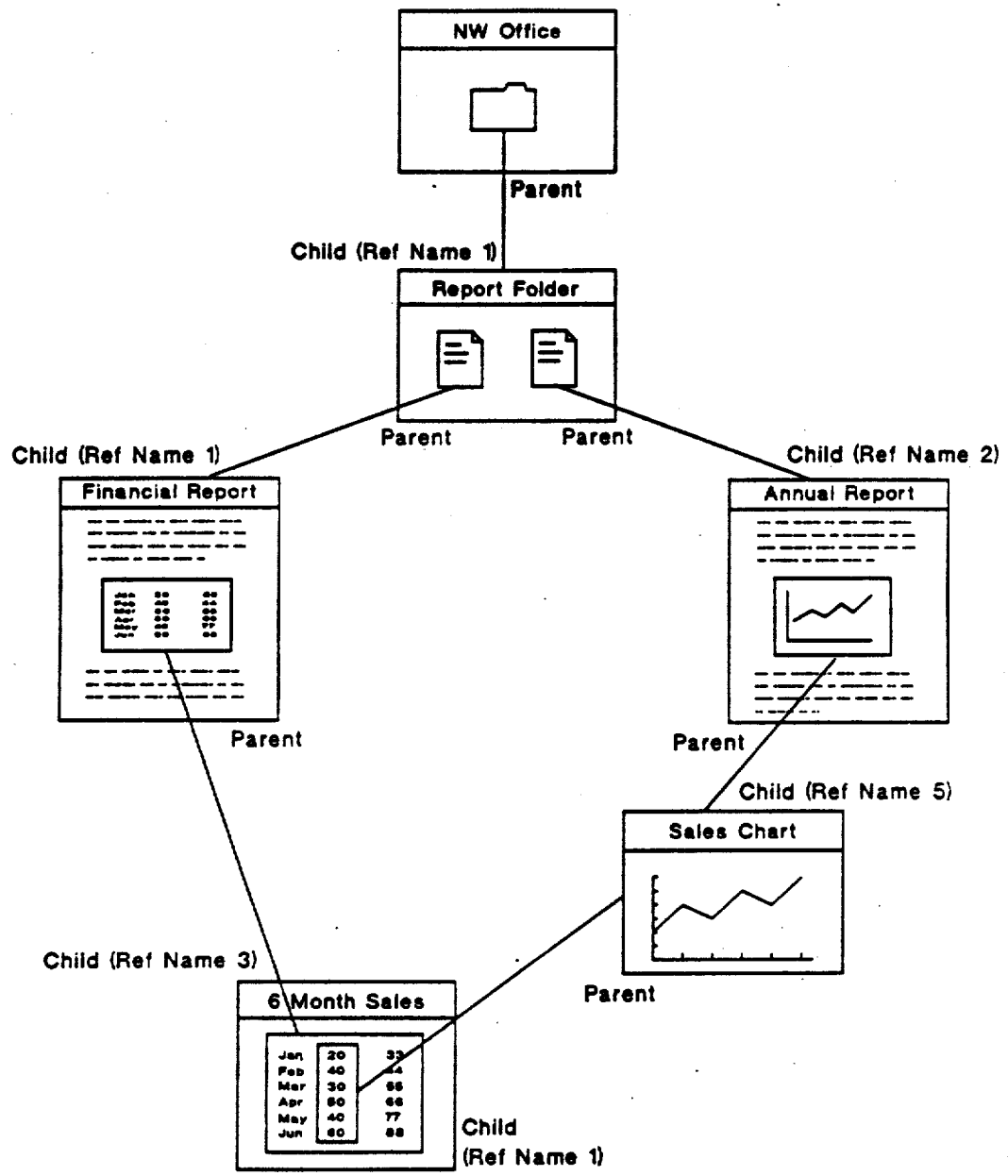
Figure 2-6. Reference Name Examples

Simple Links

A *simple link* is one that connects a container object to its children. For example, the NewWave Office's File Drawer may contain a folder or document. When a container object is opened, it displays icons or other representations of the objects it contains, but not the contents of those objects. Since the container object does not need any data from the child object, only minimal communication is needed between the parent and the child.

Views

*Views* are links in which there is a transfer of data from the child object to the parent object. The child object in a view is the *source* of the data and the parent is the *destination* in the transfer.

In contrast to simple links, views require additional responsibilities from the parent and child objects. The parent object is responsible for requesting that data be transferred. The child object is responsible for informing the parent when new data is available and for supplying data when it is requested.

There are two different kinds of views: data passing and visual.

A *data passing view* is one in which the child sends data to the parent for interpretation. An example of a data passing view is "6 Month Sales" passing sales data to "Sales Chart". "Sales Chart" then uses the data to create its graph.

A *visual view* is one where the child renders a picture of itself for the parent on the display or the printer. An example of this type of view is "Sales Chart" displaying itself within "Annual Report". In such a case, no actual data reaches the parent object.

Figure 2-7 shows the types of links between the objects in the example.

The details of setting up a view between two objects are discussed later in the chapter.

View Examples

To help your understanding of views, we recommend that you experiment with the HPTEXT and HPLAYOUT sample applications. HPTEXT is a typical source object. It permits you to select portions of text to be shared with other objects in visual views. HPLAYOUT is a typical destination object that can accept a visual view from a source object. You should go through the exercise of transferring data from HPTEXT to HPLAYOUT. You should also try out the "Manage Links" commands in HPTEXT to see how views are maintained.

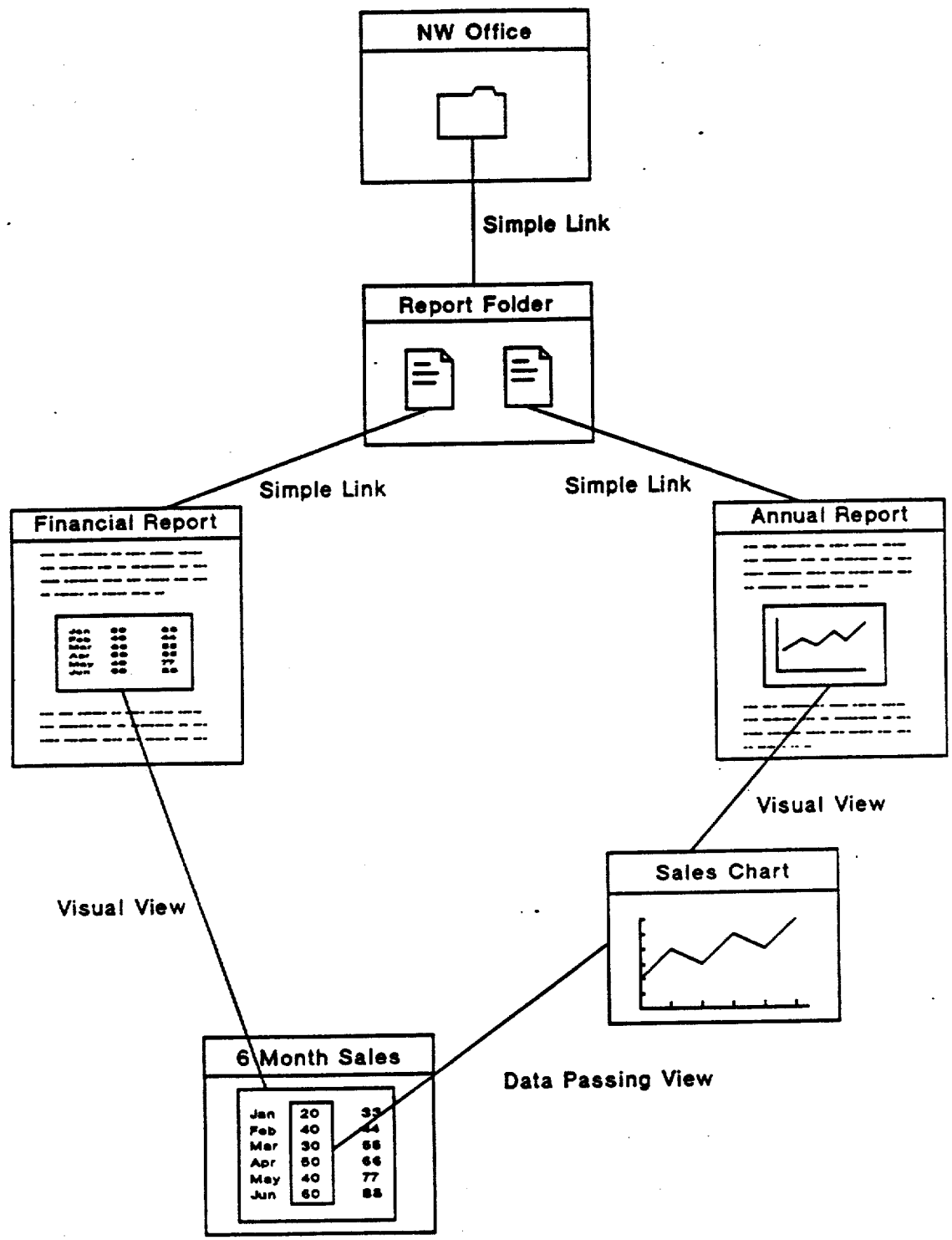
Figure 2-7. Types of Links

Reference Names

Wherever there is a link, there must be a reference name for the parent object to identify the child object. Reference names are used by the OMF in function calls to identify objects to be passed. When reference names are passed, they must be declared as type OBJECTNAME. OBJECTNAME is defined as being 32 bits long (a double word).

The first 3 bits (high order bits 31, 30, 29) are known as the scope of the object name. The *scope* is used to furnish additional information concerning the object, the link, or the object's usage, depending on the nature of the function call and object. The three scope bits define how the remaining 29 bits in OBJECTNAME are to be interpreted.

The OBJECTNAME scope value can be one of the following: *global, persistent, datalink, parameter, self* or *nullscope*. These names provide a means for the OMF and other applications to reference objects and act appropriately.

The following scopes are defined:

GLOBAL - Global names can be used by any object to refer to one of the system objects, such as the NewWave Office, File Drawer, Waste Basket, the Print Spooler, the OMF Clipboard, the Agent, etc. A given global name always refers to the same system object no matter who uses it.

PERSISTENT - This is the scope that objects use to name their own children in a simple link, i.e., a container relationship. The term persistent refers to the fact that the name persists as long as the relationship is in existence. The parent object can arbitrarily assign any value to the low order 29 bits and the OMF remembers that name. Persistent names are only usable by the parent who assigned them. Persistent name X used by one object does not necessarily refer to the same object as persistent name X used by a different object.

DATALINK - This is similar to the PERSISTENT scope except that it refers to visual or data passing views as opposed to simple links.

PARAMETER - This scope allows the name of an object to be passed as a parameter to a message. This name refers to the same object no matter which application uses it.

An important difference between a parameter name and a global name is that a parameter name is transient. A parameter name is valid only as long as the object to which it refers still exists on the same system. In most cases, a parameter name is passed in a message and gets used while processing that message. The name is then forgotten or used to assign a persistent or datalink name to the object.

It is not valid for an object to remember any parameter names in its data file while it is inactive, because the parameter name may no longer be valid if the object is copied or if the referenced object no longer exists. Parameter names are obtained by calling OMF_MakeObjParam on a name of some other scope.

SELF - This scope always refers to the object making the particular OMF call. The low 29 bits are ignored for all object names of this type.

NULLSCOPE - This indicates an error condition. NULLOBJECT is a pre-defined name for this scope. Calling OMF_Assign to assign NULLOBJECT to a persistent or datalink name enables the parent object to delete the links to its children. NULLOBJECT and NULLSCOPE do not equal NULL however.

View Specifications

Whenever a view is established, certain information concerning the view must be stored. This information is referred to as a view specification or view spec for short. A *view specification* is the information associated with a view that indicates which part of the source object is being referenced, where it is placed in the destination object and other information concerning the nature and status of the view. The view specification also specifies which kind of data transfers the child object can provide and how the system should perform those data transfers.

The view specification information is not a single entity; rather, it has three components. They reside in the destination object, the source object, and the OMF. It is thus useful to think of the view specification in terms of its locations as follows:

- Destination Specification
- Source Specification
- OMF View Specification, including:
    - Data ID
    - Textual Data ID
    - View Class
    - Snapshot Indicator
    - Flags Figure 2-8 shows the view specifications for two views from our example.

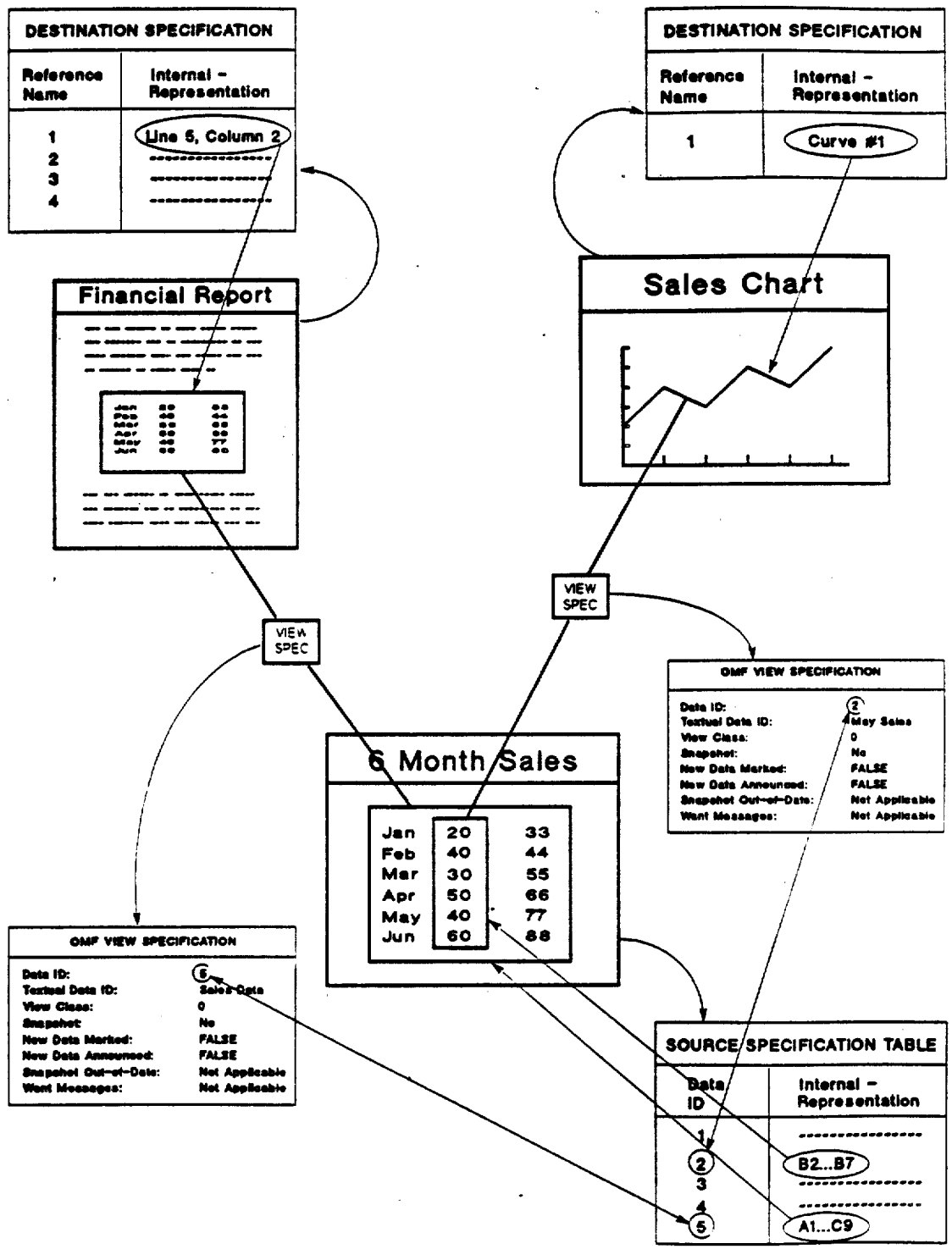
Figure 2-8. Example of View Specifications

Destination Specification  The *destination specification* indicates where within the parent object the data from the child object is to be displayed or used. Although logically this is associated with the view specification, it is only used and maintained by the parent object and is not kept by the OMF as part of the view spec. The parent object has complete responsibility for keeping track of where within itself it displays or uses data from a child object.

Source Specification  The *source specification* indicates which part of the child object is being displayed (in the case of a visual view) or transferred (as in a data passing view). The source specification is logically associated with the view spec, but actually is stored by the child object. The source specification is a data structure that the child object uses to keep track of a single range of viewed data. The child object usually maintains a table of source specifications for the various ranges of viewed data that it is supporting.

OMF View Specification  The OMF is responsible for storing the data ID, textual data ID, view class, snapshot indicator, and flags. These are described below.

Data ID

The *data ID* is a token assigned by the child object to identify a part of itself being displayed or transferred. This ID is used as a parameter for identifying views in the OMF function calls made by the child object.

The data ID is actually a 16-bit integer and is often simply an index into the table of source specifications belonging to the child. Each source specification describes a part of the object being transferred.

The same range of viewed data can be used in multiple views. When this happens, the same data ID is used for these views. Generally the child object does not care how many views are using the same data ID, except when it is checking to see if a data ID is still in use.

Often there will be multiple data IDs within the same child object that refer to different parts of the data. In our example, "6 Month Sales" has a data ID corresponding to "B2...B7" (the column of data used to build the chart) for its view to "Sales Chart". On the other hand, the data ID for the link between "6 Month Sales" and "Financial Report" corresponds to "A1...C9" because those are the columns used.

In the view spec for the link between "Sales Chart" and "Annual Report", the data ID "0" is used. Objects that cannot support views of different parts of themselves will generally use the same data ID for all views they support. The chart application uses data ID "0" for this purpose.

Textual Data ID

The *textual data ID* is a string that can be displayed to the user for the purpose of identifying the transferred information. It is up to 32 characters and is supplied by the child object. Although not required, it is good practice for child objects to specify textual IDs.

In "Annual Report", the user sees the "Sales Chart" child object as "Sales Graph". In "Sales Chart", the "6 Month Sales" object is seen as "6 Month Graph Data". In "Financial Report", "6 Month Sales" is seen as "6 Month Report Data".

View Class

The *view class* specifies which operations the parent object can request a view to perform. These operations are called *view methods*. They are either the methods the source object itself can perform (i.e., are included in its HAVE_METHODS list), or else they are methods that the object guarantees will be supported on its behalf by a snapshot associated with any of the views it provides (snapshots are defined later in this chapter).

Different classes of objects will in general need to provide different sets of view methods to support particular data types. For example, a chart might support only visual views, a text object might support a set which also includes transferring text data, and a spreadsheet would likely add transfer of numeric data as well.

Although most objects need to define only one such set of view methods, complex objects may need to define more than one set to support views of different data types they may contain. An object can define up to eight such sets as described below. Although a given child object can support more than one kind of a view, once a particular view spec has been established, its view class cannot be changed.

The view class is specified by an integer in the range 0 to 7. Each view class value is associated with a different class property of the child object. A range of 8 numeric property names, PROP_VIEWMETHODS + 0 through PROP_VIEWMETHODS + 7, is reserved for this purpose. Only those class properties that are to be used need to be defined. Each of these properties is simply a list of WORDs with each word specifying a supported view method. The PROP_VIEWMETHODS properties should never be altered after the object class has been installed.

The view class is usually 0 unless your application can supply fundamentally different types of data. For example, if the application SPREAD.NWE can supply both graphics and spreadsheet data to other objects, there needs to be two different view classes since the relationships are not the same.

A parent object can test the methods of a view by using the OMF routines OMF_GetViewMethod and OMF_GetViewMethodList.

View class 0 is a special class in that it identifies the methods of an *initial view* (or *default view*) of an object. An initial view is a view that is created when the user has not specified any particular part of the child object to be transferred. This occurs when an icon is pasted or moved into the parent's window, or when a new object is created within a parent object. For example, when a spreadsheet icon is Cut from a folder, and Pasted into a document, an initial view of the spreadsheet is created.

Initial views must be of view class 0 so that prospective parents can know which view methods will be supported before accepting a child object for inclusion.

Snapshot Indicator

The *snapshot indicator* tells the OMF if a view uses a snapshot, and if so, identifies the snapshot. A snapshot can be described as an "intelligent buffer" for the data being transferred through a view. A *snapshot* is a special type of object that is associated with a separate executable file (referred to as a *dynamic access library*) instead of the full application code. This is described in depth later.

Snapshots have a one-to-one relationship with data IDs. If several views of the same child object have the same data ID, then they also will have the same snapshot.

A child object makes the decision whether or not a snapshot is appropriate for the view. This decision is transparent to the parent object. A child object that does not provide a snapshot must be prepared to receive and process the view messages that the parent object sends to the view. A view message is a request to a view. The OMF routes it to the snapshot if it exists or to the source object according to the algorithm illustrated in Figure 2-9.

Even when a snapshot is provided, it does not necessarily have to service all the view methods. Since the snapshot is an object, it has a set of methods associated with its object class that are distinct from the view methods of the view. A snapshot is not asked to perform a view method unless its own class supports the method. When a view is initialized, an object class is specified for the snapshot. The class defines the methods that the snapshot will support. (A view message that a snapshot does not support is passed on to the child object if supported there. If not, then an error is returned.)

Note also that a snapshot does not have to be kept up-to-date by the child object. The child object has a choice about what the OMF should do when a message is sent to a view with an out-of-date snapshot. The child object can request that the OMF force it to update the snapshot, or to route any view messages to the child object itself, bypassing the snapshot completely.

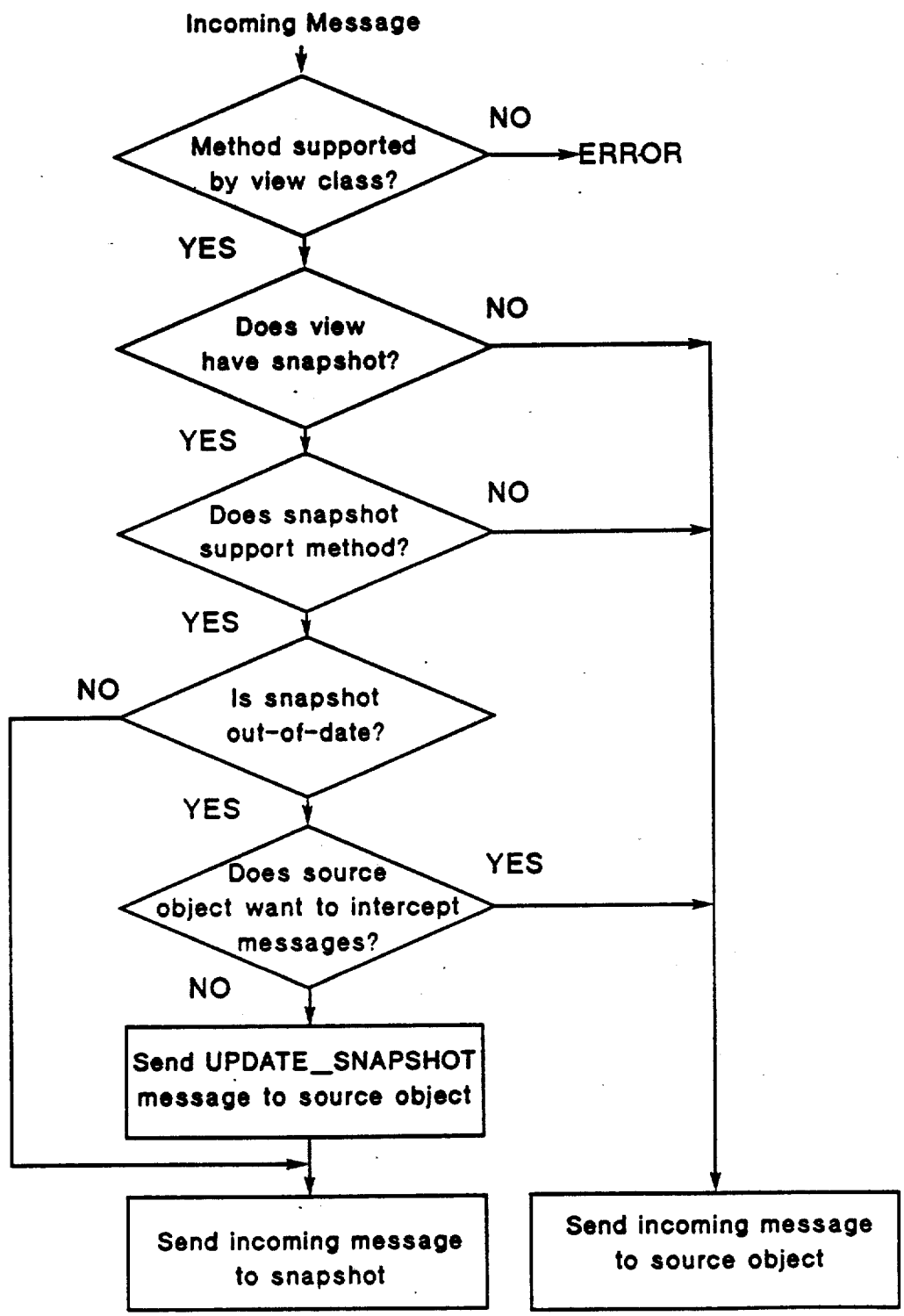
Figure 2-9. How Views Deal with Incoming Messages

Flags

There are four flags that are used when dealing with a view.

*New data marked* indicates that new data has been marked for this view but not yet announced. It essentially means that a change to the source object is in progress. This flag is set when the source object calls the function OMF_SetNewData.

*New data announced* indicates that the source object change is complete but that when the new data was announced for this view, the parent object was inactive. As a result, this flag is set to true, so that when the parent object becomes active, it will look for the new data. This flag is set when the source object calls the function OMF_AnnounceNewData and the parent is inactive. The parent object can test this flag with the function OMF_TestNewData and clear it with the function OMF_ClearNewData.

*Snapshot out-of-date* indicates that the snapshot's contents are not up-to-date. This flag is set by the source object. Its effect is shown in Figure 2-9 "How Views Deal with Incoming Messages".

*Want messages* indicates what the OMF should do with view messages when the snapshot is out-of-date. This flag is set by the source object. Its effect is shown in Figure 2-9 "How Views Deal with Incoming Messages".

Snapshots

A snapshot is a special kind of object. Normally, working with a view causes the child object's application to be invoked. Where large applications are involved, this can cause a lot of unnecessary overhead. To eliminate this overhead, you can set up your application to provide snapshots.

A *snapshot* is an object that uses executable code from a separate library referred to as a *dynamic access library* (or *DAL*) rather than using the full application executable code. The code in the DAL need only perform those functions necessary for manipulation of the view inside a parent object. Typically, a snapshot only needs to be able to display itself and transfer data. Thus, the child object does not have to be active in order for the parent to display or get data from it.

Figure 2-10 illustrates the difference between a view with and a view without a snapshot. On the left side, the view between "Financial Report" and "6 Month Sales" is shown without a snapshot. Note that the "6 Month Sales" object is active but not open; there is no visible window. As a result, there is more overhead on the system because the full SPREAD.NWE application is running. On the right, the same view is shown with a snapshot as alternative. In this case, the "6 Month Sales" object is shown in a state of dormancy and SPRDSNAP.NWE (a fictitious name for the spreadsheet snapshot library) is active. This results in less overhead on the system.

Note that a snapshot must be self-contained and include all of the data necessary for it to perform its methods. The snapshot may choose to keep data in any suitable form. For example, the SPREAD application probably stores its data in tables of numbers. SPRDSNAP.NWE could be simplified by storing a vector description of the table which can be quickly replayed on demand. Note also that the snapshot needs to keep only that data described by the source specification of the view.

Snapshot objects cannot be compound. Snapshot objects are referred by the child object using reference names with PARAMETER scope. The parent object cannot tell if a snapshot is being used or not. It just sends messages to the view (via OMF_SendViewMsg) and the OMF routes the message to the snapshot or child object as described earlier in Figure 2-9 "How Views Deal with Incoming Messages".

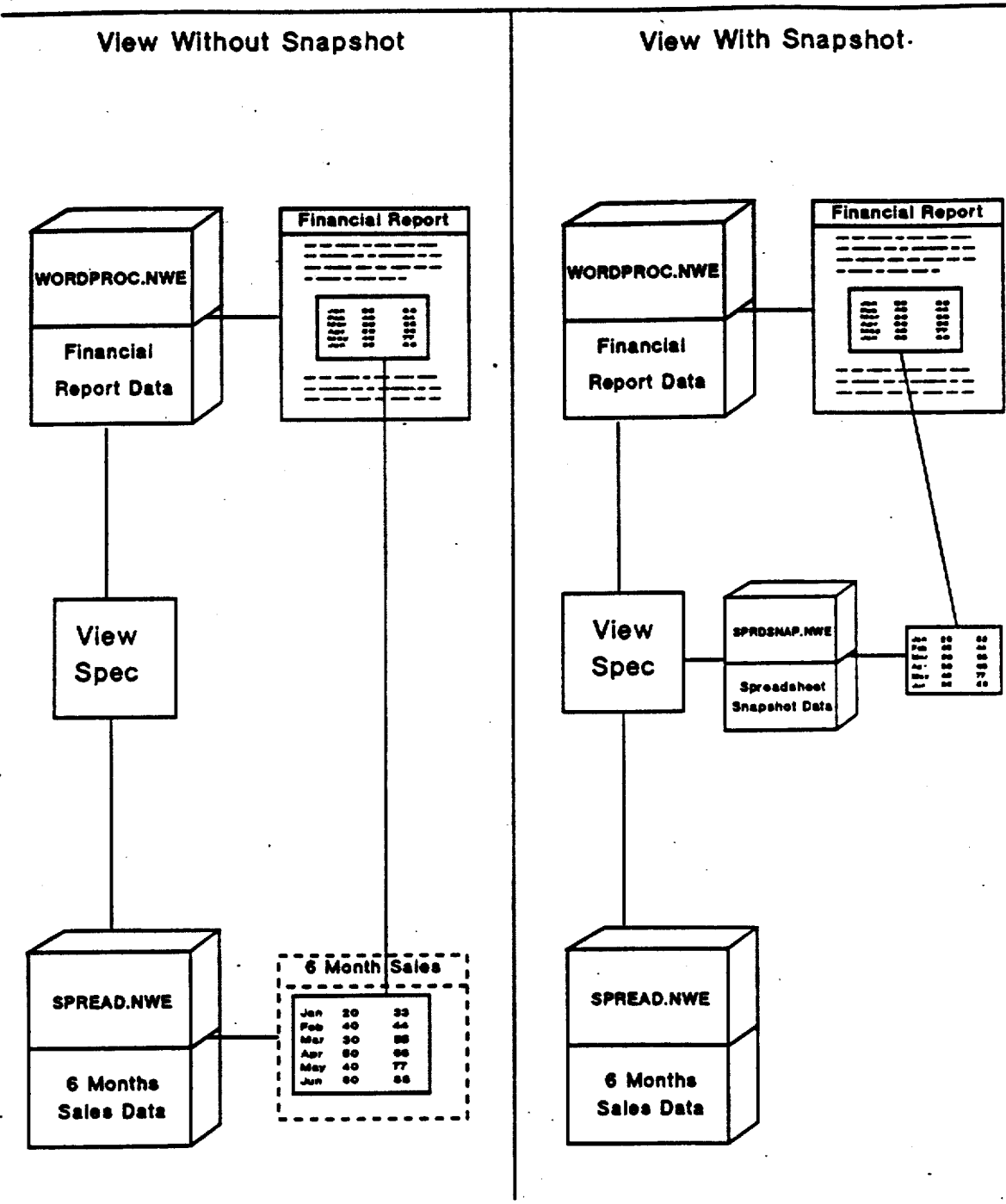
Figure 2-10. Difference Between View With Snapshot and View Without Snapshot

Dynamic Access Objects

Dynamic Access Libraries (or DALs) bind a data file with a dynamic library containing code that can perform operations on the data. An object which has a dynamic access library instead of the code of the application itself, is referred to as a *dynamic access object*. A dynamic access object is best thought of as a library that binds together the object's data and operations on that data, such as reading, writing, and displaying.

Dynamic access objects are not active in the same sense that normal objects are, for they do not directly interact with the user. Most importantly, dynamic access objects are not allowed to make most OMF calls themselves.

The most common use of a dynamic access object is as a snapshot. Remember that a snapshot is an object, but its data file only contains the data from the portion of the source object being viewed. Also the code which encapsulates the data file is a dynamic library, as opposed to another application.

All dynamic access objects must have a class property of PROP_DALNAME. This gives the name of the dynamic library's executable file that is associated with that particular object. This class property is set up when the dynamic access object's class is installed.

There are two interfaces to describe for dynamic access objects: the external interface that an application using the dynamic access object sees, and the internal interface that the object presents to the OMF.

External DAL Interface

The *external DAL interface* is what the application object sees. This interface consists of three functions:

1. OMF_GetDALObject - Activates a dynamic access object.
2. OMF_FreeDALObject - Frees a dynamic access object.
3. OMF_SendDALMsg - Sends a message to a dynamic access object.

Each of these calls is described in detail in the Programmer Reference Manual.

When a dynamic access object is used as a snapshot, the child object uses these calls to define and update the contents of the snapshot.

The parent object does not use these calls to access the snapshot. Instead, OMF will internally make these calls when the parent object calls OMF_GetView, OMF_FreeView, and OMF_SendViewMsg, respectively.

Internal DAL Interface

The *internal DAL interface* is the interface that the dynamic access object presents to the OMF. These are messages that are sent to the library by the OMF. All DAL objects must support these messages. This interface consists of four messages:

1. LIB_OBJ_INIT - Sent to an object to pass it the root filename of its data files.

2. LIB_OBJ_TERMINATE - Sent to an object when all outstanding OMF_GetDALObject and OMF_GetView calls on it have been freed by corresponding calls to OMF_FreeDALObject and OMF_FreeView.

3. LIB_USER_INIT - Sent to an object to inform it another user has made a call to OMF_GetDALObject or OMF_GetView on it. The term *user* here refers to another object accessing the DAL object.

4. LIB_USER_TERMINATE - Sent to an object to inform it that a user of the DAL object has called OMF_FreeDALObject or OMF_FreeView on it.

A fifth message, LIB_COPY_SELF, is not required for dynamic access objects in general, but is required for snapshots.

These messages are explained in detail in the "HP NewWave Environment: Programmer Reference Manual".

All dynamic access libraries must contain an EXPORTed entry point to process messages "sent" to the DAL object. The actual name of the entry point does not matter; but the library's module DEF file must EXPORT the routine as ordinal entry point "@ 1". It is recommended that this is the only EXPORTed entry point for the library.

The procedure to handle messages to the dynamic access library is called the library's *message procedure*, and must have the following form:

```
LONG FAR PASCAL MessageProc (hObjData, hUserData, wMsg, lParam)
``` where:

*hObjData* is the handle returned by the library when it was sent LIB_OBJ_INIT message for this object. This allows the library to determine which object is receiving the message. If the message being received is LIB_OBJ_INIT, this parameter is NULL.

*hUserData* is the handle returned by the library when this object was sent the LIB_USER_INIT message. This allows the library to determine which user of the object is sending the message, if it needs to do so. If the message being received is LIB_USER_INIT, this parameter is NULL.

*wMsg* is the message type that the caller specified to OMF_SendDALMsg.

*lParam* is the lParam that the caller specified to OMF_SendDALMsg. Interpretation of this value varies for different message types.

Maintaining A View

After a view has been set up, it will require further maintenance: either updating or deleting the view.

Updating A View

When a child object is changed by the user, it must update all of the views affected by the change (by calling OMF_SetNewData and OMF_AnnounceNewData). The child object tells the system about each view needing to be updated. If the parent of a view is active when the child object is changed, the system notifies it with the message (DATA_CHANGE).

When a parent object is activated, it should ask the system (by calling OMF_TestNewData) if any of the views it includes were updated while it was inactive. Note that a parent may not care about this if it has a visual view to the child object, since it does not store any data from the child.

For example, if a change is made to "6 Month Sales", the "Financial Report" and "Sales Chart" need to be notified that a change is occurring. Here are the steps in the process:

1. "6 Month Sales" indicates that a change is in progress by setting the "new data marked" flags in the view specifications maintained by the OMF. Since the change is in progress, it is better to wait until the change is complete before updating the destination objects.

2. When the change is finally complete, "6 Month Sales" tells the OMF to announce the changes to its destination objects. Let's assume that "Financial Report", "Sales Chart", and "Annual Report" are inactive. The inter-object relationships cause the following to happen.

3. The OMF sets the "new data announced" flag maintained by the OMF for the "Financial Report"-"6 Month Sales" view specification. When "Financial Report" is opened, the flag will indicate that its data needs to be updated.

4. "Sales Chart" is a different situation because it is a source object to "Annual Report". A change in "6 Month Sales" affects "Annual Report" as well as "Sales Chart". "Sales Chart" is activated in order to receive the data change.

5. When "Sales Chart" announces that it has been updated, the "new data announced" flag for "Annual Report" object is set. Since "Annual Report" is inactive and not a source object, the flag is set rather than activating it.

Deleting A View.

When the representation of the child object is deleted in the parent object, the parent object informs the system that it no longer includes the child. If the data ID of the deleted view is then no longer in use, the system in turn notifies the child object (by sending the message LOSE_DATAID) that the particular data ID is no longer needed.

The LOSE_DATAID message is only sent if the child object is active when the parent object deletes the link. Thus, when the child object is activated, it should ask the system (by calling OMF_EnumParents or OMF_GetDataIdUsage) if any of the data IDs it provides were deleted. If so, the child object can remove its internal information (source specification) associated with that data ID. This is roughly analogous to a destination object calling OMF_TestNewData when it starts up.

Views are described in detail in the "HP NewWave Environment: Program Design Examples" manual where it is explained how to incorporate a view from both the parent and the child object.

Actions Performed on Objects

As opposed to conventional MS-DOS programming, programming in the NewWave environment is driven by events; it entails waiting for actions to occur to objects. Thus, it is useful to think in terms of the different actions that are performed on objects. An object can be created, activated, opened, closed, terminated, and destroyed.

Figure 2-11 illustrates the actions that can be performed on an object.

Creating Objects

To begin a new document, a user *creates* an object. This is done by opening on the "Create a New..." dialog box from the File menu and selecting the desired object. A copy of the appropriate template object is placed in the current window. The appropriate set of data files and the internal OMF entries are created.

At this point, the application is in a state of dormancy and no messages are sent to the application (except for encapsulated applications which are a special case). When the user is ready to enter new data, the object will leave its state of dormancy and go through activation and opening as described below.

Activating Objects

Between user sessions with an object, the object remains in a state of dormancy. If some other object in the system wishes to communicate with the object, it is *activated*. Often an object is activated in order for the user to gain access to the data. In that case, the object is also opened. (Opening is described below).

The major difference between activation and opening is that an activated object does not display its window or interact with the user in any way. It can, however, receive messages from other objects or the OMF. An open object has its own user interface (its window) and can be manipulated directly by the user.

When the object is activated, the OMF starts up the associated application. The first thing the application does is to create a NewWave window although it does not display the window or interact with the user in any way. As soon as the window is created, it registers the window handle with the OMF (by calling OMF_Init). The reason for this is that the OMF uses the window handle as the "address" to which messages are sent.

OMF_Init returns to the object the root name of the object's data files. The object may access those files immediately or it may simply remember the object file name for later access. Then it goes into its normal Windows message processing loop, and waits to be told what it should do next. The user sees nothing at this time.

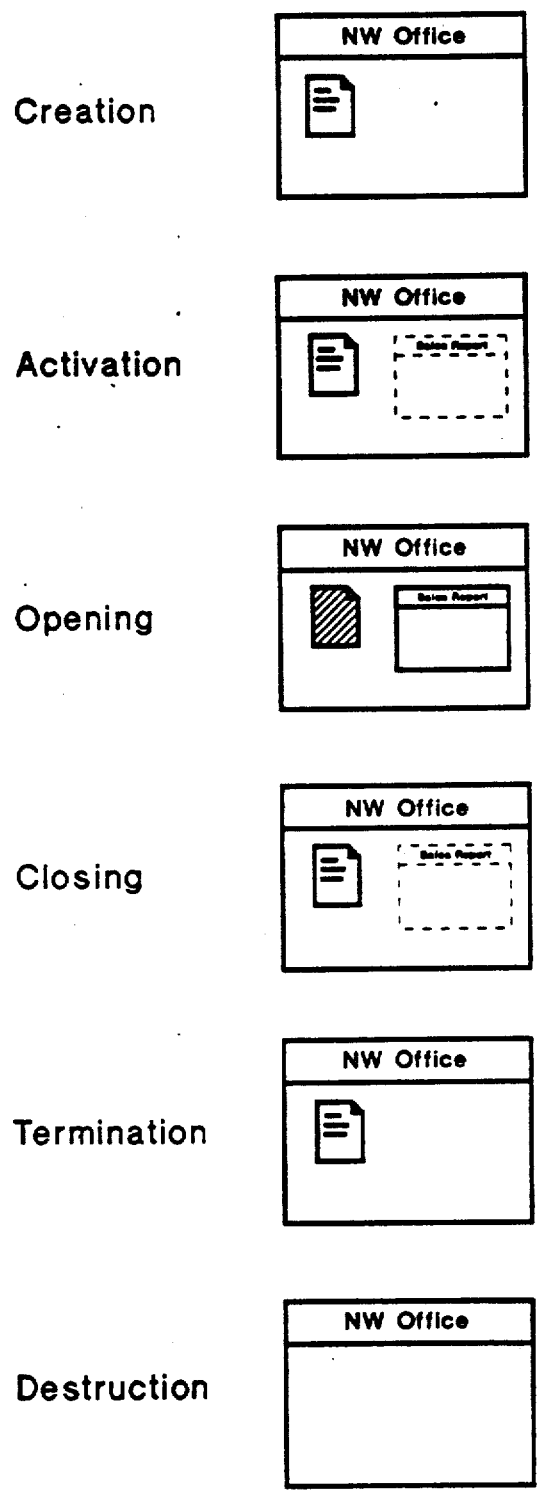
Figure 2-11 Actions Performed on Objects

Finally, the OMF sends the object a CREATE_OMF message. The object can perform any OMF-dependent initialization while processing the message. OMF_Init is the only OMF function that can be called before CREATE_OMF is received.

An example of an object that is active but not open would be "Sales Chart" when "Annual Report" is opened. "Sales Chart" needs to be active because it is being displayed within "Annual Report". It does not need to be open since the user is only involved with "Annual Report" and is not editing graphs.

Opening Objects

*Opening* an object means that the user has requested direct access to that object. In the process, its icon is grayed and a window is opened for the object. When a user gives a command that indicates that he wishes to work on an object (e.g., double-clicking on the object), the object is activated and is then sent a message (OPEN) to open itself. It then displays its window on the screen and is available for interaction with the user.

Editing is an example of an object being active and open. As an example, the user might open "Financial Report" by double clicking on its icon. Unseen by the user, the NewWave Office makes a call to OMF_GetOMFObject requesting activation of the "Financial Report" object. The OMF scans its tables and identifies the data files and application code that comprise that object. It then runs the application code (WORDPROC.NWE in this example), passing to the object the root name of the data file(s) corresponding to the object in question. The NewWave Office then makes a call to OMF_Send to send a message to the child object, "6 Month Sales" requesting that it open itself. Finally the document shows its window displaying the "Financial Report" data for the user to edit.

Closing Objects

*Closing* is the process of shutting down the application and is essentially opposite of opening. The user indicates that he is through working with an object by closing the object's window. The object then removes its "visible" window from the display without actually destroying it. It remains active but not open until it is terminated. The object remains active because other objects in the system may need to communicate with it. The object continues to execute its Windows message processing loop, and waits for more instructions.

Terminating Objects

When the OMF determines that no other active object in the system currently wishes to communicate with an object that is not open, the object is said to be terminated and the OMF sends that object a TERMINATE message. (Note that a terminated object is not deleted from the system; it is simply in an inactive state. See Destroying Objects below.) Termination is the counterpart to activation. When an object receives the TERMINATE message, it should 1. perform any housekeeping involved with termination such as saving data files and the coordinates of the window, 2. return to its message processing loop and wait for a DIE_PLEASE message, 3. then destroy its "hidden" window, and 4. finally terminate itself.

Objects should not destroy their "hidden" window and call the Windows function PostQuitMessage until the DIE_PLEASE message is received.

Destroying Objects

When a user no longer needs an object, either by itself or as part of a compound object, he can remove the object from the system by placing it in the Waste Basket and then emptying the Waste Basket. When the OMF determines that an object has no links to it from any other object in the system (including the Waste Basket) the OMF *destroys* that object. This means that the data files associated with that object are physically removed from the file system and the object no longer exists. Destroying is the counterpart to creating.

The Life Cycle of an Object

Figure 2-12 shows the typical life cycle of an object. An object is only created and destroyed once. Most often an object is activated, opened, worked on, closed, terminated, and then later re-activated. When an object is activated without being opened, it takes the path that bypasses Opening and Closing. When an object is closed but kept active and then requested to open again, it follows the path upwards from Closing back to Opening.

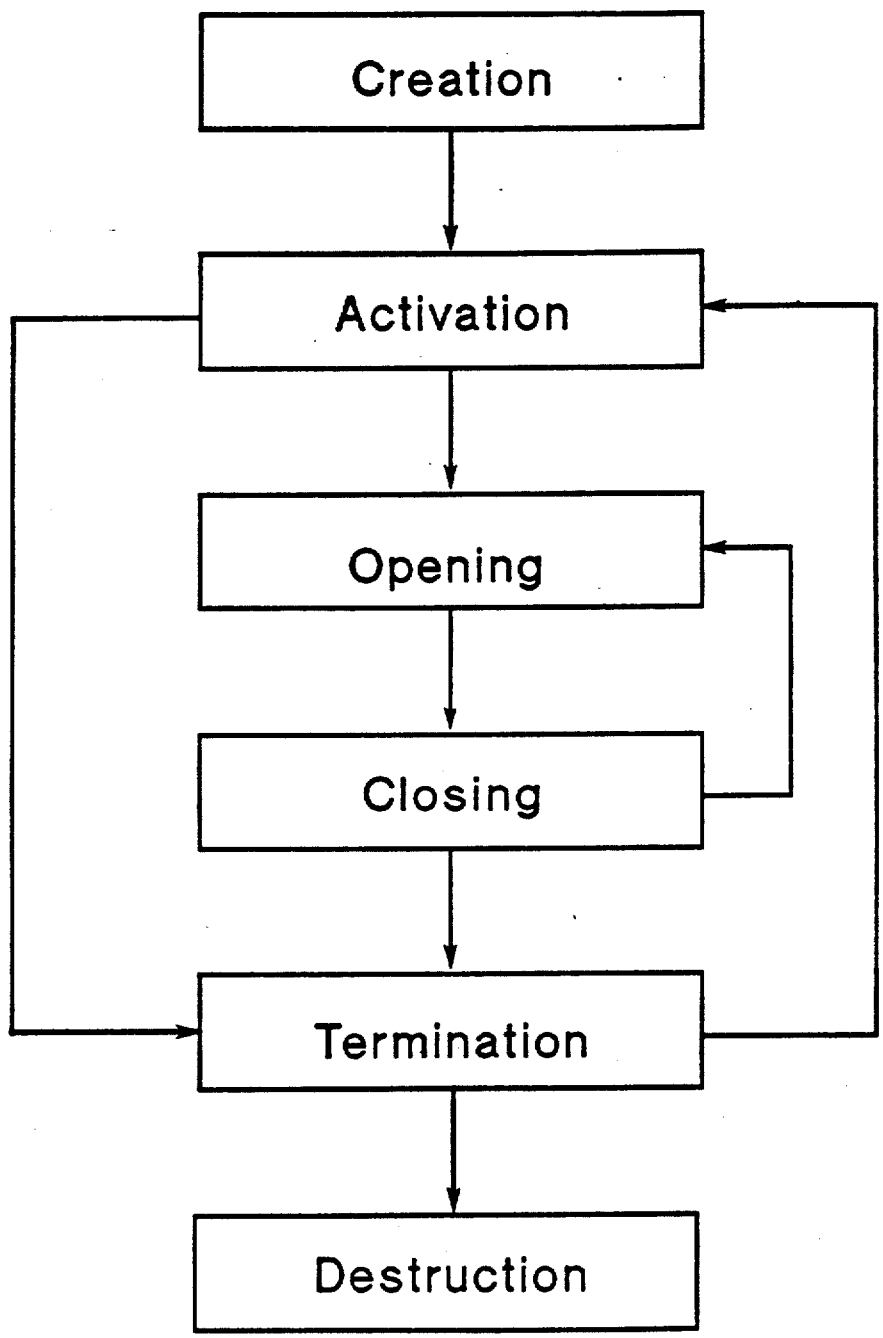
Figure 2-12. The Life Cycle of an Object

Serialization / Deserialization of Objects

It is possible to take an object from one NewWave system and move that object to another NewWave system. This is possible by serializing and deserializing the objects.

For example, suppose a user wants to send "Financial Report" to another NewWave system that is not connected electronically. The user performs this task by clicking the mouse button once to select the "Financial Report" object. The user then selects the "Export to Disk File" command from the Items Menu. At this point the user is prompted to type in a DOS filename to which the extension ".SER" is added. The user types in a filename of "A:\FINREPT", and serializes the object to a floppy disk in drive A:. The user then takes the disk to the next system, and places the floppy in drive A:. From the NewWave Office on the new system, the user selects the command "Import from Disk File" from the File Menu, and types the name of the file, "A:\FINREPT". The OMF performs a deserialization on that file, and the "Financial Report" document object now appears in the NewWave Office window.

Serialization also causes all child objects of the serialized object to be serialized. For example, since the "Financial Report" document includes "6 Month Sales", it must also be serialized into the same diskette file and would be re-created when the file was deserialized.

It is also possible for an object to be self-serializing. This means that the object may process and support its own serialization / deserialization in order to perform some special operations on its files. If an application states that it supports the SERIALIZE method, then this message is sent to the object for processing.

Once the application receives a SERIALIZE or a DESERIALIZE message from the OMF, the application reads and writes data from and to a serial file. All of the above mentioned functions are discussed in detail in the "HP NewWave Environment: Programmer's Reference Manual".

The rule of thumb is to let the OMF take care of serializing and deserializing an object. The only time that an application needs to process its own serialization/deserialization when it references an external file (a DOS file), or the format of its data file needs to be "cleaned" up before it can be serialized.

OMF Function Summary

There are approximately 70 functions available for calling the OMF. These fall into these eight general categories:

1. System Functions
2. Status Functions
3. Property Functions
4. Update Functions
5. Clipboard Functions
6. Serialization Functions
7. View Functions
8. Dynamic Access Library Functions Note that these are *general* categories set up for the convenience of learning the OMF functions. Not all of the functions fit neatly into these categories.

OMF System Functions

This category of OMF calls is the most general. It includes functions for initialization and termination as well as functions that retrieve miscellaneous OMF information.

Table 2-2. OMF System Functions

| Function/Macro | Description |
| --- | --- |
| OMF_Init | Registers with the OMF at startup. |
| OMF_Term | Last OMF call during termination process. |
| OMF_Opening | Informs the OMF that an object is now open. |
| OMF_Closing | Tells the OMF that the user closed the object. |
| OMF_ObjectFlag | Sets (or checks) OMF notification flags. |
| OMF_GetOMFObject | Establishes access to a known object. |
| OMF_FreeOMFObject | Tells the OMF that access to an object is done. |
| OMF_Send | Sends a message to another object. |
| OMF_PassWindowHandle | Tells the OMF that the window handle has changed. |
| OMF_GetOMFVersion | Returns the current OMF version number. |
| OMF_GetOMFDirectory | Returns the drive:path to the OMF files. |
| OMF_GetOMFError | Returns the most recent OMF error code. |
| OMF_Shutdown | Initiates a system shutdown. |
| OMF_ConfigChange | Causes a CONFIG_CHANGE message to be sent to all active objects that have set their FLAG_CONFIGURATION flag when a configuration value has changed. |

OMF Status Functions

The OMF status functions are used primarily to retrieve information concerning existing object relationships.

Table 2-3. OMF Status Functions

| Function/Macro | Description |
| --- | --- |
| OMF_EnumObjects | Returns names of generic objects. |
| OMF_EnumGlobalObjects | Returns names of global objects. |
| OMF_EnumChildren | Returns names of caller's child objects. |
| OMF_EnumChildrenOf | Returns names of specified object's child objects. |
| OMF_EnumParents | Returns names of calling object's parent objects. |
| OMF_EnumParentsOf | Returns names of specified object's parent objects. |
| OMF_GetChildCountOf | Gets a specified object's number of child objects. |
| OMF_GetParentCountOf | Returns the number of parents of a specified child object. |
| OMF_IsDescendant | Checks whether two objects are related. |
| OMF_GetMethod | Checks whether a given OMF method is supported by a specified object. |
| OMF_GetMethodList | Returns the complete list of an object's methods. |
| OMF_GetType | Returns the displayable class name. |
| OMF_GetIcon | Returns the handle to the object's icon. |
| OMF_GetObjectState | Checks if an object is open and/or active. |
| OMF_GetDiskSize | Gets the size (in bytes) of an object including its DATALINK descendants. |

OMF Property Functions

The OMF property functions are used to find out information about an object's properties and to make modifications to them.

Table 2-4. OMF Property Functions

| Function/Macro | Description |
| --- | --- |
| OMF_GetProperties | Returns the handle to the property list. |
| OMF_FreeProperties | Releases the property list. |
| OMF_ReadProperty | Reads from the property list. |
| OMF_WriteProperty | Writes to the property list. |
| OMF_ReadPropertyHandle | Reads a single property value into a global memory buffer and returns the handle to the buffer. |
| OMF_SetModified | Updates Modified/Last Writer properties. |

OMF Update Functions

The OMF update functions are used when adding or removing objects.

Table 2-5. OMF Update Functions

| Function/Macro | Description |
| --- | --- |
| OMF_MakeObjParam | Gets an object name that can be passed in a message. |
| OMF_Assign | Assigns an object to a reference name. |
| OMF_Copy | Duplicates an existing object. |
| OMF_AddChildTo | Adds a child object to a specified parent object. |
| OMF_RemoveChildFrom | Removes a child object from a specified parent object. |
| OMF_ImportObject | Creates an object from a DOS file. |
| OMF_Export | Copies an object's file to a DOS file. |

OMF Clipboard Functions

The OMF clipboard functions are used when moving objects to and from the clipboard.

Table 2-6. OMF Clipboard Functions

| Function/Macro | Description |
| --- | --- |
| OMF_PutOnOMFClipboard | Puts an object on the OMF clipboard. |
| OMF_PutViewOnOMFClipboard | Puts an object and a view on the clipboard. |
| OMF_RemoveFromOMFClipboard | Takes an object from the OMF clipboard. |
| OMF_EmptyOMFClipboard | Clears the OMF clipboard. |

OMF Serialization Functions

The OMF Serialization functions are used when converting objects to serial files or vice versa.

Table 2-7: OMF Serialization Functions

| Function/Macro | Description |
|---|---|
| OMF_Serialize | Creates a serial file from an object. |
| OMF_DeSerialize | Creates an object from a serial file. |
| OMF_GetSerialData | Reads data directly from a serial file. |
| OMF_GetSerialDataHandle | Reads data from a serial file returning a handle to the data. |
| OMF_PutSerialData | Writes data directly to a serial file. |

OMF View Functions

The OMF View Functions are involved primarily with view specifications.

Table 2-8. OMF View Functions

| Function/Macro | Description |
|---|---|
| OMF_InitViewSpec | Used by a child object to initialize a new view. |
| OMF_CopyViewSpec | Copies the viewspec from one view to another view. |
| OMF_SetDataIdText | Changes the view's textual ID. |
| OMF_SetSnapshotState | Allows child object to update the state of the snapshot. |
| OMF_SetNewData | Sets new data flag before announcing it. |
| OMF_AnnounceNewData | Notifies parent objects about new data. |
| OMF_GetDataIdUsage | Allows child object to determine the number of destinations where the data ID is used. |
| OMF_GetSnapshot | Returns the object name of the snapshot to the child object. |
| OMF_GetView | Activates a view in order to send messages to it. |
| OMF_FreeView | Deactivates a view when it is through receiving messages. |
| OMF_GetViewMethod | Tests for a single view method. |
| OMF_GetViewMethodList | Returns a list of view methods. |
| OMF_GetDataIdText | Returns a child object's description of the view. |
| OMF_SendViewMsg | Sends view messages to the child object or snapshot. |
| OMF_ClearNewData | Resets the new data announced flag for a view. |
| OMF_TestNewData | Called by a parent object to test a view's new data announced flag. |

OMF Dynamic Access Library Functions

The OMF Dynamic Access Library functions are used when dealing with a snapshot's dynamic access object.

Table 2-9. OMF Dynamic Access Library Functions

| Function/Macro | Description |
|---|---|
| OMF_GetDALObject | Activates a dynamic access object. |
| OMF_FreeDALObject | Frees a dynamic access object. |
| OMF_SendDALMsg | Sends a message to a dynamic access object. |

OMF Message Summary

Table 2-10. Required OMF Messages

| Message | Description |
|---|---|
| HAS_METHOD | Inquires about supported methods. |
| TERMINATE | Informs an object that it has been deactivated. |
| DIE_PLEASE | Tells an object to terminate itself. |
| CREATE_OMF | This is the first message from the OMF when an object is activated. |

Table 2-11. Major Event OMF Messages

| Message | Description |
|---|---|
| OPEN | The user has requested the object to open. |
| DISCARD_ICONS | Icon handles from OMF_GetIcon are no longer valid. |
| CLASS_CHANGE | Class properties have changed. |
| CONFIG_CHANGE | Sent to an active object that has set its own FLAG_CONFIGNOTIFICATION flag with OMF_ObjectFlag whenever any object calls OMF_ConfigChange. |
| QUERY_SHUTDOWN | Sent to all active objects that have set their FLAG_QUERYSHUTDOWN (with OMF_ObjectFlag) when the user tries to close the NewWave Office. |
| WARM_START | The object is being informed of a system restart after a system shutdown. |

Table 2-12. General Information OMF Messages

| Message | Description |
|---|---|
| OBJECT_OPENING | A child (or global) object has been opened. |
| OBJECT_CLOSING | A child (or global) object has been closed. |
| ADD_CHILD | A new child object is being added. |
| LOSE_CHILD | A child is being removed. |
| ADDED_PARENT | A reference to this object was added. |
| LOST_PARENT | A reference to this object was deleted. |
| PROP_CHANGE | The properties of the object, its child object, or a global object were changed. |

Table 2-13. OMF Message Replies

| Message | Description |
|---|---|
| ENUM_OBJECT | This message is returned from an OMF_EnumObjects call. |

Table 2-14. OMF Task Messages

| Message | Description |
|---|---|
| OMF_INSERT | An object is being passed for inclusion. |
| CONTAINMENT_STATUS | Used to test if an object can accept another object being dragged on top of it. |
| CONVERT | Sent to indicate that a conversion is to take place concerning an object and a file or memory block. |
| COPY_EXTERNAL | An object is being copied. |
| DESTROY_EXTERNAL | An object is being destroyed. |
| DESTROY_MODELESS | Used when a dynamic library is called to display a modeless dialog box. |
| SERIALIZE | An object is being serialized. |
| DESERIALIZE | An object is being deserialized. |
| COPY_SELF | Sent when OMF_Copy is called for that object. |
| MULTI_INSERT | Used to test if an object can accept multiple insertions from a group drag move or copy to the object. |
| PREPARE_PRINT | An object is being started by the print spooler. |
| PRINT_ADD_TO_QUEUE | Sent from inside an application to indicate that an object is to be printed. |
| PRINT_MASTER | Tells an object to print itself in entirety. |
| WINDOW_TO_TOP | Tells an object to bring its window to the front. |
| OMF_NEW_OBJECT | Sent when the CREATOR has created a new object at your request. |

Table 2-15. OMF View Management Messages

| Message | Description |
|---|---|
| INIT_VIEW | Sent from a parent object to a child object to initialize a new view specification. |
| LOSE_DATAID | Sent from the OMF to a child object to indicate no more requestors remain for a data ID. |
| UPDATE_SNAPSHOT | Sent from the OMF to a child object to update a snapshot. |
| DATA_CHANGE | Sent from the OMF to a parent object to indicate that new data is available. |
| DATA_CHANGE_END | Sent from the OMF to a destination object to indicate that no more new data is available. |
| DATAID_CHANGE | Sent from the OMF to a parent object to indicate that a view's textual data ID is new. |

Table 2-16. OMF View Messages

| Message | Description |
|---|---|
| GET_SIZE | Determines the size of a visual view. |
| DISPLAY_VIEW | Display a visual view in another object's window. |
| PRINT_SLAVE | Print a visual view as part of another object. |

Table 2-17. OMF Messages to Dynamic Access Objects

| Message | Description |
| --- | --- |
| LIB_OBJ_INIT | Passes the root filename of the object to a dynamic access library. |
| LIB_OBJ_TERMINATE | Sent to an object when the last outstanding OMF_GetDALObject call on it is being freed up by the OMF_FreeDALObject routine. |
| LIB_USER_INIT | Sent to an object to inform it about another user, that is, that another call to OMF_GetDALObject has been made. |
| LIB_USER_TERMINATE | Sent to an object to inform it that an application using the object has called OMF_FreeDALObject on it. |
| LIB_COPY_SELF | Sent to an object when its data file must be copied. |

OMF Property Summary

A list of the class properties and their descriptions follows.

Table 2-18. Class Properties

| Property Name | Description |
| --- | --- |
| PROP_CLASSNAME | The name of the class of objects. Not localized. |
| PROP_DALNAME | Used by Dynamic Access Library (DAL) objects only, identifies the object's dynamic library. |
| PROP_EVENTTRIGGERS | Used by the Agent to trigger tasks that utilize this object. |
| PROP_ICONNAME | Identifies the object's class icon. |
| PROP_METHODS | Identifies which messages this class of objects can respond to. |
| PROP_TEXTID | Identifies the name of the class (visible to the user). Used in localization. |
| PROP_USERUNITS | Contains the units of an object's size in terms that are relevant to the user, e.g., "pages", "number of objects", etc. Used in localization. (See PROP_USERSIZE below.) |
| PROP_VIEWMETHODS | Specifies the methods that are supported by views of objects of this class. Used by child objects of views. |

The full list of object properties appears below:

Table 2-19. Object Properties

| Property Name | Description |
|---|---|
| PROP_ADDCHILD | Allows children to be added and removed from the object, only appropriate for parent objects. |
| PROP_COMMENTS | Contains comments the user has entered concerning this object. |
| PROP_CREATED | Contains the date and time of the object's creation. |
| PROP_CREATOR | Identifies the user who created the object. |
| PROP_DESKTOPFLAGS | Used by encapsulated DOS applications only. Contains specific flags which permit/prevent editing an object's title; indicate data files in the DOS domain; cause deletion of DOS domain files if object is destroyed; and protect objects from move/copy/cut share. |
| PROP_EXTRADISK | Specifies the size of any data external to the OMF data base. |
| PROP_FASTPROPS | Permits the "fast prop" properties to be read by a single OMF_ReadProperty call (see below). |
| PROP_FORMATTEDFOR | Used by WYSIWYG objects only, identifies the device to be emulated for WYSIWYG. |
| PROP_ISANNOTATION | Identifies object as an annotation, e.g., a voice or text description. Used by annotation objects only. |
| PROP_LASTWRITER | Contains the name of the user who last modified the object. |
| PROP_MODIFIED | Contains the date and time of the object's last modification. |
| PROP_OLDAPPINFO | Used by encapsulated DOS applications only, identifies object as an old application shell object and contains certain DOS information. |
| PROP_PUBLIC | Indicates whether object should be copied when a parent is copied (otherwise, it is considered public and a second reference is made rather than a duplicate copy). |
| PROP_RECEIVED | Present on envelope objects only, contains the date and time that the envelope was received. |
| PROP_SENDER | Present on envelope objects only, identifies the sender of the envelope. |
| PROP_SYSTEM | For GLOBAL objects, specifies the visibility of the object. For other objects, specifies whether or not the object is the "blank" master copy. |
| PROP_TIMEZONE | Present on the NewWave Office only, identifies the user's time zone. |
| PROP_TITLE | Contains the object's title. |
| PROP_USERSIZE | Contains the size of an object in units that are relevant to a user, e.g., 16 pages for a text document, 34 objects for a folder, etc. (Contains number only; units are contained in PROP_USERUNITS. See above.) |

FastProperties

*FastProperty* is a special type of object property. Those properties classified as FastProperties can all be retrieved by a single call, the OMF function OMF_ReadProperty for property PROP_FASTPROPS. They are returned together in the FastProperty structure. The properties classified as FastProperties are:

PROP_MODIFIED,

PROP_LASTWRITER,

PROP_PUBLIC,

PROP_ADDCHILD,

PROP_SYSTEM,

PROP_EXTRADISK,

PROP_DESKTOPFLAGS, and

PROP_TITLE.

We claim:

1. A computer having a file management system, the file management system comprising:
   a plurality of application programs;
   a plurality of data files containing data created by application programs from the plurality of application programs;
   a plurality of class data structures, each class data structure including a reference to an application program from the plurality of application programs; and
   a plurality of object data structures, each object data structure including
   a reference to a class data structure from the plurality of class data structures,
   a reference to at least one data file from the plurality of data files,
   a text stirring which identifies the object to a user, and
   a tag which is hidden from the user and which identifies the object data structure to the computer, wherein the value of the tag is in no way derived from the text string.

2. A computer having a file management system, the file management system comprising:
   a plurality of application programs;
   a plurality of data files containing data created by application programs from the plurality of application programs;
   a plurality of class data structures, each class data structure including a reference to an application program from the plurality of application programs;
   a plurality of object data structures, each object data structure including a reference to a class data structure from the plurality of class data structures and a reference to at least one data file from the plurality of data files; and,
   a plurality of link data structures, each link data structure including a reference to a first object data structure in the plurality of object data structures which serves as a parent object of the link, and including a reference to a second object data structure in the plurality of object data structures which serves as a child object of the link, wherein the child object and the parent object are not the same for every link data structure.

3. A computer as in claim 2 wherein each link data structure in the plurality of link data structures includes:
   a value which identifies which part of the child object is viewed by the parent object.

4. A computer as in claim 2 wherein each object data structure from the plurality of object data structure additionally includes:
   a text string which identifies the object data structure to a user; and,
   a tag which is hidden from the user and which identifies the object data structure to the computer, wherein the value of the tag is in no way derived from the text string.

5. A computer having a file management system, the file management system comprising:
   a plurality of data files;
   a plurality of object data structures, each object data structure including a reference to at least one data file from the plurality of data files; and,
   a plurality of link data structures, each link data structure including a reference to a first object data structure in the plurality of object data structures which serves as parent object of the link, and including a reference to a second object data structure in the plurality of object data structures which serves as a child object of the link.

6. A computer as in claim 5 wherein each link data structure in the plurality of link data structures includes:
   a value which identifies which part of the child object is viewed by the parent object.

7. A computer as in claim 5 wherein each object data structure from the plurality of object data structure additionally includes:
   a text string which identifies the object data structure to a user; and,
   a tag which is hidden from the user and which identifies the object data structure to the computer, wherein the value of the tag is in no way derived from the text string.

8. A computer as in claim 5, additionally comprising:
   a plurality of application programs; and,
   a plurality of class data structures, each class data structure including a reference to an application program from the plurality of application programs;

wherein each object data structure from the plurality of object data structures includes a reference to a class data structure from the plurality of class data structures.

9. A computer having a file management system, the file management system comprising:

a plurality of data files; and, a plurality of object data structures, each object data structure including a reference to at least one data file from the plurality of data files, a text string which identifies the object data structure to a user, and a tag which is hidden from the user and which identifies the object data structure to the computer, wherein the value of the tag is in no way derived from the text string.

10. In a computer having a file management system, the file management system allowing for the linking of two objects, one object serving as a parent object and one serving as a child object, a method by which the file management system copies the parent object, the method comprising:

copying the parent object to form a copy of the parent object;

copying the child object to form a copy of the child object; and, linking the copy of the parent object to the copy of the child object.

11. In a computer having a file management system, the file management system allowing for the linking of two objects, one object serving as a parent object and one serving as a child object, a method by which the file management system copies the parent object, the method comprising:

copying the parent object to form a copy of the parent object; and, linking the copy of the parent object to the child object.

12. In a computer displaying a plurality of windows, a first window in the plurality of windows displaying data from a first data file, and a second window from the plurality of windows displaying data from a second data file, a method for displaying data from the first file in the second window, the method comprising:

creating a first data object structure which references the first data file;

creating a second data object structure which references the second data file;

creating a link structure which includes a reference to the first data object structure and to the second data object structure and which includes a specification of the data from the first file which is to be displayed in the second window.

13. In a computer system, a method for establishing a link between two object data structures wherein the link specifies a first subset of data to be shared, the method comprising:

constructing, in response to a first user command which specifies the data to be shared and a first object data structure as source of the data to be shared, a portion of a link which includes a reference to the data to be shared and a reference to the first object data structure from which the data originates; and completing construction of the link, in response to a second user command which specifies the second object data structure with which the data will be shared, by adding to the link a reference to the second object data structure.

14. A method as in claim 13 where the first user command in a "Share" command to a clipboard.

15. A method as in claim 14 where the second user command is a "Paste" command from a clipboard.

16. A computer as in claim 1 wherein each object data structure from the plurality of object data structures additionally includes:

a reference to a plurality of class properties, specific class properties within the class properties being determined based on a class data structure from the plurality of class data structures to which the object data structure includes a reference.

17. A computer as in claim 2 wherein each object data structure from the plurality of object data structures additionally includes:

a reference to a plurality of class properties, specific class properties within the class properties being determined based on a class data structure from the plurality of class data structure to which the object data structure includes a reference.

18. A computer as in claim 2 wherein each link data structure from the plurality of link data structure additionally includes a reference name.

19. A computer as in claim 5 wherein each link data structure from the plurality of link data structure additionally includes a reference name.

20. A computer as in claim 8 wherein each object data structure from the plurality of object data structures additionally includes:

a reference to a plurality of class properties, specific class properties within the class properties being determined based on a class data structure from the plurality of class data structures to which the object data structure includes a reference.

21. A method as in claim 10 wherein the step of linking the copy of the parent object to the copy of the child object includes:

placing in a link table a new link entry, the new link entry including a reference to the copy of the parent object, a reference to the copy of the child object and a reference name, the reference name being a copy of a reference name included in a link entry in the link table which is for a link between the parent object and the child object.

22. A method as in claim 11 wherein the step of linking the copy of the parent object to the copy of the child object includes:

placing in a link table a new link entry, the new link entry including a reference to the copy of the parent object, a reference to the child object and a reference name, the reference name being a copy of a reference name included in a link entry in the link table which is for a link between the parent object and the child object.

23. A computer having an object-oriented file management system which manages a plurality of application programs and a plurality of data files containing data created by application programs from the plurality of application programs, the file management system comprising:

a plurality of object data structures, each object data structure including a class reference which indicates class of the object data structure,
a reference to at least one data file from the plurality of data files, and
a reference to a plurality of class properties, specific class properties included within the class properties being determined based on the class reference.

24. In a computer having a file management system, the file management system allowing for linking pairs of objects by recording a link in a link table, for every pair of linked object, one object in the pair of linked objects serving as a parent object and one object in the pair of linked objects serving as a child object, a method by which the file management system removes a first parent object from the file management system, the method comprising the steps of:
  (a) for every object which is linked to the first parent object as a child object, performing the following substeps,
    (a1) deleting a link in the link table linking the first parent object to the child object, and
    (a2) if the child object is not linked as a child object to any other objects, removing the child object from the file management system; and,
  (b) deleting the first parent object.

* * * * *